United States Patent [19]

Anderson

[11] Patent Number: 5,818,649
[45] Date of Patent: Oct. 6, 1998

[54] ELECTROMAGNETIC ENERGY DIRECTING METHOD AND APPARATUS

[76] Inventor: John E. Anderson, 75 Craigmount Avenue North, Corstorphine, Edinburgh, EH4 8DT, United Kingdom

[21] Appl. No.: 613,006

[22] Filed: Mar. 8, 1996

[30] Foreign Application Priority Data

Mar. 23, 1995 [GB] United Kingdom ............. 95 06 010.9

[51] Int. Cl.⁶ .............................. G02B 17/00; G21B 1/00
[52] U.S. Cl. .......................... 359/726; 376/103; 376/104
[58] Field of Search ...................................... 359/726–736

[56] References Cited

U.S. PATENT DOCUMENTS

| | | | |
|---|---|---|---|
| 3,805,051 | 4/1974 | Rambauske | 362/346 |
| 3,805,052 | 4/1974 | Rambauske | 362/346 |
| 3,941,459 | 3/1976 | McFarland et al. | 359/859 |
| 4,003,639 | 1/1977 | McFarland et al. | 359/859 |
| 4,027,185 | 5/1977 | Nodwell et al. | 313/35 |
| 4,031,384 | 6/1977 | Sherman, Jr. | 250/203.1 |
| 4,084,581 | 4/1978 | Vigoureux | 126/600 |
| 4,179,192 | 12/1979 | Shafer | 359/858 |
| 4,195,914 | 4/1980 | Hughes | 359/858 |
| 4,270,844 | 6/1981 | Cobble et al. | 359/853 |
| 4,700,102 | 10/1987 | Camm et al. | 313/24 |
| 4,937,490 | 6/1990 | Camm et al. | 313/12 |

FOREIGN PATENT DOCUMENTS

| | | |
|---|---|---|
| 1029427 | 8/1963 | United Kingdom . |
| 1412955 | 11/1975 | United Kingdom . |
| WO 91/10212 | 7/1991 | WIPO . |

OTHER PUBLICATIONS

Reviews of Modern Physics, vol. 59, No. 3, Part II, Jul. 1987 "Report to the APS of the Study Group on Science and Technology of Directed Energy Weapons".

Arc Lamp Systems Vortek Industries Limited.

Frieden, Lt.Cdr. David R., Principles of Naval Weapon Systems, Ed., 1985, pp. 192, 316.

Novotny, Eva, Introduction to Stellar Atmospheres and Interiors, 1973, pp. 59–63.

Ditchburn, R.W., Light, 3rd Ed., 1980, pp. 379–383.

Born, M. & Wolf, E., Principles of Optics, 6th Ed., 1986, pp. 143–154, 166–169, 188–190, 197–202.

Proc. Phys. Soc., 60(1948), pp. 293–304.

Mach, E., The Principles of Physical Optics, 1926, pp. 28–29, 252–253.

(List continued on next page.)

*Primary Examiner*—Scott J. Sugarman
*Attorney, Agent, or Firm*—Bacon & Thomas

[57] ABSTRACT

A method and apparatus for directing electromagnetic energy may be used as a directed energy weapon, illuminator for an active sensor and/or guidance system, countermeasure, or to ignite a fusion weapon; as a beam expander; for power transmission by a beam; propulsion by a beam or inertial fusion; power generation from inertial fusion; telecommunication; or computer hardware. The method and apparatus direct electromagnetic energy from a source made up of an area or volume as opposed to a point. Electromagnetic energy of at least one wavelength is emitted first towards a defined surface and thence to a defining surface. Each surface is either everywhere reflective or refractive, and each point on the defined surface lies at a point of intersection of a pair of defining rays radiating from different points on or within the source. Each defining ray is of a defining wavelength. Each defining ray is reflected or refracted by the defined surface and is then incident to the same side of the defining surface at a respective further point where it is reflected or refracted through a respective predetermined directed angle. The directed angle of a half-tangent to the defining surface which is co-planar with the two defining rays and lies at any intermediate point on the defining surface between the two respective further points is intermediate between the directed angles of two similarly orientated half-tangents which are co-planar with the two defining rays and lie at the respective further points.

214 Claims, 72 Drawing Sheets

OTHER PUBLICATIONS

Karim, M.A., Electro–optical Devices and Systems, 1990, pp. 7–8.

Principles of Mathematics, Allendoerfer & Oakley, 1955, pp. 90, 206–208.

Encyclodedic Dictionary of Mathematics, 2nd Ed., 1987, §84B, 93A,H; 106B,H; 193A,C; 198A,H; 294B, 330, App.A Table 3.V(2)(ii), App.A Table 9.V, App.A Table 10.1V, App.A Table 15.VI(2).

Siddons, A.W., Snell, K.S., Morgan, J.B., A New Calculus Part III, 1961, pp. 3.137, 3.159, 3.204/5, 3,248, 3,298/9, 3.311/2, 3.317/8.

Born, M., & Wolf, E., Principles of Optics, 6th Ed., 1986, pp. 1–18, 36–45, 109–121, 319–320, 375, 544, 556–578, 615–624, 652–656.

Optics & Laser Technology, vol. 22, No. 2 (1990), pp. 127–130, vol. 23, No. 2, pp. 105–108.

SKF Transrol high efficiency ball and roller screws 3369/2 E, undated, pp. 40–43.

Davall Gears Catalogue, No. 101/86/GB/10M, undated, pp. 157–159.SKF General Catalogue, 1985, p. 62.

Ditchburn, R.W., Light, 3rd Ed., 1980, pp. 18–26, 31–40, 54–55, 103–105, 108–112, 148–150, 155–156, 430–433, 460–461, 494–498, 517–522, 537–540, 648–663, 700–702.

Sommerville, D.M.Y., Analytical Geometry of Three Dimensions, 1959, 1959, p. 121.

AutoCad Release 10 Reference Manual, 1989, pp. 123–124.

Gaydon, A.G. & Hurle, I.R., The Shock Tube in High–Temperature Chemical Physics, 1963, pp. 4, 50, 83, 180–181, Table VIII.3 pp. 188, 214–215, 256.

Shock Tube Research, Proc. of the 8th Int. Shock Tube Symp., 197, pp. 11/1–15.

Hagler, M.O. & Kristiansen, M., An Introduction to Controlled Thermonuclear Fusion, 1977, pp. 42–43, 125–148, 162–163, 166–170.

Martin, Dr. A.R., Project Daedalus, Ed., Journal of the British Interplanetary Society, 1978, pp. S63–S65.

American Inst. of Physics Handbok, 3rd. Ed., 1982, Energy Conversion Factors, pp. 6–5, 5–281/2, 5–297.

National Defense, Mar. 1991, pp. 14–18.

Physical Review, vol. 107, No. 2 (1957) pp. 345–350.

J. Hecht, The Laser Guidebook, 1986, pp. 24–31.

Macleod, H.A., Thin–Film optical filters, 2nd Ed., 1986, pp. 4–7, 11–43, 137–148, 164–187, 314–328, 406.

Oriel Catalog, vol. III, Optics & Filters, 1984, pp. 97–98.

Laser Induced Damage in Optical Materials, 1980, pp. 265–276.

Laser Induced Damage in Optical Materials, 1984, pp. 322–351.

Laser Induced Damage in Optical Materials, 1986, pp. 684–692.

Laser Induced Damage in Optical Materials, 1987, pp. 405–408, 519–545, 614–622.

Laser Induced Damage in Optical Materials, 1988, pp. 114–117, 122–127, 486–501, 516–519.

Acton Research Corporation, Excimer & UV Laser Optics, undated, p. 13.

Acton Research Corporation, High Power Excimer & UV Laser Optics, 1990, p. 5.

Tsipis, Kosta, Scientic American, Dec. 1981, Laser Weapons, pp. 35–41.

van de Hulst, H.C., Light Scattering by Small Particles, 1981, p. 11.

Novotny, Eva, Introduction to Stellar Atmospheres and Interiors, 1973, pp. 64–67, 126–127, 131–132.

Durrant, P.J., Organic Chemistry, 1957, p. 323.

Mcgraw–Hill Encyl. of Science & Technology, 7th Ed., Entry for Coherence, pp. 114–118.

van Allmen, M.F., Physical Processes in Laser–material Interactions, 1980, pp. 49–75.

RCA Handbook, 1974, pp. 81–87.

Kuiper, G.P., The Solar system, vol. II, The Earth as a Plant, 1954, pp. 434–447.

Opto & Laser Europe, Sep. 1993, pp. 39, 41, 43.

Courant, R., Differential & Integral Calculus, vol. II, 1936, pp. 44–46.

Gillespie, R.P., Partial Differentiation, 1960, pp. 5–6, 13, 21–23, 43–44.

Courant, R. & Hilbert, D., Methods of Mathematical Physics, vol. II, pp. 240–242.

Aikten, A.C., Determinants and Matrices, 9th Ed., 1959, pp. 27, 61.

Knoop, K., Infinite Sequences and Series, 1956, p. 159, ft. 1.

Photonics Spectra Dictionary, 38th Int., Ed. 1992, Definition of "Reflectivity".

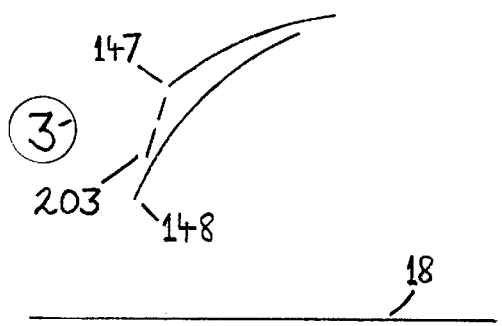
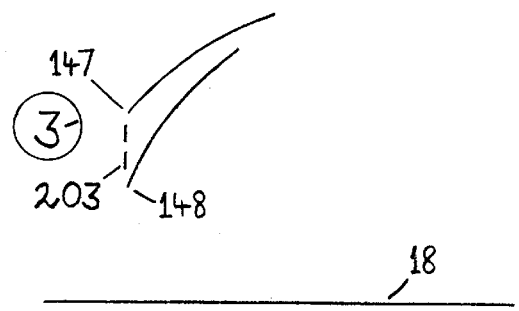
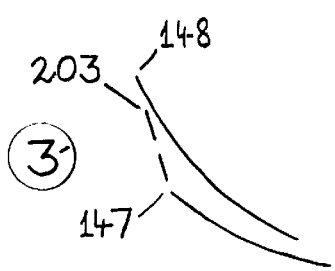
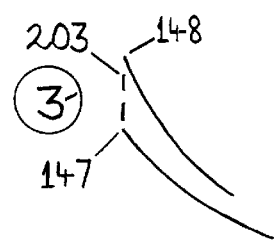
FIGURE 14　　　　FIGURE 15
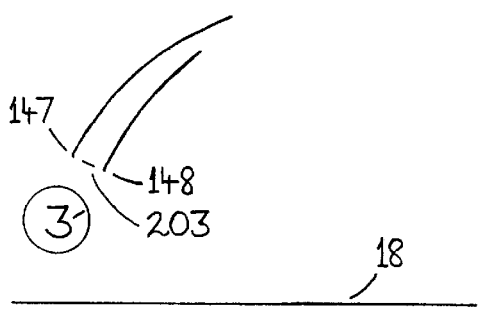
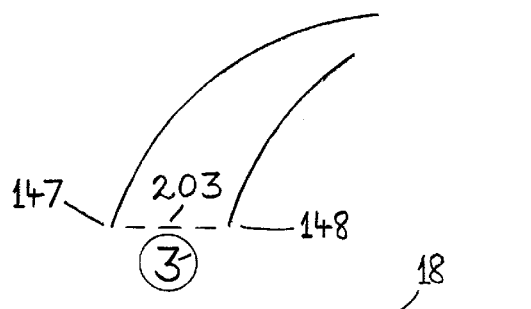
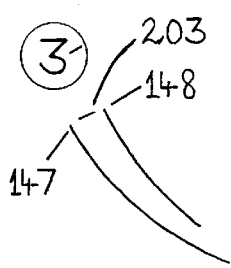
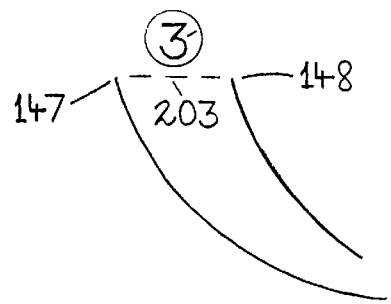
FIGURE 16　　　　FIGURE 17

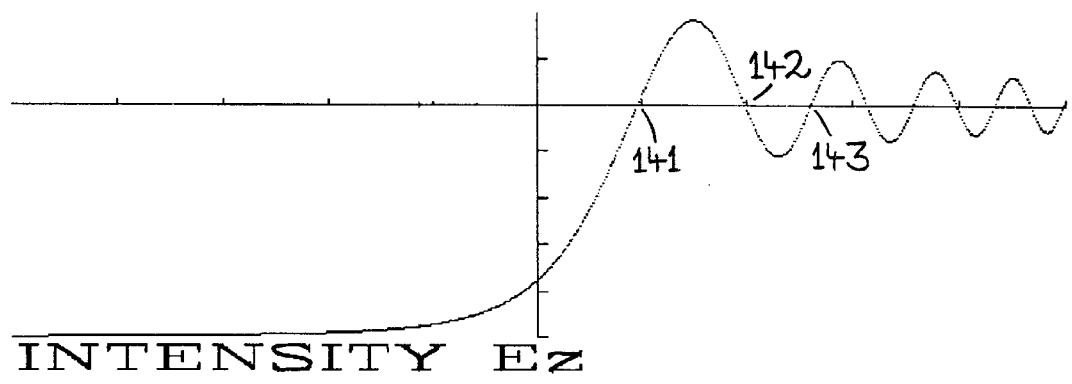
PI — SIGMAO
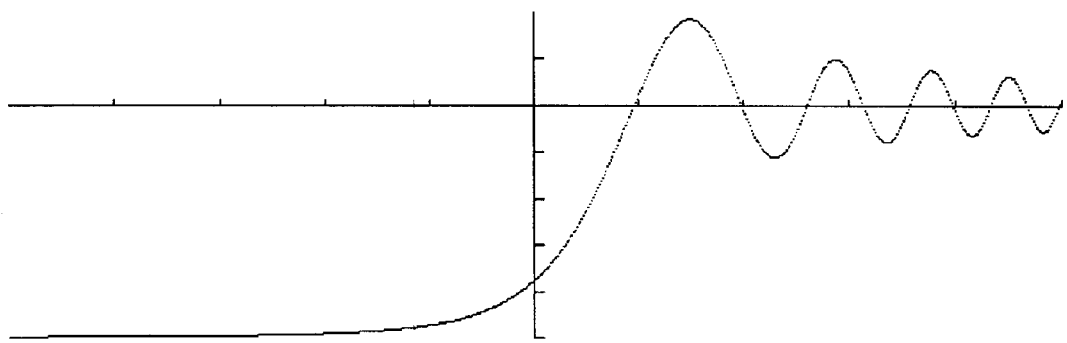
FIGURE 36

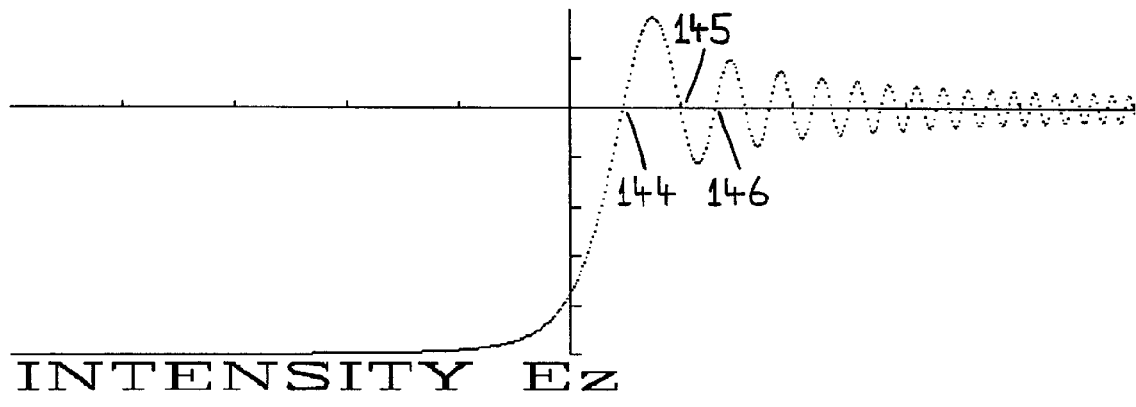
PI — SIGMA0
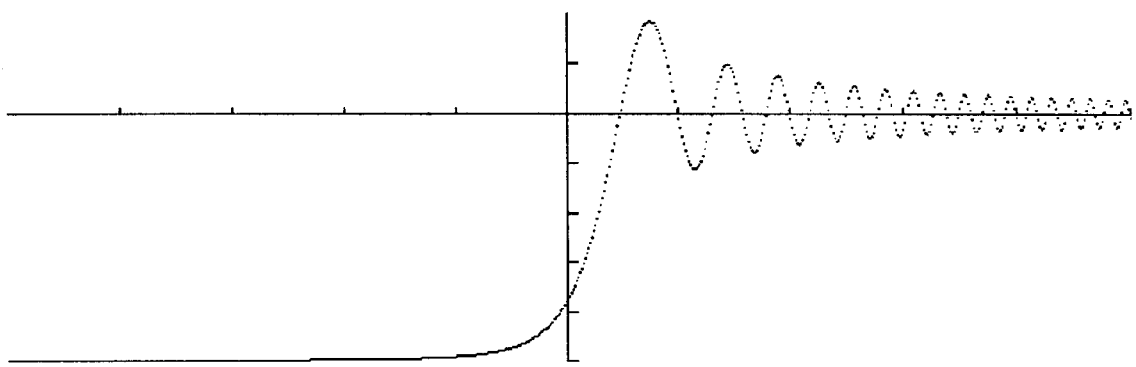
FIGURE 37

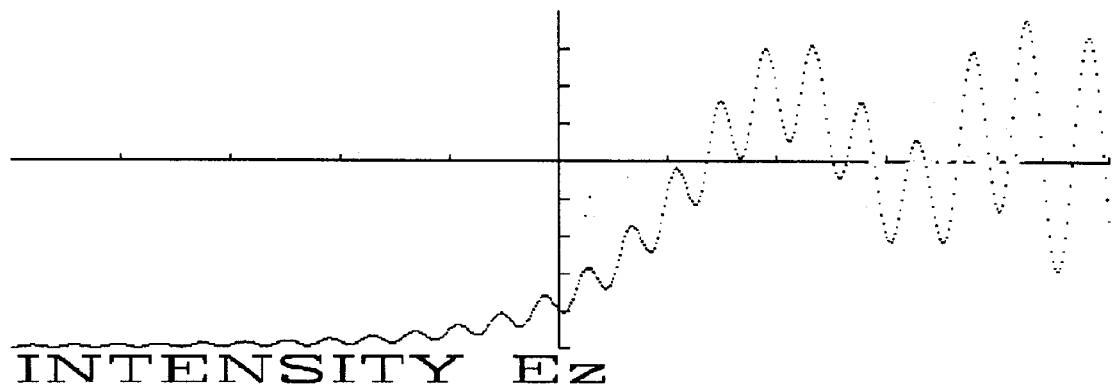
PI — SIGMA0
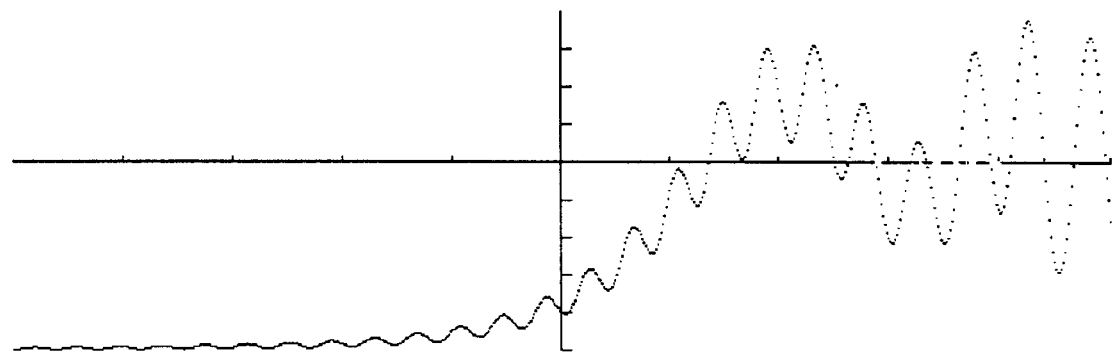
FIGURE 38

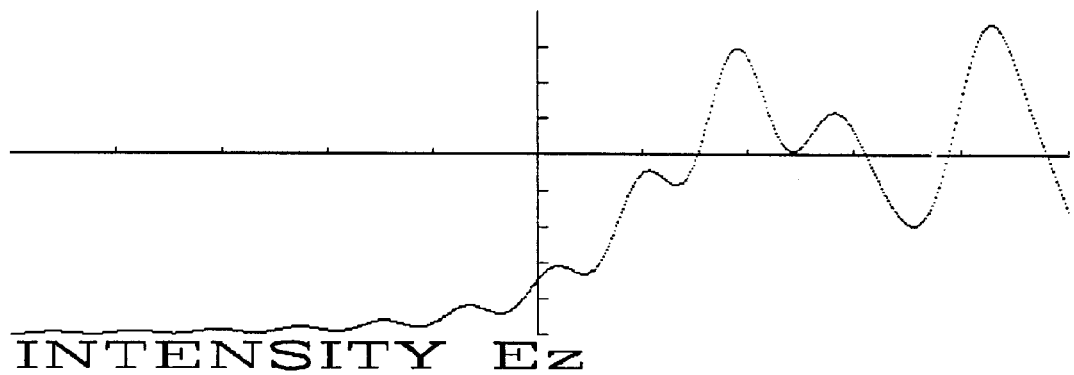
PI — SIGMA0
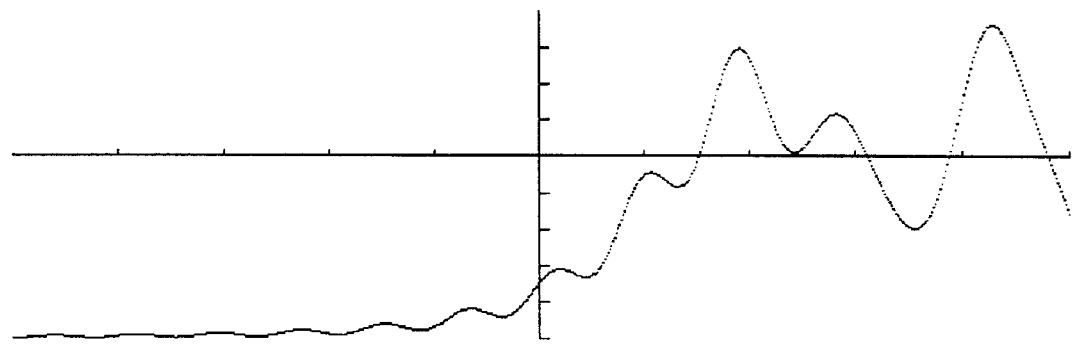
FIGURE 39

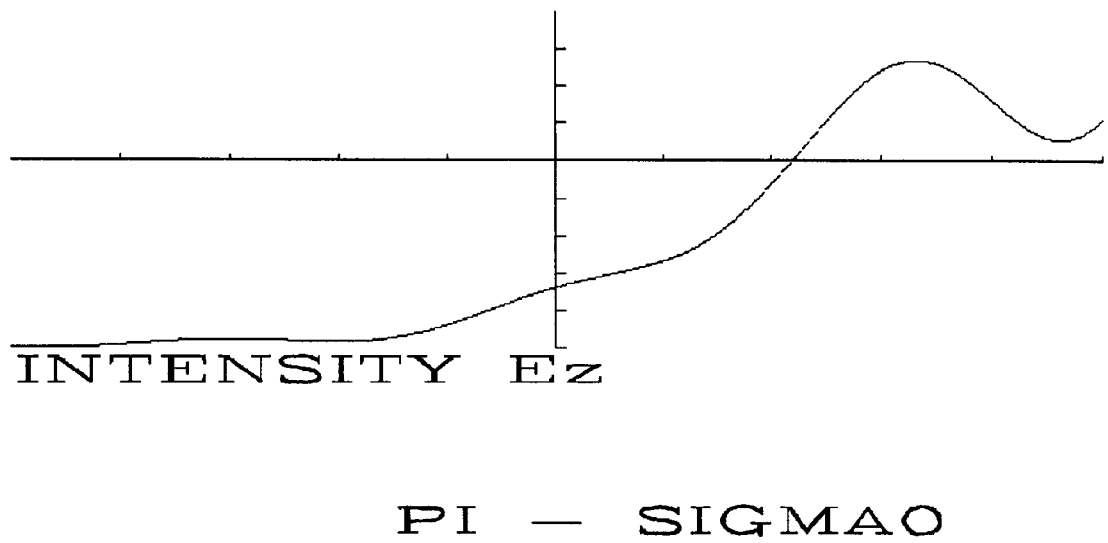
PI — SIGMA0
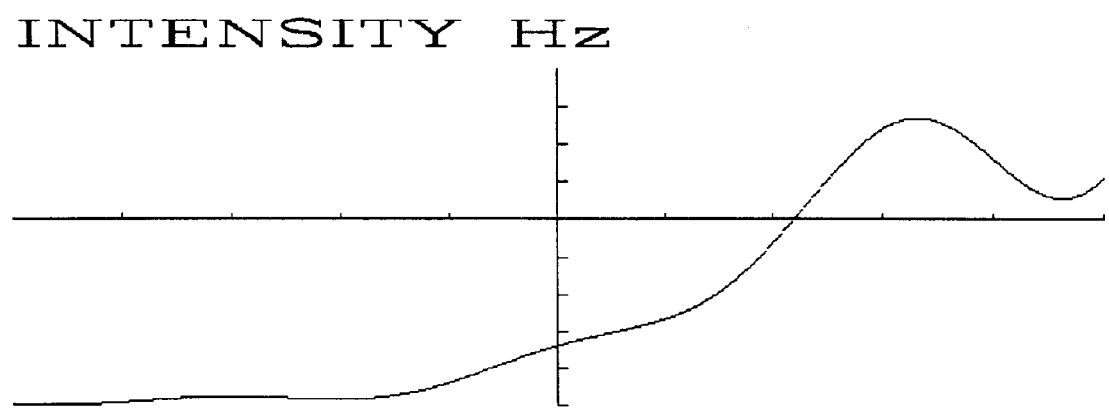
FIGURE 40

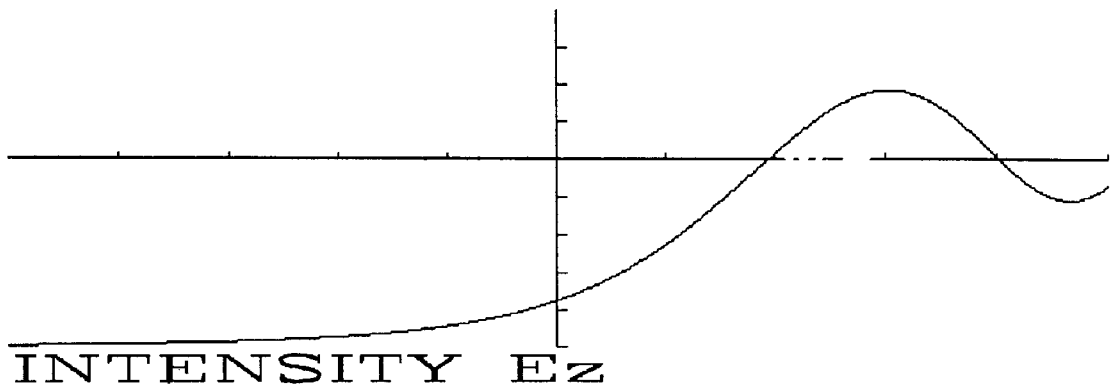
INTENSITY Ez
PI — SIGMA0
INTENSITY Hz
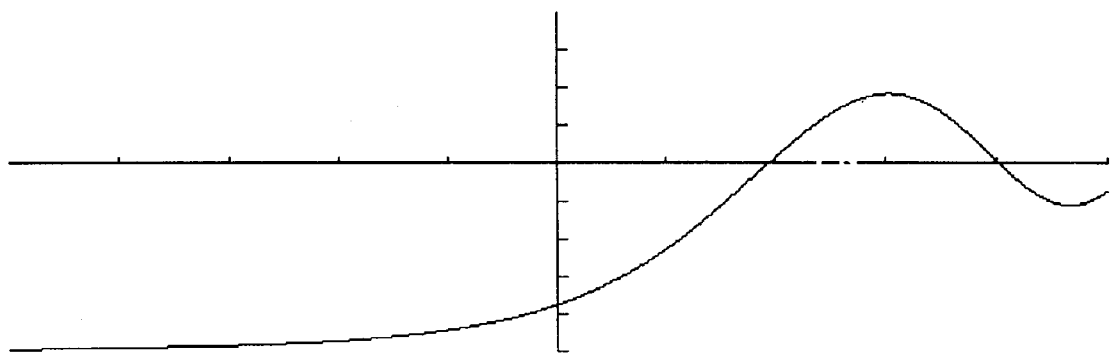
FIGURE 41

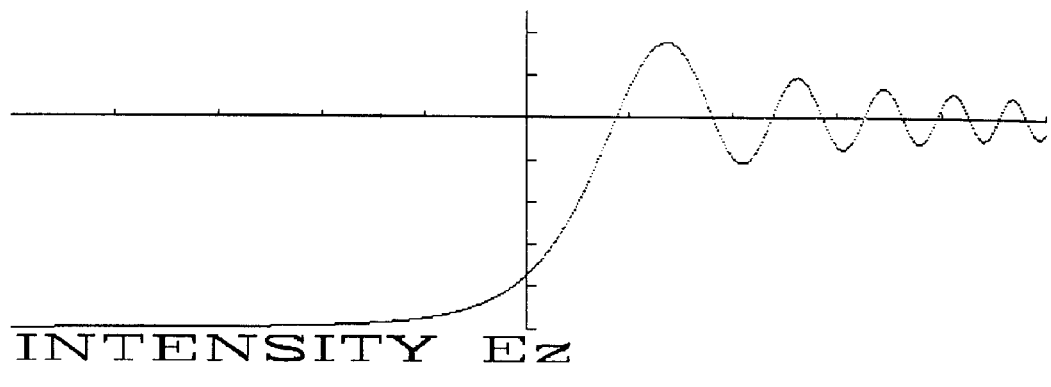
PI — SIGMA0
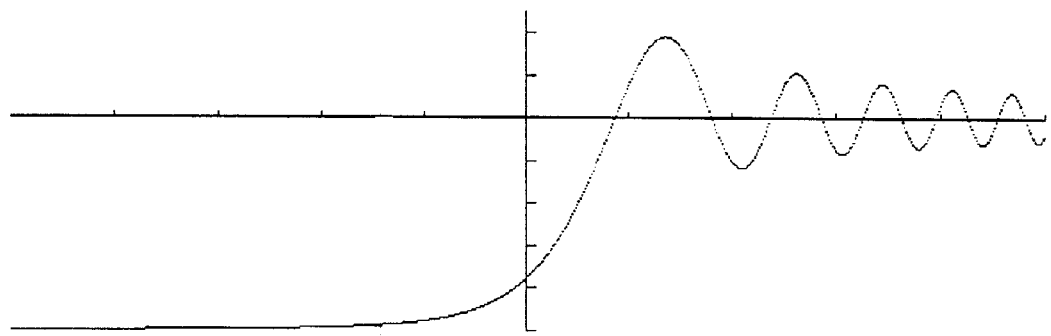
FIGURE 42

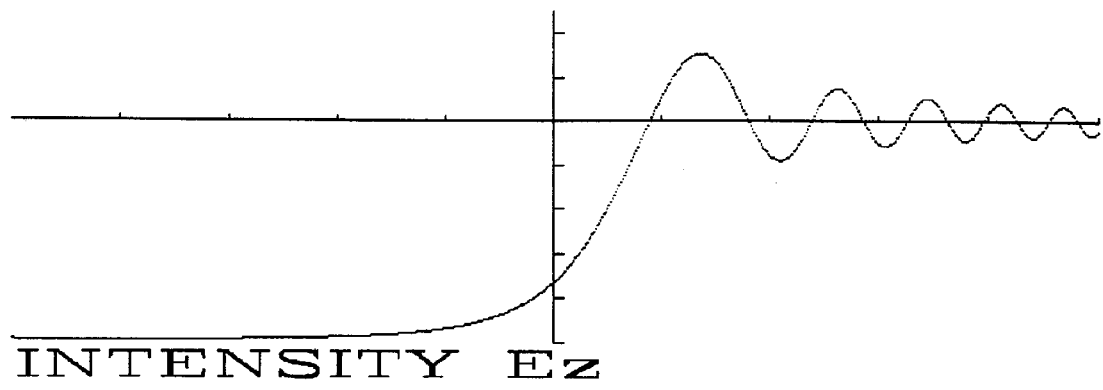
INTENSITY Ez
PI — SIGMA0
INTENSITY Hz
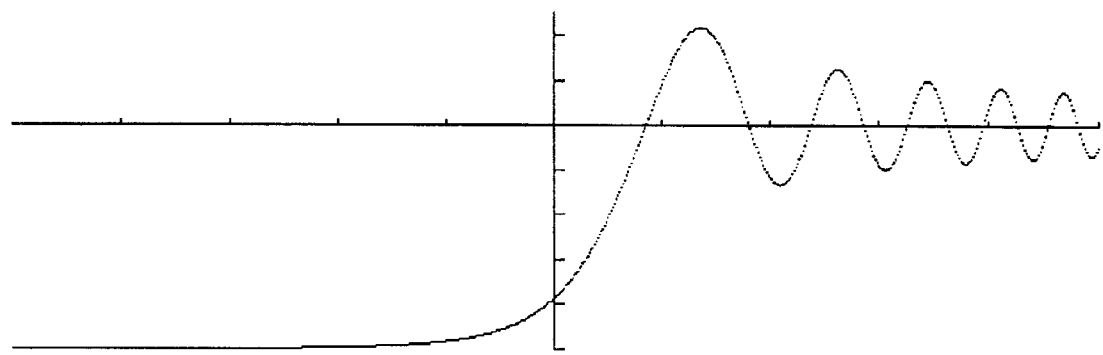
FIGURE 43

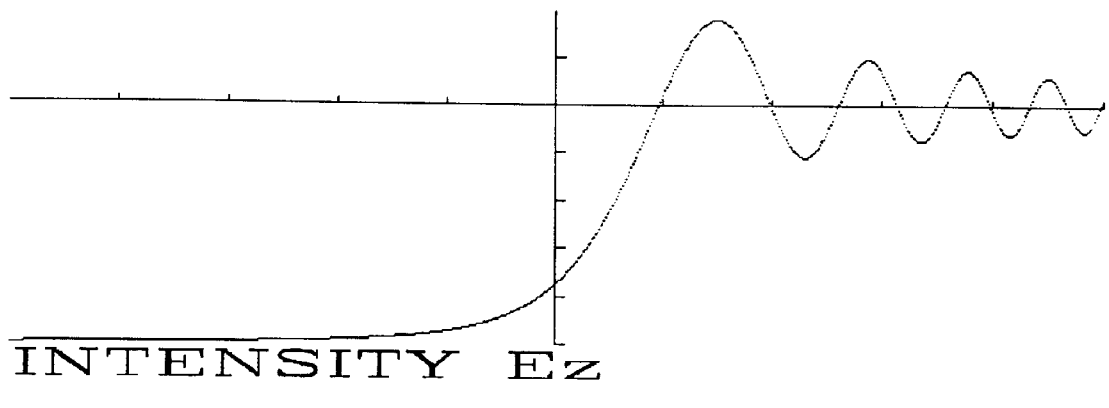
INTENSITY Ez
PI — SIGMA0
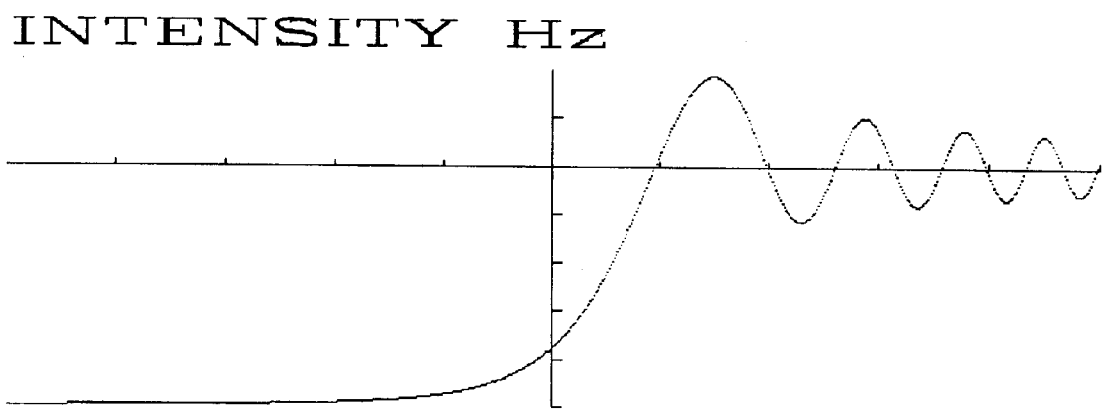
INTENSITY Hz
FIGURE 44

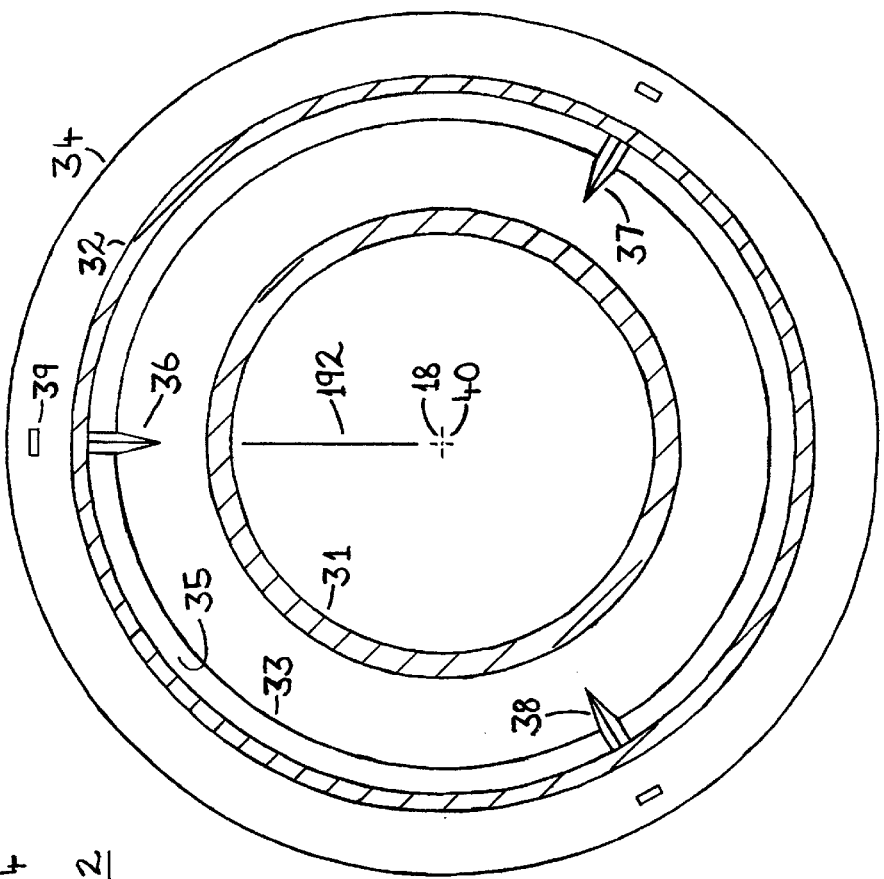
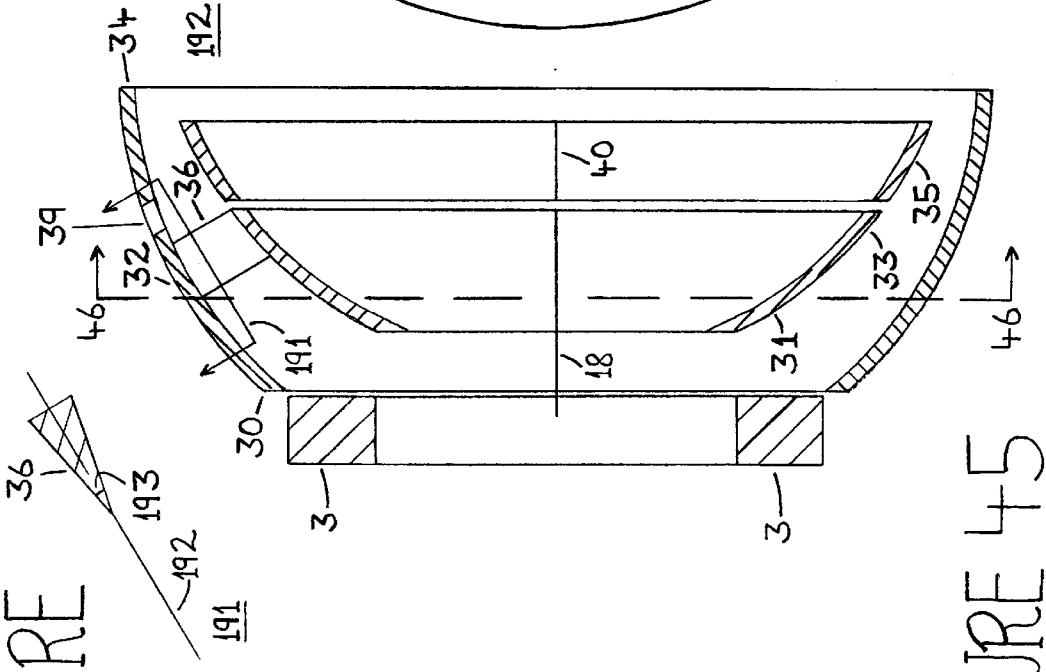
FIGURE 46
FIGURE 47
FIGURE 45

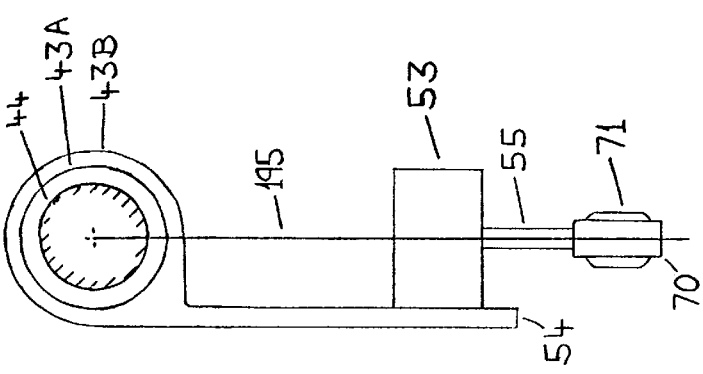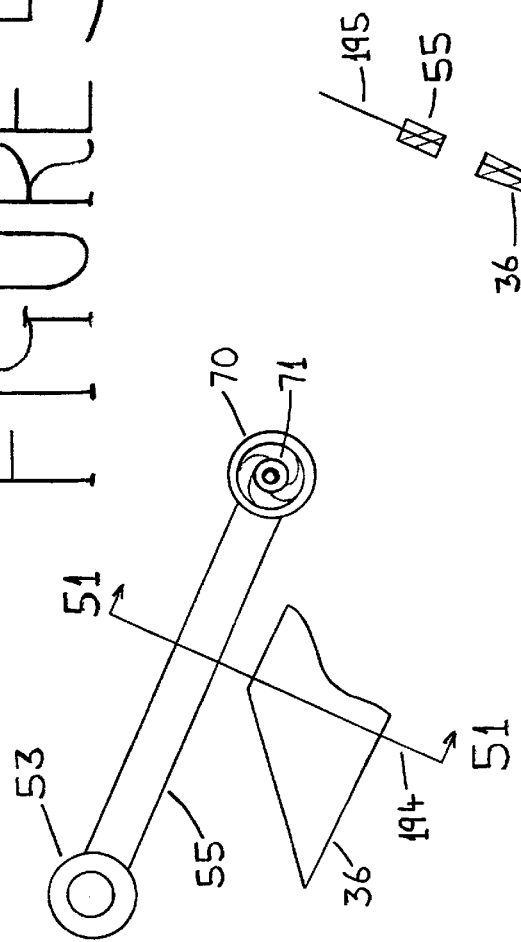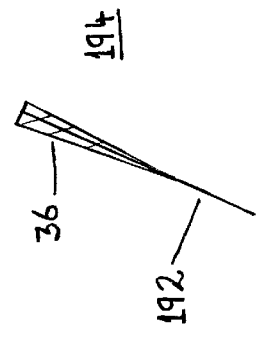

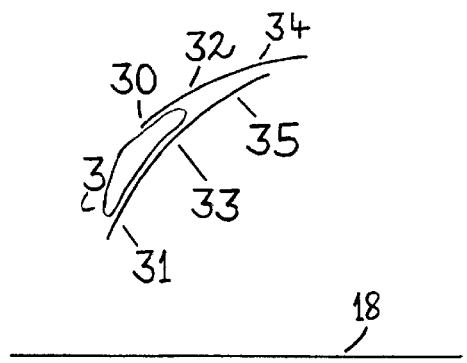
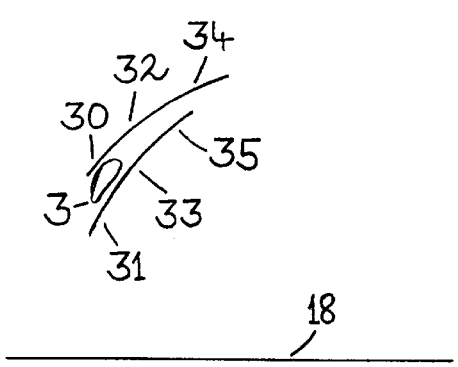
FIGURE 65  FIGURE 66
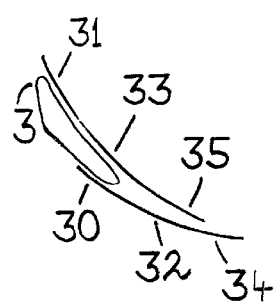
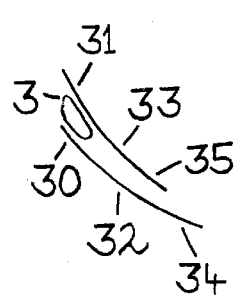
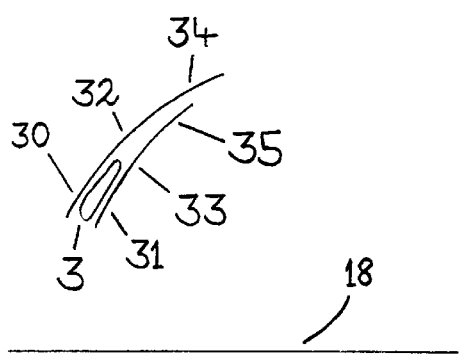
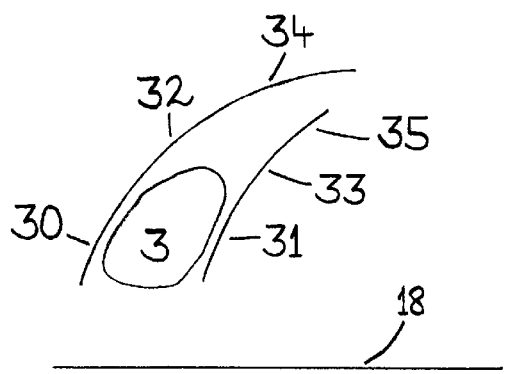
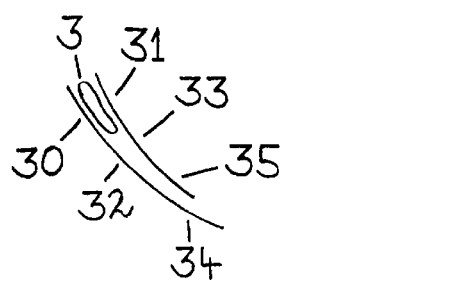
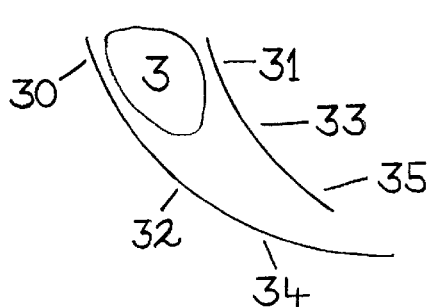
FIGURE 67  FIGURE 68

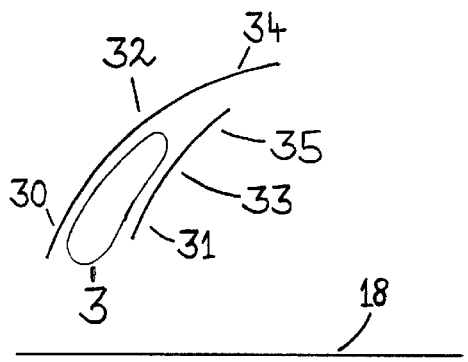
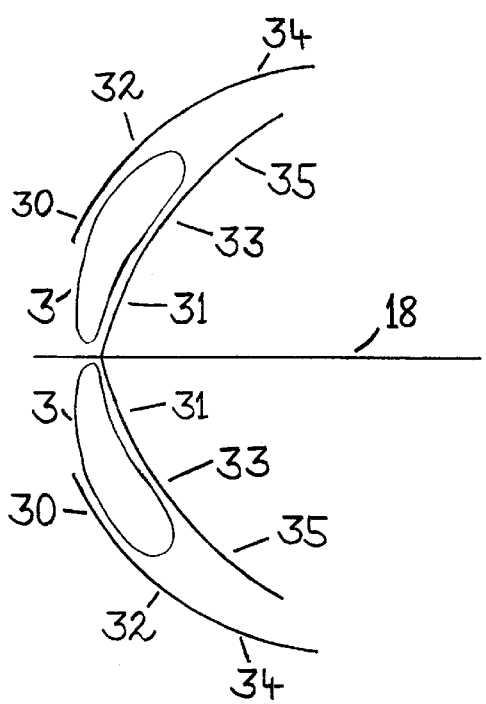
FIGURE 69
FIGURE 70
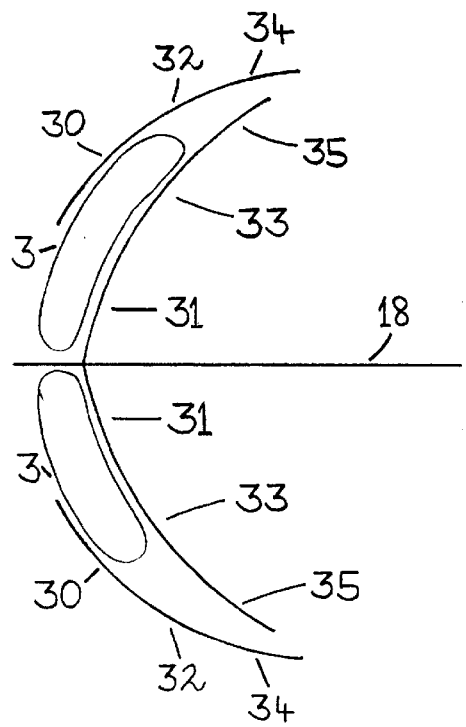
FIGURE 71

Reflectivity for s dotted p solid

Reflectivity for s dotted p solid

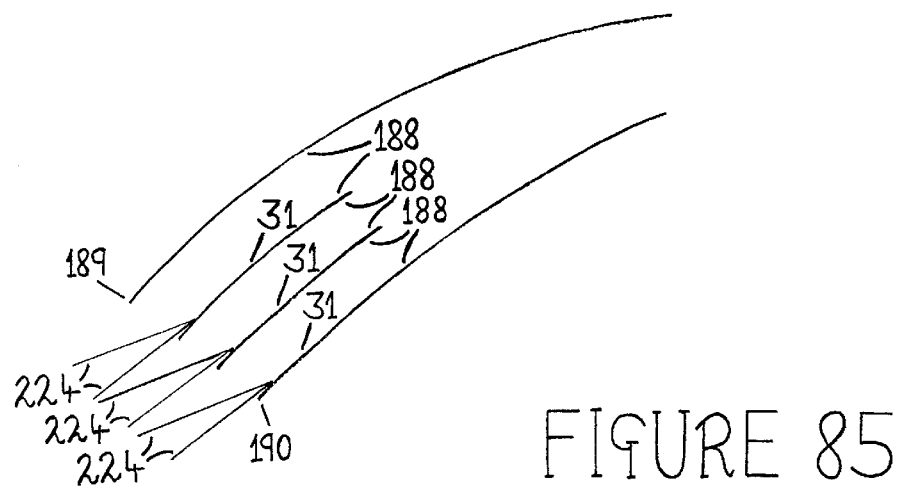
FIGURE 85
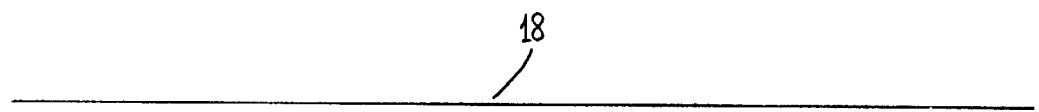
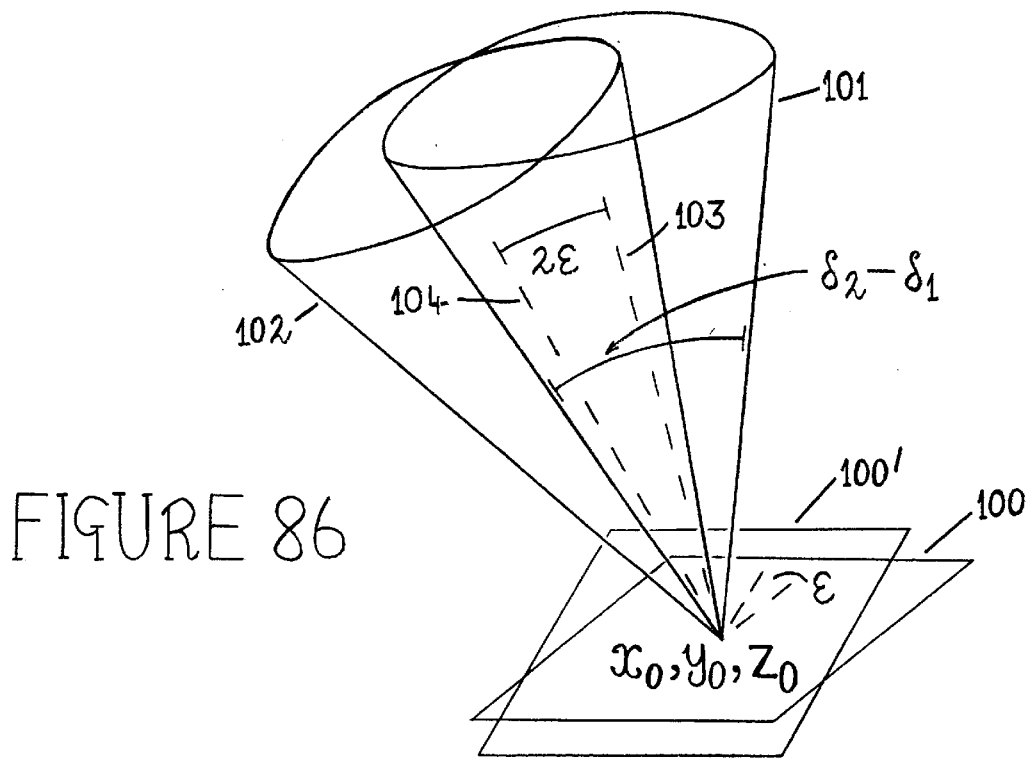
FIGURE 86

ELECTROMAGNETIC ENERGY DIRECTING METHOD AND APPARATUS

1.0 BACKGROUND OF THE INTENTION

This invention relates to a method and apparatus for directing electromagnetic energy, and in particular, but not exclusively, to such a method and apparatus for use in the fields of defence as a directed energy weapon, means of illumination for an active sensor and/or guidance system, counter-measure, or to ignite a fusion weapon; beam expanders; power transmission by means of a beam; propulsion by means of a beam or inertial fusion; power generation from inertial fusion; telecommunications; or computer hardware.

2.0 PRIOR ART

Existing methods of, and apparatus for, directing electromagnetic energy either: (a) use the stimulated emission of radiation, such as in laser systems; (b) use a "point" source, such as with parabolic radar dishes; or (c) use a plurality of phased array elements, such as in phased array microwave radar systems.

A review of some such prior art systems can be found in Reviews of Modern Physics, Volume 59, Number 3, Part II, July 1987 "Report to the APS of the Study Group on Science and Technology of Directed Energy Weapons".

Laser based systems have a number of disadvantages. Several of these are inherent in the mechanism of lasing, such as:

(i) the inhomogeneity of the active lasing medium which limits the collimation of the output beam;

(ii) the need to dispose of heat or waste products; and (iii) the need for an optical or resonant cavity.

Further difficulties arise since laser systems are restricted to a small number of resonant frequencies. This causes problems with atmospheric propagation either because the atmosphere is not transparent to the frequency of operation, or because two frequencies seperated by the frequency of a molecular excitation will cause Stimulated Raman Scattering.

Further, laser systems, having a high enough power to be used as a weapon or to ignite fusion, presently operate at relatively high wavelengths. However, low wavelengths are required to reduce diffraction; overcome plasma shielding of the target; to avoid instabilities during the implosion required to ignite fusion; and also to destroy a target, because they are associated with low reflectivity.

Further, many laser systems do not output electromagnetic energy continuously but in pulses, whose peak power level is moreover limited by the need to avoid damage to the optical components of the laser system and plasma shielding of the target, and thus have a low average power level.

Finally, laser systems tend to be very large, heavy and complex compared to their power output.

Point sources stiffer from the inherent disadvantage that insufficient energy can be output from them for useful application.

Phased arrays, such as those used in microwave applications, suffer from the disadvantage that they require highly complex addressing schemes in order to operate properly, and provide adequate beam steering.

Further, microwaves are of too high a wavelength to be of any practical use as a weapon except against unshielded electronic equipment.

3.0 OBJECTS OF THE INVENTION

It is an object of the present invention to obviate or mitigate the aforementioned disadvantages in the prior art systems.

It is a further object of the present invention to provide a method employing, and an apparatus having, constructional simplicity, reduced size and/or reduced weight relative to the prior art systems.

The major object of the present invention is to provide a method and apparatus by which electromagnetic energy is directed from a source comprising an area or volume as opposed to a point. It is appreciated that such an object is generally considered impossible. The misconceptions underlying such beliefs are refuted in Section 6.19.1.

Yet another object of the invention is to improve the collimation of an imperfectly collimated laser beam.

Yet another object of the invention is to reduce the diffraction of the directed energy.

Advantages of some of the embodiments of the present method and apparatus include:

(a) That the devices are not limited to producing a collimated beam or focusing the output at a point;

(b) That many constructional tolerances can be relaxed without affecting the operation of the device;

(c) That the device does not require a working medium, which might be inhomogeneous or require cooling;

(d) Ease of cooling;

(e) That any mirrors used in the method and apparatus need not have high reflectivity; and, indeed, may be uncoated metal mirrors;

(f) That the grazing angles of rays striking mirrors may be small in order to obtain adequate reflectivity particularly at low wavelengths;

(g) That the device may use any source of electromagnetic energy provided that energy may be reflected or refracted;

(h) That the device may use more than one source either seperately or simultaneously;

(i) That, since the device can use a continuous source, it can have a higher average power output than devices which use pulsed sources, such as many types of laser;

(j) That the invention provides the advantage of the more efficient "dynamic" kill, as opposed to a "thermal" kill, on a continuous basis as well as a pulsed basis.

4.0 SUMMARY OF THE INVENTION

In view of the foregoing, a first aspect of the present invention provides an apparatus for directing electromagnetic energy comprising a source with an extent selected from the group consisting of an area and a volume from which electromagnetic energy of at least one wavelength is emitted first towards a defined surface and thence to a defining surface, the nature of each surface being selected from the group consisting of everywhere reflective and everywhere refractive, wherein each point on the defined surface lies at a point of intersection of a pair of defining rays radiating from different points within said extent, each defining ray being of a defining wavelength and being propagated by the defined surface, said propagation being selected from the group consisting of reflection and refraction according to the nature of said defined surface, and then being incident to the same side of the defining surface at a respective further point and there being propagated through a respective predetermined directed angle, said propagation being selected from the group consisting of reflection and refraction according to the nature of said defining surface, so that the defined surface is optically nearer to the source than the defining surface along both defining rays, and further the directed angle of a half-tangent to the defining surface which is co-planar with the two defining rays and lies at any intermediate point on the defining surface between the two respective further points is intermediate between the directed angles of two similarly orientated half-tanigents which are co-planar with the two defining rays and lie at the respective further points, and a further ray from said source and of said defining wavelength passing through said point of intersection and also any one of such intermediate points is propagated by the defining surface through a directed angle selected from the group consisting of a directed angle intermediate between the two respective predetermined directed angles and a directed angle approximately equal to one of them, said propagation being selected from the group consisting of reflection and refraction according to the nature of said defining surface.

In a first embodiment there is provided an apparatus in which the defining surface is reflective and the defined surface is reflective. In a second embodiment there is provided an apparatus in which the defining surface is reflective and the defined surface is refractive. In a third embodiment there is provided an apparatus in which the defining surface is refractive and the defined surface is reflective. In a fourth embodiment there is provided an apparatus in which the defining surface is refractive and the defined surface is refractive.

It will be appreciated that the position of each point on the defined surface is determined by the pair of defining rays which intersect at that point, and thus by the shape and nature of the defining surface together with those portions of that pair of defining rays after their reflection or refraction by the defining surface. The nature of a refractive defining surface includes the ratio of the refractive indices of the transparent media either side of that defining surface, which may vary over that surface. Since that ratio will generally vary with wavelength, it will also be appreciated that any respective predetermined directed angle through which a defining ray is refracted will depend on the defining wavelength. So that the defined surface is defined by the defining surface, those portions of each pair of defining rays after their reflection or refraction by the defining surface, and, for a refractive defining surface, the defining wavelength.

It will equally be appreciated that for specular reflection as defined by Alhazen's Law of Reflection the wavelength has no effect on any respective predetermined directed angle through which a defining ray is reflected. But that said law is not strictly correct for metal surfaces as phase shifts occur on reflection at a metal surface which vary with the wavelength and angle of incidence of the incident electromagnetic energy and affect the shape of a reflected wave surface, as described in Section 6.18.1. And that geometrical light rays in space are defined as the orthogonal trajectories to the wave surfaces. A respective predetermined directed angle through which a defining ray is reflected may therefore depend on the defining wavelength.

A directed angle is defined as the rotation of one ray into another. When viewed from one side of the plane containing both rays, counterclockwise rotation is taken as positive and clockwise rotation as negative.

A first point is optically nearer to a reference point than a second point along a specified ray which goes through all three points and begins or ends at said reference point when the path length along said specified ray between the first point and the reference point is less than the path length along said specified ray between the second point and the reference point. Such a reference point can be anywhere on or in the source.

A tangent to a curve at a point of contact of that tangent with that curve is split into two half-tangents by that point of contact.

The intersection of the defining surface with the plane containing the pair of defining rays is a line. In order to make valid comparisons between the directions of a line in a plane at various points on that line it is necessary to compare the directed angles of the similarly orientated half-tangents at said points measured from some starting point oil that line by going along said line in one direction (or the other) and adding its positive or negative rotation to the initial directed angle of the appropriate half-tangent at said starting point.

The fifth, sixth, seventh and eighth embodiments are respectively a first, second, third or fourth embodiment which has an axis of symmetry, the defining and defined surfaces being formed by rotation about said axis of symmetry.

The ninth, tenth, eleventh and twelfth preferred embodiments are respectively a first, second, third or fourth embodiment which has an axis of symmetry, the defining and defined surfaces being formed by rotation about said axis of symmetry, such that if a line parallel to or coincident with said axis of symmetry is chosen as the initial line in a system of two dimensional polar co-ordinates in a plane through said axis of symmetry and as the positive half of the x-axis in a system of two dimensional cartesian co-ordinates in said plane then a point on said defining surface has polar co-ordinates r, $\theta$, gradient $\gamma$ and cartesian co-ordinates x,y while a point on said defined surface has polar co-ordinates $r_0, \theta_0$, gradient $\gamma_0$ and cartesian co-ordinates $x_0, y_0$.

In such an embodiment, said initial directed angle is conveniently measured from a line through said starting point parallel to the x-axis; so that the directed angles may immediately be converted to angles from the x-axis and co-ordinates which are greater than or equal to zero but less than $2\pi$ by the addition of $2n\pi$ where n is the requisite integer. Thus a directed angle $\gamma$ may be converted to an angle $|\gamma|_0^{2\pi}$ greater than or equal to zero but less than $2\pi$. A gradient may therefore be either a directed angle or an angle to the x-axis. It will be appreciated that said starting point is not necessarily at one end of the line.

There are of course two sets of directed angles for the gradient of a line at any point: one set of directed angles for each half-tangent. The two sides of the line may be respectively associated with the two sets of directed angles at said starting point and their half-tangents. Hereinafter the side of the line associated with a directed angle $\gamma$ at a starting point will be the side approached by the rotation from a line through said starting point parallel to the x-axis through an angle $|\gamma|_0^{2\pi}$ into its half-tangent. If $|\gamma|_0^{2\pi}=0$ so that there is no identifying rotation then the side for $|\gamma|_0^{2\pi}=0$ is the side opposite to that for $|\gamma|_0^{2\pi}=\pi$. And any half-tangent at another point on the line which is similarly orientated to said half-tangent at the starting point will also be associated with that side of the line together with its set of directed angles.

The thirteenth, fourteenth, fifteenth and sixteenth preferred embodiments are respectively a ninth, tenth, eleventh or twelfth embodiment in which each pair of defining rays whose intersection specifies a point on the defined surface lie entirely in a respective plane through the axis of symmetry such that if a further line parallel to said axis of symmetry through the point of intersection of a pair of defining rays in a plane through said axis of symmetry is chosen as an initial line in a further system of two dimensional polar coordinates in said plane then a point on the defining surface has further polar co-ordinates p,δ and the polar co-ordinates of the respective further point for the first defining ray are $r_1,\theta_1$, the further polar co-ordinates of said respective further point for said first defining ray are $p_1,\delta_1$, the gradient of said defining surface at said respective further point for said first defining ray is $\gamma_1$, the polar co-ordinates of the respective further point for the second defining ray are $r_2,\theta_2$, the further polar co-ordinates of said respective further point for said second defining ray are $p_2,\delta_2$, the gradient of said defining surface at said respective further point for said second defining ray is $\gamma_2$, said first defining ray is reflected or refracted from said defining surface at an output angle of $\beta_1$ to the x-axis and said second defining ray is reflected or refracted from said defining surface at an output angle of $\beta_2$ to the x-axis.

In such an embodiment, the directed angle through which a ray of further polar coordinate δ and output angle β is reflected or refracted at the defining surface is β−δ where $-\pi \leq \beta-\delta < \pi$.

The seventeenth, eighteenth, nineteenth and twentieth embodiments are respectively thirteenth, fourteenth, fifteenth or sixteenth embodiments wherein the defining surface is in the form of first and second defining surfaces of the same type as the surface reformed and a respective one of the defining rays is incident on each of said defining surfaces to a similarly orientated side to that on which the other defining ray is incident to the other defining surface and the intermediate point lies on either of said defining surfaces in the plane of and between the pair of defining rays so that the respective further point for said first defining ray lies on said first defining surface and the gradient of said first defining surface at said respective further point for said first defining ray is $\gamma_1$ and said first defining ray is reflected or refracted from said first defining surface at an output angle of $\beta_1$ to the x-axis and the respective further point for said second defining ray lies on said second defining surface and the gradient of said second defining surface at said respective further point for said second defining ray is $\gamma_2$ and said second defining ray is reflected or refracted from said second defining surface at an output angle of $\beta_2$ to the x-axis.

The twenty-first, twenty-second, twenty-third and twenty-fourth embodiments are respectively seventeenth, eighteenth, nineteenth or twentieth embodiments wherein an edge of said first defining surface is everywhere contiguous with an edge of said second defining surface.

In one embodiment there is provided an apparatus in which the defining surface is continuous.

In one embodiment there is provided an apparatus in which the defined surface is continuous.

In an embodiment with a continuous defining surface there is provided an apparatus in which the gradient of a portion of said surface is specified by γ=b where b is a constant so that the differential equation for said surface is an exact differential over said region.

In an embodiment with a continuous defined surface there is provided an apparatus in which the gradient of at least a portion of said surface is specified by $\gamma_0=b_0$ where $b_0$ is a constant so that the differential equation for said surface is an exact differential over said region.

In an embodiment with a continuous defined surface there is provided an apparatus in which the co-ordinates used in the differential equation for said surface are the polar co-ordinates $r_0,\theta_0$ and the gradient $\gamma_0$ of at least a portion of said surface is specified by $\gamma_0(r_0,\theta_0)=\theta_0+2n\pi\pm\pi/2$ so that said differential equation is an exact differential over said region.

In an embodiment with a continuous defined surface there is provided an apparatus in which the gradient of at least a portion of said surface is continuous and is specified by its partial derivative with respect to one of the co-ordinates used in the differential equation for said surface together with a constant of integration, its partial derivative with respect to the other co-ordinate used in said differential equation being determined from the condition that said differential equation is an exact differential; so that said condition is automatically satisfied and said differential equation is an exact differential over said region.

In said embodiment there is provided an apparatus in which the co-ordinates used in said differential equation are the Cartesian co-ordinates $x_0,y_0$ and the partial derivatives of said gradient $\gamma_0$ are:

$$\left(\frac{\partial \gamma_0}{\partial x_0}\right)_{y_0} = \frac{\cos\gamma_0}{x_0\sin\gamma_0 - y_0\cos\gamma_0} \text{ and}$$

$$\left(\frac{\partial \gamma_0}{\partial y_0}\right)_{x_0} = \frac{\sin\gamma_0}{x_0\sin\gamma_0 - y_0\cos\gamma_0}$$

so that said gradient is given by:

$x_0 \cos \gamma_0 + y_0 \sin \gamma_0 = a_0$ where $a_0$ is a constant.

Alternatively, in said embodiment there is provided an apparatus in which the coordinates used in said differential equation are the polar co-ordinates $r_0,\theta_0$ and the partial derivatives of said gradient $\gamma_0$ are:

$$\left(\frac{\partial \gamma_0}{\partial r_0}\right)_{\theta_0} = \frac{1}{r_0} \cot(\gamma_0 - \theta_0) \text{ and } \left(\frac{\partial \gamma_0}{\partial \theta_0}\right)_{r_0} = 1$$

so that said gradient is given by:

$$\gamma_0(r_0, \theta_0) = \arccos \frac{a_0}{r_0} + \theta_0$$

where $a_0$ is a constant.

In an embodiment with a continuous defined surface there is provided an apparatus in which the gradient of at least a portion of said defined surface is specified by its partial derivatives with respect to the co-ordinates used in the differential equation for said defined surface together with a constant of integration in such a manner that said differential equation after the application of an integrating factor is all exact differential over said region and both the expression for the differential of the natural logarithm of said integrating factor given by the condition that said differential equation after the application of said integrating factor is an exact differential and the sum over both the co-ordinates used in said differential equation of the product of the partial derivative of said gradient with respect to one of said co-ordinates and the differential of that co-ordinate, namely $$\sum_{i=1}^{2} \left(\frac{\partial \gamma_0}{\partial X_i}\right)_{X_j} dX_i$$

where $j \neq i, \gamma_0$ is said gradient and $X_1$, $X_2$ are said co-ordinates used in the differential equation, are exact differentials over said region.

In said embodiment there is provided an apparatus in which the co-ordinates used in said differential equation are the Cartesian co-ordinates $x_0, y_0$ and the partial derivatives of said gradient are:

$$\left( \frac{\partial \gamma_0}{\partial x_0} \right)_{y_0} = \Re \left( \sum_{j=0}^{\infty} a_j (x_0 + iy_o)^j \right)$$

and $$\left( \frac{\partial \gamma_0}{\partial y_0} \right)_{x_0} = \Re \left( \sum_{j=0}^{\infty} a_j (x_0 + iy_0)^{ji} \right)$$

where each $a_j$ is a complex constant, any $a_j$ may be zero, and, if the series have an infinite number of terms, they are each convergent; so that said gradient is given by:

$$\gamma_0(x_0, y_0) = \Re \left( \sum_{j=0}^{\infty} \frac{a_j}{j+1} (x_0 + iy_0)^{j+1} \right) + b_0$$

where $b_0$ is a real constant.

Alternatively, in said embodiment there is provided an apparatus in which the coordinates used in said differential equation are the polar co-ordinates $r_0, \theta_0$ and the partial derivatives of said gradient are:

$$\left( \frac{\partial \gamma_0}{\partial r_0} \right)_{\theta_0} = \Re \left( \sum_{j=0}^{\infty} a_j r_0^{j-1} e^{j\theta_0 i} \right)$$

and $$\left( \frac{\partial \gamma_0}{\partial \theta_0} \right)_{r_0} = \Re \left( \sum_{j=0}^{\infty} a_j r_0^j e^{j\theta_0 i} \right)$$

where each $a_j$ is a complex constant, any $a_j$ may be zero, and, if the series have an infinite number of terms, they are each convergent; so that said gradient is given by:

$$\gamma_0(r_0, \theta_0) = a_0^R \ln r_0 - a_0^{\Im} \theta_0 + b_0 + \Re \left( \sum_{j=1}^{\infty} \frac{a_j}{j} r_0^j e^{j\theta_0 i} \right)$$

where $b_0$ is a real constant.

In an embodiment with a continuous defined surface there is provided an apparatus in which the defining surface is reflective and the gradient of at least a portion of said defined surface is specified by its partial derivatives with respect to the co-ordinates used in the differential equation for said defined surface together with a constant of integration in such a manner that said differential equation after the application of an integrating factor is an exact differential over said region and both the expression for the differential of the natural logarithm of said integrating factor given by the condition that said differential equation after the application of said integrating factor is an exact differential and the sum over both the co-ordinates used in said differential equation of the product of the partial derivative of said gradient with respect to one of said co-ordinates and the differential of that co-ordinate, namely $$\sum_{i=1}^{2} \left( \frac{\partial \gamma_0}{\partial X_i} \right)_{X_j} dX_i$$

where $j \neq i$, $\gamma_0$ is said gradient and $X_1$, $X_2$ are said co-ordinates used in the differential equation, are exact differentials over said region.

In said embodiment there is provided an apparatus in which the co-ordinates used in said differential equation are $X_1$, $X_2$ where $X_1$ relates to the first defining mirror-ray combination only while $X_2$ relates to the second defining mirror-ray combination only and $$\left( \frac{\partial \gamma_0}{\partial X_2} \right)_{X_1} = 0 \text{ but } \gamma_0 \neq 2\gamma_1 - \beta_1 - n\pi.$$

The defined surface is defined in said embodiment by the defining mirror and those portions of each pair of defining rays after their reflection by the defining mirror. A defined surface is defined in those embodiments with first and second defining mirrors by said mirrors and those portions of each pair of defining rays after their reflection by said mirrors. A defining mirror-ray combination refers to a single defining ray and that portion of the or its respective defining mirror which reflects it. Thus if $X_1$ relates to the first defining mirror-ray combination only, it relates either to the polar co-ordinates of the respective further point for the first defining ray $r_1, \theta_1$, the gradient of the or the first defining mirror at said respective further point for said first defining ray $\gamma_1$ (which may be derived from the relationship between $r_1$ and $\theta_1$ due to the specification of the or the first defining mirror) and the output angle for said first defining ray $\beta_1$; or to some similar choice of variables.

Alternatively, in said embodiment there is provided an apparatus in which the coordinates used in said differential equation are $X_1$, $X_2$ where $X_1$ relates to the first defining mirror-ray combination only while $X_2$ relates to the second defining mirror-ray combination only and $$\left( \frac{\partial \gamma_0}{\partial X_1} \right)_{X_2} = 0 \text{ but } \gamma_0 \neq 2\gamma_2 - \beta_2 - n\pi.$$

Alternatively, in said embodiment there is provided an apparatus in which the coordinates used in said differential equation are $X_1$, $X_2$ where $X_1$ relates to the first defining mirror-ray combination only while $X_2$ relates to the second defining mirror-ray combination only and $$\left( \frac{\partial \gamma_0}{\partial X_1} \right)_{X_2}$$

is a non-zero constant or a function only of $X_1$ while $$\left( \frac{\partial \gamma_0}{\partial X_2} \right)_{X_1}$$

is a non-zero constant or a function only of $X_2$ so that:

$$\gamma_0 = \frac{2\gamma_2 - \beta_2 + 2\gamma_1 - \beta_1 - n\pi}{2}.$$

Alternatively, in said embodiment there is provided an apparatus in which the coordinates used in said differential equation are $X_1$, $X_2$ where $X_1$ relates to the first defining mirror-ray combination only while $X_2$ relates to the second defining mirror-ray combination only $$\text{and } \left( \frac{\partial \gamma_0}{\partial X_1} \right)_{X_2} = \sum_{j=0}^{\infty} \sum_{k=0}^{\infty} j a_{jk} X_1^{j-1} X_2^k$$

$$\text{while } \left( \frac{\partial \gamma_0}{\partial X_2} \right)_{X_1} = \sum_{j=0}^{\infty} \sum_{k=0}^{\infty} k a_{jk} X_1^j X_2^{k-1}$$

-continued so that $\gamma_0 = \sum_{j=0}^{\infty} \sum_{k=0}^{\infty} a_{jk} X_1^j X_2^k$.

In an embodiment with a continuous defined surface there is provided an apparatus in which the defining surface is reflective and the co-ordinates used in the differential equation for said defined surface are $X_1$, $X_2$ where both $X_1$ and $X_2$ each relate to both defining mirror-ray combinations and the partial derivative of the gradient of at least a portion of said defined surface with respect to one of said co-ordinates is zero so that said gradient is specified only in terms of the other of said variables, for instance as $\gamma_0 = \gamma_0(X_2)$ when $$\left( \frac{\partial \gamma_0}{\partial X_1} \right)_{X_2} = 0,$$

and said differential equation after the application of an integrating factor is an exact differential over said region.

In said embodiment there is provided an apparatus in which when the variables $\theta_1, \theta_2, 2\gamma_1 - \beta_1, 2\gamma_2 - \beta_2, r_1, r_2$ are numbered such that the ordered set or list of variables $\{Y_1, \ldots, Y_6\} \leftrightarrows \{\theta_1, \theta_2, 2\gamma_1 - \beta_1, 2\gamma_2 - \beta_2, r_1, r_2\}$ in an ordered one-to-one correspondence, each of the variables $X_1$, $X_2$ is defined in terms of a function of an odd numbered variable, $G(Y_{2j-1})$ where j=1,2,3, and a function of its corresponding even numbered variable, $F(Y_{2j})$.

In the above refinement of said embodiment there is provided an apparatus in which said variables are defined as:

$$X_2 = F(Y_{2j}) + G(Y_{2j-1})$$

and $$X_1 = F(Y_{2j}) - G(Y_{2j-1}).$$

In the above further refinement of said embodiment there is provided an apparatus in which the radius co-ordinate of the axially symmetric defining mirror is specified by $$r_1 = c \sin^{\frac{1}{a-1}} ((a-1)\theta_1 + b)$$

where a, b, c are real constants and said variables are defined as:

$$X_2 = a\theta_2 + a\theta_1$$

and $$X_1 = a\theta_2 - a\theta_1.$$

In the latter refinement of said embodiment there is provided an apparatus in which the output angles of the defining rays, $\beta_1$ and $\beta_2$, are constant, or vary so slowly with $\theta_1$ and $\theta_2$ respectively that they may be regarded as locally constant.

In one embodiment there is provided an apparatus in which said axially symmetric defining mirror comprises a portion of a hemisphere whose centre lies at the pole, so that a=1 and b=$-\pi/2$ for acute angles of $\gamma_1$ and $\gamma_2$ and obtuse angles of $\theta_1$ and $\theta_2$, while b=$\pi/2$ for obtuse angles of $\gamma_1$ and $\gamma_2$ and acute angles of $\theta_1$ and $\theta_2$, and $r_2 = r_1$, a constant.

In said embodiment there is provided an apparatus in which the gradient of at least a portion of said defined surface is specified by $\gamma_0 = \frac{1}{2}X_2 \mp \frac{1}{2}\pi$.

Alternatively, in said embodiment there is provided an apparatus in which the gradient of at least a portion of said defined surface is specified by $\gamma_0 = \frac{1}{2}X_2 - \frac{1}{2}\pi$ and the range for $X_1$ is $0 < X_1 < \frac{1}{2}\pi$.

In one embodiment there is provided an apparatus in which said axially symmetric defining mirror has a section in a plane through said axis of symmetry which is a circle through the origin, so that a=2.

In one embodiment there is provided an apparatus in which the defining surface is reflective and all the defining rays are incident to the same side of the defining mirror as any perpendicular from the axis of symmetry; and for each point of intersection of a pair of defining rays $\gamma'_1$ is the gradient of said defining mirror at a point whose further polar co-ordinates are $p'_1, \delta'_1$ and $p'_1$ has at most a single value for any value of $\delta'_1, \gamma'_2$ is the gradient of said defining mirror at a point whose further polar co-ordinates are $p'_2, \delta'_2$ and $p'_2$ has at most a single value for any value of $\delta'_2$ and $\gamma'_2 > \gamma'_1$ for all $\delta'_2 > \delta'_1$ and for all $\delta'_1$ where for the purpose of said comparison $\gamma'_1, \gamma'_2$ are directed angles; so that said defining mirror is concave with respect to all the points of intersection of each pair of the defining rays.

In said embodiment there is provided an apparatus in which the output angles of one of said pairs of defining rays are the same or approximately the same so that, for those in-plane rays comprising said pair of defining rays and the further rays for their point of intersection, the angular output aperture of said in-plane rays, when defined as the maximum of the angles between any two of the output rays corresponding to said in-plane rays if said output angles have a range greater than or equal to $-\pi$ but less than $\pi$, is less than the angular input aperture for said point, when defined as the angle between said pair of defining rays on incidence to the defined surface.

Alternatively, in said embodiment there is provided an apparatus in which a further ray from the point of intersection of one of said pairs of defining rays is co-planar with said two defining rays and intersects said defining mirror at an intermediate point with further polar co-ordinates $p_3, \frac{1}{2}(\delta_2 + \delta_1)$ and the gradient $\gamma_3$ of said defining mirror at said intermediate point is approximately equal to $\frac{1}{2}(\gamma_2 + \gamma_1)$ so that the angle $\omega_1$ between the output direction of said further ray and the output direction of the first defining ray is given by the approximation $$\cos\omega_1 \approx \cos\frac{\beta_1 - \beta_2}{2}.$$

In the latter refinement of said embodiment there is provided an apparatus in which $\beta_1 = \beta_2$.

Alternatively, in the latter refinement of said embodiment there is provided an apparatus in which $\beta_1 \approx \beta_2$.

Alternatively, in the latter refinement of said embodiment there is provided an apparatus in which said defining mirror is such that $\frac{1}{2}(\delta_2 - \delta_1)$ is very nearly equal to $\gamma_2 - \gamma_1$ so that $$|\omega_1| << \frac{\delta_2 - \delta_1}{2}.$$

In one embodiment there is provided an apparatus comprising a plurality of stages wherein each stage includes a defining surface together with a defined surface.

In said embodiment there is provided an apparatus wherein the rays output from a stage form the input to a further stage which will be referred to as the next successive stage in series to said stage and which has smaller choices for the angular input aperture at the various points on its defined surface than said stage in order to improve the accuracy with which those rays are directed.

In said embodiment or its refinement there is provided an apparatus wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

In the latter refinement of said embodiment there is provided an apparatus wherein the defined surface of a parallel stage is a mirror which incorporates a mirror on its reverse side which mirror forms the defining mirror of the next parallel stage inwards.

In one embodiment there is provided an apparatus in which there is a plurality of first stages, each including a defining and a defined mirror, which first stages will be referred to as being in parallel to one another, so that the input aperture of each such parallel first stage is but a fraction of that of an input aperture formed by an edge of the outermost defining mirror and an edge of the innermost defined mirror of said parallel first stages, and the gradient in a plane through the axis of symmetry of each of the defined mirrors of said parallel first stages is such that the angles of incidence of the rays of electromagnetic energy on said defined mirrors are high and such that said defined mirrors are long and thus have a high surface area, whereby said high angles of incidence, said high surface area of the defined mirror of and said relatively small input aperture for each such parallel first stage enable the source to have a very high intensity over a large waveband.

In one embodiment there is provided an apparatus wherein there is a predetermined direction for a stage which is the last in a series of stages and every defining ray for said stage is reflected through a respective predetermined directed angle so as to be parallel to said predetermined direction and the defining surface for said stage is such that the further rays for said stage are reflected to be approximately parallel to said predetermined direction.

In one embodiment there is provided an apparatus wherein there is a predetermined focus for a stage which is the last in a series of stages and every defining ray for said stage is reflected through a respective predetermined directed angle so as to come to said predetermined focus and the defining surface for said stage is such that the further rays for said stage are reflected to come approximately to said predetermined focus.

In one embodiment there is provided an apparatus wherein there is a predetermined output angle to the x-axis for a stage which is the last in a series of stages and every defining ray for said stage is reflected from the defining mirror for said stage at an output angle to the x-axis equal to said predetermined output angle and said defining mirror is such that the further rays for said stage are reflected from said defining mirror at output angles to the x-axis approximately equal to said predetermined output angle.

In one embodiment there is provided an apparatus in which the defining mirrors of at least two successive stages in a series form a continuous reflective surface.

In said embodiment there is provided an apparatus in which the defining mirror of each of said successive stages has a regular envelope to the lines extending those portions of the defining rays for that stage before their reflection by said defining mirror.

Alternatively, in said embodiment there is provided an apparatus in which there is a single regular envelope to the lines extending those portions of the defining rays for all of said successive stages before their reflection by said defining mirrors.

A regular envelope is an envelope, with a similar shape to the caustic curve of a spherical defining mirror for rays parallel to its axis, to which the lines extending those portions of the defining rays before their reflection by the defining mirror(s) are tangent.

In one embodiment there is provided an apparatus in which at least two defined mirrors of successive stages in a series are similarly orientated and the specification of the gradient in a plane through the axis of symmetry for, and the position of, each of said defined mirrors is such that said defined mirrors form one continuous reflective surface.

Two or more defined mirrors of successive stages in a series are similarly orientated if the incidence of the defining rays on the defined mirror of their respective stage is in a similar direction over all those stages.

In said embodiment there is provided an apparatus in which that point of the defined mirror of the lowest numbered stage of said successive stages which is nearest the source has the largest value of the gradient in a plane through the axis of symmetry, and of the angular input aperture, the defined mirrors of each successive stage are further from said source and from said axis of symmetry, and the value of said gradient, and of said angular input aperture, progressively reduce as the point of intersection of the defining rays moves along said continuous surface away from said source through said successive stages.

In one embodiment there is provided an apparatus in which a point on the defined surface lies at a point of intersection of a defining ray and a respective line, said line having the path which a defining ray would have taken if it existed.

In one embodiment there is provided an apparatus in which a point on the defined surface lies at a point of intersection of a pair of lines, each such line having the path which a defining ray would have taken if it existed.

According to a second aspect of the present invention there is provided a defined surface as defined by a source with an extent selected from the group consisting of an area and a volume from which electromagnetic energy of at least one wavelength is emitted first towards a defined surface and thence to a defining surface, the nature of each surface being selected from the group consisting of everywhere reflective and everywhere refractive, wherein each point on the defined surface lies at a point of intersection of a pair of defining rays radiating from different points within said extent, each defining ray being of a defining wavelength and being propagated by the defined surface, said propagation being selected from the group consisting of reflection and refraction according to the nature of said defined surface, and then being incident to the same side of the defining surface at a respective further point and there being propagated through a respective predetermined directed angle, said propagation being selected from the group consisting of reflection and refraction according to the nature of said defining surface, so that the defined surface is optically nearer to the source than the defining surface along both defining rays, and further the directed angle of a half-tangent to the defining surface which is co-planar with the two defining rays and lies at any intermediate point on the defining surface between the two respective further points is intermediate between the directed angles of two similarly orientated half-tangents which are co-planar with the two defining rays and lie at the respective further points, and a further ray from said source and of said defining wavelength passing through said point of intersection and also any one of such intermediate points is propagated by the defining surface through a directed angle selected from the group consisting of a directed angle intermediate between the two respective predetermined directed angles and a directed angle approximately equal to one of them, said propagation being selected from the group consisting of reflection and refraction according to the nature of said defining surface.

According to a third aspect of the present invention there is provided a method for directing electromagnetic energy comprising providing a source with an extent selected from the group consisting of an area and a volume from which electromagnetic energy of at least one wavelength is emitted first towards a defined surface and thence to a defining surface, the nature of each surface being selected from the group consisting of everywhere reflective and everywhere refractive, wherein each point on the defined surface lies at a point of intersection of a pair of defining rays radiating from different points within said extent, each defining ray being of a defining wavelength and being propagated by the defined surface, said propagation being selected from the group consisting of reflection and refraction according to the nature of said defined surface, and then being incident to the same side of the defining surface at a respective further point and there being propagated through a respective predetermined directed angle, said propagation being selected from the group consisting of reflection and refraction according to the nature of said defining surface, so that the defined surface is optically nearer to the source than the defining surface along both defining rays, and further the directed angle of a half-tangent to the defining surface which is co-planar with the two defining rays and lies at any intermediate point on the defining surface between the two respective further points is intermediate between the directed angles of two similarly orientated half-tangents which are co-planar with the two defining rays and lie at the respective further points, and a further ray from said source and of said defining wavelength passing through said point of intersection and also any one of such intermediate points is propagated by the defining surface through a directed angle selected from the group consisting of a directed angle intermediate between the two respective predetermined directed angles and a directed angle approximately equal to one of them, said propagation being selected from the group consisting of reflection and refraction according to the nature of said defining surface; and providing said defining and defined surfaces.

5.0 BRIEF DESCRIPTION OF DRAWINGS

Figures 5A, 5B, 5C:
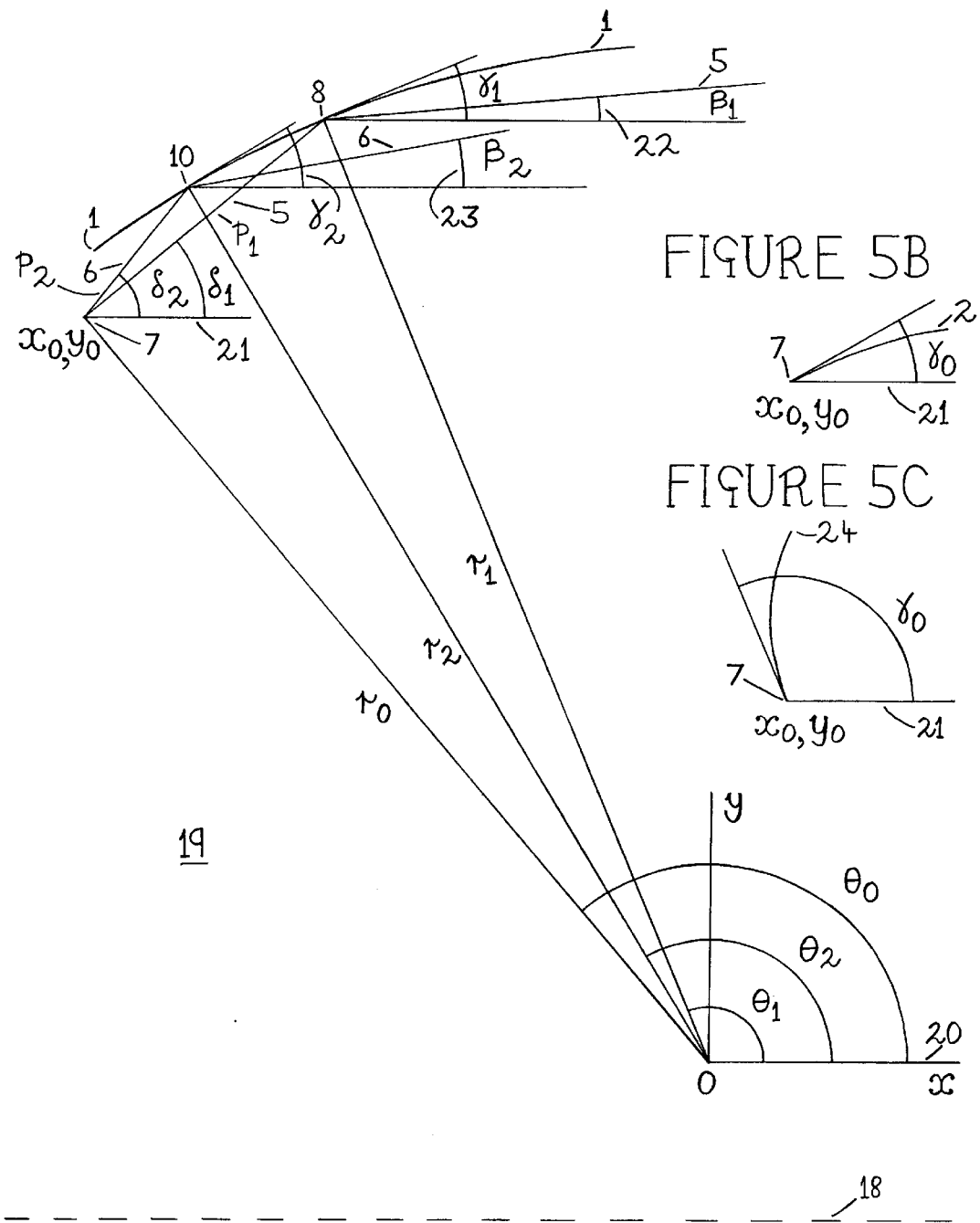
FIGS. 5A, 5B and 5C are a schematic diagram of the ninth, tenth, thirteenth and fourteenth embodiments showing the co-ordinate systems used to describe those embodiments and the representation of the angles therein.
Figure 24:
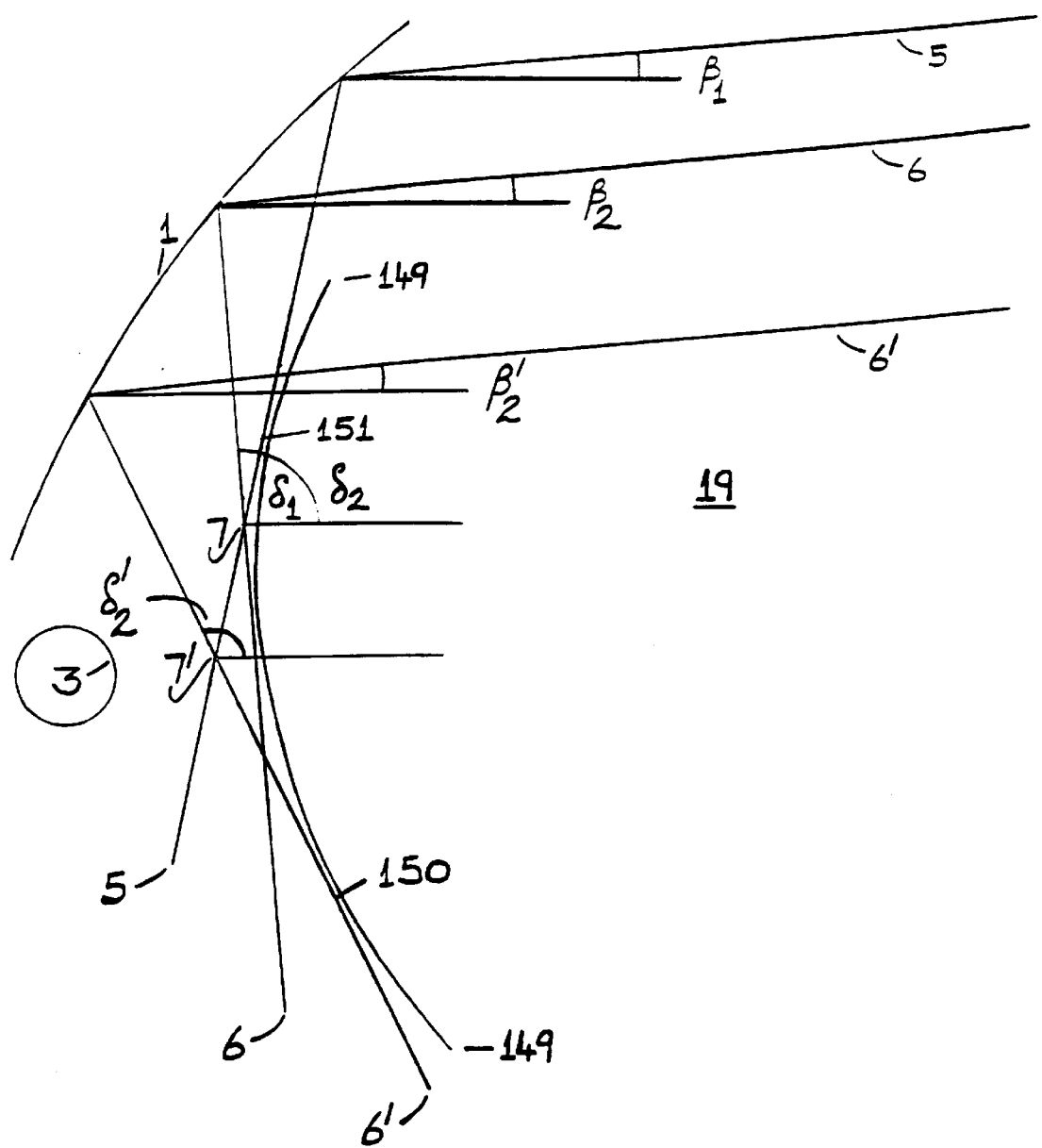
Figure 27:
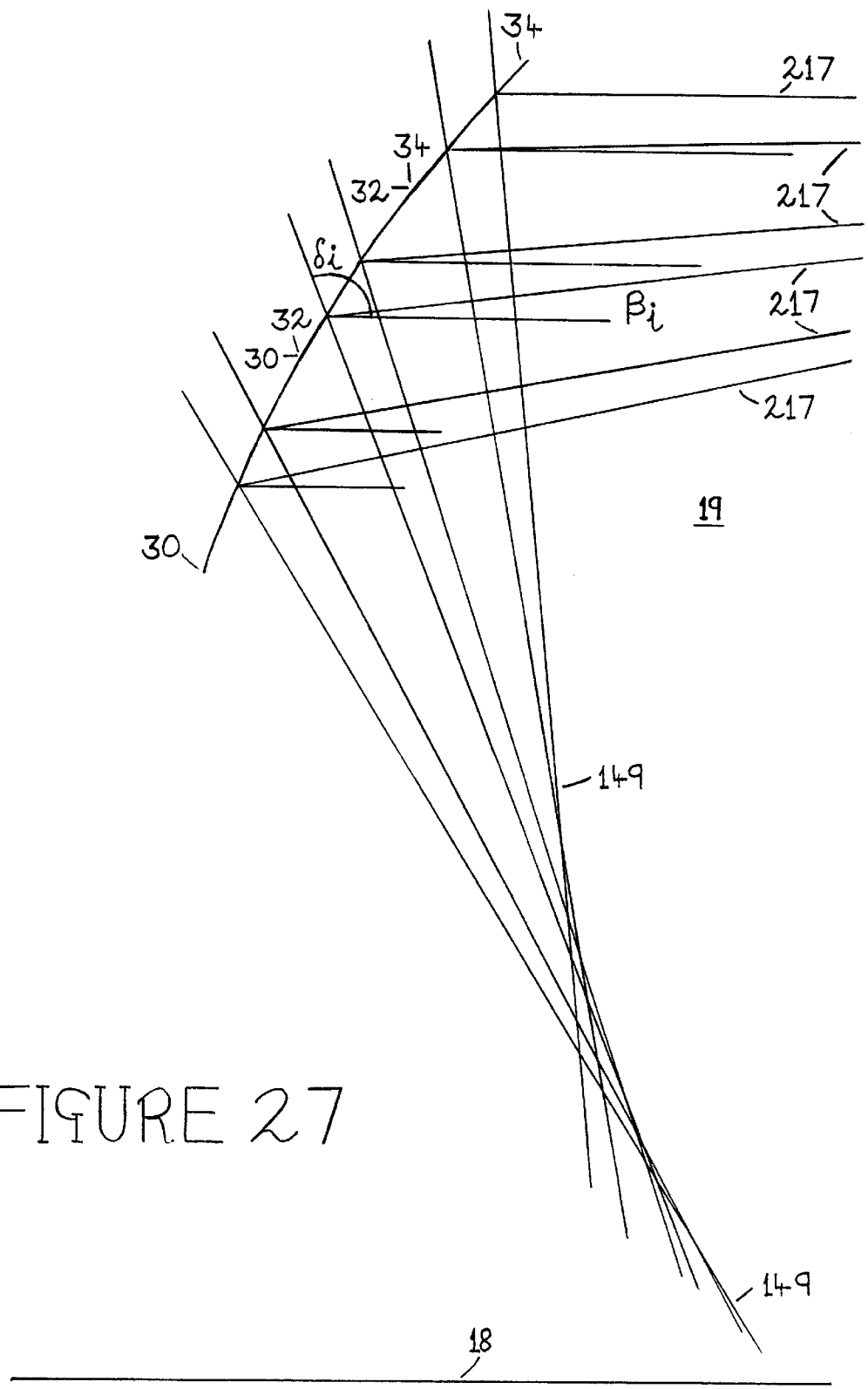
Figure 28:
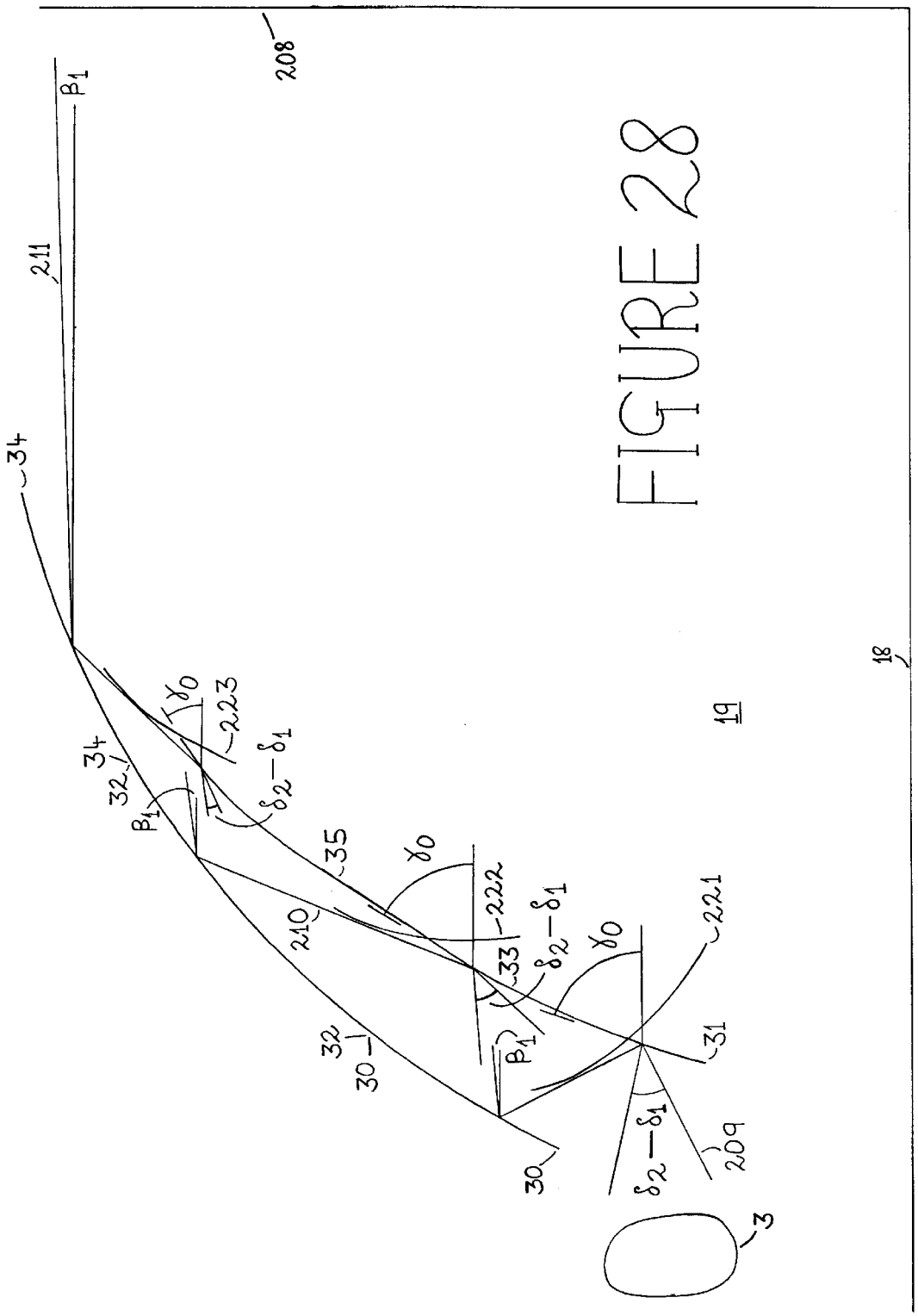
Figure 29:
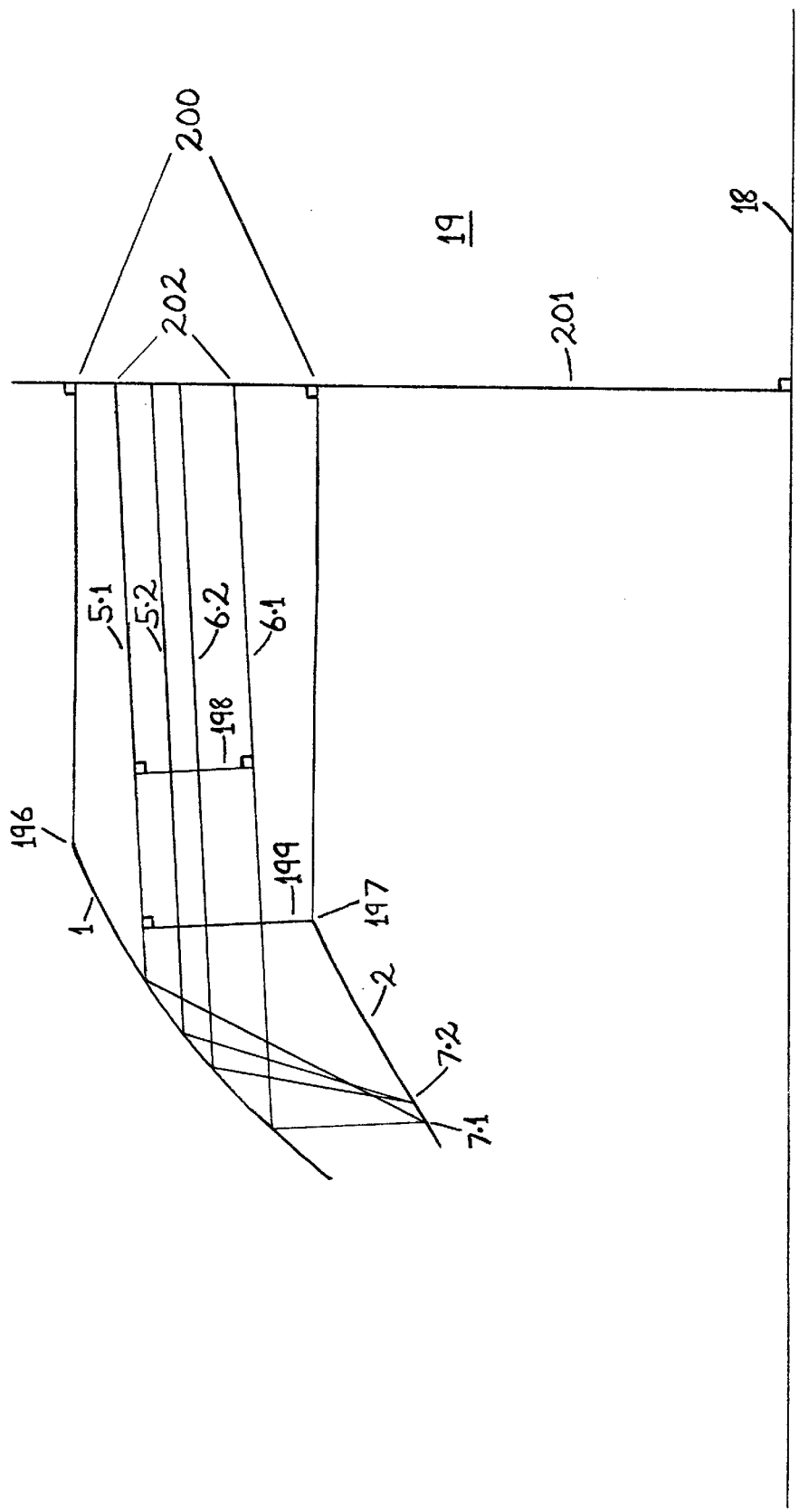
Figure 30:
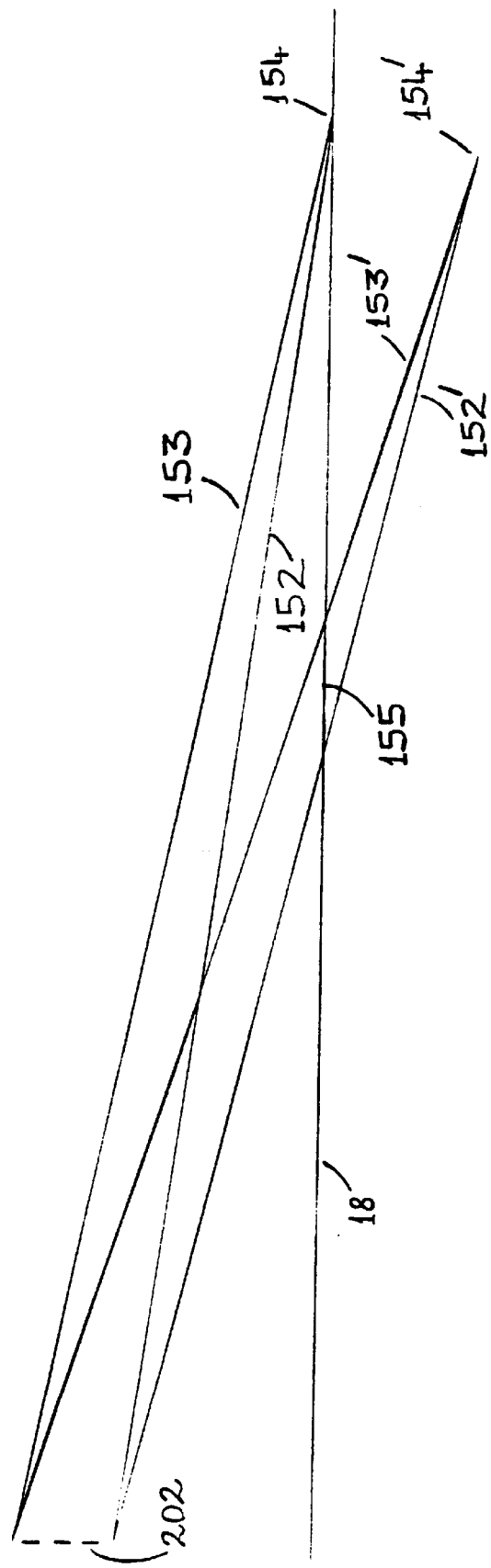
Figure 31:
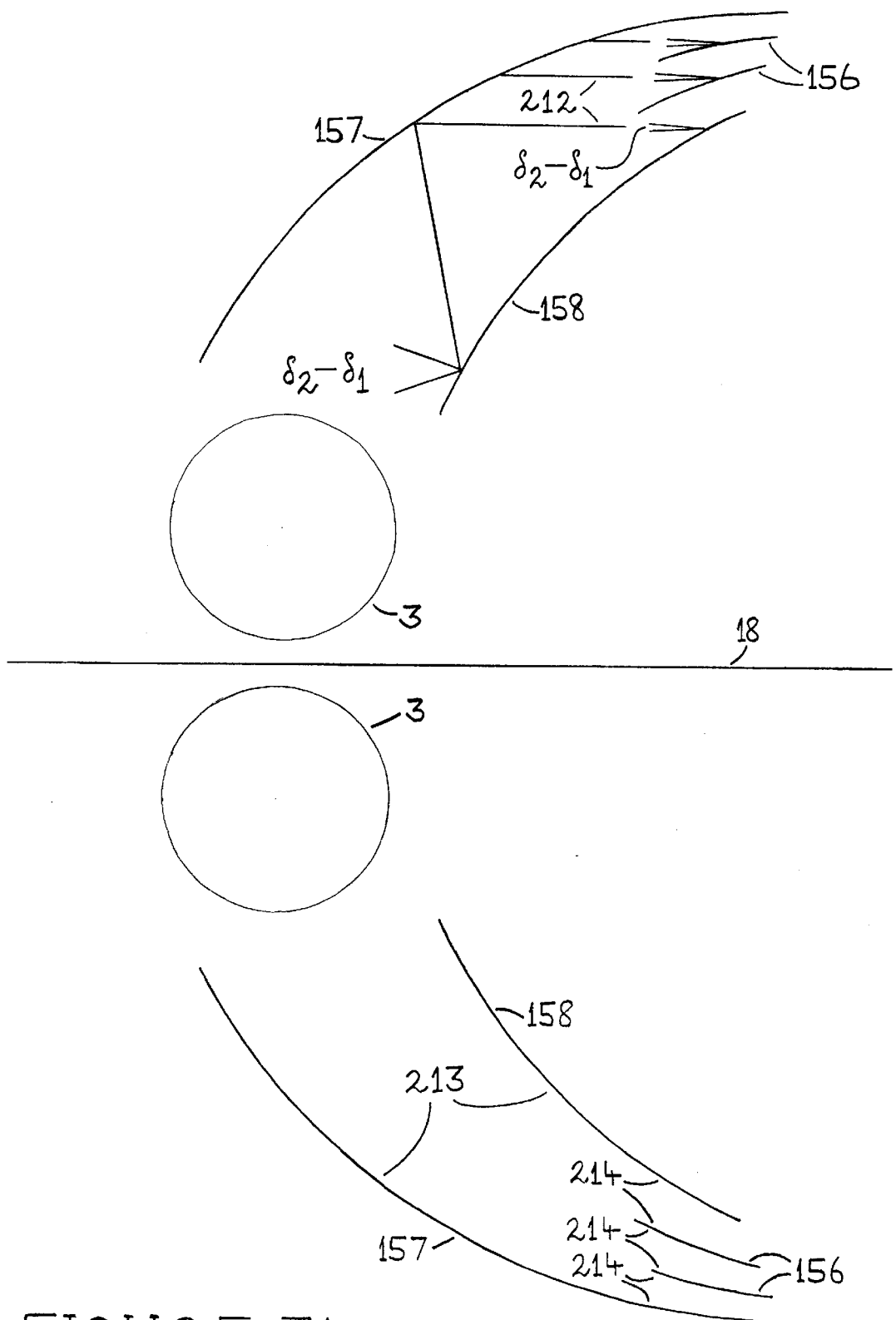
Figure 32:
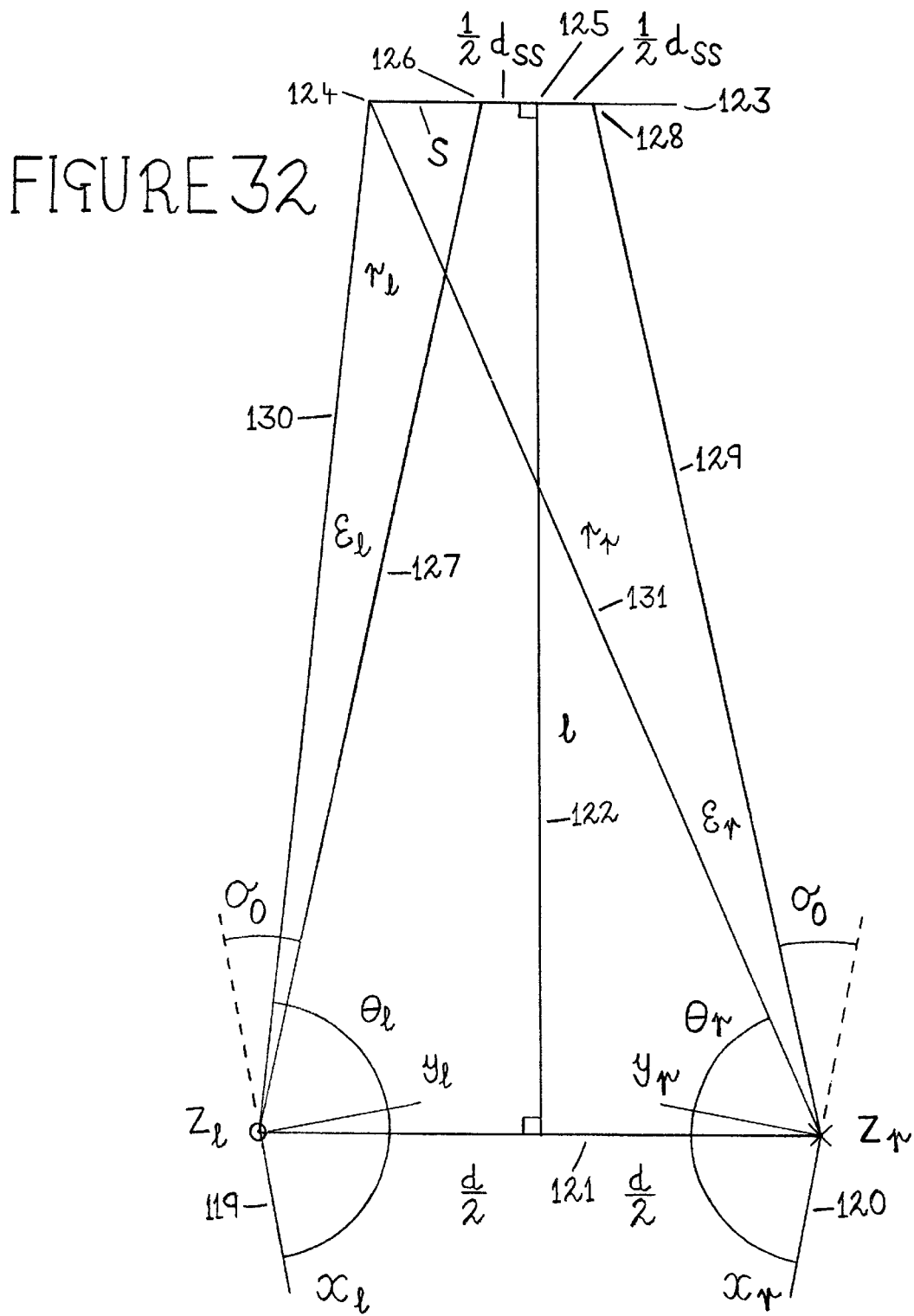
Figure 33:
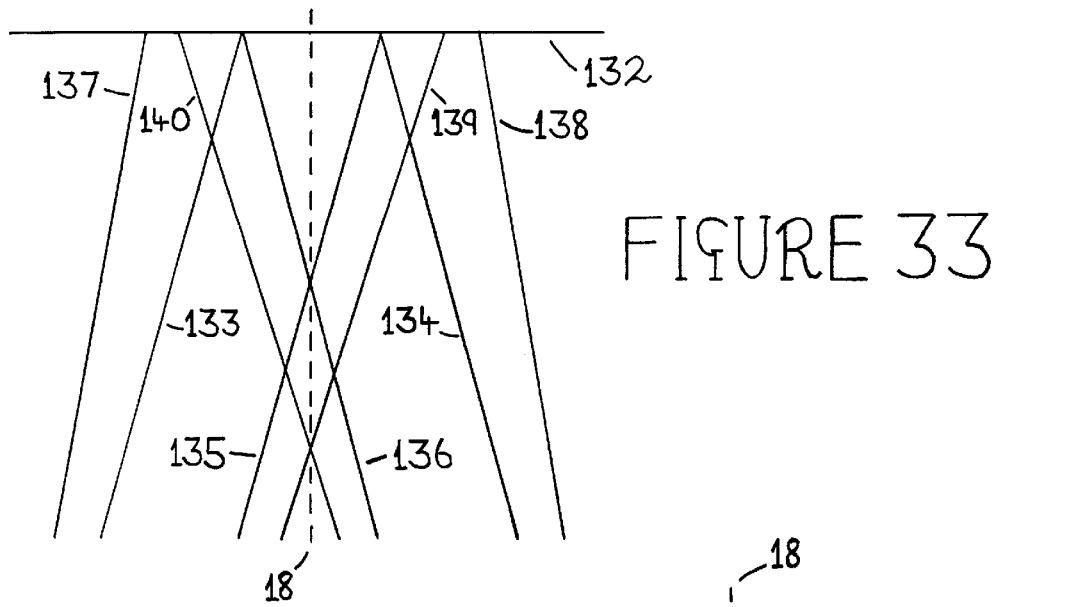
Figure 34:
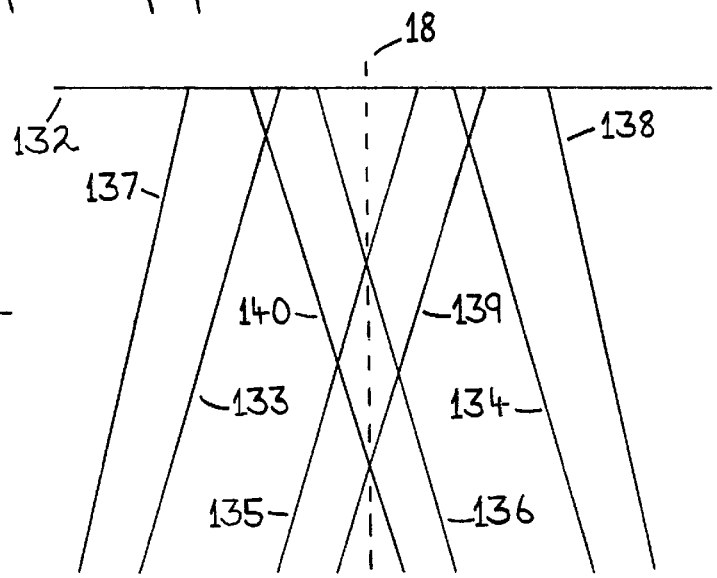
Figure 35:
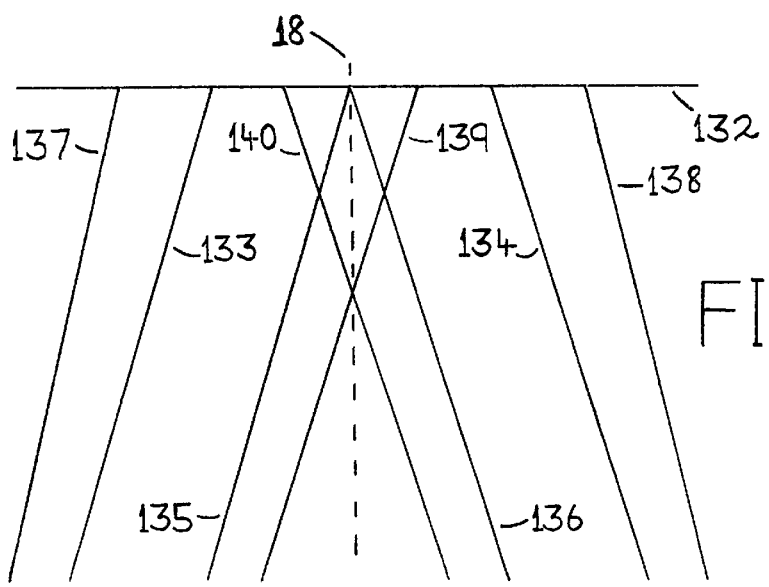
Figure 48:
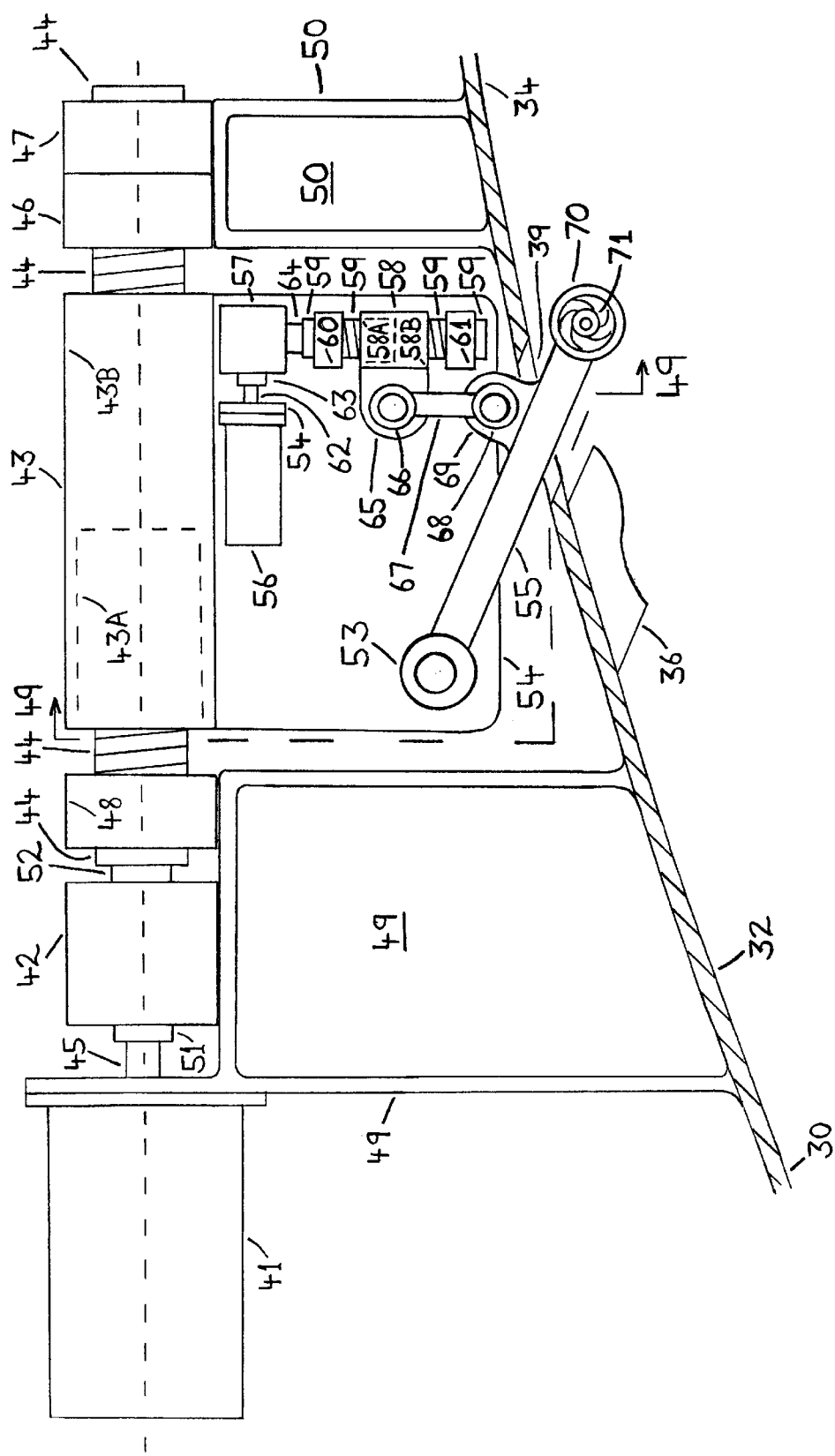
Figure 52:
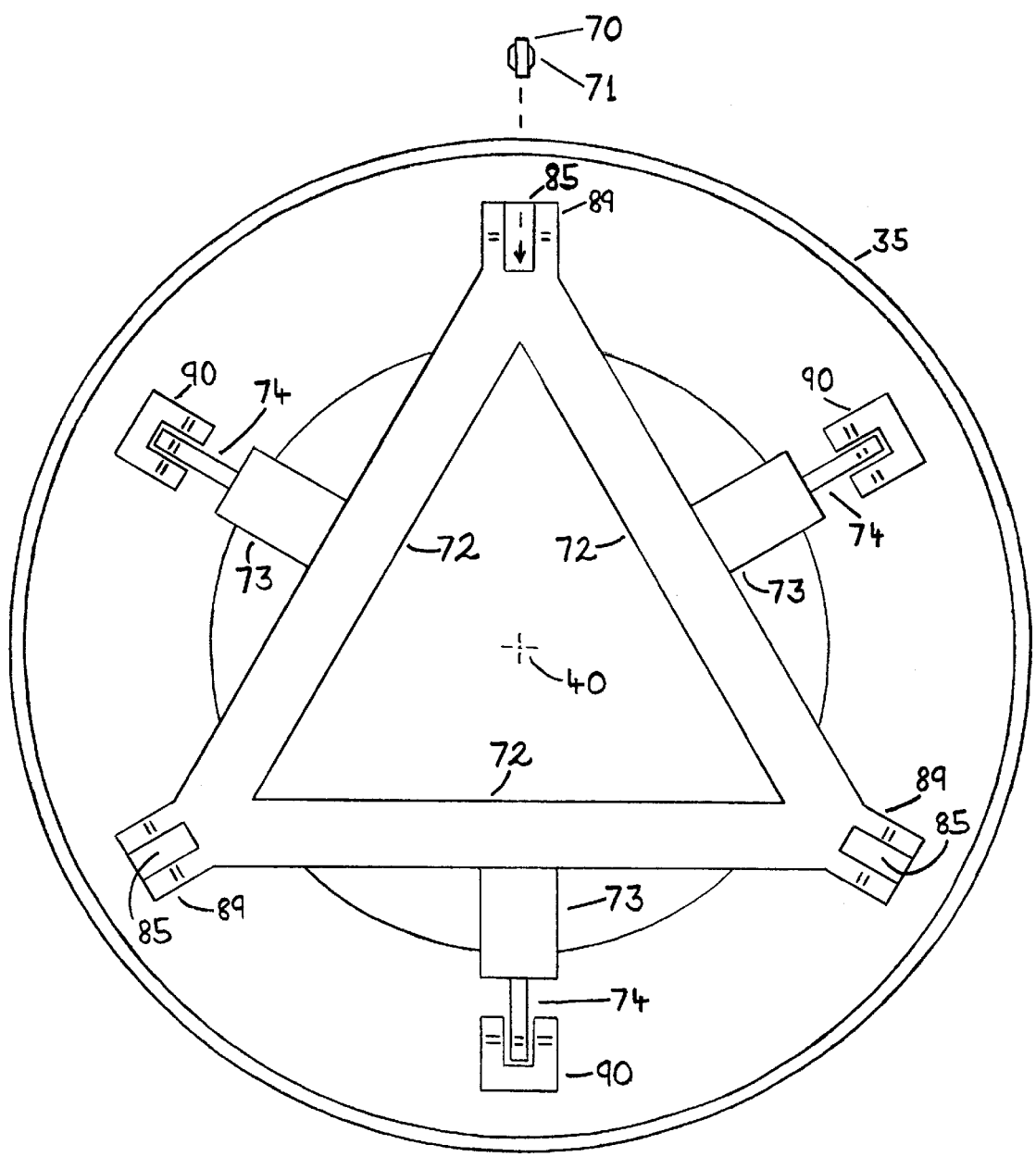
Figure 60:
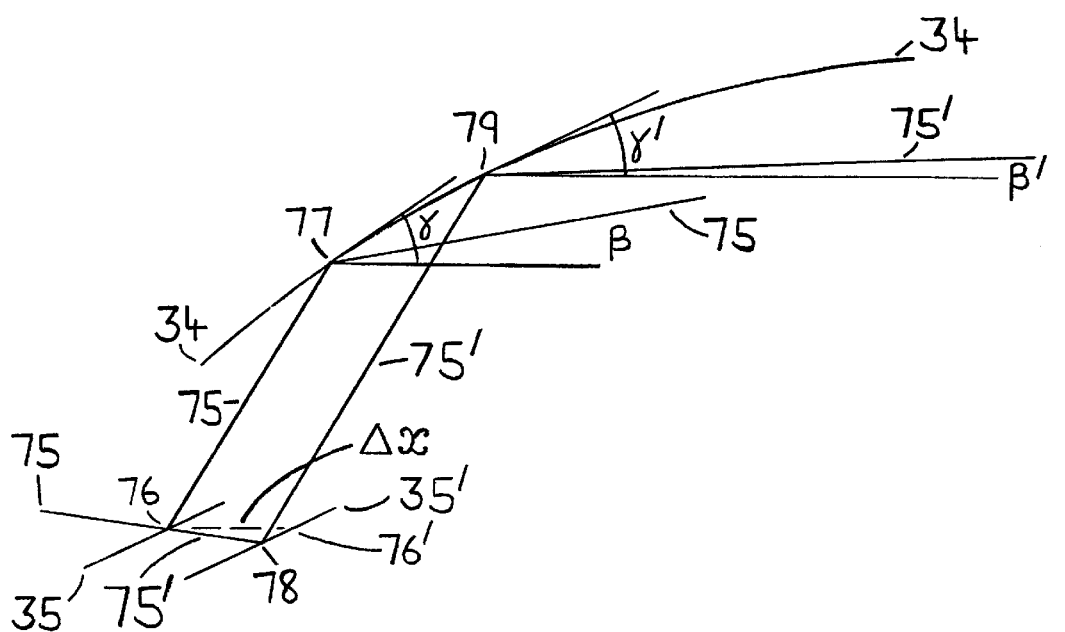
Figure 61:
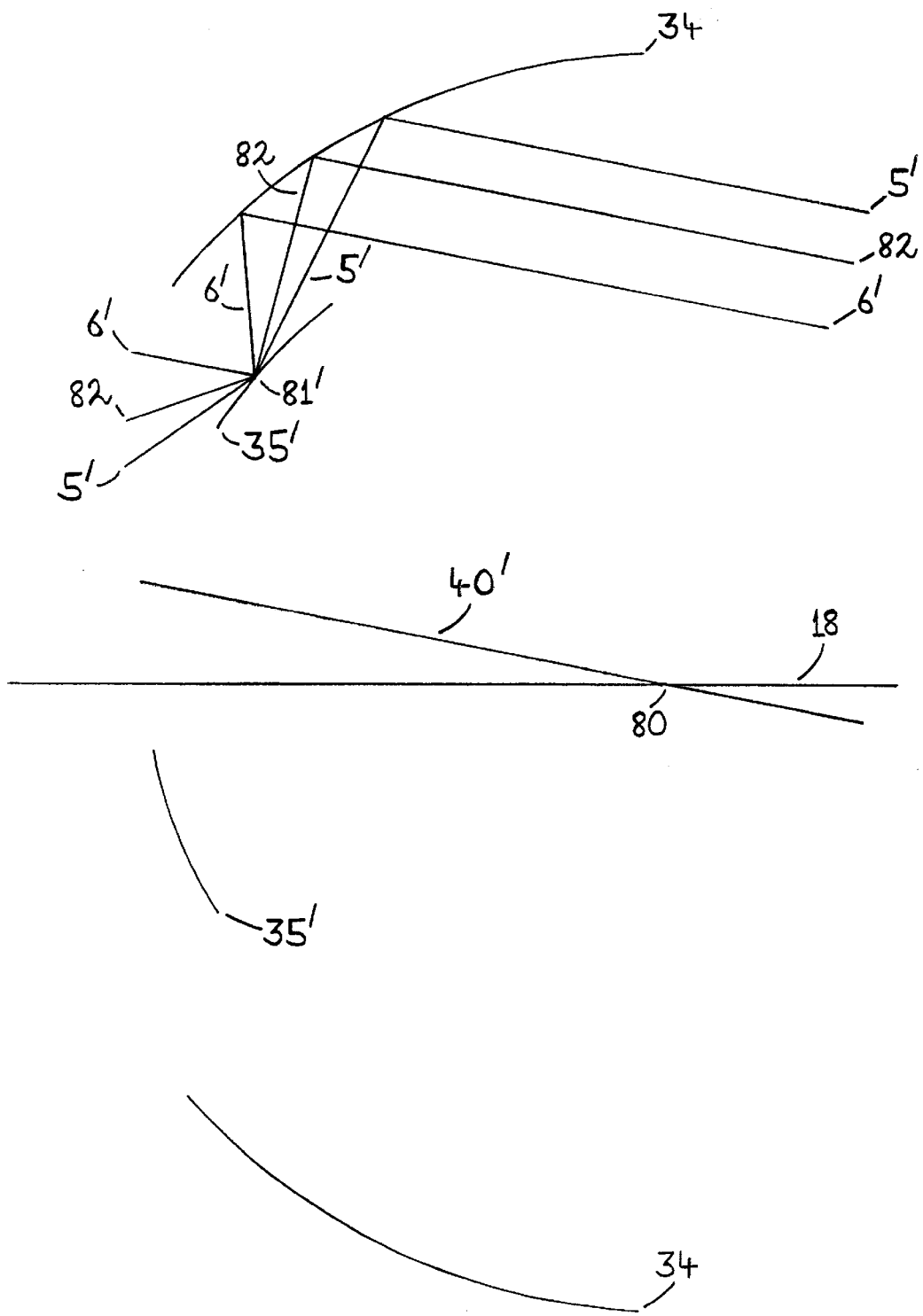
Figure 62:
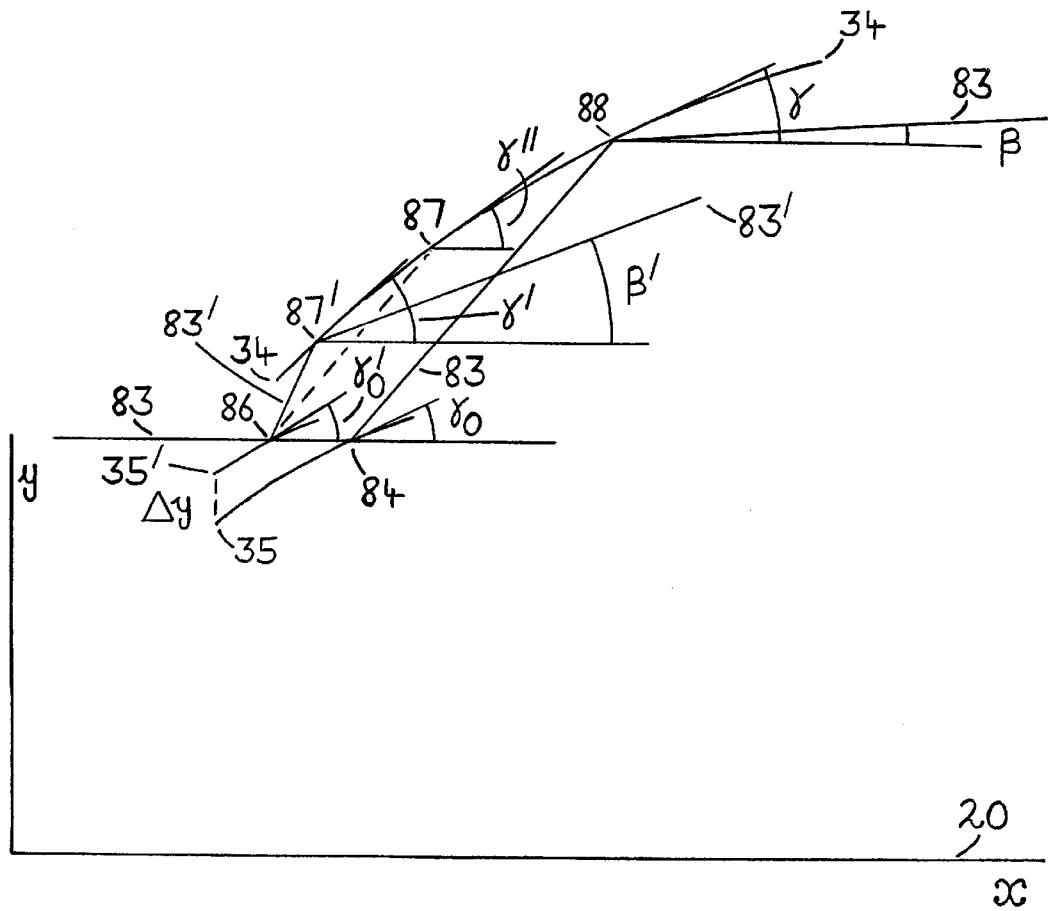
Figure 63:
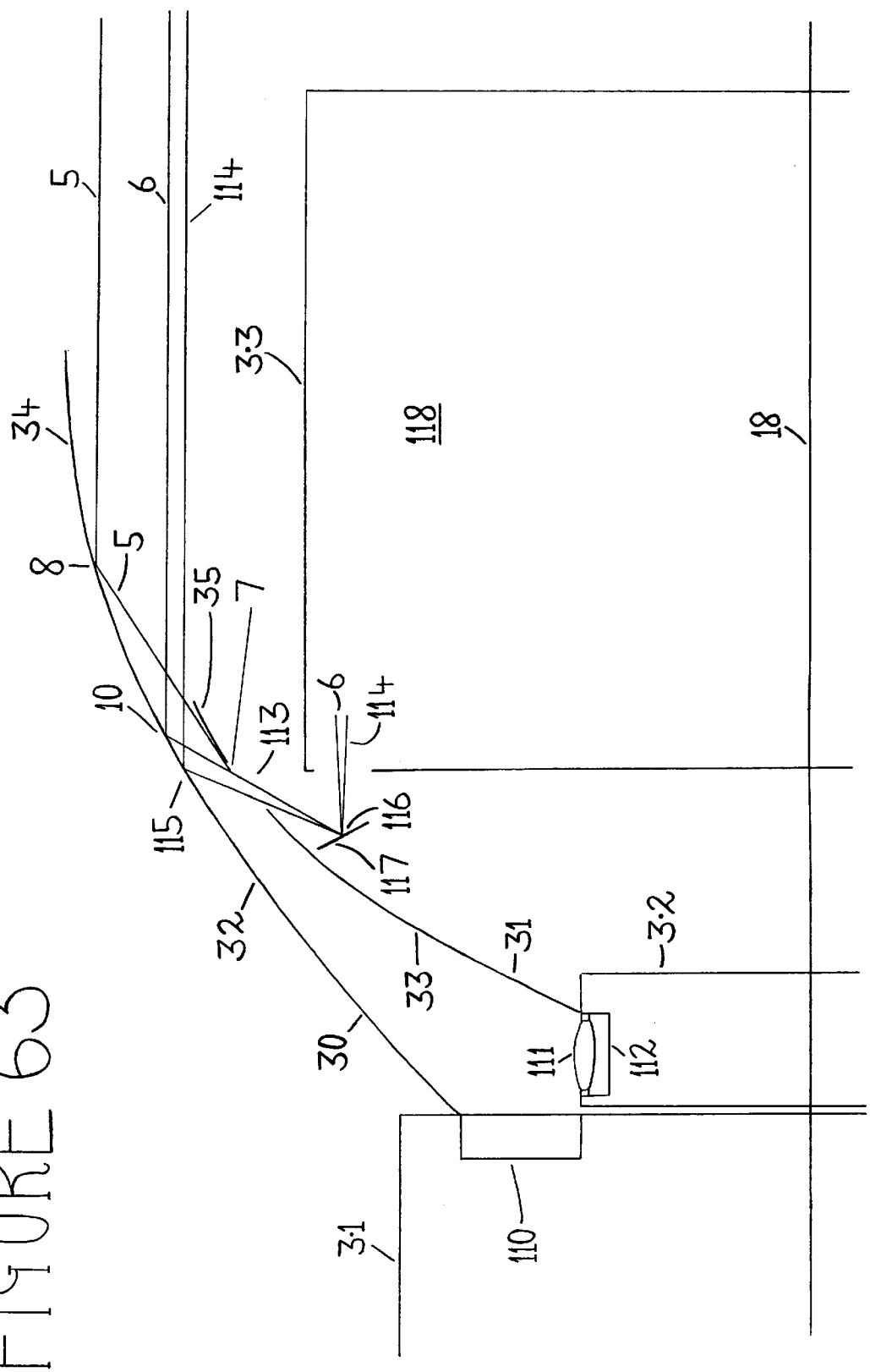
Figure 64:
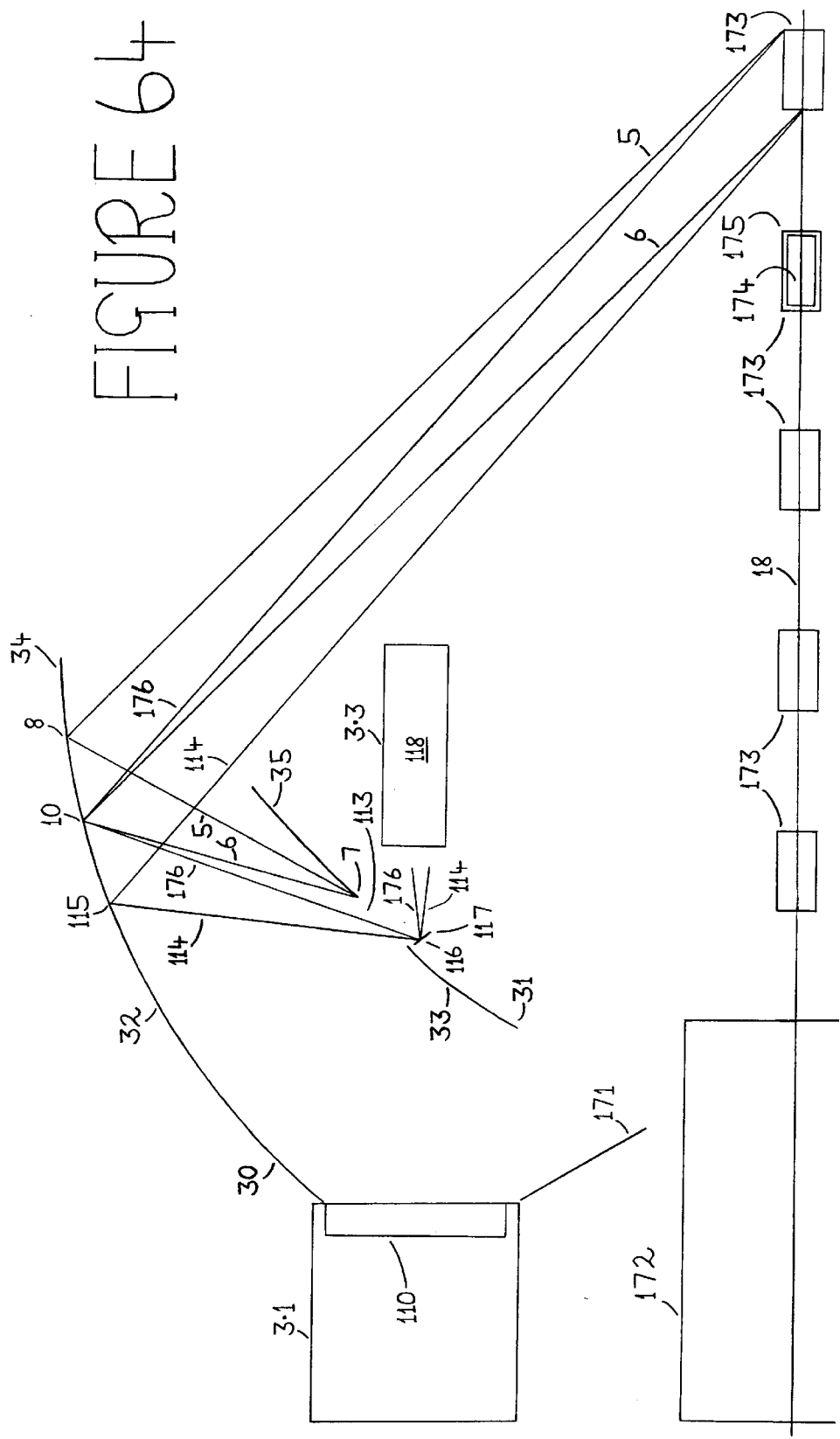
Figure 72:
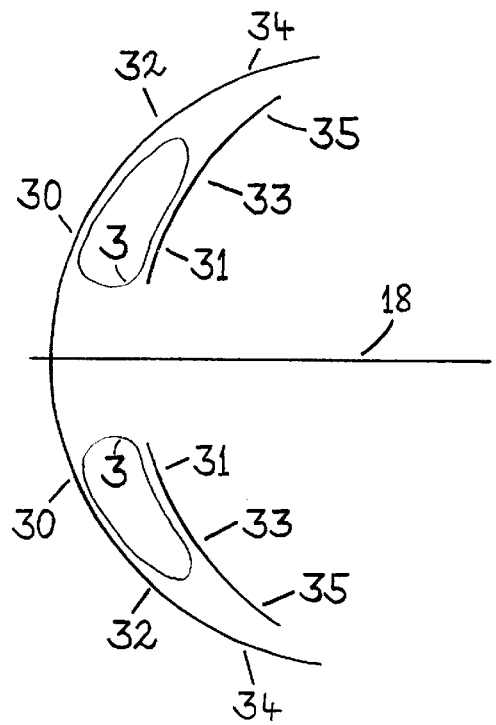
Figure 73:
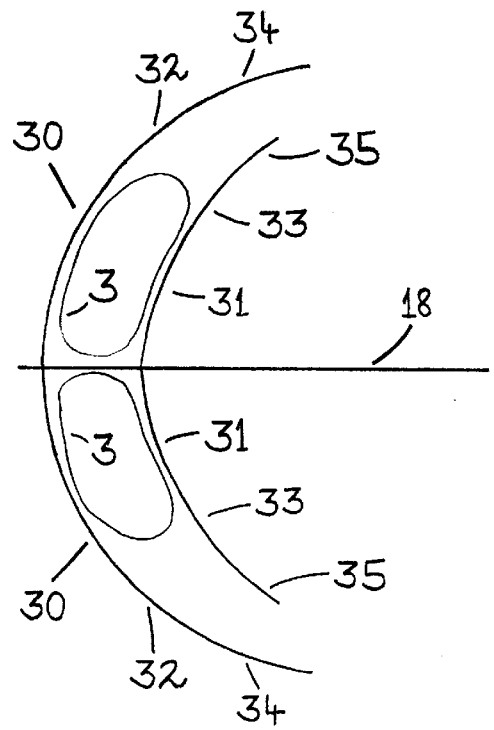
Figure 74:
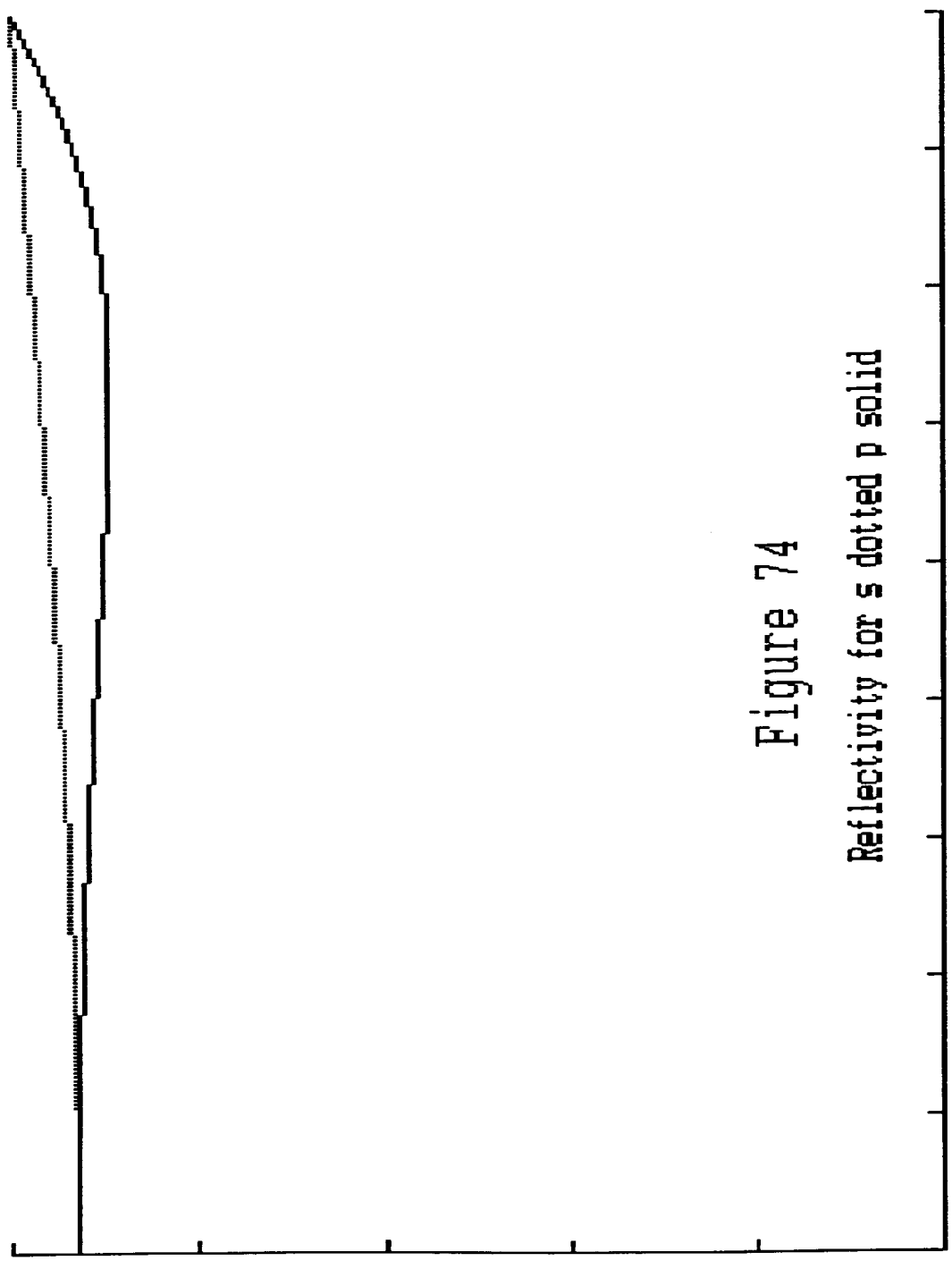
Figure 75:
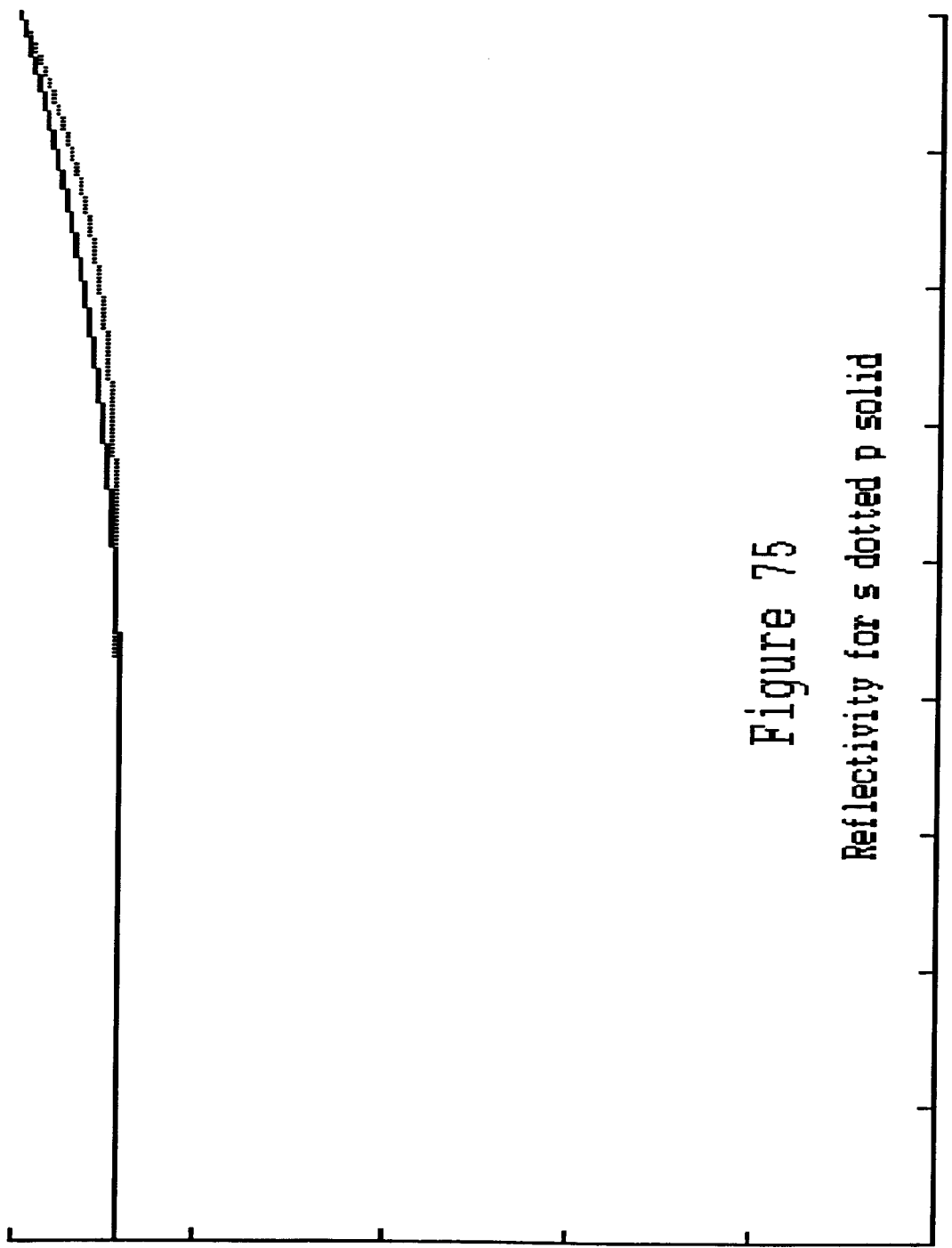
Figure 76:
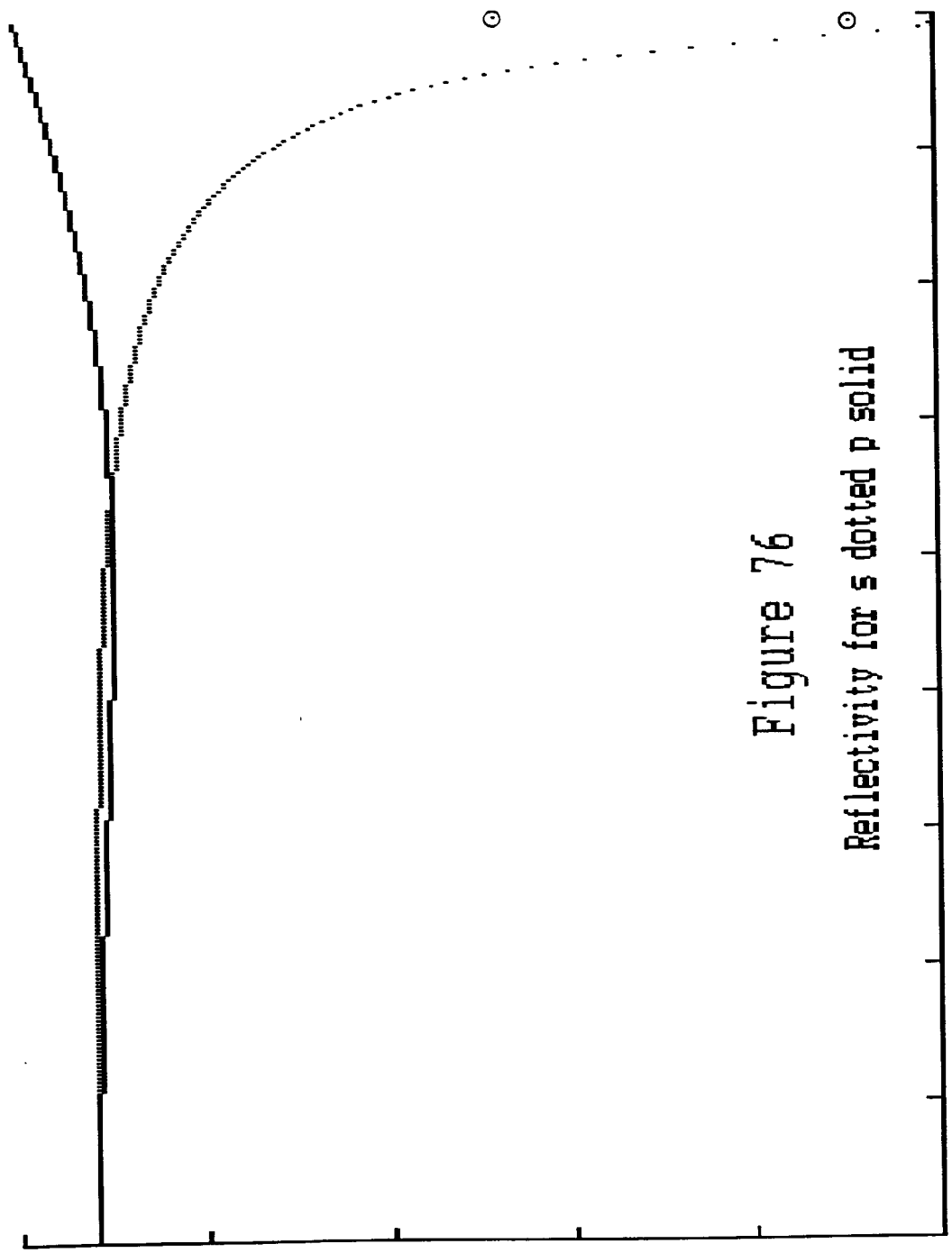
Figure 77:
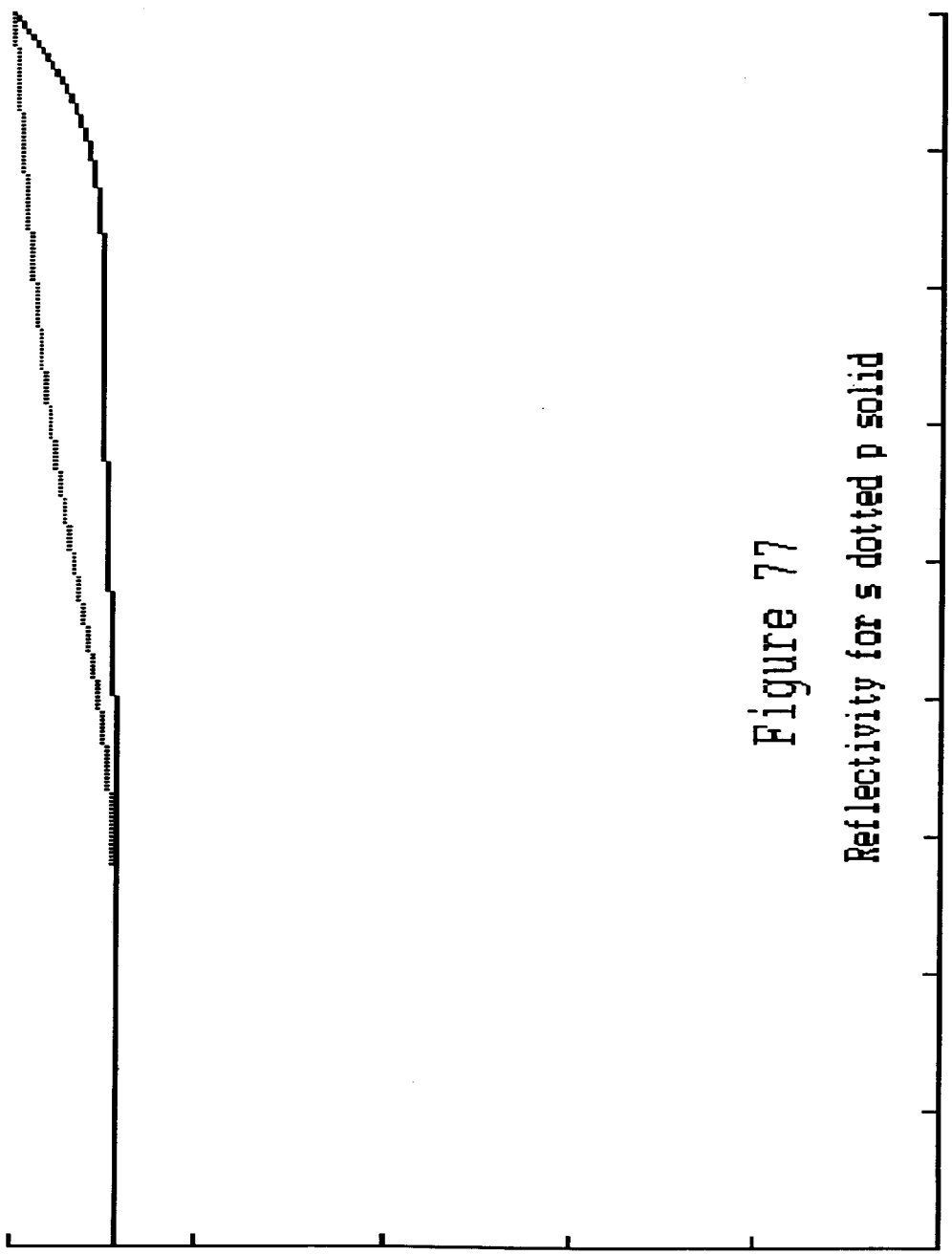
Figure 78:
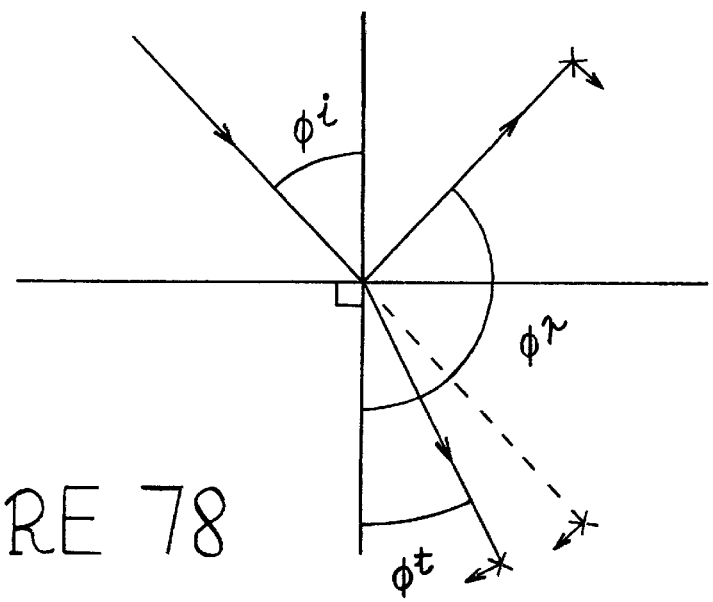
Figure 79:
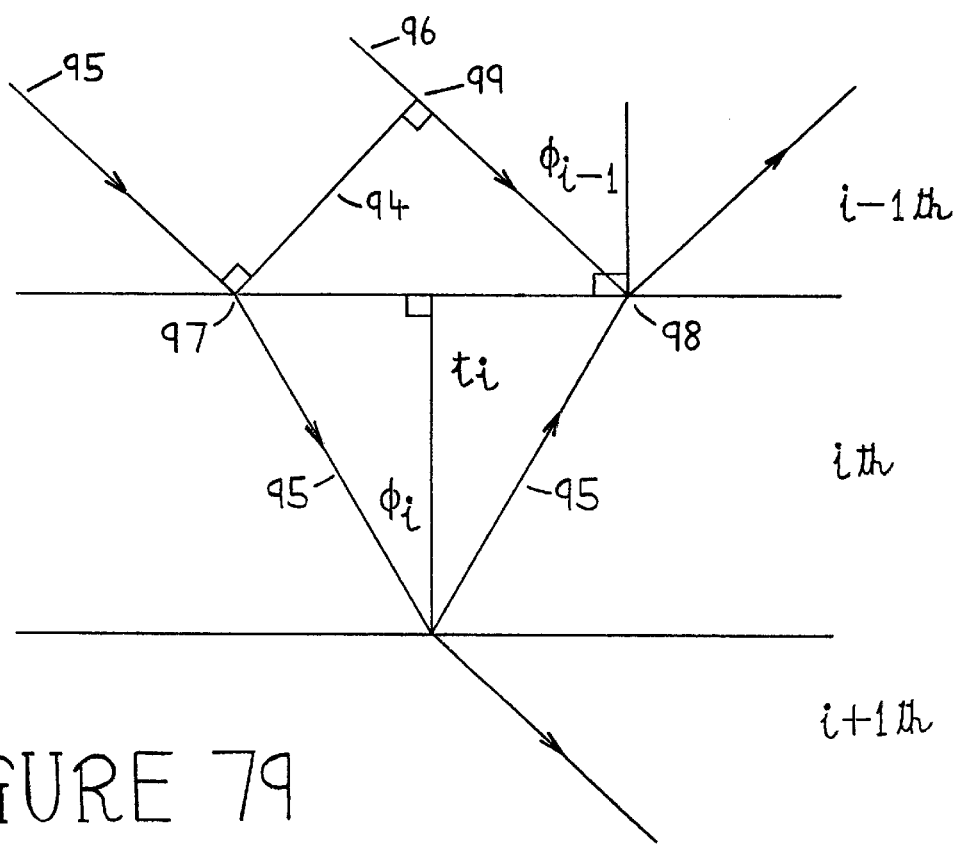
Figure 80:
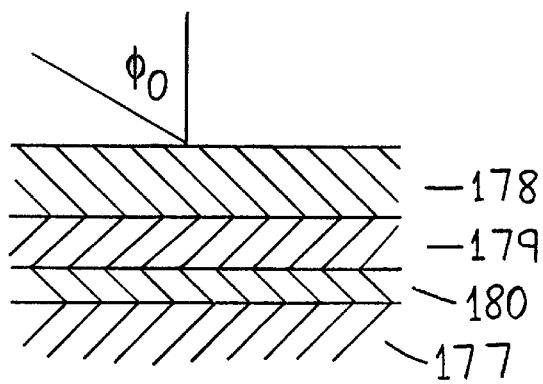
Figure 81:
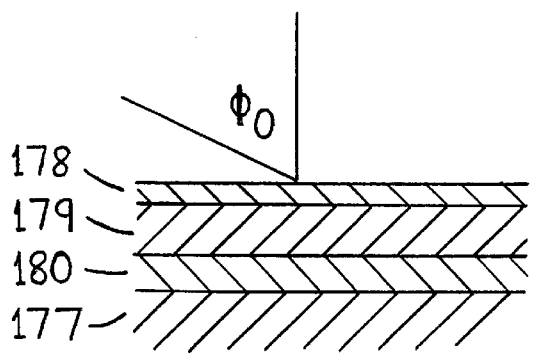
Figure 82:
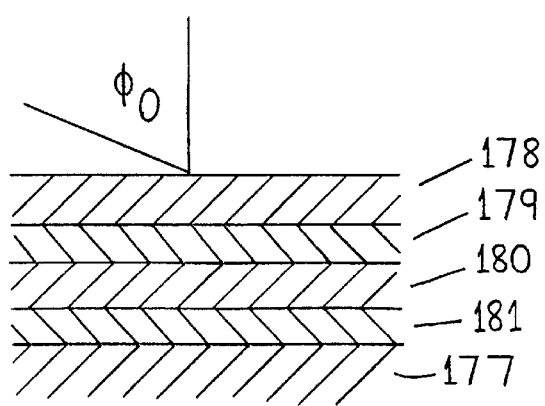
Figure 83:
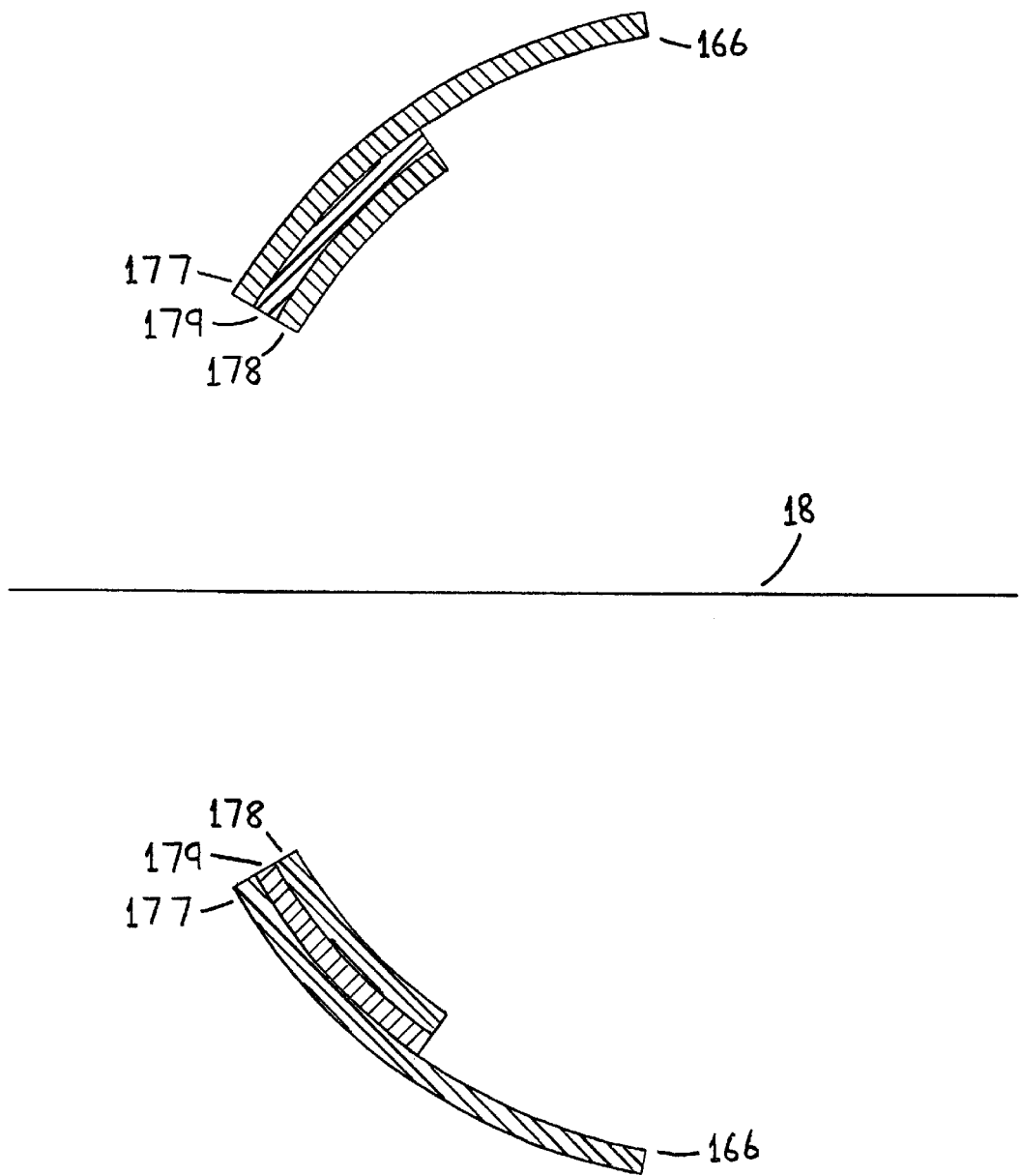
Figure 84:
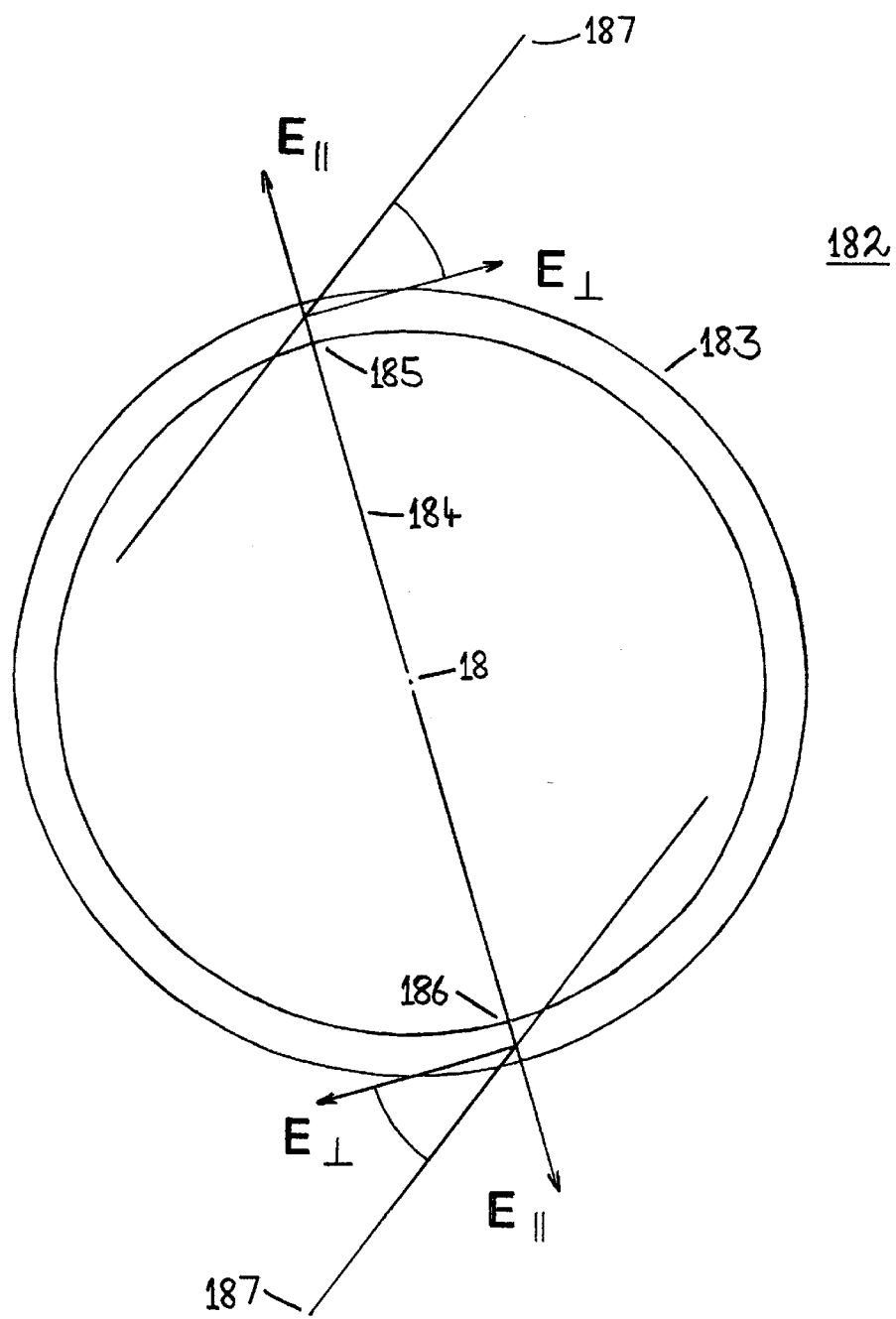
Figure 87:
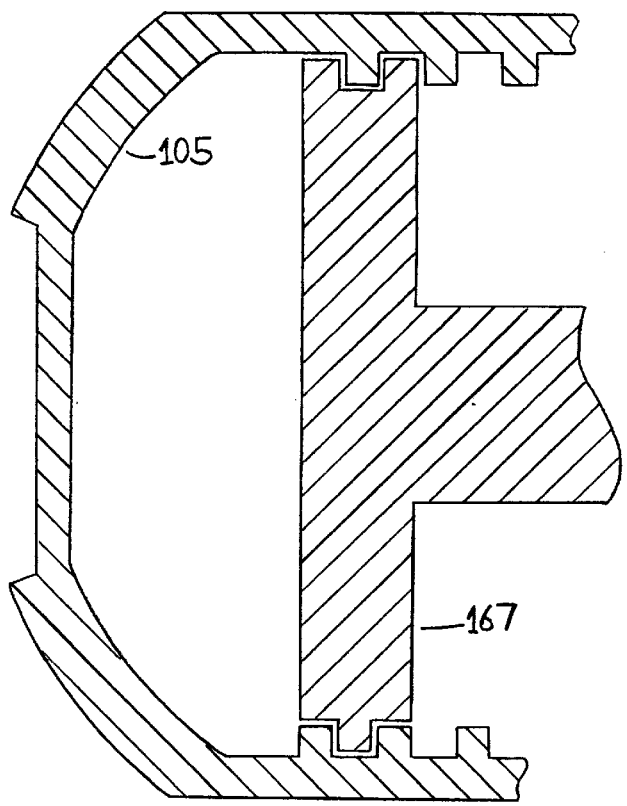
Figure 88:
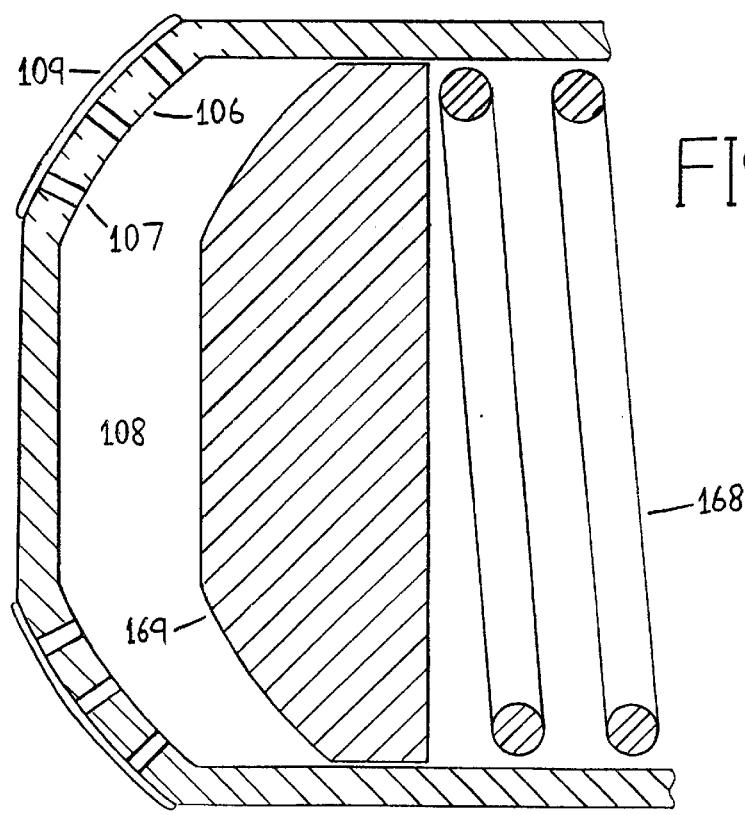
Figure 89:
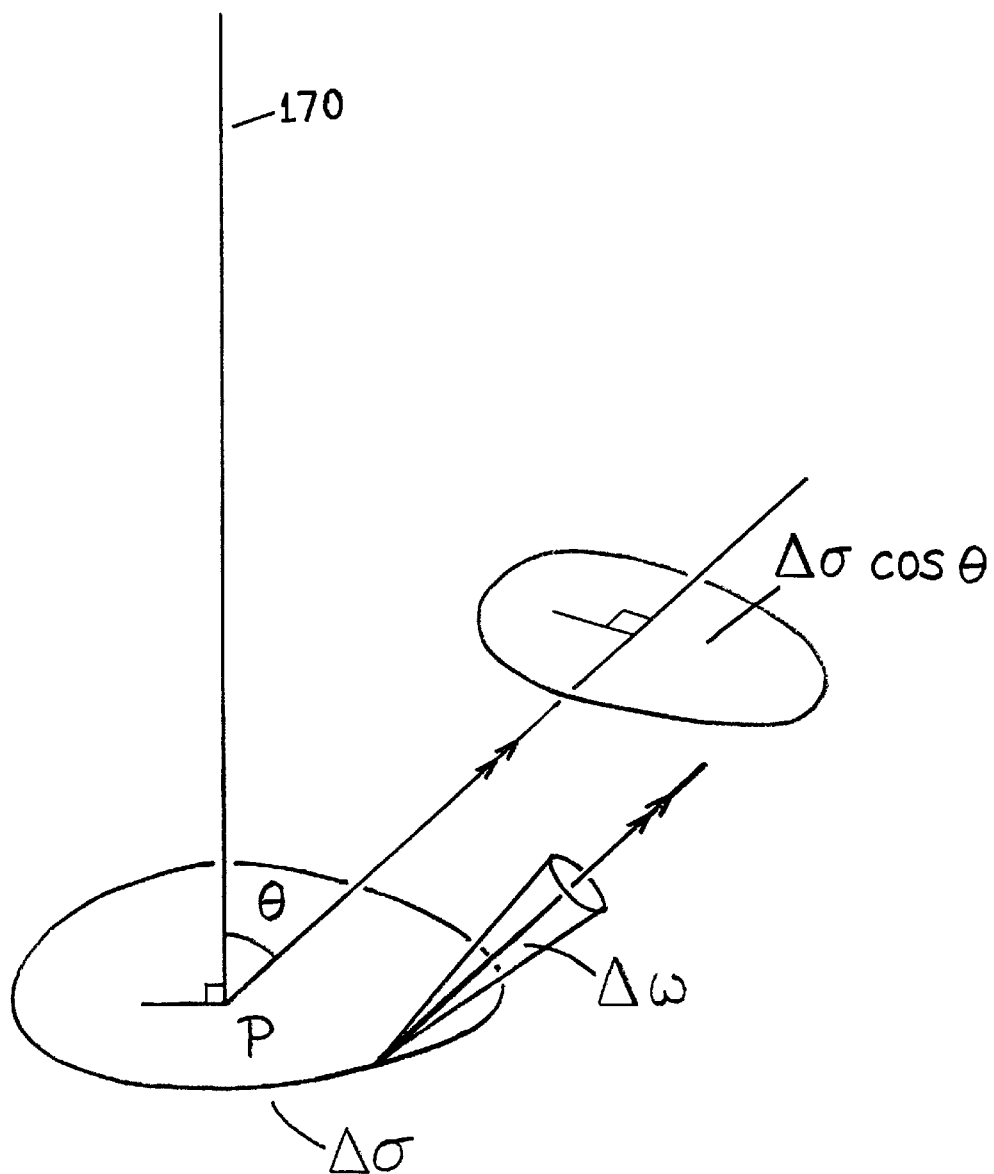
Figure 90:
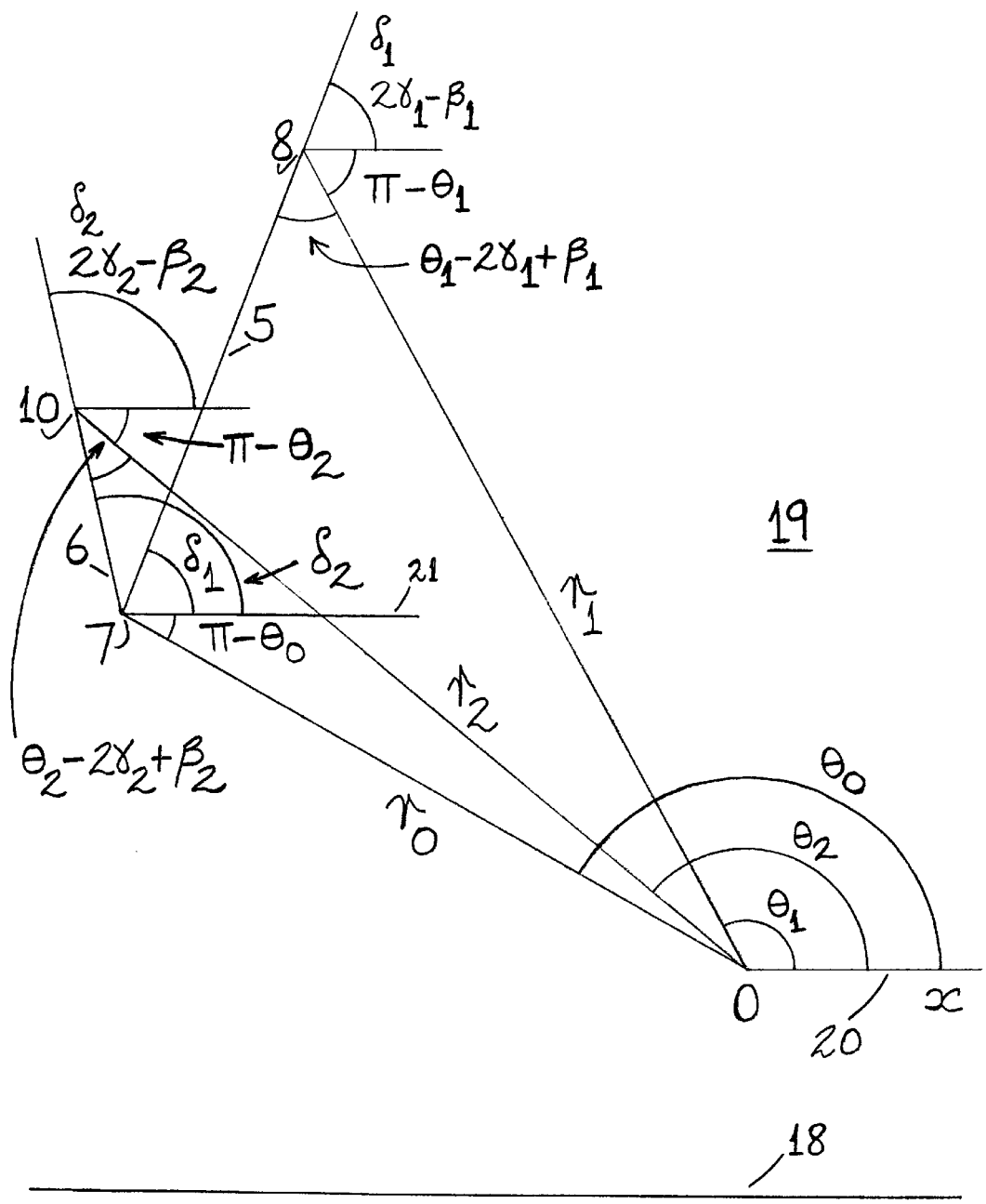
Figure 91:
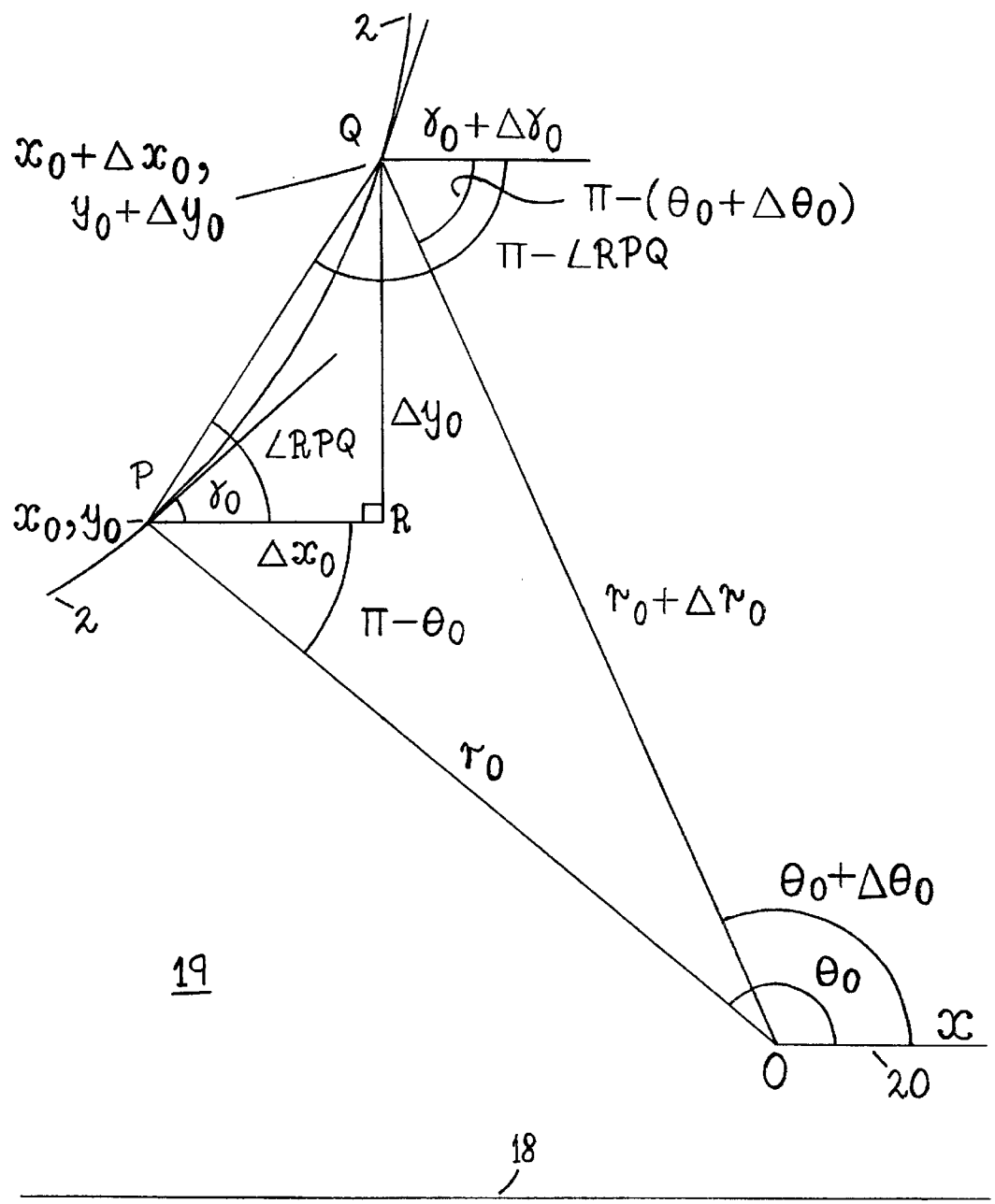
Figure 92:
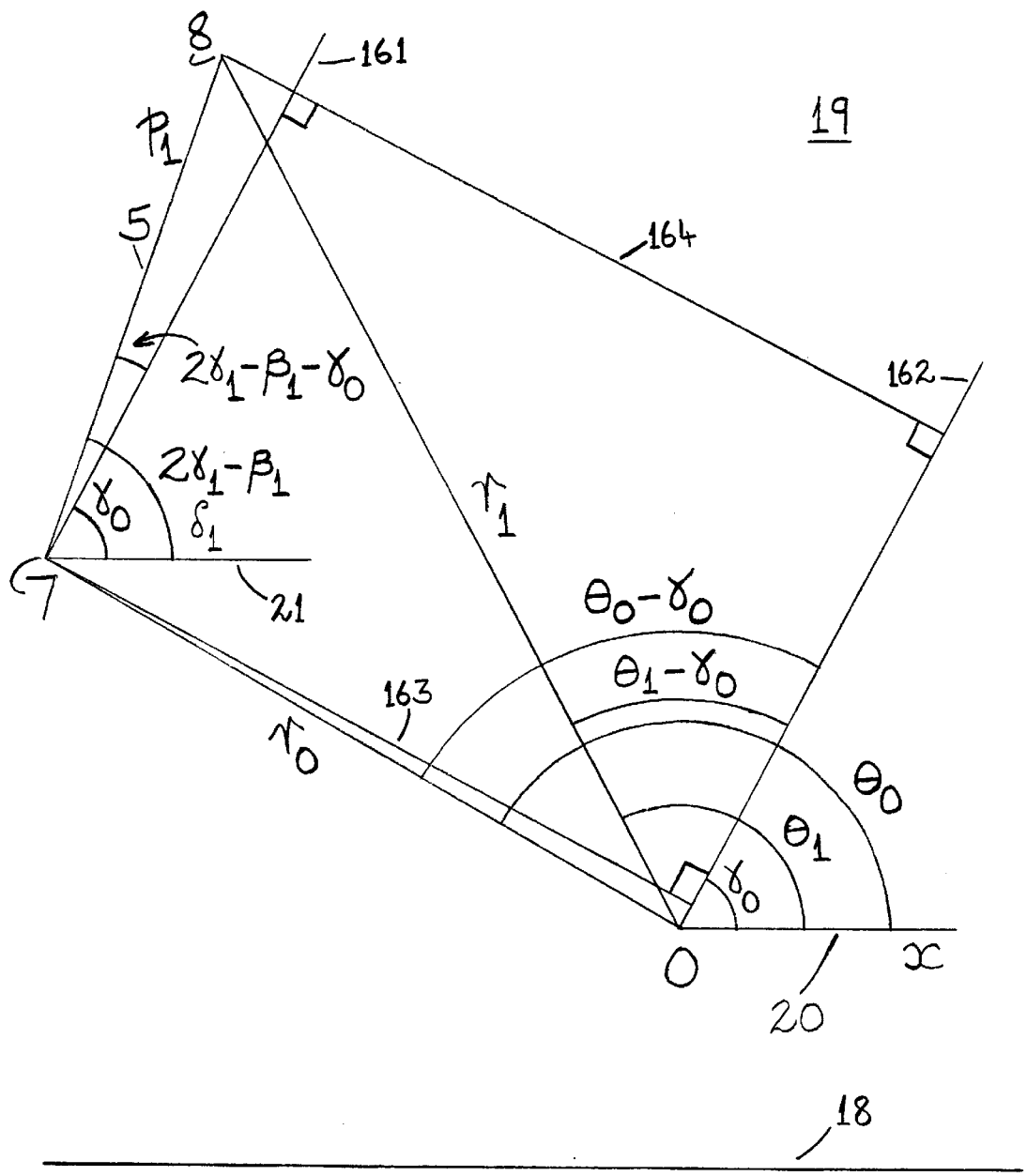
Figure 93:
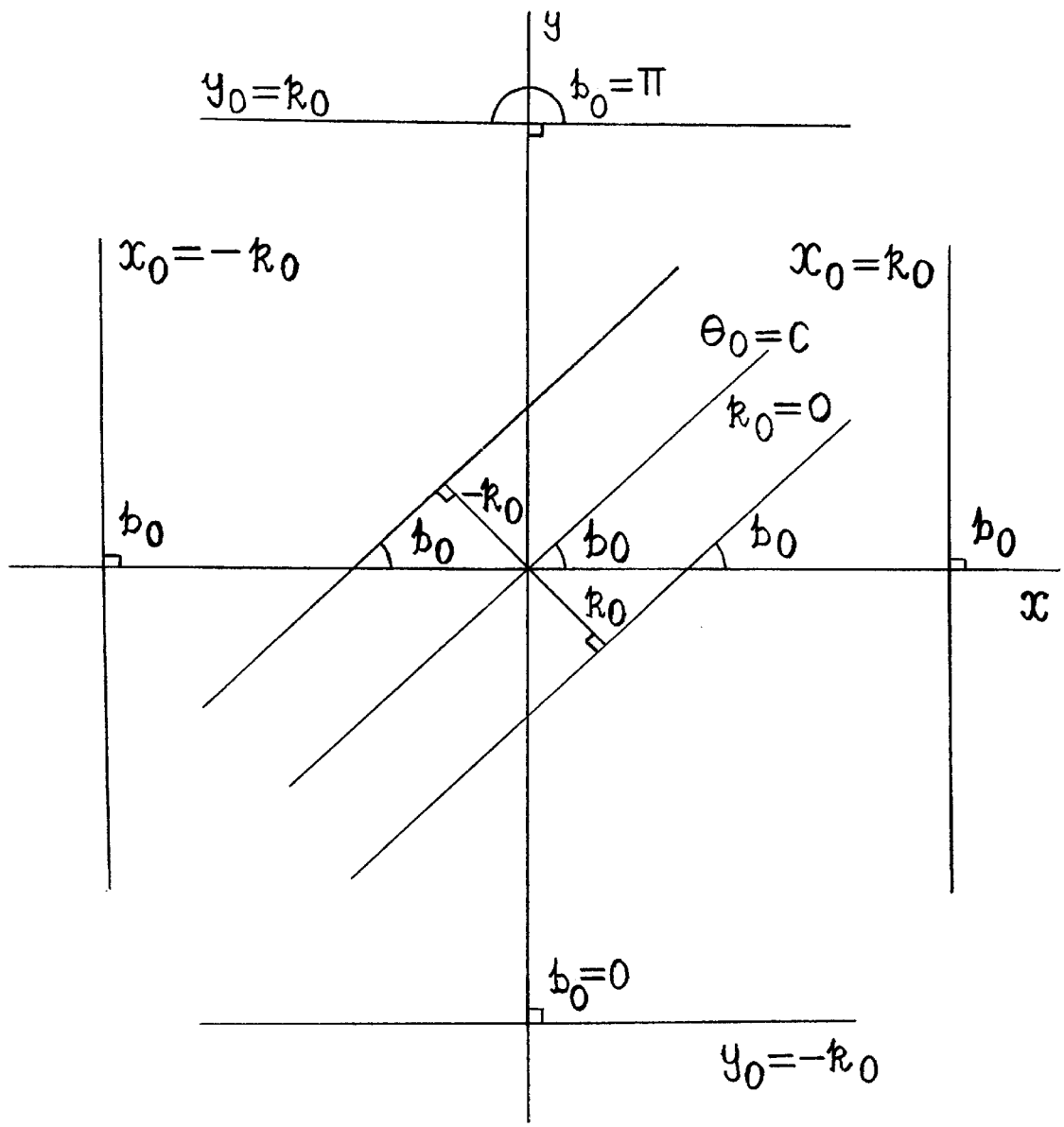
Figure 94:
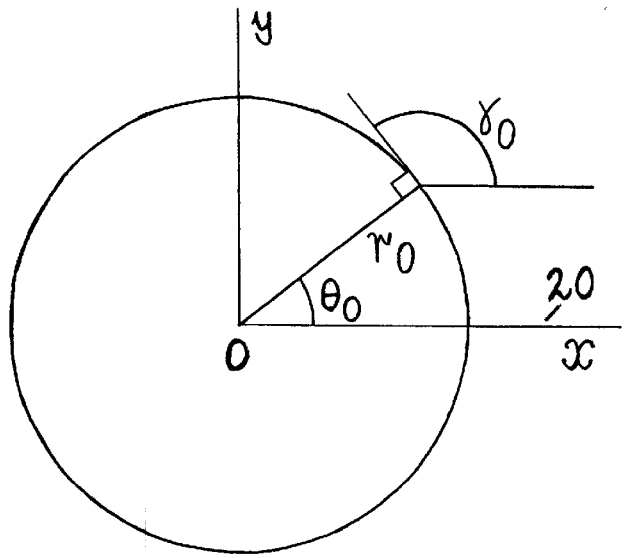
Figure 95:
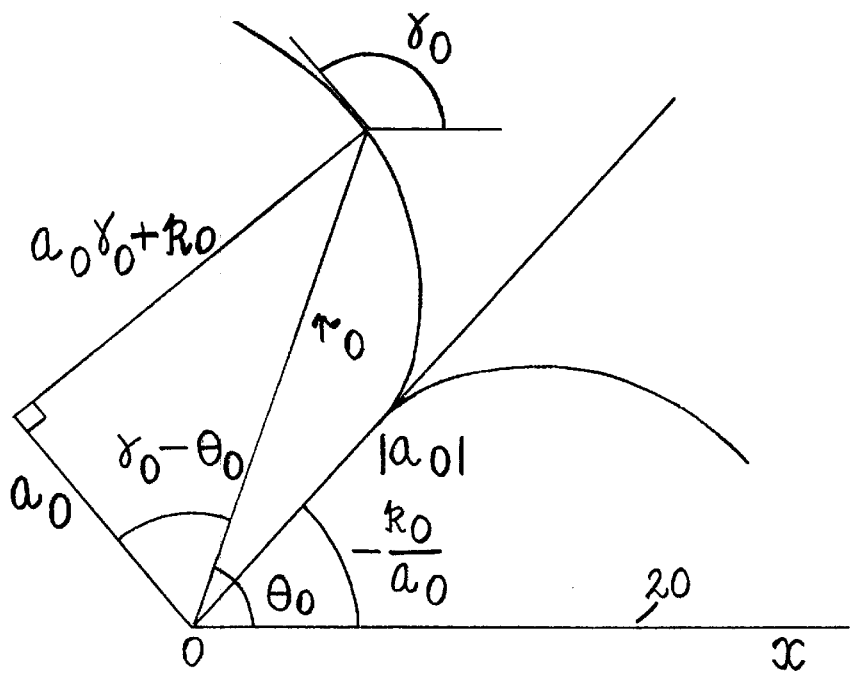
Figure 96:
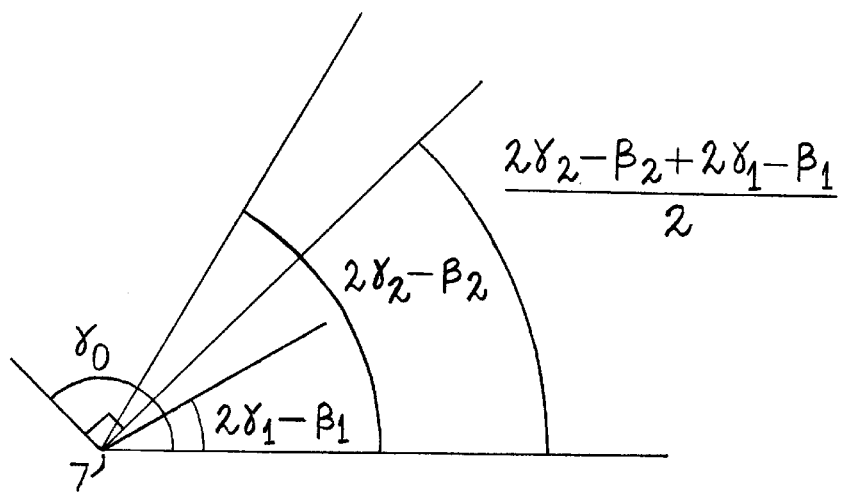
Figure 97:
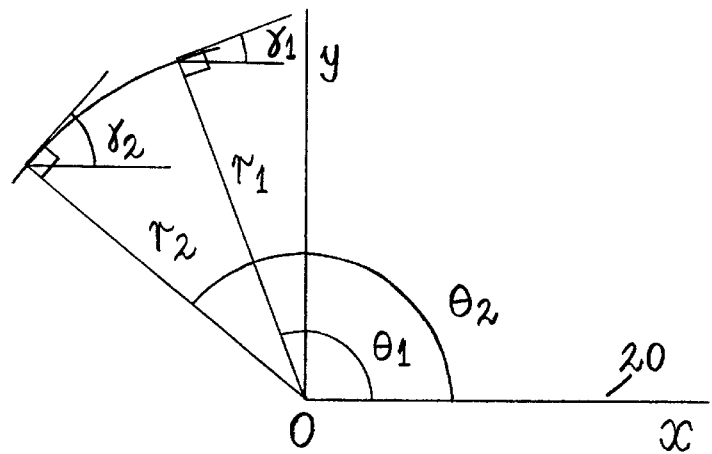
Figure 98:
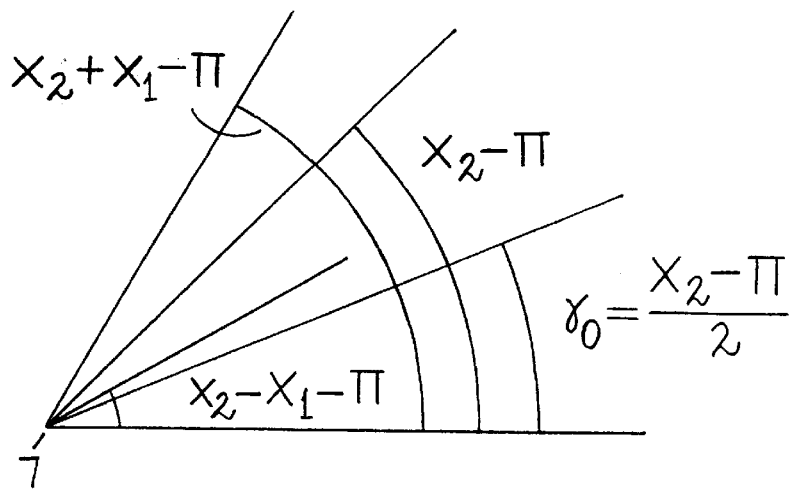
Figure 99:
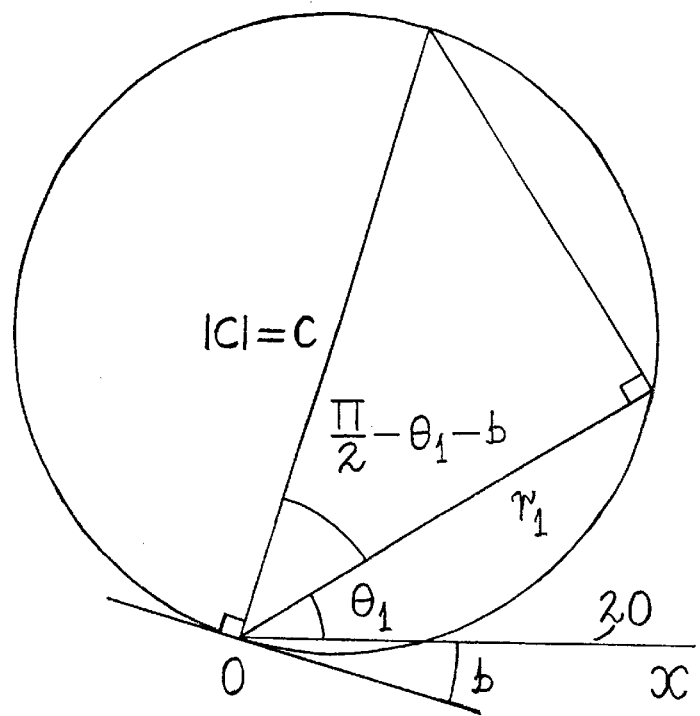

FIGS. 14 to 23 comprise ten schematic diagrams showing various ways in which an input aperture may (or may not) be formed;

FIG. 24 is a schematic diagram showing an envelope to the lines extending portions of the defining rays;

FIGS. 25A, 25B and 26A, 26B are schematic diagrams showing two relationships for a reflective defined surface which constrain its gradient;

FIG. 27 is similar to FIG. 24 but shows the defining mirrors of the successive stages in a series;

FIG. 28 is a schematic diagram showing similarly orientated defined mirrors;

FIG. 29 is a schematic diagram illustrating the definitions of several terms used in the description;

FIG. 30 is a schematic diagram showing the output beam from an axially symmetric embodiment of the apparatus;

FIG. 31 is a schematic diagram showing multiple final stages in parallel to each other;

FIG. 32 is a schematic diagram showing the geometry associated with the diffraction effects of an arrangement analogous to the apparatus;

FIGS. 33, 34 and 35 comprise three schematic diagrams showing examples of different positions of the output beam from an axially symmetric embodiment of the apparatus;

FIG. 36 comprises a pair of graphs of the intensity across one edge of the reflected plane wave due to the $E_z$ and $H_z$ fields respectively after removal of the incident plane wave for a single semi-infinite plate;

FIG. 37 is similar to FIG. 36 but for one quarter of the range;

FIG. 38 comprises a similar pair of graphs to those in FIG. 36 but for two semi-infinite plates orientated as shown in FIG. 32 and with the reflected plane wave removed for the plate on the right;

FIG. 39 is similar to FIG. 38 but for half the distance between the edges of the plates;

FIGS. 40 and 41 are similar to FIG. 38 and demonstate how the edge of the output beam may be made sharper;

FIGS. 42 and 43 are similar to FIG. 36 but at radar instead of optical frequencies and demonstrate the effect of different grazing angles at radar frequencies;

FIG. 44 is similar to FIG. 36 but has a different grazing angle to demonstrate the lack of effect of different grazing angles at optical frequencies;

FIG. 45 is a sectional front elevation of a twenty-fifth embodiment of the apparatus;

FIG. 46 is a sectional end elevation of the twenty-fifth embodiment of the apparatus;

FIG. 47 is an enlarged section of a leg of the fixed tripod;

FIG. 48 is a cutaway view in schematic form of an axial drive unit, a transverse drive unit, and a leg of a moving tripod together with mountings for the units for use in the twenty-fifth embodiment of the apparatus;

FIG. 49 shows an end elevation in schematic form of a screw shaft, a nut, a flange and that leg of the moving tripod together with the bearings at its two ends;

FIG. 50 is similar to FIG. 48 but shows only that leg of the moving tripod together with the bearings at its two ends and the nearby leg of the fixed tripod;

FIG. 51 shows a section of that leg of the moving tripod and the nearby leg of the fixed tripod;

FIG. 52 shows a detailed end elevation from the opposite direction to that of FIG. 46 of a third stage defined mirror which forms part of the twenty-fifth embodiment of the apparatus;

FIGS. 53 through 59 are schematic diagrams showing various positions of the moving tripod and the third stage defined mirror;

FIG. 60 is a schematic diagram showing an example of the effect on a ray of an axial movement of the third stage defined mirror in the twenty-fifth embodiment;

FIG. 61 is a schematic diagram showing the effect of a particular rotation of the third stage defined mirror in a twenty-sixth embodiment on the way the electromagnetic energy is directed;

FIG. 62 is a schematic diagram showing the effect on an example ray of a transverse movement and/or distortion of third stage defined mirror in an twenty-seventh embodiment;

FIG. 63 is a schematic diagram showing part of a section of a twenty-eighth embodiment of the apparatus which has more than one source of electromagnetic energy;

FIG. 64 is a schematic diagram showing part of a section of a twenty-ninth embodiment of the apparatus able to sustain fusion;

FIGS. 65 to 73 comprise nine schematic diagrams showing various embodiments in which the source lies between the defining and defined surfaces of one or more stages;

FIG. 74 is a graph of the reflectivity of Aluminium at a wavelength of 0.2 $\mu$m;

FIG. 75 is a graph similar to that in FIG. 74 but for Aluminium coated with a layer of Magnesium Fluoride 0.026 $\mu$m thick;

FIG. 76 is a graph similar to that in FIG. 75 but with the coating 0.04 $\mu$m thick;

FIG. 77 is a graph similar to that in FIG. 75 but with the coating 0.1 $\mu$m thick;

FIG. 78 shows a convention for the positive directions of the electric vectors for the incident, reflected and refracted parts of a ray at the boundary of a layer;

FIG. 79 shows the effect of a layer of dielectric on the propagation of a plane wave;

FIGS. 80 to 82 show various stacks each comprising layers of dielectric on a substrate;

FIG. 83 is a section in schematic form of a mirror coated with a number of layers of dielectric which is varied along the axis of symmetry of that mirror;

FIG. 84 is a schematic diagram showing the electromagnetic energy from an axially symmetric embodiment of the apparatus passing through a plane at right angles to the axis of symmetry;

FIG. 85 is a schematic diagram showing an embodiment of the apparatus having a plurality of first stages in parallel;

FIG. 86 shows the effect on a set of well-directed rays of a rotation of a small portion of a defined mirror;

FIG. 87 is a section of a mirror which is made to move in order to replace a reflecting surface which is being evaporated away;

FIG. 88 is a section of a mirror perforated by holes through which a liquid metal is made to pass;

FIG. 89 is a schematic diagram illustrating the definition of specific intensity;

FIG. 90 is a further extract from FIG. 5A showing the relationship of various co-ordinates to each other;

FIG. 91 shows the differential geometry of an axially symmetric defined mirror;

FIG. 92 is a still further extract from FIG. 5A distorted to show more clearly how various co-ordinates are related to each other;

FIG. 93 is a schematic diagram showing the various axially symmetric defined surfaces whose gradient $\gamma_0$ is given by $\gamma_0 = b_0$ where $b_0$ is a constant;

FIG. 94 is a schematic diagram showing an axially symmetric defined surface whose gradient $\gamma_0$ is given by $\gamma_0 = \theta_0 + 2n\pi \pm \pi/2$;

FIG. 95 is a schematic diagram of an axially symmetric defined surface whose gradient $\gamma_0$ is given by $x_0 \cos \gamma_0 + y_0 \sin \gamma_0 = a_0$ or $r_0 \cos(\gamma_0 - \theta_0) = a_0$ where $a_0$ is a constant;

FIG. 96 is a schematic diagram showing the gradient $\gamma_0$ of an axially symmetric defined surface with $$\gamma_0 = \frac{2\gamma_2 - \beta_2 + 2\gamma_1 - \beta_1 - n\pi}{2}$$

when $n=-1$;

FIG. 97 is a schematic diagram showing an axially symmetric defining mirror comprising a portion of a hemisphere whose centre lies at the pole;

FIG. 98 is a schematic diagram showing the gradient $\gamma_0$ of an axially symmetric defined surface with $\gamma_0 \frac{1}{2} X_2 - \frac{1}{2} \pi$ and $0 \leq X_1 \leq \frac{1}{2}\pi$ when $X_2 = \theta_2 + \theta_1$ and $X_1 = \theta_2 - \theta_1$; and FIG. 99 is a schematic diagram showing an axially symmetric defining mirror having a section in a plane through the axis of symmetry which is a circle through the origin.

6.0 DESCRIPTION OF EMBODIMENTS OF THE INVENTION

6.1 First embodiment

Figure 1:
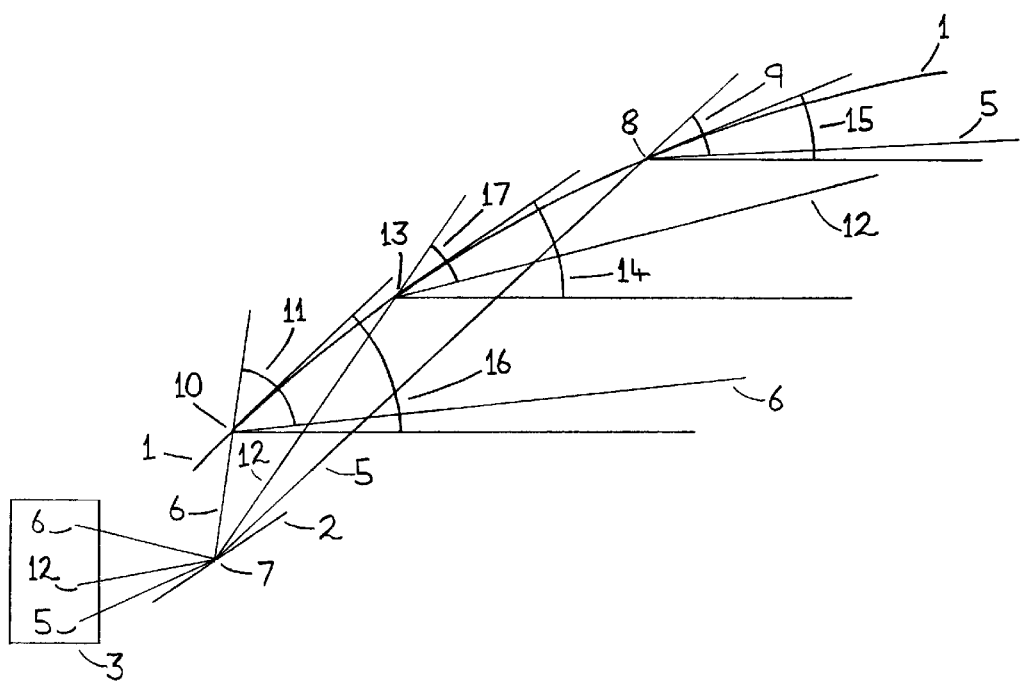
FIG. 1 is a schematic diagram of the first and fifth embodiments of an energy directing apparatus according to the present invention.

FIG. 1 shows the first embodiment in which both the defining and the defined surfaces are reflective. The arrangement in FIG. 1 includes a defining mirror 1, a defined mirror 2 and a source 3 of electromagnetic energy of one or more wavelengths comprising a volume of plasma.

A pair of defining rays 5 and 6 respectively emanate from different points within said source 3 and meet at a point of intersection 7 on said defined mirror 2. Each of said defining rays 5 and 6 is of a defining wavelength, $\lambda$.

Said first defining ray 5 is reflected from said defined mirror 2 and intersects said defining mirror 1 at a respective further point 8. Said first defining ray 5 is then reflected from said defining mirror 1 through a respective predetermined directed angle 9.

Said second defining ray 6 is reflected from said defined mirror 2 and intersects said defining mirror 1 at a respective further point 10. Said second defining ray 6 is then reflected

17 from said defining mirror through a respective predetermined directed angle 11. Both said defining rays 5 and 6 are incident to the same side of the defining mirror 1. The defined mirror 2 is optically nearer to any point in the source 3 than the defining mirror 1 along both defining rays 5 and 6.

There are two such defining rays 5 and 6 for every point on the defined mirror 2.

The directed angle 14 of a half-tangent to the defining mirror 1 which is co-planar with the two defining rays 5 and 6 and lies at any intermediate point 13 on the defining mirror 1 between the two respective further points 8 and 10 is intermediate between the directed angles 15 and 16 of two similarly orientated half-tangents which are co-planar with the two defining rays 5 and 6 and lie at the respective further points 8 and 10.

A further ray 12 of said defining wavelength λ emanates from said source 3 and passes through said point of intersection 7 and also any one of such intermediate points 13. Said further ray 12 is thus reflected at said point of intersection 7 from said defined mirror 2 in a plane containing both said defining rays 5 and 6 and in any path which is intermediate between those of said two defining rays 5 and 6 and intersects said defining mirror 1 at any one of such intermediate points 13 between said two respective further points 8 and 10.

Said further ray 12 is reflected at said intermediate point 13 from said defining mirror 1 through a directed angle 17 which is intermediate between said two respective predetermined directed angles 9 and 11. Said directed angle 17 may alternatively be approximately equal to either of said two respective predetermined directed angles 9 or 11.

6.2 Second embodiment

Figure 2:
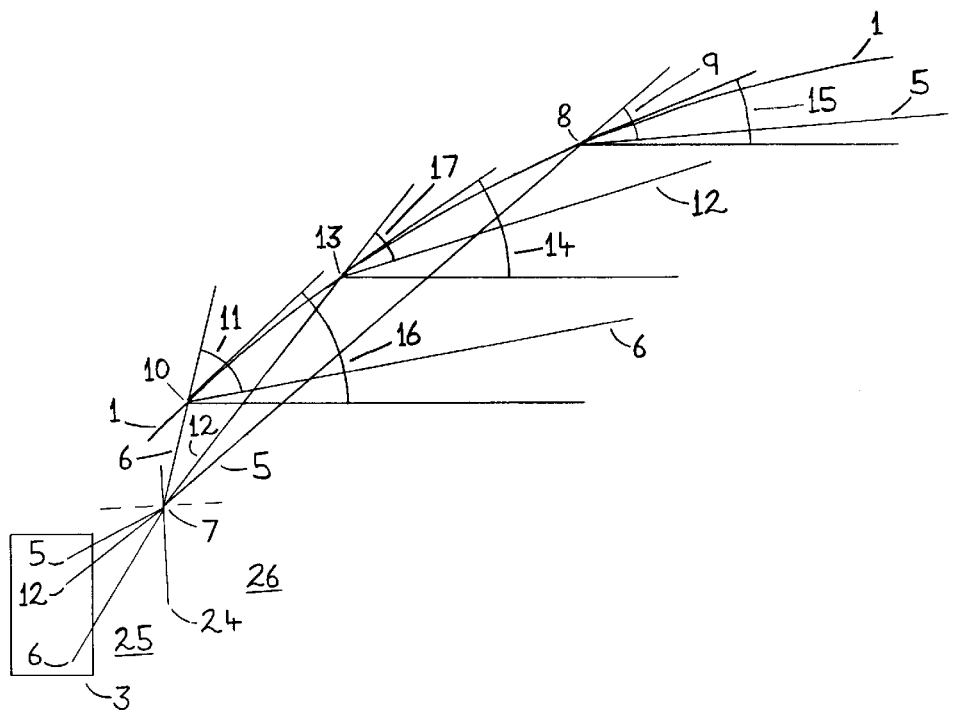
FIG. 2 is a schematic diagram of the second and sixth embodiments of an energy directing apparatus according to the present invention.

The second embodiment is shown in FIG. 2 in which the defined mirror 2 of the arrangement in FIG. 1 is replaced by a defined surface 24 between two transparent media 25 and 26 of different refractive indices so that said defining rays 5 and 6 and said further ray 12 are refracted at said surface 24. Moreover, said further ray 12 is reflected at said intermediate point 13 from said defining mirror 1 through a directed angle 17 which is approximately equal to said respective predetermined directed angle 9. Otherwise FIG. 2 is identical to FIG. 1.

Said directed angle 17 may alternatively be intermediate between said two respective predetermined directed angles 9 and 11.

6.3 Third embodiment

Figure 3:
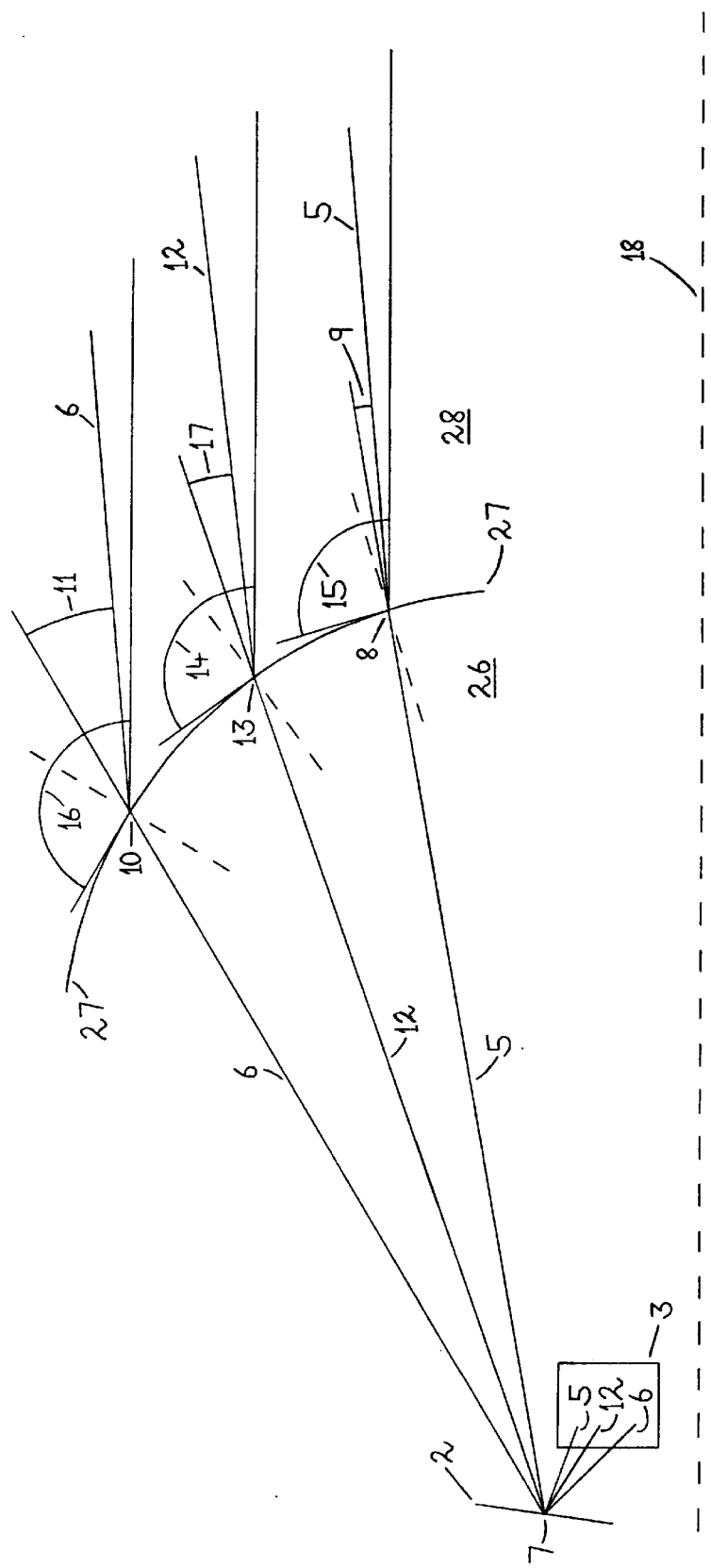
FIG. 3 is a schematic diagram of the third and seventh embodiments of an energy directing apparatus according to the present invention.

The third embodiment is shown in FIG. 3 in which the defining mirror 1 of the arrangement in FIG. 1 is replaced by a defining surface 27 between two transparent media 26 and 28 of different refractive indices so that said defining rays 5 and 6 and said further ray 12 are refracted at said surface 27. Otherwise the numbering of the elements in FIG. 3 is identical to that in FIG. 1.

6.4 Fourth embodiment

Figure 4:
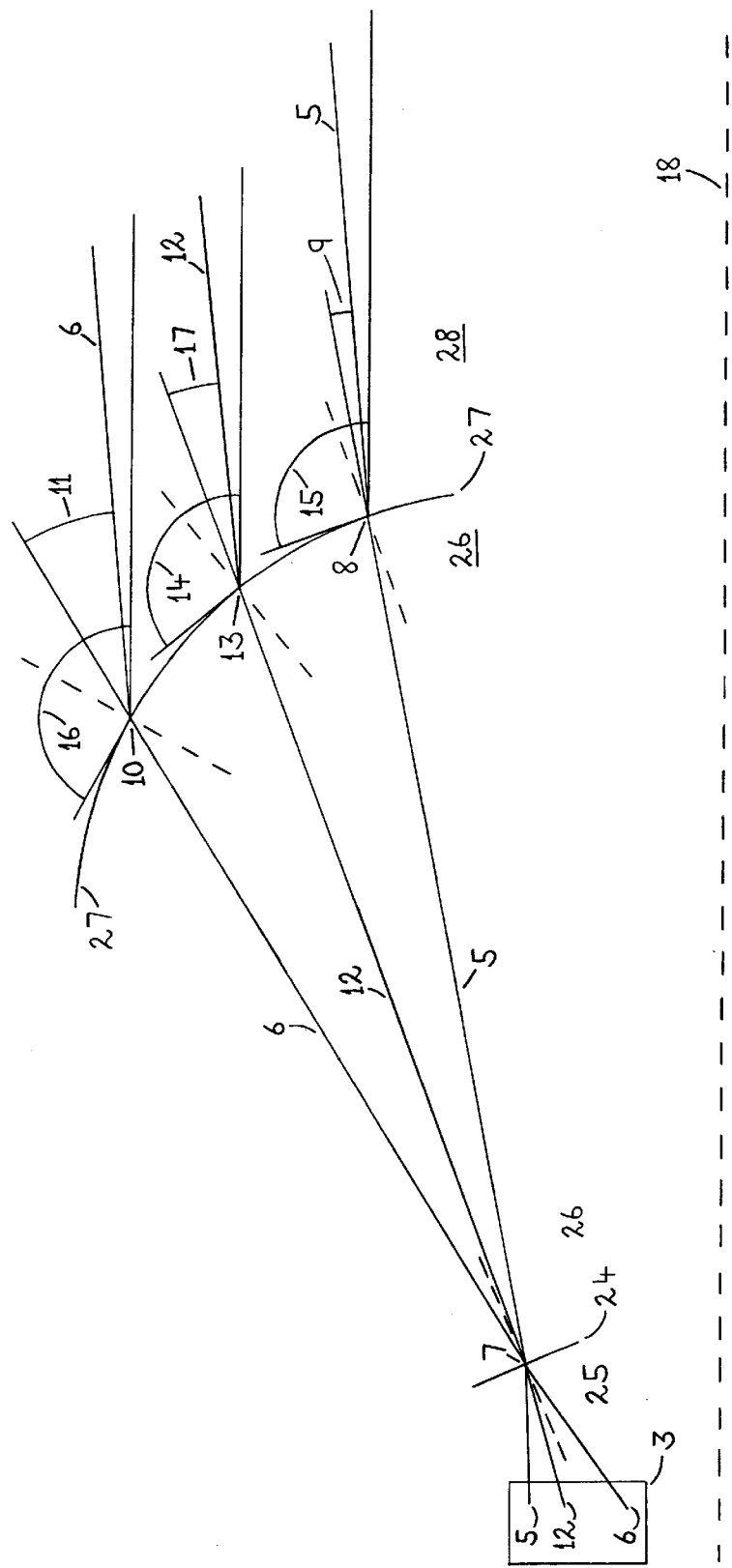
FIG. 4 is a schematic diagram of the fourth and eighth embodiments of an energy directing apparatus according to the present invention.

The fourth embodiment is shown in FIG. 4 in which the defined mirror 2 of the arrangement in FIG. 1 is replaced by a defined surface 24 between two transparent media 25 and 26 of different refractive indices and the defining mirror 1 of the arrangement in FIG. 1 is replaced by a defining surface 27 between the transparent medium 26 and a transparent medium 28 of a different refractive index to that of the transparent medium 26 so that said defining rays 5 and 6 and said further ray 12 are refracted at both said surfaces 24 and 27. Otherwise the numbering of the elements in FIG. 4 is identical to that in FIG. 1.

6.5 Fifth to eighth embodiments

In a fifth embodiment of the apparatus to which FIG. 1 may be applied there is an axis of symmetry 18 and said defining mirror 1 and said defined mirror 2 are formed by rotation about said axis of symmetry 18.

In a sixth embodiment of the apparatus to which FIG. 2 may be applied there is an axis of symmetry 18 and said defining mirror 1 and said defined surface 24 are formed by rotation about said axis of symmetry 18.

In a seventh embodiment of the apparatus to which FIG. 3 may be applied there is an axis of symmetry 18 and said defining surface 27 and said defined mirror 2 are formed by rotation about said axis of symmetry 18.

In a eighth embodiment of the apparatus to which FIG. 4 may be applied there is an axis of symmetry 18 and said defining surface 27 and said defined surface 24 are formed by rotation about said axis of symmetry 18.

The source 3 may be formed by rotation about the axis of symmetry 18 in any of said embodiments.

6.6 Ninth and tenth embodiments

FIG. 5 is applicable to the ninth and tenth preferred embodiments in which there is an axis of symmetry 18 such that the defining mirror 1 shown in FIG. 5A and either the reflective defined surface 2 shown in FIG. 5B or the refractive defined surface 24 shown in FIG. 5C are formed by rotation about said axis of symmetry 18. The source 3 may also be formed by rotation about the axis of symmetry. A line 20 parallel to or coincident with said axis of symmetry 18 is the initial line in a system of two dimensional polar co-ordinates in a plane 19 through said axis of symmetry 18 and the positive half of the x-axis in a system of two dimensional cartesian co-ordinates in said plane 19. All said surfaces are shown as their line of intersection with said plane 19 and all the half-tangents to those surfaces lie in said plane 19. Said plane 19 is the plane of the paper.

A point on said defining mirror 1 has polar co-ordinates $r,\theta$, gradient $\gamma$ and cartesian co-ordinates $x,y$ while a point on said reflective defined surface 2 or said refractive defined surface 24 has polar co-ordinates $r_0,\theta 0$, gradient $\gamma_0$ and cartesian co-ordinates $x_0,y_0$.

6.7 Thirteenth and fourteenth embodiments

FIG. 5 is also applicable to the thirteenth and fourteenth preferred embodiments. Each pair of defining rays 5 and 6 whose intersection specifies a point 7 on the reflective defined surface 2 or the refractive defined surface 24 lie entirely in said plane 19 through the axis of symmetry 18.

A further line 21 is parallel to said axis of symmetry 18 and begins at said point of intersection 7 of said pair of defining rays 5 and 6. Said further line 21 is the initial line in a further system of two dimensional polar co-ordinates in said plane 19.

A point on said defining mirror 1 has further polar co-ordinates $p,\delta$.

Said respective further point 8 for said first defining ray 5 has polar co-ordinates $r_1,\theta_1$, further polar co-ordinates $p_1,\delta_1$, and the gradient of said defining mirror 1 at said respective further point 8 is $\gamma_1$.

Said respective further point 10 for said second defining ray 6 has polar co-ordinates $r_2,\theta_2$, further polar co-ordinates $p_2,\delta_2$, and the gradient of said defining mirror 1 at said respective further point 10 is $\gamma_2$.

Said first defining ray 5 is reflected from said defining mirror 1 at an output angle 22 to the positive half of the x-axis 20 which is represented by $\beta_1$. Said second defining ray 6 is reflected from said defining mirror 1 at an output angle 23 to the positive half of the x-axis 20 which is represented by $\beta_2$.

6.8 Eleventh and twelfth embodiments

Figure 6A:
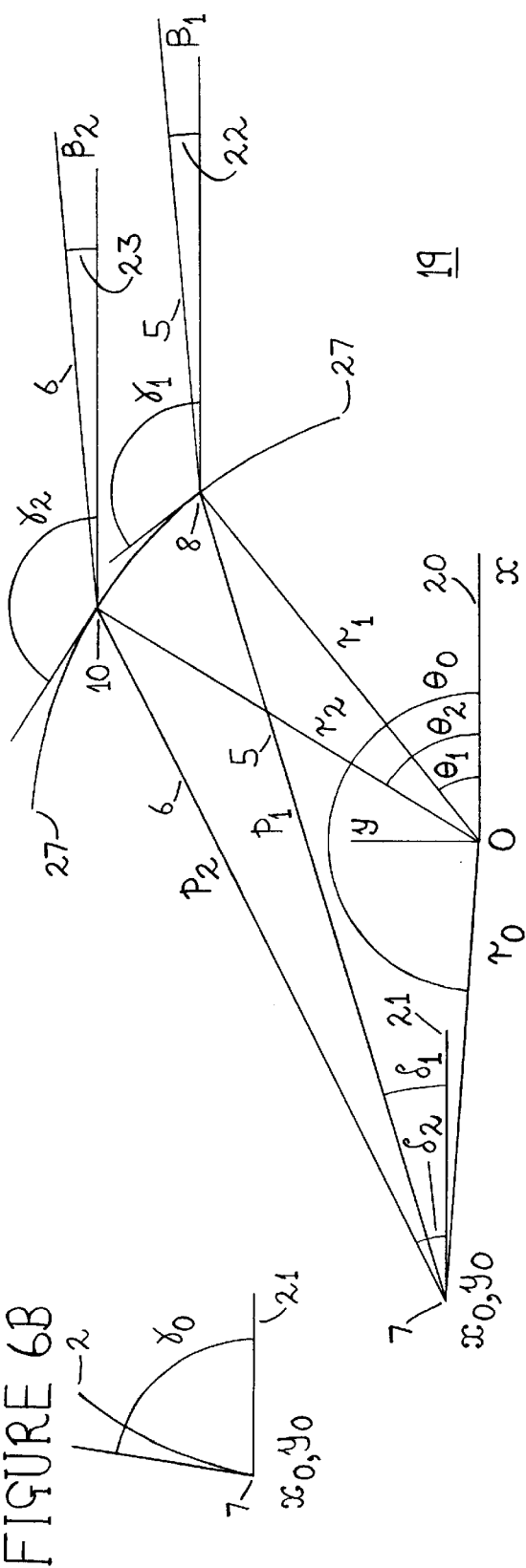
FIGS. 6A, 6B and 6C are a schematic diagram of the eleventh, twelfth, fifteenth and sixteenth embodiments showing the co-ordinate systems used to describe those embodiments and the representation of the angles therein.
Figure 6B:
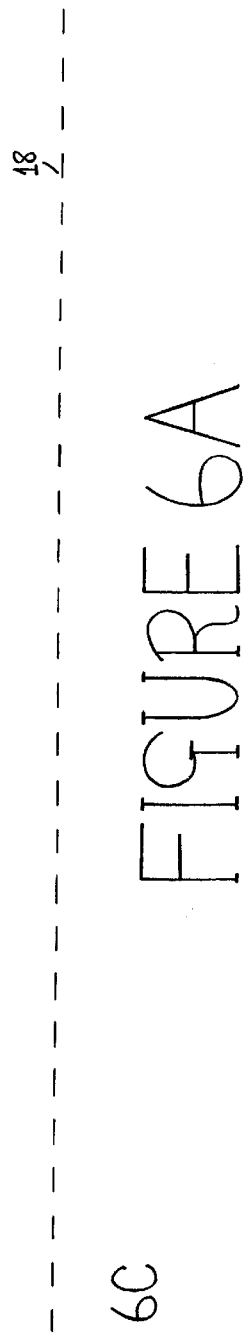
Figure 6C:
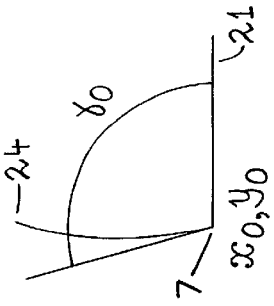

FIG. 6 is applicable to the eleventh and twelfth preferred embodiments in which there is an axis of symmetry 18 such that the defining surface 27 shown in FIG. 6A and either the reflective defined surface 2 shown in FIG. 6B or the refractive defined surface 24 shown in FIG. 6C are formed by rotation about said axis of symmetry 18. The source 3 may also be formed by rotation about the axis of symmetry. The polar and cartesian co-ordinate systems and the co-ordinates and gradients of the defined surfaces 2 and 24 in FIG. 6 are identical to those in FIG. 5. While a point on said defining surface 27 has polar co-ordinates r,θ, gradient γ and cartesian co-ordinates x,y.

6.9 Fifteenth and sixteenth embodiments

FIG. 6 is also applicable to the fifteenth and sixteenth preferred embodiments. Each pair of defining rays 5 and 6 whose intersection specifies a point 7 on the reflective defined surface 2 or the refractive defined surface 24 lie entirely in said plane 19 through the axis of symmetry 18. The further polar co-ordinate system and the co-ordinates of and the gradients at the respective further points 8 and 10 in FIG. 6 are identical to those in FIG. 5.

A point on said defining surface 27 has further polar co-ordinates p,δ. The gradient of said defining surface 27 at said respective further point 8 is $\gamma_1$ while that at said respective further point 10 is $\gamma_2$.

Said first defining ray 5 is refracted by said defining surface 27 at an output angle 22 to the positive half of the x-axis 20 which is represented by $\beta_1$. Said second defining ray 6 is refracted by said defining surface 27 at an output angle 23 to the positive half of the x-axis 20 which is represented by $\beta_2$.

6.10 Seventeenth and eighteenth embodiments

Figure 7:
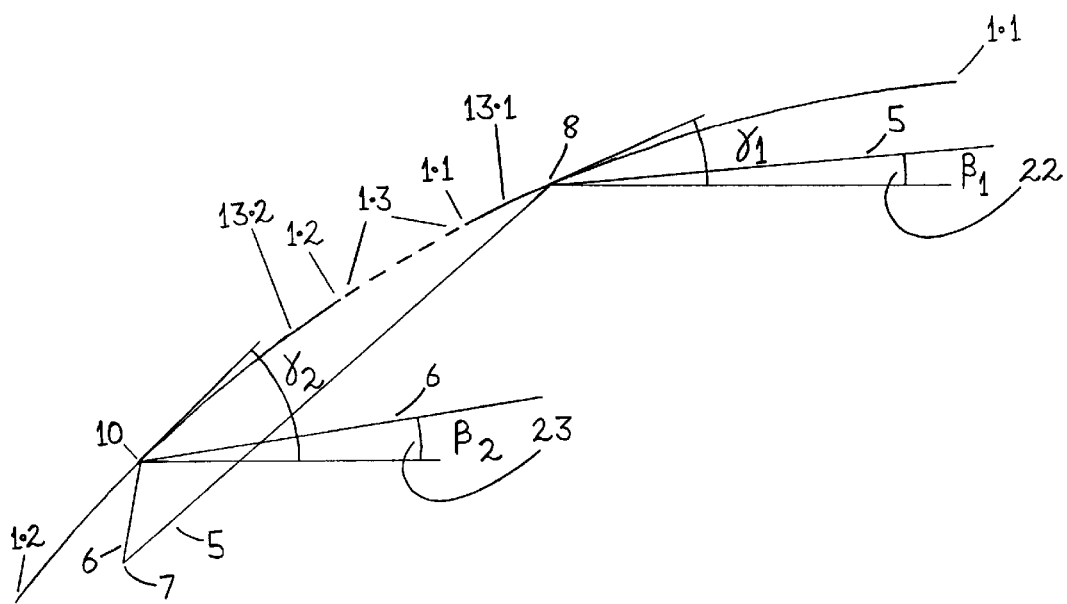
FIG. 7 is a schematic diagram of the seventeenth, eighteenth, twenty-first and twenty-second embodiments.

FIG. 7 is applicable to the seventeenth and eighteenth embodiments in which the defining mirror 1 of the arrangement in FIG. 5 is in the form of a first defining mirror 1.1 and a second defining mirror 1.2. Said first defining ray 5 is incident to said first defining mirror 1.1 while said second defining ray 6 is incident to said second defining mirror 1.2. Both said defining rays 5 and 6 are incident to similarly orientated sides of said defining mirrors 1.1 and 1.2. Said intermediate point 13 may lie on either of said defining mirrors 1.1 or 1.2 but in said plane 19 and between the pair of defining rays 5 and 6: for instance at either 13.1 or 13.2. So that said respective further point 8 for said first defining ray 5 lies on said first defining mirror 1.1 and the gradient of said first defining mirror 1.1 at said respective further point 8 is $\gamma_1$ while said first defining ray 5 is reflected from said first defining mirror 1.1 at an output angle 22 to the positive half of the x-axis 20 which is represented by $\theta_1$. And so that said respective further point 10 for said second defining ray 6 lies on said second defining mirror 1.2 and the gradient of said second defining mirror 1.2 at said respective further point 10 is $\gamma_2$ while said second defining ray 6 is reflected from said second defining mirror 1.2 at an output angle 23 to the positive half of the x-axis 20 which is represented by $\beta_1$.

6.11 Twenty-first and twenty-second embodiments

FIG. 7 is also applicable to the twenty-first and twenty-second embodiments in which an edge of the reflective surface of said first defining mirror 1.1 in said seventeenth or eighteenth embodiment is everywhere contiguous with an edge of the reflective surface of said second defining mirror 1.2 when the reflective surface of said first defining mirror 1.1 is extended by the dashed surface 1.3 to join up with the reflective surface of said second defining mirror 1.2.

6.12 Nineteenth and twentieth embodiments

Figure 8:
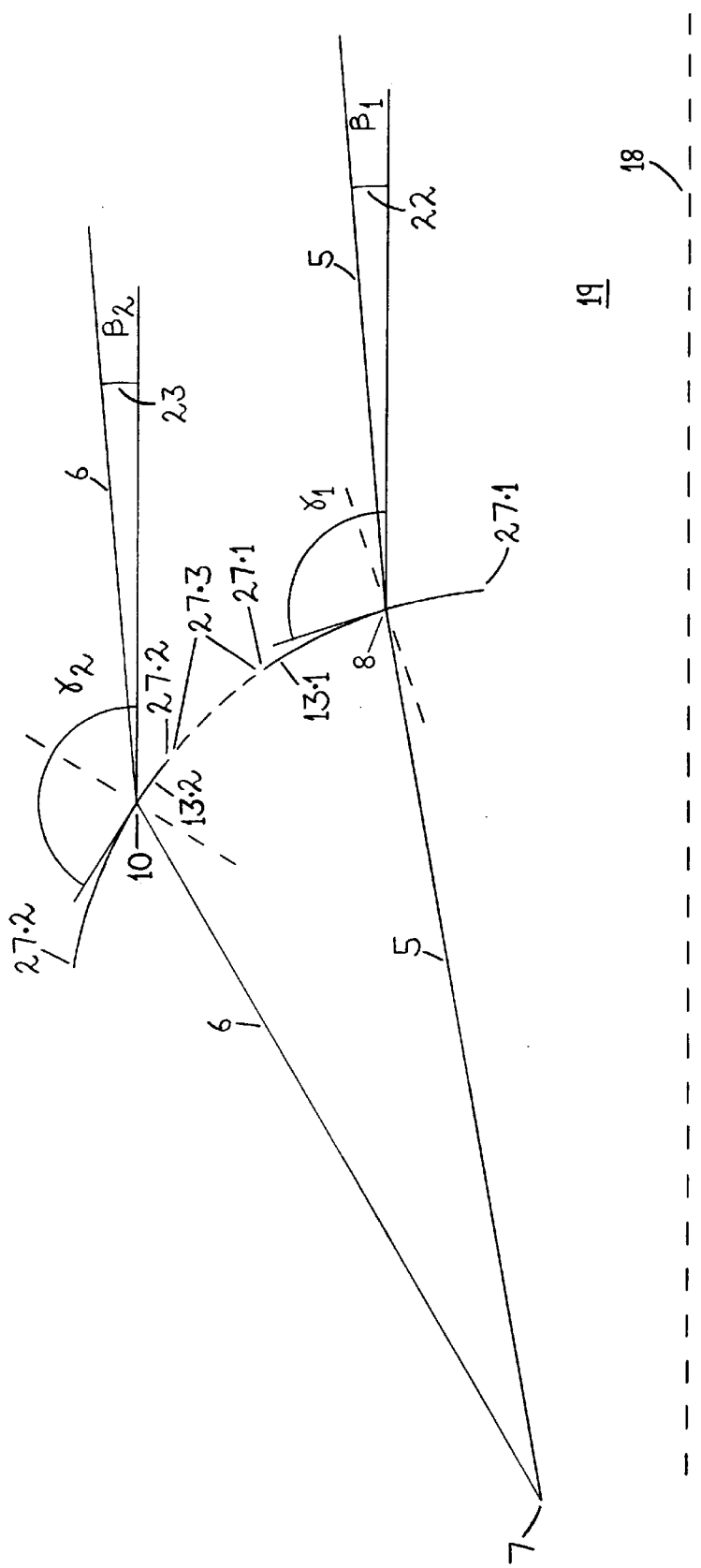
FIG. 8 is a schematic diagram of the nineteenth, twentieth, twenty-third and twenty-fourth embodiments.

FIG. 8 is applicable to the nineteenth and twentieth embodiments in which the defining surface 27 of the arrangement in FIG. 6 is in the form of a first defining surface 27.1 and a second defining surface 27.2. Said first defining ray 5 is incident to said first defining surface 27.1 while said second defining ray 6 is incident to said second defining surface 27.2. Both said defining rays 5 and 6 are incident to similarly orientated sides of said defining surfaces 27.1 and 27.2. Said intermediate point 13 may lie on either of said defining surfaces 27.1 or 27.2 but in said plane 19 and between the pair of defining rays 5 and 6: for instance at either 13.1 or 13.2. So that said respective further point 8 for said first defining ray 5 lies on said first defining surface 27.1 and the gradient of said first defining surface 27.1 at said respective further point 8 is $\gamma_1$ while said first defining ray 5 is refracted by said first defining surface 27.1 at an output angle 22 to the positive half of the x-axis 20 which is represented by $\beta_1$. And so that said respective further point 10 for said second defining ray 6 lies on said second defining surface 27.2 and the gradient of said second defining surface 27.2 at said respective further point 10 is $\gamma_2$ while said second defining ray 6 is refracted by said second defining surface 27.2 at an output angle 23 to the positive half of the x-axis which is represented by $\beta 2$.

6.13 Twenty-third and twenty-fourth embodiments

FIG. 8 is also applicable to the twenty-third and twenty-fourth embodiments in which an edge of said first defining surface 27.1 in said nineteenth or twentieth embodiments is everywhere contiguous with an edge of said second defining surface 27.2 when said first defining surface 27.1 is extended by the dashed refractive surface 27.3 to join up with said second defining surface 27.2.

6.14.0 Mathematics

6.14.1 Three dimensional co-ordinate systems

Figure 9:
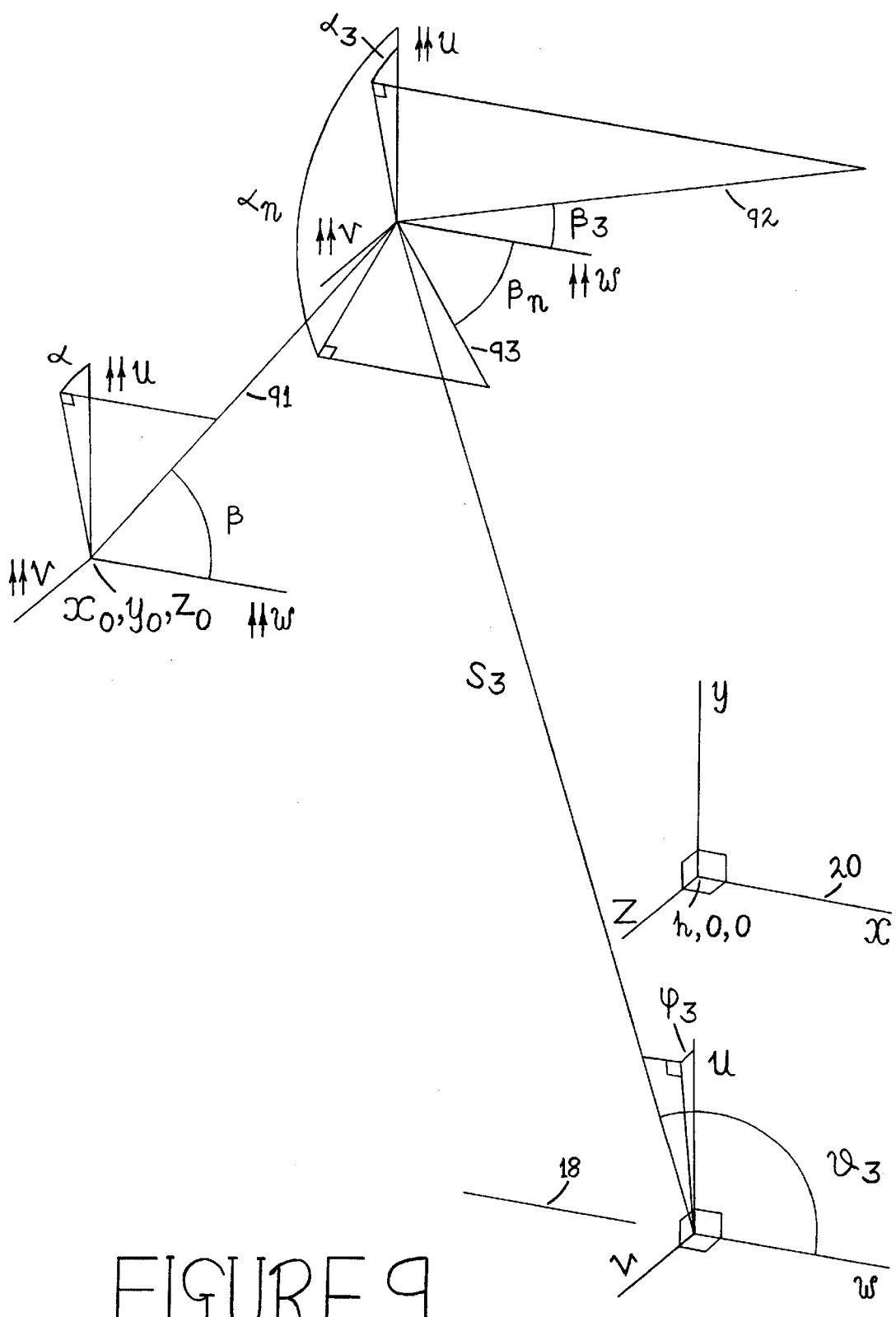
FIG. 9 is a diagram showing a three dimensional view of a ray and the co-ordinate systems used to describe it.

FIG. 9 includes a right-handed system of three dimensional cartesian co-ordinates u,v,w in which the w-axis is aligned with the axis of symmetry 18 and is thus either parallel to the x-axis as shown, or coincident with it; and the u-axis is aligned with the y-axis. It follows that the plane through the axis of symmetry in which the two dimensional cartesian co-ordinates x,y lie is the uw plane, and that for any given point x=w but y=u−h where h is the distance of the origin of the y-axis from the origin of the u-axis. The two-dimensional system of cartesian co-ordinates x,y is converted to a right-handed system of three-dimensional cartesian co-ordinates x,y,z by the addition of a z-axis. It follows that the z and v axes are parallel and that for any given point z=v.

FIG. 9 also includes a right-handed system of spherical polar co-ordinates s,v,φ in which the angle v is measured from the w-axis and the angle φ is measured from the u-axis and in the uv plane.

This choice of co-ordinate systems allows the two dimensional cartesian co-ordinates x,y together with the two dimensional polar co-ordinates r,θ to be used in their usual relationship for the specification of surfaces which are symmetric about the axis of symmetry 18; while at the same time enabling the angle between a ray and said axis to be a co-ordinate, which is advantageous as a distant target is usually along said axis.

6.14.2 Out-of-plane ray

FIG. 9 shows a ray 91 from a point $x_0,y_0,z_0$ on a defined mirror. This ray is not in the plane containing the paths of the two defining rays for the point $x_0,y_0,z_0$ between said point $x_0,y_0,z_0$ and the defining mirror(s) and will therefore be referred to hereinafter as an out-of-plane ray 91.

The out-of-plane ray 91 has a direction $\beta,\alpha$. It intersects the or one of the defining mirror(s) at a point $s_3,v_3,\phi_3$ and is reflected as 92 in an output direction $\beta_3,\alpha_3$. The normal 93 to the or one of the defining mirror(s) at the point $s_3,v_3,\phi_3$ has a direction $\beta_n,\alpha_n$.

The relation between the directions of the normal 93 and the incident and reflected rays 91 and 92 respectively in spherical polar co-ordinates is given by:

$$\cos\beta_3 = \cos\beta - 2\cos\epsilon\cos\beta_n$$

$$\sin\beta_3\sin\alpha_3 = \sin\beta\sin\alpha - 2\cos\epsilon\sin\beta_n\sin\alpha_n$$

$$\sin\beta_3\cos\alpha_3 = \sin\beta\cos\alpha - 2\cos\epsilon\sin\beta_n\cos\alpha_n$$

where $\epsilon$ is the angle between said incident ray 91 and said normal 93 given by:

$$\cos\epsilon = \cos\beta\cos\beta_n + \sin\beta\sin\beta_n\cos(\alpha-\alpha_n)$$

6.14.3 Utility of certain embodiments

In many embodiments of the apparatus, it is arranged that the defining rays reflected or refracted from a particular region of the defining surface(s) will have a common output direction, or similar output directions, and that the output directions of the further rays, and the other in and out-of-plane rays, reflected or refracted from that particular region will approximate to said output direction(s) of the defining rays.

No such approximation may be formulated for a general case as no information can be assumed in such a case either about the defining surface(s) for the purpose of finding the output directions of further rays, or about the output directions of the defining rays with which comparison must be made. Indeed, not only may the defining surface(s) and the defining rays be asymmetric but the output directions of a pair of defining rays may also not lie in any plane let alone one through a particular axis.

However, a simple approximation may be formulated and the utility of the apparatus may be demonstrated for an axially symmetric example thereof, and for an asymmetric variant of said axially symmetric example, using the above relation. Further details of these examples will be specified as the relevant mathematical description is introduced.

For any axially symmetric embodiment of the apparatus in which the output direction(s) of each pair of defining rays are not only symmetric to those of every other pair of defining rays but also lie in a respective plane through the axis of symmetry 18, the output direction of the out-of-plane ray from the point $x_0,y_0,z_0$ should be compared with the output direction(s) of the defining rays for said point $x_0,y_0,z_0$ when said defining rays are rotated around said axis of symmetry 18 into the plane through the point of intersection $s_3,v_3,\phi_3$ of said out-of-plane ray with the defining mirror(s). The axis of symmetry 18 is, of course, aligned with the w-axis as aforesaid.

For any asymmetric embodiment in which the output direction(s) of each pair of defining rays lie in a respective plane through the w-axis said comparison may be made after the output direction(s) of said defining rays are similarly rotated around the w-axis.

For both such embodiments, provided the range of values $0 \leq \beta_1 \leq 2\pi$ is allowed to $\beta_1$, the corresponding output direction for the first defining ray is $\beta_1,\phi_3$ irrespective of whether that ray diverges from or converges towards the w-axis.

So that the angle $\omega_1$ between the out-of-plane ray 92 and the corresponding output direction for the first defining ray is given by:

$$\begin{aligned}
\cos\omega_1 &= \cos\beta_3\cos\beta_1 + \sin\beta_3\sin\beta_1\cos(\alpha_3-\phi_3)\\
&= (\cos\beta - 2\cos\epsilon\cos\beta_n)\cos\beta_1 + \sin\beta_3\sin\beta_1(\cos\alpha_3\cos\phi_3 + \sin\alpha_3\sin\phi_3)\\
&= (\cos\beta - 2\cos\beta\cos^2\beta_n - 2\sin\beta\sin\beta_n\cos\beta_n\cos(\alpha-\alpha_n))\cos\beta_1 + ((\sin\beta\cos\alpha - 2\cos\epsilon\sin\beta_n\cos\alpha_n)\cos\phi_3 + (\sin\beta\sin\alpha - 2\cos\epsilon\sin\beta_n\sin\alpha_n)\sin\phi_3)\sin\beta_1\\
&= (-\cos\beta\cos2\beta_n - \sin\beta\sin2\beta_n\cos(\alpha-\alpha_n))\cos\beta_1 + (\sin\beta\cos(\phi_3-\alpha) - 2\cos\epsilon\sin\beta_n\cos(\phi_3-\alpha_n))\sin\beta_1\\
&= (-\cos\beta\cos2\beta_n - \sin\beta\sin2\beta_n\cos(\alpha-\alpha_n))\cos\beta_1 + (\sin\beta(\cos(\phi_3-\alpha_n)\cos(\alpha-\alpha_n) + \sin(\phi_3-\alpha_n)\sin(\alpha-\alpha_n)) - 2\cos\beta\sin\beta_n\cos\beta_n\cos(\phi_3-\alpha_n) - 2\sin\beta\sin^2\beta_n\cos(\phi_3-\alpha_n)\cos(\alpha-\alpha_n))\sin\beta_1\\
&= (-\cos\beta\cos2\beta_n - \sin\beta\sin2\beta_n\cos(\alpha-\alpha_n))\cos\beta_1 + (\sin\beta\cos2\beta_n\cos(\alpha-\alpha_n)\cos(\phi_3-\alpha_n) + \sin\beta\sin(\phi_3-\alpha_n)\sin(\alpha-\alpha_n) - \cos\beta\sin2\beta_n\cos(\phi_3-\alpha_n))\sin\beta_1\\
&= (-\cos\beta\cos2\beta_n - \sin\beta\sin2\beta_n\cos(\alpha-\alpha_n))\cos\beta_1 + (\sin\beta\cos2\beta_n\cos(\alpha-\alpha_n) - \cos\beta\sin2\beta_n)\sin\beta_1 + ((\cos(\phi_3-\alpha_n)-1)(\sin\beta\cos2\beta_n\cos(\alpha-\alpha_n) - \cos\beta\sin2\beta_n) + \sin\beta\sin(\phi_3-\alpha_n)\sin(\alpha-\alpha_n))\sin\beta_1
\end{aligned}$$

6.14.3.1 Output angles for in-plane rays

It will be appreciated that if an output ray from an axially symmetric embodiment of the apparatus lies in a plane through the axis of symmetry 18 then the point at which it is reflected (or refracted) from a defining surface, the normal at that point, and its incident ray must also lie in said plane. So that if the output directions of a pair of defining rays from an axially symmetric embodiment of the apparatus are specified as lying in a plane through the axis of symmetry 18 then both said defining rays must in fact lie entirely in that plane through said axis of symmetry.

FIG. 5 shows the axially symmetric thirteenth and fourteenth embodiments in which the pair of defining rays 5 and 6 lie entirely in a plane 19 through the axis of symmetry 18.

Figure 10:
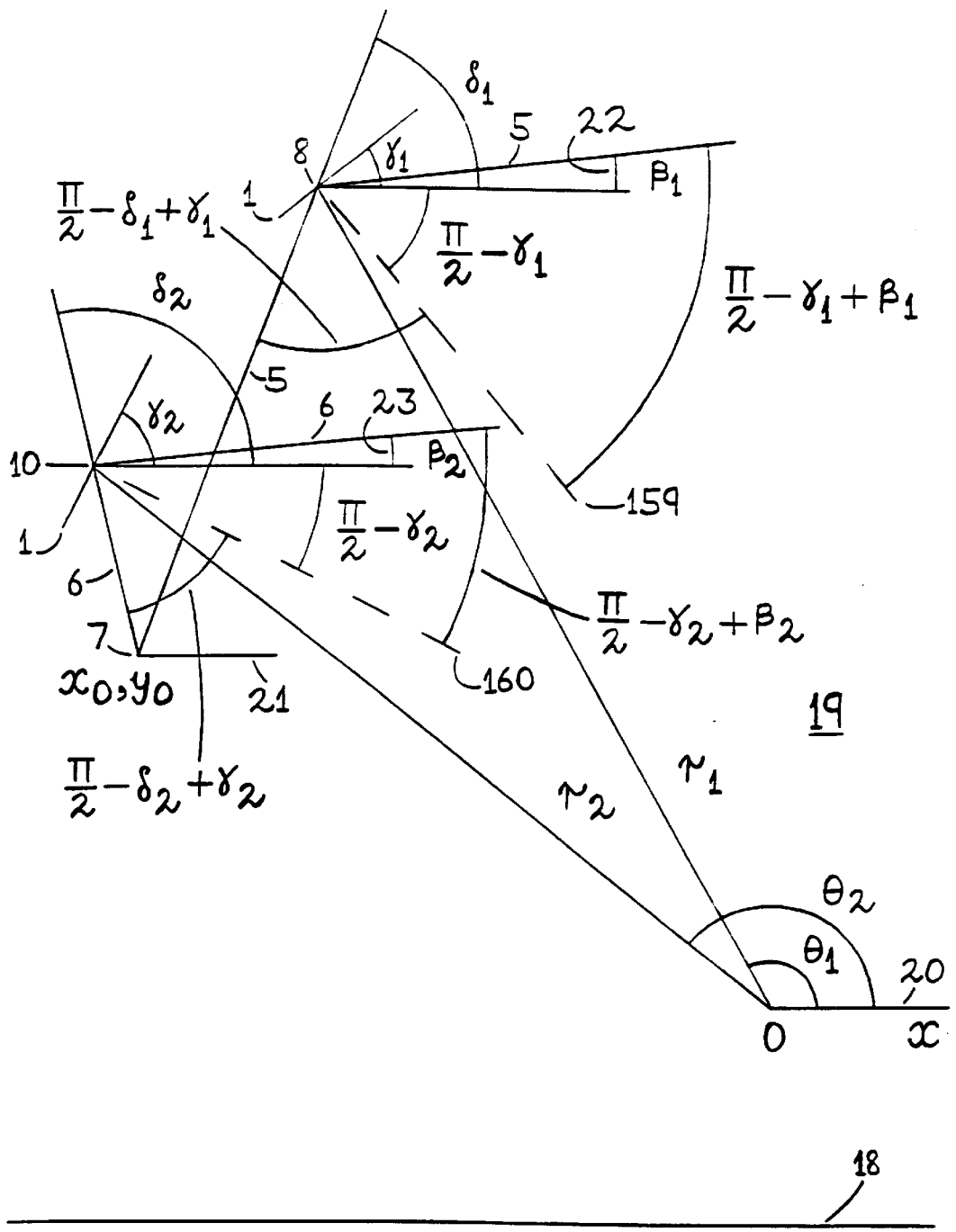
FIG. 10 is an extract from FIG. 5A distorted to show a geometric relationship more clearly.

FIG. 10 is an extract from FIG. 5A distorted to show more clearly how the further polar co-ordinate $\delta_1$ of the respective further point 8 for the first defining ray 5 is geometrically related to the gradient $\gamma_1$ of the defining mirror 1 at said respective further point 8 and $\beta_1$ the output angle 22 of said first defining ray 5 at said respective further point 8. A similar geometric relationship is also shown for the respective further point 10 and the second defining ray 6 with its output angle 23.

FIG. 10 also includes the normal 159 to the defining mirror 1 at the respective further point 8, and the normal 160 to the defining mirror 1 at the respective further point 10.

The angle of incidence between the first defining ray 5 and the normal 159 at the respective further point 8 is $\pi-\delta_1-(\pi/2-\gamma_1)$ while the angle of reflection between said first defining ray 5 and said normal 159 is $\pi/2-\gamma_1+\beta_1$. Since these two angles are equal $\beta_1=2\gamma_1-\delta_1$.

For other figures a similar procedure may yield $\beta_1=2\gamma_1-\delta_1+2n\pi$ where n is an integer. When $\beta_1$ is the argument of a trigonometric function, such multiples of $2\pi$ are of no consequence. As we may write $\beta_1=2(\gamma_1+n\pi)-\delta_1$ the relation $\beta_1=2\gamma'_1-\delta_1$ may be obtained for other purposes by making $\gamma'_1=\gamma_1+n\pi$. Moreover, the range of $\beta_1$ may be altered, for instance to $-\pi\leq\beta_1<\pi$ by making $\gamma'_1=\gamma_1+n\pi-\pi/2$. Similarly for $\beta_2$.

If the axis of symmetry 18 in FIGS. 5 and 10 is disregarded it will be seen that these results hold for that portion of an asymmetric embodiment in which the pair of defining rays lie entirely in a plane through the w-axis.

6.14.3.2 Necessary conditions that rays do not diverge

If some of the rays from a point of intersection of a pair of defining rays are incident to one side of a defining mirror while others of said rays are incident to the opposite side of said defining mirror then the two sets of rays must diverge from each other after reflection. Moreover, such a defining mirror cannot be both axially symmetric and concave to both sets of rays.

If the rays from a point of intersection of a pair of defining rays are incident to a surface which is not concave with respect to said point of intersection in every direction in the region of incidence then said rays must diverge from each other after reflection.

But the incidence of such rays to two defining mirrors which are not contiguous does not, of itself, imply that said rays must diverge from each other after reflection. And the incidence of such rays to a defining mirror whose gradient is discontinuous does not, of itself, imply that said rays must diverge from each other after reflection.

As even concave defining mirrors may cause further rays to diverge from each other, the condition for concavity is a necessary but not a sufficient condition that rays do not diverge from each other.

6.14.3.3 Condition for concavity

In an axially symmetric embodiment, any line of intersection of a defining mirror with a plane at right angles to the axis of symmetry 18 is a circle whose centre is a point in said plane and on said axis of symmetry 18. So that such a line of intersection is concave with respect to said point.

Figure 11:
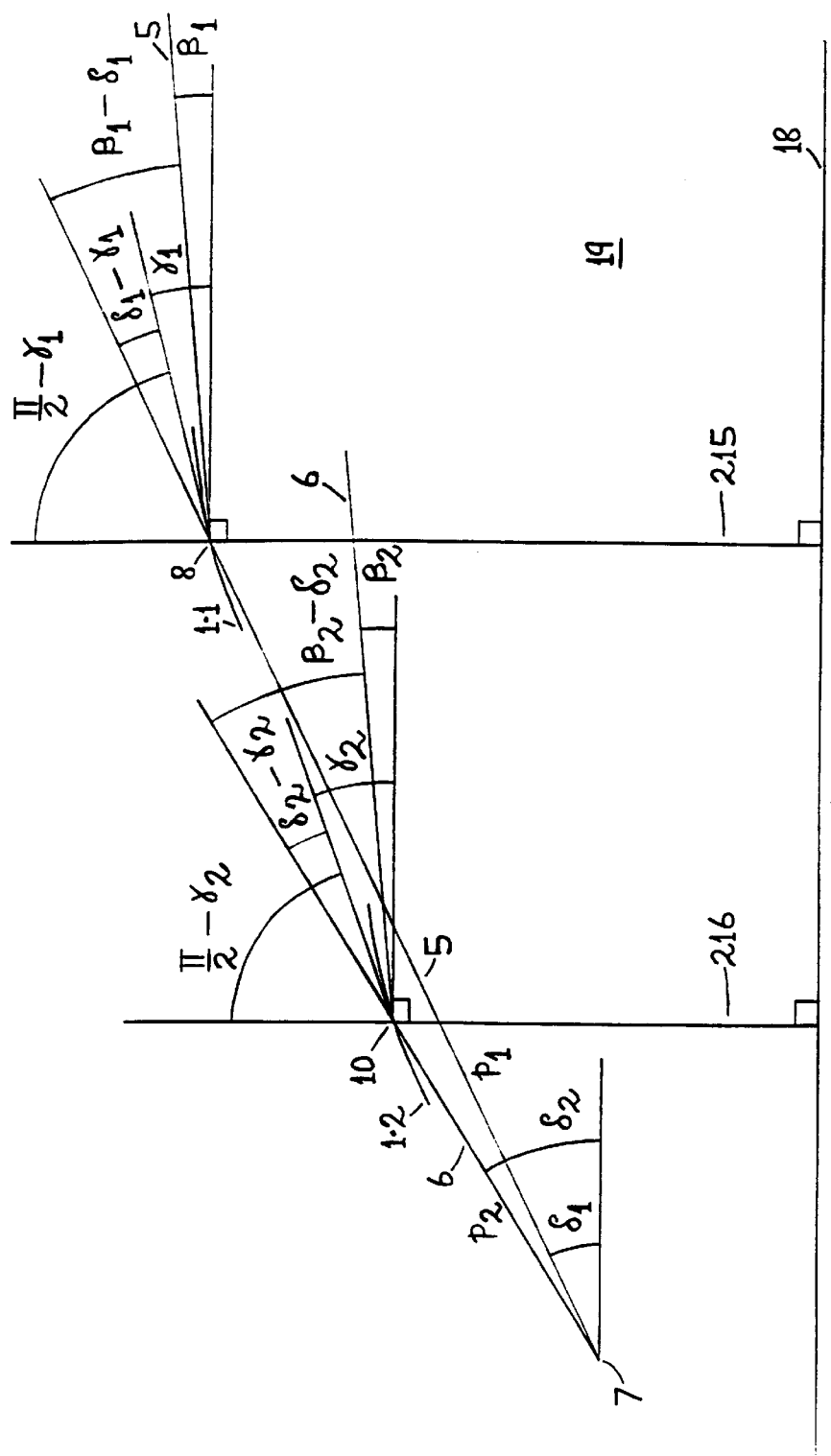
FIG. 11 shows a pair of defining rays which are incident to the same side(s) of the defining mirror(s) as any perpendicular from the axis of symmetry.

FIG. 11 shows a pair of defining rays 5 and 6 and their point of intersection 7. The first defining ray 5 is incident to a first defining mirror 1.1 at a respective further point 8. The second defining ray 6 is incident to a second defining mirror 1.2 at a respective further point 10. All the lines, points and angles in said figure lie in the plane 19 through the axis of symmetry 18. Said plane 19 is the plane of the paper. A perpendicular 215 from the axis of symmetry 18 meets the first defining mirror 1.1 at the respective further point 8 while a perpendicular 216 from the axis of symmetry 18 meets the second defining mirror 1.2 at the respective further point 10. It should be noted that $\beta_2-\delta_2<\beta_1-\delta_1$ in FIG. 11 as both those directed angles are negative.

Since each defining ray of a pair is incident to the same side of the defining mirror, or similarly orientated sides of the two defining mirrors, and the directed angle through which any further ray is reflected is intermediate between the two respective predetermined directed angles through which the defining rays are reflected or approximately equal to one of those directed angles, all the further rays are incident to the same side(s) of the defining mirror(s) as the pair of defining rays; as will now be shown.

The condition that all the ith in-plane rays are incident to one side of a defining mirror, or similarly orientated sides of the two defining mirrors, is $0<|\delta_i-\gamma_{i0}|^{2\pi}<\pi$ where $\gamma_i$ is a directed angle of the half-tangent associated with that side at the point of incidence of the ith in-plane ray to a defining mirror; while the condition that they are all incident to the other side(s) is $\pi<|\delta_i-\gamma_{i0}|^{2\pi}<2\pi$.

Suppose that $0<\delta_2-\gamma_2<\pi$ and $0<\delta_1-\gamma_1<\pi$ for the defining rays and similarly orientated half-tangents at the respective further points as shown in FIG. 11. If the intermediacy of the directed angles through which the defining and further rays are reflected is such that $\beta_2-\delta_2<\beta_3-\delta_3<\beta_1-\delta_1$ where $\beta_3$ is here the output angle for any further ray and the initial directed angle from which the $T\gamma_i$ are measured is chosen so that $\beta_i=2\gamma_i-\delta_i$ then:

$$2\gamma_2-2\delta_2<2\gamma_3-2\delta_3<2\gamma_1-2\delta_1$$

or $$\delta_2-\gamma_2>\delta_3-\gamma_3>\delta_1-\gamma_1$$

so that $$0<\delta_3-\gamma_3<\pi$$

Whereas if $\gamma_2-\delta_2>\beta_3-\delta_3>\beta_1-\delta_1$ then:

$$2\gamma_2-2\gamma_2>2\gamma_3-2\gamma_3>2\gamma_1-2\delta_1$$

or $$\delta_2-\gamma_2<\delta_3-\gamma_3<\delta_1-\gamma_1$$

so that $$0<\delta_3-\gamma_3<\pi$$

as before.

If the approximate equality of the directed angles through which one of the defining and some of the further rays are reflected is such that $\beta_2-\delta_2\approx\beta_3-\delta_3<\gamma_1\delta_1$ then:

$$2\gamma_2-2\delta_2\approx2\gamma_3-2\delta_3<2\gamma_1-2\delta_1$$

or $$\delta_2-\gamma_2\approx\delta_3-\gamma_3>\delta_1-\gamma_1$$

Since $\beta_3-\delta_3$ is, a priori, not significantly different from $\beta_2-\delta_2$:

$$0<\delta_3-\gamma_3<\pi$$

as before.

Whereas if $\beta_2-\delta_2<\beta_3-\delta_3\approx\beta_1-\delta_1$ then:

$$2\gamma_2-2\delta_2<2\gamma_3-2\delta_3\approx2\gamma_1-2\delta_1$$

or $$\delta_2-\gamma_2>\delta_3-\gamma_3\approx\delta_1-\gamma_1$$

Since $\beta_3-\delta_3$ is, a priori, not significantly different from $\beta_1-\delta_1$:

$$0<\delta_3-\gamma_3<\pi$$

as before.

If the approximate equality of the directed angles through which one of the defining and some of the further rays are reflected is such that $\beta_2-\delta_2\approx\beta_3-\delta_3>\beta_1-\delta_1$ then:

$$2\gamma_2-2\delta_2\approx2\gamma_3-2\delta_3>2\gamma_1-2\delta_1$$

or $$\delta_2-\gamma_2\approx\delta_3-\gamma_3<\delta_1-\gamma_1$$

Since $\beta_3-\delta_3$ is, a priori, not significantly different from $\beta_2-\delta_2$:

$$0<\delta_3-\gamma_3<\pi$$

as before.

Whereas if $\beta_2-\delta_2>\beta_3-\delta_3\approx\beta_1-\delta_1$ then:

$$2\gamma_2-2\delta_2>2\gamma_3-2\delta_3\approx2\gamma_1-2\delta_1$$

or $$\delta_2-\gamma_2<\delta_3-\gamma_3\approx\delta_1-\gamma_1$$

Since $\beta_3-\delta_3$ is, a priori, not significantly different from $\beta_1-\delta_1$:

$$0<\delta_3-\gamma_3<\pi$$

as before.

Hence the further rays are incident to the same side(s) of the defining mirror(s) as the pair of defining rays in all the above cases. Similarly if $\pi<\delta_2-\gamma_2<2\pi$ and $\pi<\delta_1-\gamma_1<2\pi$.

If the perpendiculars from the axis of symmetry to the respective further points are incident to the same side of the defining mirror, or similarly orientated sides of the two defining mirrors, then since the directed angle of the half-tangent to a defining mirror which is co-planar with the two defining rays and lies at any intermediate point on the defining mirror, or one of the defining mirrors, between the two respective further points is intermediate between the directed angles of two similarly orientated half-tangents which are co-planar with the two defining rays and lie at the respective further points, any perpendicular from the axis of symmetry to an intermediate point between the two respective further points is incident to said side of the defining mirror, or one of said sides of the defining mirrors, as the perpendiculars to said two respective further points; as will now be shown.

The condition that a perpendicular from the axis of symmetry is incident to the side of a defining mirror associated with the directed angle $\gamma_i$ of a half-tangent at the point of incidence of said perpendicular is $0<|\pi/2-\gamma_i|_0^{2\pi}<\pi$.

Suppose that $0<\pi/2-\gamma_2<\pi$ it and $0<\pi/2-\gamma_1<\pi$ it for similarly orientated half-tangents at the respective further points as shown in FIG. 11. If the intermediacy of the directed angles of the half-tangents is such that $\gamma_2>\gamma_3>\gamma_1$ then:

$$-\gamma_2>-\gamma_3>-\gamma_1$$

$$\pi/2-\gamma_2<\pi/2-\gamma_3<\pi/2-\gamma_1$$

so that $$0<\pi/2-\gamma_3<\pi$$

Whereas if $\gamma_2<\gamma_3<\gamma_1$ then:

$$-\gamma_2>-\gamma_3>-\gamma_1$$

$$\pi/2-\gamma_2>\pi/2-\gamma_3>\pi/2-\gamma_1$$

so that $$0<\pi/2-\gamma_3<\pi$$

as before.

Hence any perpendicular from the axis of symmetry to an intermediate point between the two respective further points is incident to the same side of the defining mirror, or one of the same sides of the defining mirrors, as the perpendiculars to said two respective further points. Moreover $-\pi/2<\gamma_3<\pi/2$.

If $0<\delta_2-\gamma_2<\pi$, $0<\gamma_1-\gamma_1<\pi$, $0<\pi/2-\gamma_2<\pi$ and $0<\pi/2-\gamma_1<\pi$ as shown in FIG. 11 then the pair of defining rays and therefore all the further rays from their point of intersection must be incident to the same side(s) of the defining mirror(s) as any perpendicular from the axis of symmetry and thus must be incident to the inside(s) of said defining mirror(s).

Figure 12:
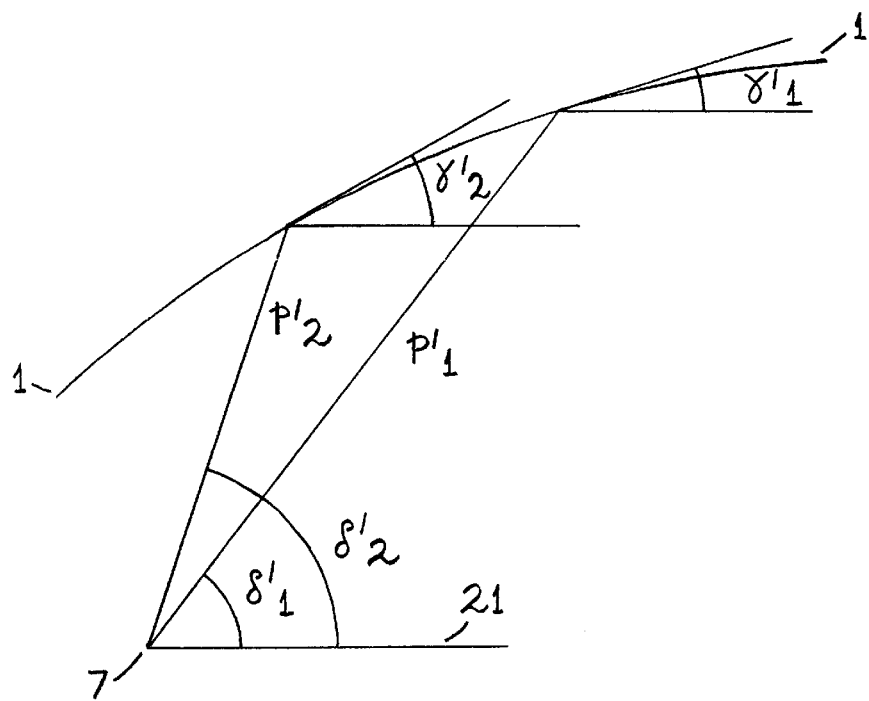
FIG. 12 illustrates a condition that the line of intersection of axially symmetric defining mirror(s) with a plane through the axis of symmetry is concave with respect to a point of intersection of a pair of defining rays.

FIG. 12 shows a point of intersection 7, the further line 21 beginning at said point of intersection 7, and the line of intersection of a defining mirror 1 with a plane 19 through the axis of symmetry 18.

If in an axially symmetric embodiment $\gamma'_1$ is the gradient of a defining mirror at a point whose further polar co-ordinates are $p'_1,\delta'_1$ and $\gamma'_2$ is the gradient of a defining mirror at a point whose further polar co-ordinates are $p'_2,\delta'_2$ and $\gamma'_2>\gamma'_1$ for all $\delta'_2>\delta'_1$ and for all $\delta'_1$ where for the purpose of said comparison $\gamma'_1,\gamma'_2$ are directed angles and there is at most a single value of $p'_1$ for any value of $\delta'_1$ and at most a single value of $p'_2$ for any value of $\delta'_2$ as shown in FIG. 12 then the line of intersection of the defining mirror(s) with any plane through the axis of symmetry 18 is everywhere concave with respect to that point of intersection of a pair of defining rays which is the pole of said further polar co-ordinates. A single value of $p'_1$ for any value of $\delta'_1$ has been specified because a defining mirror which continues beyond the point at which an in-plane ray is tangent to it, so that in-plane rays become incident to its other side, will have two points with different values of $p'_1$ for a single value of $\delta'_1$ beyond such a point. Similarly for $p'_2$. It should be noted that this condition excludes $\gamma_2<\gamma_3<\gamma_1$.

If the defining mirror(s) are axially symmetric, a pair of defining rays and therefore all the further rays from their point of intersection are incident to the inside(s) of the defining mirror(s), and the line of intersection of the defining mirror(s) with any plane through the axis of symmetry 18 is everywhere concave with respect to said point of intersection of that pair of defining rays then the defining mirror(s) are concave with respect to said point of intersection of that pair of defining rays and have concave side(s) facing towards said axis of symmetry 18. It follows that all the in and out-of-plane rays from said point of intersection are incident to the same side(s) of the defining mirror(s) as the defining rays. The output directions of further rays reflected from a particular region of the defining mirror(s) can only approximate to the output direction(s) of the defining rays reflected from that particular region if this condition is true for every point on the defined mirror from which defining rays go to said particular region. And if this approximation does not hold for all the further rays it cannot hold for all the rays.

The condition for concavity may thus be stated for axially symmetric defining mirror(s) as follows. If all the defining rays are incident to the same side(s) of the defining mirror(s) as any perpendicular from the axis of symmetry; and for each point of intersection of a pair of defining rays $\gamma'_1$ is the gradient of a defining mirror at a point whose further polar co-ordinates are $p'_1,\delta'_1$ and $p'_1$ has at most a single value for any value of $\delta'_1$, $\gamma'_2$ is the gradient of a defining mirror at a point whose further polar co-ordinates are $p'_2,\delta'_2$ and $p'_2$ has at most a single value for any value of $\delta'_2$, and $\gamma'_2>\gamma'_1$ for all $\delta'_2>\delta'_1$ and for all $\delta'_1$ where for the purpose of said comparison $\gamma'_1,\gamma'_2$ are directed angles; then said defining mirror(s) are concave with respect to all the points of intersection of each pair of the defining rays.

6.14.3.4 Direction of normal in an axially symmetric embodiment

For an axially symmetric embodiment fulfilling the above condition in which the gradient of the defining mirror at $s_3,v_3,\phi_3$ is $\gamma_3$ where $-\pi/2<\gamma_3<\pi/2$ the normal for the out-of-plane ray lies on the concave inside of the defining mirror and has a direction $\gamma_3-\pi/2,\phi_3$ so that $\phi_3-\alpha_n=0$ giving:

$$\begin{aligned}\cos\omega_1 &= \cos\beta(-\cos(2\gamma_3-\pi)\cos\beta_1 - \sin(2\gamma_3-\pi)\sin\beta_1) + \\ &\quad \sin\beta(-\sin(2\gamma_3-\pi)\cos\beta_1 + \cos(2\gamma_3-\pi)\sin\beta_1)\cos(\alpha-\phi_3) \\ &= -\cos\beta\cos(2\gamma_3-\pi-\beta_1) - \sin\beta\sin(2\gamma_3-\pi-\beta_1)\cos(\alpha-\phi_3) \\ &= -\cos(\beta-(2\gamma_3-\pi-\beta_1)) + \\ &\quad \sin\beta\sin(2\gamma_3-\pi-\beta_1)(1-\cos(\alpha-\phi_3)) \\ &= \cos(\beta-2\gamma_3+\beta_1) - \sin\beta\sin(2\gamma_3-\beta_1)(1-\cos(\alpha-\phi_3))\end{aligned}$$

The same result is obtained if $\pi/2<\gamma_3<3\pi/2$ as the normal then has a direction $\gamma_3+\pi/2,\phi_3$.

6.14.3.5 Maximum value of $\omega_1$

In the absence of any specification of the defining mirror(s) and the defining rays it is impossible to find a maximum value of $\omega_1$ for any set of in and out-of-plane rays from the point $x_0,y_0,z_0$ enclosed by a given cone whose vertex is at said point $x_0,y_0,z_0$.

Clearly, however, an out-of-plane ray through said cone which diverges by the same angle from both the defining rays for the point $x_0,y_0,z_0$ would be a reasonably representative ray with which to estimate the maximum value of $\omega_1$. But it is simpler to choose $$\beta = \frac{\delta_2 + \delta_1}{2}$$

and vary $\alpha$ even though such an in or out-of-plane ray diverges by the same angle from both those defining rays only when it lies in the same plane as those defining rays.

6.14.3.5.1 Further ray in an axially symmetric embodiment

For a further ray from the point $x_0,y_0,z_0$ lying by definition in the same plane as the pair of defining rays for said point $x_0,y_0,z_0$ between the defined and defining surfaces, and thus in a plane through the axis of symmetry 18, $$\alpha = \phi_3 = \arctan \frac{z_0}{y_0 + h}$$

so that the expression for the angle $\omega_1$ for the axially symmetric embodiment, namely:

$$\cos\omega_1 = \cos(\beta - 2\gamma_3 + \beta_1) - \sin\beta\sin(2\gamma_3 - \beta_1)(1 - \cos(\alpha - \phi_3))$$
$$= \cos(\beta - 2\gamma_3 + \beta_1)$$

Now $\beta_1 = 2\gamma_1 - \delta_1$ and $\beta_2 = 2\gamma_2 - \delta_2$. So that for a representative further ray for which $$\beta = \frac{\delta_2 + \delta_1}{2} = \frac{2\gamma_2 - \beta_2 + 2\gamma_1 - \beta_1}{2} \; : -$$

$$\cos\omega_1 = \cos\left(\frac{2\gamma_2 - \beta_2 + 2\gamma_1 - \beta_1}{2} - 2\gamma_3 + \beta_1\right)$$

In the absence of any specification of the defining mirror(s) the only information available about the value of $\gamma_3$ is the inequality $\gamma_2 > \gamma_3 > \gamma_1$. We may, however, make the approximation $\gamma_3 \approx \frac{1}{2}(\gamma_2 + \gamma_1)$; so that the above expression becomes the approximation:

$$\cos\omega_1 \approx \cos\left(\gamma_2 + \gamma_1 - \frac{\beta_2}{2} - \frac{\beta_1}{2} - \gamma_2 - \gamma_1 + \beta_1\right)$$

$$\cos\omega_1 \approx \cos\frac{\beta_1 - \beta_2}{2}$$

When the output rays are to be collimated $\beta_1 = \beta_2 = 0$. When the output rays are to be directed in a predetermined direction $\beta_1 = \beta_2$ as in FIG. 11. When the output rays are to meet at a distant target $\beta_1$ and $\beta_2$ are small and very nearly equal. Even when the output rays are to be incident to a small but close target $\beta_1 \approx \beta_2$. In the latter case a similar expression may be found for $\cos\omega_2$. When the output angles are to be equal to a predetermined output angle $\beta$ to the x-axis $\beta_1 = \beta_2 = \beta$ as in FIG. 11 for every half-plane through the axis of symmetry 18.

If the output directions of the two defining rays of a pair are the same or similar then the angle between the further ray and the output direction for the first defining ray is approximately zero. Similarly for the second defining ray.

The above approximation may immediately be rewritten as:

$$\cos\omega_1 \approx \cos\left(\frac{\delta_2 - \delta_1}{2} - (\gamma_2 - \gamma_1)\right)$$

For defining mirror(s) for which $\gamma'_2 > \gamma'_1$ for all $\delta'_2 > \delta'_1$ and for all $\delta'_1$ then as the choice of $\delta_2 \to \delta_1$ so $\gamma_2 \to \gamma_1$ (provided there is no discontinuity in the value of $\gamma_2$ at $p_1,\delta_1$) and the approximation $\gamma_3 \approx \frac{1}{2}(\gamma_2 + \gamma_1)$ becomes more accurate. Thus, as the choice of $\delta_2 \to \delta_1$ so the angle $\omega_1 \to 0$ (and $\beta_2 \to \beta_1$). Moreover as $$\frac{\delta_2 - \delta_1}{2}$$

and $\gamma_2 - \gamma_1$ are both positive, it is clearly feasible to specify the defining mirror(s) in such a manner that as both $$\frac{\delta_2 - \delta_1}{2}$$

and $\gamma_2 \to \gamma_1$ are chosen to be smaller, their difference becomes very much smaller and they become very nearly equal; so that the approximation may be written $$|\omega_1| \ll \frac{\delta_2 - \delta_1}{2}.$$

Figure 13:
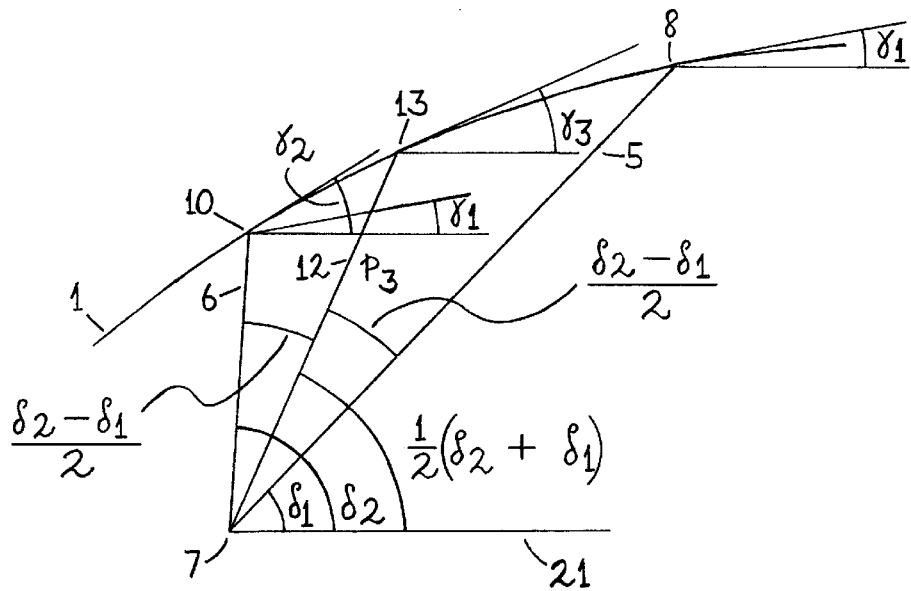
FIG. 13 shows defining mirror(s) with a particular gradient at the point of intersection of a further ray which bisects a pair of defining rays, together with a relationship involving said defining mirrors and said defining rays.
Figure 18:
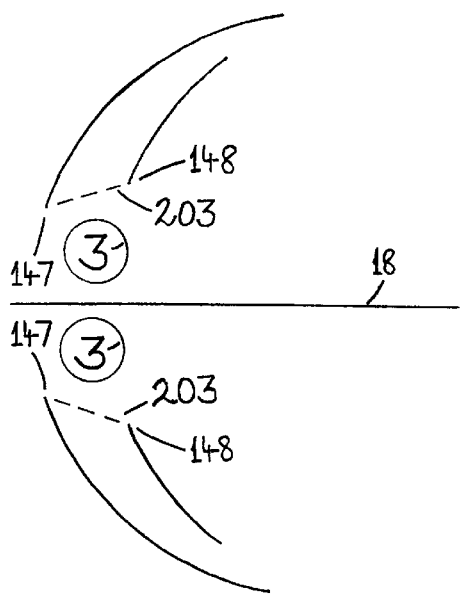
Figure 19:
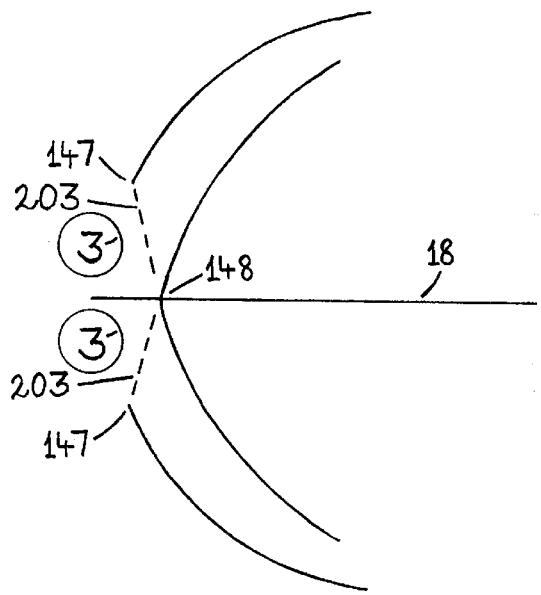
Figure 20:
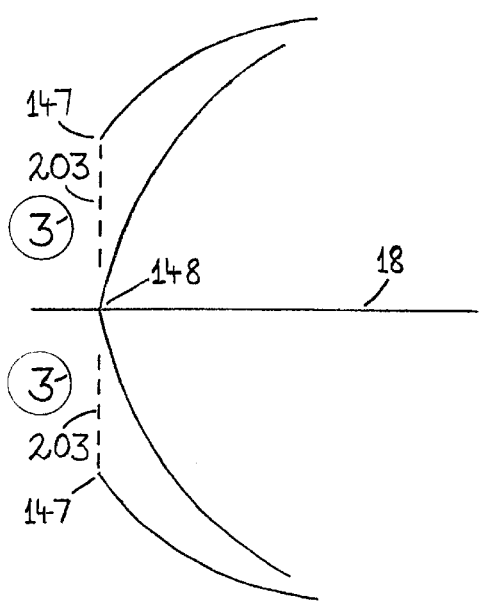

FIG. 13 shows a further ray 12 from the point of intersection 7 of a pair of defining rays 5 and 6 which is co-planar with said two defining rays by virtue of being a further ray and intersects a defining mirror 1 at an intermediate point 13 with further polar coordinates $p_3, \frac{1}{2}(\delta_2 + \delta_1)$. The gradient $\delta_3$ of the defining mirror 1 at the intermediate point 13 is approximately equal to $\frac{1}{2}(\delta_2 + \delta_1)$. All the lines in said figure lie in the plane 19 through the axis of symmetry 18. Said plane 19 is the plane of the paper. It will be seen that $$\frac{\delta_2 - \delta_1}{2} \approx \gamma_2 - \gamma_1$$

in said figure.

6.14.3.5.2 Out-of-plane ray

Consider a ray from the point of intersection $x_0,y_0,z_0$ of the two defining rays whose direction is $\beta, \alpha + \Delta\alpha$ where a is still equal to arctan $$\frac{z_0}{y_0 + h}$$

and the increment $\Delta\alpha$ is nonzero. Said ray lies outside the plane containing said two defining rays and is thus an out-of-plane ray.

6.14.3.5.2.1 Axially symmetric embodiment

For said axially symmetric embodiment in which $-\pi/2 < \gamma_3 + \Delta\gamma_3 < \pi/2$, the direction of the normal at the point of intersection of said out-of-plane ray with the defining mirror (s) is $\gamma_3 + \Delta\gamma_3 - \pi/2, \phi_3 + \Delta\phi_3$ where the increments $\Delta\alpha$ and $\Delta\phi_3$ have the same sign but different magnitudes (which are related to each other).

So that $\alpha + \Delta\alpha - (\phi_3 + \Delta\phi_3) \approx \alpha - \phi_3 = 0$ for small increments and the factor in the second term of the expression for the angle $\omega_1$ for said axially symmetric embodiment namely $1 - \cos(\alpha + \Delta\alpha - (\phi_3 + \Delta\phi_3)) \approx 0$.

Moreover of the other two factors in the second term, both $|\sin\beta| \leq 1$ and also $|\sin(2\gamma_3 + 2\Delta\gamma_3 - \beta_1)| \leq 1$.

Thus the second term in the expression for the angle $\omega_1$ for the axially symmetric embodiment has little effect for small changes in a on the approximation for the angle $\omega_1$.

For small increments $\Delta\alpha$ the point of intersection of the out-of-plane ray with the defining mirror(s) will be near the point of intersection of the above further ray with the defining mirror(s). Since the defining mirror(s) are axially symmetric, the gradient of all the points in a plane at right angles to the axis of symmetry 18 through the point of intersection of the out-of-plane ray with the defining mirror (s) are the same. So that $\gamma_2 > \gamma_3 + \Delta\gamma_3 > \gamma_1$ and the approximation $\gamma_3 + \Delta\gamma_3 \approx \frac{1}{2}(\gamma_2 + \gamma_1)$ may be made for small changes in $\alpha$.

Consider also the rays from the point $x_0, y_0, z_0$ lying within, or just outside, a circular cone having a half angle $$\frac{\delta_2 - \delta_1}{2}$$

whose axis of symmetry has a direction $\frac{1}{2}(\delta_2 + \delta_1)$, $\alpha$ where $\alpha$ is still equal to arctan $$\frac{z_0}{y_0 + h}.$$

If those rays are significantly angled from the w-axis so that their respective angles $\beta$ are significantly greater than zero but significantly less than $\pi$ then their respective increments $\Delta\alpha$, being constrained by said cone, are indeed small; and the maximum sizes of said respective increments $\Delta\alpha$ are dependent on the magnitude of $$\frac{\delta_2 - \delta_1}{2}.$$

If on the other hand those rays are not significantly angled from the w-axis, so that their respective angles $\beta$ are close to 0 or $\pi$, then another factor in said second term, $\sin \beta$, is close to zero so that said second term again has little effect. Moreover, the greatest possible change in $\alpha$ will not vary the point of intersection of the out-of-plane ray with the defining mirror(s) or the gradient at said intersection very much.

Since the second term in the expression for the angle $\omega_1$ for the axially symmetric embodiment has little effect on the approximation for the angle $\omega_1$ and $\gamma_2 > \gamma_3 + \Delta\gamma_3 > \gamma_1$ for small changes in $\alpha$+and since the maximum size of the increment $\Delta\alpha$ for $0 << \beta << \pi$ is dependent on the magnitude of $$\frac{\delta_2 - \delta_1}{2}$$

while if $\beta$ is close to 0 or $\pi$ then another factor in said second term, $\sin \beta$, is approximately equal to zero and $\gamma_3$ does not vary with $\alpha$ very much, then as the choice of $\delta_2 \to \delta_1$ the angle $\omega_1 \to 0$ for an out-of-plane ray; and, moreover, $$|\omega_1| << \frac{\delta_2 - \delta_1}{2}$$

for an out-of-plane ray if $$|\omega_1| << \frac{\delta_2 - \delta_1}{2}$$

for a further ray.

6.14.3.5.2.2 Asymmetric embodiment

For an asymmetric embodiment in which $\alpha_n$ is only approximately equal to $\phi_3$ a similar argument applies provided $\gamma_2 > \gamma_3 + \Delta\gamma_3 > \gamma_1$ for the out-of-plane ray despite the asymmetry, but subject to the further inaccuracy that $\cos(\phi_3 - \alpha_n) - 1$ and $\sin(\phi_3 - \alpha_n)$ and the terms containing them are not quite zero. Moreover, when the pair of defining rays does not lie entirely in a plane through the w-axis then the equalities $\beta_1 = 2\gamma_1 - \delta_1$ and $\beta_2 = 2\gamma_2 - \delta_2$ are no longer accurate.

6.14.4 Angular input and output apertures

Consider an axially symmetric embodiment in which the output direction(s) of each pair of defining rays lie in a respective plane through the axis of symmetry 18 so that both defining rays of a pair lie entirely in their respective plane through the axis of symmetry. It can be shown that for many defining mirrors the well-directed in and out-of-plane rays reflected from a point $x_0, y_0, z_0$ on a defined mirror lie within, or just outside, a circular cone having a half angle $$\frac{\delta_2 - \delta_1}{2}$$

whose vertex lies at said point $x_0, y_0, z_0$ and whose axis of symmetry has a direction $\frac{1}{2}(\delta_2 + \delta_1)$, $\alpha$ where $\alpha$ is equal to arctan $$\frac{z_0}{y_0 + h}.$$

For this reason, and because it is the angle between the pair of defining rays on incidence to the defined surface, $\delta_2 - \delta_1$ is defined as the angular input aperture for said point. As $\delta_2 > \delta_1$ in the figures and by convention so $\delta_2 - \delta_1 = 0$; as for instance in FIGS. 5, 6 and 13. But each such demonstration requires a specification of the defining mirror.

The angular output aperture for said point may be defined as the maximum of the angles between any two of the output rays for said point. It is positive so that it may be compared with the angular input aperture for said point.

For a pair of defining rays and a further ray passing through their point of intersection and also any intermediate point of the defining mirror(s) co-planar with the two defining rays and between the two respective further points at which the defining rays are reflected by the defining mirror, the angular output aperture of said three in-plane rays for said point is $\text{MAX}(|\beta_3 - \beta_1|, |\beta_3 - \beta_2|, |\beta_2 - \beta_1|)$ where the ranges of the output angles $\beta_i$ are $-\pi \leq \beta_i < \pi (i=1,2,3)$ and the initial directed angle from which the corresponding $\gamma_i$ are measured is chosen so that $\beta_i = 2\gamma_i - \delta_i$. It will now be shown that this angle is less than the angular input aperture for said point when the defining mirror(s) are concave with respect to the point of intersection of said pair of defining rays and the output angles of said pair of defining rays are the same or approximately the same.

If the defining mirror(s) are concave with respect to the point of intersection of said pair of the defining rays then $\gamma'_2 > \gamma'_1$ for all $\delta'_2 > \delta'_1$ where $\gamma'_2, \gamma'_1$ are directed angles (as opposed to $\gamma'_2 < \gamma'_1$).

Since the directed angle of a half-tangent to the or one of the defining mirror(s) which is co-planar with the two defining rays and lies at any intermediate point on the defining mirror(s) between the two respective further points is intermediate between the directed angles of two similarly orientated half-tangents which are co-planar with the two defining rays and lie at the respective further points and $\gamma'_2 > \gamma'_1$ for all $\delta'_2 > \delta'_1$:

$$\gamma_2 > \gamma_3 > \gamma_1$$

where $\gamma_2, \gamma_3, \gamma_1$ are directed angles.

As $\gamma_3 > \gamma_1$ so $2\gamma_3 - \delta_3 > 2\gamma_1 - \delta_3$ or $\beta_3 > 2\gamma_1 - \delta_3$. As $\delta_3 < \delta_2$ so $\beta_3 > 2\gamma_1 - \delta_2$ or $\beta_3 - \beta_1 > 2\gamma_1 \beta_1 - \delta_2$. Hence $\delta_2 - \delta_1 > \beta_1 - \beta_3$.

As $\gamma_2 > \gamma_2$ so $2\gamma_2 - \delta_3 > 2\gamma_3 - \delta_3$ or $2\gamma_2 - \delta_3 > \beta_3$. As $\delta_3 > \delta_1$ so $2\gamma_2 - \delta_1 > \beta_3$ or $2\gamma_2 - \beta_2 - \delta_1 > \beta_3 - \beta_2$. Hence $\beta_2 - \delta_1 > \beta_3 - \beta_2$.

As $\gamma_2 > \gamma_1$ so $2\gamma_2 - \delta_2 > 2\gamma_1 - \delta_2$ or $\beta_2 > 2\gamma_1 - \delta_2$. Hence $\beta_2 - \beta_1 > 2\gamma_1 \, ' \beta_1 - \delta_2$ or $\delta_2 - \delta_1 > \beta_1 - \beta_2$.

When the directed angle through which the further ray is reflected is intermediate between the two respective predetermined directed angles through which the defining rays are reflected:

Either $\beta_2 - \delta_2 < \beta_3 - \delta_3 < \beta_1 - \delta_1$ or $\beta_2 - \delta_2 > \beta_3 - \delta_3 > \beta_1 - \delta_1$ If the output angles of the defining rays are the same then $\beta_2 = \beta_1$ and $\beta_2 - \beta_2 < \beta_1 - \delta_1$ as $\delta_2 > \delta_1 \leq 0$. Hence:

$\beta_2 - \delta_2 < \beta_3 - \delta_3 < \beta_1 - \delta_1$

Clearly this relationship also holds for a range of values of $\beta_2$ and $\beta_1$ for which $\beta_2 \approx \beta_1$.

Thus $\delta_2 - \delta_3 > \beta_2 - \beta_3$. As $\delta_3 > \delta_1$ so $\delta_2 - \delta_1 > \beta_2 - \beta_3$.
Equally $\delta_3 - \delta_1 > \beta_3 - \beta_1$. As $\delta_3 < \delta_2$ so $\delta_2 - \delta_1 > \beta_3 - \beta_1$.
Also $\delta_2 - \delta_1 > \beta_2 - \beta_1$.

When the directed angle through which the further ray is reflected is approximately equal to one of the two respective predetermined directed angles through which the defining rays are reflected the inequality $\beta_2 - \delta_2 < \beta_1 - \delta_1$ is unchanged as either $\beta_2 = \beta_1$ or $\beta_2 \approx \beta_1$. So that the approximate equalities can only be:

Either $\beta_2 - \delta_2 \approx \beta_3 - \delta_3 < \beta_1 - \delta_1$ or $\beta_2 - \delta_2 < \beta_3 - \delta_3 \approx \beta_1 - \delta_1$ If $\beta_2 - \delta_2 \approx \beta_3 - \delta_3$ then $\delta_2 - \delta_3 \approx \beta_2 - \beta_3$. As $\delta_3 > \delta_1$ so $\delta_2 - \delta_1 > \beta_2 - \beta_3$. While the other two inequalities remain unchanged.

If $\beta_3 - \delta_3 \approx \beta_1 - \delta_1$ then $\delta_3 - \delta_1 \approx \beta_3 - \beta_1$. As $\delta_3 < \delta_2$ so $\delta_2 - \delta_1 > \beta_3 - \beta_1$. While the other two inequalities remain unchanged.

As $\delta_2 - \delta_1$ is greater than both $\pm(\beta_3 - \beta_1)$ so $\delta_2 - \delta_1 > |\beta_3 - \beta_1|$. As $\delta_2 - \delta_1$ is greater than both $\pm(\beta_3 - \beta_2)$ so $\delta_2 - \delta_1 > |\beta_3 - \beta_1|$. As $\delta_2 - \delta_1$ is greater than both $\pm(\beta_2 - \beta_1)$ so $\delta_2 - \delta_1 > |\beta_2 - \beta_1|$. Hence $\delta_2 - \delta_1 > \text{MAX}(|\beta_3 - \beta_1|, |\beta_3 - \beta_2|, |\beta_2 - \beta_1|)$ and the angular input aperture for said point is greater than the maximum of the output angles between the pair of defining rays and any further ray, and thus all further rays, through their point of intersection; and hence greater than the angular output aperture of the defining and further rays for said point.

6.14.4.1 Refractive case for an axially symmetric embodiment

Consider an axially symmetric embodiment in which the output direction(s) of each pair of defining rays lie in a respective plane through the axis of symmetry 18 so that both defining rays of a pair lie entirely in their respective plane through the axis of symmetry. If the intersection of a refractive defining surface with a plane through the axis of symmetry is a circle whose centre lies at the point of intersection of a pair of defining rays then all the in-plane rays from said point of intersection will pass through said surface along a normal and without any deviation. In which case, the angular output aperture of the defining and further rays for said point of intersection will be equal to the angular input aperture for said point.

Otherwise, however, the angular output aperture of the in-plane rays for said point of intersection may be made less than the angular input aperture for said point of intersection by a suitable choice of gradient for the defining surface together with a suitable choice of refractive indices for the incident and refractive mediums.

6.14.5 Multiple stages

The accuracy with which the rays are directed may be improved by the provision of multiple stages in which each stage includes one or two defining mirrors and their respective defined mirror, and in which the output from a stage forms the input to one or more successive stages which are each able to have smaller choices for the angular input aperture at the various points on their defined mirror. Said successive stages may be referred to as being in parallel to one another but in series to said stage. The improvement is considerable when the defining mirror(s) are specified so that $$|\omega_1| << \frac{\delta_2 - \delta_1}{2}.$$

It will be appreciated, however, that any of the stages may have a refractive surface instead of any of its reflective surfaces. And that each of the stages may have its own value(s) for the output angles of the defining rays.

An example of the utility of such multiple stages will now be given with reference to FIG. 5A and 5B when applied to the thirteenth embodiment.

Consider an axially symmetric embodiment of a stage of the apparatus which has a single defining mirror 1 which extends over a portion of a sphere. The x-axis is chosen to be coincident with the axis of symmetry it (so that h=0) while the origin is chosen to be the centre of said sphere and $r_1$ and $r_2$ are replaced by a constant, r. Since the tangent to a circle is at a right angle to its radius $\gamma_1 = \pi/2 - (\pi - \theta_1) = \theta_1 - \pi/2$. Similarly $\gamma_2 = \theta_2 - \pi/2$ and $\gamma_3 = \theta_3 - \pi/2$.

Finally, the output of the defining rays is collimated so that $\beta_1 = \beta_2 = 0$ and $\omega_1 = \beta_3$ for a further ray. Hence $\delta_1 = 2\gamma_1 - \beta_1 = 2\theta_1 - \pi$ while $\delta_2 = 2\gamma_2 - \beta_2 - 2\theta_2 - \pi$ so that the angular input aperture $\delta_2 - \delta_1 = 2\theta_2 - 2\theta_1$. Since the further ray 12 lies in the same plane through the axis of symmetry 18 as the two defining rays 5 and 6 respectively and its angles of incidence and reflection at the intermediate point 13 are equal $\beta_1 = 2\gamma_3 - \beta_3 = 2\theta_3 - \beta_3 - \pi$.

The gradients of the two defining rays 5 and 6 respectively and the further ray 12 between the point $x_0, y_0$ and the defining mirror 1 may be expressed:

$$\left( \frac{4\sin\frac{1}{2}X_1 \cos\frac{1}{2}X_1 \left( 2\cos^2\frac{1}{2}X_1 - 1 \right)}{\sin\frac{1}{2}X_1} \right)^{\frac{1}{3}} \sin\frac{1}{2}X_1 dX_1 =$$

$$-2^{\frac{2}{3}} \left( 2\cos^3\frac{1}{2}X_1 - \cos\frac{1}{2}X_1 \right)^{\frac{1}{3}} 2d\left( \cos\frac{1}{2}X_1 \right) =$$

$$2^{\frac{2}{3}} \left( \frac{1}{\cos^2\frac{1}{2}X_1} - 2 \right)^{\frac{1}{3}} 2\cos\frac{1}{2}X_1 d\left( \cos\frac{1}{2}X_1 \right)$$

Eliminating $x_0, y_0$ and r gives:

$$\tan\beta_3 = \frac{\sin 2(\theta_2 - \theta_1)\sin\theta_3 + \sin\theta_1 \sin 2(\theta_3 - \theta_2) - \sin\theta_2 \sin 2(\theta_3 - \theta_1)}{\sin 2(\theta_2 - \theta_1)\cos\theta_3 + \sin\theta_1 \cos 2(\theta_3 - \theta_2) - \sin\theta_2 \cos 2(\theta_3 - \theta_1)}$$

Putting $\gamma_3 = \frac{1}{2}(\gamma_2 + \gamma_1)$ so that $2\theta_3 = \theta_2 + \theta_1$ gives:

$$\tan\beta_3 = -\tan(\theta_2 - \theta_1)\tan\tfrac{3}{4}(\theta_2 - \theta_1)\tan\tfrac{1}{2} - (\theta_2 + \theta_1)$$

For $\theta_1 = 136°$ and $\theta_2 = 152°$, giving an angular input aperture appropriate to a first stage of $32°, \beta_3 \approx 2.54°$; whereas for $\theta_1=143.4°$ and $\theta_2=144.6°$, giving the angular input aperture appropriate to a second stage in series to said first stage of 2.4°, $\beta_3 \approx 0.0137°$. Thus an approximately 13.3 fold reduction in the angular input aperture produces an approximately 185.4 fold reduction in $\beta_3$.

The provision of a third stage with an angular input aperture of approximately 0.0137°, a further reduction in the angular input aperture of 175 fold, produces an even greater further reduction in $\beta_3$ to 0.00000043° for $\theta_1=145°$ or to 0.00000348° for $\theta_1=100°$. Although similar figures for out-of-plane rays and/or embodiments with greater first stage angular input apertures will be higher, they are generally less than those acceptable in many practical embodiments; so that it is rarely necessary to provide more than three stages in any series; or to restrict the choice of $\theta_1$ for the final stage in a series of stages. In any case, the accuracy with which the rays are directed may be improved as much as desired by the provision of sufficient further stages in any series.

6.15.0 Morphology

6.15.1 Factors affecting the size and shape of a multiple stage embodiment

In a practical embodiment, the size of the apparatus relative to that of the source must be adequate to accommodate sufficient stages for the desired accuracy of direction; the size of the apparatus relative to its desired maximum range must be adequate to limit such diffraction as may be produced by the apparatus; and the size of the apparatus relative to the power of the source must be adequate to keep the loading of the mirrors within acceptable levels. It is convenient for the shape of each defining mirror to be chosen at the same time as its size, thereby determining the gradient of that defining mirror. There is no reason to choose a discontinuous defining mirror or a discontinuous gradient for a defining mirror.

6.15.2 Leading and trailing edges

The identification of two edges of an axially symmetric mirror assists the explanation in succeeding sections. It will be appreciated that if an output ray from an axially symmetric embodiment of the apparatus lies in a plane through the axis of symmetry 18 then the point at which it is reflected (or refracted) from the defining surface of a final stage, the normal at that point and its incident ray must also lie in said plane. So that if each one of the output rays of a pair of defining rays from an axially symmetric embodiment of the apparatus is specified as lying in a respective plane through the axis of symmetry 18 then both said defining rays must in fact lie entirely in the same plane through that axis of symmetry, unless their point of intersection is on that axis of symmetry.

If the rays from an axially symmetric embodiment of the apparatus are directed substantially parallel to the axis of symmetry 18 either at a target in a plane at right angles to said axis of symmetry, or at a point target on said axis of symmetry which lies at a distance from the apparatus which is much greater than the diameter of the apparatus, and a mirror in said embodiment has two edges both of which are illuminated by well-directed rays and the rays from one of said two edges have a shorter path to said target than those from the other of said two edges, then that one of said two edges may be referred to as the trailing edge of said mirror while the other of said two edges may be referred to as the leading edge of said mirror. On this definition, if a mirror has a trailing edge then it has a leading edge.

If the defining mirror of a final stage has a trailing edge then said trailing edge must be closer to the target than its leading edge as the aforementioned rays must go straight from said defining mirror to said target without any deviation. But if the defining mirror of a stage other than a final stage has a trailing edge then that trailing edge will not be closer to said target than its leading edge if the output of the defining rays of said stage goes in the opposite direction to said target.

If a defined mirror has a trailing edge then said trailing edge need not be closer to the target than its leading edge even if said defined mirror is for a final stage as the aforementioned rays must be reflected or refracted by at least the defining surface of that final stage. The leading edge of a defined mirror is usually but not necessarily nearer to the axis of symmetry 18 than its trailing edge. For convenience, the terms leading and trailing edge will also be used loosely even when the conditions in their definition are not met, particularly when one or both of the two edges are not illuminated, or are illuminated by poorly directed rays.

6.15.3 Input aperture

FIGS. 14 to 23 are schematic diagrams showing various ways in which an edge of the defining mirror of the first stage, which is numbered 147 throughout said figures, together with an edge of the defined mirror of the first stage, which is numbered 148 throughout said figures, may (or may not) form an input aperture through which rays pass from the source 3. For an axially symmetric embodiment of the apparatus, each of said diagrams comprises a section through the axis of symmetry 18 and said edges will often be leading edges. In order to distinguish between the various edges of any particular mirror, the existence of leading and trailing edges will be assumed here. A target whose existence is necessary to the definition of leading and trailing edges is assumed to be at a great distance to the right in each of FIGS. 14 to 23. It will be seen that the leading edge 148 of the first stage defined mirror in an axially symmetric embodiment of the apparatus often comprises that edge of the input aperture with the smallest, or the equal smallest, radius measured at right angles from the axis of symmetry 18.

Such an input aperture may, inter alia, comprise an annulus as in FIG. 15; a portion of the surface of a cone as in FIGS. 14, 16, and also 18 in which, however, the leading edge 147 of the first stage defining mirror has a smaller radius than the leading edge 148 of the first stage defined mirror; or a portion of the surface of a cylinder as in FIG. 17. The leading edge 148 of the first stage defined mirror may even comprise a point so that such an input aperture may consist of the entire surface of a cone as in FIG. 19 or even a circle as in FIG. 20. The area enclosed between such leading edges will be referred to as the areal input aperture. It is numbered 203 in said figures.

Figure 21:
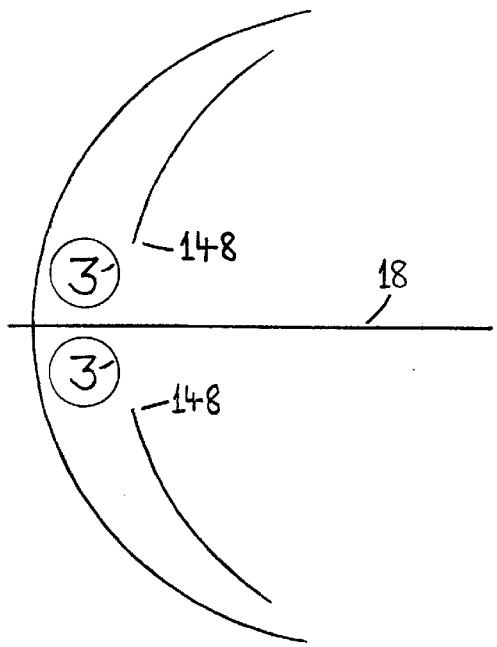
Figure 22:
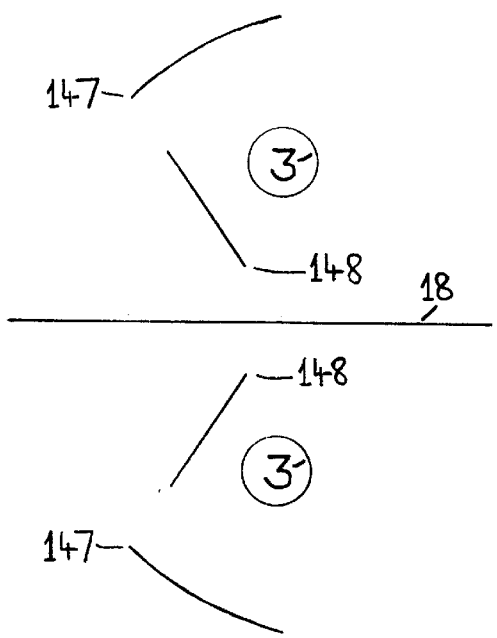
Figure 23:
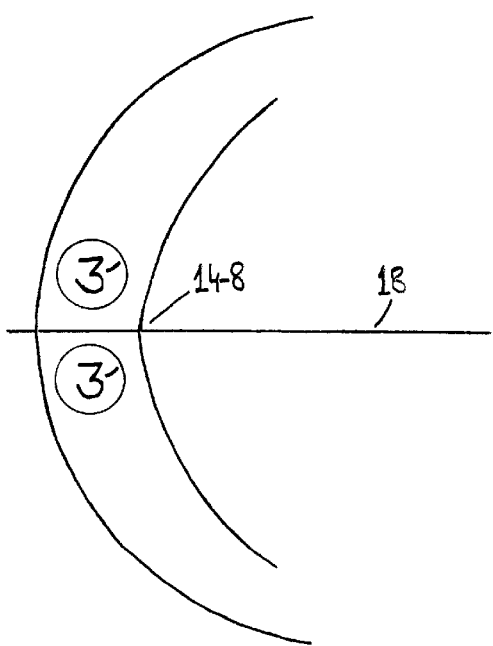

However, the first stage defining mirror may partially enclose the source as in FIG. 21; or the leading edges may not form an input aperture as in FIG. 22 in which there is no input aperture at all. Or both the first stage defining mirror and the first stage defined mirror may enclose the source as in FIG. 23.

Clearly the shape of such an input aperture may be chosen to fit the shape of the source or the means for generating said source. Equally, the nature of the source may affect the choice of input aperture. For instance, the source may be optically thin and need to be enclosed partially by one mirror as in FIG. 21 or wholly by two mirrors as in FIG. 23 in order to yield sufficient electromagnetic energy; or may emit rays only or preferentially in certain directions. Moreover, two or more sources may share an input aperture.

6.15.4 Output aperture

In an axially symmetric embodiment of the apparatus in which the electromagnetic energy is directed towards a distant target or targets, a trailing edge of the defining mirror of a final stage together with a trailing edge of the defined mirror of that final stage will usually form an output aperture comprising a portion of the surface of a cone, but may also form an annulus, or not form an output aperture at all. In all these cases, the trailing edge of a final defined mirror will have a smaller radius than the trailing edge of its respective defining mirror. Similarly for edges which are not trailing edges but form an output aperture.

In an axially symmetric embodiment of the apparatus in which the electromagnetic energy is directed towards a nearby target or targets, an edge of the defining mirror of a final stage together with an edge of a defined mirror of the final stage may in addition to the above also form an output aperture comprising a portion of the surface of a cylinder.

6.15.5 Collection of electromagnetic energy

The major objective in the design of many embodiments of the apparatus is to maximise the amount of electromagnetic energy which may be collected by the apparatus in a given time while limiting the angles $\omega_1$ and $\omega_2$ between the in and out-of-plane rays and the corresponding output directions for the defining rays for the last stage in each series of stages. Several factors affect said amount.

Said electromagnetic energy must pass through any input aperture which exists before it can be collected by a defined mirror. The rate of emission of electromagnetic energy by a source may vary both with the angle with which and the position oil or within the source from which it is emitted. So that the amount of electromagnetic energy passing through an input aperture in a given time is the sum of the amounts of electromagnetic energy emitted from the source in said given time over all those points on or within said source from which rays passing through said input aperture are emitted and over all the angles for which rays pass through said input aperture for each such point.

The amount of electromagnetic energy passing through the input aperture in a given time is not necessarily directly proportional to the areal input aperture; not only, however, because the rate of emission of electromagnetic energy by a source may vary with the angle with which and the position on or within the source from which it is emitted, and thus across said input aperture, but also because the orientation of the input aperture may have to change if that input aperture is increased or decreased in size. But clearly maximising the amount of electromagnetic energy passing through the input aperture in a given time may require an increase in the size of said input aperture. The remaining factors affecting said amount are complex.

6.15.5.1 Envelope to the lines extending portions of the defining rays

FIG. 24 is a schematic diagram for an axially symmetric embodiment of the apparatus in which all the defining rays lie in a plane 19 through the axis of symmetry 18. Said plane 19 is the plane of the paper. FIG. 24 shows portions of the defining rays 5 and 6 lying in said plane 19, their point of intersection 7, their respective further polar co-ordinates $\delta_1$ and $\delta_2$ at said point of intersection, together with the line of intersection of the defining mirror 1 with said plane 19 and the respective output angles $\beta_1$ and $\beta_2$ of said defining rays when reflected by said defining mirror. But there is no defined mirror in said figure and that portion of each of said defining rays 5 and 6 before its reflection by the defining mirror 1 is extended backwards beyond its point of intersection 7 by a line.

In addition, FIG. 24 shows in a similar fashion an alternate defining ray 6' which intercepts the defining ray 5 at an alternate point of intersection 7' and has a further polar co-ordinate $\delta'_2$ and an output angle $\beta'_2$. The lines extending those portions of the defining rays before their reflection by the defining mirror 1 are all members of a family and may be specified in terms of a parameter. FIG. 24 also shows an envelope 149 to which all the lines extending those portions of the defining rays, including those of said defining rays 5, 6 and 6', are tangent. Similarly if the defining mirror 1 is in the form of two defining mirrors.

Such an envelope will generally exist over a region for which the defining mirror and its gradient (in said plane 19) are continuous and reflect defining rays whose output angles are members of a family, but its shape depends on the behaviour of said gradient. If the defining mirror is spherical and all the output angles of the defining rays are zero (so that $\beta_1=\beta_2=\beta'_2=0$) this envelope is a well known caustic. An envelope with a similar shape to the caustic curve of a spherical defining mirror for output rays parallel to its axis will be referred to as a regular envelope. Said envelope 149 is, of course, regular.

6.15.5.2 Magnitude of the angular input aperture

The angular input aperture $\delta'_2-\delta_1$ at the point of intersection 7' is larger than the angular input aperture $\delta_2-\delta_1$ at the point of intersection 7, and said point of intersection 7' is further away from the envelope 149 than said point of intersection 7.

The point of contact 150 at which the alternate defining ray 6' is tangent to the envelope 149 lies before the point of intersection 7' on said alternate defining ray 6'; while the point of contact 151 at which the defining ray 5 is tangent to said envelope 149 lies after said point of intersection 7' on said defining ray 5.

Clearly, as the point of contact 150 moves towards the point of contact 151, the angular input aperture at the point of intersection 7' reduces and the distance of said point of intersection 7' from said envelope 149 also reduces. As the points of contact 150 and 151 coincide so $\delta'_2=\delta_1, \beta'_2=\beta_1$ and the defining rays 5 and 6' coincide, as they are members of a family and have been specified in terms of a parameter.

Clearly a defined mirror through the point of intersection 7' cannot cross the envelope 149 as there are no defining rays beyond said envelope 149 with which to define such a mirror. Moreover, when the gradient $\gamma_0$ of a defined mirror at the point of intersection 7' is greater than the further polar co-ordinate $\delta_1$ for the defining ray 5 then not all of the angular input aperture is utilised as any actual such defining ray would have to be reflected from the wrong side of the defined mirror. But if $\gamma_0 \leq \delta_1$ then such a defined mirror is constrained by the envelope 149 and the defining ray 5.

The position of any point from which the design of the defined mirrors is commenced, such as a leading edge of the first stage defined mirror, is determined by its two defining rays (irrespective of whether said defining rays are actually emitted by the source 3 or are merely invoked to locate said point). In the ninth, tenth, thirteenth and fourteenth embodiments, said two defining rays have output angles of $\beta_1$ and $\beta_2$ respectively and intercept the defining mirror 1 (which may be a first stage defining mirror) at points with gradients of $\gamma_1$ and $\gamma_2$ respectively while giving rise to an angular input aperture of $\delta_2-\delta_1$; so that all these items must be chosen together with said point.

It should be noted that, in a first stage in which $0 \leq \gamma_1 < \pi/2$ and $0 \leq \gamma_2 < \pi/2$ while $0 \leq \beta_1 \leq \gamma_1$ and $0 \leq \beta_2 \leq \gamma_2$ and the leading edges of the defining and defined mirrors form an input aperture, the combination of a small value of the average $\frac{1}{2}(\gamma_2+\gamma_1)$ of said gradients with large values of said output angles $\beta_1$ and $\beta_2$ for the leading edge of said defined mirror gives a very small input aperture.

6.15.5.3 Gradient of the defined surface

The electromagnetic energy which enters the apparatus through an input aperture or otherwise must be collected by a defined surface prior to direction by the respective defining surface(s). The following two relationships apply when that defined surface is reflective, and are shown in FIGS. 25 and 26 respectively.

Figure 25A:
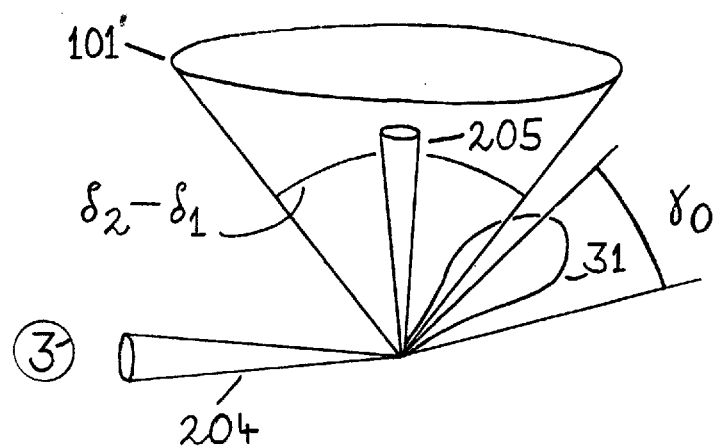
Figure 25B:
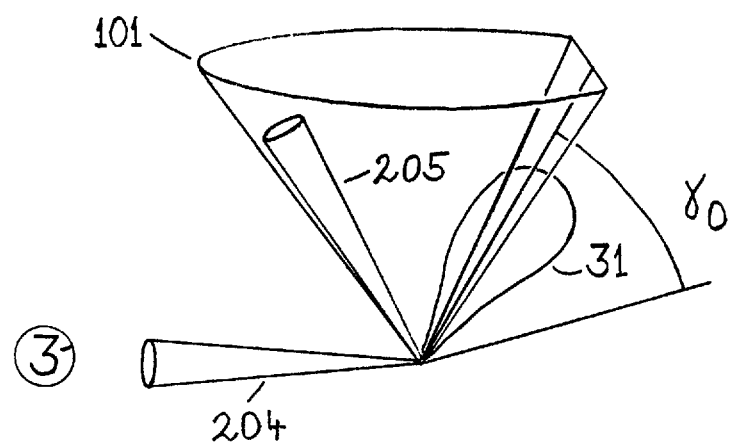

If those rays from the source which are incident at a point on a first stage defined mirror 31, which may be a point on its leading edge, are contained within a narrow cone 204, it is necessary that the reflections 205 of those rays from that point should lie within, or just outside, either the circular cone 101 of angle $\delta_2-\delta_1$, when $\gamma_0 \leq \delta_1$ as in FIG. 25A; or a segment of said circular cone 101, when $\gamma_0 > \delta_1$ as in FIG. 25B (irrespective of whether said defining rays are actually emitted by the source 3 or are merely invoked to locate that point). Said circular cone 101 is uniquely located by the reflections from that point of the two defining rays for that point. Thus the gradient $\gamma_0$ of said defined mirror is more or less constrained by the allowable directions of said reflections 205, depending on the excess of the circular cone 101 of angle $\delta_2-\delta_1$, or its segment, over the narrow cone 204 which is equal in size to its reflections 205. In this case, the angular input aperture $\delta_2-\delta_1$ previously chosen for that point should be as small as possible, in order to minimise the angles $\omega_1$ and $\omega_2$, while remaining compatible with an adequate input aperture and the desired value of $\gamma_0$.

Figure 26A:
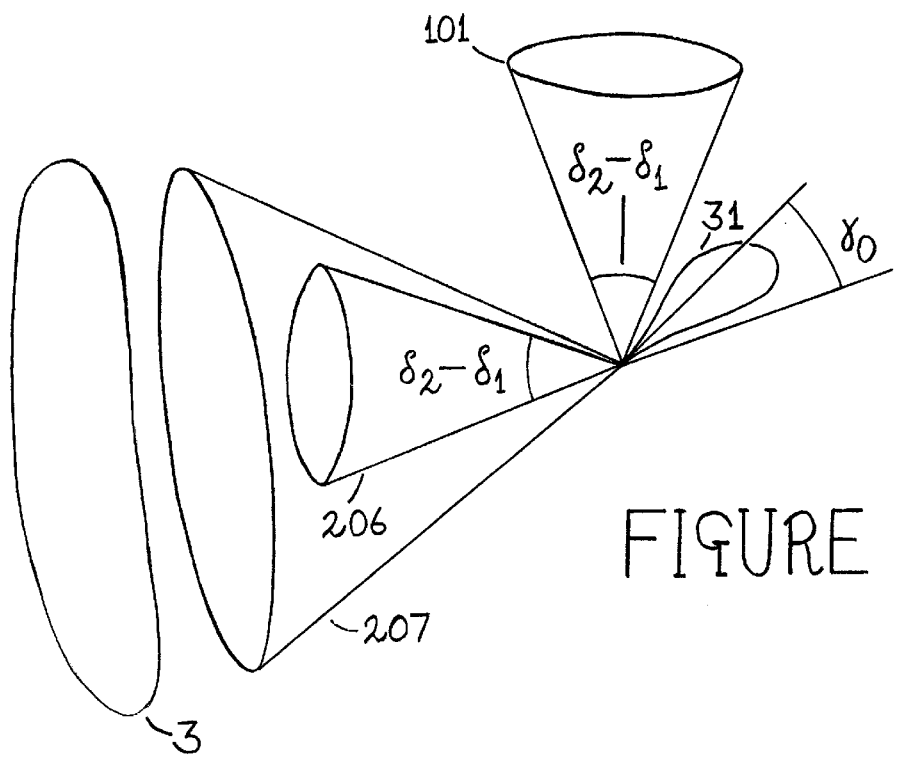
Figure 26B:
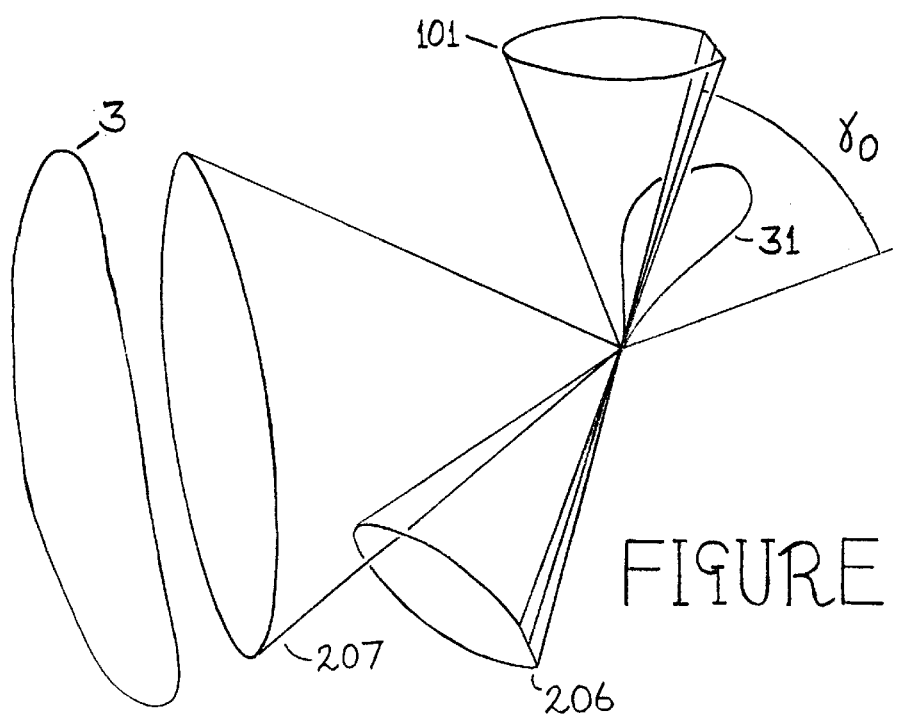

If, however, those rays are incident on that point from a much wider range of directions 207 than a circular cone 101 of angle $\delta_2-\delta_1$ then any circular cone of rays from them of angle $\delta_2-\delta_1$ may be chosen for direction and reflected within the circular cone 101 when $\gamma_0 \leq \delta_1$ as in FIG. 26A; and $\gamma_0$ is restricted only by the excess of said wider range of directions 207 over the circular cone 206 which contains the chosen rays. When $\gamma_0 > \delta_1$ as in FIG. 26B, a choice of $\gamma_0$ dictates not only the size of the segment of the circular cone 101 but also the orientation and size of the segment of the circular cone 206 which contains, but is not necessarily filled by, the chosen rays. Provided sufficient electromagnetic energy will be collected, said restriction on $\gamma_0$ may be relaxed in favour of the desired value of $\gamma_0$. In either case, the angular input aperture $\delta_2-\delta_1$ previously chosen for that point should be as large as possible to maximise the collection of electromagnetic energy while remaining compatible with the limit on the angles $\omega_1$ and $\omega_2$, an adequate input aperture, and the desired value of $\gamma_0$.

In either relationship, $\gamma_0$ is subject to the following consideration. In a practical embodiment, each defined mirror is continuous rather than a set of unconnected point mirrors. For this reason, the gradient of a defined mirror in an axially symmetric embodiment has already been specified to be a variable $\gamma_0$ rather than a set of values. Equally $\gamma_0$ is constrained by the desired direction of the reflections from the defined mirror. Clearly $\gamma_0$ must be specified, despite such constraint, in such a manner that the defined mirror is continuous and methods of doing this will be described later in this application. It should be noted, however, that this consideration does not require $\gamma_0$ itself to be continuous. And also that such a specification for all the points on a defined mirror decides its shape.

Consider with reference to FIG. 24 the design of a first stage for which there is a regular envelope 149 when that design commences at a point 7' on the (first stage) defined mirror which lies nearest the source 3 and furthest from said regular envelope 149. If the values of $\gamma_0$ along the (first stage) defined mirror are small then the (first stage) defined mirror quickly approaches the regular envelope 149 and the values of the angular input aperture $\delta_2-\delta_1$ along said (first stage) defined mirror quickly approach zero. Such a (first stage) defined mirror will only collect a small amount of the electromagnetic energy emitted from the source as its gradient tends to be parallel to the rays of electromagnetic energy rather than at right angles to them and because it also becomes progressively further from said source as it extends. So that more than one such stage must be provided in parallel for adequate collection of the electromagnetic energy. And, near the regular envelope 149, such a (first stage) defined mirror will only collect electromagnetic energy for a small range of angles. Moreover, that edge of such a (first stage) defined mirror which is furthest from the source 3 and on, or nearest to, the regular envelope 149 will be relatively near the axis of symmetry 18. If electromagnetic energy passes close to said edge then said proximity to the axis of symmetry will tend to increase the number of parallel stages making up the next successive stage in series.

Clearly, therefore, it is desirable to choose values for $\gamma_0$ at points on a first stage defined mirror which approach, or even exceed, their respective values of $\delta_1$ at those points.

Table 1 includes the values of various co-ordinates for the first stage of an embodiment of the apparatus similar to that specified in Section 6.14.5. As the radius of the sphere, a portion of which forms the first stage defining mirror, is given by r=9, that is also the value of the two dimensional polar co-ordinates $r_1$ and $r_2$ for all the points on said sphere. The remaining two dimensional polar co-ordinates $\theta_1$ and $\theta_2$ for the intersection of various first and second defining rays in a pair with the sphere at their respective further points are given in Table 1 in degrees. The two dimensional Cartesian co-ordinates $x_0$ and $y_0$ for the point of intersection of each such pair of defining rays on the first stage defined mirror are also given in Table 1. The values of $\theta_1, \theta_2, x_0, y_0$ for each pair of defining rays down that table are for successive points along the first stage defined mirror. The final point is the point at which that first stage defined mirror intersects the caustic.

TABLE 1

| $\theta_1$ | $\theta_2$ | $\delta_2-\delta_1$ | $x_0$ | $y_0$ | $\gamma_0$ |
|---|---|---|---|---|---|
| 120 | 150 | 60 | −7.0980762 | 3.2942265 | 45 |
| 121.2737340 | 145.2737340 | 48 | −6.8135205 | 3.5703951 | 43.2737340 |
| 122.8891565 | 140.8891565 | 36 | −6.5873333 | 3.7782203 | 41.8891565 |
| 124.8745455 | 136.8745455 | 24 | −6.4226646 | 3.9233526 | 40.8745455 |
| 127.2550335 | 133.2550335 | 12 | −6.3224796 | 4.0091423 | 40.2550335 |
| 130.0466110 | 130.0466110 | 0 | −6.2888850 | 4.0375800 | 40.0466110 |

The gradient which has been specified for the first stage defined mirror is given by $$\gamma_0 = \frac{\theta_2 + \theta_1 - \pi}{2}$$

so that the equation of said first stage defined mirror is that given in Section 6.21.7.2.1.1.5 with $\beta_1=\beta_2=0$ and $b=-\pi/2$. As $\delta_1=2\theta_1-\pi$ and $\delta_2=2\theta_2-\pi$ the angular input aperture $\delta_2-\delta_1$ is equal to $2\theta_2-2\theta_1$ for such a stage. Both the gradient $\gamma_0$ and the angular input aperture $\delta_2-\delta_1$ are also given in Table 1 for the points of intersection of each of those pairs of defining rays on the first stage defined mirror.

It will be seen that the values of $\gamma_0$ are small, the first stage defined mirror quickly approaches the caustic, the values of the angular input aperture $\delta_2-\delta_1$ quickly approach zero, and that the value of $y_0$ at the caustic is much less than that of r, so that the point at which said first stage defined mirror meets the caustic is relatively near the axis of symmetry 18.

The intersections of a pair of defining rays with the defining mirror lie outside the intersections with said defining mirror of the further rays from their point of intersection on the defined mirror. It will be seen from the values of $\theta_1$ and $\theta_2$ in Table 1 that the intersections of each pair of defining rays in that table with the defining mirror lie outside the intersections with the defining mirror of those pairs of defining rays succeeding it down that table and along the first stage defined mirror. So that the portion of a defining mirror lying between the pair of defining rays for one point on a defined mirror may overlap that for other points on that defined mirror, and the defining mirror may be "shared" by the further rays for all those points. As $\beta_1=\beta_2=0$ for all the defining rays in this example, the output rays for one point on the first stage defined mirror overlap those for other points on that first stage defined mirror. Such would also be the case if $\beta_1$ was merely approximately equal to $\beta_2$ and to some common output angle. It will thus be appreciated that output rays for a final stage in a series of stages which share a common output angle may overlap. The overlaps of portions of a defining mirror, and of output rays, may equally be partial.

It will be appreciated that all the considerations in this section also apply to stages subsequent to the first.

6.15.6 Mirrors continuous over successive stages

In some embodiments of the apparatus the defining mirrors of two or more successive stages in a series may form a continuous reflective surface, in which the defining mirror of each stage may have its own specification, or share a specification with one or more of the other stages. If there is a common specification, each of the co-specified defining mirrors may either have a regular envelope to its own family of defining rays, or share a regular envelope to some common family of defining rays, or have no envelope. If there is more than one specification, each of the defining mirrors may have a regular envelope to its own or some common family of defining rays, or have no envelope. If two or more regular envelopes are joined so as to be continuous, they may be regarded as forming a single envelope. If these continuous regular envelopes are envelopes to a common family of defining rays, the gradient at their join will be continuous and the single envelope will be regular.

FIG. 27 is similar to FIG. 24 but shows the defining mirrors of the successive stages in a series, namely the first, second and third stage defining mirrors 30, 32 and 34 respectively, which form a continuous reflective surface and have a single regular envelope 149 for a family of defining rays 217 whose output angles $\beta_i$ increase with increasing values of their respective further polar co-ordinates $\delta_i$.

In any embodiment of the apparatus in which the directions of the outputs of the defining rays of a stage in any series of stages are variously away from the source 3 for the first stage in said series, towards a target on the opposite side of the apparatus to said source 3 for the final stage in said series, and intermediate between said directions for any intermediate stage in said series, all the defined mirrors are similarly orientated. FIG. 28 is a schematic diagram for an axially symmetric embodiment of the apparatus in which all the defining rays lie entirely in a plane 19 through the axis of symmetry 18 showing the defining and defined mirrors of the successive stages in a series, namely the first, second and third stage defining mirrors 30, 32 and 34 respectively and the first, second and third stage defined mirrors 31, 33 and 35 respectively. Said plane 19 is the plane of the paper. FIG. 28 also shows the source 3, the target 208 and a first, a second and a third stage defining ray 209, 210 and 211 respectively. It will be seen that the direction of the output of the first stage defining ray 209 is away from the source 3, the direction of the output of the third and final stage defining ray 211 is towards the target 208, and the direction of the output of the second and intermediate stage defining ray 210 is intermediate between said directions. This would remain so even if the third stage defining ray 211 was reflected back towards the source 3 by the third stage defining mirror (so that its output angle, $\beta$, was less than $-\pi/2$). It will also be seen that the incidence of each of the defining rays on the defined mirror of their respective stage is in a similar direction, so that all the defined mirrors are similarly orientated. It will also be seen that the rays output from a stage other than the final stage form the input to the next stage in series.

In such an embodiment, or any other embodiment in which two or more defined mirrors of successive stages in a series are similarly orientated, the specification of the gradient for, and the position of, each of said defined mirrors may be such that said defined mirrors form one continuous reflective surface.

A continuous reflective surface for the defining mirrors of two or more successive stages in a series is not a prerequisite for a continuous reflective surface for the defined mirrors of those stages.

A regular or irregular envelope, whether shared between two or more successive stages or otherwise, is not a prerequisite for a continuous reflective surface for the defined mirrors in those successive stages. However, the defining mirrors of successive stages may share a regular envelope to some family of defining rays. When such a defining mirror is for an intermediate stage and its respective defined mirror is to join with the defined mirror of the next stage then the gradient of that respective defined mirror must be such that $\gamma_0 > \delta_1$ at many, if not all, of the points on that respective defined mirror to avoid it crossing that regular envelope. There is, of course, no reason ever to choose $\gamma_0 > \delta_1$ for a final stage as it is not necessary to extend the defined mirror of a final stage to join with the defined mirror of any subsequent stage.

In FIG. 28 the specification of the gradient in the plane 19 through the axis of symmetry 18 for, and the position of, each of the defined mirrors 31, 33 and 35 is such that said defined mirrors form one continuous reflective surface.

In a further refinement, that point of the defined mirror of the lowest numbered stage of said successive stages which is nearest the source 3 has the largest value of the gradient $\gamma_0$ (within the range $0 \leq \gamma_0 < \pi/2$) and of the angular input aperture $\delta_2-\delta_1$ and optionally of the output angles $\beta_1$ and $\beta_2$ and lies furthest from the lowest numbered or the single regular envelope in consequence of said largest value of $\delta_2-\delta_1$. The defined mirrors of each successive stage are further from the source 3 and from the axis of symmetry 18 and the values of said gradient $\gamma_0$ and of said angular input aperture $\delta_2-\delta_1$ and optionally of the output angles $\beta_1$ and $\beta_2$ progressively reduce as the point of intersection of the defining rays moves along said continuous surface away from said source 3 through said successive stages and approaches their respective or the single regular envelope. In general, such envelopes become further away from said source 3 when they become sufficiently far from said axis of symmetry 18. In FIG. 28 the first, second and third stage defined mirrors 31, 33 and 35 respectively have such a geometry. FIG. 28 shows a value of the gradient $\gamma_0$, a value of the angular input aperture $\delta_2-\delta_1$ and a value of one of the output angles for each of said defined mirrors. FIG. 28 also shows the axis of symmetry 18 and first, second and third stage regular envelopes 221, 222 and 223 respectively. It will be seen that the angular input aperture for each stage other than the first is smaller than the angular input aperture of the stage preceding it.

Consider a source comprising a sphere. The size of the sine of the half angle it subtends at any point external to it is inversely proportional to the distance of that point away from its centre. So that the reduction of the angular input aperture $\delta_2-\delta_1$ with the distance of the point of intersection of the defining rays from the source 3 does not of itself necessarily reduce the amount of electromagnetic energy which can be collected at any given point on said continuous surface.

A point of said continuous reflective surface may act as a point on the defined mirror of one particular stage in series for one ray but as a point on the defined mirror of the next stage in series for another ray. Similarly for continuous defining mirrors. So that successive stages may overlap.

Some rays may bypass one or more preceding stages in series and enter a subsequent stage in series at a point on its defined mirror and be reflected within the cone enclosing the well directed in and out-of-plane rays for said point.

Rays may also enter any stage after one or more reflections from the defining mirrors at a point on the defined mirror of that stage and be reflected within the cone enclosing the well directed in and out-of-plane rays for said point.

Further mirrors such as that shown at 112 in FIG. 63 may be provided to reflect rays from a source to a point on a defined mirror from which they may be reflected within the cone enclosing the well directed in and out-of-plane rays for said point. FIG. 63 is described in Section 6.17.2.

6.15.7 Optical and physical output apertures

If, in an axially symmetric embodiment of the apparatus in which each pair of defining rays lies entirely in a respective plane through the axis of symmetry 18, all the defining rays for all those points on a defined mirror which lie in a half-plane whose edge is on said axis of symmetry 18 are parallel oil reflection by the defining mirror(s) for said defined mirror, then the distance between those of said defining rays which are furthest apart on reflection is constant and will be referred to as the optical output aperture for said mirrors. For convenience, this term will also be used loosely even when said condition is not met.

Consider a stage of an embodiment of the apparatus in which the trailing edges of the defining and the defined mirrors of said stage are both closer to the target than their respective leading edges and the trailing edge of the defined mirror of said stage is further from the axis of symmetry 18 than its leading edge. The innermost of said defining rays does not necessarily touch the trailing edge of said defined mirror on output, so that a further parameter is required to characterise the output.

In an axially symmetric embodiment of the apparatus in which each pair of defining rays lies entirely in a respective plane through the axis of symmetry 18 having a stage with a defined mirror with a leading and a trailing edge with said trailing edge further from said axis of symmetry 18 than said leading edge, the shortest line between said trailing edge and the line of the outermost of said parallel defining rays after its reflection by the defining mirror for said stage will be referred to as the physical output aperture for said stage. Clearly said line lies in said half-plane and at right angles to the line of said outermost defining ray and thus parallel to the optical output aperture for the mirrors of said stage. In many such embodiments of the apparatus the defining rays for a final stage are parallel to the axis of symmetry 18 on output from said final stage. In which case both the optical output aperture for the mirrors of said final stage and the physical output aperture for said final stage are at right angles to said axis of symmetry 18. This remains approximately so if the defining rays for a final stage meet at a distant point on said axis of symmetry 18.

Clearly these definitions can be applied to any qualifying set of defining rays for an axially symmetric embodiment which lie in a half-plane whose edge is on the axis of symmetry 18 and, in particular, to the pair of defining rays for a single point, and thus to that point. And the physical output aperture for a stage is the maximum of the physical output apertures of all such points on the defined mirror of that stage.

FIG. 29 shows a defining mirror 1 and a defined mirror 2 in an axially symmetric embodiment of the apparatus in which each pair of defining rays lies entirely in a plane 19 through the axis of symmetry 18. Said figure also shows the trailing edge 196 of the defining mirror 1 and the trailing edge 197 of the defined mirror 2.

First and second points of intersection 7.1 and 7.2 on the defined mirror 2 lie in a half-plane through the axis of symmetry 18. Said half-plane lies in the plane of the paper.

A first pair of defining rays 5.1 and 6.1 intersect at the first point of intersection 7.1 and thus lie entirely in said half-plane, while a second pair of defining rays 5.2 and 6.2 intersect at the second point of intersection 7.2 and thus also lie entirely in said half-plane. All said defining rays are parallel on reflection by the defining mirror 1.

FIG. 29 shows the optical output aperture 198 and the physical output aperture 199 for said two pairs of defining rays.

6.15.8 Annular thickness of the output beam

The section in a plane at right angles to the axis of symmetry 18 of an output beam from an axially symmetric embodiment of the apparatus to a distant target is annular in any event. The thickness of said annulus close to the apparatus will be referred to as the annular thickness of the output beam.

The following relationships hold if the defining rays for the final stage of an axially symmetric embodiment of the apparatus in which the trailing edge of the defined mirror of said final stage is closer to the target than its leading edge but further from the axis of symmetry 18 are parallel to said axis of symmetry 18 on output (so that each pair of those defining rays lies entirely in a respective plane through said axis of symmetry 18). It should be mentioned that in such a case all the output rays will be approximately at right angles to said plane as the in and out-of-plane rays approximate to said defining rays. For convenience, those out-of-plane rays and any in-plane rays lying outside the outermost or inside the innermost defining rays will be neglected.

If the optical output aperture for the mirrors of a final stage is less than the physical output aperture for said final stage then there will be a gap between the innermost defining ray for said final stage and the trailing edge of the defined mirror of said final stage. The annular thickness of the output beam will be equal to the optical output aperture for the mirrors of said final stage and be less than the physical output aperture for said final stage.

If the optical output aperture for the mirrors of a final stage is equal to the physical output aperture for said final stage then there will be no such gap. The annular thickness of the output beam will be equal to both said output apertures.

If the optical output aperture for the mirrors of a final stage is greater than the physical output aperture for that final stage then some of the rays on the inside of the beam output from the or a defining mirror of said final stage will be masked by the trailing edge of the defined mirror of said final stage. This eventuality is quite likely as some of the defining rays for a final stage will come from the leading edge of the or the second defining mirror for said final stage which will be appreciably nearer the axis of symmetry 18 than its trailing edge. Since said rays will be substantially parallel to said axis of symmetry 18 they will generally fall within the cone of well directed rays which are incident at their point of intersection with said defined mirror and therefore undergo an extra pair of reflections without expanding the output beam. In which case, the annular thickness of the output beam will be the physical output aperture for said final stage. Otherwise, however, the masked rays after their extra pair of reflections may increase the annular thickness of the output beam.

The following relationships hold if said defining rays are not parallel to the axis of symmetry 18 on output so that the physical output aperture is not at right angles to said axis of symmetry 18.

When the physical output aperture is less than or equal to the optical output aperture then the annular thickness of the output beam will be greater than the physical output aperture by a factor of sec β where β is the output angle common to said parallel defining rays, again provided masked rays do not increase the annular thickness of the output beam, as will generally be the case.

When the physical output aperture is greater than the optical output aperture then the annular thickness of the output beam will be greater than the optical output aperture by a factor of sec β and may therefore also be greater than the physical output aperture: but by less than a factor of sec β provided masked rays do not increase the annular thickness of the output beam, as will generally be the case.

Thus, in general, the annular thickness of the output beam is less than or equal to the physical output aperture of the final stage when said defining rays are parallel to the axis of symmetry 18 on output, but may be greater by a factor of up to sec β when said defining rays are not so parallel. And, in general, choosing a small physical output aperture for a final stage ensures a small annular thickness for the output beam because the physical output aperture either limits or is linearly related to the annular thickness of the output beam.

Finally it should be mentioned that there may be a small portion of the defining mirror of a final stage which lies outside the output beam when said beam is symmetric about the axis of symmetry 18 and which is not therefore used in such a case. The projection of the trailing edges of the defining and defined mirrors of a final stage on a plane at right angles to the axis of symmetry 18 gives an annular exit aperture.

FIG. 29 shows the annular exit aperture 200 given by the projection of the trailing edges 196 and 197 of the defining mirror 1 and the defined mirror 2 respectively on a plane 201. FIG. 29 also shows the annular thickness 202 of the output beam comprising two pairs of defining rays which are not parallel to the axis of symmetry 18.

6.15.9 Multiple final stages in parallel

In many embodiments of the apparatus the defining rays for the final stage meet at a point on the axis of symmetry 18. The in and out-of-plane rays approximate to those defining rays. The output beam from an axially symmetric embodiment of the apparatus is represented schematically in FIG. 30 which shows the innermost defining ray 152 and the outermost defining ray 153 for a half-plane, which lies in the plane of the paper and whose edge is on the axis of symmetry 18, meeting at a point 154. The vertical dashed line seperating the defining rays 152 and 153 at the extreme left of said diagram represents the annular thickness 202 of the output beam.

It is possible, but inconvenient, to direct all the defining rays towards some other point on the axis of symmetry 18 by changing the shape of one or more of the mirrors. However, moving the defined mirror of the final stage axially relative to its defining mirror(s) causes each pair of defining rays to move in a plane through the axis of symmetry 18 without appreciably altering the distance of their point of intersection from the apparatus. So that the innermost and outermost defining rays move to new positions 152' and 153' respectively and intersect at a point 154' which represents an approximate focus for all the defining rays. An example of the effect of such axial movements on a ray will be described later.

Thus at any other point 155 on the axis of symmetry 18 to which the output beam is directed, said defining rays in their new positions 152' and 153' will be seperated by a small distance which is approximately proportional to the annular thickness of the output beam (and the ratio of the distance between said other point 155 and said point 154' divided by the distance between the apparatus and said point 154'). Said small distance increases the size of the spot at that other point 155 (which is also due to the limitations of the geometric optics of the apparatus and any diffraction which may be produced by the apparatus). So that it is desirable to minimise the annular thickness of the output beam (and collaterally with it the annular exit aperture). Said other point 155 will be referred to as a partial focus.

However, a single final stage may be replaced by multiple final stages in parallel to each other. And the annular thickness of the output beam of each one of such multiple final stages will be a fraction of the annular thickness of the output beam of the single final stage which they have replaced (irrespective of whether each of said output beams focusses on a point or not). As the output beam of each such multiple final stage may be seperately directed at said other point 155 by moving its respective defined mirror axially relative to its defining mirror by the amount appropriate to that particular final stage, the increase in the size of the spot due to the annular thicknesses of the output beams of multiple final stages will be a fraction of that due to a single final stage.

It is therefore useful for the annular thickness of the output beam from the or each of the final stage(s) to be small in relation to the spread of the output beam on a target due to other effects.

Such an arrangement is shown in FIG. 31 in which the defining mirrors 157 of the outermost final stage in parallel and of all the preceding stages in series form a continuous reflective surface while the defined mirrors 158 of the innermost final stage in parallel and of all the preceding stages in series form a continuous reflective surface. Each reverse surface 156 of the defined mirror of each of the final stages in parallel except the innermost forms the defining mirror(s) of the next final stage in parallel inwards. As already mentioned, the axial movement of each defined mirror of a final stage is relative to that of its defining mirror(s). (So that axial movement of the defined mirror of the innermost final stage requires axial movement of all the defined mirrors 158 in the arrangement shown.) It will be seen that the rays 212 output from the penultimate stage 213 common to all the series of stages form the input to all the final stages 214. FIG. 31 shows an angular input aperture for both the penultimate stage and each of the final stages. That for the penultimate stage is greater than any of those for a final stage.

In some embodiments of the apparatus the defining rays for a final stage meet at different points on the axis of symmetry 18 in order to distribute the electromagnetic energy over a longer portion of said axis of symmetry 18. Equally, the mirrors of said parallel stages may be moved so that said stages in parallel are focussed, partially or otherwise, on different points on the axis of symmetry 18.

6.15.10 Minimising the physical output aperture

In an axially symmetric embodiment of the apparatus in which each pair of defining rays lies entirely in a respective plane through the axis of symmetry 18, the gradients between the defined and defining mirror(s) of the first and second defining rays for a point on a defined mirror are $\delta_1$ and $\delta_2$ respectively. If $\beta_1 \approx \beta_2$ throughout a final stage, as will be the case if $\beta_1 \approx 0$ and $\beta_2 \approx 0$, there may be a regular envelope to all the defining rays of said final stage, depending on the behaviour of the gradient of the defining mirror(s) of said final stage. If there is such a regular envelope then, as $\delta_2 > \delta_1$ by definition, the intersection along the first defining ray of the first and second defining rays must lie before that point of contact at which said first defining ray is tangent to said regular envelope, as may be seen from FIG. 24. Moreover, as $\delta_2 \to \delta_1$ that point of intersection 7 tends towards the point of contact 151 at which the defining ray 5 is tangent to the regular envelope 149. And the minimum length of the first defining ray 5 between the defined and the or the first defining mirror is the length along said first defining ray between the point of contact 151 at which said first defining ray is tangent to the regular envelope 149 and its point of intersection with said or said first defining mirror. As $\delta_2 - \delta_1$ must be small as well as positive for a final stage, the length of the first defining ray between the defined and the or the first defining mirror must be near its minimum anyway and the point of intersection of said defining rays must be near to said regular envelope 149.

As the output angle of the first defining ray $\beta_1 \approx 0$ for an embodiment of the apparatus in which the output is substantially parallel to the axis of symmetry 18 and $\delta_1 = 2\gamma_1 - \beta_1$ so the gradient of the or the first defining mirror at the point of intersection of said first defining ray with said or said first defining mirror $\gamma_1 \approx \frac{1}{2}\delta_1$. Equally, in those embodiments in which the trailing edge of the defined mirror of a final stage is closer to the target than its leading edge but further from the axis of symmetry 18 and $0 \leq \gamma_0 < \pi/2$, the gradient of the defined mirror $\gamma_0 \leq \delta_1$ to ensure that the first defining ray is reflected from the correct side of said defined mirror. So that the values of $\gamma_1$ and $\gamma_0$ are comparable for such an embodiment.

In order to accommodate several stages within the apparatus without making the apparatus excessively large, it is often necessary to continue the defining mirror(s) until they have a fairly small gradient. In which case $\gamma_1 << \pi/2$ and $\delta_1 << \pi/2$ for a final stage.

One way of ensuring that the physical output aperture for a point on the defined mirror of a final stage is small, irrespective of the precise position of the trailing edge of said defined mirror in relation to that point, is by making the gradient $\delta_1$ of said first defining ray small (since the length of the first defining ray between the defined and the or the first defining mirror must be near its minimum).

Thus in order to make the physical output aperture for a final stage small by making all the physical output apertures for all the points on the defined mirror of that stage small using the above method, it is necessary for all the gradients $\delta_1$ of the first defining rays for that stage to be small; so that both $\gamma_1$ and $\gamma_0$ are small, and $\gamma_1 \approx \gamma_0$ in consequence, throughout that final stage if its output is substantially parallel to the axis of symmetry 18. Moreover, the grazing angle for the defining mirror, $\delta_1 - \gamma_1$, and the grazing angle for the defined mirror, $\delta_1 - \gamma_0$, must also be small. Such small grazing angles, with their correspondingly high angles of incidence, have important practical consequences which will be referred to later. It should be mentioned, however, that as in the example given of the utility of multiple stages in series a low value of $\gamma_1$ implies $\theta_1 \approx \pi/2$ and thus a higher value of $\beta_3$ for a final stage. The reduction in grazing angle at the mirrors of successive stages will be seen in FIG. 28.

6.15.11.0 Diffraction effects

The diffraction effects associated with the apparatus are more easily explained and considered using an analogous case.

6.15.11.1 Analogous case

FIG. 32 includes a plane mirror 119 on the left and another plane mirror 120 on the right, both of which lie at right angles to the plane of the paper. A right-handed system of three dimensional Cartesian co-ordinates $x_l, y_l, z_l$ is used for the plane mirror 119 on the left, while a further right-handed system of three dimensional Cartesian co-ordinates $x_r, y_r, z_r$ is used for the plane mirror 120 on the right.

The $x_l$ axis lies on the intersection of the plane mirror 119 with the plane of the paper, while the $z_l$ axis is at right angles to the plane of the paper with its positive direction rising perpendicularly from the paper. This is indicated by a circle. The edge of the plane mirror 119 coincides with the $z_l$ axis, so that the equation of said plane mirror 119 would be $y_l = 0, x_l > 0$ if it were semi-infinite.

The $x_r$ axis lies on the intersection of the plane mirror 120 with the plane of the paper, while the $z_r$ axis is at right angles to the plane of the paper with its positive direction going perpendicularly into the paper. This is indicated by a cross. The edge of the plane mirror 120 coincides with the $z_r$ axis, so that the equation of said plane mirror 120 would be $y_r = 0, x_r > 0$ if it were semi-infinite. It will be observed that the equations of the two semi-infinite planes are exactly similar.

As the edges of the two plane mirrors 119 and 120 respectively are parallel, they are everywhere seperated by a fixed distance, which is denoted by d. A second further line 121 lies in the plane of the paper between said edges, and is thus at right angles to both of them; and is d in length.

One end of a third further line 122 perpendicularly bisects the second further line 121. The third further line 122 lies in the plane of the paper. Its other end lies on a fourth further line 123 which is parallel to the second further line 121 and thus lies in the plane of the paper at right angles to the third further line 122. The length of the third further line 122 is denoted by l and the point at its other end is numbered 125.

A point 126 lies on the fourth further line 123 a short distance $\frac{1}{2}d_{ss}$ to the left of the point 125. A ray 127 lies in the plane of the paper between the origin of the co-ordinate system $x_l, y_l, z_l$ and the point 126. The ray 127 is reflected from the plane mirror 119 at a grazing angle of $\sigma_0$.

A point 128 lies on the fourth further line 123 a short distance ½$d_{ss}$ to the right of the point 125. A second ray 129 lies in the plane of the paper between the origin of the co-ordinate system $x_r,y_r,z_r$ and the point 128. The second ray 129 is reflected from the plane mirror 120 at a grazing angle of $\sigma_0$ also.

A point 124 lies on the fourth further line 123. It may be to either side of the point 126 at a distance denoted by s from it which is positive to the right and negative to the left. A fifth further line 130 joining the origin of the co-ordinate system $x_l,y_l,z_l$ with the point 124 has a length denoted by $r_l$ and its angle with the $x_l$ axis is $\theta_l$. The angle between the ray 127 and the fifth further line 130 is $\epsilon_l$ so that $\theta_l=\pi-\sigma_0+\epsilon_l$. A sixth further line 131 joining the origin of the co-ordinate system $x_r,y_r,z_r$ with the point 124 has a length denoted by $r_r$ and its angle with the $x_r$ axis is $\theta_r$. The angle between the second ray 129 and the sixth further line 131 is $\epsilon_r$ measured in the same sense as $\theta_r$ so that $\theta_r=\pi-\sigma_0+\epsilon_r$.

6.15.11.2 Rigorous diffraction theory

The diffraction due to a semi-infinite plate is the subject of a precise mathematical formulation, known as Rigorous Diffraction Theory, for the case in which said plate is perfectly conducting and infinitely thin and does not have non-linear material equations.

Since both the semi-infinite planes corresponding to the plane mirrors 119 and 120 have exactly similar equations, said mathematical formulation is the same for both said plane mirrors and the subscripts r and l may be omitted.

For an incident plane wave of wavelength $\lambda$ parallel to a plane containing the z-axis the entire problem and thus the electric field vector E and the magnetic field vector H are independent of z so that:

$$\frac{\partial E_x}{\partial z} = \frac{\partial E_y}{\partial z} = \frac{\partial E_z}{\partial z} = \frac{\partial H_x}{\partial z} = \frac{\partial H_y}{\partial z} = \frac{\partial H_z}{\partial z} = 0$$

In which case Maxwell's equations in free space with a time factor $e^{-iwt}$ suppressed may be split into two independent sets, known as the E-polarization field:

$$E_x = E_y = H_z = 0$$

$$H_x = \frac{1}{ik}\frac{\partial E_z}{\partial y}, \; H_y = -\frac{1}{ik}\frac{\partial E_z}{\partial x}$$

$$\frac{\partial^2 E_z}{\partial x^2} + \frac{\partial^2 E_z}{\partial y^2} + k^2 E_z = 0$$

and the H-polarization field:

$$H_x = H_y = E_z = 0$$

$$E_x = -\frac{1}{ik}\frac{\partial H_z}{\partial y}, \; E_y = \frac{1}{ik}\frac{\partial H_z}{\partial x}$$

$$\frac{\partial^2 H_z}{\partial x^2} + \frac{\partial^2 H_z}{\partial y^2} + k^2 H_z = 0$$

where $k=2\pi/\lambda$.

The E-polarized solution for an incident plane wave with a grazing angle $\sigma_0$, specified by $E_z^{(incid)}=e^{-ikr\cos(\theta-\sigma_0)}$, is:

$$E_z = \frac{e^{-\frac{1}{4}i\pi}}{\sqrt{\pi}}\left(e^{-ikr\cos(\theta-\sigma_0)}F\left(-\sqrt{2kr}\cos\frac{1}{2}(\theta-\sigma_0)\right) - \right.$$

$$\left. e^{-ikr\cos(\theta+\sigma_0)}F\left(-\sqrt{2kr}\cos\frac{1}{2}(\theta+\sigma_0)\right)\right)$$

where F is the complex Fresnel integral. $H_x$ and $H_y$ may be derived from $E_z$.

The H-polarized solution for an incident plane wave with a grazing angle $\sigma_0$, specified by $H_z^{(incid)}=e^{-ikr\cos(\theta-\sigma_0)}$, is:

$$H_z = \frac{e^{-\frac{1}{4}i\pi}}{\sqrt{\pi}}\left(e^{-ikr\cos(\theta-\sigma_0)}F\left(-\sqrt{2kr}\cos\frac{1}{2}(\theta-\sigma_0)\right) + \right.$$

$$\left. e^{-ikr\cos(\theta+\sigma_0)}F\left(-\sqrt{2kr}\cos\frac{1}{2}(\theta+\sigma_0)\right)\right)$$

And $E_x$ and $E_y$ may be derived from $H_z$.

Provided $\theta<\pi$ (so that $\theta<<\pi+\sigma_0$), the respective incident plane wave is present in both the above $E_z$ and $H_z$ solutions in its entirety and may be removed from either of those solutions simply by subtracting it from the solution.

Equally, provided the respective reflected plane wave is present in a solution in its entirety, it may be removed simply by subtracting it from that solution. Removing both the incident and the reflected plane waves from a solution leaves only the diffraction field.

If $\sqrt{2kr}\cos\frac{1}{2}(\theta\pm\sigma_0)$ are both numerically much greater than one, asymptotic expansions of the complex Fresnel integrals also allow the $E_z$ solution to be split into a geometric optics field, $E_z^{(g)}$, and a diffraction field, $E_z^{(d)}$:

$$E_z^{(g)} = \begin{cases} e^{-ikr\cos(\theta-\sigma_0)} - e^{-ikr\cos(\theta+\sigma_0)} & \text{for } 0 \le \theta < \pi-\sigma_0 \\ e^{-ikr\cos(\theta-\sigma_0)} & \text{for } \pi-\sigma_0 < \theta < \pi+\sigma_0 \\ 0 & \text{for } \pi+\sigma_0 < \theta \le 2\pi \end{cases}$$

$$E_z^{(d)} \approx \sqrt{\frac{2}{\pi}}\; e^{\frac{1}{4}i\pi}\; \frac{\sin\frac{\sigma_0}{2}\sin\frac{\theta}{2}}{2\cos\frac{\theta-\sigma_0}{2}\cos\frac{\theta+\sigma_0}{2}}\; \frac{e^{i\frac{2\pi r}{\lambda}}}{\sqrt{\frac{2\pi r}{\lambda}}}$$

provided $\theta \ne \pi \pm \sigma_0$ so that for $\frac{2\pi r}{\lambda} >> 1$, $H_\theta^{(d)} = -E_z^{(d)}$ and $H_r^{(d)} = 0$.

Equally the $H_z$ solution may be split into:

$$H_z^{(g)} = \begin{cases} e^{-ikr\cos(\theta-\sigma_0)} + e^{-ikr\cos(\theta+\sigma_0)} & \text{for } 0 \le \theta < \pi-\sigma_0 \\ e^{-ikr\cos(\theta-\sigma_0)} & \text{for } \pi-\sigma_0 < \theta < \pi+\sigma_0 \\ 0 & \text{for } \pi+\sigma_0 < \theta \le 2\pi \end{cases}$$

$$H_z^{(d)} \approx -\sqrt{\frac{2}{\pi}}\; e^{\frac{1}{4}i\pi}\; \frac{\cos\frac{\sigma_0}{2}\cos\frac{\theta}{2}}{2\cos\frac{\theta-\sigma_0}{2}\cos\frac{\theta+\sigma_0}{2}}\; \frac{e^{i\frac{2\pi r}{\lambda}}}{\sqrt{\frac{2\pi r}{\lambda}}}$$

provided $\theta \ne \pi \pm \sigma_0$ so that for $\frac{2\pi r}{\lambda} >> 1$, $E_\theta^{(d)} = H_z^{(d)}$ and $E_r^{(d)} = 0$.

Thus according to said expressions derived from the asymptotic expansions the diffraction fields for both the $E_z$ and $H_z$ solutions behave as though they originate from a line source situated along the edge of the plane and vary with the angle $\theta$.

6.15.11.3 Spot size

FIGS. 33 through 35 show examples of some of the different positions of the output beam from an axially symmetric embodiment of the apparatus with a single final stage on striking a plane target 132 which may be effected by making small adjustments to the directions of parts of said output beam by moving the defined mirror of said final stage axially relative to its defining mirror using means to be described. The same numbering is adopted for the same item in each figure. The axis of symmetry 18 and all the rays shown lie in the plane of the paper.

That edge of the defining mirror of the single final stage nearest the plane target 132 is illuminated by well directed rays and may therefore be referred to as the trailing edge of said defining mirror. And there are defining rays from said trailing edge, which are numbered 133 for the ray on the left and 134 for the ray on the right. Those defining rays for said defining mirror which intersect said defining mirror furthest from its trailing edge are numbered 135 for the ray on the left and 136 for the ray on the right. The defining rays 133 and 135 respectively are not, of course, necessarily involved in the definition of the same point on the defined mirror of the single final stage. And in said examples, they do not meet on the plane target 132 (even if they are specified in said embodiment to meet at some point). Similarly for the defining rays 134 and 136.

Those further rays which strike the plane target 132 furthest from the axis of symmetry 18 in FIGS. 33 through 35 are numbered 137 for the ray on the left and 138 for the ray on the right. For a typical embodiment and a distant target, said further rays 137 and 138 respectively emerge from the outside of the cone or cylinder delineated by the defining rays 133 and 134, as shown. That in-plane ray from the left which is not intermediate between any pair of defining rays (and is thus not a further ray) and which strikes the plane target 132 furthest from said further ray 137 is numbered 139. While that in-plane ray from the right which is not intermediate between any pair of defining rays and which strikes the plane target 132 furthest from said further ray 138 is numbered 140. For a typical embodiment and a distant target, said in-plane rays 139 and 140 respectively emerge from the inside, or begin inside, the cone or cylinder delineated by the defining rays 135 and 136, as shown. No out-of-plane rays are shown for clarity's sake. But this does not affect the following argument as they approximate either to further rays or to in-plane rays in the final stage of a series of stages.

FIGS. 33 through 35 illustrate various sizes of spot derived using the geometric optics of the apparatus.

The interior of the output beam is cut off either by a trailing edge of the defined mirror of the final stage, which deflects all electromagnetic energy, including its diffraction field, principally towards its defining mirror and thus away from the axis of symmetry 18; or by some other edge which is orientated so as to deflect any diffraction field associated with it well away from said axis of symmetry 18. As the entire defining mirror of the final stage is illuminated, only its trailing edge will produce diffraction effects in the region of the axis of symmetry 18 (unless its curvature in a plane through said axis of symmetry 18, for which there is a wide range of possibilities, or variations in said illumination, which are difficult to quantify, have some effect; and can thus be optimised to reduce diffraction in any case). So that the diffraction ill the plane of the paper to the left of the beam will only be significant around the intersection of the defining ray 133 for said trailing edge with the plane target 132. But the part of this region to the left of, and thus outside of, said intersection always overlaps with the further rays for the left part of the beam up to and including 137 and sometimes overlaps with the in-plane rays for the right part of the beam up to and including 140 as in FIG. 33.

It follows that increases in the spot size respectively due to the limitations of the geometric optics of the apparatus, and diffraction, are not cumulative for said typical embodiment.

This and the different positions of the output beam shown in FIGS. 33 through 35 in which the left and right parts of the beam lying in the plane of the paper overlap in different ways suggest that the diffraction in the plane of the paper to the left of the beam is most appropriately studied by superimposing on the total field from the plane mirror 119 only the diffraction from the plane mirror 120, in order to isolate the variation in intensity due to diffraction from other effects. Moreover, the absence from the region of the axis of symmetry 18 of diffraction due to those parts of the defining mirror of the final stage other than its trailing edge allows the theory for semi-infinite plates to be used for such a study.

6.15.11.4 Analysis of diffraction effects

The amplitudes of the asymptotic approximations for the diffraction field are nearly constant for constant values of $\sqrt{r/\lambda} \sin \epsilon/2$ where $\epsilon$ is a very small angular difference between $\theta$ and $\pi-\sigma_0$. For putting $\theta=\pi-\sigma_0+\epsilon$ in those approximations gives:

$$E_z^{(d)} \approx \sqrt{\frac{2}{\pi}} \, e^{\frac{1}{4} i\pi} \, \frac{\sin\frac{\sigma_0}{2} \sin\frac{\pi-\sigma_0+\epsilon}{2}}{2\cos\frac{\pi-2\sigma_0+\epsilon}{2} \cos\frac{\pi+\epsilon}{2}} \, \frac{e^{i\frac{2\pi r}{\lambda}}}{\sqrt{\frac{2\pi r}{\lambda}}}$$

$$= -\sqrt{\frac{2}{\pi}} \, e^{\frac{1}{4} i\pi} \, \frac{\sin\frac{\sigma_0}{2} \cos\left(\frac{\sigma_0}{2} - \frac{\epsilon}{2}\right)}{2\sin\left(\sigma_0 - \frac{\epsilon}{2}\right) \sin\frac{\epsilon}{2}} \, \frac{e^{i\frac{2\pi r}{\lambda}}}{\sqrt{\frac{2\pi r}{\lambda}}}$$

$$\approx -\sqrt{\frac{2}{\pi}} \, e^{\frac{1}{4} i\pi} \, \frac{\sin\frac{\sigma_0}{2} \cos\frac{\sigma_0}{2}}{2\sin\sigma_0} \, \frac{e^{i\frac{2\pi r}{\lambda}}}{\sqrt{2\pi} \sqrt{\frac{r}{\lambda}} \sin\frac{\epsilon}{2}}$$

as $\frac{\sigma_0}{2} \gg \frac{\epsilon}{2}$ $$= -\frac{e^{\frac{1}{4} i\pi}}{4\pi \sqrt{\frac{r}{\lambda}} \sin\frac{\epsilon}{2}} \, e^{i\frac{2\pi r}{\lambda}}$$

$$H_z^{(d)} \approx \sqrt{\frac{2}{\pi}} \, e^{\frac{1}{4} i\pi} \, \frac{\cos\frac{\sigma_0}{2} \cos\frac{\pi-\sigma_0+\epsilon}{2}}{2\cos\frac{\pi-2\sigma_0+\epsilon}{2} \cos\frac{\pi+\epsilon}{2}} \, \frac{e^{i\frac{2\pi r}{\lambda}}}{\sqrt{\frac{2\pi r}{\lambda}}}$$

$$= \sqrt{\frac{2}{\pi}} \, e^{\frac{1}{4} i\pi} \, \frac{\cos\frac{\sigma_0}{2} \sin\left(\frac{\sigma_0}{2} - \frac{\epsilon}{2}\right)}{2\sin\left(\sigma_0 - \frac{\epsilon}{2}\right) \sin\frac{\epsilon}{2}} \, \frac{e^{i\frac{2\pi r}{\lambda}}}{\sqrt{\frac{2\pi r}{\lambda}}}$$

$$\approx \sqrt{\frac{2}{\pi}} \, e^{\frac{1}{4} i\pi} \, \frac{\cos\frac{\sigma_0}{2} \sin\frac{\sigma_0}{2}}{2\sin\sigma_0} \, \frac{e^{i\frac{2\pi r}{\lambda}}}{\sqrt{2\pi} \sqrt{\frac{r}{\lambda}} \sin\frac{\epsilon}{2}}$$

as $\frac{\sigma_0}{2} \gg \frac{\epsilon}{2}$ $$= -\frac{e^{\frac{1}{4} i\pi}}{4\pi \sqrt{\frac{r}{\lambda}} \sin\frac{\epsilon}{2}} \, e^{i\frac{2\pi r}{\lambda}}$$

It will be noted that said asymptotic approximations are not accurate at or very near $\theta=\pi-\sigma_0$ and that the above further approximations imply that $E_z^{(d)}=-H_z^{(d)}$ which is not in fact the case. It should also benoted that series approximations for the $E_z$ and $H_z$ fields are not valid at ranges of more than a fraction of a wavelength. It is therefore necessary to use the full solutions at or very near $\theta=\pi-\sigma_0$.

Though one argument of the real Fresnel integrals in the full solutions for $E_z$ and $H_z$ $2\sqrt{2r/\pi}$ cos $\theta+\sigma_0/2=-2\sqrt{2r/\lambda}$ sin $\epsilon$ at $\theta=\pi-\sigma_0+\epsilon$, the full solution for either $E_z$ or $H_z$ cannot easily be shown mathematically to give an intensity which is either invariant or approximately invariant with $\sqrt{r/\lambda}$ sin $\epsilon/2$ at or very near $\theta=\pi-\sigma_0$.

However, calculation by computer for a single semi-infinite plate of the intensity due to the $E_z$ field removal f the incident wave using said full $E_z$ solution shows such an invariance, as does a similar calculation of the intensity due to the $H_z$ field after the removal of the incident wave using said full $H_z$ solution.

FIG. 36 comprises graphs produced from both said calculations showing said intensities for a range of positive and negative values of s in FIG. 32 on a common scale. The horizontal axis corresponds to the intensity of the incident wave. The bottom of the vertical axis corresponds to an intensity of zero. The vertical axis corresponds to s=0 and thus to $\theta_I=\pi-\sigma_0$. The calculation has been performed for d=$d_{ss}$ so that the third further line 122 is parallel to the ray 127 and equal in length to it. Thus tan $\epsilon_I$=s/l so that $\epsilon_I^h \approx$s/l.

FIG. 36 comprises graphs for a grazing angle of 5° and a wavelength of 0.2 $\mu$m at a range, l, of 60 m. FIG. 37 comprises similar graphs for the same range of values of s and on the same common scale for the same grazing angle and wavelength but at one quarter of that range and thus for approximately four times the range of values of $\epsilon_I$.

It may be observed that the distances between the points 144, 145 and 146 in FIG. 37 are half that between the points 141, 142 and 143 of the same intensity in FIG. 36, and thus correspond approximately to twice the values of $\epsilon_I$ because of the factor of four difference in the range of values of $\epsilon_I$ between FIG. 37 and FIG. 36. Similarly for the graphs of the intensities du e to the $H_z$ field.

As sin $\epsilon_I \approx \epsilon_I$ and $r_I \approx $l for small values of $\epsilon_I$, this demonstrates that said intensities are invariant with $\sqrt{r/\lambda}$ sin $\epsilon/2$. For the intensity has remained invariant when the range has been reduced by a factor of four but the value of $\epsilon_I$ has doubled.

Conversely, quadrupling the range has doubled the width of the fringes, so that the width of the fringes is proportional to $\sqrt{r}$.

FIG. 38 comprises graphs similar to those of FIG. 36, but for two semi-infinite plates orientated as shown in FIG. 32. Each plate is illuminated by a plane wave of wavelength $\lambda$ parallel to a plane containing its respective z axis, but the waves for the two plates are $\pi$ out of phase within their own solutions to compensate for the opposite directions of the $z_l$ and $z_r$ axes and thus to simulate a real output beam which interferes constructively on the axis of symmetry 18. The incident wave is removed from the solutions for both said plates to simulate a real output beam, while the reflected wave is removed from the solution for the plate on the right to facilitate a study of the left hand side of the beam. The vertical axis corresponds to $\theta_I \approx \pi-\sigma_0$ as before.

It will be seen that further but smaller fringes have been superimposed on the pattern for a single plate. And that this superimposition is dot pattern multiplication, although similar to it. The width of fringes due to interference between isotropic electromagnetic energy from the two edges is approximately equal to $\lambda$l/d. FIG. 39 comprises similar graphs on the same common scale as FIG. 38 and for identical data to FIG. 38 except that the distance, d, between the edges of the plates has been halved. It will be observed that the width of each further fringe has doubled, thus demonstrating that said further fringes are due to interference between electromagnetic energy from the two edges.

As the width of the fringes for a single plate is proportional to $\sqrt{r}$ and thus approximately proportional to $\sqrt{l}$ while the width of the fringes due to interference between electromagnetic energy from the two edges is proportional to the range, l, there must be some range at which the widths of the two sets of fringes are comparable. At or above that range, it is feasible to superimpose the two sets of fringes in such a way that their falls coincide so as to produce a spot which is smaller above some given level of intensity and has a sharper edge, as shown in FIG. 40 in which a further fringe has been superimposed on the fringe in FIG. 41.

A similar effect may be obtained by the provision of multiple pairs of plane mirrors similar to 119 and 120, each pair of plane mirrors having a slightly different seperation, together with the appropriate superimposition of the fringes and further fringes due to said multiple pairs of plane mirrors; and equally by the provision of multiple final stages in parallel. It will be appreciated, however, that optimisation of the intensity profile of the spot must start with the distribution of the geometric rays from the apparatus on the plane target 132, which is a matter of considerable complexity.

Provided $\theta \neq \pi \pm \sigma_0$ the asymptotic approximations give an expression for the ratio of the E-polarization diffraction field to the H-polarization diffraction field:

$$\frac{E_z^{(d)}}{H_z^{(d)}} = -\tan\frac{\sigma_0}{2} \tan\frac{\theta}{2}$$

which implies that the ratio of the intensities given by the full $E_z$ and $H_z$ solutions for a single semi-infinite plate is dependent on the grazing angle, $\sigma_0$. This is certainly true at radar frequencies, as may be seen by comparing FIG. 42 for a grazing angle of 5° with FIG. 43 for a grazing angle of 0.9° but otherwise identical data using a calculation identical to that for FIG. 36. This effect may be used to provide the output beam with a signature for detection by a sensor system.

However, the diffraction fields, $E_z^{(d)}$ and $H_z^{(d)}$, are in-versely proportional to $\sqrt{2\pi r/\lambda}$. They are thus small compared with their respective geometric fields, $E_z^{(g)}$ and $H_z^{(g)}$, at optical frequencies for ranges at or below the maximum range of most embodiments of the apparatus.

There is no significant difference between the intensities given by the full $E_z$ and $H_z$ solutions for a single semi-infinite plate at optical frequencies for short ranges and almost no dependence of said ratio on the grazing angle, as may be seen from FIG. 36 for a grazing angle of 5° and FIG. 44 for a grazing angle of 0.1° but otherwise identical data using a calculation identical to that for FIG. 36.

6.16.0 Beam adjustment 6.16.1 Beam adjustment linkage

A mechanical linkage for making small adjustments to the direction of the beam of electromagnetic energy output by a twenty-fifth embodiment of the apparatus, or of parts of said beam, will now be described with reference to FIGS. 45 to 52. The function of such a linkage is to move a defined mirror of the last in the or one of the series of stages in a controlled manner in one or more directions and/or through one or more rotations relative to the remainder of the apparatus and thus, in particular, relative to the defining mirror of said final stage.

Part of the twenty-fifth embodiment is shown in FIG. 46 as a sectional end elevation and in FIG. 45 as a sectional front elevation. Although the plane of the section for the sectional end elevation of FIG. 46 is drawn in FIG. 45, that sectional end elevation is for the entire portion of the twenty-fifth embodiment shown in those figures and not merely that half of it shown in FIG. 45. Moreover, in FIG.

45, the source 3 is shown in purely schematic form; sonic details of the third stage defined mirror 35 have been omitted for clarity; and a leg 36, being thin, is drawn in its entirety, so that its section in a respective further plane 191 may be drawn in its entirety in FIG. 47 in enlarged form.

Said part of the twenty-fifth embodiment includes three stages where each stage comprises a defining mirror and its corresponding defined mirror. In the sectional front elevation of FIG. 45 an axis of symmetry 18 lies in the plane of the paper.

The first stage is nearest the source 3 and comprises a first stage defining mirror 30 and a first stage defined mirror 31. The second stage is the next nearest to the source 3 and comprises a second stage defining mirror 32 and a second stage defined mirror 33. The third stage is furthest from the source 3 and comprises a third stage defining mirror 34 and a third stage defined mirror 35.

The first, second and third stage defining mirrors 30, 32 and 34 respectively form a defining unit in which an edge of the reflective surface of said first stage defining mirror 30 is everywhere contiguous with an edge of the reflective surface of said second stage defining mirror 32 and the other edge of the reflective surface of said second stage defining mirror 32 is everywhere contiguous with an edge of the reflective surface of said third stage defining mirror 34; so that said defining mirrors form a continuous reflective surface.

The first and second stage defined mirrors 31 and 33 respectively similarly form a fixed defined unit in which an edge of the reflective surface of said first stage defined mirror 31 is everywhere contiguous with an edge of the reflective surface of said second stage defined mirror 33; so that said defined mirrors form a continuous reflective surface.

The first, second and third stage defining mirrors 30, 32 and 34 respectively and the first and second stage defined mirrors 31 an(33 respectively are symmetric about the axis of symmetry 18 while the third stage defined mirror 35 is symmetric about an axis of symmetry 40 which may, or may not, be aligned with the axis of symmetry 18 according to the movement of said third stage defined mirror 35. A recess 39 is cut in the second and/or the third stage defining mirror to accept means to move the third stage defined mirror 35. Two further recesses identical to said recess 39 are equidistant from the axis of symmetry 18 and equally spaced around it.

6.16.1.1 Fixed tripod

Three legs 36, 37 and 38 of a fixed tripod attach the defining unit formed by the first, second and third stage defining mirrors 30, 32 and 34 respectively to the fixed defined unit formed by the first and second stage defined mirrors 31 and 33 respectively.

The leg 36 is symmetric about a respective half-plane 192 through the axis of symmetry 18 and its section in a respective further plane 191 at right angles to said respective half-plane 192 through said axis of symmetry 18 and to its length is an isosceles triangle whose unequal angle 193 lies nearer to the source 3 than its equal angles. FIG. 47 shows an enlarged section of said leg 36 through said respective further plane 191 in which the width of said section has been enlarged much more than its length.

The leg 36 is reflective and the unequal angle 193 is small compared with the largest grazing angle for any ray amongst the rays of electromagnetic energy incident upon it.

And, the unequal side of said isosceles triangle is small compared with its equal sides.

The legs 37 and 38 are identical to the leg 36. The legs 36, 37 and 38 are equidistant from the axis of symmetry 18 and equally spaced around it.

6.16.1.2 Moving tripod

That part of said twenty-fifth embodiment shown in FIG. 48 in schematic form comprises an axial drive unit, its corresponding transverse drive unit, and its corresponding leg of a moving tripod together with mountings for said units.

An axial drive unit comprises an electrically powered motor 41, a backlash free reduction gearbox 42 and a recirculating roller screw which includes a nut 43 divided into two halves 43A and 43B preloaded against each other and a screw shaft 44. This preload eliminates play between the nut 43 and the screw shaft 44, increases the rigidity of the drive, and prevents any unwanted linear motion of the nut 43 by precluding its conversion to rotary motion of the screw shaft 44. The axis of the motor shaft 45 of the motor 41, the axis of the screw shaft 44 and the axis of symmetry 18 are parallel to each other. A pair of taper roller bearings 46 and 47 preloaded against each other locate and support one end of the screw shaft 44. A cylindrical roller bearing 48 supports the other end of the screw shaft 44. The motor 41, the reduction gearbox 42 and the cylindrical roller bearing 48 are attached to the defining unit formed by the defining mirrors 30, 32 and 34 by a flange 49. The pair of taper roller bearings 46 and 47 are attached to the third stage defining mirror 34 by a second flange 50.

The motor shaft 45 of the motor 41 is attached to the input shaft 51 of the reduction gearbox 42. The output shaft 52 of the reduction gearbox 42 is attached to the screw shaft 44.

The mountings on the defining unit for said axial drive unit and two further axial drive units whose construction and attachment are identical to that of said axial drive unit are equidistant from the axis of symmetry 18 and equally spaced around it.

A second pair of taper roller bearings 53 which are preloaded against each other and a transverse drive unit are attached to one half 43B of the nut 43 by a third flange 54 and are free both to move axially and to rotate with the nut 43. When the screw shaft 44 is stationary, such movement is helical. The transverse drive unit is smaller and less powerful than the axial drive unit. The second pair of taper roller bearings 53 supports a leg 55 of a moving tripod which is free to rotate about said second pair of taper roller bearings 53 in a plane through the axis of the screw shaft 44 as well as to move with the nut 43.

The transverse drive unit comprises a further electrically powered motor 56, a further backlash free reduction gearbox 57 and a further recirculating roller screw which includes a further nut 58 divided into two halves 58A and 58B preloaded against each other and a further screw shaft 59. This preload eliminates play between the nut 58 and the further screw shaft 59, increases the rigidity of the drive, and prevents any unwanted linear motion of the nut 58 by precluding its conversion to rotary motion of the further screw shaft 59. The axis of the further screw shaft 59 lies in the plane through the axis of the screw shaft 44 at right angles to the axis of the screw shaft 44. A third pair of taper roller bearings 60 and 61 preloaded against each other locate and support the further screw shaft 59.

The further motor 56, the further reduction gearbox 57 and the third pair of taper roller bearings 60 and 61 are attached to one half 43B of said nut by the third flange 54.

The further motor shaft 62 of the further motor 56 is attached to the further input shaft 63 of the further reduction gearbox 57. The gears in the further reduction gearbox 57 are worm or spiroid gears and the reduction provided by said further reduction gearbox 57 is much greater than that provided by the reduction gearbox 42. The axis of the further motor shaft 62 of the further motor 56 is parallel to the axis of the screw shaft 44. The further output shaft 64 of the further reduction gearbox 57 is attached to the further screw shaft 59.

The half 58B of the further nut 58 is attached by a fourth flange 65 to a, fourth pair of taper roller bearings 66 which are preloaded against each other. The fourth pair of taper roller bearings 66 supports a strut 67 lying in the plane through the axis of the screw shaft 44. The other end of the strut 67 is supported by a fifth pair of taper roller bearings 68 which are preloaded against each other. The fifth pair of taper roller bearings 68 is attached to the leg 55 of the moving tripod by a fifth flange 69.

The further nut 58 is prevented from rotating with respect to the leg 55 of the moving tripod and said further recirculating roller screw by the strut 67 and the fourth and fifth pairs of taper roller bearings 66 and 68 respectively. So that the further motor 56 drives the leg 55 of the moving tripod in the plane through the axis of the screw shaft 44.

That end of the leg 55 of the moving tripod not supported by the second pair of taper roller bearings 53 incorporates a spherical bearing 70 whose sphere 71 is attached to the third stage defined mirror 35 by a mounting 89 (shown only in FIG. 52). The spherical bearing 70 is recessed inside the third stage defined mirror 35 so that it will not be heated by or impede the electromagnetic energy. The sphere 71 has two flats formed by the symmetrical removal of parts of its periphery which are connected by a bolt hole through its centre and perpendicular to said flats in order to facilitate its attachment to a mounting 89 after entry through a recess 85 in the third stage defined mirror.

The strut 67 has to resist unwanted rotation of the leg 55 of the moving tripod in the plane through the axis of the screw shaft 44. The line of action of the force exerted by the spherical bearing 70 on its sphere 71 due to a movement of the axial drive unit alone is parallel to the axis of said screw shaft 44. In order to miniminise the force caused by such a movement due to the inertia of the third stage defined mirror 35, which is attached to the sphere 71, on the strut 67 and said further and smaller recirculating roller screw together with the bearings and flanges which connect them, the leg 55 of the moving tripod is arranged to be as near parallel to the axis of the screw shaft 44 as feasible and the fifth pair of taper roller bearings 68 is arranged to be as near to the spherical bearing 70 as feasible.

FIG. 49 shows an end elevation in schematic form of the screw shaft 44, the two halves 43A and 43B of the nut 43, the third flange 54, the second pair of taper roller bearings 53, the leg 55 of the moving tripod, the spherical bearing 70 together with its sphere 71 and the plane through the axis of the screw shaft 44, which plane is numbered 195. The leg 55 of the moving tripod, the second pair of taper roller bearings 53, the spherical bearing 70 and the sphere 71 (other than its two flats and its bolt hole) are symmetric about the plane 195 through the axis of the screw shaft 44.

FIG. 50 is similar to FIG. 48 but shows only the leg 55 of the moving tripod together with the bearings at its two ends, the leg 36 of the fixed tripod and a second further plane 194 at right angles to said plane 195 and to the line joining the centre of the second pair of taper roller bearings 53 to the centre of the sphere 71. FIG. 51 shows a section of the leg 55 and the leg 36 in that second further plane 194. It will be seen that the plane 195 through the axis of the screw shaft 44 and the respective half-plane 192 coincide in FIG. 51 although that is not necessarily the case. The section of the leg 55 in the second further plane 194 is a rectangle whose smaller sides are equal in length to the unequal side of said isosceles triangle which forms the smallest side of the leg 36 of the fixed tripod.

Said axial drive unit is mounted in such a, position that the leg 55 of said moving tripod is close to the leg 36 of the fixed tripod; and such that, when the plane 195 through the axis of the screw shaft 44 (which is also the plane of symmetry of said leg 55 of the moving tripod) passes through the axis of symmetry 18, it coincides with the respective half-plane 192 and the smaller sides of said leg 55 are lined up with the unequal side of said leg 36 of the fixed tripod, as in FIG. 51. These two precautions minimise the amount of electromagnetic energy which can be incident on that smaller side of said leg 55 of the moving tripod which is nearest to the source 3. Said leg 55 of the moving tripod is reflective. These three precautions minimise the heating of said leg 55 of the moving tripod by the electromagnetic energy.

The leg 55 of the moving tripod passes through the second and/or the third stage defining mirror by means of the recess 39. As the smaller sides of the rectangular section of the leg 55 in the second further plane 194 are smaller than the seperation of the flats of the sphere 71, the size of the recess 39 and that recess in the third stage defined mirror 35 which allows said leg 55 to reach a mounting 89 are generally determined by the size of the spherical bearing 70.

Two further legs of the moving tripod are driven in an identical manner to that of the leg 55. There are thus three transverse drive units as well as three axial drive units. And each further leg incorporates a further spherical bearing with a further sphere. The sphere 71 and said two further spheres are equidistant from the axis of symmetry 40 of the third stage defined mirror 35 and equally spaced around it, so that each leg of the moving tripod has the same relation to a leg of the fixed tripod when said axis of symmetry 40 of said third stage defined mirror 35 is aligned with the axis of symmetry 18.

FIG. 52 shows an end elevation of the third stage defined mirror 35 from the opposite direction to that in FIG. 46. Three mountings 89 on the inside of the third stage defined mirror 35 for the spheres of the spherical bearing 70 and said two further spherical bearings are connected by an equilateral triangular structure 72 as shown in FIG. 52. The equilateral triangular structure 72 serves both to stiffen the third stage defined mirror 35 and allows said three transverse drive units to tension the moving tripod in order to eliminate any play due to said spherical bearings. Said spherical bearings may be spherical roller bearings. It should also be mentioned that the force oil the sphere 71 due to the frictional torque exerted on the nut 43 by the screw shaft 44 is small compared to that which may be produced by a transverse drive unit.

Three electromagnetic actuators 73 are mounted one to a side on the equilateral triangular structure 72 with their moving parts 74 connected to the third stage defined mirror 35 by lugs 90 so as to be able to produce small distortions of said third stage defined mirror 35. If the distortions required are sufficiently small then electromechanical actuators may be used instead.

The moving tripod is least able to resist the rotation of the third stage defined mirror 35 about its axis of symmetry 40. However, such rotation does not affect the operation of the apparatus because of the symmetry of the third stage defined mirror 35 about the axis of symmetry 40. Equally, there is no point in extending and rotating all three legs of the moving tripod so as to produce such a rotation. Similarly for undesired rotation of the defined unit about the axis of symmetry 18.

6.16.2 Examples

A number of examples of the working of the moving tripod will now be described.

Figure 53:
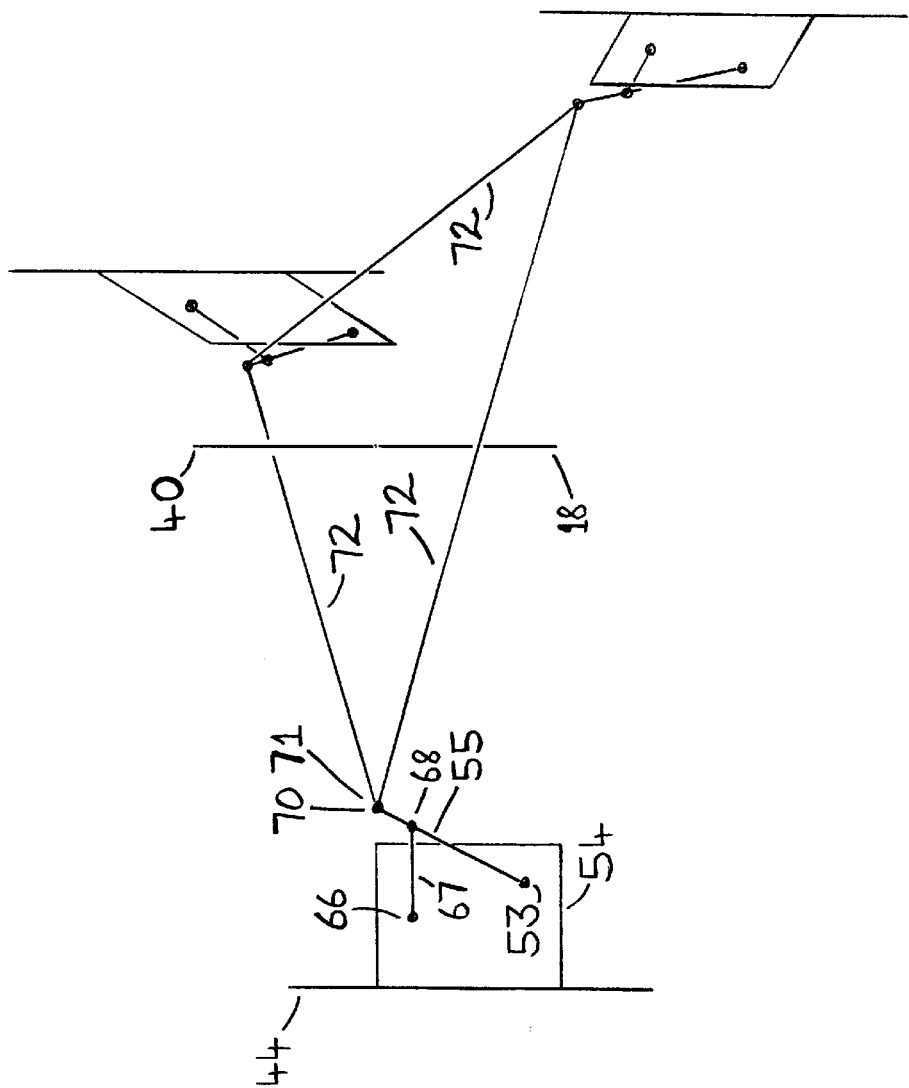

FIG. 53 is a schematic diagram in which the axial drive unit, its corresponding transverse drive unit, and its corresponding leg of the moving tripod are represented by the axis of the screw shaft 44, the third flange 54, the second pair of taper roller bearings 53, the leg 55 of the moving tripod, the fourth pair of taper roller bearings 66, the strut 67, the fifth pair of taper roller bearings 68, and the spherical bearing 70 together with its sphere 71. The two further legs of the moving tripod together with their corresponding axial and transverse drive units are represented in an identical manner, and the axis of symmetry 18 is also shown.

The third stage defined mirror is represented in FIG. 53 by the equilateral triangular structure 72 and its axis of symmetry 40.

6.16.2.1 Axial movement

If each of the input shafts of the reduction gearboxes rotates the same amount in the same direction simultaneously then each leg of the moving tripod and the third stage defined mirror 35 will move a small distance along the axis of symmetry 18 in the positive or negative x-direction depending on the direction of said rotations.

FIG. 53 shows the positions of the moving tripod and the third stage defined mirror during an axial movement in which the axis of symmetry 40 of said third stage defined mirror is aligned with the axis of symmetry 18 and the plane of symmetry of each of the legs of the moving tripod lies in that plane containing the axis of its screw shaft and said axis of symmetry 18. It will be appreciated that those axes of symmetry need not be either aligned or parallel during an axial movement. And that the plane of symmetry of any leg of the moving tripod does not necessarily lie in that plane containing the axis of its screw shaft and the axis of symmetry 18.

6.16.2.1.1 Effect of axial movement

An example of the effect of such axial movements on a ray will now be described with reference to FIG. 60 and the twenty-fifth embodiment.

The axis of symmetry 18 lies in the plane of the paper. A ray 75 which has been output from the second stage and which lies in the plane of the paper intersects the third stage defined mirror 35 at a point 76 and is reflected in the plane of the paper to intersect said third stage defining mirror 34 at a point 77. The gradient at said point 77 of the line of intersection of the third stage defining mirror 34 with the plane of the paper is $\gamma$. The ray 75 is reflected from the third stage defining mirror 34 in the plane of the paper with an output angle of $\beta$ to the x-axis.

The third stage defined mirror 35 is now moved a small distance $\Delta x$ in the positive x direction to a new position where it is numbered 35' so that said point 76 on it moves to a new position 76'. The ray 75 has been directed by the first and second stages so as to be substantially parallel to the x-axis. It now follows a new path 75' and intersects the third stage defined mirror 35' at a point 78 near said point 76' and is reflected in the plane of the paper to intersect the third stage defining mirror 34 at a point 79. The gradient at said point 79 of the line of intersection of the third stage defining mirror 34 with the plane of the paper is $\gamma'$. The ray 75 in its new path 75' is now reflected from the third stage defining mirror 34 in the plane of the paper with an output angle of 4' to the x-axis.

In this embodiment $\gamma > \gamma'$. As the gradient of the line of intersection of the third stage defined mirror 35' with the plane of the paper at said point 78 is only slightly different from that at said point 76 now at 76', the output angle $\beta' < \beta$. So that the effect of said axial movement $\Delta x$ in the positive x direction is to reduce the output angle of the ray 75 and make said ray 75 converge towards the axis of symmetry.

Equally, the output angle of the ray 75 is increased and said ray 75 is caused to diverge away from the axis of symmetry by an axial movement of the third stage defined mirror 35 in the negative x-direction. Similarly for all those rays lying in any plane through the axis of symmetry.

6.16.2.2 Rotations

Four further examples of the working of the moving tripod which illustrate the manner in which the third stage defined mirror 35 can usefully be rotated will now be described.

If both the axis of symmetry 40 of the third stage defined mirror 35 and the plane 195 of symmetry of the leg 55 of the moving tripod lie in the plane containing the axis of symmetry 18 and the axis of the screw shaft 44 then an axis through the two centres of the two further spheres must be at right angles to said plane containing said axis of symmetry 18 and said axis of said screw shaft 44. So that if the third stage defined mirror 35 is to rotate about said axis through the two centres of the two further spheres then the geometry of the apparatus described above requires that the leg 55 of the moving tripod must rotate in said plane containing the axis of symmetry 18 and the axis of said screw shaft 44 and at the same time move axially.

Figure 54:
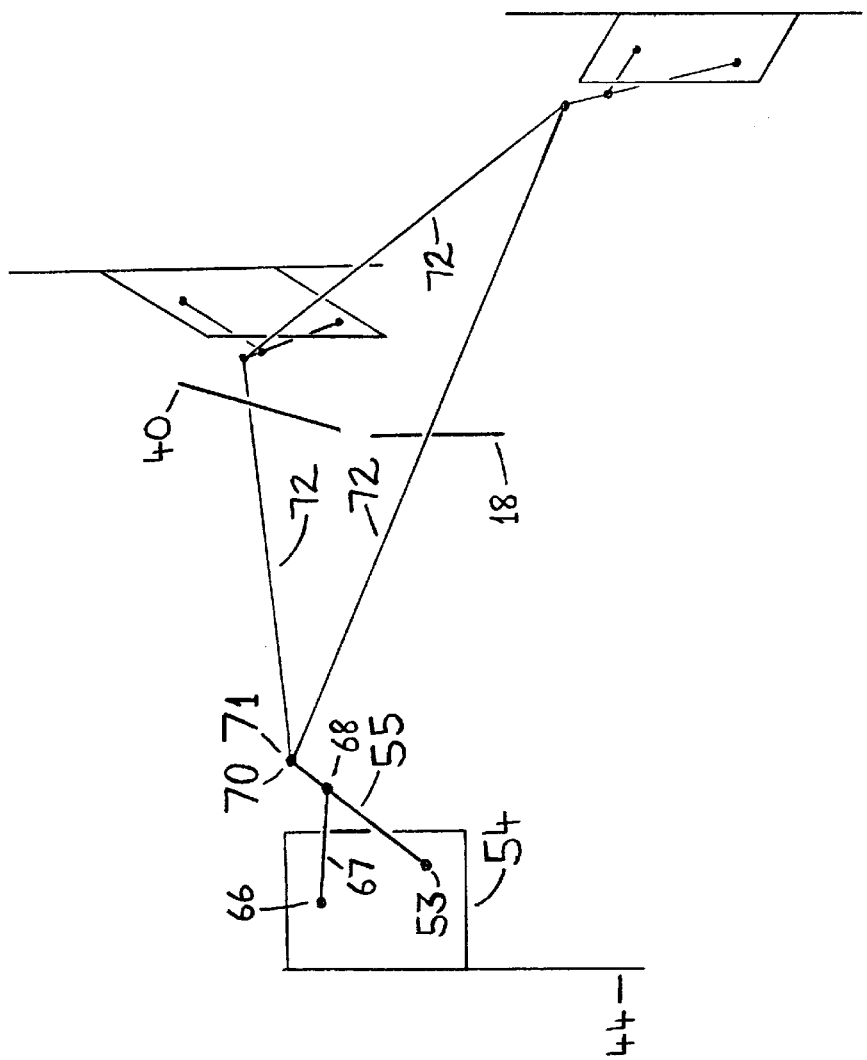

FIG. 54 is similar to FIG. 53 and shows the position of the moving tripod and the third stage defined mirror resulting from such a rotation from a position as shown in FIG. 53.

When the axis of symmetry 40 of the third stage defined mirror 35 does not lie in said plane containing the axis of symmetry 18 and the axis of the screw shaft 44 then the tensioning of the moving tripod moves the plane of symmetry of the leg 55 out of the plane containing said axis of symmetry 40 and the axis of said screw shaft 44.

If the axis of symmetry 40 of the third stage defined mirror 35 is not in said plane containing the axis of symmetry 18 and the axis of the screw shaft 44 and said third stage defined mirror 35 is to rotate about an axis through the two centres of the two further spheres then the geometry of the apparatus described above requires that the leg 55 of the moving tripod must not only rotate in the plane through the axis of its screw shaft 44 and at the same time move axially but must also rotate around the axis of its screw shaft 44 so that the rotation of the screw shaft 44 which causes its axial movement must be modified to compensate for the axial effect of said rotation.

Figure 55:
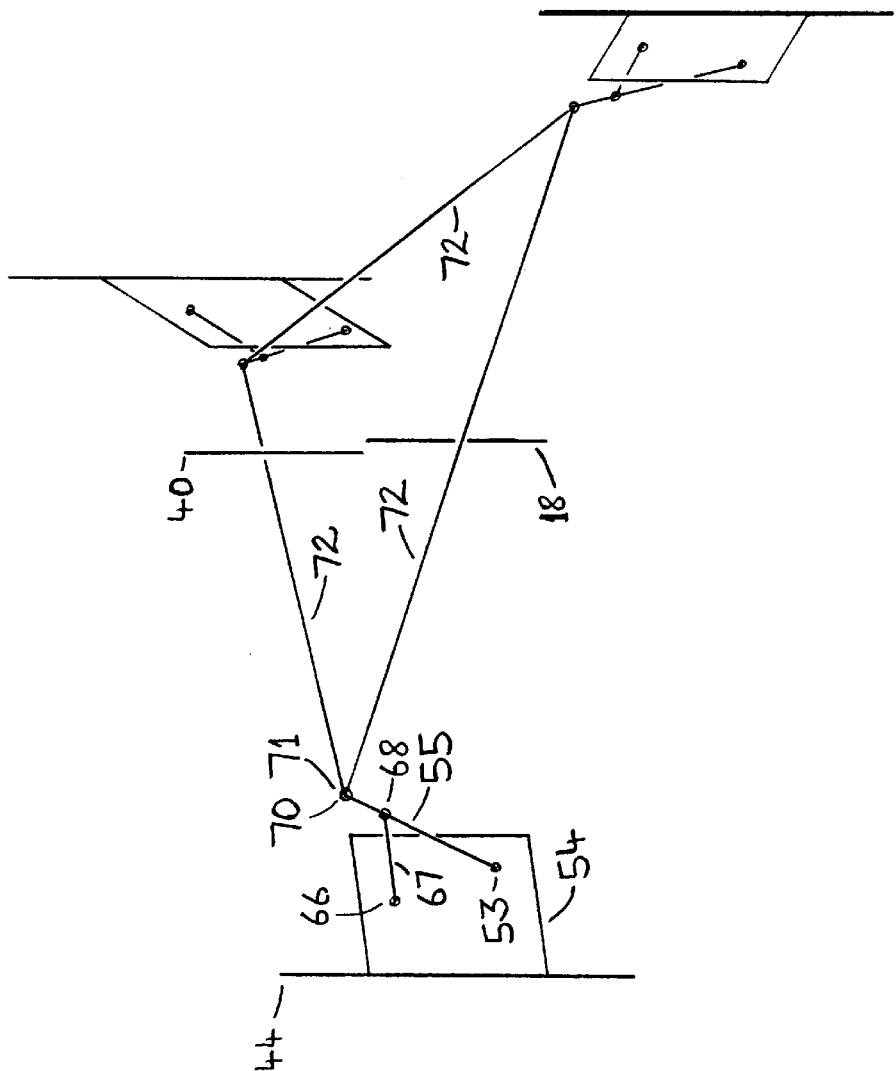
Figure 56:
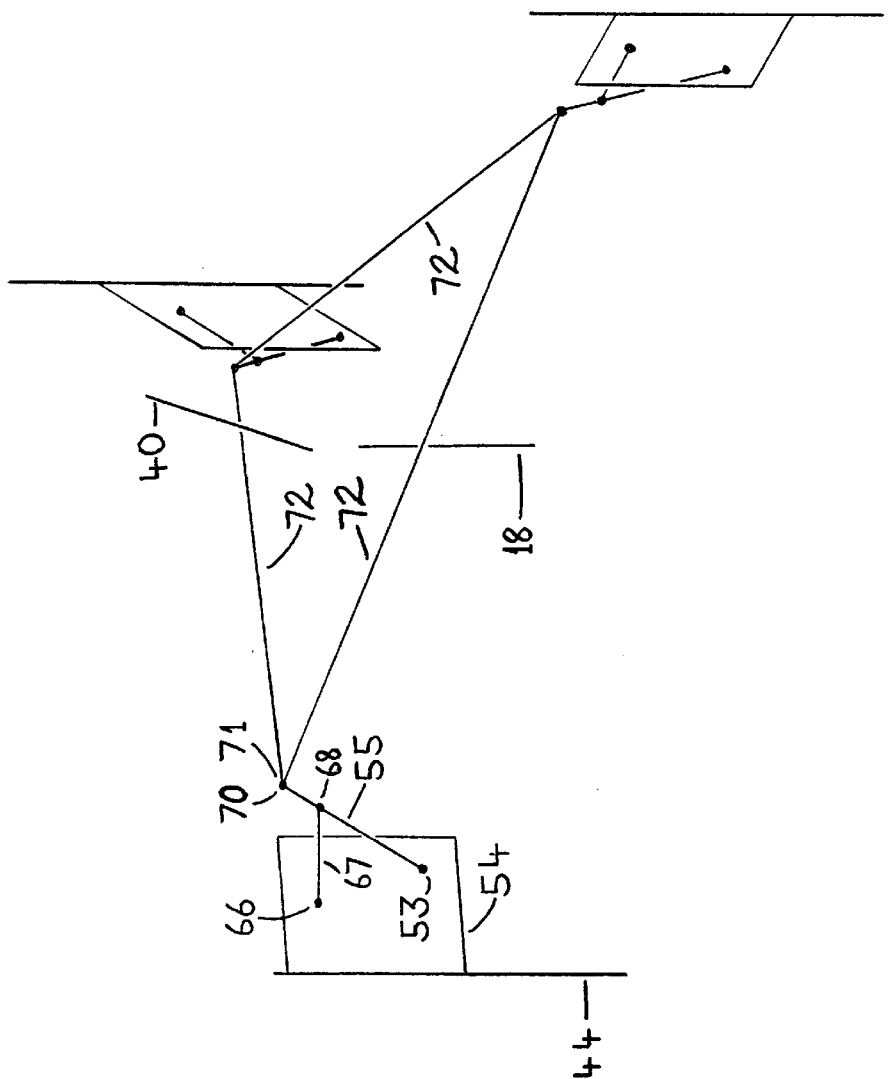

FIGS. 55 and 56 are similar to FIG. 53 and show the initial and final positions of the moving tripod and the third stage defined mirror in such a rotation.

As the rotations required of the third stage defined mirror 35 amount to only $\pm 1\frac{1}{2}°$ at most the movements required of said transverse drive unit are small.

Said rotary compensations for the axial effect of rotation of a leg of a moving tripod about the axis of its screw shaft are extremely small.

If the third stage defined mirror 35 is to rotate about an axis through the centre of the sphere 71 but not the centre of any other sphere then the two further legs of the moving tripod must move at the same time.

Figure 57:
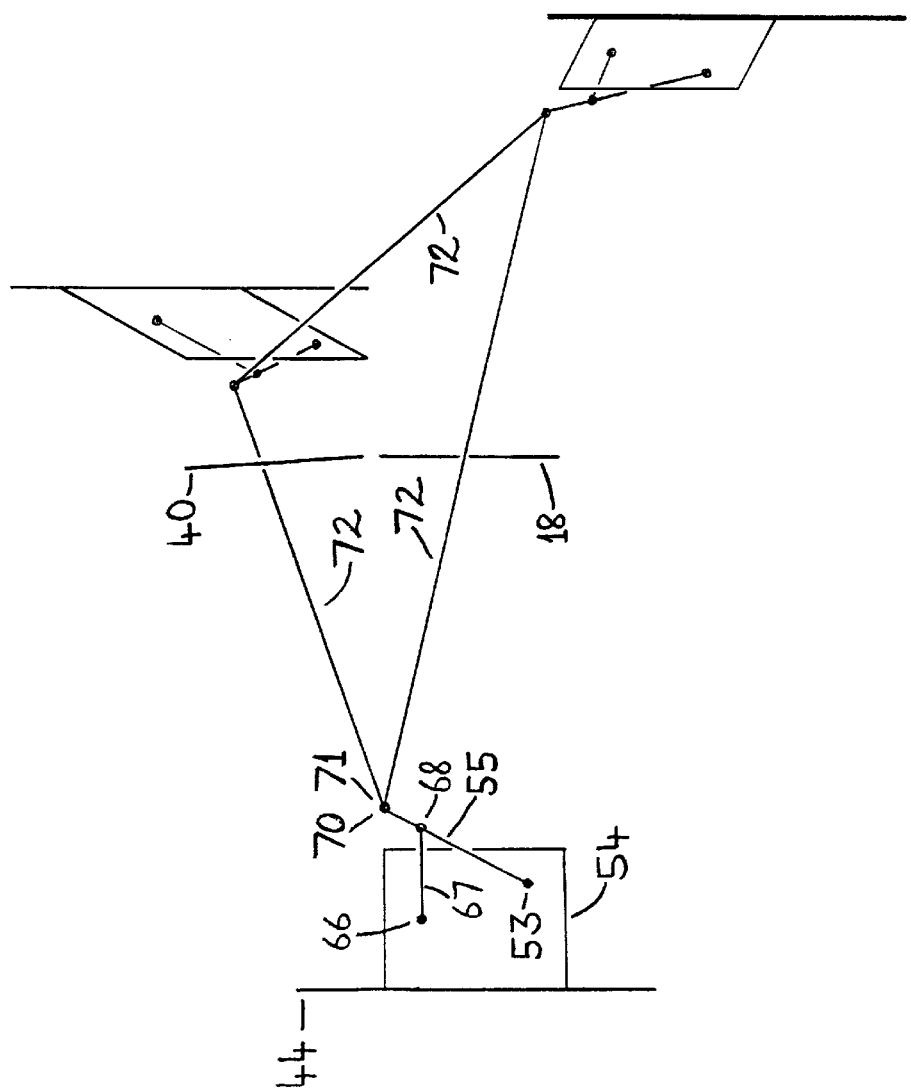

FIG. 57 is similar to FIG. 53 and represents the position of the moving tripod and the third stage defined mirror resulting from such a rotation from a position as shown in FIG. 53.

If the third stage defined mirror 35 is to rotate about an axis which does not pass through any of the centres of the spheres (and which is not its own axis of symmetry 40 as aforesaid ) then all three of the legs of the moving tripod must move at the same time.

Figure 58:
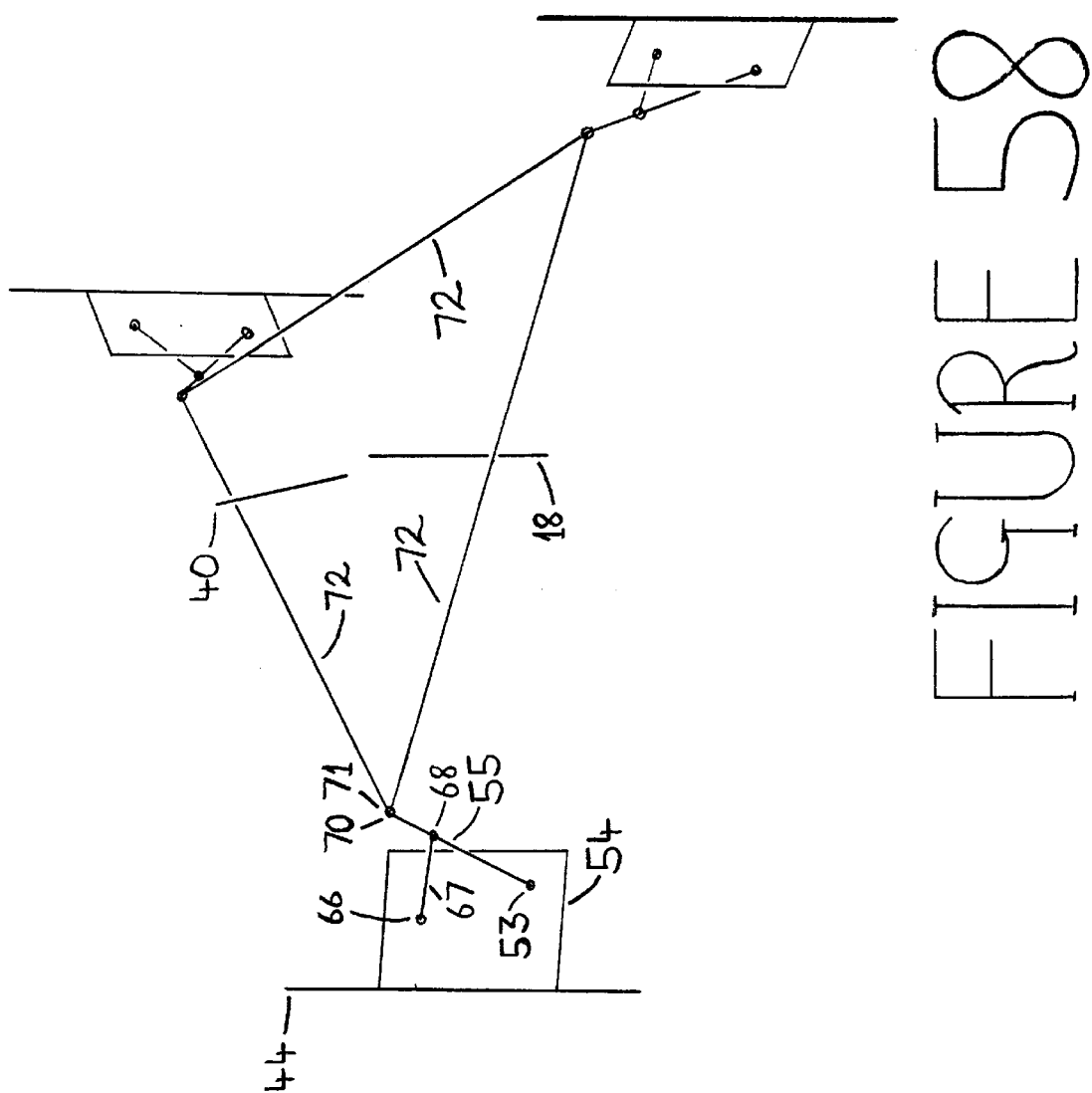

FIG. 58 is similar to FIG. 53 and represents the position of the moving tripod and the third stage defined mirror resulting from such a rotation.

6.16.2.2.1 Effect of a rotation.

An example of the effect of a rotation will now be described. The twenty-sixth embodiment includes a third stage defining mirror 34 which extends over a portion of a sphere whose centre 80 lies on the axis of symmetry 18. The axis of symmetry 18 lies in the plane of the paper in FIG. 61 which also shows the line of intersection of the third stage defining mirror 34 with the plane of the paper.

A third stage defined mirror 35 which is symmetric about an axis of symmetry 40 has rotated about the centre 80 in such a way that its axis of symmetry 40 has moved from being aligned with the axis of symmetry 18 to a new position 40' in the plane of the paper. So that the axis of that rotation is a line through the centre 80 at right angles to the plane of the paper. The new position of the third stage defined mirror 35 is numbered 35'.

Before said rotation, two defining rays 5 and 6 lying in the plane of the paper defined a point 81 on the third stage defined mirror 35. The line of intersection of the third stage defined mirror 35 with the plane of the paper and said point 81 are shown in their rotated positions 35' and 81' respectively together with the respective paths 5' and 6' to which those defining rays 5 and 6 would have rotated with said third stage defined mirror 35.

A further ray 82 lying in the plane of the paper between the paths 5' arid 6' to which those defining rays 5 and 6 would have rotated is incident to the third stage defined mirror 35' at said point 81'.

Since the section of the third stage defining mirror 34 in the plane of the paper is a portion of a circle of centre 80 and since the third stage defined mirror 35 has rotated about said centre 80 in such a way that its axis of symmetry 40 has moved from being aligned with the axis of symmetry 18 to a new position 40' in the plane of the paper and since the further ray 82 lies in the plane of the paper between the paths 5' and 6' to which the defining rays 5 and 6 would have rotated so said further ray 82 is directed but with respect to said axis of symmetry 40' rather than said axis of symmetry 18.

Thus the rotation of the third stage defined mirror 35 about the centre 80 of the spherical third stage defining mirror 34 caused the further ray 82 to be directed with respect to the rotated axis of symmetry 40' of said third stage defined mirror 35. Similarly for any axis of rotation through the centre 80.

It will be appreciated that rotating the spherical third stage defining mirror 34 about its centre 80 would not affect the further ray 82. Otherwise, however, there is no reason why the defining mirror of the last in the or one of the series of stages could not be moved in a controlled manner in one or more directions and/or through one or more rotations relative to the remainder of the apparatus and thus, in particular, relative to a defined mirror of said final stage as an alternative to moving the defined mirror of said final stage and with similar effects.

6.16.2.3 Transverse movement

A final example of the working of the moving tripod will now be described.

In this final example, the axis of symmetry 40 of the third stage defined mirror 35 is aligned with the axis of symmetry 18 and the plane of symmetry of each of the legs of the moving tripod lies in that plane containing the axis of its screw shaft and said axis of symmetry 18, and said third stage defined mirror 35 is to move transversely in the plane containing said axis of symmetry 18 and the axis of the screw shaft 44 in a direction at right angles to said axis of symmetry 18. The geometry of the apparatus described above requires that the leg 55 of the moving tripod must rotate in the plane containing the axis of symmetry 18 and the axis of its screw shaft 44 and at the same time move axially, while both of the other legs of the moving tripod must at the same time rotate around the axes of their screw shafts by angles which are equal in magnitude but opposite in direction to each other, rotate in the planes through the respective axis of their screw shaft and (initially) said axis of symmetry 18, and move axially by equal distances. But the rotations of their screw shafts must comprise the sum of a common amount and amounts which are equal in magnitude but opposite in direction in order to compensate for the axial effects of said rotations in opposite directions.

Figure 59:
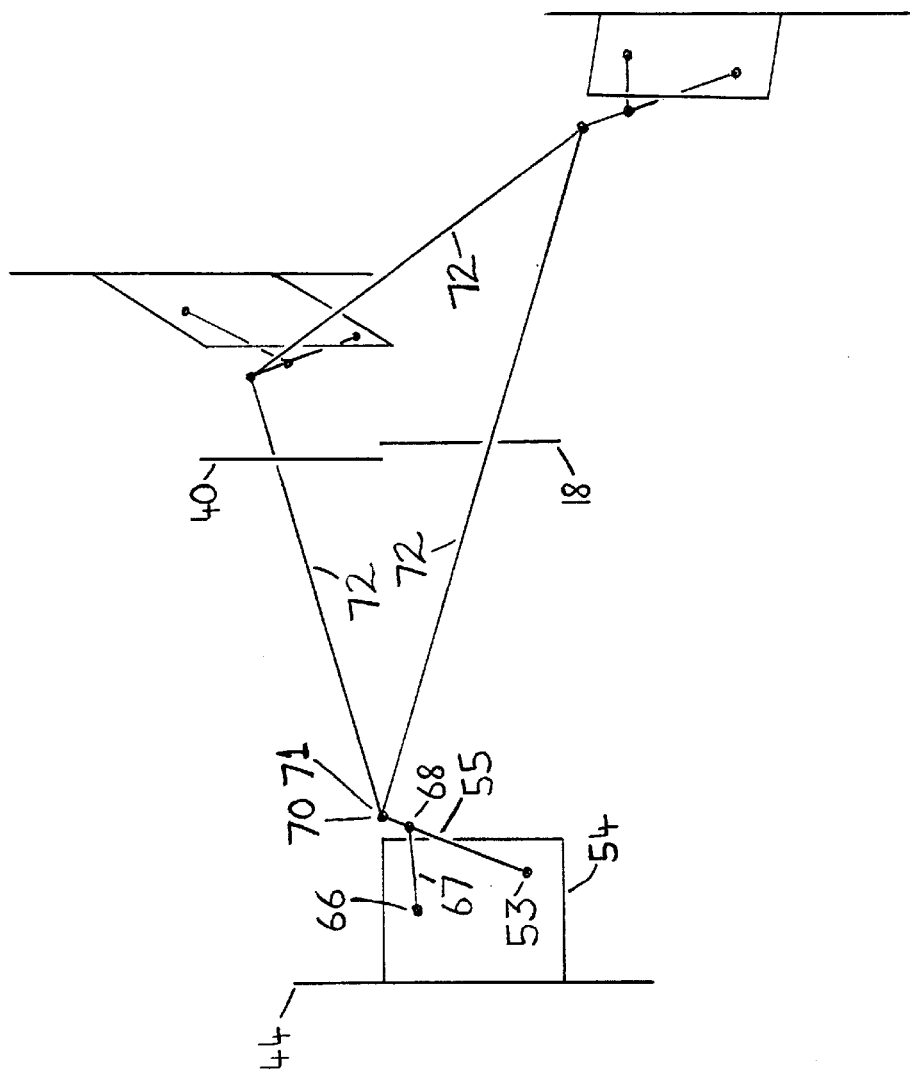

FIG. 59 is similar to FIG. 53 and represents the position of the moving tripod and the third stage defined mirror resulting from such a transverse movement from a position as shown in FIG. 53.

It will be appreciated that the third stage defiled mirror 35 may equally be made to move in any other direction in a plane at right angles to the axis of symmetry 18.

6.16.2.3.1 Effect of a transverse movement

An example of the effect on a ray of a transverse movement at right angles to the axis of symmetry 18 of the third stage defined mirror 35, and/or of a transverse distortion at right angles to the axis of symmetry 18 of said third stage defined mirror 35 by an electromagnetic actuator 73, will now be described with reference to FIG. 62 and a twenty-seventh embodiment of the apparatus. The axis of symmetry 40 of the third stage defined mirror 35 is aligned with the axis of symmetry 18. The plane of the paper is that plane through the axis of symmetry 18 which contains both the x and y axes.

A ray 83 which has been output from the second stage and which lies in the plane of the paper intersects the third stage defined mirror 35 at a point 84. The gradient at said point 84 of the line of intersection of the third stage defined mirror 35 with the plane of the paper is $\gamma_0$. The ray 83 is reflected in the plane of the paper to intersect the third stage defining mirror 34 at a point 88. The gradient at said point 88 of the line of intersection of the third stage defining mirror 34 with the plane of the paper is $\gamma$. The ray 83 is reflected from the third stage defining mirror 34 in the plane of the paper with an output angle of $\beta$ to the x-axis.

The third stage defined mirror 35 or that part of it near said point 84 is now moved a small distance $\Delta y$ in the positive y-direction to a new position where it is numbered 35'. In this embodiment, the ray 83 has been directed by the first and second stages so as to be substantially parallel to the x-axis, so that it now intersects the third stage defined mirror 35' at a point 86 whose y co-ordinate is very nearly the same as that of said point 84. The gradient at said point 86 of the line of intersection of the third stage defined mirror 35' with the plane of the paper is $\gamma'_0$. In this embodiment, $\gamma'_0 > \gamma_0$.

The ray 83 is now reflected from the third stage defined mirror 35' in the plane of the paper along a new path 83' to intersect the third stage defining mirror 34 at a point 87'. If $\gamma'$ had been equal to $\gamma_0$ then said intersection would have been at a point 87. The gradient at said point 87' of the line of intersection of the third stage defining mirror 34 with the plane of the paper is $\gamma'$, while that at said point 87 is $\gamma''$.

The ray 83 in its new path 83' is now reflected from the third stage defining mirror 34 in the plane of the paper with an output angle of β' to the x-axis. In this embodiment, γ'>γ" so that the effect of γ'$_0$>γ$_0$ in decreasing the output angle is offset by the effect of γ'>γ" in increasing it.

In this embodiment γ'>γ while γ'$_0$>γ'$_0$ has neglible effect so that the output angle β'>β.

Thus in this embodiment said transverse movement and/or distortion Δy of the third stage defined mirror 35 in the positive g direction distorts that part of the output beam comprising the ray 83. It will be appreciated that the effect of said transverse movement and/or distortion will not be the same for rays which are axially symmetric to the ray 83 but lie in other half-planes through the axis of symmetry 18. It will also be appreciated that in another embodiment the output angle may increase rather than decrease for the same movement, and that the relationship between the effect and the sense of the transverse movement and/or distortion depends on the gradients of the third stage defining and defined mirrors.

6.16.3 Force exerted on a sphere

In some applications of the apparatus a sphere attached to a third stage defined mirror 35 may be subject to an extraneous linear acceleration which results in a change in velocity of the sphere and which may have any direction with respect to the apparatus. Such an extraneous linear acceleration may be caused by linear and/or angular accelerations and/or the angular velocity of the apparatus itself or of a turret in which it is mounted, and/or by linear and/or angular accelerations and/or the angular velocity of a vehicle in which the apparatus or any such turret is fitted (in which case, the linear acceleration of the apparatus or turret relative to the vehicle should be minimal). That part of the acceleration of the sphere which may be related only to the velocity of the sphere is regarded as the centripetal acceleration.

The third stage defined mirror 35 together with its various appendages will also be subject to such extraneous linear accelerations. The centre of mass of the equilateral triangular structure 72 is at its centroid which lies on the axis of symmetry 40 of the third stage defined mirror 35. The mountings 89, the electromagnetic actuators 73 together with their moving parts 74, and the lugs 90 are equidistant from the axis of symmetry 40 and equally spaced around it in planes at right angles to said axis of symmetry 40 which pass through or close to said centroid. The centre of mass of the third stage defined mirror 35 lies on the axis of symmetry 40, although not necessarily at said centroid. So that the centre of mass of the third stage defined mirror 35 together with its various appendages lies on the axis of symmetry 40 close to said centroid.

Said centroid lies at the mean of the positions of the sphere 71 and the two further spheres. So that any calculation of the forces on the spheres which are required to produce any linear acceleration of the third stage defined mirror 35 together with its various appendages may be made approximately by assuming that one third of the mass of said third stage defined mirror 35 together with its various appendages lies at each of the centres of the three spheres.

The third stage defined mirror 35 together with its various appendages and the three spheres attached to it, which form a moving defined unit, may be subject to an extraneous angular acceleration caused by the angular accelerations mentioned above. The equilateral triangular structure 72 and the electromagnetic actuators 73 together with their moving parts 74 are nearer to the axis of symmetry 40 than the spheres. The mountings 89 and the lugs 90 are at approximately the same distance from the axis of symmetry 40 as the spheres. While the third stage defined mirror 35 is partly nearer to and partly further from the axis of symmetry 40 than the spheres. So that the moment of inertia of the moving defined unit about an axis through the centroid either co-incident with the axis of symmetry 40, or nearly parallel to it, is approximately the same as that of three masses, each of one third of the mass of that moving defined unit lying at one of the centres of the three spheres. Such an approximation will also hold for any instantaneous axis of rotation parallel to such an axis through the centroid by virtue of the Theorem of Parallel Axes.

The moment of inertia of a third stage defined mirror 35 about an axis at a larger angle to the axis of symmetry 40 cannot either be approximated or calculated without first designing that third stage defined mirror; so that other instantaneous axes of rotation cannot be considered. Moreover, the useful rotations of the third stage defined mirror 35 are about axes nearly at right angles to the axis of symmetry 40. Hence only axial and transverse movements of the moving defined unit will be considered.

The greatest possible magnitude of said extraneous linear acceleration may vary according to the application from being much less than that acceleration required to make the maximum axial movement desired of said sphere with respect to the defining unit in the time available to being somewhat greater than that acceleration.

The maximum axial force required to move said sphere and its third of the third stage defined mirror 35 together with its various appendages axially must produce the sum of the maximum axial component of said extraneous linear acceleration plus the acceleration required to make the maximum axial movement desired of said sphere with respect to the defining unit in the time available when these two accelerations have the same direction.

The maximum transverse force required to move said sphere and its third of the third stage defined mirror 35 together with its various appendages transversely must produce the sum of the maximum transverse component of said extraneous linear acceleration plus the acceleration required to make the maximum transverse movement desired of said sphere with respect to the defining unit in the time available when these two accelerations have the same direction.

Therefore, although the maximum transverse movement desired in the time available, and thus the acceleration required to produce it, is smaller than the maximum axial movement desired in the time available, the maximum transverse force required may not be that much smaller than the maximum axial force required.

Any calculation of the actual forces exerted on each sphere must, of course, take account of the forces tensioning the moving tripod.

Since the line of action of a force exerted by the spherical bearing 70 on its sphere 71 to give it said extraneous linear acceleration may have any direction, and since it is desired to minimise the force exerted on the strut 67 and said further and smaller recirculating roller screw together with the bearings and flanges which connect them, the fifth pair of taper roller bearings 68 is arranged to be as near to said spherical bearing 70 as feasible and the leg 55 of said moving tripod is arranged to be as long as feasible.

6.17.0 Sources
6.17.1 Applicable types

The source 3 may comprise any source of electromagnetic energy provided the wavelength or some portion of the set of wavelengths it emits may in whole or in part be reflected either specularly or in accordance with some known law or, in the alternative, be refracted in accordance with Snell's or some other known law. Such a portion of the set of wavelengths may include both lines and bands. There is no requirement for any elementary radiators in the source 3 to be coherent with each other. Indeed, there is no need for an elementary radiator to be coherent at all, although in reality it will be, unless one or more of the reflecting or refracting surfaces is coated to enhance its performance by means of interference effects. When reflective surfaces are used, the reflectivity at such wavelengths need not necessarily be high.

If electromagnetic energy of one or more of the wavelengths emitted by the source 3 is transmitted through a material whose boundary forms one of the defining or defined surfaces then a further seperately specified surface may be provided in order to adequately reflect that electromagnetic energy.

The grazing angle of a ray of that electromagnetic energy with a defining or defined mirror may be arranged to be small in order that such a surface may adequately reflect that electromagnetic energy.

6.17.2 Multiple sources

Two or more sources may be used, either seperately or simultaneously, with one embodiment of the apparatus. FIG. 63 is a schematic diagram showing part of a section of a twenty-eighth embodiment of the apparatus in a plane through the axis of symmetry 18. All of the items shown in FIG. 63 are symmetric about the axis of symmetry 18 and are formed by rotation about said axis of symmetry 18 except the plasma arcs 111. FIG. 63 includes a chemically powered source 3.1 comprising a converging shock tube, an electrically powered source 3.2 comprising a circular array of those plasma arcs 111, and a laser 3.3 which may be powered chemically, electrically, or by nuclear reactions. FIG. 63 also includes the first, second and third stage defining mirrors 30, 32 and 34 respectively together with the first, second and third stage defined mirrors 31, 33 and 35 respectively.

The source 3.1 includes a window 110 through which electromagnetic energy emitted by the plasma in the converging shock tube passes into the input aperture of the first stage of the apparatus. Electromagnetic energy from the circular array of the plasma arcs 111 comprised by the source 3.2 also passes into the input aperture of the first stage either directly or after reflection from a further mirror 112 in the form of a cylinder or a truncated cone placed inside it for that purpose. Electromagnetic energy from one of these sources may also be reflected into the apparatus by the other of these sources. The further mirror 112 reflects rays from either of said sources to a point on a defined mirror from which they will be reflected within the cone enclosing the well directed in and out-of-plane rays for said point. The converging shock tube may comprise a round of ammunition.

The electromagnetic energy emitted by the laser 3.3 is partially collimated and need only be passed through a final stage of the apparatus to complete its direction. Such partial collimation allows a laser to be used which has optics which are imperfect in design or manufacture, or which has inhomogeneities in its working medium, as the consequent errors will be corrected by the apparatus, There is a gap 113 in the third stage defined mirror 35 around a point 7 which would otherwise be on that third stage defined mirror 35 at the intersection of two defining rays 5 and 6 for said point 7.

An alternate defining ray 114 is incident to the third stage defining mirror 34 at a point 115 which is either intermediate between the respective further points and 10 at which the defining rays 5 and 6 are respectively incident to that third stage defining mirror 34 or the other side of the respective further point 10 (as shown) and thus intersects the defining ray 6 at an alternate point 116 which is inside the third stage defined mirror 35. The alternate point 116 lies on an alternate third stage defined mirror 117 which is defined by said alternate point 116 and similar points. A further alternate defining ray may be used instead of the defining ray 6.

FIG. 63 shows the optical cavity 118 of the laser 3.3 which is symmetric about the axis of symmetry 18 aforesaid and comprises an unstable resonator with an annular output aperture. The angular input aperture at the alternate point 116 is approximately equal to twice the maximum error in the collimation of that electromagnetic energy output from the optical cavity 118 which is incident at that alternate point 116. The gradient in the plane through the axis of symmetry 18 of the alternate third stage defined mirror 117 is chosen to reflect the partially collimated output from the annular output aperture of the optical cavity 118 through the gap 113 onto the third stage defining mirror 34 so that said third stage defining mirror 34 can direct it.

The alternate third stage defined mirror 117 is variously made to move parallel to the axis of symmetry 18, transversely to said axis of symmetry 18, and in rotation by a further moving tripod similar to that already described for the third stage defined mirror 35 but attached to the first or second stage defined mirror in order to control the output beam from the laser 3.3. As the gradient of the alternate third stage defined mirror 117 is obtuse while that of the third stage defined mirror 35 is acute, said transverse movements have the opposite effect to that described for said third stage defined mirror 35.

It is well known that plasmas with very high temperatures and pressures and measurable emissivities can be obtained in shock tubes and maintained for periods of the order of 100 milleseconds for use as a source of high-temperature thermal radiation. Individual plasma arcs with an electrical input of 300 kW are available from Vortek Industries Limited.

In a twenty-ninth embodiment of the apparatus, the laser 3.3 is replaced by a circular array of lasers whose phases are locked together or controlled individually. The output of each laser in said circular array replaces only a part of the output of the laser 3.3 and the gap 113 is replaced by holes in the third stage defined mirror 35 each of which is of sufficient size and suitably placed for the beam of a single laser to pass through after its reflection by the alternate third stage defined mirror 117.

6.17.2.1 Inertial fusion

A simple target for an embodiment of the apparatus intended to ignite fusion inertially comprises a cylindrical shell of heavy material enclosing, solid, liquid or gaseous fusion reactants. In an axially symmetric embodiment, such a target is situated some distance along the axis of symmetry 18 where the defining rays for the final stage(s) and the alternate defining rays for the or the innermost final stage are all chosen to give respective distributions of electromagnetic energy on the target which together will symmetrically implode it towards its axis. Said target is compressed first by electromagnetic energy from a source such as the shock tube 3.1 or the circular array of plasma arcs 3.2 and then also by one or more pulses from the laser 3.3 in order to achieve that increasing, or ramped, power level which avoids preheating along the axis of the target so that shock waves converge on the axis of the target and preferentially heat the fusion reactants there to a temperature at which they will undergo thermonuclear fusion and in turn ignite fusion in the remainder of the target. The ignition of inertial fusion has been extensively studied and many experiments have been conducted.

The heating of the target both as a result of such an implosion and the resultant fusion reaction(s) causes the emission of a considerable amount of electromagnetic energy. FIG. 64 shows part of a section of a twenty-ninth embodiment of the apparatus able to sustain fusion, which is similar to that in FIG. 63 but with a circular array of lasers 3.3 as described and a circular array of chemically or electrically powered shock tubes in place of the shock tube 3.1. There is no electrically powered source 3.2.

Moreover, the point of intersection 7 of the pair of defining rays 5 and 6 is a point on the third stage defined mirror 35, rather than in the hole 113, and the well directed rays from that point illuminate an entire target apart from its front end. And the alternate point of intersection 116 is at the intersection of the alternate defining ray 114 and a further alternate defining ray 176, rather than the defining ray 6, and the well directed rays from said alternate point 116 also illuminate the same area of that target as above. It will be appreciated, however, that this is by no means the only choice for said defining rays 5 and 6 and said alternate and further alternate defining rays 114 and 176 respectively.

In addition, a further alternate defined mirror 171 reflects the electromagnetic energy from the implosion of the target and the resultant fusion reaction(s) into the first stage of the apparatus from where it is directed by virtue of said choice of defining rays for the final stage to give either the same distribution of electromagnetic energy on the target as the other sources combined, or one having a similar effect, thereby recirculating part of that electromagnetic energy for the implosion of the next target without any prior conversions of that energy into and from electricity and the losses of energy consequent thereon. It will be appreciated that the further alternate defined mirror 171 may alternatively reflect said electromagnetic energy into a subsequent stage of the apparatus.

It will be appreciated that the third stage defining mirror 34 can be extended further to the right, so that some of its output angles can be less than $-\pi/2$. This allows the front end of a cylindrical target, as well as its other surfaces, to be compressed in order to facilitate a symmetrical implosion of such a target. In this arrangement, the point at which electromagnetic energy is emitted as a result of the implosion and the fusion reaction(s) is brought closer to the further alternate defined mirror 171 so that said mirror may collect a higher proportion of that electromagnetic energy.

A rail gun 172 propels a series of equally spaced cylindrical targets 173 along a line such as the axis of symmetry 18 at a very high speed which is chosen in relation to said spacing to synchronise the arrival of each pulse of recirculated electromagnetic energy and each target at the position where the implosion of that target is to take place. Each target 173 consists of a cylindrical shell 175 enclosing fusion reactants 174.

If the rate of fire of the rail gun is inadequate to achieve said spacing, more than one rail gun must be provided. If there is a common point of implosion, the trajectories of each of these rail guns must pass through that common point.

In an embodiment in which the defined mirrors of each of the final stage(s) are positioned by moving tripod(s), while the alternate defined mirror is positioned by the further moving tripod, the position at which a target will be imploded may differ for each target.

The recirculated energy may be used for the containment of the original target, or the implosion of a further part of the original target, as well as for the implosion of a succeeding target.

In a further refinement, the area on a target at which electromagnetic energy is directed moves in relation both to that target and the apparatus. Initially, electromagnetic energy is directed at the front of the target, which implodes. As the target is moving away from the apparatus faster than the area at which the electromagnetic energy is directed, electromagnetic energy recirculated from the initial fusion reaction implodes a portion of the target further away from its front; and this process continues until the implosion reaches the rear of the target. At this time, the rear of the target is further away from the apparatus than the point at which the initial implosion took place. When a successive target has reached that point, which may be some time after the implosion of the rear of the target, the electromagnetic energy from the remnants of the fusion of the target is directed at the front of said successive target; and the process begins again.

As the recirculation of electromagnetic energy requires at most seven reflections, at mirrors which may be of very high reflectivity for reasons which will be detailed in subsequent sections, the efficiency with which the energy collected by the further alternate defined mirror 171 can be recirculated may be very high. And both the recirculated electromagnetic energy, and the energy produced, may increase at each cycle.

As the energy from any point in or on a source is spread over a considerable distance around the annular exit aperture of the apparatus and superimposed on the energy from other such points, any emission of electromagnetic energy which is non-isotropic and/or varies from point to point in or on a source will be evened out in the output beam. As the defining rays may be chosen to give any desired distribution of electromagnetic energy at a target, such a distribution may be chosen to obtain the optimum mode of implosion of such a target.

For reasons which will be detailed in succeeding sections, the apparatus may output electromagnetic energy of low wavelengths, which avoid plasma shielding of the target; and also penetrate further into the target. Such high penetration minimises instabilities in the implosion of the target.

It will be appreciated that a target is not limited in shape to a cylinder, or to having a shell. Thus a target may be composed entirely of solid fusion reactants. Such a target may have a hollow centre. A target may be spherical for those embodiments of the apparatus in which electromagnetic energy converges symmetrically on the centre of the target. Alternatively, a target may not be either cylindrical or spherical.

It will also be appreciated that other sources of electromagnetic energy may be used to ignite fusion: in particular, other nuclear explosions. And that an accelerator other than a rail gun may be used to propel the targets.

In a further embodiment, one or more outermost parallel final stages direct an output beam, while the remaining parallel final stages illuminate an inertial fusion target. And the further alternate defined mirror reflects the electromagnetic energy from the inertial fusion into an intermediate stage of the apparatus such that some of it forms the output beam.

It will also be appreciated that as two or more sources may be used, either seperately or simultaneously, with one embodiment of the apparatus, as aforesaid, any recirculation may also be simultaneous with the operation of any other source. Indeed, the time taken for such a recirculation is generally in practice so short that one or more such recirculations will almost inevitably take place before a pulse of electromagnetic energy from an electromagnetic shock tube has been completed.

6.17.3 Internal sources

In some embodiments of the apparatus the source 3 lies inside the apparatus. FIGS. 65 to 73 are schematic diagrams showing various embodiments in which the source 3 lies between the defining and defined surfaces of one or more stages. For an axially symmetric embodiment of the apparatus, each of said diagrams comprises a section through the axis of symmetry 18. Said figures include the first, second and third stage defining mirrors 30, 32 and 34 respectively together with the first, second and third stage defined mirrors 31, 33 and 35 respectively. It will be appreciated, however, that said embodiments are not limited to surfaces which are reflective, and that the source 3 is not necessarily the only source.

In some embodiments of the apparatus one or more of said defining or defined surfaces forms either a part or the whole of the boundary enclosing a cavity in which the stimulated emission of radiation takes place. In some of these embodiments said cavity comprises a resonator. It will be appreciated that there is not necessarily any reason to limit the oscillation modes, since the direction, wavelength and spatial distribution of the radiation are all free. The only requirement is that the intensity of electromagnetic energy within the cavity is adequate for the desired stimulated emission of radiation to take place.

6.18.0 Mirrors

As the working of the apparatus itself does not require repeated reflection of the electromagnetic energy back and forth within a resonant cavity, the reflectivity of any mirrors in the apparatus need not necessarily be high. Of course, a lower reflectivity for any such mirror implies a lower energy efficiency for the apparatus and also a higher absorption for that mirror.

6.18.1 Metal mirrors

Metals have good reflectivity over a wide range of wavelengths (and, over most of their range, at all angles of incidence). The reflectivity of a metal for the component of electromagnetic energy incident upon it whose electric vector is normal to the plane of incidence of that electromagnetic energy is greater than its reflectivity for the component of that electromagnetic energy whose electric vector is parallel to said plane of incidence.

There is a (non-zero) minimum for the reflectivity of the component of that electromagnetic energy whose electric vector is parallel to said plane of incidence at a particular angle of incidence. At high angles of incidence (above the angle at which the component of that electromagnetic energy whose electric vector is parallel to said plane of incidence has a minimum) both these reflectivities tend to one. And the effect of surface roughness in reducing the specular reflectivity of a metal surface is less at high angles of incidence. Thus, as the grazing angles with the mirrors of the final stage in any series of stages may be arranged to be very low as aforesaid, so that the angles of incidence are high, the reflectivity of a metal surface is almost always sufficiently high for such a final stage.

FIG. 74 is a graph of the reflectivity of Aluminium in a vacuum at a wavelength of 0.2 $\mu$m where its refractive index is 0.11–i2.2. The reflectivity for the component of electromagnetic energy whose electric vector is normal to the plane of incidence is shown as a dotted line while that for the component of electromagnetic energy whose electric vector is parallel to the plane of incidence is shown as a solid line. The reflectivity ranges from 0 to 1 on the vertical axis while the angle of incidence ranges from 0° to 90° on the horizontal axis.

Reflection at a metal surface introduces a phase change (or shift) for each component of the electromagnetic energy of a particular wavelength incident upon it which varies with the angle of incidence and differ s according to whether the electric vector of that component of the electromagnetic energy is parallel to or normal to the plane of incidence. At norma incidence, when there is no way of distinguishing between the two components, these phase shifts are the same, or differ by $\pm\pi$, depending on the choice of convention for the measurement of the electric vectors from which the phase shifts are determined. At grazing incidence, when there is no effect, these phase shifts are either both zero, or one of them may be $\pm\pi$, depending on that choice of convention. Normal incidence almost never occurs in the apparatus, and grazing incidence can never quite occur. The phase shifts are not in general either the same or different by $\pm\pi$ for any other incidence. The phase shifts at non-grazing incidence are also dependent on the complex refractive index of the metal which varies with the wavelength of the incident electromagnetic energy. These phase shifts affect the shape of a reflected wave surface, each point on which shares a certain phase by definition.

6.18.1.1 Protective coating

However high its reflectivity, such a metal surface may be soft or easily oxidised and it may be desirable to give a surface such as Aluminium a protective coating consisting of a dielectric which is hard, transparent to all the wavelengths to be utilised by the apparatus, and does not absorb water; such as Magnesium Fluoride. The theoretical effects of such a single coating are the same as those detailed for a multiplicity of layers of different dielectrics in Section 6.18.2. But the practical effects of such a single coating differ from those of multiple coatings so that the most important of those practical effects will be detailed here.

For any particular wavelength, the thickness of the coating can be chosen to favour the reflectivity at high angles of incidence for the component of the electromagnetic energy of one of said orientations of the electric vector at the expense of the other, subject to an exception which will be described. At low angles of incidence, both reflectivities generally approximate to those of the bare metal irrespective of the thickness of the coating.

If the thickness of the dielectric is less than the quarter wave thickness given by $\lambda/4(n_1^2-n_0^2 \sin^2 \phi_0)^{1/2}$ where $\lambda$ is the wavelength of the electromagnetic energy in a vacuum, $n_0$ and $n_1$ are the (real) refractive indices of the incident medium and the dielectric respectively, and $\phi_0$ is the angle of incidence, the reflectivity of the metal surface coated with a dielectric for the component of the electromagnetic energy whose electric vector is parallel to the plane of incidence will be increased at high angles of incidence.

FIG. 75 is a graph similar to that in FIG. 74 but for Aluminium coated with a layer of Magnesium Fluiorde 0.026 $\mu$m thick. It will be seen that the reflectivity at high angles of incidence for the component whose electric vector is parallel to the plane of incidence is now higher than that for the component whose electric vector is normal to the plane of incidence.

However, for the component of the electromagnetic energy whose electric vector is normal to the plane of incidence there may be for those thicknesses less than, equal to, or slightly above the quarter wave thickness a sudden drop, perhaps even to zero, of the reflectivity at one particular value of the angle of incidence depending on the thickness of the coating and the wavelength of the electromagnetic energy before the reflectivity increases at very high angles of incidence.

FIG. 76 is a graph similar to that in FIG. 75 but with the coating 0.04 $\mu$m thick. This corresponds to the quarter wave thickness for an angle of incidence of about 35.78°. The thickness does not greatly exceed the quarter wave thickness at higher angles of incidence. It will be seen that there is a drop to zero of the reflectivity for the component whose electric vector is normal to the plane of incidence at an incidence of 89°. At higher angles of incidence, that reflectivity increases to unity, as may be seen from the isolated points on the graph which have been encircled for clarity.

Such combinations of incident angle, coating thickness and wavelength must either be avoided; or used to provide the output beam with a signature for detection by a sensor system. Concerning which purpose, it should be noted that for the defining mirror of the final stage in a series of stages the drop in reflected energy may be restricted to a narrow range of wavelengths because the range of angles of incidence to the defining mirror of a final stage in a series of stages is small.

If the thickness of the coating is increased beyond the region at which such a drop occurs, the reflectivity for the component of the electromagnetic energy whose electric vector is normal to the plane of incidence will increase at high angles of incidence, while the reflectivity for the component of the electromagnetic energy whose electric vector is parallel to the plane of incidence will decrease at high angles of incidence, until the reflectivities are respectively similar to and somewhat lower than the values for bare metal.

FIG. 77 is a graph similar to that in FIG. 75 but with the coating 0.1 $\mu$m thick. It will be seen that the reflectivity at high angles of incidence for the component whose electric vector is normal to the plane of incidence has increased appreciably.

6.18.2 Thin film mirrors

For stages other than the final stage in a series of stages, the angles of incidence of the rays on the mirrors of such stages will be lower, and it will often be desirable to increase the reflectivity of a metal surface by coating it with a multiplicity of layers of different dielectrics which are transparent to all the wavelengths to be utilised by the apparatus. It is alternatively possible to use mirrors comprising multiple layers of different dielectrics on a non-metallic substrate. In order to understand the wave composition of the output beam it is necessary to consider from first principles the effects of such a multiplicity of layers.

In a typical embodiment, the outermost layer has a high refractive index and is supported by an even number of layers which alternatively have first lower and then higher refractive indices than the layer on top of them. The thickness of each layer is the same throughout the extent of that layer, but the layers do not necessarily all have the same thickness.

6.18.2.1 Conventions and phase shifts

When a ray of a particular wavelength is incident on the boundary of a layer, part of it is reflected and part of it is refracted (at an angle different from the incident angle for non-normal incidence). It has been mentioned that there is more than one convention for the measurement of the electric vectors from which the phase shifts are determined. FIG. 78 shows one convention for the positive directions of electric vectors respectively parallel to and normal to a plane of incidence lying in the plane of the paper for the incident, reflected and refracted parts of a ray from which positive directions the phase shift on reflection may be found. The line of the incident part of the ray is extended into the layer by a dashed extension. A circle indicates a vector rising perpendicularly from the paper while a cross indicates a vector in the opposite direction. The angles of incidence, reflection and refraction are $\phi^i$, $\phi^r$ and $\phi^t$ respectively. For the component of electromagnetic energy whose electric vector is normal to the plane of incidence, denoted by $E_\perp$, and for the component of electromagnetic energy whose electric vector is parallel to the plane of incidence, denoted by $E_\parallel$, when the angle of incidence is above the Brewster angle, there will be a phase shift of $\pm\pi$ when the reflection takes place at the boundary from a dielectric of lower refractive index to a dielectric of higher refractive index, but a zero phase shift when the reflection takes place at the boundary from a dielectric of higher refractive index to a dielectric of lower refractive index. Said phase shifts interchange for the component of electromagnetic energy whose electric vector is parallel to the plane of incidence, namely $E_\parallel$, when the angle of incidence is below the Brewster angle. In order to maintain compatibility between the phase shift at normal incidence and the phase shift at oblique incidence in this convention, it is necessary to measure the angle of reflection $\phi^r$ from the opposite half-normal as shown. If, however, the alternative convention, that the incident and reflected angles are measured from the same half-normal, so that they are equal, is used then the positive and negative directions of the electric vector for that component of the reflected electromagnetic energy (only) whose electric vector is parallel to the plane of incidence must be interchanged thereby altering its phase shift by $\pm\pi$ for angles of incidence both above and below the Brewster angle. To avoid confusion, this alternative convention will be distinguished herein by referring to the component of electromagnetic energy whose electric vector is normal to the plane of incidence as $E_s$ and the component of electromagnetic energy whose electric vector is parallel to the plane of incidence as $E_p$.

The positive direction of the magnetic vector for a ray is derived from the direction of that ray and the positive direction of the electric vector for that ray in both these conventions; so that the positive direction of the magnetic vector is reversed when that of the electric vector is.

6.18.2.2 Effect of a layer

FIG. 79 shows a portion of a plane wave 94 along which both the amplitude and phase are constant which lies within the i−1th layer if i≠1, as shown, or within the medium outside the mirror if i=1 . Its propagation is represented by two rays 95 and 96 which are at right angles to it within the i−1th layer or the medium outside the mirror, according to the value of i. The plane of incidence is in the plane of the paper.

The ray 95 is incident to the outermost boundary of the ith layer with an angle of incidence of $\phi_{i-1}$ at a point 97 which also lies on the plane wave 94. Part of the ray 95 is refracted into the ith layer at an angle of refraction $\phi_i$ and then partly reflected from the innermost boundary of said ith layer to a further point 98. Said ith layer has a thickness of $t_i$, a real refractive index $n_i$, and the wavelength of the plane wave 94 in said ith layer is $\lambda_i=\lambda/n_i$ where is the wavelength of said plane wave 94 in a vacuum.

Since the distance travelled by the ray 95 between the point 97 and the further point 98 is $2t_i/\cos\phi_i$ the corresponding phase shift (disregarding any phase shift on reflection) is:

$$\frac{2\pi}{\lambda_i} \cdot \frac{2t_i}{\cos\phi_i} = \frac{2\pi n_i}{\lambda} \cdot \frac{2t_i}{\cos\phi_i}$$

The ray 96 is incident to the outermost boundary of the ith layer at the further point 98. The distance between the point 97 and the further point 98 is $2t_i \tan\phi_i$. The i−1th layer, or the medium outside the mirror, has a real refractive index $n_{i-1}$, and the wavelength of the plane wave 94 in said i–1th layer, or the medium outside the mirror, is $\lambda_{i-1}=\lambda/n_{i-1}$.

Since the distance travelled by the ray 96 between a second further point 99 on the plane wave 94 and the further point 98 is $2t_i \tan\phi_i \sin\phi_{i-1}$ the corresponding phase shift is:

$$\frac{2\pi}{\lambda_{i-1}} \frac{2t_i\sin\phi_i\sin\phi_{i-1}}{\cos\phi_i} = \frac{2\pi n_{i-1}}{\lambda} \frac{2t_i\sin\phi_i\sin\phi_{i-1}}{\cos\phi_i}$$

$$= \frac{2\pi}{\lambda} \frac{2t_i n_i \sin^2\phi_i}{\cos\phi_i} \text{ as } n_{i-1}\sin\phi_{i-1}$$

$$= n_i\sin\phi_i$$

In said typical embodiment, the refractive index of the i+1th layer is the same as that of the i–1th layer, so that the angle of refraction at the innermost boundary of the ith layer is $\phi_{i-1}$ and the condition for the Brewster angle at the outermost boundary of the ith layer, $\phi_{i-1}=\pi/2-\phi_i$, is the same as that for its innermost boundary, $\phi_i=\pi/2-\phi_{i-1}$. Thus for each orientation of the electric vectors of their components either normal to or parallel to the plane of incidence, one, but not both, of said rays 95 and 96 undergoes a phase shift on reflection of $\pm\pi$. If said conditions are fulfilled there will not, of course, be any such reflection for those components of the rays 95 and 96 whose electric vector is parallel to the plane of incidence.

As the refractive index of the incident medium differs from that of the first layer, there is, of course, an angle of incidence other than $\phi_i$ or $\phi_{i-1}$ at the outermost boundary of the first layer, and thus a different condition for the Brewster angle at said boundary. So that the reflection from the outermost boundary of the first layer will be $\pi$ out of phase from its desired value at some angles of incidence for the component of electromagnetic energy whose electric vector is parallel to the plane of incidence. Moreover, phase shifts other than 0 or $\pm\pi$ occur on reflection from a metal substrate at non-grazing incidence.

Since the two rays 95 and 96 are in phase at the point 97 and the second further point 99 respectively, and one, but not both, of said rays 95 and 96 undergoes a phase shift on reflection of $\pm\pi$, the difference in phase between said ray 95 and said ray 96 at the further point 98 after the reflection of the latter is the sum of the phase difference due to the difference in the path lengths of said two rays 95 and 96 and $\pm\pi$:

$$2\frac{2\pi n_i t_i}{\lambda\cos\phi_i}(1-\sin^2\phi_i) \pm \pi = 2\frac{2\pi n_i t_i}{\lambda}\cos\phi_i \pm \pi$$

If said difference in phase is equal to a multiple of $2\pi$ then said two rays 95 and 96 are in phase after the reflection of the latter.

Choosing $4\pi t_i/\lambda n_i \cos\phi_i \pm \pi =_0 2\pi$ makes the phase difference due to the difference in the path lengths of the two rays 95 and 96 equal to $\pi$. As $n_i \sin\phi_i=n_0 \sin\phi_0$ where $\phi_0$ is the angle of incidence in the medium outside the mirror, the corresponding thickness of the ith layer is given by:

$$t_i = \frac{\lambda}{4(n_i^2 - n_0^2\sin^2\phi_0)^{\frac{1}{2}}}$$

This is known as the quarter wave thickness.

Since the ith layer is of uniform thickness, a similar relationship will hold for any point on its outermost boundary. And if such a relationship exists for each layer individually, it will exist for all the layers together. In which case, all the electromagnetic energy emerging from the outermost boundary of the first layer will be in phase and the reflection due to the layers will be at a maximum.

But a small change in the wavelength of the wave, or the angle of incidence of the wave, will alter the phase shift for each path which the wave may take through the layers, split the wave into many out-of-phase reflected plane waves, and thereby reduce the reflection;

so that high reflectivity can only be obtained for such an arrangement over a limited range of wavelengths and angles of incidence. As high reflectivity will be obtained whenever said difference in phase is approximately equal to a multiple of $2\pi$, the reflectivity for any given angle of incidence will comprise waveband of high reflectivity seperated by wavebands of low reflectivity. Such small changes will also introduce a phase difference between the resultant of the components of the reflected plane waves whose electric vectors are normal to the plane of incidence and the resultant of the components of the reflected plane waves whose electric vectors are parallel to the plane of incidence.

6.18.2.3 High and low reflectivity wavebands and signature of output beam

The limited range of wavelengths and angles of incidence for which high reflectivity may be obtained may be extended if not all the thicknesses of the layers of one type of dielectric are the same, so that the difference in phase is approximately equal to a multiple of $2\pi$ for enough of the layers for any given combination of wavelength and angle of incidence. Indeed, the thickness may be varied for both types of dielectric.

Thus the thickness of each layer of at least one of the types of dielectric is chosen according to some relation, such as an arithmetic, geometric or harmonic progression, to provide adequate reflectivity over the wide range of angles of incidence to a stage other than the final stage in a series of stages, and the range of wavelengths to be utilised by the apparatus.

In some embodiments, the reflectivity of the mirrors is chosen to be high for those wavelengths for which the rays of electromagnetic energy incident to them have the greatest energy at the expense of certain wavelengths for which said rays have a lower energy so as to avoid heating those mirrors excessively and also to maximise the energy in the output beam. Equally, when the output beam is to be used within the atmosphere, the reflectivity may be chosen to be low for those wavelengths which are so much scattered or absorbed by the atmosphere as not to be useful in favour of higher reflectivity at other wavelengths.

The width of waveband for which high reflectivity may be obtained by multiple layers formed from any pair of high and low refractive index dielectrics increases with the ratio of the difference between the high and low refractive indices divided by the sum of the high and low refractive indices. Materials with a high refractive index which are transparent for all the wavelengths to be used without being soft or water absorbent may not exist.

Thus an additional type of dielectric of higher refractive index may be used instead of the original dielectric of high refractive index in order to provide a single outer coating which is hard, transparent to all the wavelengths to be utilised by the apparatus, and does not absorb water. As this additional type of dielectric will not have the same refractive index as the original dielectric of high refractive index, a priori, a further different condition for the Brewster angle will be introduced at the innermost boundary of the first layer, and this may cause undesirable phase shifts on reflection from the innermost boundary of said first layer at some angles of incidence for that component of electromagnetic energy whose electric vector is parallel to the plane of incidence. Moreover, said different condition for the Brewster angle at the outermost boundary of the first layer will also be changed.

As the angle of incidence to a mirror increases from zero the width of waveband for which high reflectivity may be obtained by multiple layers formed from any given pair of dielectrics increases for the component of electromagnetic energy whose electric vector is normal to the plane of incidence, but decreases for the component of electromagnetic energy whose electric vector is parallel to the plane of incidence. Moreover, the reflectivity increases for the component of electromagnetic energy whose electric vector is normal to the plane of incidence, but decreases for the component of electromagnetic energy whose electric vector is parallel to the plane of incidence. Additional changes occur when any of the conditions for a Brewster angle is satisfied, and because of phase shifts at the metal substrate if any. Hence further modifications to the thicknesses of the layers of dielectric may be made to compensate for such effects.

It is possible to show that the angle of refraction $\phi_1$ corresponding to the Brewster angle of incidence at the outermost boundary of the first and outermost layer is not only less than the Brewster angle at the innermost boundary of the first layer but is also less than the Brewster angles at the innermost boundaries of all those layers of the same type of dielectric as that first layer (provided the incident medium has a lower refractive index than any of the other types of dielectric).

Let the Brewster angle at the outermost boundary of the first layer be $\phi_0^B$. We have $\phi_0^B = \pi/2 - \phi_1$ and $\tan \phi_0^B = n_1/n_0$.

Let the Brewster angle at the innermost boundary of the i−1th layer and the outermost boundary of the ith layer be $\phi_{i-1}^B$ where i>1. We then have $\tan \phi_{i-1}^B = n_i/n_{i-1}$.

If the first and the i−1th layers have the same refractive index so that $n_1 = n_{i-1}$ we may eliminate them to give:

$$\tan\left(\frac{\pi}{2} - \phi_1\right) \tan\phi_{i-1}^B = \frac{n_i}{n_0}$$

$$\frac{\cos\left(\frac{\pi}{2} - \phi_1 - \phi_{i-1}^B\right) - \cos\left(\frac{\pi}{2} - \phi_1 + \phi_{i-1}^B\right)}{\cos\left(\frac{\pi}{2} - \phi_1 + \phi_{i-1}^B\right) + \cos\left(\frac{\pi}{2} - \phi_1 - \phi_{i-1}^B\right)} = \frac{n_i}{n_0}$$

Now $0 < \phi_{i-1}^B < \pi/2$ and $0 < \phi_1 < \pi/2$ so that $-\pi/2 < \pi/2 - \phi_1 - \phi_{i-1}^B < \pi/2$ and $\cos(\pi/2 - \phi_1 - \phi_{i-1}^B) > 0$. As $n_i/n_0 > 1$ also:

$$\cos\left(\frac{\pi}{2} - \phi_1 + \phi_{i-1}^B\right) < 0$$

As there are two possibilities for the angle $\pi/2 - \phi_1 + \phi_{i-1}^B$:

Either $\frac{\pi}{2} < \frac{\pi}{2} - \phi_1 + \phi_{i-1}^B \leq \pi$ or $\pi \leq \frac{\pi}{2} - \phi_1 + \phi_{i-1}^B < \frac{3\pi}{2}$ Either $0 < \phi_{i-1}^B - \phi_1 \leq \frac{\pi}{2}$ or $\frac{\pi}{2} \leq \phi_{i-1}^B - \phi_1 < \pi$ As $0 < \phi_1 < \pi/2$ and $0 < \phi_{i-1}^B < \pi/2$ so $\phi_1 < \phi_{i-1}^B$.

It follows that there is a range of angles of incidence above the Brewster angle at the outermost boundary of the first layer but below any angle of incidence corresponding to the Brewster angle at the innermost boundary of the first layer for which tile phase change on reflection of the component of electromagnetic energy whose electric vector is parallel to the plane of incidence at the outermost boundary of the first layer will not differ by $\pi$ from that at the innermost boundary of the first layer for the typical embodiment in which the first layer of dielectric has a higher refractive index than the layer of dielectric below it.

Let the angle of incidence corresponding to the Brewster angle at the innermost boundary of the first layer be $\phi_0$. If the incident medium is a vacuum, $n_0 = 1$. We then have $\sin \phi_0 = n_1 \sin \phi_1^B$ and $\tan \phi_1^B = n_2/n_1$ so that:

$$\sin\phi_0 = n_1 \sin\phi_1^B = n_2 \cos\phi_1^B$$

As $\sin^2\phi_1^B + \cos^2\phi_1^B = 1$ so $\frac{\sin^2\phi_0}{n_1^2} + \frac{\sin^2\phi_0}{n_2^2} =$ $$1 \text{ and: } -\sin^2\phi_0 = \frac{n_1^2 n_2^2}{n_1^2 + n_2^2}$$

As $\sin \phi_0 < 1$ for such an angle to exist so $n_1^2 n_2^2 < n_1^2 + n_2^2$ and:

$$n_1^2 < \frac{n_2^2}{n_2^2 - 1}$$

It will thus be seen that the condition for the angle $\phi_0$ to exist restricts the values of $n_1$ and $n_2$. Equally, the angle $\phi_0$ will not exist for many combinations of $n_1$ and $n_2$, in which case angles of incidence greater than or equal to that angle of incidence corresponding to the Brewster angle at the innermost boundary of the first layer need not be considered.

For angles of incidence above the Brewster angle at the outermost boundary of the first layer in a typical embodiment, which is of higher refractive index than the layer below it as aforesaid, but below any angle of incidence corresponding to the Brewster angle at its innermost boundary, the highest reflectivity at any given angle of incidence and wavelength for the component of electromagnetic energy whose electric vector is parallel to the plane of incidence will occur when the first layer of dielectric is approximately twice the quarter wave thickness for that angle of incidence but the underlying layers are each of quarter wave thickness and the reflection of said component from the outermost boundary of the first layer is thus in phase with the reflections of said component from the underlying layers in said typical embodiment. High reflectivity at high angles of incidence for the component of electromagnetic energy whose electric vector is normal to the plane of incidence can also be obtained when the first layer of dielectric is approximately twice the quarter wave thickness for that angle of incidence and the underlying layers are each of quarter wave thickness. FIG. 80 shows a stack of three layers of dielectric on a substrate 177 in which the first layer 178 and the third layer 180 consist of the same dielectric which has a high refractive index but the first layer is approximately twice the thickness of the third layer, while the second layer 179 consists of a dielectric of low refractive index. The second and third layers are of quarter wave thickness for the incident angle $\phi_0$ shown at an incident wavelength of $\lambda$ in a vacuum. The incident angle $\phi_0$ is greater than the Brewster angle at the outermost boundary of the first layer but below any angle of incidence corresponding to the Brewster angle at the innermost boundary. For other angles of incidence, other wavelengths, or embodiments with different underlying layers, in which the reflections from the underlying layers have more than one phase, this modification may be used to minimise the difference between the phase of the reflection of the component of electromagnetic energy whose electric vector is parallel to the plane of incidence from the outermost boundary of the first layer and the phases of the reflections of said component from the underlying layers.

It is also possible to miniminise the difference between the phase of the reflection of the component of electromagnetic energy whose electric vector is parallel to the plane of incidence from the outermost boundary of the first layer and the phase(s) of the reflections of said component from the underlying layers at angles of incidence above the Brewster angle at the outermost boundary of the first layer but below any angle of incidence corresponding to the Brewster angle at its innermost boundary by reducing the thickness of the first layer below said quarter wave thickness for the third layer. The thicknesses of the underlying layers may also be reduced to compensate for the change in reflectivity produced by the reduced thickness outer layer. FIG. 81 shows a stack similar to that in FIG. 80 but with the thickness of the first layer 178 reduced below that of the third layer 180. This technique has an additional advantage for incident light capable of producing standing waves in the layers of dielectric in that the amplitude of the electric vectors for both components within those layers is small.

For angles of incidence above the Brewster angle for the outermost boundary of the first layer but below any angle of incidence corresponding to the Brewster angle at its innermost boundary, the phase change on reflection of the component of electromagnetic energy whose electric vector is parallel to the plane of incidence at the outermost boundary of the first layer for any given wavelength can be made to differ by $\pi$ from that at the innermost boundary of the first layer, as required, if the first layer of dielectric is chosen to have a lower refractive index than the layer below it. FIG. 82 shows a stack of four layers of dielectric on a substrate 177 in which the first layer 178 and the third layer 180 consist of the same dielectric which has a low refractive index while the second layer 179 and the fourth layer 181 consist of the same further dielectric which has a high refractive index. All the layers are of quarter wave thickness for the incident angle $\phi_0$ shown at an incident wavelength of $\lambda$ a vacuum. The incident angle $100_0$ is greater than the Brewster angle at the outermost boundary of the first layer but below any angle of incidence corresponding to the Brewster angle at its innermost boundary. Said first layer 178 may consist of an additional type of dielectric which is hard, transparent to all the wavelengths to be utilised by the apparatus and does not absorb water.

The effects mentioned in this subsection contribute to the signature of the output beam.

It should be mentioned that the phase difference between the resultant of the components of the reflected plane waves whose electric vectors are normal to the plane of incidence and the resultant of the components of the reflected plane waves whose electric vectors are parallel to the plane of incidence occurs at all angles of incidence, rather than all but one, due to a progression in the thickness of the layers of dielectric or a modification of the thickness of one or more of those layers.

Multiple layers of dielectrics may equally be used to increase the refraction at a surface.

6.18.3 Damage mechanisms

The damage mechanism of electromagnetic mirrors irradiated by a continuous source of electromagnetic energy or pulses of electromagnetic energy is primarily thermal.

The damage mechanism for coated mirrors irradiated by a continuous source of electromagnetic energy is also primarily thermal; whereas the damage mechanism for coated mirrors irradiated by a short pulse of electromagnetic energy may also be related to the peak electric field and give rise to a much lower damage threshold. Some early empirical work found the pulse drainage threshold for ultra-violet to be proportional to the fourth power of the wavelength of the electromagnetic energy for which the mirror was designed. Much lower short pulse damage thresholds are expected for wavelengths other than those for which a coated mirror was designed.

To achieve the same average power level, a series of pulses of electromagnetic energy must have both a higher intensity and also a higher peak electric field than continuous electromagnetic energy. Moreover, a single pulse of electromagnetic energy produces a high temperature gradient and thus high thermal shock at the surface of a mirror which is cool, or has cooled down after a previous pulse. While continuous electromagnetic energy (with a slow initial rise) produces a steady state temperature gradient which would have lower thermally induced stress for the same surface temperature. In theory, the thermal damage threshold scales as the square root of the pulse length. So that a continuous source of electromagnetic energy, such as all electrically powered arc, a sustained nuclear reaction, or a continuous laser, or a source which produces a long pulse, such as a chemical round of ammunition, may be used without damaging mirrors, whether coated or otherwise, at a higher average power level than a pulsed laser with a very short pulse, whether the damage mechanism is thermal or electric.

If a requirement to install a heavy electrical generator to power an arc in an aircraft whose engine drives said generator puts a premium on high energy efficiency, then mirrors with multilayer coatings are highly desirable. If, on the other hand, chemical rounds of ammunition with very high power outputs are used, then uncoated mirrors with lower energy efficiency and higher absorption may be acceptable, particularly as the rounds of ammunition must be loaded between pulses.

It should, however, be mentioned that higher absorption implies higher distortion of the mirrors due to local heating if there are any non-uniformities in the electromagnetic energy.

If the intensity of the electromagnetic energy emitted by the source thereof is symmetric about the axis of symmetry 18 then the intensity of electromagnetic energy incident on any mirror of a stage other than the last in a series of stages will also be symmetric provided all the mirrors preceding it along the path of said electromagnetic energy are also symmetric about said axis of symmetry 18 even to the extent of their reflectivity. But said incident intensity will not, in general, be constant otherwise. This will also be the case for the mirrors of a final stage when the axis of symmetry 40 of the defined mirror of that final stage is aligned with the axis of symmetry 18.

The absorption of different portions of any coated mirror can be adjusted by a variation of the number of layers in that coating either along the axis of symmetry 18 of a mirror 166, as shown in FIG. 83, or some other line; so that the absorbed power density is less variable from place to place on it. Such a variation will also affect the reflectivity of the mirror. If such a variation increases the ratio between the reflectivities for the two components of electromagnetic energy with said different directions of the electric vector, it may also be used to increase the signature of the output beam so that it may more readily be detected by a sensor.

It should be mentioned that the signature varies for different parts of the output beam. FIG. 84 shows the electromagnetic energy from an axially symmetric embodiment of the apparatus passing through a plane 182 at right angles to the axis of symmetry 18 a short distance along an annular output beam 183. Said plane 182 is in the plane of the paper. A certain plane of incidence 184 to the defining mirror of the final stage in a series of stages passes through the axis of symmetry 18; so that all the rays in said plane are in-plane rays at all the mirrors in said series of stages. The plane of incidence 184 intersects the annular output beam at 185 and 186 on said plane 182 at right angles to the axis of symmetry 18. Due to the direction of the electromagnetic energy by the apparatus, all those planes of incidence of electromagnetic energy to the defining mirror of said final stage, which pass through said intersections 185 and 186, approximate to the plane of incidence 184, even though the position and orientation of the planes of incidence of the rays therein may differ significantly from that of said plane of incidence 184 at preceding mirrors.

The intensity for all the rays making up the beam at the intersections 185 and 186 of the resultant component of electromagnetic energy whose electric vector is normal to the plane of incidence 184, namely $E_\perp$, will, in general, differ from that of the resultant component of electromagnetic energy whose electric vector is parallel to said plane of incidence 184, namely $E_\parallel$, due to the different reflectivities at the various mirrors in the apparatus for other differently orientated normal and parallel components for each of said rays which arise from the non-normal incidence of those rays in the apparatus. FIG. 84 shows the resultant electric vectors $E_\perp$ and $E_\parallel$ normal to and parallel to said plane of incidence 184 respectively at both said intersections 185 and 186.

So that if the intensity of electromagnetic energy was investigated by a sensor preceded by a polariser able to rotate about any axis parallel to said axis of symmetry 18 it would find planes of maximum intensity 187 at both said intersections 185 and 186 that were parallel to each other as shown.

As said plane of incidence 184 rotates about the axis of symmetry 18 the direction of said two parallel planes of maximum intensity 187 also rotates. Thus a particular plane of maximum intensity is associated with two sections of the output beam.

In general, the angles of incidence of rays of electromagnetic energy on mirrors forming part of the apparatus are high. Such high angles of incidence imply high reflectivity in certain situations which have already been mentioned. High reflectivity implies low absorption by the mirrors and thus high power capacity for the mirrors when the damage mechanism is thermal. Provided any multilayer coatings in the apparatus reflect as much electromagnetic energy as possible at their outermost boundaries, high reflectivity due to high incident angles is accompanied by low peak electric fields within the layers and thus high damage thresholds for short pulses of electromagnetic energy for which the damage mechanism is related to the peak electric field. So that, in theory, a very high damage threshold could be obtained for electromagnetic energy whose electric vector is normal to the plane of incidence, such as might be output by a free electron laser with a linear wriggler.

Clearly the most accurate direction is achieved when the first stage defined mirror is the mirror optically nearest to the source; so that it is desirable for most of the electromagnetic energy from the source to be incident to the first stage defined mirror. Of all the mirrors which take part in the direction of electromagnetic energy, the first stage defined mirror often has the smallest radii measured at right angles from the axis of symmetry 18, and is usually convex to said electromagnetic energy; so that said electromagnetic energy is usually spread out over a large surface area at succeeding mirrors. The first stage defined mirror is thus usually subject to the highest intensity of electromagnetic radiation of all the mirrors. It has already been pointed out that the starting point for the design of the first stage defined mirror and the gradient at any point of said first stage defined mirror may be chosen. FIG. 85 shows an embodiment of the apparatus having a plurality of first stages 188 in parallel so that the input aperture of each such parallel first stage is but a fraction of that of an input aperture formed by an edge 189 of the outermost defining mirror and an edge 190 of the innermost defined mirror of said parallel first stages. And the gradient of each first stage defined mirror is such that the angles of incidence of the rays of electromagnetic energy 224 on said first stage defined mirror are high to take advantage of the higher reflectivity available in certain situations, and such that each first stage defined mirror 31 is long and thus has a high surface area. Said high angles of incidence, said high surface area of the defined mirror of and said relatively small input aperture for each such parallel stage enable the apparatus to have a source of very high intensity over a large waveband.

6.18.4 Cooling of mirrors

The mirrors may be cooled by means of a flow of gas or of a liquid, or by the evaporation of a liquid. All these processes may be controlled by one or more thermostats in order to regulate the working temperature of the mirrors and thus their sizes. Equally, the temperature of each mirror may be controlled by the melting of a solid, or the provision of a heat sink. The mirrors may be cooled, and/or their working temperature controlled, by any combination of two or more of said means.

Cooling by means of a flow of air is particularly convenient in an aircraft. While using a flow of non-ionising fluid is convenient when that fluid is also being used to cool the electrodes of an electric arc providing a source of electromagnetic energy.

A heat sink may be adequate for temperature control when the source consists of a limited number of chemical rounds of ammunition.

As the temperature at which a solid melts is almost independent of pressure, and the heat of fusion of such a solid must be provided before its temperature can rise above its melting point or be removed before its temperature can fall below that melting point, the provision of a cavity filled with a solid of low melting point such as sodium within a mirror can be used to control the working temperature of that mirror and thus its size very accurately.

6.18.5 Tolerances

FIG. 86 shows a small portion 100 of a defined mirror of a certain stage of the apparatus surrounding a point $x_0, y_0, z_0$. A set of in and out-of-plane rays from the point $x_0, y_0, z_0$ is enclosed by a circular cone 101 whose vertex is at said point $x_0, y_0, z_0$. This set is a set of rays which are well directed by that stage of the apparatus and the angle of the circular cone 101 is slightly greater than the angular input aperture $\delta_2 - \delta_1$ at the point $x_0, y_0, z_0$.

If said small portion 100 of said defined mirror is rotated about the point $x_0, y_0, z_0$ through a small angle $\epsilon$ to a new position 100' due to an error in the shape of said defined mirror of a temporary or permanent nature, then each of said rays rotates through a respective angle to form a further set of rays enclosed by a circular cone 102 which is identical to said circular cone 101 but whose axis 104 is at an angle of $2\epsilon$ to the axis 103 of said circular cone 101.

In so far as the rays in said further set of rays enclosed by the circular cone 102 remain within the circular cone 101 they merely replace rays which were previously within said circular cone 101 and are well directed by the defining mirror of that stage as before. Only those rays in said further set which lie outside said circular cone 101 suffer any misdirection at all. Thus an angular error in the surface of a defined mirror which is small in relation to the angular input aperture at the point on that defined mirror at which said angular error occurs has little effect on the direction of the output beam as a whole. And clearly, a similar argument applies to any angular error in a ray from said point $x_0, y_0, z_0$ howsoever caused.

Any error in the path of a ray due to any error in either of the mirrors of a stage other than the final stage in a series of stages is of no consequence if, at the point at which said ray is incident to the defined mirror of the succeeding stage, said ray lies within the cone of well directed rays which are incident at said point. Thus the tolerances for such mirrors are high.

Similarly, any error in the path of a ray due to any inhomogeneity of the medium along the path of said ray is of no consequence if, at the point at which said ray is incident to the defined mirror of a stage, said ray lies within the cone of well directed rays which are incident at said point. Thus the tolerance for inhomogeneities in such a medium prior to the defined mirror of the final stage in a series of stages is high also.

The effect of the defined mirror of the final stage in a series of stages being oversize is similar to that of a transverse movement of such a defined mirror as described with reference to FIG. 62 and the twenty-seventh embodiment of the apparatus.

The effect of $\gamma'_0 > \gamma_0$ in decreasing the output angle is offset by the effect of $\gamma' > \gamma''$ in increasing it. But $\gamma' > \gamma$ a so that the output angle $\beta' > \beta$. Hence the defined mirror of a final stage should not be oversize.

For typical embodiments in which the ray 83 is incident upon the third and final stage defining mirror 34 at a small grazing angle, the distance between the points 87' and 88 will be large and the difference between $\gamma'$ and $\gamma$ will be large in consequence. As the difference between $\beta'$ and $\beta$ will then also be large, it is important in such embodiments that the defined mirror of a final stage is not oversize.

For similar reasons, the defined mirror of a final stage must not be undersize.

6.18.6 Sacrificial mirrors

As the tolerances for the size and shape of any mirror other than that of a final stage in any series of stages are high, the surfaces of such mirrors may be sacrificial, or consist of a liquid which is sacrificial.

FIG. 87 shows a section of a mirror 105 which is made to move by the rotation of a screw 167 in order to replace a reflecting surface which is being evaporated away. FIG. 88 shows a section of a mirror 106 perforated by holes 107 through which a liquid metal 108 is made to pass to form the reflecting surface 109 by the action of a spring 168 on a plunger 169.

Of course, if the source is a nuclear explosion, and an accurately directed beam is only required for the very short period of time for which the mirrors of the final stage or stages survive, the entire apparatus may be sacrificial.

6.19.0 Effect of incoherent non-monochrome source

The effect on the output beam and a target of a source which consists of a large number of elementary radiators which are not coherent and which emit electromagnetic energy of different wavelengths will now be discussed.

6.19.1 Specific intensity and flux

It is often asserted that electromagnetic radiation from an incoherent source cannot be focussed to achieve a (real) image with a higher intensity than that originally emitted and then implied that an incoherent source cannot therefore be concentrated onto a small spot. For instance in Principles of Naval Weapons Systems at page 316 it is asserted:— "Unlike incoherent sources, which cannot be focused to achieve images with higher intensity than originally emitted, the laser can be concentrated into a spot as small as one wavelength in diameter." In that work, the intensity referred to is power per unit area. It does not, however, follow that it is necessary to form a real image to direct radiation onto a small spot. A more direct argument has been expressed in terms of specific intensity.

Consider a small area $\Delta\sigma$ about a point P and a direction at an angle $\theta$ to the normal 170 to that small area at P, as shown in FIG. 89. As said small area is flat, its projection on a plane at right angles to said direction is $\Delta\sigma \cos\theta$. Circular cones of solid angle $\Delta\omega$ whose axes are parallel to said direction may be drawn with vertices at the point P and every other point on said small area.

The specific intensity, $I_\lambda$, of electromagnetic radiation of wavelength $\lambda$ passing at a time t through the point P in said direction at an angle $\theta$ to the normal 170 of said small area $\Delta\sigma$ about said point P is defined as:

$$I_\lambda = \lim_{\substack{\Delta\lambda \to 0 \\ \Delta t \to 0 \\ \Delta\sigma \to 0 \\ \Delta\omega \to 0}} \frac{\Delta E_\lambda}{\Delta\lambda \Delta t \Delta\sigma \cos\theta \Delta\omega}$$

where $\Delta E_\lambda$ is the energy at wavelengths between $\lambda$ and $\lambda + \Delta\lambda$ of those rays passing at times between t and $t+\Delta t$ through said small area $\Delta\sigma$ (and, for sufficiently small solid angles $\theta\omega$, its projection $\Delta\sigma \cos\theta$ on a plane at right angles to said direction) and lying within all those circular cones of solid angle $\Delta\omega$ whose axes are parallel to said direction.

It will be noted that the projected area, $\Delta\sigma \cos\theta$, has been used rather than the small area, $\Delta\sigma$, so that the units of specific intensity are energy per unit wavelength interval per unit time interval per unit area of the cross-section of a beam per solid angle.

It is argued in an "Introduction to Stellar Atmospheres and Interiors" by Eva Novotny at page 63 that:

"Once the passage to the limit $\Delta\omega \to 0$ has been made, the beam is no longer divergent. Therefore, there is no dilution of energy as the beam travels through space, and the" (specific) "intensity is independent of the distance from the source."

And:

"No optical instrument can make a radiating surface appear more intense, since it cannot increase the amount of energy passing along a ray. A telescope gathers more light than the eye, but spreads it over an enlarged image."

The specific intensity is the rate of change of energy with respect to wavelength, time, area and solid angle. It must be multiplied by wavelength interval, time interval, area and solid angle to give any energy. There is no energy if any of the wavelength interval, the time interval, the area or the solid angle is zero.

For precisely this reason it is held, for instance in Light by R. W. Ditchburn 3rd Ed. at page 382, that "no light or radiant energy is transmitted in a mathematically parallel beam or from a mathematical point source." As there are no mathematically parallel beams or mathematical point sources this definition of specific intensity does not give rise to problems.

On the same basis, however, the energy in a ray of no solid angle is zero. So that the above argument is invalid, since it is meaningless to consider whether or not it is possible to increase the energy passing along a ray while that energy is zero by definition. In order to determine the effect of the apparatus on specific intensity, it is necessary to consider finite areas and beams of finite solid angle.

It must also be stressed that the apparatus does not create an image. So that any conditions relevant to the formation of an image do not apply.

If each ray passing through a point on a target is traced backwards through its reflections and/or refractions at the defining and defined surfaces, it will be seen that each ray has a unique path. As no two rays coincide, the apparatus cannot increase the amount of energy passing along a given direction to a particular point on the target. But it can both arrange for those rays to be closer together, and also reduce their divergence. Electromagnetic energy from an incoherent source can therefore be focussed to increase the specific intensity.

Consider an axially symmetric embodiment of the apparatus comprising three stages in series, each of which has a single defining mirror extending over a portion of a sphere, and for each of which the output of the defining rays is parallel to the axis of symmetry, together with a plane at right angles to said axis of symmetry intersecting the (annular) output beam from that apparatus. Since the defining rays of the third and final stage are collimated along the axis of symmetry and the in and out-of-plane rays approximate to those defining rays, the half-angles of the cones whose vertices are on said plane and which enclose those portions of the output beam passing through said vertices are less than or equal to the output angle for that representative ray approximating to the maximum of the angles between the out-of-plane rays and the first defining ray at the leading edge of the third and final stage where the angular input aperture for said final stage will be largest. Let us suppose by way of example that a beam from a source is reflected by defined mirrors at points defined by $\theta_1=136°, \theta_2=152°; \theta_1=143.4°, \theta_2=144.6°$; and $\theta_1=145°, \theta_2=145.00685°$. It has already been shown that such an apparatus has an angular input aperture for said point on the first stage defined mirror of 32° and an output angle for a representative further ray from said point of a mere 0.00000043°. The output angle for a representative out-of-plane ray from said point is larger than this but the output angles for representative out-of-plane rays become lower for points further along the first stage defined mirror as the angular input aperture reduces. So that the output angle for a representative out-of-plane ray does not differ significantly from this for any point on the first stage defining mirror. The output angles from such an embodiment are thus seven orders of magnitude below said figure for the angular input aperture. Since the solid angle of the (collimated) output beam is approximately proportional to the square of said output angle for a representative out-of-plane ray, the solid angle of the (collimated) output beam is some fourteen orders of magnitude below that of the electromagnetic energy incident to the first stage defined mirror.

As the output aperture of such an apparatus would be excessively large, the area of the (annular) output beam in this example could well be four orders of magnitude greater than the surface area of the source. Moreover, the amount of electromagnetic energy incident on the first stage defined mirror may be but a fraction of that emitted from the source. Clearly, however, these effects combined are nothing like large enough to outweigh the above fourteen orders of magnitude decrease. So that such an apparatus must increase the specific intensity of the electromagnetic energy in said output beam by many orders of magnitude compared with the specific intensity at the source.

It should be mentioned that it is equally possible to define a specific intensity, I, for all the wavelengths of interest as:

$$I = \lim_{\substack{\Delta t \to 0 \\ \Delta\sigma \to 0 \\ \Delta\omega \to 0}} \frac{\Delta E}{\Delta t \Delta\sigma \cos\theta \Delta\omega}$$

where $\Delta E$ is the total energy at the wavelengths of interest of those same rays.

The specific intensity is not, however, the rate per unit area at which energy of a given wavelength flows onto the point P on the target from all directions. That is the flux $F_\lambda$ at said point P. For any one beam, the rate per unit area at which energy of a given wavelength flows onto the small area $\Delta\sigma$ is:

$$\Delta F_\lambda = \frac{\Delta E_\lambda}{\Delta\lambda \Delta t \Delta\sigma}$$

So that the flux $F_\lambda$ at said point P is given by:

$$F_\lambda = \int dF_\lambda = \int \lim_{\substack{\Delta\lambda \to 0 \\ \Delta t \to 0 \\ \Delta\sigma \to 0 \\ \Delta\omega \to 0}} \frac{\Delta E_\lambda}{\Delta\lambda \Delta t \Delta\sigma \Delta\omega} d\omega$$

It will be noted that this quantity is being defined for the particular small area $\Delta\sigma$ and not relative to the cross-section of a beam and does not therefore use the projected area $\Delta\sigma \cos\theta$. The flux is not restricted to a single direction and is made up of the energies of many different beams. We may write:

$$\Delta F_\lambda = \frac{\Delta E_\lambda}{\Delta\lambda \Delta t \Delta\sigma \cos\theta \Delta\omega} \cos\theta \Delta\omega \text{ so that}$$

$$F_\lambda = \int I_\lambda \cos\theta d\omega$$

The definition of flux is such that there is no energy if any of the wavelength interval, the time interval or the area is zero. So that it is necessary to consider finite areas, as before.

It should be mentioned that the flux may equally be defined for all the wavelengths of interest as:

$$F = \int dF = \iint \lim_{\substack{\Delta\lambda \to 0 \\ \Delta t \to 0 \\ \Delta\sigma \to 0 \\ \Delta\omega \to 0}} \frac{\Delta E_\lambda}{\Delta\lambda \Delta t \Delta\sigma \Delta\omega} d\lambda d\omega$$

As aforesaid, the area of the (annular) output beam in the above example is excessively large and may be four orders of magnitude greater than that of the source. So that the flux of the electromagnetic energy in that output beam may be reduced by the apparatus compared to that at the source.

Since, however, the output beam is well collimated, it may be focussed by a parabolic mirror or a lens onto a small spot at which the flux will be very much greater than that at the source. For a similar example in an apparatus whose defining rays are directed to come to a focus and whose in and out-of-plane rays come approximately to said focus, the flux at said focus will similarly be very much greater than that at the source.

As has been pointed out in Section 6.15.5.3, a portion of a defining mirror lying between the pair of defining rays for one point on a defined mirror may overlap wholly or partially with a portion of a defining mirror lying between the pair of defining rays for another point on that defined mirror; so that the output rays for both the points of intersection on the defined mirror of said pairs of defining rays may also overlap wholly or partially. It follows that the area of the annular output beam does not necessarily increase as beams from the source to further points on the defined mirror are added. So that the ratio of the flux of the output beam to the flux at the source does not necessarily decrease upon said additions.

It has been mentioned in Section 6.15.8 that in some embodiments of the apparatus the physical output aperture for a final stage is chosen to be small to ensure that the output beam has a small annular thickness. This incidentally ensures that the ratio of the flux of the output beam to the flux at the source is high. Such an arrangement may involve extra pairs of reflections for some rays, but as they will generally fall within the cone of well directed rays which are incident at their point of intersection with the defined mirror of said final stage, as aforesaid, they will generally be well directed; while increasing the flux in the output beam.

An imaging system cannot increase the flux from an incoherent source if the refractive indices of the object and image spaces are equal and cannot increase said flux beyond the square of the ratio of the refractive index of the image space to that of the object space otherwise. A final argument about the energy at a point on the target shows that the flux from an incoherent source may be increased but that it is necessary to avoid a certain form of imaging.

In order to avoid the mathematical consequences of the above definitions of specific intensity and flux, let us suppose that the energy of a beam over some time interval is distributed over a finite number of individual rays so that those individual rays have nonzero energy, while at the same time regarding the number of rays as infinite for other purposes. Consider an apparatus which has a single final stage with a defining surface which is totally reflective or refractive and all of whose defining rays are directed at a particular point on a target.

If all those defining rays came from one point on the defined surface of said single final stage then the number of defining rays and their total energy at that point on the target would equal the number of defining rays and their total energy from that point on said defined surface. And, the defined surface for said single final stage would be merely a point and not a surface as stipulated. Moreover, not all the rays from that point on said defined surface would necessarily pass through that point on the target. Only if both that point on said defined surface and that point on the target were at conjugate points with respect to the defining surface of said single final stage, thus forming an imaging system for said two points, could an infinite number of rays of all types and their total energies even be equal at said two points. If such a defining surface is reflective then it must be an ellipsoid and both that point on said defined surface and that point on the target must be at its foci on its axis of symmetry. If such a defining surface is refractive then it must be aspheric but axially symmetric and both that point on said defined surface and that point on the target must be at conjugate points on its axis of symmetry. It is impossible even to construct an axially symmetric surface through a point on its axis of symmetry. So that the defined surface, if it also is axially symmetric, cannot exist even as a mirror through a point in such an imaging system. It should also be mentioned that the defined surface, and thus the surface of any source in contact with it, and the surface of a real image cannot be conjugate with respect to any single surface.

But the defining rays do not come from one point on said defined surface and said defined surface is not a point. On the contrary, defining rays from all the points on the defined surface of said single final stage are directed at said point on the target. Alternatively, if not all the pairs of defining rays are directed at said point on the target, in and out-of-plane rays from other points on said defined surface may come to said point. In either case, the number of rays and their total energy at a point on the target may be higher than the number of rays and their total energy at a point on said defined surface because their origin is not restricted to said point. It would be necessary to apportion the total energy over all the rays for all the points on the defined mirror, calculate the paths of those rays to the target, and then spread the energy of each ray over an appropriate small area of the target, to give the flux at the target. Equally, the rays from many points on the surface of the source may come to said point on the target. For an apparatus of multiple stages, it is easy to see that all the rays come to said point on the target, or approximately so, from the improvement in the accuracy with which a further ray may be directed by the provision of multiple stages. So that, provided a significant proportion of the electromagnetic energy emitted by the source is collected by the apparatus, the flux at a point on the target may be much higher than the flux at a point on the surface of the source. Hence again, the electromagnetic energy from an incoherent source can be concentrated onto a small spot.

6.19.2 Elementary radiators

Geometric optics is defined as that branch of optics which is independent of wavelength. The optics of an embodiment of the apparatus in which the defining and defined surfaces all comprise uncoated mirrors, each of whose (complex) refractive indices is the same for all wavelengths, is thus geometric.

An elementary radiator emits electromagnetic energy, which will have the same wavelength subject to the damping caused by loss of energy during the emission, the Doppler effect varying with its random thermal motion, and any stimulated emission caused by electromagnetic energy from other elementary radiators near to it, lasting for periods of $10^{-8}$ seconds on average. Such an emission may end because of loss of energy or a prior collision.

As electromagnetic energy of one wavelength must, in general, be elliptically polarised, even if said polarisation may reduce to circular or linear polarisation, such an elementary radiator may be considered to radiate a homogeneous spherical wave of elliptically polarised electromagnetic energy at any given point in time. A homogeneous wave is one in which the surfaces of constant amplitude coincide with the surfaces of constant phase; as, for instance, in the plane waves specified in Section 6.15.11.2.

In geometric optics, the wave surfaces and rays of electromagnetic energy in a transparent medium are orthogonal to each other (unless the medium of propagation is anisotropic which is unlikely to be the case). Thus, assuming geometric optics and ignoring any phase shifts on reflection, if an embodiment of the apparatus was comprised by uncoated mirrors, from the same sequence of which all the rays were reflected, and had sufficient stages to very nearly direct that electromagnetic energy, which entered it after emission by such an elementary radiator, towards a point, then the wave surfaces from that elementary radiator converging on said point would be nearly spherical in shape but not, of course, in extent. And the lengths of the various paths by which portions of each of said wave surfaces reached said point would be approximately the same. Moreover, the electromagnetic energy incident on said point would be nearly coherent (to a degree depending on the ratio between the asphericity of said wave surfaces and the wavelength of the electromagnetic energy).

Since that elementary radiator need not either be situated on the axis of symmetry 18, nor have any particular x co-ordinate, for the purpose of such a direction, the same would hold true for all such elementary radiators. But since a large number of non-adjacent elementary radiators will, in general, have random phases, and the approximations of the path lengths from elementary radiators which are randomly situated to said point will be random in value, the resultant waveforms they produce along each of the various paths converging on said point will be irregular, even though they are identical (subject to variations due to the uneven spread of electromagnetic energy over the wave surface from each one of the elementary radiators when output from the apparatus together with further variations due to the change of reflectivity with angle of incidence) and thus capable of reinforcing each other and, to some extent, of cancelling each other out. However, as the phase of each elementary radiator will vary in a truly random way over any practical period of observation the electromagnetic energy incident on said point originating from a large number of non-adjacent elementary radiators will not, in general, be coherent in terms of producing observable fringes, even if they were all emitting electromagnetic energy of the same wavelength.

6.19.3 Part waves

It has already been mentioned that different rays may take dissimilar paths through the apparatus and yet still be directed by the apparatus even though these paths do not necessarily include reflections or refractions at all the surfaces in the apparatus, and may include more than one reflection at a particular surface. And that a surface may be coated with one or more layers of dielectrics, at any surface of which either reflection or refraction may take place. Moreover that the component of a wave whose electric vector is parallel to the plane of incidence may give rise to two reflected part waves which are π out of phase if its angles of incidence lie either side of a Brewster angle. Thus a wave of electromagnetic energy from an elementary radiator may be split up into two or more part waves.

For coated mirrors, the thicknesses of the dielectric layers and the changes in their refractives indices with wavelength are so small that the effect of wavelength on the paths of the rays is extremely small. Moreover, the effect on the paths is only of consequence for the defining mirror of a final stage, which will only have at most one layer of coating because the rays are incident to it at small grazing angles; and for the defined mirror of a final stage when the rays are incident to the defining mirror of the final stage at small grazing angles and those grazing angles might be significantly different for a different path. As, in a typical embodiment, the rays are also incident to the defined mirror of the final stage at small grazing angles, it will also only have at most one layer of coating. These restrictions to a single layer and to the use of small grazing angles both reduce the lateral displacement of a ray due to a change of wavelength.

Defining rays refracted by a defining surface must be specified to have a particular wavelength. If the defining surface of the final stage in a series of stages refracts, then only electromagnetic energy of the specified wavelength will be directed by the apparatus in accordance with those defining rays. There is, however, no reason why an embodiment of the apparatus may not be designed with refraction at other surfaces and yet still direct rays of various wavelengths in accordance with the defining rays of a final stage if, at the point at which any such ray is reflected or refracted from the defined surface of that final stage, it lies within the cone of well directed rays which are reflected or refracted from that point.

Each such part wave which has undergone reflections and/or refractions at a particular sequence of surfaces, selected not only from the defining and defined surfaces themselves but also from the surfaces of any layers of dielectric deposited on any one of those defining and defined surfaces, will be directed by an apparatus of suitable design and sufficient stages for the purpose to approximately form a spherical wave converging on a point, as before. Of course, the apparatus may equally be designed to approximately form, inter alia, either a plane wave, or a spherical wave diverging from a point.

6.19.4 Wave surfaces

The deviation from the desired plane, spherical, or other shape of a wave surface with a certain phase on its exit from any given embodiment of the apparatus is very complicated, as is the calculation of that wave surface. Moreover, the deviation varies with the plane of polarisation being considered if that wave has been reflected at a metal surface. Two simple statements can, however, be made. Although these statements refer only to the case where the desired wave surface is a plane at right angles to the axis of symmetry 18, similar statements may be made for other cases. Firstly, the extent of the wave surface at right angles to the axis of symmetry 18 and thus across the annular exit aperture is limited by the width of said annular exit aperture, which is generally small as aforesaid. Secondly, those parts of the wave surface which are due to the rays which are not in a plane through the axis of symmetry 18 are spread over a considerable distance round the annular exit aperture. So that the greater deviation from the desired shape of the wave surface due to said rays is offset by that spread and does not imply a rapid deviation from the desired shape of the wave surface with respect to the distance round the annular exit aperture.

Since it is impossible to construct an envelope to a similar set of such wave surfaces, all of which must have the same wavelength and polarisation as well as the same phase, unless they are in, or very nearly in, a plane at right angles to the axis of symmetry 18 there is no reason to expect the emergence of a resultant wave surface which would "steer" part of the output beam (rather than just spread it). Moreover, even when such a construction is possible, the multiplicity of waves due to the multiplicity of elementary radiators tends to ensure that such an envelope is not at more than a very small angle to a plane at right angles to the axis of symmetry 18 since the nearest wave surfaces, to which such an envelope will fit best, tend to be close to each other in the direction of the x-axis. Moreover, the multiplicity of waves is increased if there is any splitting of waves into a greater number of part waves. It should also be mentioned that there is no physical evidence that an actual, rather than a resultant, wave surface can be created in empty space.

6.19.5 Effect on a target

The probability of the interaction of an electron with a wave of electromagnetic energy is proportional to the square of the (real) amplitude of that wave, as is the intensity or amount of energy which crosses in unit time a unit area normal to the direction of propagation of that wave. The square of the amplitude of the resultant of n simple harmonic waves of the same frequency following the same path is given by:

$$a_r^2 = \sum_{i=1}^{n} a_i^2 + \sum_{i=1}^{n} \sum_{j=1}^{n} a_i a_j \cos \delta_{ij}$$

where $a_i$ is the amplitude of the ith wave and $\delta_{ij}$ is the phase difference between the ith and jth wave (and $\delta_{ii}$ does not exist). A similar result may be obtained in terms of electric and magnetic vectors.

If the phase differences are random then there will be as many $\cos \delta_{ij}$ with a negative value as a positive value and the second term in the expression for $a_r^2$ will be small. In which case, the square of the amplitude of the resultant is approximately equal to the sum of the squares of the amplitudes of the individual waves. Whereas if all the waves are in phase then all the $\delta_{ij}$ will be zero and all the $\cos \delta_{ij}$ will be one. This, however, applies to both the probability of interaction and the intensity.

Thus if the surface of an opaque target is placed close to (but not at) said point towards which electromagnetic energy is directed, the result of the irregularity of the waveform of the electromagnetic energy incident upon it will be that such electromagnetic energy will penetrate the same distance into the target as electromagnetic energy of the same intensity but a simple harmonic waveform, since such energy cannot be reflected without interacting; provided there is no other reason for the respective absorption coefficients of the material of the target for electromagnetic energy with an irregular and a simple harmonic waveform at each of the incident wavelengths to be different.

6.19.6 Plasma frequency

Although an electron in free space is unable to gain the energy of a photon because it would thereby be accelerated to the speed of light, a free electron which is restrained within a material but not bound to one of its atoms is not prevented from being accelerated by an electromagnetic field and may absorb (and emit) a photon.

If such a field has a frequency less than the plasma frequency which is defined as $\omega_p = (Ne^2/\epsilon_0 m)^{1/2}$ where N is the number density of electrons, e is the electron charge, $\epsilon_0$ is the permittivity of free space and m is the electron mass then such a free electron will accelerate in phase with said field.

When said field changes its direction, said free electron will reradiate, unless it has already collided with an atom. Thus the reflectivity of a material containing free electrons at a frequency below the plasma frequency corresponding to the number density of those free electrons is predominantly determined by the number density of those free electrons.

At frequencies above the plasma frequency, the inertia of said free electron will prevent it from oscillating in phase with the field and severely reduce the probability of its absorbing a photon.

6.19.7 Effects associated with a high intensity bean at a target

In certain situations the irradiation of a target by a beam whose intensity is many megawatts per square centimeter can increase the reflectivity of that target.

If a semiconductor or an insulator is irradiated by electromagnetic energy of a sufficiently low wavelength electrons will be freed and may then obtain sufficient energy to free other electrons by impact ionisation and create a reflective plasma of electrons within the target. The multiplication of free electrons by impact ionisation is known as an electron avalanche.

If any target is irradiated by such a powerful beam for longer than a very short pulse material will be evaporated from its surface and ionised to form a reflective plasma which shields the target.

Now the apparatus can, as aforesaid, use coherent or incoherent electromagnetic energy of any wavelength which may be wholly or partially reflected or refracted. And Aluminium, for instance, can reflect very short wavelengths of 0.12 μm at normal incidence when coated with Magnesium Fluoride and of 0.035 μm at grazing incidence provided an oxide layer is not allowed to form on its surface. Finally, the plasma frequency is proportional to the square root of the number density of electrons in it. Thus a beam from the apparatus which includes electromagnetic energy with low wavelengths can penetrate materials and plasmas with a very high number density of electrons.

Dynamically loading a target produces several particularly efficient kill mechanisms. The low reflectivity of most materials at low wavelengths enables such a beam to heat those materials to their vaporization temperature, and thus dynamically load the target, more quickly. The high number density of electrons, and thus the high density and temperature of the plasma, which may be achieved before plasma shielding takes place enables such a beam to dynamically load a target more heavily. If the source is continuous, and the beam remains focussed on the same spot on the target, the dynamic loading of that spot will also be continuous provided the beam is not so intense and so completely focussed that plasma shielding is initiated. Thus the apparatus when used with a continuous source of energy may not only deliver a higher average power level than a pulsed laser and produce dynamic loading on the target but also avoid initiating plasma shielding at the target provided the energy distribution over the wavelengths of the electromagnetic energy emitted by said source is sufficiently weighted in favour of low wavelengths as to avoid the initiation of plasma shielding at the target.

6.19.8 Atmospheric absorption and scattering

It should, however, be mentioned that wavelengths below 0.1751 μm are strongly absorbed by molecular oxygen in the atmosphere due to the Schumann-Runge continuum and that Rayleigh scattering of shorter wavelengths is very high. At low altitudes, Mie scattering of shorter wavelengths by the larger aerosol particles in the atmosphere is also significant. Molecular oxygen absorbs weakly below 0.205 μm due to the Schumann-Runge bands, and more weakly still below 0.2424 μm due to the Herzberg continuum.

The intensity within the atmosphere of a substantially monochromatic beam, such as that produced by a laser, is reduced by the build up of Stimulated Raman Scattering by nitrogen molecules. If, however, the electromagnetic energy is distributed over a number of component wavelengths which cannot interact coherently, Stimulated Raman Scattering will not become significant until the energy of each such component exceeds the threshold at which said build up is considered to begin. So that if the source of electromagnetic energy for the apparatus has a wide waveband or a sufficient number of widely spaced component wavelengths, Stimulated Raman Scattering will be insignificant. In which case, high intensities may be produced on a target even when that target is within the lower atmosphere.

Wavelengths below 0.311 μm are strongly absorbed by ozone due to the Hartley continuum. At altitudes between 10 and 40 kilometers the absorption of wavelengths between 0.22 and 0.29 μm by Ozone is very high.

6.20 Comparison with lasers

The stimulated emission of radiation requires a population inversion or similar process in an active medium. The collimation of the output beam from any laser is limited by the homogeneity of this lasing medium. The apparatus itself does not require any such working medium and its operation prior to the defined mirror of the final stage in a series of stages is unaffected by the inhomogeneity of any medium inside it, as already mentioned.

In chemically powered lasers the active medium consists of the product or one of the products of a chemical reaction which must be disposed of. In some other types of laser, the active medium must be cooled and the heat which must be removed from said active medium is proportional to the volume of said active medium and may therefore be large in amount. In the apparatus itself, the only heat which must be removed is proportional to the surface area of its mirrors and/or the volume of any transparent material in it.

The apparatus itself does not require a resonant cavity, so that the dimensions of an embodiment of the apparatus whose source of electromagnetic energy is external to it are not in any way determined by the length of such a cavity, which may be excessively large in some designs of laser, and whose ratio to the diameter of the cavity may have to be high to collimate the output of the laser.

6.21.0 Continuity of surfaces
6.21.1 Differential equation of the defined surface Equations for defined surfaces may be found using many different co-ordinate systems.

In an axially symmetric embodiment of the apparatus in which each pair of defining rays lies entirely in a respective plane through the axis of symmetry 18, the co-ordinates of the point of intersection 7 of the defining rays 5 and 6 on either the defined mirror 2 or the defined surface 24 may be related to the co-ordinates of the respective further points 8 and 10 at which the defining rays intersect the defining surface(s) together with the further polar co-ordinates $\delta_1$ and $\delta_2$ using the geometry of the defining rays.

The design of a defined surface may be commenced from such a point of intersection 7 by specifying the gradient $\gamma_0$ of the defined surface at that point. The relationship between $\gamma_0$ and the co-ordinates of that point together with their differentials is a differential equation.

As it is desirable that the defined surface is continuous, rather than a set of unconnected point surfaces, such differential equations must be solved in a way that ensures this. A method of achieving this purpose will now be described for various axially symmetric embodiments. Each solution of such a differential equation for an axially symmetric embodiment represents a plane curve with one degree of freedom.

It is, of course, equally desirable that the defining surface (s) are continuous. This, however, is generally the case for a specification of a defining surface, so that it is not as difficult to ensure that the defining surface is continuous as it is to ensure that a defined surface is continuous. In order to keep the latter more difficult objective in mind therefore, the following mathematical treatment is given in terms only of the continuity of a defined surface.

The methods of solution in Section 6.21.7 are not applicable to defining surface(s). Nevertheless, the reverse surface of a defined mirror may always form the defining mirror(s) of a next stage in parallel inwards, so that any of the equations of a defined surface may be used as the equation of a defining surface (subject to some offset or scaling to take account of the thickness of the mirrors).

In addition, some of the specifications for the gradient of a defined surface may be used for the specification of the gradient of a defining surface or a portion thereof even when there are no stages in parallel. This will be indicated where applicable.

The relation between the further polar co-ordinate $\delta_1$ of a respective further point on a defining mirror and the gradient $\gamma_1$ together with the output angle $\beta_1$ at that respective further point was derived in Section 6.14.3.1. The gradient of a surface is related to the co-ordinates of that surface while each output angle is one of the fundamental choices of any design of the apparatus. Thus the expression $2\gamma_1 - \beta_1$ is used throughout the remaining mathematics in place of $\delta_1$ as the latter is less meaningful therein, even though the former is strictly only appropriate to a defining mirror.

6.21.1.1 Cartesian co-ordinates of the defined surface

The cartesian co-ordinates $x_0, y_0$ of the point of intersection 7 of the defining rays 5 and 6 may be related to the polar co-ordinates of said respective further points 8 and 10 using FIG. 10.

As $\beta_1 = 2\gamma_1 - \delta_1$ for the or the first defining mirror so $\delta_1 = 2\gamma_1 - \beta_1$. Similarly $\delta_2 = 2\gamma_2 - \beta_2$ for the or the second defining mirror. It follows from the definition of the tangent of an angle that:

$$\tan \delta_1 = \tan(2\gamma_1 - \beta_1) = \frac{r_1 \sin\theta_1 - y_0}{r_1 \cos\theta_1 - x_0} \text{ and}$$

$$\tan \delta_2 = \tan(2\gamma_2 - \beta_2) = \frac{r_2 \sin\theta_2 - y_0}{r_2 \cos\theta_2 - x_0}$$

Hence: –

$$\begin{aligned} y_0 &= r_1\sin\theta_1 - r_1\cos\theta_1\tan(2\gamma_1 - \beta_1) + x_0\tan(2\gamma_1 - \beta_1) \\ &= r_2\sin\theta_2 - r_2\cos\theta_2\tan(2\gamma_2 - \beta_2) + x_0\tan(2\gamma_2 - \beta_2) \end{aligned}$$

So that: –

$$\begin{aligned} x_0 &= \frac{\begin{array}{l} r_2(\sin\theta_2\cos(2\gamma_2 - \beta_2) - \cos\theta_2\sin(2\gamma_2 - \beta_2))\cos(2\gamma_1 - \beta_1) - \\ r_1(\sin\theta_1\cos(2\gamma_1 - \beta_1) - \cos\theta_1\sin(2\gamma_1 - \beta_1))\cos(2\gamma_2 - \beta_2) \end{array}}{\sin(2\gamma_1 - \beta_1)\cos(2\gamma_2 - \beta_2) - \sin(2\gamma_2 - \beta_2)\cos(2\gamma_1 - \beta_1)} \\ &= \frac{\begin{array}{l} r_2\sin(\theta_2 - 2\gamma_2 + \beta_2)\cos(2\gamma_1 - \beta_1) - \\ r_1\sin(\theta_1 - 2\gamma_1 + \beta_1)\cos(2\gamma_2 - \beta_2) \end{array}}{\sin(2\gamma_1 - \beta_1 - 2\gamma_2 + \beta_2)} \end{aligned}$$

And: –

$$\begin{aligned} x_0 &= r_1\cos\theta_1 - r_1\sin\theta_1\cot(2\gamma_1 - \beta_1) + y_0\cot(2\gamma_1 - \beta_1) \\ &= r_2\cos\theta_2 - r_2\sin\theta_2\cot(2\gamma_2 - \beta_2) + y_0\cot(2\gamma_2 - \beta_2) \end{aligned}$$

So that: –

$$\begin{aligned} y_0 &= \frac{\begin{array}{l} r_2(\sin\theta_2\cos(2\gamma_2 - \beta_2) - \cos\theta_2\sin(2\gamma_2 - \beta_2))\sin(2\gamma_1 - \beta_1) - \\ r_1(\sin\theta_1\cos(2\gamma_1 - \beta_1) - \cos\theta_1\sin(2\gamma_1 - \beta_1))\sin(2\gamma_2 - \beta_2) \end{array}}{\sin(2\gamma_1 - \beta_1)\cos(2\gamma_2 - \beta_2) - \sin(2\gamma_2 - \beta_2)\cos(2\gamma_1 - \beta_1)} \\ &= \frac{\begin{array}{l} r_2\sin(\theta_2 - 2\gamma_2 + \beta_2)\sin(2\gamma_1 - \beta_1) - \\ r_1\sin(\theta_1 - 2\gamma_1 + \beta_1)\sin(2\gamma_2 - \beta_2) \end{array}}{\sin(2\gamma_1 - \beta_1 - 2\gamma_2 + \beta_2)} \end{aligned}$$

Hence $x_o = x_o(\theta_1, \theta_2, 2\gamma_1 - \beta_1, 2\gamma_2 - \beta_2, r_1, r_2)$ and $y_o = y_o(\theta_1, \theta_2, 2\gamma_1 - \beta_1, 2\gamma_2 - \beta_2, r_1, r_2)$.

It will be seen that this derivation could be performed in terms of a similar set of co-ordinates $\{\theta_1, \theta_2, \delta_1, \delta_2, r_1, r_2\}$ for the defining surface(s); as could any such derivation.

6.21.1.2 Polar co-ordinates of the defined surface

As $r_0 = (x_0^2 + y_0^2)^{1/2}$ and $\theta_0 = \arctan y_0/x_0$ so $r_0 = r_0(\theta_1, \theta_2, 2\gamma_1 - \beta_1, 2\gamma_2 - \beta_2, r_1, r_2)$ and $\theta_0 = \theta_0(\theta_1, \theta_2, 2\gamma_1 - \beta_1, 2\gamma_2 - \beta_2, r_1, r_2)$. There are, however, simpler relationships.

FIG. 90 is a further extract from FIG. 5A showing how the polar co-ordinates $r_0, \theta_0$ of the point of intersection 7 of the defining rays 5 and 6 are related to the further polar co-ordinate $\delta_1$ of the respective further point 8 on the defining mirror 1 and the polar co-ordinates $r_1,\theta_1$ of said respective further point 8.

Also shown is the similar relationship of $r_0,\theta_0$ to the further polar co-ordinate $\delta_2$ of the respective further point 10 and the polar co-ordinates $r_2,\theta_2$ of said respective further point 10.

As before $\delta_1=2\gamma_1-\beta_1$ and $\delta_2=2\gamma_2-\beta_2$ as shown.

Applying the Law of Sines to the triangle whose vertices are the origin O and the points 7 and 8 gives:

$$\frac{r_0}{\sin(\theta_1 - 2\gamma_1 + \beta_1)} = \frac{r_1}{\sin(2\gamma_1 - \beta_1 + \pi - \theta_0)}$$

$$\frac{r_0}{\sin(\theta_1 - 2\gamma_1 + \beta_1)} = \frac{r_1}{\sin(\theta_0 - 2\gamma_1 + \beta_1)}$$

Applying the Law of Sines to the triangle whose vertices are the origin O and the points 7 and 10 gives:

$$\frac{r_0}{\sin(\theta_2 - 2\gamma_2 + \beta_2)} = \frac{r_2}{\sin(2\gamma_2 - \beta_2 + \pi - \theta_0)}$$

$$\frac{r_0}{\sin(\theta_2 - 2\gamma_2 + \beta_2)} = \frac{r_2}{\sin(\theta_0 - 2\gamma_2 + \beta_2)}$$

6.21.1.3 Various forms of the differential equation

The gradient of any line at a particular point may be chosen from two angles which differ by $\pi$. When deriving any form of differential equation for the defined surface both choices of angle for the gradient $\gamma_0$ of said defined surface produce exactly the same differential equation.

In FIG. 91 the plane 19 of the paper is a plane through the axis of symmetry 18. FIG. 91 shows a portion of an axially symmetric defined mirror 2 lying in the plane 19 of the paper with two points P and Q on it whose cartesian co-ordinates are respectively $x_0,y_0$ and $x_0+\Delta x_0, y_0+\Delta y_0$ and whose polar co-ordinates are respectively $r_0$, $\theta_0$ and $r_0+\Delta r_0$, $\theta_0+\Delta\theta_0$ together with a line PR parallel to the x-axis 20 and a choice of angle for $\gamma_0$.

6.21.1.3.1 Cartesian co-ordinates

As the point Q approaches the point P, $\Delta x_0 \to 0, \Delta y_0 \to 0$, $\Delta \gamma_0 \to 0$ and the angle $\angle RPQ \to \gamma_0$. It follows from the definition of the tangent of an angle and of a differential that:

$$\tan\gamma_0 = \lim_{\Delta x_0 \to 0} \frac{\Delta y_0}{\Delta x_0} = \frac{dy_0}{dx_0}$$

where $dx_0$ and $dy_0$ are differentials; so that the cartesian form of the differential equation is:

$$\sin\gamma_0 dx_0 - \cos\gamma_0 dy_0 = 0$$

6.21.1.3.2 Polar co-ordinates

Applying the Law of Sines to the triangle OPQ in FIG. 91 gives:

$$\frac{r_0 + \Delta r_0}{\sin(\angle RPQ + \pi - \theta_0)} = \frac{r_0}{\sin(\pi - \angle RPQ - (\pi - (\theta_0 + \Delta\theta_0)))}$$

$$\frac{r_0 + \Delta r_0}{\sin(\angle RPQ - \theta_0)} = \frac{r_0}{\sin(-\angle RPQ + \theta_0 + \Delta\theta_0)}$$

$$\frac{r_0 + \Delta r_0}{\sin(\angle RPQ - \theta_0)} = \frac{r_0}{\sin(\angle RPQ - \theta_0 - \Delta\theta_0)}$$

$$(r_0 + \Delta r_0)(\sin(\angle RPQ - \theta_0)\cos\Delta\theta_0 -$$

$$\cos(\angle RPQ - \theta_0)\sin\Delta\theta_0) - r_0\sin(\angle RPQ - \theta_0) = 0$$

As the point Q approaches the point P, the angle $\angle RPQ \to \gamma_0, \Delta r_0 \to 0$ and $\Delta\theta_0 \to 0$ so that excluding infinitesimals of order higher than $\Delta r_0$ or $\Delta\theta_0 \cos\Delta\theta_0 \to 1$, $\sin\Delta\theta_0 \to \Delta\theta_0$ and $\Delta r_0 \sin\Delta\theta_0 \to 0$. It follows from the definition of a differential that:

$$\frac{r_0\cos(\gamma_0 - \theta_0)}{\sin(\gamma_0 - \theta_0)} = \lim_{\Delta\theta_0 \to 0} \frac{\Delta r_0}{\Delta\theta_0} = \frac{dr_0}{d\theta_0}$$

where $dr_0$ and $d\theta_0$ are differentials; so that the polar form of the differential equation is:

$$\sin(\gamma_0 - \theta_0)dr_0 - r_0 \cos(\gamma_0 - \theta_0)d\theta_0 = 0$$

As $d(r_0\sin(\gamma_0-\theta_0)) = \sin(\gamma_0-\theta_0)dr_0 + r_0\cos(\gamma_0-\theta_0)(d\gamma_0-d\theta_0)$ this may also be written:

$$d(r_0 \sin(\gamma_0-\theta_0)) - r_0 \cos(\gamma_0-\theta_0)d\gamma_0 = 0$$

Both $r_0\sin(\gamma_0-\theta_0)$ and $r_0\cos(\gamma_0-\theta_0)$ can be expressed in terms of the co-ordinates for the defining mirror $\theta_1,\theta_2,2\gamma_1-\beta_1,2\gamma_2-\beta_2,r_1,r_2$ together with $\gamma_0$ using the relations in Section 6.21.1.2 as follows:

$$-r_0(\sin(2\gamma_1 - \beta_1 - \gamma_0)\cos(\gamma_0 - \theta_0) +$$

$$\cos(2\gamma_1 - \beta_1 - \gamma_0)\sin(\gamma_0 - \theta_0)) = r_1\sin(\theta_1 - 2\gamma_1 + \beta_1) \text{ and}$$

$$-r_0(\sin(2\gamma_2 - \beta_2 - \gamma_0)\cos(\gamma_0 - \theta_0) +$$

$$\cos(2\gamma_2 - \beta_2 - \gamma_0)\sin(\gamma_0 - \theta_0)) = r_2\sin(\theta_2 - 2\gamma_2 + \beta_2)$$

So that: –

$$r_0\cos(\gamma_0 - \theta_0) (\sin(2\gamma_1 - \beta_1 - \gamma_0)\cos(2\gamma_2 - \beta_2 - \gamma_0) -$$

$$\cos(2\gamma_1 - \beta_1 - \gamma_0)\sin(2\gamma_2 - \beta_2 - \gamma_0)) = r_2\sin(\theta_2 - 2\gamma_2 +$$

$$\beta_2)\cos(2\gamma_1 - \beta_1 - \gamma_0) - r_1\sin(\theta_1 - 2\gamma_1 + \beta_1)\cos(2\gamma_2 - \beta_2 - \gamma_0)$$

$$r_0\cos(\gamma_0 - \theta_0) = -\frac{r_2\sin(\theta_2 - 2\gamma_2 + \beta_2)\cos(2\gamma_1 - \beta_1 - \gamma_0)}{\sin(2\gamma_1 - \beta_1 - 2\gamma_2 + \beta_2)}$$
$$\phantom{r_0\cos(\gamma_0 - \theta_0) =} \frac{-r_1\sin(\theta_1 - 2\gamma_1 + \beta_1)\cos(2\gamma_2 - \beta_2 - \gamma_0)}{}$$

And: –

$$r_0\sin(\gamma_0 - \theta_0) (\sin(2\gamma_1 - \beta_1 - \gamma_0)\cos(2\gamma_2 - \beta_2 - \gamma_0) -$$

$$\cos(2\gamma_1 - \beta_1 - \gamma_0)\sin(2\gamma_2 - \beta_2 - \gamma_0)) = -r_2\sin(\theta_2 - 2\gamma_2 +$$

$$\beta_2)\sin(2\gamma_1 - \beta_1 - \gamma_0) + r_1\sin(\theta_1 - 2\gamma_1 + \beta_1)\sin(2\gamma_2 - \beta_2 - \gamma_0)$$

$$r_0\sin(\gamma_0 - \theta_0) = -\frac{r_2\sin(\theta_2 - 2\gamma_2 + \beta_2)\sin(2\gamma_1 - \beta_1 - \gamma_0)}{\sin(2\gamma_1 - \beta_1 - 2\gamma_2 + \beta_2)}$$
$$\phantom{r_0\sin(\gamma_0 - \theta_0) =} \frac{-r_1\sin(\theta_1 - 2\gamma_1 + \beta_1)\sin(2\gamma_2 - \beta_2 - \gamma_0)}{}$$

6.21.1.4 Path lengths

The further polar co-ordinate $p_1$ represents that portion of the path of the first defining ray 5 which lies between its point of intersection 7 with the second defining ray 6 on either the defined mirror 2 or the defined surface 24 and its intersection at the respective further point 8 with either the defining mirror 1 or the defining surface 27 when measured from said point of intersection 7. It should be noted that neither $p_1,\delta_1$ nor $p_2,\delta_2$ are co-ordinates of the defined mirror or surface.

FIG. 92 is a still further extract from FIG. 5A distorted to show more clearly how the further polar co-ordinates $p_1,\delta_1$ of the respective further point 8 arc related to the polar co-ordinates $r_1,\theta_1$, of said respective further point 8 and the polar co-ordinates $r_0,\theta_0$ of the point of intersection 7 of the defining rays 5 and 6 which comprises the origin of said further polar co-ordinates.

In order to illustrate the significance of angles such as $\gamma_0-\theta_0$ and $\delta_1-\gamma_0$, the gradient $\gamma_0$ of either the defined mirror 2 or the defined surface 24 at said point 7 is included in said relationship. FIG. 92 shows lines 161 and 162 through said point 7 and the origin O respectively at angles of $\gamma_0$ to the x-axis together with perpendiculars 163 and 164 to said lines from said points 7 and 8 respectively.

There is a similar relationship for the further polar co-ordinates $p_2, \delta_2$ of the respective further point 10 and the polar co-ordinates $r_2, \theta_2$ of said respective further point 10.

As before $\delta_1 = 2\gamma_1 - \beta_1$ and $\delta_2 = 2\gamma_2 - \beta_2$ for the defining mirror(s), as is shown for $\delta_1$.

As the portion shown in FIG. 92 of the path of the first defining ray 5 between the point of intersection $r_0, \theta_0$ of the two defining rays and the point of intersection $r_1, \theta_1$ of the first defining ray 5 with the or the first defining mirror is $p_1$ in length (measured from said point of intersection $r_0, \theta_0$):

$$r_1 \genfrac{}{}{0pt}{}{\sin}{\cos}(\theta_1 - \gamma_0) = r_0 \genfrac{}{}{0pt}{}{\sin}{\cos}(\theta_0 - \gamma_0) + p_1 \genfrac{}{}{0pt}{}{\sin}{\cos}(2\gamma_1 - \beta_1 - \gamma_0)$$

for all values of $r_0, r_1, \theta_0, \theta_1, 2\gamma_1 - \beta_1$ and $\gamma_0$.

Similarly, as the portion of the path of the second defining ray 6 between the point of intersection $r_0, \theta_0$ of the two defining rays and the point of intersection $r_2, \theta_2$ of the second defining ray 6 with the or the second defining mirror is $p_2$ in length (measured from said point of intersection $r_0, \theta_0$):

$$r_2 \genfrac{}{}{0pt}{}{\sin}{\cos}(\theta_2 - \gamma_0) = r_0 \genfrac{}{}{0pt}{}{\sin}{\cos}(\theta_0 - \gamma_0) + p_2 \genfrac{}{}{0pt}{}{\sin}{\cos}(2\gamma_2 - \beta_2 - \gamma_0)$$

for all values of $r_0, r_2, \theta_0, \theta_2, 2\gamma_2 - \beta_2$ and $\gamma_0$.

Now $r_1 \genfrac{}{}{0pt}{}{\sin}{\cos}(\theta_1 - \gamma_0) - r_0 \genfrac{}{}{0pt}{}{\sin}{\cos}(\theta_0 - \gamma_0)$ $$= \frac{r_1\sin(\theta_1 - 2\gamma_1 + \beta_1) \genfrac{}{}{0pt}{}{\sin}{\cos}(2\gamma_2 - \beta_2 - \gamma_0) - r_1\sin(\theta_2 - 2\gamma_2 + \beta_2) \genfrac{}{}{0pt}{}{\sin}{\cos}(2\gamma_1 - \beta_1 - \gamma_0) + r_1 \genfrac{}{}{0pt}{}{\sin}{\cos}(\theta_1 - \gamma_0)\sin(2\gamma_1 - \beta_1 - 2\gamma_2 + \beta_2)}{\sin(2\gamma_1 - \beta_1 - 2\gamma_2 + \beta_2)}$$

$$= \frac{\frac{r_1}{2}\left( \genfrac{}{}{0pt}{}{\cos}{\sin}(\theta_1 + \gamma_0 - 2\gamma_1 + \beta_1 - 2\gamma_2 + \beta_2) \genfrac{}{}{0pt}{}{-\cos}{+\sin}(\theta_1 - \gamma_0 - 2\gamma_1 + \beta_1 + 2\gamma_2 - \beta_2) \right) \mp }{}$$

$$\frac{r_1}{2}\left( \genfrac{}{}{0pt}{}{\cos}{\sin}(\theta_1 - \gamma_0 + 2\gamma_1 - \beta_1 - 2\gamma_2 + \beta_2) - \genfrac{}{}{0pt}{}{\cos}{\sin}(\theta_1 - \gamma_0 - 2\gamma_1 + \beta_1 + 2\gamma_2 - \beta_2) \right) - $$

$$= \frac{r_2\sin(\theta_2 - 2\gamma_2 + \beta_2) \genfrac{}{}{0pt}{}{\sin}{\cos}(2\gamma_1 - \beta_1 - \gamma_0)}{\sin(2\gamma_1 - \beta_1 - 2\gamma_2 + \beta_2)}$$

$$= \frac{r_1\sin(\theta_1 - 2\gamma_2 + \beta_2) \genfrac{}{}{0pt}{}{\sin}{\cos}(2\gamma_1 - \beta_1 - \gamma_0) - r_2\sin(\theta_2 - 2\gamma_2 + \beta_2) \genfrac{}{}{0pt}{}{\sin}{\cos}(2\gamma_1 - \beta_1 - \gamma_0)}{\sin(2\gamma_1 - \beta_1 - 2\gamma_2 + \beta_2)}$$

$$= \genfrac{}{}{0pt}{}{\sin}{\cos}(2\gamma_1 - \beta_1 - \gamma_0) \frac{r_1\sin(\theta_1 - 2\gamma_2 + \beta_2) - r_2\sin(\theta_2 - 2\gamma_2 + \beta_2)}{\sin(2\gamma_1 - \beta_1 - 2\gamma_2 + \beta_2)}$$

Hence $p_1 = \dfrac{r_1\sin(\theta_1 - 2\gamma_2 + \beta_2) - r_2\sin(\theta_2 - 2\gamma_2 + \beta_2)}{\sin(2\gamma_1 - \beta_1 - 2\gamma_2 + \beta_2)}$ While $r_2 \genfrac{}{}{0pt}{}{\sin}{\cos}(\theta_2 - \gamma_0) - r_0 \genfrac{}{}{0pt}{}{\sin}{\cos}(\theta_0 - \gamma_0)$ $$= \frac{r_1\sin(\theta_1 - 2\gamma_1 + \beta_1) \genfrac{}{}{0pt}{}{\sin}{\cos}(2\gamma_2 - \beta_2 - \gamma_0) - r_2\sin(\theta_2 - 2\gamma_2 + \beta_2) \genfrac{}{}{0pt}{}{\sin}{\cos}(2\gamma_1 - \beta_1 - \gamma_0) + r_2 \genfrac{}{}{0pt}{}{\sin}{\cos}(\theta_2 - \gamma_0)\sin(2\gamma_1 - \beta_1 - 2\gamma_2 + \beta_2)}{\sin(2\gamma_1 - \beta_1 - 2\gamma_2 + \beta_2)}$$

$$r_1\sin(\theta_1 - 2\gamma_1 + \beta_1) \genfrac{}{}{0pt}{}{\sin}{\cos}(2\gamma_2 - \beta_2 - \gamma_0) \mp$$

$$\frac{r_2}{2}\left( \genfrac{}{}{0pt}{}{\cos}{\sin}(\theta_2 - \gamma_0 + 2\gamma_1 - \beta_1 - 2\gamma_2 + \beta_2) - \genfrac{}{}{0pt}{}{\cos}{\sin}(\theta_2 - \gamma_0 - 2\gamma_1 + \beta_1 + 2\gamma_2 - \beta_2) \right) +$$

$$= \frac{\frac{r_2}{2}\left( \genfrac{}{}{0pt}{}{+\cos}{-\sin}(\theta_2 - \gamma_0 + 2\gamma_1 - \beta_1 - 2\gamma_2 + \beta_2) - \genfrac{}{}{0pt}{}{\sin}{\cos}(\theta_2 + \gamma_0 - 2\gamma_1 + \beta_1 - 2\gamma_2 + \beta_2) \right)}{\sin(2\gamma_1 - \beta_1 - 2\gamma_2 + \beta_2)}$$

$$= \frac{r_1\sin(\theta_1 - 2\gamma_1 + \beta_1) \genfrac{}{}{0pt}{}{\sin}{\cos}(2\gamma_2 - \beta_2 - \gamma_0) - r_2\sin(\theta_2 - 2\gamma_1 + \beta_1) \genfrac{}{}{0pt}{}{\sin}{\cos}(2\gamma_2 - \beta_2 - \gamma_0)}{\sin(2\gamma_1 - \beta_1 - 2\gamma_2 + \beta_2)}$$

$$= \genfrac{}{}{0pt}{}{\sin}{\cos}(2\gamma_2 - \beta_2 - \gamma_0) \frac{r_1\sin(\theta_1 - 2\gamma_1 + \beta_1) - r_2\sin(\theta_2 - 2\gamma_1 + \beta_1)}{\sin(2\gamma_1 - \beta_1 - 2\gamma_2 + \beta_2)}$$

Hence $p_2 = \dfrac{r_1\sin(\theta_1 - 2\gamma_1 + \beta_1) - r_2\sin(\theta_2 - 2\gamma_1 + \beta_1)}{\sin(2\gamma_1 - \beta_1 - 2\gamma_2 + \beta_2)}$ These expressions at once give rise to the following two relations where the ordered set or list of variables $\{Y_1, \ldots, Y_6\} \leftrightarrows \{\theta_1, \theta_2, 2\gamma_1-\beta_1, 2\gamma_2-\beta_2, r_1, r_2\}$ in an ordered one-to-one correspondence, j' is an integer with a range of 1 to 6 and the subscript $Y_{j'}$ specifies all the variables $Y_1, \ldots, Y_6$; so that the subscript $Y_{j'} \neq 2\gamma_2-\beta_2$ specifies that all the variables $Y_1, \ldots, Y_6$ except $2\gamma_2-\beta_2$, or $Y_4$, are held constant:

$$\left(\frac{\partial p_1}{\partial (2\gamma_2 - \beta_2)}\right)_{Y_{j'} \neq 2\gamma_2-\beta_2} = \frac{\begin{array}{c}(-r_1\cos(\theta_1 - 2\gamma_2 + \beta_2) + r_2\cos(\theta_2 - 2\gamma_2 + \beta_2))\sin(2\gamma_1 - \beta_1 - 2\gamma_2 + \beta_2) + \\ (r_1\sin(\theta_1 - 2\gamma_2 + \beta_2) - r_2\sin(\theta_2 - 2\gamma_2 + \beta_2))\cos(2\gamma_1 - \beta_1 - 2\gamma_2 + \beta_2)\end{array}}{\sin^2(2\gamma_1 - \beta_1 - 2\gamma_2 + \beta_2)}$$

$$= \frac{r_1\sin(\theta_1 - 2\gamma_1 + \beta_1) - r_2\sin(\theta_2 - 2\gamma_1 + \beta_1)}{\sin^2(2\gamma_1 - \beta_1 - 2\gamma_2 + \beta_2)}$$

$$= \frac{p_2}{\sin(2\gamma_1 - \beta_1 - 2\gamma_2 + \beta_2)}$$

$$\left(\frac{\partial p_2}{\partial (2\gamma_1 - \beta_1)}\right)_{Y_{j'} \neq 2\gamma_1-\beta_1} = \frac{\begin{array}{c}(-r_1\cos(\theta_1 - 2\gamma_1 + \beta_1) + r_2\cos(\theta_2 - 2\gamma_1 + \beta_1))\sin(2\gamma_1 - \beta_1 - 2\gamma_2 + \beta_2) - \\ (r_1\sin(\theta_1 - 2\gamma_1 + \beta_1) - r_2\sin(\theta_2 - 2\gamma_1 + \beta_1))\cos(2\gamma_1 - \beta_1 - 2\gamma_2 + \beta_2)\end{array}}{\sin^2(2\gamma_1 - \beta_1 - 2\gamma_2 + \beta_2)}$$

$$= \frac{-r_1\sin(\theta_1 - 2\gamma_2 + \beta_2) + r_2\sin(\theta_2 - 2\gamma_2 + \beta_2)}{\sin^2(2\gamma_1 - \beta_1 - 2\gamma_2 + \beta_2)}$$

$$= -\frac{p_1}{\sin(2\gamma_1 - \beta_1 - 2\gamma_2 + \beta_2)}$$

It will be observed that there is considerable similarity between the expressions for the path lengths:

$$p_1 = \frac{r_1\sin(\theta_1 - 2\gamma_2 + \beta_2) - r_2\sin(\theta_2 - 2\gamma_2 + \beta_2)}{\sin(2\gamma_1 - \beta_1 - 2\gamma_2 + \beta_2)}$$

$$p_2 = \frac{r_1\sin(\theta_1 - 2\gamma_1 + \beta_1) - r_2\sin(\theta_2 - 2\gamma_1 + \beta_1)}{\sin(2\gamma_1 - \beta_1 - 2\gamma_2 + \beta_2)}$$

and those of the cartesian coordinates of the defined mirror:

$$x_0 = \frac{\begin{array}{c}r_2\sin(\theta_2 - 2\gamma_2 + \beta_2)\cos(2\gamma_1 - \beta_1) - \\ r_1\sin(\theta_1 - 2\gamma_1 + \beta_1)\cos(2\gamma_2 - \beta_2)\end{array}}{\sin(2\gamma_1 - \beta_1 - 2\gamma_2 + \beta_2)}$$

$$y_0 = \frac{\begin{array}{c}r_2\sin(\theta_2 - 2\gamma_2 + \beta_2)\sin(2\gamma_1 - \beta_1) - \\ r_1\sin(\theta_1 - 2\gamma_1 + \beta_1)\sin(2\gamma_2 - \beta_2)\end{array}}{\sin(2\gamma_1 - \beta_1 - 2\gamma_2 + \beta_2)}$$

due to relationships such as $x_0 + p_1\cos(2\gamma_1 - \beta_1) = r_1\cos\theta_1$ and $y_0 + p_1\sin(2\gamma_1 - \beta_1) = r_1\sin\theta_1$.

This enables a relationship to be found between their partial derivatives with respect to $r_1, \theta_1, r_2, \theta_2$.

The first term in $x_0$ is equal to $-\cos(2\gamma_1 - \beta_1)$ times the second term in $p_1$. Said terms comprise the only occurences of $r_2, \theta_2$ in $x_0$ and $p_1$. Thus:

$$\left(\frac{\partial x_0}{\partial \theta_2}\right)_{Y_{j'} \neq \theta_2} = -\cos(2\gamma_1 - \beta_1)\left(\frac{\partial p_1}{\partial \theta_2}\right)_{Y_{j'} \neq \theta_2}$$

$$\left(\frac{\partial x_0}{\partial r_2}\right)_{Y_{j'} \neq r_2} = -\cos(2\gamma_1 - \beta_1)\left(\frac{\partial p_1}{\partial r_2}\right)_{Y_{j'} \neq r_2}$$

The first term in $y_0$ is equal to $-\sin(2\gamma_1 - \beta_1)$ times the second term in $p_1$. Said terms comprise the only occurences of $r_2, \theta_2$ in $y_0$ and $p_1$. Thus:

$$\left(\frac{\partial y_0}{\partial \theta_2}\right)_{Y_{j'} \neq \theta_2} = -\sin(2\gamma_1 - \beta_1)\left(\frac{\partial p_1}{\partial \theta_2}\right)_{Y_{j'} \neq \theta_2}$$

-continued $$\left(\frac{\partial y_0}{\partial r_2}\right)_{Y_{j'} \neq r_2} = -\sin(2\gamma_1 - \beta_1)\left(\frac{\partial p_1}{\partial r_2}\right)_{Y_{j'} \neq r_2}$$

The second term in $x_0$ is equal to $-\cos(2\gamma_2 - \beta_2)$ times the first term in $p_2$. Said terms comprise the only occurences of $r_1, \theta_1$ in $x_0$ and $p_2$. Thus:

$$\left(\frac{\partial x_0}{\partial \theta_1}\right)_{Y_{j'} \neq \theta_1} = -\cos(2\gamma_2 - \beta_2)\left(\frac{\partial p_2}{\partial \theta_1}\right)_{Y_{j'} \neq \theta_1}$$

$$\left(\frac{\partial x_0}{\partial r_1}\right)_{Y_{j'} \neq r_1} = -\cos(2\gamma_2 - \beta_2)\left(\frac{\partial p_2}{\partial r_1}\right)_{Y_{j'} \neq r_1}$$

The second term in $y_0$ is equal to $-\sin(2\gamma_2 - \beta_2)$ times the first term in $p_2$. Said terms comprise the only occurences of $r_1, \theta_1$ in $y_0$ and $p_2$. Thus:

$$\left(\frac{\partial y_0}{\partial \theta_1}\right)_{Y_{j'} \neq \theta_1} = -\sin(2\gamma_2 - \beta_2)\left(\frac{\partial p_2}{\partial \theta_1}\right)_{Y_{j'} \neq \theta_1}$$

$$\left(\frac{\partial y_0}{\partial r_1}\right)_{Y_{j'} \neq r_1} = -\sin(2\gamma_2 - \beta_2)\left(\frac{\partial p_2}{\partial r_1}\right)_{Y_{j'} \neq r_1}$$

Similar relationships for the partial derivatives with respect to $2\gamma_1-\beta_1$ and $2\gamma_2-\beta_2$ will be derived from the expressions for the partial derivatives of $x_0$ and $y_0$.

6.21.1.5 Partial derivatives of $x_0$ and $y_0$ $$\left(\frac{\partial x_0}{\partial \theta_1}\right)_{Y_j \neq \theta_1} = \frac{-r_1 \cos(\theta_1 - 2\gamma_1 + \beta_1)\cos(2\gamma_2 - \beta_2)}{\sin(2\gamma_1 - \beta_1 - 2\gamma_2 + \beta_2)} = -\cos(2\gamma_2 - \beta_2)\left(\frac{\partial p_2}{\partial \theta_1}\right)_{Y_j \neq \theta_1}$$

$$\left(\frac{\partial x_0}{\partial \theta_2}\right)_{Y_j \neq \theta_2} = \frac{r_2 \cos(\theta_2 - 2\gamma_2 + \beta_2)\cos(2\gamma_1 - \beta_1)}{\sin(2\gamma_1 - \beta_1 - 2\gamma_2 + \beta_2)} = -\cos(2\gamma_1 - \beta_1)\left(\frac{\partial p_1}{\partial \theta_2}\right)_{Y_j \neq \theta_2}$$

$$\left(\frac{\partial y_0}{\partial \theta_1}\right)_{Y_j \neq \theta_1} = \frac{-r_1 \cos(\theta_1 - 2\gamma_1 + \beta_1)\sin(2\gamma_2 - \beta_2)}{\sin(2\gamma_1 - \beta_1 - 2\gamma_2 + \beta_2)} = -\sin(2\gamma_2 - \beta_2)\left(\frac{\partial p_2}{\partial \theta_1}\right)_{Y_j \neq \theta_1}$$

$$\left(\frac{\partial y_0}{\partial \theta_2}\right)_{Y_j \neq \theta_2} = \frac{r_2 \cos(\theta_2 - 2\gamma_2 + \beta_2)\sin(2\gamma_1 - \beta_1)}{\sin(2\gamma_1 - \beta_1 - 2\gamma_2 + \beta_2)} = -\sin(2\gamma_1 - \beta_1)\left(\frac{\partial p_1}{\partial \theta_2}\right)_{Y_j \neq \theta_2}$$

$$\left(\frac{\partial x_0}{\partial r_1}\right)_{Y_j \neq r_1} = \frac{-\sin(\theta_1 - 2\gamma_1 + \beta_1)\cos(2\gamma_2 - \beta_2)}{\sin(2\gamma_1 - \beta_1 - 2\gamma_2 + \beta_2)} = -\cos(2\gamma_2 - \beta_2)\left(\frac{\partial p_2}{\partial r_1}\right)_{Y_j \neq r_1}$$

$$\left(\frac{\partial x_0}{\partial r_2}\right)_{Y_j \neq r_2} = \frac{\sin(\theta_2 - 2\gamma_2 + \beta_2)\cos(2\gamma_1 - \beta_1)}{\sin(2\gamma_1 - \beta_1 - 2\gamma_2 + \beta_2)} = -\cos(2\gamma_1 - \beta_1)\left(\frac{\partial p_1}{\partial r_2}\right)_{Y_j \neq r_2}$$

$$\left(\frac{\partial y_0}{\partial r_1}\right)_{Y_j \neq r_1} = \frac{-\sin(\theta_1 - 2\gamma_1 + \beta_1)\sin(2\gamma_2 - \beta_2)}{\sin(2\gamma_1 - \beta_1 - 2\gamma_2 + \beta_2)} = -\sin(2\gamma_2 - \beta_2)\left(\frac{\partial p_2}{\partial r_1}\right)_{Y_j \neq r_1}$$

$$\left(\frac{\partial y_0}{\partial r_2}\right)_{Y_j \neq r_2} = \frac{\sin(\theta_2 - 2\gamma_2 + \beta_2)\sin(2\gamma_1 - \beta_1)}{\sin(2\gamma_1 - \beta_1 - 2\gamma_2 + \beta_2)} = -\sin(2\gamma_1 - \beta_1)\left(\frac{\partial p_1}{\partial r_2}\right)_{Y_j \neq r_2}$$

Hence $x_0 = r_2\left(\frac{\partial x_0}{\partial r_2}\right)_{Y_j \neq r_2} + r_1\left(\frac{\partial x_0}{\partial r_1}\right)_{Y_j \neq r_1}$ and $y_0 = r_2\left(\frac{\partial y_0}{\partial r_2}\right)_{Y_j \neq r_2} + r_1\left(\frac{\partial y_0}{\partial r_1}\right)_{Y_j \neq r_1}$ $$\left(\frac{\partial x_0}{\partial(2\gamma_1 - \beta_1)}\right)_{Y_j \neq 2\gamma_1 - \beta_1} = \frac{\begin{array}{l}(-r_2\sin(\theta_2 - 2\gamma_2 + \beta_2)\sin(2\gamma_1 - \beta_1) + r_1\cos(\theta_1 - 2\gamma_1 + \beta_1)\cos(2\gamma_2 - \beta_2))\sin(2\gamma_1 - \beta_1 - 2\gamma_2 + \beta_2) - \\ (r_2\sin(\theta_2 - 2\gamma_2 + \beta_2)\cos(2\gamma_1 - \beta_1) - r_1\sin(\theta_1 - 2\gamma_1 + \beta_1)\cos(2\gamma_2 - \beta_2))\cos(2\gamma_1 - \beta_1 - 2\gamma_2 + \beta_2)\end{array}}{\sin^2(2\gamma_1 - \beta_1 - 2\gamma_2 + \beta_2)}$$

$$= -r_2\left(\frac{\partial y_0}{\partial r_2}\right)_{Y_j \neq r_2} - \left(\frac{\partial x_0}{\partial \theta_1}\right)_{Y_j \neq \theta_1} - x_0\cot(2\gamma_1 - \beta_1 - 2\gamma_2 + \beta_2)$$

$$= \frac{\begin{array}{l}-r_2\sin(\theta_2 - 2\gamma_2 + \beta_2)(\cos(2\gamma_1 - \beta_1 - 2\gamma_2 + \beta_2)\cos(2\gamma_1 - \beta_1) + \sin(2\gamma_1 - \beta_1 - 2\gamma_2 + \beta_2)\sin(2\gamma_1 - \beta_1)) \\ +r_1\cos(2\gamma_2 - \beta_2)(\cos(\theta_1 - 2\gamma_1 + \beta_1)\sin(2\gamma_1 - \beta_1 - 2\gamma_2 + \beta_2) + \sin(\theta_1 - 2\gamma_1 + \beta_1)\cos(2\gamma_1 - \beta_1 - 2\gamma_2 + \beta_2))\end{array}}{\sin^2(2\gamma_1 - \beta_1 - 2\gamma_2 + \beta_2)}$$

$$= \frac{\cos(2\gamma_2 - \beta_2)(r_1\sin(\theta_1 - 2\gamma_2 + \beta_2) - r_2\sin(\theta_2 - 2\gamma_2 + \beta_2))}{\sin^2(2\gamma_1 - \beta_1 - 2\gamma_2 + \beta_2)}$$

$$= \frac{\cos(2\gamma_2 - \beta_2)p_1}{\sin(2\gamma_1 - \beta_1 - 2\gamma_2 + \beta_2)} = -\cos(2\gamma_2 - \beta_2)\left(\frac{\partial p_2}{\partial(2\gamma_1 - \beta_1)}\right)_{Y_j \neq 2\gamma_1 - \beta_1}$$

$$\left(\frac{\partial x_0}{\partial(2\gamma_2 - \beta_2)}\right)_{Y_j \neq 2\gamma_2 - \beta_2} = \frac{\begin{array}{l}(-r_2\cos(\theta_2 - 2\gamma_2 + \beta_2)\cos(2\gamma_1 - \beta_1) + r_1\sin(\theta_1 - 2\gamma_1 + \beta_1)\sin(2\gamma_2 - \beta_2))\sin(2\gamma_1 - \beta_1 - 2\gamma_2 + \beta_2) + \\ (r_2\sin(\theta_2 - 2\gamma_2 + \beta_2)\cos(2\gamma_1 - \beta_1) - r_1\sin(\theta_1 - 2\gamma_1 + \beta_1)\cos(2\gamma_2 - \beta_2))\cos(2\gamma_1 - \beta_1 - 2\gamma_2 + \beta_2)\end{array}}{\sin^2(2\gamma_1 - \beta_1 - 2\gamma_2 + \beta_2)}$$

$$= -\left(\frac{\partial x_0}{\partial \theta_2}\right)_{Y_j \neq \theta_2} - r_1\left(\frac{\partial y_0}{\partial r_1}\right)_{Y_j \neq r_1} + x_0\cot(2\gamma_1 - \beta_1 - 2\gamma_2 + \beta_2)$$

$$= \frac{\begin{array}{l}-r_1\sin(\theta_1 - 2\gamma_1 + \beta_1)(\cos(2\gamma_1 - \beta_1 - 2\gamma_2 + \beta_2)\cos(2\gamma_2 - \beta_2) - \sin(2\gamma_1 - \beta_1 - 2\gamma_2 + \beta_2)\sin(2\gamma_2 - \beta_2)) \\ -r_2\cos(2\gamma_1 - \beta_1)(\cos(\theta_2 - 2\gamma_2 + \beta_2)\sin(2\gamma_1 - \beta_1 - 2\gamma_2 + \beta_2) - \sin(\theta_2 - 2\gamma_2 + \beta_2)\cos(2\gamma_1 - \beta_1 - 2\gamma_2 + \beta_2))\end{array}}{\sin^2(2\gamma_1 - \beta_1 - 2\gamma_2 + \beta_2)}$$

$$= -\frac{\cos(2\gamma_1 - \beta_1)(r_1\sin(\theta_1 - 2\gamma_1 + \beta_1) - r_2\sin(\theta_2 - 2\gamma_1 + \beta_1))}{\sin^2(2\gamma_1 - \beta_1 - 2\gamma_2 + \beta_2)}$$

$$= -\frac{\cos(2\gamma_1 - \beta_1)p_2}{\sin(2\gamma_1 - \beta_1 - 2\gamma_2 + \beta_2)} = -\cos(2\gamma_1 - \beta_1)\left(\frac{\partial p_1}{\partial(2\gamma_2 - \beta_2)}\right)_{Y_j \neq 2\gamma_2 - \beta_2}$$

$$\left(\frac{\partial y_0}{\partial(2\gamma_1 - \beta_1)}\right)_{Y_j \neq 2\gamma_1 - \beta_1} = \frac{\begin{array}{l}(r_2\sin(\theta_2 - 2\gamma_2 + \beta_2)\cos(2\gamma_1 - \beta_1) + r_1\cos(\theta_1 - 2\gamma_1 + \beta_1)\sin(2\gamma_2 - \beta_2))\sin(2\gamma_1 - \beta_1 - 2\gamma_2 + \beta_2) - \\ (r_2\sin(\theta_2 - 2\gamma_2 + \beta_2)\sin(2\gamma_1 - \beta_1) - r_1\sin(\theta_1 - 2\gamma_1 + \beta_1)\sin(2\gamma_2 - \beta_2))\cos(2\gamma_1 - \beta_1 - 2\gamma_2 + \beta_2)\end{array}}{\sin^2(2\gamma_1 - \beta_1 - 2\gamma_2 + \beta_2)}$$

$$= r_2\left(\frac{\partial x_0}{\partial r_2}\right)_{Y_j \neq r_2} - \left(\frac{\partial y_0}{\partial \theta_1}\right)_{Y_j \neq \theta_1} - y_0\cot(2\gamma_1 - \beta_1 - 2\gamma_2 + \beta_2)$$

$$= \frac{\begin{array}{l}-r_2\sin(\theta_2 - 2\gamma_2 + \beta_2)(\sin(2\gamma_1 - \beta_1)\cos(2\gamma_1 - \beta_1 - 2\gamma_2 + \beta_2) - \cos(2\gamma_1 - \beta_1)\sin(2\gamma_1 - \beta_1 - 2\gamma_2 + \beta_2)) \\ +r_1\sin(2\gamma_2 - \beta_2)(\cos(\theta_1 - 2\gamma_1 + \beta_1)\sin(2\gamma_1 - \beta_1 - 2\gamma_2 + \beta_2) + \sin(\theta_1 - 2\gamma_1 + \beta_1)\cos(2\gamma_1 - \beta_1 - 2\gamma_2 + \beta_2))\end{array}}{\sin^2(2\gamma_1 - \beta_1 - 2\gamma_2 + \beta_2)}$$

-continued
$$= \frac{\sin(2\gamma_2 - \beta_2)(r_1\sin(\theta_1 - 2\gamma_2 + \beta_2) - r_2\sin(\theta_2 - 2\gamma_2 + \beta_2))}{\sin^2(2\gamma_1 - \beta_1 - 2\gamma_2 + \beta_2)}$$

$$= \frac{\sin(2\gamma_2 - \beta_2)p_1}{\sin(2\gamma_1 - \beta_1 - 2\gamma_2 + \beta_2)} = -\sin(2\gamma_2 - \beta_2)\left(\frac{\partial p_2}{\partial(2\gamma_1 - \beta_1)}\right)_{Y_j = 2\gamma_1 - \beta_1}$$

$$\left(\frac{\partial y_0}{\partial(2\gamma_2 - \beta_2)}\right)_{Y_j = 2\gamma_2 - \beta_2} = \frac{\begin{array}{c}(-r_2\cos(\theta_2 - 2\gamma_2 + \beta_2)\sin(2\gamma_1 - \beta_1) + r_1\sin(\theta_1 - 2\gamma_1 + \beta_1)\cos(2\gamma_2 - \beta_2))\sin(2\gamma_1 - \beta_1 - 2\gamma_2 + \beta_2) + \\ (r_2\sin(\theta_2 - 2\gamma_2 + \beta_2)\sin(2\gamma_1 - \beta_1) - r_1\sin(\theta_1 - 2\gamma_1 + \beta_1)\sin(2\gamma_2 - \beta_2))\cos(2\gamma_1 - \beta_1 - 2\gamma_2 + \beta_2)\end{array}}{\sin^2(2\gamma_1 - \beta_1 - 2\gamma_2 + \beta_2)}$$

$$= -\left(\frac{\partial y_0}{\partial \theta_2}\right)_{Y_j = \theta_2} + r_1\left(\frac{\partial x_0}{\partial r_1}\right)_{Y_j = r_1} + y_0\cot(2\gamma_1 - \beta_1 - 2\gamma_2 + \beta_2)$$

$$= \frac{-r_1\sin(\theta_1 - 2\gamma_1 + \beta_1)(\sin(2\gamma_1 - \beta_1 - 2\gamma_2 + \beta_2)\cos(2\gamma_2 - \beta_2) + \cos(2\gamma_1 - \beta_1 - 2\gamma_2 + \beta_2)\sin(2\gamma_2 - \beta_2))}{\sin^2(2\gamma_1 - \beta_1 - 2\gamma_2 + \beta_2)}$$
$$\phantom{=} \frac{-r_2\sin(2\gamma_1 - \beta_1)(\cos(\theta_2 - 2\gamma_2 + \beta_2)\sin(2\gamma_1 - \beta_1 - 2\gamma_2 + \beta_2) - \sin(\theta_2 - 2\gamma_2 + \beta_2)\cos(2\gamma_1 - \beta_1 - 2\gamma_2 + \beta_2))}{\sin^2(2\gamma_1 - \beta_1 - 2\gamma_2 + \beta_2)}$$

$$= -\frac{\sin(2\gamma_1 - \beta_1)(r_1\sin(\theta_1 - 2\gamma_1 + \beta_1) - r_2\sin(\theta_2 - 2\gamma_1 + \beta_1))}{\sin^2(2\gamma_1 - \beta_1 - 2\gamma_2 + \beta_2)}$$

$$= -\frac{\sin(2\gamma_1 - \beta_1)p_2}{\sin(2\gamma_1 - \beta_1 - 2\gamma_2 + \beta_2)} = -\sin(2\gamma_1 - \beta_1)\left(\frac{\partial p_1}{\partial(2\gamma_2 - \beta_2)}\right)_{Y_j = 2\gamma_2 - \beta_2}$$

The relationships between the partial derivatives of the cartesian coordinates and the path lengths may be summarised using the modulus 2 notation where j is an integer from 1 to 6 as:

$$\left(\frac{\partial x_0}{\partial Y_j}\right)_{Y_j = j} = -\cos(2\gamma_{1+j|2} - \beta_{1+j|2})\left(\frac{\partial p_{1+j|2}}{\partial Y_j}\right)_{Y_j = j}$$

$$\left(\frac{\partial y_0}{\partial Y_j}\right)_{Y_j = j} = -\sin(2\gamma_{1+j|2} - \beta_{1+j|2})\left(\frac{\partial p_{1+j|2}}{\partial Y_j}\right)_{Y_j = j}$$

6.21.2 Condition for the continuity of a surface

The most general equation of a plane curve is an implicit function $F(X_1,X_2)=0$ where $X_1$ and $X_2$ may be any variables provided $X_1,X_2$ is some point in the plane. As the role of such a plane curve is to generate a surface by its revolution about the axis of symmetry, $F(X_1,X_2)$ may be limited to a single-valued function. If $F(X_1,X_2)=0$ is the equation of a defined surface then $F(X_1,X_2)$ must in any event be limited to a single-valued function, as any two defining rays can at most intersect once. In any case, a multi-valued function may always be redefined as a number of single-valued functions and a single surface may always be redefined as a number of surfaces. Although an output angle erroneously associated with a point on a defining surface rather than a defining ray may, in theory, be multi-valued if there is more than one defining ray at a particular point on a defining surface, each such defining ray is almost certainly required for the definition of a point on a different defined surface; in which case such a multi-valued output angle may better be regarded as a number of single-valued output angles each associated with a single defining ray.

Similarly, if an output angle is discontinuous at some point on a defining surface to the extent that the defined surface is discontinuous, the two parts of the defined surface may be regarded as different defined surfaces. If the gradient of a defining surface is discontinuous at some point on the defining surface, or if the defining surface itself is discontinuous, the defined surface will, in general, be discontinuous. It should, however, be mentioned that it is possible for both the output angle and the gradient to be discontinuous at some point on a defining surface, or for the defining surface itself to be discontinuous, without there being any discontinuity in the defining rays or the defined surface.

Clearly such a plane curve is not continuous if either the values of $X_1$ along said plane curve are not continuous; the values of $X_2$ along said plane curve are not continuous; or both the values of $X_1$ and the values of $X_2$ along said plane curve are not continuous. Moreover, there are no other ways in which such a plane curve may be discontinuous. So that a plane curve $F(X_1,X_2)=0$ is continuous at a point a,b if and only if both the values of $X_1$ and those of $X_2$ along said plane curve are continuous at a,b.

If the equation of a plane curve is, or may be put, in an explicit form, such as $X_1=F(X_2)$, then a discontinuity in the function $F(X_2)$ for some value of $X_2$ immediately implies a discontinuity in $X_1$. But since the function $F(X_1,X_2)$ has no meaning of its own, it is not immediately apparent whether its discontinuity with respect to either or both of $X_1$ and $X_2$ implies any discontinuity in either or both of $X_1$ and $X_2$ when $F(X_1,X_2)=0$. However, the equation $F(X_1,X_2)=0$ may be rewritten as:

$$X_1 = F(X_1,X_2) + X_1$$

and $$X_2 = F(X_1,X_2) + X_2$$

The condition that the values of $X_1$ along the plane curve $F(X_1,X_2)=0$ are continuous at a,b is that given any positive number $\epsilon_1$ a non-zero positive number $\eta_1$ (in general depending on $\epsilon_1$ and tending to zero with $\epsilon_1$) can be found such that:

$$|F(X_1,b)+X_1-F(a,b)-a|<\epsilon_1 \text{ if } |X_1-a|<\eta_1$$

If $F(X_1,b)-F(a,b)$ and $X_1-a$ have different signs then increasing both sides of the consequent inequality by $|X_1-a|$ gives:

$$|F(X_1,b)-F(a,b)|<\epsilon_1+|X_1-a|<\epsilon_1+\eta_1 \text{ if } |X_1-a|<\eta_1$$

If $F(X_1,b)-F(a,b)$ and $X_1-a$ have the same sign then reducing both sides of the consequent inequality by $|X_1-a|$ gives:

$$|F(X_1,b)-F(a,b)|<\epsilon_1-|X_1-a|<\epsilon_1+\eta_1 \text{ if } |X_1-a|<\eta_1$$

as before.

The condition that the values of $X_2$ along the plane curve $F(X_1,X_2)=0$ are continuous at a,b is that given any positive number $\epsilon_2$ a non-zero positive number $\eta_2$ (in general depending on $\epsilon_2$ and tending to zero with $\epsilon_2$) can be found such that:

$|F(a,X_2)+X_2-F(a,b)-b| < \epsilon_2$ if $|X_2-b| < \eta_2$

If $F(a,X_2)-F(a,b)$ and $X_2-b$ have different signs then increasing both sides of the consequent inequality by $|X_2-b|$ gives:

$|F(a,X_2)-F(a,b)| < \epsilon_2 + |X_2-b| < \epsilon_2 + \eta_2$ if $|X_2-b| < \eta_2$ If $F(a,X_2)-F(a,b)$ and $X_2-b$ have the same sign then reducing both sides of the consequent inequality by $|X_2-b|$ gives:

$|F(a,X_2)-F(a,b)| < \epsilon_2 - |X_2-b| < \epsilon_2 + \eta_2$ if $|X_2-b| < \eta_2$ as before.

Now the condition that the function $F(X_1,X_2)$ is continuous with respect to the pair of variables $X_1,X_2$ at a,b is that given any positive number $\epsilon$ a non-zero positive number $\eta$ (in general depending on $\epsilon$ and tending to zero with $\epsilon$) can be found such that:

$|F(a+\cos \tau \Delta t, b+\sin \tau \Delta t)-F(a,b)| < \epsilon$ if $\Delta t < \eta$ where $\Delta t$ is a small positive increment all of whose possible contributions to $X_1$ and $X_2$ are included when the argument $\tau$ has a range $0 \leq \tau < 2\pi$.

Putting $\tau=0$ or $\pi$ so that $X_2=b, X_1=a \pm \Delta t$ and $\Delta t$ being positive is $|X_1-a|$ while choosing $\epsilon=\epsilon_1+\eta_1$ gives:

$|F(X_1,b)-F(a,b)| < \epsilon_1+\eta_1$ if $|X_1-a| < \eta$ where $\eta_1$ may be found to be $\eta$.

Putting $\tau=\pi/2$ or $3\pi/2$ so that $X_1=a, X_2=b \pm \Delta t$ and $\Delta t$ being positive is $|X_2-b|$ while choosing $\epsilon=\epsilon_2+\eta_2$ gives:

$|F(a,X_2)-F(a,b)| < \epsilon_2+\eta_2$ if $|X_2-b| < \eta$ where $\eta_2$ may be found to be $\eta$.

Clearly if $F(X_1,X_2)$ is continuous with respect to the pair of variables $X_1,X_2$ at a,b then both the values of $X_1$ and those of $X_2$ along the plane curve $F(X_1,X_2)=0$ are continuous at a,b. If, however, $F(X_1,X_2)$ is not continuous with respect to the pair of variables $X_1,X_2$ at a,b so that there is a discontinuity in $F(X_1,X_2)$ at a,b it is still possible for both the values of $X_1$ and those of $X_2$ along said plane curve to be continuous at a,b if said plane curve $F(X_1,X_2)=0$ does not cross that discontinuity. Thus the continuity of $F(X_1,X_2)$ with respect to the pair of variables $X_1,X_2$ at a,b is merely a sufficient (but not a necessary) condition that both the values of $X_1$ and those of $X_2$ along said plane curve are continuous at a,b.

So that if $F(X_1,X_2)$ is continuous with respect to the pair of variables $X_1,X_2$ at a,b then both the values of $X_1$ and those of $X_2$ along the plane curve $F(X_1,X_2)=0$ are continuous at a,b and said plane curve is continuous at a,b.

If $$\left( \frac{\partial F(X_1,X_2)}{\partial X_1} \right)_{X_2} dX_1 + \left( \frac{\partial F(X_1,X_2)}{\partial X_2} \right)_{X_1} dX_2$$

is an exact differential $dF(X_1,X_2)$ at some point a,b then by the definition of the differential $dF(X_1,X_2)$ in which $\Delta t$ is a small positive increment all of whose possible contributions to $X_1$ and $X_2$ are included when the argument $\tau$ has a range $0 \leq \tau < 2\pi$:

$$dF(a,b) = \lim_{\Delta t \to 0} \frac{\Delta F(a,b)}{\Delta t} =$$

$$\lim_{\Delta t \to 0} \frac{F(a+\cos \tau \Delta t, b+\sin \tau \Delta t) - F(a,b)}{\Delta t}$$

and, moreover, said limit at a,b exists. It immediately follows that given any positive number $\epsilon$ a non-zero positive number $\eta$ (in general depending on $\epsilon$ and tending to zero with $\epsilon$) can be found such that:

$|F(a+\cos \tau \Delta t, b+\sin \tau \Delta t)-F(a,b)| < \epsilon$ if $\Delta t < \eta$ and that $F(X_1,X_2)$ is continuous with respect to the pair of variables $X_1,X_2$ at a,b. As this cannot be the case if said limit at a,b does not exist, this is a necessary and sufficient condition.

As is well known, the necessary and sufficient condition that $$\left( \frac{\partial F(X_1,X_2)}{\partial X_1} \right)_{X_2} dX_1 + \left( \frac{\partial F(X_1,X_2)}{\partial X_2} \right)_{X_1} dX_2$$

is an exact differential $dF(X_1,X_2)$ at a,b is:

$$\left( \frac{\partial}{\partial X_2} \left( \frac{\partial F(X_1,X_2)}{\partial X_1} \right)_{X_2} \right)_{X_1} = \left( \frac{\partial}{\partial X_1} \left( \frac{\partial F(X_1,X_2)}{\partial X_2} \right)_{X_1} \right)_{X_2}$$

at a,b. As the consequence of this condition is a necessary and sufficient condition that $F(X_1,X_2)$ is continuous with respect to the pair of variables $X_1,X_2$ at a,b which is a sufficient condition that both the values of $X_1$ and those of $X_2$ along the plane curve $F(X_1,X_2)=0$ are continuous at a,b, this condition is a sufficient condition that the plane curve $F(X_1,X_2)=0$ is continuous at a,b.

It can be shown by a somewhat less rigorous argument that this condition for an exact differential $dF(X_1,X_2)$ is equally a necessary and sufficient condition for the continuity of $F(X_1,X_2)$ with respect to the pair of variables $X_1,X_2$ at a,b.

The existence of these two second derivatives at a,b implies that $F(X_1,X_2)$, $$\left( \frac{\partial F(X_1,X_2)}{\partial X_1} \right)_{X_2} \text{ and } \left( \frac{\partial F(X_1,X_2)}{\partial X_2} \right)_{X_1}$$

exist and are finite at a,b.

Consider the path between a,b and $a+\Delta X_1, b+\Delta X_2$ comprising a step of $\Delta X_1$, followed by a step of $\Delta X_2$. Excluding terms of order higher than $\Delta X_1$ or $\Delta X_2$ the cumulative change in $F(X_1,X_2)$ along said path is:

$$\left( \frac{\partial F(a,b)}{\partial X_1} \right)_{X_2} \Delta X_1 + \left( \frac{\partial F(a+\Delta X_1,b)}{\partial X_2} \right)_{X_1} \Delta X_2 =$$

$$\left( \frac{\partial F(a,b)}{\partial X_1} \right)_{X_2} \Delta X_1 + \left( \frac{\partial F(a,b)}{\partial X_2} \right)_{X_1} \Delta X_2 +$$

$$\frac{\left( \frac{\partial F(a+\Delta X_1,b)}{\partial X_2} \right)_{X_1} - \left( \frac{\partial F(a,b)}{\partial X_2} \right)_{X_1}}{\Delta X_1} \Delta X_1 \Delta X_2$$

provided $F(X_1,X_2)$ exists and is finite along said path and also $$\left(\frac{\partial F(a + \Delta X_1, b)}{\partial X_2}\right)_{X_1}$$

exists and is finite along the step of $\Delta X_2$. As $\Delta X_1 \to 0$ so $$\left(\frac{\partial F(a + \Delta X_1, b)}{\partial X_2}\right)_{X_1} \to \left(\frac{\partial F(a, b)}{\partial X_2}\right)_{X_1}$$

which exists and is finite as aforesaid and this becomes:

$$\left(\frac{\partial F(a, b)}{\partial X_1}\right)_{X_2} \Delta X_1 + \left(\frac{\partial F(a, b)}{\partial X_2}\right)_{X_1} \Delta X_2 +$$

$$\left(\frac{\partial}{\partial X_1}\left(\frac{\partial F(a, b)}{\partial X_2}\right)_{X_1}\right)_{X_2} \Delta X_1 \Delta X_2$$

Consider also the alternative path between a,b and a+$\Delta X_1$, b+$\Delta X_2$ comprising a step of $\Delta X_2$ followed by a step of $\Delta X_1$. Excluding terms of order higher than $\Delta X_1$ or $\Delta X_2$ the cumulative change in $F(X_1, X_2)$ along said alternative path is:

$$\left(\frac{\partial F(a, b)}{\partial X_2}\right)_{X_1} \Delta X_2 + \left(\frac{\partial F(a, b + \Delta X_2)}{\partial X_1}\right)_{X_2} \Delta X_1 =$$

$$\left(\frac{\partial F(a, b)}{\partial X_2}\right)_{X_1} \Delta X_2 + \left(\frac{\partial F(a, b)}{\partial X_1}\right)_{X_2} \Delta X_1 +$$

$$\frac{\left(\frac{\partial F(a, b + \Delta X_2)}{\partial X_1}\right)_{X_2} - \left(\frac{\partial F(a, b)}{\partial X_1}\right)_{X_2}}{\Delta X_2} \Delta X_2 \Delta X_1$$

provided $F(X_1, X_2)$ exists and is finite along said alternative path and also $$\left(\frac{\partial F(a, b + \Delta X_2)}{\partial X_1}\right)_{X_2}$$

exists and is finite along the step of $\Delta X_1$.

As $\Delta X_2 \to 0$ so $$\left(\frac{\partial F(a, b + \Delta X_2)}{\partial X_1}\right)_{X_2} \to \left(\frac{\partial F(a, b)}{\partial X_1}\right)_{X_2}$$

which exists and is finite as aforesaid and this becomes:

$$\left(\frac{\partial F(a, b)}{\partial X_2}\right)_{X_1} \Delta X_2 + \left(\frac{\partial F(a, b)}{\partial X_1}\right)_{X_2} \Delta X_1 +$$

$$\left(\frac{\partial}{\partial X_2}\left(\frac{\partial F(a, b)}{\partial X_1}\right)_{X_2}\right)_{X_1} \Delta X_2 \Delta X_1$$

As both $\Delta X_1$ and $\Delta X_2$ tend to zero $F(X_1, X_2)$ F(a,b) which exists and is finite as aforesaid. In which case, all the provisos for the cumulative changes along said path and said alternative path to exist and be finite have been satisfied. Thus if the two second derivatives exist then the cumulative change in $F(X_1, X_2)$ along the path between a,b and a+$\Delta X_1$, b+$\Delta X_2$ exists and is finite and that along the alternative path between those points also exists and is finite for all the points a+$\Delta X_1$, b+$\Delta X_2$ for which $\Delta X_1 \to 0$ and It will be seen that said cumulative changes are equal if:

$$\left(\frac{\partial}{\partial X_1}\left(\frac{\partial F(a, b)}{\partial X_2}\right)_{X_1}\right)_{X_2} = \left(\frac{\partial}{\partial X_2}\left(\frac{\partial F(a, b)}{\partial X_1}\right)_{X_2}\right)_{X_1}$$

As this condition does not include $\Delta X_1$ or $\Delta X_2$ it may be satisfied irrespective of the values of $\Delta X_1$ and $\Delta X_2$.

Thus if said condition is satisfied then both $$\left(\frac{\partial}{\partial X_1}\left(\frac{\partial F(a, b)}{\partial X_2}\right)_{X_1}\right)_{X_2} \text{ and } \left(\frac{\partial}{\partial X_2}\left(\frac{\partial F(a, b)}{\partial X_1}\right)_{X_2}\right)_{X_1}$$

must exist so that the cumulative change in $F(X_1, X_2)$ along the path between a,b and a+$\Delta X_1$, b+$\Delta X_2$ exists and is finite and that along the alternative path between those points also exists and is finite for all the points a+$\Delta X_1$, b+$\Delta X_2$ for which $\Delta X_1 \to 0$ and $\Delta X_2 \to 0$. Moreover, said paths are equal for all those points. Since said points comprise the entire region around and at a,b there cannot be a discontinuity in $F(X_1, X_2)$ at a,b in any direction and $F(X_1, X_2)$ must be continuous with respect to the pair of variables $X_1, X_2$ at a,b.

If said condition is not satisfied then either one or both of said second derivatives do not exist or said cumulative changes must differ. If one or both of said second derivatives does not exist then either $F(X_1, X_2)$ does not exist or is infinite at a,b; or $$\left(\frac{\partial F(X_1, X_2)}{\partial X_1}\right)_{X_2} \text{ and/or } \left(\frac{\partial F(X_1, X_2)}{\partial X_2}\right)_{X_1}$$

do not exist, or are not finite at a,b because of a discontinuity. If said cumulative changes differ then the second step in either said path or said alternative path to some point a+$\Delta X_1$, b+$\Delta X_2$ must cross a discontinuity. Said condition is therefore both necessary and sufficient.

6.21.3 Cartesian form of the differential equation as an exact differential

As before, if the gradient of the defined mirror is denoted by $\gamma_0$ then its differential equation can be written:

$$\sin \gamma_0 dx_0 - \cos \gamma_0 dy_0 = 0$$

Since $\gamma_0$ may be specified in more than one way, this may better be regarded as a family of differential equations for $x_0, y_0$ having one member for each specification of $\gamma_0$.

If $dx_0$ and $dy_0$ are both zero then $x_0$ and $y_0$ are both constants and the defined mirror is a point, which is irrelevant to the relationship under examination and will therefore be excluded hereinafter.

If $\sin \gamma_0 = 0$ then $\gamma_0 = 2n \pi + \pi^0$ and $\cos \gamma_0 = \pm 1$ so that the differential equation becomes $dy_0 = 0$ which is clearly an exact differential, and $y_0$ is a constant. (Conversely if $dy_0 = 0$ then $y_0$ is a constant and the differential equation becomes $\sin \gamma_0 dx_0 = 0$. As $dx_0$ cannot be zero when $dy_0$ is zero, $\sin \gamma_0 = 0$.) This case is a straight line parallel to the x-axis. It occurs for defining mirror-ray combinations which obey the relations:

$$x_0 = \frac{r_2 \sin(\theta_2 - 2\gamma_2 + \beta_2)\cos(2\gamma_1 - \beta_1) - r_1 \sin(\theta_1 - 2\gamma_1 + \beta_1)\cos(2\gamma_2 - \beta_2)}{\sin(2\gamma_1 - \beta_1 - 2\gamma_2 + \beta_2)}$$

and

-continued
$$y_0 = \frac{r_2\sin(\theta_2 - 2\gamma_2 + \beta_2)\sin(2\gamma_1 - \beta_1) - r_1\sin(\theta_1 - 2\gamma_1 + \beta_1)\sin(2\gamma_2 - \beta_2)}{\sin(2\gamma_1 - \beta_1 - 2\gamma_2 + \beta_2)}$$

where $y_0$ is a constant.

Such defining mirrors are also subject to the relationship $$\frac{dr_1}{r_1} = \frac{\cos(\gamma_1 - \theta_1)}{\sin(\gamma_1 - \theta_1)} d\theta_1$$

or its cartesian equivalent for the or the first defining mirror and a similar relationship for any second defining mirror.

If $\cos \gamma_0 0$ then $\gamma_0 = 2n\ \pi \pm \pi/2$ and $\sin \gamma_0 = \pm 1$ so that the differential equation becomes $dx_0 0$ which is clearly an exact differential, and $x_0$ is a constant. (Conversely if $dx_0=0$ then $x_0$ is a constant and the differential equation becomes $\cos \gamma_0 dy_0=0$. As $dy_0$ cannot be zero when $dx_0$ is zero, $\cos \gamma_0=0$.) This case is a straight line parallel to the y-axis. It occurs for defining mirrors which obey relations in the same form as above but with $x_0$ constant and $y_0$ variable.

Provided neither $\sin \gamma_0$ nor $\cos \gamma_0$ is zero the condition that $\sin \gamma_0 dx_0 - \cos \gamma_0 dy_0 = 0$ is an exact differential is:

$$\left(\frac{\partial(\sin\gamma_0)}{\partial y_0}\right)_{x_0} = \left(\frac{\partial(-\cos\gamma_0)}{\partial x_0}\right)_{y_0}$$

$$\cos\gamma_0 \left(\frac{\partial \gamma_0}{\partial y_0}\right)_{x_0} = \sin\gamma_0 \left(\frac{\partial \gamma_0}{\partial x_0}\right)_{y_0}$$

It should be noted that the latter form of the condition requires the paradigm $\gamma_0 = \gamma_0(x_0, y_0)$.

Now neither $\sin \gamma_0$ nor $\cos \gamma_0$ may be zero. So that if and only if $$\left(\frac{\partial \gamma_0}{\partial y_0}\right)_{x_0}$$

is zero then $$\left(\frac{\partial \gamma_0}{\partial x_0}\right)_{y_0}$$

is zero, and vice versa. In either case, $\gamma_0 = b_0$ where $b_0$ is a constant other than $n\ \pi/2$ and the differential equation becomes:

$$\sin b_0 dx_0 - \cos b_0 dy_0 = 0$$

which is an exact differential, and $x_0 \sin b_0 - y_0 \cos b_0 = k_0$ where $k_0$ is a constant.

It will be seen from the above differential equation that if $\gamma_0 = b_0$ where $b_0$ is a constant then the cartesian form of the differential equation is an exact differential whatever the value of $b_0$. And that the specification $\gamma_0 = b_0$ includes the cases where $\gamma_0 = 2n\ \pi + _\pi{}^0$ and $\gamma_0 = 2n\ \pi \pm \pi/2$.

If $0 < b_0 < \pi$ and $k_0$ is positive, this solution is the equation of the straight line which crosses the positive part of the x-axis at an angle $b_0$ to said x-axis with a perpendicular distance from the origin to said straight line of $k_0$. If $0 < b_0 < \pi$ and $k_0$ is negative, this solution is the equation of the straight line which crosses the negative part of the x-axis at an angle $b_0$ to said x-axis with a perpendicular distance from the origin to said straight line of $-k_0$. Clearly these cases include lines parallel to the y-axis for which $b_0 = \pi/2$ and straight lines through the origin for which $k_0 = 0$. If $b_0 = _\pi{}^0$ then $y_0 = \mp k_0$ which are the equations of straight lines parallel to the x-axis. All these cases are shown in FIG. 93. Similarly for values of $b_0$ outside the range $0 \leq b_0 \leq \pi$.

The specification $\gamma_0 = b_0$ is equally applicable to the specification of the gradient of a portion of a defining surface as may be signified by replacing $\gamma_0$ by $\gamma$ and $b_0$ with b.

When $\gamma_0$ is not a constant, $\gamma_0 = \gamma_0(x_0, y_0)$ and not a function of $x_0$ only or $y_0$ only as neither of $$\left(\frac{\partial \gamma_0}{\partial x_0}\right)_{y_0} \text{or} \left(\frac{\partial \gamma_0}{\partial y_0}\right)_{x_0}$$

are zero.

As $\gamma_0$ determines the directions of the reflections from the defined mirror, it is as important in those cases where $\gamma_0$ is not a constant to have a useable specification for $\gamma_0$ as a useable specification for the defined mirror.

If $\gamma_0$ is specified in terms of a differentiable function (other than a constant) then expressions for $$\left(\frac{\partial \gamma_0}{\partial x_0}\right)_{y_0} \text{and} \left(\frac{\partial \gamma_0}{\partial y_0}\right)_{x_0}$$

may be found.

If either of $\sin \gamma_0$ or $\cos \gamma_0$ are specified then an expression for $\gamma_0$ may generally be found. If the defined mirror is specified then an expression for $\gamma_0$ may also generally be found. If, as a result of any of these specifications, $\gamma_0$ is known in terms of a differentiable function (other than a constant) then expressions for $$\left(\frac{\partial \gamma_0}{\partial x_0}\right)_{y_0} \text{and} \left(\frac{\partial \gamma_0}{\partial y_0}\right)_{x_0}$$

may be found.

If both $$\left(\frac{\partial \gamma_0}{\partial x_0}\right)_{y_0} \text{and} \left(\frac{\partial \gamma_0}{\partial y_0}\right)_{x_0}$$

are chosen and $$\left(\frac{\partial \gamma_0}{\partial x_0}\right)_{y_0} dx_0 + \left(\frac{\partial \gamma_0}{\partial y_0}\right)_{x_0} dy_0$$

is an exact differential then $d\gamma_0$ will exist; in which case an expression for $\gamma_0$ may, or may not, be found except for a constant of integration.

But the expressions for $\gamma_0$, $$\left(\frac{\partial \gamma_0}{\partial x_0}\right)_{y_0} \text{and} \left(\frac{\partial \gamma_0}{\partial y_0}\right)_{x_0}$$

may not satisfy said condition for an exact differential for the differential equation (even if the defined mirror has been specified and is continuous: because the differential equation may require an integrating factor to make it exact).

If, however, either one of $$\left(\frac{\partial \gamma_0}{\partial x_0}\right)_{y_0} \text{or} \left(\frac{\partial \gamma_0}{\partial y_0}\right)_{x_0}$$

is specified then the other one of said partial derivatives is constrained when $\gamma_0$ is continuous by the condition for an exact differential for the differential equation, for, as it exists, $$d\gamma_0 = \left(\frac{\partial \gamma_0}{\partial x_0}\right)_{y_0} dx_0 + \left(\frac{\partial \gamma_0}{\partial y_0}\right)_{x_0} dy_0$$

so that $\gamma_0$ is completely determined by said partial derivatives except for a constant of integration. And said condition for an exact differential for the differential equation is automatically satisfied. Clearly, therefore, this is the preferable option.

Satisfying the condition for an exact differential for the differential equation does not ensure that it is possible to form the function whose differential is the differential equation. It is necessary to form an expression for $d\gamma_0$; and either rewrite the differential equation to include $d\gamma_0$ and then substitute said expression for that $d\gamma_0$ in the rewritten differential equation in the hope of integrating the result by quadrature or numerically; or to find $\gamma_0 = \gamma_0(x_0, y_0)$ by quadrature integration and substitute it for $\gamma_0$ in the differential equation in order to integrate said differential equation; or to find the implicit function $\gamma_0(x_0, y_0, \gamma_0) = 0$ by quadrature integration and use it to eliminate $\gamma_0$ from the differential equation. In both the latter cases, the differential equation may still have been rewritten to include $d\gamma_0$.

The condition that $$\left(\frac{\partial \gamma_0}{\partial x_0}\right)_{y_0} dx_0 + \left(\frac{\partial \gamma_0}{\partial y_0}\right)_{x_0} dy_0$$

is an exact differential, $d\gamma_0$ (and that $\gamma_0$ is continuous with respect to the pair of variables $x_0$ and $y_0$) is:

$$\left(\frac{\partial}{\partial y_0}\left(\frac{\partial \gamma_0}{\partial x_0}\right)_{y_0}\right)_{x_0} = \left(\frac{\partial}{\partial x_0}\left(\frac{\partial \gamma_0}{\partial y_0}\right)_{x_0}\right)_{y_0}$$

Suppose that $$\left(\frac{\partial \gamma_0}{\partial x_0}\right)_{y_0}$$

is chosen (so that $$\left(\frac{\partial \gamma_0}{\partial y_0}\right)_{x_0} = \tan\gamma_0 \left(\frac{\partial \gamma_0}{\partial x_0}\right)_{y_0} ). \text{ If } \left(\frac{\partial \gamma_0}{\partial x_0}\right)_{y_0}$$

is a (non-zero) constant or a function of $x_0$ only then $$\left(\frac{\partial}{\partial y_0}\left(\frac{\partial \gamma_0}{\partial x_0}\right)_{y_0}\right)_{x_0} = 0$$

but $$\left(\frac{\partial}{\partial x_0}\left(\frac{\partial \gamma_0}{\partial y_0}\right)_{x_0}\right)_{y_0}$$

is not. If $$\left(\frac{\partial \gamma_0}{\partial x_0}\right)_{y_0}$$

is a function of $y_0$ only then $$\left(\frac{\partial}{\partial y_0}\left(\frac{\partial \gamma_0}{\partial x_0}\right)_{y_0}\right)_{x_0}$$

is also a function of $y_0$ only or a constant, while $$\left(\frac{\partial}{\partial x_0}\left(\frac{\partial \gamma_0}{\partial y_0}\right)_{x_0}\right)_{y_0}$$

is a function of both $x_0$ and $y_0$. Thus the only possibility for fulfilling said condition is for $$\left(\frac{\partial \gamma_0}{\partial x_0}\right)_{y_0}$$

to be a function of both $x_0$ and $y_0$.
Similarly $$\left(\frac{\partial \gamma_0}{\partial y_0}\right)_{x_0}$$

must be a function of both $x_0$ and $y_0$ if the differential expression $$\left(\frac{\partial \gamma_0}{\partial x_0}\right)_{y_0} dx_0 + \left(\frac{\partial \gamma_0}{\partial y_0}\right)_{x_0} dy_0$$

is to be an exact differential, $d\gamma_0$.
If $$\left(\frac{\partial \gamma_0}{\partial x_0}\right)_{y_0}$$

is chosen to be $F(x_0, y_0)$ a function of both $x_0$ and $y_0$ then:

$$\left(\frac{\partial \gamma_0}{\partial y_0}\right)_{x_0} = \tan\gamma_0 F(x_0, y_0)$$

$$\left(\frac{\partial}{\partial x_0}\left(\frac{\partial \gamma_0}{\partial y_0}\right)_{x_0}\right)_{y_0} =$$

$$\sec^2\gamma_0 \left(\frac{\partial \gamma_0}{\partial x_0}\right)_{y_0} F(x_0, y_0) + \tan\gamma_0 \left(\frac{\partial F(x_0, y_0)}{\partial x_0}\right)_{y_0}$$

and the condition for an exact differential $d\gamma_0$ becomes:

$$\sec^2\gamma_0 F^2(x_0, y_0) + \tan\gamma_0 \left(\frac{\partial F(x_0, y_0)}{\partial x_0}\right)_{y_0} = \left(\frac{\partial F(x_0, y_0)}{\partial y_0}\right)_{x_0}$$

As $F(x_0, y_0)$ is any function of $x_0$ and $y_0$ we could have chosen $$\left(\frac{\partial \gamma_0}{\partial y_0}\right)_{x_0}$$

to be $\tan\gamma_0 F(x_0, y_0)$ without loss of generality. So that this also covers the case where $$\left(\frac{\partial \gamma_0}{\partial y_0}\right)_{x_0}$$

is chosen.
If $F(x_0, y_0)$ contains $\gamma_0$ explicitly we may regard $F(x_0, y_0)$ as $F(x_0, y_0, \gamma_0(x_0, y_0))$ to obtain:

$$\left(\frac{\partial F(x_0, y_0)}{\partial x_0}\right)_{y_0} = \left(\frac{\partial F(x_0, y_0, \gamma_0)}{\partial x_0}\right)_{y_0,\gamma_0} \left(\frac{\partial x_0}{\partial x_0}\right)_{y_0} +$$

$$\left(\frac{\partial F(x_0, y_0, \gamma_0)}{\partial y_0}\right)_{x_0,\gamma_0} \left(\frac{\partial y_0}{\partial x_0}\right)_{y_0} +$$

$$\left(\frac{\partial F(x_0, y_0, \gamma_0)}{\partial \gamma_0}\right)_{x_0,y_0} \left(\frac{\partial \gamma_0}{\partial x_0}\right)_{y_0}$$

$$= \left(\frac{\partial F(x_0, y_0, \gamma_0)}{\partial x_0}\right)_{y_0,\gamma_0} +$$

$$\left(\frac{\partial F(x_0, y_0, \gamma_0)}{\partial \gamma_0}\right)_{x_0,y_0} F(x_0, y_0)$$

$$\left(\frac{\partial F(x_0, y_0)}{\partial y_0}\right)_{x_0} = \left(\frac{\partial F(x_0, y_0, \gamma_0)}{\partial x_0}\right)_{y_0,\gamma_0} \left(\frac{\partial x_0}{\partial y_0}\right)_{x_0} +$$

$$\left(\frac{\partial F(x_0, y_0, \gamma_0)}{\partial y_0}\right)_{x_0,\gamma_0} \left(\frac{\partial y_0}{\partial y_0}\right)_{x_0} +$$

$$\left(\frac{\partial F(x_0, y_0, \gamma_0)}{\partial \gamma_0}\right)_{x_0,y_0} \left(\frac{\partial \gamma_0}{\partial y_0}\right)_{x_0}$$

$$= \left(\frac{\partial F(x_0, y_0, \gamma_0)}{\partial y_0}\right)_{x_0,\gamma_0} +$$

$$\left(\frac{\partial F(x_0, y_0, \gamma_0)}{\partial \gamma_0}\right)_{x_0,y_0} \tan\gamma_0 F(x_0, y_0)$$

Thus the partial derivatives of $F(x_0,y_0,\gamma_0)$ with respect to $\gamma_0$ cancel from said condition. While if $F(x_0,y_0)$ does not contain $\gamma_0$ explicitly said partial derivatives do not exist anyway. Thus said condition can be rewritten as:

$$\sec^2\gamma_0 F^2(x_0, y_0, \gamma_0) +$$

$$\tan\gamma_0 \left(\frac{\partial F(x_0, y_0, \gamma_0)}{\partial x_0}\right)_{y_0,\gamma_0} = \left(\frac{\partial F(x_0, y_0, \gamma_0)}{\partial y_0}\right)_{x_0,\gamma_0}$$

or a similar condition for $F(x_0,y_0)$.

As $$\left(\frac{\partial \gamma_0}{\partial x_0}\right)_{y_0}$$

must be a function of both $x_0$ and $y_0$ so must $F(x_0,y_0,\gamma_0)$. Either of $$\left(\frac{\partial F(x_0, y_0, \gamma_0)}{\partial x_0}\right)_{y_0,\gamma_0} \text{ or } \left(\frac{\partial F(x_0, y_0, \gamma_0)}{\partial y_0}\right)_{x_0,\gamma_0}$$

may be zero, but not both, as said condition would then require $F(x_0,y_0,\gamma_0)$ and thus $$\left(\frac{\partial \gamma_0}{\partial x_0}\right)_{y_0}$$

to be zero, as $\sec \gamma_0$ cannot be zero. Thus $F(x_0,y_0,\gamma_0)$ cannot be a function of $\gamma_0(x_0,y_0)$ only.

We may, without loss of generality, rewrite $$F(x_0, y_0, \gamma_0) = \frac{G(x_0, y_0, \gamma_0)}{x_0 \sin\gamma_0 - y_0 \cos\gamma_0}$$

where $G(x_0,y_0,\gamma_0)$ is not a multiple of $x_0 \sin \gamma_0 - y_0 \cos \gamma_0$ because $F(x_0,y_0,\gamma_0)$ is not a constant. Hence:

$$\left(\frac{\partial F(x_0, y_0, \gamma_0)}{\partial x_0}\right)_{y_0,\gamma_0} =$$

$$\frac{\left(\frac{\partial G(x_0, y_0, \gamma_0)}{\partial x_0}\right)_{y_0,\gamma_0}(x_0\sin\gamma_0 - y_0\cos\gamma_0) - G(x_0, y_0, \gamma_0)\sin\gamma_0}{(x_0\sin\gamma_0 - y_0\cos\gamma_0)^2}$$

$$\left(\frac{\partial F(x_0, y_0, \gamma_0)}{\partial y_0}\right)_{x_0,\gamma_0} =$$

$$\frac{\left(\frac{\partial G(x_0, y_0, \gamma_0)}{\partial y_0}\right)_{x_0,\gamma_0}(x_0\sin\gamma_0 - y_0\cos\gamma_0) + G(x_0, y_0, \gamma_0)\cos\gamma_0}{(x_0\sin\gamma_0 - y_0\cos\gamma_0)^2}$$

Multiplying by the common denominator leaves the condition as:

$$\sec^2\gamma_0 G^2(x_0, y_0, \gamma_0) +$$

$$\tan\gamma_0 \left(\left(\frac{\partial G(x_0, y_0, \gamma_0)}{\partial x_0}\right)_{y_0,\gamma_0}(x_0\sin\gamma_0 - y_0\cos\gamma_0) - G(x_0, y_0, \gamma_0)\sin\gamma_0\right)$$

$$= \left(\frac{\partial G(x_0, y_0, \gamma_0)}{\partial y_0}\right)_{x_0,\gamma_0}(x_0\sin\gamma_0 - y_0\cos\gamma_0) + G(x_0, y_0, \gamma_0)\cos\gamma_0$$

If both $$\left(\frac{\partial G(x_0, y_0, \gamma_0)}{\partial x_0}\right)_{y_0,\gamma_0} \text{ and } \left(\frac{\partial G(x_0, y_0, \gamma_0)}{\partial y_0}\right)_{x_0,\gamma_0}$$

are zero (so that $G(x_0,y_0,\gamma_0)$ is either a function of $\gamma_0$ only or a constant) then:

$$\sec \gamma_0 G^2(x_0,y_0,\gamma_0) - G(x_0,y_0,\gamma_0) = 0$$

$$G(x_0,y_0,\gamma_0) = \cos \gamma_0$$

so that $G(x_0,y_0,\gamma_0)$ cannot be a constant

If $G(x_0,y_0,\gamma_0)$ does not include $x_0$ explicitly so that $$\left(\frac{\partial G(x_0, y_0, \gamma_0)}{\partial x_0}\right)_{y_0,\gamma_0} = 0$$

even though $G(x_0,y_0,\gamma_0)$ is dependent on $x_0$ because it includes $\gamma_0(x_0,y_0)$ explicitly the condition becomes:

$$\sec\gamma_0 G^2(y_0, \gamma_0) -$$

$$\cos\gamma_0 \left(\frac{\partial G(y_0, \gamma_0)}{\partial y_0}\right)_{\gamma_0}(x_0\sin\gamma_0 - y_0\cos\gamma_0) - G(y_0, \gamma_0) = 0$$

This contains an isolated occurence of $x_0$ and cannot be satisfied by specifying $G(y_0,\gamma_0)$ If $G(x_0,y_0,\gamma_0)$ does not include $\gamma_0$ explicitly so that $$\left(\frac{\partial G(x_0, y_0, \gamma_0)}{\partial y_0}\right)_{x_0,\gamma_0} = 0$$

even though $G(x_0,y_0,\gamma_0)$ is dependent on $y_0$ because it includes $\gamma_0(x_0,y_0)$ explicitly the condition becomes:

$$\sec\gamma_0 G^2(x_0, \gamma_0) +$$

$$\sin\gamma_0 \left(\frac{\partial G(x_0, \gamma_0)}{\partial x_0}\right)_{\gamma_0} (x_0\sin\gamma_0 - y_0\cos\gamma_0) - G(x_0, \gamma_0) = 0$$

This contains an isolated occurence of $y_0$ and cannot be satisfied by specifying $G(x_0,y_0)$.

$$\text{If } \left(\frac{\partial \gamma_0}{\partial x_0}\right)_{y_0} = \frac{\cos\gamma_0}{x_0\sin\gamma_0 - y_0\cos\gamma_0}$$

$$\text{then } \left(\frac{\partial \gamma_0}{\partial y_0}\right)_{x_0} = \tan\gamma_0 \left(\frac{\partial \gamma_0}{\partial x_0}\right)_{y_0} = \frac{\sin\gamma_0}{x_0\sin\gamma_0 - y_0\cos\gamma_0}$$

$$\text{and } d\gamma_0 = \frac{\cos\gamma_0 dx_0 + \sin\gamma_0 dy_0}{x_0\sin\gamma_0 - y_0\cos\gamma_0} -$$

$$x_0\sin\gamma_0 d\gamma_0 + \cos\gamma_0 dx_0 + y_0\cos\gamma_0 d\gamma_0 + \sin\gamma_0 dy_0 = 0$$

$$x_0\cos\gamma_0 + y_0\sin\gamma_0 = a_0 \text{ where } a_0 \text{ is a constant.}$$

This specification of the gradient is equally applicable to the specification of the gradient of a defining surface as may be signified by replacing $\gamma_0$ with $\gamma$, $x_0$ with $x$, $y_0$ with $y$ and $a_0$ with $a$.

Putting $x_0=r_0\cos\theta_0$ and $y_0=r_0\sin\theta_0$ yields one of the expressions for $\gamma_0$ given later for the polar form of the differential equation.

While the differential equation may be written:

$$\sin\gamma_0 dx_0 - \cos\gamma_0 dy_0 + x_0\cos\gamma_0 d\gamma_0 + y_0\sin\gamma_0 d\gamma_0 - x_0\cos\gamma_0 d\gamma_0 - y_0\sin\gamma_0 d\gamma_0 = 0$$

$$d(x_0\sin\gamma_0 - y_0\cos\gamma_0) - x_0\cos\gamma_0 d\gamma_0 - y_0\sin\gamma_0 d\gamma_0 = 0$$

$$d(x_0\sin\gamma_0 - y_0\cos\gamma_0) - a_0 d\gamma_0 = 0$$

$x_0 \sin\gamma_0 - y_0 \cos\gamma_0 - a_0\gamma_0 - k_0$ where $k_0$ is a constant.

Putting $x_0=r_0\cos\theta_0$ and $y_0=r_0\sin\theta_0$ yields the solution given later for the polar form of the differential equation.

Now $\cos\gamma_0 dy_0 = \sin\gamma_0 dx_0$ by virtue of the. differential equation while the condition for the exactness of said differential equation is $$\cos\gamma_0 \left(\frac{\partial \gamma_0}{\partial y_0}\right)_{x_0} = \sin\gamma_0 \left(\frac{\partial \gamma_0}{\partial x_0}\right)_{y_0}.$$

So that combining both these relations gives:

$$\cos^2\gamma_0 \left(\frac{\partial \gamma_0}{\partial y_0}\right)_{x_0} dy_0 = \sin^2\gamma_0 \left(\frac{\partial \gamma_0}{\partial x_0}\right)_{y_0} dx_0$$

$$\sin^2\gamma_0 \left(\left(\frac{\partial \gamma_0}{\partial x_0}\right)_{y_0} dx_0 + \left(\frac{\partial \gamma_0}{\partial y_0}\right)_{x_0} dy_0 \right) = \left(\frac{\partial \gamma_0}{\partial y_0}\right)_{x_0} dy_0$$

$$\text{If } \left(\frac{\partial \gamma_0}{\partial x_0}\right)_{y_0} dx_0 + \left(\frac{\partial \gamma_0}{\partial y_0}\right)_{x_0} dy_0 \text{ is}$$

an exact differential, $d\gamma_0$, then: –

$$\sin^2\gamma_0 d\gamma_0 = \left(\frac{\partial \gamma_0}{\partial y_0}\right)_{x_0} dy_0$$

As $$\left(\frac{\partial \gamma_0}{\partial y_0}\right)_{x_0}$$

must be a function of both $x_0$ and $y_0$ if $d\gamma_0$ is to exist and the relation between $x_0$ and $y_0$ is not known at this stage, this further condition for the exactness of the differential equation cannot be integrated by quadrature or numerically at this stage.

Alternatively, we may write:

$$\cos^2\gamma_0 \left(\left(\frac{\partial \gamma_0}{\partial x_0}\right)_{y_0} dx_0 + \left(\frac{\partial \gamma_0}{\partial y_0}\right)_{x_0} dy_0\right) = \left(\frac{\partial \gamma_0}{\partial x_0}\right)_{y_0} dx_0$$

If $$\left(\frac{\partial \gamma_0}{\partial x_0}\right)_{y_0} dx_0 + \left(\frac{\partial \gamma_0}{\partial y_0}\right)_{x_0} dy_0$$

is an exact differential, $d\gamma_0$, then:

$$\cos^2\gamma_0 d\gamma_0 = \left(\frac{\partial \gamma_0}{\partial x_0}\right)_{y_0} dx_0$$

As $$\left(\frac{\partial \gamma_0}{\partial x_0}\right)_{y_0}$$

must be a function of both $x_0$ and $y_0$ if $d\gamma_0$ is to exist and the relation between $x_0$ and $y_0$ is not known at this stage, this further condition for the exactness of the differential equation cannot be integrated by quadrature or numerically at this stage.

6.21.4 Integrating factor for the cartesian form.

As before, if the gradient of the defined mirror is denoted by $\gamma_0$ then its differential equation can be written:

$$\sin\gamma_0 dx_0 - \cos\gamma_0 dy_0 = 0$$

Again, this may better be regarded as a family of differential equations for $x_0,y_0$ having one member for each specification of $\gamma_0$.

Since $\gamma_0$ can be regarded as a function of $x_0,y_0$ because of this differential equation there is no need for the integrating factor to include $\gamma_0$ explicitly. Applying the integrating factor $T(x_0,y_0)$ gives:

$$T(x_0,y_0) \sin\gamma_0 dx_0 - T(x_0,y_0) \cos\gamma_0 dy_0 = 0$$

Provided neither of $\sin\gamma_0$ nor $\cos\gamma_0$ is zero, the condition for an exact differential is:

$$\left(\frac{\partial(T(x_0, y_0)\sin\gamma_0)}{\partial y_0}\right)_{x_0} = \left(\frac{\partial(-T(x_0, y_0)\cos\gamma_0)}{\partial x_0}\right)_{y_0}$$

$$T(x_0, y_0)\cos\gamma_0 \left(\frac{\partial \gamma_0}{\partial y_0}\right)_{x_0} + \sin\gamma_0 \left(\frac{\partial T(x_0, y_0)}{\partial y_0}\right)_{x_0} =$$

-continued
$$T(x_0, y_0)\sin\gamma_0 \left( \frac{\partial \gamma_0}{\partial x_0} \right)_{y_0} - \cos\gamma_0 \left( \frac{\partial T(x_0, y_0)}{\partial x_0} \right)_{y_0}$$

But $$\cos\gamma_0 = \sin\gamma_0 \frac{dx_0}{dy_0}$$

by virtue of the differential equation; so that:

$$\left( \frac{\partial T(x_0, y_0)}{\partial x_0} \right)_{y_0} dx_0 + \left( \frac{\partial T(x_0, y_0)}{\partial y_0} \right)_{x_0} dy_0 =$$

$$T(x_0, y_0) \left( \frac{\partial \gamma_0}{\partial x_0} \right)_{y_0} dy_0 - T(x_0, y_0) \left( \frac{\partial \gamma_0}{\partial y_0} \right)_{x_0} dx_0$$

$$\frac{dT(x_0, y_0)}{T(x_0, y_0)} = \left( \frac{\partial \gamma_0}{\partial x_0} \right)_{y_0} dy_0 - \left( \frac{\partial \gamma_0}{\partial y_0} \right)_{x_0} dx_0$$

Clearly $$\left( \frac{\partial \gamma_0}{\partial x_0} \right)_{y_0} \text{ and } \left( \frac{\partial \gamma_0}{\partial y_0} \right)_{x_0}$$

may not both be zero in this or any similar expression for $dT(x_0,y_0)/T(x_0,y_0)$, as that would make $T(x_0,y_0)$ a constant and require the differential equation to be exact prior to the application of the integrating factor.

Now $$\left( \frac{\partial \gamma_0}{\partial x_0} \right)_{y_0} \text{ and } \left( \frac{\partial \gamma_0}{\partial y_0} \right)_{x_0}$$

may be chosen independently of each other and $T(x_0,y_0)$ and $\gamma_0(x_0,y_0)$ obtained therefrom provided the expression for $dT(x_0,y_0)/T(x_0,y_0)$ and the expression $$\left( \frac{\partial \gamma_0}{\partial x_0} \right)_{y_0} dx_0 + \left( \frac{\partial \gamma_0}{\partial y_0} \right)_{x_0}$$

are integrable somehow. However, it is convenient to impose the conditions that these expressions are exact differentials. Such conditions are by no means restrictive as they allow all four factors of $dx_0$ and $dy_0$, namely $$\left( \frac{\partial \gamma_0}{\partial x_0} \right)_{y_0} \text{ and } \left( \frac{\partial \gamma_0}{\partial y_0} \right)_{x_0}$$

for each differential, to be functions of both $x_0$ and $y_0$ without preventing the integration of said expressions (even though the relation, if any, between $x_0$ and $y_0$ is as yet unknown).

The expression for $dT(x_0,y_0)/T(x_0,y_0)$ is an exact differential if:

$$\left( \frac{\partial}{\partial y_0} \left( -\left( \frac{\partial \gamma_0}{\partial y_0} \right)_{x_0} \right) \right)_{x_0} = \left( \frac{\partial}{\partial x_0} \left( \frac{\partial \gamma_0}{\partial x_0} \right)_{y_0} \right)_{y_0} \text{ or}$$

$$-\left( \frac{\partial}{\partial y_0} \left( \frac{\partial \gamma_0}{\partial y_0} \right)_{x_0} \right)_{x_0} = \left( \frac{\partial}{\partial x_0} \left( \frac{\partial \gamma_0}{\partial x_0} \right)_{y_0} \right)_{y_0}$$

While $$\left( \frac{\partial \gamma_0}{\partial x_0} \right)_{y_0} dx_0 + \left( \frac{\partial \gamma_0}{\partial y_0} \right)_{x_0} dy_0$$

is an exact differential, $d\gamma_0$, if:

$$\left( \frac{\partial}{\partial y_0} \left( \frac{\partial \gamma_0}{\partial x_0} \right)_{y_0} \right)_{x_0} = \left( \frac{\partial}{\partial x_0} \left( \frac{\partial \gamma_0}{\partial y_0} \right)_{x_0} \right)_{y_0}$$

If $$\left( \frac{\partial \gamma_0}{\partial x_0} \right)_{y_0} = F(x_0, y_0) \text{ and } \left( \frac{\partial \gamma_0}{\partial y_0} \right)_{x_0} = G(x_0, y_0)$$

it can be seen that these two conditions for the exactness of the expression for $dT(x_0,y_0)/T(x_0, y_0)$ and $$\left( \frac{\partial \gamma_0}{\partial x_0} \right)_{y_0} dx_0 + \left( \frac{\partial \gamma_0}{\partial y_0} \right)_{x_0} dy_0$$

are the Cauchy-Riemann equations:

$$\left( \frac{\partial F(x_0, y_0)}{\partial y_0} \right)_{x_0} = \left( \frac{\partial G(x_0, y_0)}{\partial x_0} \right)_{y_0} \text{ and}$$

$$-\left( \frac{\partial G(x_0, y_0)}{\partial y_0} \right)_{x_0} = \left( \frac{\partial F(x_0, y_0)}{\partial x_0} \right)_{y_0}$$

so that if the second derivatives $$\left( \frac{\partial}{\partial x_0} \left( \frac{\partial F(x_0, y_0)}{\partial y_0} \right)_{x_0} \right)_{y_0} = \left( \frac{\partial}{\partial y_0} \left( \frac{\partial F(x_0, y_0)}{\partial x_0} \right)_{y_0} \right)_{x_0}$$

and $$\left( \frac{\partial}{\partial x_0} \left( \frac{\partial G(x_0, y_0)}{\partial y_0} \right)_{x_0} \right)_{y_0} = \left( \frac{\partial}{\partial y_0} \left( \frac{\partial G(x_0, y_0)}{\partial x_0} \right)_{y_0} \right)_{x_0}$$

then $F(x_0, y_0)$ and $G(x_0, y_0)$ each satisfy Laplace's differential equation:

$$\left( \frac{\partial}{\partial x_0} \left( \frac{\partial F(x_0, y_0)}{\partial x_0} \right)_{y_0} \right)_{y_0} + \left( \frac{\partial}{\partial y_0} \left( \frac{\partial F(x_0, y_0)}{\partial y_0} \right)_{x_0} \right)_{x_0} = 0$$

$$\left( \frac{\partial}{\partial x_0} \left( \frac{\partial G(x_0, y_0)}{\partial x_0} \right)_{y_0} \right)_{y_0} + \left( \frac{\partial}{\partial y_0} \left( \frac{\partial G(x_0, y_0)}{\partial y_0} \right)_{x_0} \right)_{x_0} = 0$$

and, being real, are harmonic functions.

As the number of the variables $x_0, y_0$ is two, the solution of Laplace's differential equation is, in general, the real part of any analytic function of the complex variable $x_0 + iy_0$.

If $F(x_0, y_0)$ is the real part of an analytic function of the complex variable $x_0 + iy_0$ then:

$$F(x_0, y_0) = \Re \left( \sum_{j=0}^{\infty} a_j(x_0 + iy_0)^j \right)$$

where each $a_j$ is a complex constant and any $a_j$ may be zero, and, if the series has an infinite number of terms, it is convergent. Hence:

$$\left( \frac{\partial F(x_0, y_0)}{\partial x_0} \right)_{y_0} = \Re \left( \sum_{j=0}^{\infty} ja_j(x_0 + iy_0)^{j-1} \right) = -\left( \frac{\partial G(x_0, y_0)}{\partial y_0} \right)_{x_0}$$

-continued $$\left(\frac{\partial F(x_0, y_0)}{\partial y_0}\right)_{y_0} = \Re\left(\sum_{j=0}^{\infty} j a_j(x_0 + iy_0)^{j-1} i\right) = \left(\frac{\partial G(x_0, y_0)}{\partial x_0}\right)_{y_0}$$

$$\text{Hence } G(x_0, y_0) = \Re\left(\sum_{j=0}^{\infty} a_j(x_0 + iy_0)^j i\right)$$

if the arbitrary constant of integration is chosen to be $a_0$. As the constant term in $F(x_0, Y_0)$ is $\Re(a_0)$ while that in $G(x_0,y_0)$ is $*(a_0)$ this does not result in a loss of generality. However, all the other constants, $a_j \Re$ and $a_j *$ for $j>0$, appear in both $F(x_0,y_0)$ and $G(x_0,y_0)$. Indeed $-G(x_0,y_0)$ is known as the conjugate harmonic function of $F(x_0,y_0)$.

Thus once $F(x_0,y_0)$ and $a_0 *$ are chosen then $G(x_0,y_0)$ may be found by virtue of said two conditions. Equally, once $G(x_0,y_0)$ and $a_0 \Re$ are chosen then $F(x_0,y_0)$ may be found. Thus $F(x_0,y_0)$ and $G(x_0,y_0)$ are independent of but related to each other.

There are three other cases in which said conditions are satisfied.

If both $$\left(\frac{\partial \gamma_0}{\partial x_0}\right)_{y_0} \text{ and } \left(\frac{\partial \gamma_0}{\partial y_0}\right)_{x_0}$$

are (nonzero) constants, such as $a_0 \Re$ and $-a_0 *$ respectively, then both said conditions are satisfied, since all their partial derivatives are zero.

If $$\left(\frac{\partial \gamma_0}{\partial x_0}\right)_{y_0} = F(x_0) \text{ and } \left(\frac{\partial \gamma_0}{\partial y_0}\right)_{x_0} = G(y_0)$$

then said conditions become:

$$-\left(\frac{\partial G(y_0)}{\partial y_0}\right)_{x_0} = \left(\frac{\partial F(x_0)}{\partial x_0}\right)_{y_0} \text{ or } -G'(y_0) = F'(x_0)$$

where $G'(y_0)$ is the first derivative of $G(y_0)$ and $F'(x_0)$ is the first derivative of $F(x_0)$; and:

$$\left(\frac{\partial F(x_0)}{\partial y_0}\right)_{x_0} = \left(\frac{\partial G(y_0)}{\partial x_0}\right)_{y_0}$$

The first condition may only be satisfied if both said first derivatives $F'(x_0)$ and $G'(y_0)$ are constants, such as $\pm a_1 \Re$ respectively. The second condition is always satisfied as both sides are always zero.

If $$\left(\frac{\partial \gamma_0}{\partial x_0}\right)_{y_0} = F(y_0) \text{ and } \left(\frac{\partial \gamma_0}{\partial y_0}\right)_{x_0} = G(x_0)$$

then said conditions become:

$$-\left(\frac{\partial G(x_0)}{\partial y_0}\right)_{x_0} = \left(\frac{\partial F(y_0)}{\partial x_0}\right)_{y_0} \text{ and}$$

$$\left(\frac{\partial F(y_0)}{\partial y_0}\right)_{x_0} = \left(\frac{\partial G(x_0)}{\partial x_0}\right)_{y_0} \text{ or } F'(y_0) = G'(x_0)$$

where $F'(y_0)$ is the first derivative of $F(y_0)$ and $G'(x_0)$ is the first derivative of $G(x_0)$. The first condition is always satisfied as both sides are always zero. The second condition may only be satisfied if both said first derivatives are the same constant, such as $-a_1 *$ Thus if suitable notations are used for the constants, all the latter three cases are compatible with the former case. And, in all four cases:

$$d\gamma_0(x_0, y_0) = F(x_0, y_0)dx_0 + G(x_0, y_0)dy_0$$

$$= \Re\left(\sum_{j=0}^{\infty} a_j(x_0 + iy_0)^j\right) dx_0 +$$

$$\Re\left(\sum_{j=0}^{\infty} a_j(x_0 + iy_0)^j i\right) dy_0$$

$$\gamma_0(x_0, y_0) = \Re\left(\sum_{j=0}^{\infty} \frac{a_j}{j+1} (x_0 + iy_0)^{j+1}\right) + b_0$$

where $b_0$ is a real constant.

This specification is equally applicable to the specification of the gradient of a defining surface as may be signified by replacing $\gamma_0$ with $\gamma$, $x_0$ with $x$, $y_0$ with $y$ and $b_0$ with $b$.

$$\frac{dT(x_0, y_0)}{T(x_0, y_0)} = F(x_0, y_0) dy_0 - G(x_0, y_0)dx_0$$

$$= \Re\left(\sum_{j=0}^{\infty} a_j(x_0 + iy_0)^j\right) dy_0 -$$

$$\Re\left(\sum_{j=0}^{\infty} a_j(x_0 + iy_0)^j i\right) dx_0$$

$$= d\left(-\Re\left(\sum_{j=0}^{\infty} \frac{a_j}{j+1} (x_0 + iy_0)^{j+1} i\right)\right)$$

Provided a natural logarithm may be complex so that its argument may be negative:

$$\ln T(x_0, y_0) = -\Re\left(\sum_{j=0}^{\infty} \frac{a_j}{j+1} x_0 + iy_0)^{j+1} i\right) + \ln c \text{ where } c \text{ is a constant.}$$

$$T(x_0, y_0) = ce^{-\Re\left(\sum_{j=0}^{\infty} \frac{a_j}{j+1} (x_0+iy_0)^{j+1} i\right)}$$

Moreover:

$$dx_0 = \frac{d\gamma_0 - G(x_0, y_0)dy_0}{F(x_0, y_0)} = \frac{F(x_0, y_0)dy_0 - d(\ln T(x_0, y_0))}{G(x_0, y_0)}$$

$$G(x_o, y_o)d\gamma_0 - G^2(x_o, y_o)dy_o = F^2(x_o, y_o) dy_o - F(x_o, y_o)d(\ln T(x_o, y_o))$$

$$dy_0 = \frac{G(x_0, y_0)d\gamma_0 + F(x_0, y_0)d(\ln T(x_0, y_0))}{F^2(x_0, y_0) + G^2(x_0, y_0)}$$

And:—

$$dy_0 = \frac{d\gamma_0 - F(x_0, y_0)dx_0}{G(x_0, y_0)} = \frac{G(x_0, y_0)dx_0 + d(\ln T(x_0, y_0))}{F(x_0, y_0)}$$

$$F(x_o, y_o)d\gamma_0 - F^2(x_o, y_o)dx_o = G^2(x_o, y_o) dx_o - G(x_o, y_o)d(\ln T(x_o, y_o))$$

$$dx_0 = \frac{F(x_0, y_0)d\gamma_0 + G(x_0, y_0)d(\ln T(x_0, y_0))}{F^2(x_0, y_0) + G^2(x_0, y_0)}$$

So that if the differentials $dx_0$ and $dy_0$ are replaced by these expressions involving $d\gamma_0$ and $d(\ln T(x_0,y_0))$ the differential equation after the application of the integrating factor becomes:

$$T(x_0, y_0)\sin\gamma_0 \frac{f(x_0, y_0)d\gamma_0 - G(x_0, y_0)d(\ln T(x_0, y_0))}{F^2(x_0, y_0) + G^2(x_0, y_0)} -$$

$$T(x_0, y_0)\cos\gamma_0 \frac{G(x_0, y_0)d\gamma_0 + F(x_0, y_0)d(\ln T(x_0, y_0))}{F^2(x_0, y_0) + g^2(x_0, y_0)} = 0$$

$$\frac{T(x_0, y_0)((F(x_0, y_0)\sin\gamma_0 - G(x_0, y_0)\cos\gamma_0)d\gamma_0 - (G(x_0, y_0)\sin\gamma_0 + F(x_0, y_0)\cos\gamma_0)d(\ln T(x_0, y_0)))}{F^2(x_0, y_0) + G^2(x_0, y_0)} = 0$$

If $F(x_0, y_0)$ and $G(x_0, y_0)$ are both constants, and thus $\Re(a_0)$ and $-\Re(a_0)$ respectively, the differential equation after the application of the integrating factor may be integrated by quadrature to give:

$$\frac{-e^{\ln T(x_0, y_0)}(G(x_0, y_0)\sin\gamma_0 + F(x_0, y_0)\cos\gamma_0)}{F^2(x_0, y_0) + G^2(x_0, y_0)} = k_0 \text{ or}$$

$$-e^{\ln T(x_0, y_0)}\left(\frac{-a_0^{\Im}}{(a_0^{\Re})^2 + (-a_0^{\Im})^2}\sin\gamma_0 + \frac{a_0^{\Re}}{(a_0^{\Re})^2 + (-a_0^{\Im})^2}\cos\gamma_0\right) = k_0$$

where $k_0$ is a constant and:

$$\gamma_0(x_0, y_0) = a_0^{\Re} x_0 - a_0^{\Im} y_0 + b_0$$

and $$T(x_0, y_0) = c e^{a_0^{\Im} y_0 + a_0^{\Re} x_0}$$

Any function for $$\left(\frac{\partial \gamma_0}{\partial x_0}\right)_{y_0}$$

may be represented by different values of $$\left(\frac{\partial \gamma_0}{\partial x_0}\right)_{y_0}$$

at different points on the defined mirror. In which case $$\left(\frac{\partial \gamma_0}{\partial x_0}\right)_{y_0}$$

is "locally" constant but "globally" variable. Similarly for $$\left(\frac{\partial \gamma_0}{\partial y_0}\right)_{x_0}.$$

Now
$$\left(\frac{\partial (T(x_0, y_0)\cos\gamma_0)}{\partial y_0}\right)_{x_0} = -T(x_0, y_0)\sin\gamma_0 \left(\frac{\partial \gamma_0}{\partial y_0}\right)_{x_0} +$$

$$\cos\gamma_0 \left(\frac{\partial T(x_0, y_0)}{\partial y_0}\right)_{x_0}$$

$$= -T(x_0, y_0)\sin\gamma_0 G(x_0 y_0) + \cos\gamma_0 T(x_0, y_0) F(x_0, y_0)$$

$$= T(x_0, y_0)\cos\gamma_0 F(x_0, y_0) + \sin\gamma_0 T(x_0, y_0)(-G(x_0, y_0))$$

$$= T(x_0, y_0)\cos\gamma_0 \left(\frac{\partial \gamma_0}{\partial x_0}\right)_{y_0} +$$

$$\sin\gamma_0 \left(\frac{\partial T(x_0, y_0)}{\partial x_0}\right)_{y_0}$$

$$= \left(\frac{\partial (T(x_0, y_0)\sin\gamma_0)}{\partial x_0}\right)_{y_0}$$

while the condition for an exact differential for the differential equation may be written:

$$\left(\frac{\partial (T(x_0, y_0)\sin\gamma_0)}{\partial y_0}\right)_{x_0} = -\left(\frac{\partial (T(x_0, y_0)\cos\gamma_0)}{\partial x_0}\right)_{y_0}$$

Thus $T(x_0, y_0) \sin \gamma_0$ and $T(x_0, y_0) \cos \gamma_0$ satisfy the Cauchy-Riemann equations with respect to $x_0$ and $y_0$. Since $$-\left(\frac{\partial G(x_0, y_0)}{\partial y_0}\right)_{x_0} = \left(\frac{\partial F(x_0, y_0)}{\partial x_0}\right)_{y_0}$$

because of one of the conditions imposed:

$$\left(\frac{\partial}{\partial x_0}\left(\frac{\partial T(x_0, y_0)}{\partial y_0}\right)_{x_0}\right)_{y_0} = \left(\frac{\partial (T(x_0, y_0)F(x_0, y_0))}{\partial x_0}\right)_{y_0}$$

$$= \left(\frac{\partial T(x_0, y_0)}{\partial x_0}\right)_{y_0} F(x_0, y_0) + T(x_0, y_0)\left(\frac{\partial F(x_0, y_0)}{\partial x_0}\right)_{y_0}$$

$$= -T(x_0, y_0) G(x_0, y_0) F(x_0, y_0) + T(x_0, y_0)\left(\frac{\partial F(x_0, y_0)}{\partial x_0}\right)_{y_0}$$

and: –

-continued
$$\left(\frac{\partial}{\partial y_0}\left(\frac{\partial T(x_0, y_0)}{\partial x_0}\right)_{y_0}\right)_{x_0} = \left(\frac{\partial(-T(x_0, y_0)G(x_0, y_0))}{\partial y_0}\right)_{x_0}$$

$$= \left(\frac{\partial T(x_0, y_0)}{\partial y_0}\right)_{x_0} G(x_0, y_0) - T(x_0, y_0)\left(\frac{\partial G(x_0, y_0)}{\partial y_0}\right)_{x_0}$$

$$= -T(x_0, y_0)G(x_0, y_0)F(x_0, y_0) + T(x_0, y_0)\left(\frac{\partial F(x_0, y_0)}{\partial x_0}\right)_{y_0}$$

are equal.

Since $\left(\frac{\partial}{\partial y_0}\left(\frac{\partial \gamma_0}{\partial x_0}\right)_{y_0}\right)_{x_0} = \left(\frac{\partial}{\partial x_0}\left(\frac{\partial \gamma_0}{\partial y_0}\right)_{x_0}\right)_{y_0}$ also: –

$$\left(\frac{\partial}{\partial x_0}\left(\frac{\partial(T(x_0, y_0)\cos\gamma_0)}{\partial y_0}\right)_{x_0}\right)_{y_0} = \left(\frac{\partial}{\partial x_0}\left(\left(\frac{\partial T(x_0, y_0)}{\partial y_0}\right)_{x_0}\cos\gamma_0 - T(x_0, y_0)\sin\gamma_0\left(\frac{\partial \gamma_0}{\partial y_0}\right)_{x_0}\right)\right)_{y_0}$$

$$= -\sin\gamma_0\left(\frac{\partial \gamma_0}{\partial x_0}\right)_{y_0}\left(\frac{\partial T(x_0, y_0)}{\partial y_0}\right)_{x_0} + \cos\gamma_0\left(\frac{\partial}{\partial x_0}\left(\frac{\partial T(x_0, y_0)}{\partial y_0}\right)_{x_0}\right)_{y_0} -$$

$$\left(\frac{\partial T(x_0, y_0)}{\partial x_0}\right)_{y_0}\sin\gamma_0\left(\frac{\partial \gamma_0}{\partial y_0}\right)_{x_0} - T(x_0, y_0)\left(\cos\gamma_0\left(\frac{\partial \gamma_0}{\partial x_0}\right)_{y_0}\left(\frac{\partial \gamma_0}{\partial y_0}\right)_{x_0} + \right.$$

$$\left.\sin\gamma_0\left(\frac{\partial}{\partial x_0}\left(\frac{\partial \gamma_0}{\partial y_0}\right)_{x_0}\right)_{y_0}\right) \text{ and: } -$$

$$\left(\frac{\partial}{\partial x_0}\left(\frac{\partial(T(x_0, y_0)\cos\gamma_0)}{\partial y_0}\right)_{x_0}\right)_{y_0} = \left(\frac{\partial}{\partial y_0}\left(\left(\frac{\partial T(x_0, y_0)}{\partial x_0}\right)_{y_0}\cos\gamma_0 - T(x_0, y_0)\sin\gamma_0\left(\frac{\partial \gamma_0}{\partial x_0}\right)_{y_0}\right)\right)_{x_0}$$

$$= -\sin\gamma_0\left(\frac{\partial \gamma_0}{\partial y_0}\right)_{x_0}\left(\frac{\partial T(x_0, y_0)}{\partial x_0}\right)_{y_0} + \cos\gamma_0\left(\frac{\partial}{\partial y_0}\left(\frac{\partial T(x_0, y_0)}{\partial x_0}\right)_{y_0}\right)_{x_0} -$$

$$\left(\frac{\partial T(x_0, y_0)}{\partial y_0}\right)_{x_0}\sin\gamma_0\left(\frac{\partial \gamma_0}{\partial x_0}\right)_{y_0} - T(x_0, y_0)\left(\cos\gamma_0\left(\frac{\partial \gamma_0}{\partial y_0}\right)_{x_0}\left(\frac{\partial \gamma_0}{\partial x_0}\right)_{y_0} + \right.$$

$$\left.\sin\gamma_0\left(\frac{\partial}{\partial y_0}\left(\frac{\partial \gamma_0}{\partial x_0}\right)_{y_0}\right)_{x_0}\right) \text{ are equal.}$$

Similarly $$\left(\frac{\partial}{\partial x_0}\left(\frac{\partial(T(x_0, y_0)\sin\gamma_0)}{\partial y_0}\right)_{x_0}\right)_{y_0} = \left(\frac{\partial}{\partial y_0}\left(\frac{\partial(T(x_0, y_0)\sin\gamma_0)}{\partial x_0}\right)_{y_0}\right)_{x_0}.$$

Thus both $T(x_0, y_0) \sin \gamma_0$ and $T(x_0, y_0) \cos \gamma_0$ each satisfy Laplace's differential equation and are each the real part of an analytic function of the complex variable $x_0 + iy_0$. And $-T(x_0, y_0) \sin \gamma_0$ is the conjugate harmonic function of $T(x_0, y_0) \cos \gamma_0$. Said expressions may thus be represented by:

$$T(x_0, y_0)\sin\gamma_0 = \Re\left(\sum_{j=0}^{\infty} c_j(x_0 + iy_0)^j i\right) \text{ and}$$

$$T(x_0, y_0)\cos\gamma_0 = \Re\left(\sum_{j=0}^{\infty} c_j(x_0 + iy_0)^j\right)$$

where each $c_j$ is complex and any $c_j$ may be zero. And:

$$\tan\gamma_0 = \frac{\Re\left(\sum_{j=0}^{\infty} c_j(x_0 + iy_0)^j i\right)}{\Re\left(\sum_{j=0}^{\infty} c_j(x_0 + iy_0)^j\right)}$$

This specification of $\gamma_0$ is consistent with and thus merely additional to the above specification of $$\left(\frac{\partial \gamma_0}{\partial x_0}\right)_{y_0} \text{ and } \left(\frac{\partial \gamma_0}{\partial y_0}\right)_{x_0}.$$

It is equally applicable to the specification of the gradient of a defining surface as may be signified by replacing $\gamma_0$ with $\gamma$, $x_0$ with x and $y_0$ with y.

Moreover, the differential equation may be written:

$$\Re\left(\sum_{j=0}^{\infty} c_j(x_0 + iy_0)^j i\right) dx_0 - \Re\left(\sum_{j=0}^{\infty} c_j(x_0 + iy_0)^j\right) dy_0 = 0$$

-continued

Hence $\Re\left(\sum_{j=0}^{\infty} \frac{c_j}{j+1} (x_0 + iy_0)^{j+1} i\right) = k_0$ where $k_0$ is a constant.

However, the values of the constants $c_j$ must be found from:

$$\Re\left(\sum_{j=0}^{\infty} c_j(x_0 + iy_0)^j\right) = T(x_0, y_0)\cos\gamma_0 = ce^{-\Re\left(\sum_{j=0}^{\infty} \frac{a_j}{j+1} (x_0+iy_0)^{j+1} i\right)} \cos\left(\Re\left(\sum_{j=0}^{\infty} \frac{a_j}{j+1} (x_0 + iy_0)^{j+1}\right) + b_0\right)$$

This result and that obtained when $F(x_0,y_0)$ and $G(x_0,y_0)$ are both constants together with the nature of $F(x_0,y_0)$ and $G(x_0,y_0)$ raise the question of whether the differential equation is equally a differential such as the following:

$$d\left(-e^{i nT(x_0,y_0)}\left(-\Re\left(\sum_{j=0}^{\infty} c_j(x_0 + iy_0)^j i\right)\sin\gamma_0 + \Re\left(\sum_{j=0}^{\infty} c_j(x_0 + iy_0)^j\right)\cos\gamma_0\right)\right)$$

$$= -e^{i nT(x_0,y_0)}\left(\left(-\Re\left(\sum_{j=0}^{\infty} c_j(x_0 + iy_0)^j i\right)\cos\gamma_0 - \Re\left(\sum_{j=0}^{\infty} c_j(x_0 + iy_0)^j\right)\sin\gamma_0\right)\right.$$

$$(F(x_0,y_0)dx_0 + G(x_0,y_0)dy_0) + \left(-\Re\left(\sum_{j=0}^{\infty} c_j(x_0 + iy_0)^j i\right)\sin\gamma_0 + \Re\left(\sum_{j=0}^{\infty} c_j(x_0 + iy_0)^j\right)\cos\gamma_0\right)$$

$$(F(x_0,y_0)dy_0 + G(x_0,y_0)dx_0) - \left(\Re\left(\sum_{j=0}^{\infty} jc_j(x_0 + iy_0)^{j-1} i\right)dx_0 - \Re\left(\sum_{j=0}^{\infty} jc_j(x_0 + iy_0)^{j-1}\right)dy_0\right)\sin\gamma_0 +$$

$$\left(\Re\left(\sum_{j=0}^{\infty} jc_j(x_0 + iy_0)^{j-1}\right)dx_0 + \Re\left(\sum_{j=0}^{\infty} jc_j(x_0 + iy_0)^{j-1} i\right)dy_0\right)\cos\gamma_0\right)$$

$$= -e^{i nT(x_0,y_0)}\left(\left(\left(-\Re\left(\sum_{j=0}^{\infty} c_j(x_0 + iy_0)^j\right)F(x_0,y_0) + \Re\left(\sum_{j=0}^{\infty} c_j(x_0 + iy_0)^j i\right)G(x_0,y_0) -\right.\right.\right.$$

$$\Re\left(\sum_{j=0}^{\infty} jc_j(x_0 + iy_0)^{j-1} i\right)\right)\sin\gamma_0 + \left(-\Re\left(\sum_{j=0}^{\infty} c_j(x_0 + iy_0)^j i\right)F(x_0,y_0) - \Re\left(\sum_{j=0}^{\infty} c_j(x_0 + iy_0)^j\right)G(x_0,y_0) +\right.$$

$$\Re\left(\sum_{j=0}^{\infty} jc_j(x_0 + iy_0)^{j-1}\right)\right)\cos\gamma_0\right)dx_0 + \left(\left(-\Re\left(\sum_{j=0}^{\infty} c_j(x_0 + iy_0)^j\right)G(x_0,y_0) - \Re\left(\sum_{j=0}^{\infty} c_j(x_0 + iy_0)^j i\right)F(x_0,y_0) +\right.\right.$$

$$\Re\left(\sum_{j=0}^{\infty} jc_j(x_0 + iy_0)^{j-1}\right)\right)\sin\gamma_0 + \left(-\Re\left(\sum_{j=0}^{\infty} c_j(x_0 + iy_0)^j i\right)G(x_0,y_0) + \Re\left(\sum_{j=0}^{\infty} c_j(x_0 + iy_0)^j\right)F(x_0,y_0) +\right.$$

$$\Re\left(\sum_{j=0}^{\infty} jc_j(x_0 + iy_0)^{j-1} i\right)\right)\cos\gamma_0\right)dy_0\right)$$

Equating the factor of $T(x_0,y_0) \sin\gamma_0 dx_0$, and that of $-T(x_0,y_0)\cos\gamma_0 dy_0$, in this differential to that in the differential equation after the application of the integrating factor both give:

$$\Re\left(\sum_{j=0}^{\infty} c_j(x_0 + iy_0)^j\right)F(x_0,y_0) -$$

$$\Re\left(\sum_{j=0}^{\infty} c_j(x_0 + iy_0)^j i\right)G(x_0,y_0) + \Re\left(\sum_{j=0}^{\infty} jc_j(x_0 + iy_0)^{j-1} i\right) = 1$$

$$\Re\left(\sum_{j=0}^{\infty} c_j(x_0 + iy_0)^j\right)\Re\left(\sum_{k=0}^{\infty} a_k(x_0 + iy_0)^k\right) -$$

$$\Re\left(\sum_{j=0}^{\infty} c_j(x_0 + iy_0)^j i\right)\Re\left(\sum_{k=0}^{\infty} a_k(x_0 + iy_0)^k i\right) +$$

$$\Re\left(\sum_{j=0}^{\infty} jc_j(x_0 + iy_0)^{j-1} i\right) = 1$$

-continued $$\Re\left(\left(\sum_{j=0}^{\infty} c_j(x_0 + iy_0)^j\right)\left(\sum_{k=0}^{\infty} a_k(x_0 + iy_0)^k\right)\right) +$$

$$\Re\left(\sum_{j=0}^{\infty} jc_j(x_0 + iy_0)^{j-1} i\right) = 1$$

$$\Re\left(\sum_{j=0}^{\infty} (x_0 + iy_0)^j \sum_{k=0}^{\infty} c_{j-k}a_k\right) + \Re\left(\sum_{j=0}^{\infty} jc_j(x_0 + iy_0)^{j-1} i\right) = 1$$

Equating the real coefficients of $(x_0+iy_0)^0$ gives:

$\Re(c_0 a_0) - 1 = -\Re(c_1 i)$ $\Re((c_0^\Re + c_0^\Im)(a_0^\Re + i a_0^\Im)) - 1 = -\Re(c_1^\Re i - c_1^\Im)$ $c_0^\Re a_0^\Re - c_0^\Im a_0^\Im - c_1^\Im$

As $(x_0+iy_0)^j$ cannot be a constant when $j>0$ this condition happens to be the same when $j>0$ as the further condition yet to be derived. So that it suffices to equate the complex coefficients of $(x_0+iy_0)^j$ for $j>0$ to give:

$$\sum_{k=0}^{j} c_{j-k}a_k = -(j+1)c_{j+1}i \text{ or}$$

$$\sum_{k=0}^{j} c_{j-k}a_k i = (j+1)c_{j+1}$$

Equating the factor of $T(x_0,y_0) \sin \gamma_0 dy_0$, and that of $T(x_0,y_0) \cos \gamma_0 dx_0$, in this differential to zero both give:

$$\Re\left(\sum_{j=1}^{\infty} c_j(x_0+iy_0)^j i\right) F(x_0, y_0) +$$

$$\Re\left(\sum_{j=0}^{\infty} c_j(x_0+iy_0)^j\right) G(x_0, y_0) - \Re\left(\sum_{j=0}^{\infty} jc_j(x_0+iy_0)^{j-1}\right) = 0$$

$$\Re\left(\sum_{j=0}^{\infty} c_j(x_0+iy_0)^j i\right) \Re\left(\sum_{k=0}^{\infty} a_k(x_0+iy_0)^k\right) +$$

$$\Re\left(\sum_{j=0}^{\infty} c_j(x_0+iy_0)^j\right) \Re\left(\sum_{k=0}^{\infty} a_k(x_0+iy_0)^k i\right) -$$

$$\Re\left(\sum_{j=0}^{\infty} jc_j(x_0+iy_0)^{j-1}\right) = 0$$

$$\Re\left(\left(\sum_{j=0}^{\infty} c_j(x_0+iy_0)^j\right)\left(\sum_{k=0}^{\infty} a_k(x_0+iy_0)^k\right) i\right) -$$

$$\Re\left(\sum_{j=0}^{\infty} jc_j(x_0+iy_0)^{j-1}\right) = 0$$

$$\Re\left(\left(\sum_{j=0}^{\infty} (x_0+iy_0)^j \sum_{k=0}^{\infty} c_{j-k}a_k\right) i\right) - \Re\left(\sum_{j=0}^{\infty} jc_j(x_0+iy_0)^{j-1}\right) = 0$$

Equating the real coefficients of $(x_0+iy_0)^0$ gives:

$$\Re(c_0 a_0 i) = \Re(c_1)$$

$$\Re((c_0^{\Re} i - c_0^{\Im})(a_0^{\Re} + ia_0^{\Im})) = c_1^{\Re} - c_0^{\Re} a_0^{\Im} - c_0^{\Im} a_0^{\Re} = c_1^{\Re}$$

It suffices to equate the complex coefficients of $(x_0+iy_0)^j$ for $j>0$ to give:

$$\sum_{k=0}^{j} c_{j-k}a_k i = (j+1)c_{j+1} \text{ as before.}$$

Thus once $c_0$ has been chosen then $c_1$ may be determined. While for $j>1$, once $c_{j-1}$ has been determined then $c_j$ may be determined from lower numbered coefficients. Thus all the $c_j$ may be determined one after another once $c_0$ has been chosen.

Hence the solution may be put in a convenient general form:

$$-e^{lnT(x_0,y_0)}\left(-\Re\left(\sum_{j=0}^{\infty} c_j(x_0+iy_0)^j i\right) \sin\gamma_0 + \Re\left(\sum_{j=0}^{\infty} c_j(x_0+iy_0)^j\right) \cos\gamma_0\right) = k_0$$

where $k_0$ is a constant, $c_1^{\Re}=-c_0^{\Re}a_0^{\Im}-c_0^{\Im}a_0^{\Re}$, $c_1^{\Im}=c_0^{\Re}a_0^{\Re}-c_0^{\Im}a_0^{\Im}-1$ and $$c_{j+1} = \frac{1}{j+1} \sum_{k=0}^{j} c_{j-k}a_k i \text{ when } j > 1.$$

If $F(x_0,y_0)=a_0^{\Re}$ and $G(x_0,y_0)=-a_0^{\Im}$ while $c_1^{\Re}=c_1^{\Im}=0$ then:

$$c_0^{\Re} = \frac{-c_0^{\Im}a_0^{\Re}}{a_0^{\Im}} = \frac{c_0^{\Im}a_0^{\Im}+1}{a_0^{\Re}}$$

$$c_0^{\Im} = \frac{-a_0^{\Im}}{(a_0^{\Re})^2+(-a_0^{\Im})^2}$$

$$c_0^{\Im} = \frac{-c_0^{\Re}a_0^{\Im}}{a_0^{\Re}} = \frac{c_0^{\Re}a_0^{\Re}-1}{a_0^{\Im}}$$

$$c_0^{\Re} = \frac{a_0^{\Re}}{(a_0^{\Re})^2+(-a_0^{\Im})^2}$$

and, as all the $a_k$ for $k>0$ are zero, all the $c_j$ for $j>1$ are zero. Hence:

$$-e^{lnT(x_0,y_0)}\left(\frac{-a_0^{\Im}}{(a_0^{\Re})^2+(-a_0^{\Im})^2} \sin\gamma_0 + \frac{a_0^{\Re}}{(a_0^{\Re})^2+(-a_0^{\Im})^2} \cos\gamma_0\right) = k_0$$

so that the convenient general form is consistent with the solution when $F(x_0,y_0)$ and $G(x_0,y_0)$ are both constants.

6.21.5 Polar form of the differential equation as an exact differential.

It has been shown that if the gradient of the defined mirror is denoted by $\gamma_0$ then its differential equation can be written:

$$\sin(\gamma_0-\theta_0)dr_0-r_0 \cos(\gamma_0-\theta_0)d\theta_0=0$$

This may better be regarded as a family of differential equations for $r_0,\theta_0$ having one member for each specification of $\gamma_0$.

If $r_0$ is zero then the defined mirror is a point at the origin, which is irrelevant to the relationship under examination and will therefore be excluded hereinafter. If $dr_0$ and $d\theta_0$ are both zero then $r_0$ and $\theta_0$ are both constants and the defined mirror is a point, which is irrelevant to the relationship under examination and will therefore be excluded hereinafter.

If $\cos(\gamma_0-\theta_0)=0$ then $\gamma_0-\theta_0=2n\ \pi\pm\pi/2$ and $\sin(\gamma_0-\theta_0)=\pm1$ so that the differential equation becomes $dr_0=0$ which is clearly an exact differential, and $r_0$ is a non-zero constant. (Conversely if $dr_0=0$ then $r_0$ is a non-zero constant and the differential equation becomes $r_0 \cos(\gamma_0-\theta_0)d\theta_0=0$. As $d\theta_0$ cannot be zero when $dr_0$ is zero and $r_0\neq0$, $\cos(\gamma_0-\theta_0)=0$.) This is the circle chose centre is at the origin as shown in FIG. 94. It occurs for defining mirror-ray combinations which obey the relations:

$$r_1 = r_0 \frac{\sin(\theta_0 - 2\gamma_1 + \beta_1)}{\sin(\theta_1 - 2\gamma_1 + \beta_1)} \text{ and}$$

$$r_1 = r_0 \frac{\sin(\theta_0 - 2\gamma_2 + \beta_2)}{\sin(\theta_2 - 2\gamma_2 + \beta_2)}$$

where $\theta_0$ is not equal to $\theta_1$ or $\theta_2$ and $r_0$ is a non-zero constant.

Such defining mirrors are also subject to the relationship $$\frac{dr_1}{r_1} = \frac{\cos(\gamma_1 - \theta_1)}{\sin(\gamma_1 - \theta_1)} d\theta_1$$

or its cartesian equivalent for the or the first defining mirror and a similar relationship for any second defining mirror.

The specification $\gamma_0 = \theta_0 + 2n\pi \pm \pi/2$ is equally applicable to the specification of the gradient of a defining surface as may be signified by replacing $\gamma_0$ with $\gamma$ and $\theta_0$ with $\theta$.

If $\sin(\gamma_0 - \theta_0) = 0$ then $\gamma_0 - \theta_0 = 2n\pi +_\pi{}^0$ and $\cos(\gamma_0 - \theta_0) = \pm 1$. As $r_0 \neq 0$ the differential equation becomes $d\theta_0 = 0$ which is clearly an exact differential, and $\theta_0$ is constant so that $\gamma_0$ is constant also. (Conversely if $d\theta_0 = 0$ then $\theta_0$ is constant and the differential equation becomes $\sin(\gamma_0 - \theta_0) dr_0 = 0$. As $dr_0$ cannot be zero when $d\theta_0$ is zero, $\sin(\gamma_0 - \theta_0) = 0$.) This case is the straight line through the origin. It occurs for defining mirrors which obey relations in the same form as above but with $r_0$ variable and $\theta_0$ constant.

Provided that neither $\sin(\gamma_0 - \theta_0)$ nor $r_0 \cos(\gamma_0 - \theta_0)$ is zero the condition that $\sin(\gamma_0 - \theta_0) dr_0 - r_0 \cos(\gamma_0 - \theta_0) d\theta_0 = 0$ is an exact differential is:

$$\left(\frac{\partial(\sin(\gamma_0 - \theta_0))}{\partial \theta_0}\right)_{r_0} = \left(\frac{\partial(-r_0 \cos(\gamma_0 - \theta_0))}{\partial r_0}\right)_{\theta_0}$$

$$\cos(\gamma_0 - \theta_0)\left(\left(\frac{\partial \gamma_0}{\partial \theta_0}\right)_{r_0} - 1\right) =$$

$$-\cos(\gamma_0 - \theta_0) + r_0 \sin(\gamma_0 - \theta_0)\left(\frac{\partial \gamma_0}{\partial r_0}\right)_{\theta_0}$$

$$\cos(\gamma_0 - \theta_0)\left(\frac{\partial \gamma_0}{\partial \theta_0}\right)_{r_0} = r_0 \sin(\gamma_0 - \theta_0)\left(\frac{\partial \gamma_0}{\partial r_0}\right)_{\theta_0}$$

It should be noted that the latter form of the condition requires the paradigm $\gamma_0 = \gamma_0(r_0, \theta_0)$.

Now none of $\sin(\gamma_0 - \theta_0)$, $r_0$ or $\cos(\gamma_0 - \theta_0)$ may be zero. So that if and only if $$\left(\frac{\partial \gamma_0}{\partial \theta_0}\right)_{r_0}$$

is zero then $$\left(\frac{\partial \gamma_0}{\partial r_0}\right)_{\theta_0}$$

is zero, and vice versa. In either case, $\gamma_0 = b_0$ where $b_0$ is a constant, and the differential equation becomes:

$$\sin(b_0 - \theta_0) dr_0 - r_0 \cos(b_0 - \theta_0) d\theta_0 = 0$$

which is an exact differential, and $r_0 \sin(b_0 - \theta_0) = k_0$ where $k_0$ is an (non-zero) constant.

It will be seen from the above differential equation that if $\gamma_0 = b_0$ where $b_0$ is a constant then the polar form of the differential equation is an exact differential whatever the value of $b_0$. And that the specification $\gamma_0 = b_0$ includes the case where $\gamma_0 = \theta_0 + 2n\pi +_\pi{}^0$ since $\theta_0$ is then a constant.

If $0 < b_0 < \pi$ and $k_0$ is positive, this solution is the equation of the straight line which crosses the positive part of the x-axis at an angle $b_0$ to said x-axis with a perpendicular distance from the origin to said straight line of $k_0$. If $0 < b_0 < \pi$ and $k_0$ is negative, this solution is the equation of the straight line which crosses the negative part of the x-axis at an angle $b_0$ to said x-axis with a perpendicular distance of $-k_0$.

Clearly these cases include lines parallel to the y-axis for which $b_0 = \pi/2$ and straight lines through the origin for which $k_0 = 0$. If $b_0 =_\pi{}^0$ then $r_0 \sin \theta_0 = \mp k_0$ which are the equations of straight lines parallel to the x-axis. All these cases are shown in FIG. 93. Similarly for values of $b_0$ outside the range $0 \leq b_0 \leq \pi$.

As before, the specification $\gamma_0 = b_0$ is equally applicable to the specification of the gradient of a portion of a defining surface as may be signified by replacing $\gamma_0$ with $\gamma$ and $b_0$ with $b$.

When $\gamma_0$ is not a constant, $\gamma_0 = \gamma_0(r_0, \theta_0)$ an not a function of $r_0$ only or $\theta_0$ only, as neither of $$\left(\frac{\partial \gamma_0}{\partial r_0}\right)_{\theta_0} \text{nor} \left(\frac{\partial \gamma_0}{\partial \theta_0}\right)_{r_0}$$

are zero.

As $\gamma_0$ determines the directions of the reflections from the defined mirror, it is as important in those cases where $\gamma_0$ is not a constant to have a useable specifications for $\gamma_0$ as a useable specification for the defined mirror.

If $\gamma_0$ is specified in terms of a differentiable function (other than a constant) then expressions for $$\left(\frac{\partial \gamma_0}{\partial r_0}\right)_{\theta_0} \text{and} \left(\frac{\partial \gamma_0}{\partial \theta_0}\right)_{r_0}$$

may be found.

If either of $\sin(\gamma_0 - \theta_0)$ or $\cos(\gamma_0 - \theta_0)$ are specified then an expression for $\gamma_0$ may generally be found. If the defined mirror is specified then an expression for $\gamma_0$ may also generally be found. If, as a result of any of these specifications, $\gamma_0$ is known in terms of a differentiable function (other than a constant) then expressions for $$\left(\frac{\partial \gamma_0}{\partial r_0}\right)_{\theta_0} \text{and} \left(\frac{\partial \gamma_0}{\partial \theta_0}\right)_{r_0}$$

may be found.

If both $$\left(\frac{\partial \gamma_0}{\partial r_0}\right)_{\theta_0} \text{and} \left(\frac{\partial \gamma_0}{\partial \theta_0}\right)_{r_0}$$

are chosen and $$\left(\frac{\partial \gamma_0}{\partial r_0}\right)_{\theta_0} dr_0 + \left(\frac{\partial \gamma_0}{\partial \theta_0}\right)_{r_0} d\theta_0$$

is an exact differential then $d\gamma_0$ will exist; in which case an expression for $\gamma_0$ may, or may not, be found except for a constant of integration.

But the expressions for $\gamma_0$, $$\left(\frac{\partial \gamma_0}{\partial r_0}\right)_{\theta_0} \text{and} \left(\frac{\partial \gamma_0}{\partial \theta_0}\right)_{r_0}$$

may not satisfy said condition for an exact differential for the differential equation (even if the defined mirror has been specified and is continuous: because the differential equation may require an integrating factor to make it exact).

If, however, either one of $$\left(\frac{\partial \gamma_0}{\partial r_0}\right)_{\theta_0} \text{ or } \left(\frac{\partial \gamma_0}{\partial \theta_0}\right)_{r_0}$$

is specified then the other one of said partial derivatives is constrained when $\gamma_0$ is continuous by the condition for an exact differential for the differential equation, for, as it exists, $$d\gamma_0 = \left(\frac{\partial \gamma_0}{\partial r_0}\right)_{\theta_0} dr_0 + \left(\frac{\partial \gamma_0}{\partial \theta_0}\right)_{r_0} d\theta_0$$

so that $\gamma_0$ is completely determined by said partial derivatives except for a constant of integration. And said condition for an exact differential for the differential equation is automatically satisfied. Clearly, therefore, this is the preferable option.

Satisfying the condition for an exact differential for the differential equation does not ensure that it is possible to form the function whose differential is the differential equation. It is necessary to form an expression for d$\gamma$; and either rewrite the differential equation to include d$\gamma_0$ and then substitute said expression for that d$\gamma_0$ in the rewritten differential equation in the hope of integrating the result by quadrature or numerically; or to find $\gamma_0 = \gamma_0(r_0, \theta_0)$ by quadrature integration and substitute it for $\gamma_0$ in the differential equation in order to integrate said differential equation; or to find the implicit function $\gamma_0(r_0, \theta_0, \gamma_0) = 0$ by quadrature integration and use it to eliminate $\gamma_0$ from the differential equation. In both the latter cases, the differential equation may still have been rewritten to include d$\gamma_0$.

The condition that $$\left(\frac{\partial \gamma_0}{\partial r_0}\right)_{\theta_0} dr_0 + \left(\frac{\partial \gamma_0}{\partial \theta_0}\right)_{r_0} d\theta_0$$

is an exact differential, d$\gamma_0$ (and that $\gamma_0$ is continuous with respect to the pair of variables $r_0$ and $\theta_0$) is:

$$\left(\frac{\partial}{\partial \theta_0}\left(\frac{\partial \gamma_0}{\partial r_0}\right)_{\theta_0}\right)_{r_0} = \left(\frac{\partial}{\partial r_0}\left(\frac{\partial \gamma_0}{\partial \theta_0}\right)_{r_0}\right)_{\theta_0}$$

Suppose that $$\left(\frac{\partial \gamma_0}{\partial r_0}\right)_{\theta_0} \text{ is chosen}$$

$$\left(\text{so that } \left(\frac{\partial \gamma_0}{\partial \theta_0}\right)_{r_0} = r_0 \tan(\gamma_0 - \theta_0)\left(\frac{\partial \gamma_0}{\partial r_0}\right)_{\theta_0}\right).$$

If $$\left(\frac{\partial \gamma_0}{\partial r_0}\right)_{\theta_0}$$

is a (non-zero) constant or a function of $r_0$ only then $$\left(\frac{\partial}{\partial \theta_0}\left(\frac{\partial \gamma_0}{\partial r_0}\right)_{\theta_0}\right)_{r_0} = 0$$

but $$\left(\frac{\partial}{\partial r_0}\left(\frac{\partial \gamma_0}{\partial \theta_0}\right)_{r_0}\right)_{\theta_0}$$

is not. If $$\left(\frac{\partial \gamma_0}{\partial r_0}\right)_{\theta_0}$$

is a function of $\theta_0$ only then $$\left(\frac{\partial}{\partial \theta_0}\left(\frac{\partial \gamma_0}{\partial r_0}\right)_{\theta_0}\right)_{r_0}$$

is also a function of $\theta_0$ only or a constant, while $$\left(\frac{\partial}{\partial r_0}\left(\frac{\partial \gamma_0}{\partial \theta_0}\right)_{r_0}\right)_{\theta_0}$$

is a function of both $r_0$ and $\theta_0$. Thus the only possibility for fulfilling said condition is for $$\left(\frac{\partial \gamma_0}{\partial r_0}\right)_{\theta_0}$$

to be a function of both $r_0$ and $\theta_0$.

If $$\left(\frac{\partial \gamma_0}{\partial r_0}\right)_{\theta_0}$$

is chosen to be $F(r_0, \theta_0)$ a function of both $r_0$ and $\theta_0$ then:

$$\left(\frac{\partial \gamma_0}{\partial \theta_0}\right)_{r_0} = r_0 \tan(\gamma_0 - \theta_0) F(r_0, \theta_0)$$

$$\left(\frac{\partial}{\partial r_0}\left(\frac{\partial \gamma_0}{\partial \theta_0}\right)_{r_0}\right)_{\theta_0} = \tan(\gamma_0 - \theta_0) F(r_0, \theta_0) +$$

$$r_0 \sec^2(\gamma_0 - \theta_0)\left(\frac{\partial \gamma_0}{\partial r_0}\right)_{\theta_0} F(r_0, \theta_0) +$$

$$r_0 \tan(\gamma_0 - \theta_0)\left(\frac{\partial F(r_0, \theta_0)}{\partial r_0}\right)_{\theta_0}$$

and the condition for an exact differential d$\gamma_0$ becomes:

$$\tan(\gamma_0 - \theta_0) F(r_0, \theta_0) + r_0 \sec^2(\gamma_0 - \theta_0) F^2(r_0, \theta_0) +$$

$$r_0 \tan(\gamma_0 - \theta_0)\left(\frac{\partial F(r_0, \theta_0)}{\partial r_0}\right)_{\theta_0} = \left(\frac{\partial F(r_0, \theta_0)}{\partial \theta_0}\right)_{r_0}$$

As $F(r_0, \theta_0)$ is any function of $r_0$ and $\theta_0$ we could have chosen $$\left(\frac{\partial \gamma_0}{\partial \theta_0}\right)_{r_0}$$

to be $r_0 \tan(\gamma_0 - \theta_0) F(r_0, \theta_0)$ without loss of generality. So that this also covers the case where $$\left(\frac{\partial \gamma_0}{\partial \theta_0}\right)_{r_0}$$

is chosen.

If $F(r_0,\theta_0)$ contains $\gamma_0$ explicitly we may regard $F(r_0,\theta_0)$ as $F(r_0,\theta_0,\gamma_0(r_0,\theta_0))$ to obtain:

$$\left(\frac{\partial F(r_0, \theta_0)}{\partial r_0}\right)_{\theta_0} = \left(\frac{\partial F(r_0, \theta_0, \gamma_0)}{\partial r_0}\right)_{\theta_0,\gamma_0} \left(\frac{\partial r_0}{\partial r_0}\right)_{\theta_0} +$$

$$\left(\frac{\partial F(r_0, \theta_0, \gamma_0)}{\partial \theta_0}\right)_{r_0,\gamma_0} \left(\frac{\partial \theta_0}{\partial r_0}\right)_{\theta_0} +$$

$$\left(\frac{\partial F(r_0, \theta_0, \gamma_0)}{\partial \gamma_0}\right)_{r_0,\theta_0} \left(\frac{\partial \gamma_0}{\partial r_0}\right)_{\theta_0} =$$

$$\left(\frac{\partial F(r_0, \theta_0, \gamma_0)}{\partial r_0}\right)_{\theta_0,\gamma_0} + \left(\frac{\partial F(r_0, \theta_0, \gamma_0)}{\partial \gamma_0}\right)_{r_0,\theta_0} F(r_0, \theta_0)$$

$$\left(\frac{\partial F(r_0, \theta_0)}{\partial \theta_0}\right)_{r_0} = \left(\frac{\partial F(r_0, \theta_0, \gamma_0)}{\partial r_0}\right)_{\theta_0,\gamma_0} \left(\frac{\partial r_0}{\partial \theta_0}\right)_{r_0} +$$

$$\left(\frac{\partial F(r_0, \theta_0, \gamma_0)}{\partial \theta_0}\right)_{r_0,\gamma_0} \left(\frac{\partial \theta_0}{\partial \theta_0}\right)_{r_0} +$$

$$\left(\frac{\partial F(r_0, \theta_0, \gamma_0)}{\partial \gamma_0}\right)_{r_0,\theta_0} \left(\frac{\partial \gamma_0}{\partial \theta_0}\right)_{r_0} = \left(\frac{\partial F(r_0, \theta_0, \gamma_0)}{\partial \theta_0}\right)_{r_0,\gamma_0} +$$

$$\left(\frac{\partial F(r_0, \theta_0, \gamma_0)}{\partial \gamma_0}\right)_{r_0,\theta_0} r_0 \tan(\gamma_0 - \theta_0) F(r_0, \theta_0)$$

Thus the partial derivatives of $F(r_0,\theta_0,\gamma_0)$ with respect to $\gamma_0$ cancel from said condition. While if $F(r_0,\theta_0)$ does not contain $\gamma_0$ explicitly said partial derivatives do not exist anyway. Thus said condition can be rewritten as:

$$\tan(\gamma_0 - \theta_0) F(r_0, \theta_0, \gamma_0) + r_0 \sec^2(\gamma_0 - \theta_0) F^2(r_0, \theta_0, \gamma_0) +$$

$$r_0 \tan(\gamma_0 - \theta_0) \left(\frac{\partial F(r_0, \theta_0, \gamma_0)}{\partial r_0}\right)_{\theta_0,\gamma_0} = \left(\frac{\partial F(r_0, \theta_0, \gamma_0)}{\partial \theta_0}\right)_{r_0,\gamma_0}$$

or a similar condition for $F(r_0,\theta_0)$.

If $F(r_0,\theta_0,\gamma_0) = r_0^l G(\theta_0,\gamma_0)$ then the condition becomes:

$$r_0^l \tan(\gamma_0 - \theta_0) G(\theta_0, \gamma_0) + r_0^{2l+1} \sec^2(\gamma_0 - \theta_0) G^2(\theta_0, \gamma_0) +$$

$$l r_0^l \tan(\gamma_0 - \theta_0) G(\theta_0, \gamma_0) = r_0^l \left(\frac{\partial G(\theta_0, \gamma_0)}{\partial \theta_0}\right)_{r_0,\gamma_0}$$

which may only be satisfied if $l=2l+1$ and thus $l=-1$. In which case the first and third terms cancel to leave:

$$\sec^2(\gamma_0 - \theta_0) G^2(\theta_0, \gamma_0) = \left(\frac{\partial G(\theta_0, \gamma_0)}{\partial \theta_0}\right)_{r_0,\gamma_0}$$

$$\frac{\left(\frac{\partial G(\theta_0, \gamma_0)}{\partial \theta_0}\right)_{r_0,\gamma_0}}{G^2(\theta_0, \gamma_0)} = \sec^2(\gamma_0 - \theta_0)$$

$$\left(\frac{\partial}{\partial \theta_0}\left(\frac{1}{G(\theta_0, \gamma_0)}\right)\right)_{r_0,\gamma_0} = -\sec^2(\gamma_0 - \theta_0)$$

$$\frac{1}{G(\theta_0, \gamma_0)} = \tan(\gamma_0 - \theta_0) + f'(\gamma_0)$$

where $f'(\gamma_0)$ is an arbitrary function of $\gamma_0$ or a constant. It can easily be shown that $$\left(\frac{\partial}{\partial r_0}\left(\frac{\partial \gamma_0}{\partial \theta_0}\right)_{r_0}\right)_{\theta_0} = \left(\frac{\partial}{\partial \theta_0}\left(\frac{\partial \gamma_0}{\partial r_0}\right)_{\theta_0}\right)_{r_0}$$

whatever the function $f'(\gamma_0)$, so that any function $f'(\gamma_0)$ is compatible with said condition for an exact differential $d\gamma_0$.

If $f'(\gamma_0) = 0$ then $G(\theta_0, \gamma_0) =$ $\cot(\gamma_0 - \theta_0)$ so that $\left(\frac{\partial \gamma_0}{\partial r_0}\right)_{\theta_0} = \frac{1}{r_0}\cot(\gamma_0 - \theta_0)$ and thus $\left(\frac{\partial \gamma_0}{\partial \theta_0}\right)_{r_0} = r_0\tan(\gamma_0 - \theta_0) \left(\frac{\partial \gamma_0}{\partial r_0}\right)_{\theta_0} = 1$ giving:-

$$d\gamma_0 = \left(\frac{\partial \gamma_0}{\partial r_0}\right)_{\theta_0} dr_0 + \left(\frac{\partial \gamma_0}{\partial \theta_0}\right)_{r_0} d\theta_0$$

$$= \frac{\cos(\gamma_0 - \theta_0)}{\sin(\gamma_0 - \theta_0)} \frac{dr_0}{r_0} + d\theta_0$$

It is a convenient to obtain an expression for $\gamma_0$ before integrating this as an exact integral. We may rewrite it as:

$$\frac{dr_0}{r_0} = \frac{\sin(\gamma_0 - \theta_0)(d\gamma_0 - d\theta_0)}{\cos(\gamma_0 - \theta_0)}$$

$$= -\frac{d(\cos(\gamma_0 - \theta_0))}{\cos(\gamma_0 - \theta_0)}$$

Provided a natural logarithm may be complex so that its argument may be negative:

ln $r_0 = -\ln \cos(\gamma_0-\theta_0) + \ln a_0$ where $a_0$ is a constant.

$$r_0 = \frac{a_0}{\cos(\gamma_0 - \theta_0)}$$

$$\gamma_0 = \arccos\frac{a_0}{r_0} + \theta_0$$

It is now possible to integrate the expression for $d\gamma_0$ as an exact integral:

$$d\gamma_0 = \frac{\cos(\gamma_0 - \theta_0) dr_0}{r_0(1 - \cos^2(\gamma_0 - \theta_0))^{\frac{1}{2}}} + d\theta_0$$

Substituting $\cos(\gamma_0 - \theta_0) = \frac{a_0}{r_0}$:

$$d\gamma_0 = \frac{\frac{a_0 dr_0}{r_0^2}}{\left(1 - \frac{a_0^2}{r_0^2}\right)^{\frac{1}{2}}} + d\theta_0$$

$$= \frac{-d\left(\frac{a_0}{r_0}\right)}{\left(1 - \frac{a_0^2}{r_0^2}\right)^{\frac{1}{2}}} + d\theta_0$$

$$\gamma_0 = \arccos\frac{a_0}{r_0} + \theta_0$$

The constant of integration must be chosen to be zero in order to maintain consistency with the previous result.

This specification of the gradient is equally applicable to the specification of the gradient of a defining surface as may signified by replacing $\gamma_0$ with $\gamma, r_0$ with $r, \theta_0$ with $\theta$ and $a_0$ with $a$.

The differential equation may be written:

$$\sin(\gamma_0-\theta_0)dr_0 + r_0\cos(\gamma_0-\theta_0)(d\gamma_0-d\theta_0) - r_0\cos(\gamma-\theta_0)d\gamma_0 = 0$$

$$d(r_0\sin(\gamma_0-\theta_0)) - a_0 d\gamma_0 = 0$$

$$r_0\sin(\gamma_0-\theta_0) - a_0\gamma_0 = k_0$$

where $k_0$ is a constant. We thus have:

$$r_0\sin(\gamma_0-\theta_0) = a_0\gamma_0 + k_0$$

and $$r_0\cos(\gamma_0-\theta_0) = a_0$$

so that:

$$r_0^2 = a_0^2 + (a_0\gamma_0 + k_0)^2$$

and $$\tan(\gamma_0-\theta_0) = \gamma_0 + \frac{k_0}{a_0} \text{ or }$$

$$\theta_0 = \gamma_0 - \arctan\left(\gamma_0 + \frac{k_0}{a_0}\right)$$

When $$\gamma_0 = -\frac{k_0}{a_0}$$

then $r_0$ has a minimum value of $|a_0|$ and $\gamma_0-\theta_0=_\pi{}^0$. As $\gamma_0$ diverges from $-k_0/a_0$ the value of $r_0$ increases. As $\gamma_0 \to \pm\infty$ so $\gamma_0-\theta_0 \to \pm\pi/2$.

If $$\gamma_0 = -\frac{k_0}{a_0} + \epsilon$$

where $\epsilon$ is a very small angle then:

$$\theta_0 = -\frac{k_0}{a_0} + \epsilon - \arctan\epsilon$$

$$= -\frac{k_0}{a_0} + \epsilon - \left(\epsilon - \frac{\epsilon^3}{3} + \frac{\epsilon^5}{5} - \ldots\right)$$

when $\theta_0$ is approximately equal to $\gamma_0$ rather than $\gamma_0-\pi$. In which case:

$$\theta_0 \approx -\frac{k_0}{a_0} + \frac{\epsilon^3}{3}$$

so that $\theta_0$ increases and decreases with $\gamma_0$ either side of $\gamma_0=\theta_0$.

FIG. 95 shows an axially symmetric defined surface in schematic form whose gradient $\gamma_0$ is given by $x_0\cos\gamma_0+y_0\sin\gamma_0=a_0$ or $r_0\cos(\gamma_0-\theta_0)=a_0$ where $a_0$ is a constant.

If $f'(\gamma_0) \neq 0$ we have:

$$G(\theta_0, \gamma_0) = \frac{1}{\tan(\gamma_0-\theta_0) + f'(\gamma_0)}$$

-continued $$\left(\frac{\partial\gamma_0}{\partial r_0}\right)_{\theta_0} = \frac{1}{r_0}\frac{1}{\tan(\gamma_0-\theta_0) + f'(\gamma_0)}$$

$$\left(\frac{\partial\gamma_0}{\partial\theta_0}\right)_{r_0} = \frac{\tan(\gamma_0-\theta_0)}{\tan(\gamma_0-\theta_0) + f'(\gamma_0)}$$

$$d\gamma_0 = \frac{dr_0 + r_0\tan(\gamma_0-\theta_0)d\theta_0}{r_0(\tan(\gamma_0-\theta_0) + f'(\gamma_0))}$$

$$(\tan(\gamma_0-\theta_0) + f'(\gamma_0))d\gamma_0 = \frac{dr_0 + r_0\tan(\gamma_0-\theta_0)d\theta_0}{r_0}$$

$$f'(\gamma_0)d\gamma_0 = \frac{\cos(\gamma_0-\theta_0)dr_0 - r_0\sin(\gamma_0-\theta_0)d\gamma_0 + r_0\sin(\gamma_0-\theta_0)d\theta_0}{r_0\cos(\gamma_0-\theta_0)}$$

$$= \frac{d(r_0\cos(\gamma_0-\theta_0))}{r_0\cos(\gamma_0-\theta_0)}$$

Provided a natural logarithm may be complex so that its argument may be negative:

$$\ln r_0\cos(\gamma_0-\theta_0) = f(\gamma_0) + \ln a_0$$

where $a_0$ is a constant and $f'(\gamma_0)$ is the first derivative of $f(\gamma_0)$. Hence:

$$r_0\cos(\gamma_0-\theta_0) = a_0 e^{f(\gamma_0)}$$

While the differential equation may be written:

$$d(r_0\sin(\gamma_0-\theta_0)) - r_0\cos(\gamma_0-\theta_0)d\gamma_0 = 0$$

$$d)r_0\sin(\gamma_0-\theta_0)) - a_0 e^{f(\gamma_0)}d\gamma_0 = 0$$

The second term many immediately be integrated if $f(\gamma_0)=b_0+c_0\gamma_0$. Moreover, as $e^{f(\gamma_0)}$ may be expanded as a power series, $a_0 e^{f(\gamma_0)}d\gamma_0$ may be integrated for a wide range of functions $f(\gamma_0)$. The resulting solutions of the differential equation may, of course, be converted to cartesian form.

Substituting $$r_0 = \tan(\gamma_0-\theta_0)\frac{dr_0}{d\theta_0}$$

by virtue of the differential equation in said condition for the exactness of the differential equation gives:

$$\cos^2(\gamma_0-\theta_0)\left(\frac{\partial\gamma_0}{\partial\theta_0}\right)_{r_0}d\theta_0 = \sin^2(\gamma_0-\theta_0)\left(\frac{\partial\gamma_0}{\partial r_0}\right)_{\theta_0}dr_0$$

$$\left(\frac{\partial\gamma_0}{\partial r_0}\right)_{\theta_0}dr_0 + \left(\frac{\partial\gamma_0}{\partial\theta_0}\right)_{r_0}d\theta_0 = \csc^2(\gamma_0-\theta_0)\left(\frac{\partial\gamma_0}{\partial\theta_0}\right)_{r_0}d\theta_0$$

If $\left(\frac{\partial\gamma_0}{\partial r_0}\right)_{\theta_0}dr_0 + \left(\frac{\partial\gamma_0}{\partial\theta_0}\right)_{r_0}d\theta_0$ is an exact differential, $d\gamma_0$, then:-

$$d\gamma_0 = \csc^2(\gamma_0-\theta_0)\left(\frac{\partial\gamma_0}{\partial\theta_0}\right)_{r_0}d\theta_0$$

As neither of $$\left(\frac{\partial\gamma_0}{\partial r_0}\right)_{\theta_0} \text{ nor } \left(\frac{\partial\gamma_0}{\partial\theta_0}\right)_{r_0}$$

are zero, $\gamma_0=\gamma_0(r_0,\theta_0)$. As the relation between $r_0$ and $\theta_0$ is not known at this stage, it is not possible to make $\gamma_0$ a function of $\theta_0$ only, namely $\gamma_0=\gamma_0(r_0(\theta_0),\theta_0)$, so that this further condition for the exactness of the differential equation cannot be integrated by quadrature at this stage while it includes $\gamma_0$. Equally, $\gamma_0(r_0,\theta_0)$ cannot be evaluated for a particular value of $\theta_0$. Thus this further condition for the exactness of the differential equation cannot be integrated numerically at this stage while it includes $\gamma_0$ either. As $$\left(\frac{\partial \gamma_0}{\partial r_0}\right)_{\theta_0} dr_0 + \left(\frac{\partial \gamma_0}{\partial \theta_0}\right)_{r_0} d\theta_0$$

must still be an exact differential for any choice of $$\left(\frac{\partial \gamma_0}{\partial \theta_0}\right)_{r_0}$$

intended to facilitate such an integration by removing $\gamma_0$, no such choice can produce any result other than one found using said condition for its exactness.

Alternatively, we may write:

$$\left(\frac{\partial \gamma_0}{\partial r_0}\right)_{\theta_0} dr_0 + \left(\frac{\partial \gamma_0}{\partial \theta_0}\right)_{r_0} d\theta_0 = \sec^2(\gamma_0 - \theta_0)\left(\frac{\partial \gamma_0}{\partial r_0}\right)_{\theta_0} dr_0$$

If $$\left(\frac{\partial \gamma_0}{\partial r_0}\right)_{\theta_0} dr_0 + \left(\frac{\partial \gamma_0}{\partial \theta_0}\right)_{r_0} d\theta_0$$

is an exact differential, $d\gamma_0$, then:

$$d\gamma_0 = \sec^2(\gamma_0 - \theta_0)\left(\frac{\partial \gamma_0}{\partial r_0}\right)_{\theta_0} dr_0$$

which further condition for the exactness of the differential equation similarly may not be integrated by quadrature or numerically at this stage while it includes $\gamma_0$. As the expression $$\left(\frac{\partial \gamma_0}{\partial r_0}\right)_{\theta_0} dr_0 + \left(\frac{\partial \gamma_0}{\partial \theta_0}\right)_{r_0} d\theta_0$$

must still be an exact differential for any choice of $$\left(\frac{\partial \gamma_0}{\partial r_0}\right)_{\theta_0}$$

intended to facilitate such an integration by removing $\gamma_0$, no such choice can produce any result other than one found using said condition for its exactness.

6.21.6 Integrating factor for the polar form

A differential equation may be made exact by multiplying it by a suitable integrating factor. As before, if the gradient of the defined mirror is denoted by $\gamma_0$ then its differential equation can be written:

$$\sin(\gamma_0-\theta_0)dr_0 - r_0 \cos(\gamma_0-\theta_0)\, d\delta_0 = 0$$

Again, this may better be regarded as a family of differential equations for $r_0, \theta_0$ having one member for each specification of $\gamma_0$.

Since $\gamma_0$ can be regarded as a function of $r_0, \theta_0$ because of this differential equation there is no need for the integrating factor to include $\gamma_0$ explicitly. Applying the integrating factor $T(r_0,\theta_0)$ gives:

$$T(r_0,\theta_0)\sin(\gamma_0-\theta_0)dr_0 - T(r_0,\theta_0)r_0 \cos(\gamma_0-\theta_0)d\theta_0=0$$

Provided neither of $\sin(\gamma_0-\theta_0)$ nor $r_0 \cos(\gamma_0-\theta_0)$ is zero, the condition for an exact differential is:

$$\left(\frac{\partial(T(r_0,\theta_0)\sin(\gamma_0-\theta_0))}{\partial \theta_0}\right)_{r_0} = \left(\frac{\partial(-T(r_0,\theta_0)r_0\cos(\gamma_0-\theta_0))}{\partial r_0}\right)_{\theta_0}$$

$$T(r_0,\theta_0)\cos(\gamma_0-\theta_0)\left(\left(\frac{\partial \gamma_0}{\partial \theta_0}\right)_{r_0} - 1\right) +$$

$$\sin(\gamma_0-\theta_0)\left(\frac{\partial T(r_0,\theta_0)}{\partial \theta_0}\right)_{r_0} = -T(r_0,\theta_0)\cos(\gamma_0-\theta_0) +$$

$$T(r_0,\theta_0)\left(r_0\sin(\gamma_0-\theta_0)\left(\frac{\partial \gamma_0}{\partial r_0}\right)_{\theta_0} - \right.$$

$$r_0\cos(\gamma_0-\theta_0)\left(\frac{\partial T(r_0,\theta_0)}{\partial r_0}\right)_{\theta_0}$$

But $$\cos(\gamma_0-\theta_0) = \frac{1}{d\theta_0}\frac{dr_0}{r_0}\sin(\gamma_0-\theta_0)$$

by virtue of the differential equation; so that:

$$\left(\frac{\partial T(r_0,\theta_0)}{\partial r_0}\right)_{\theta_0} dr_0 + \left(\frac{\partial T(r_0,\theta_0)}{\partial \theta_0}\right)_{r_0} d\theta_0 =$$

$$T(r_0,\theta_0)r_0\left(\frac{\partial \gamma_0}{\partial r_0}\right)_{\theta_0} d\theta_0 - T(r_0,\theta_0)\frac{dr_0}{r_0}\left(\frac{\partial \gamma_0}{\partial \theta_0}\right)_{r_0}$$

$$\frac{dT(r_0,\theta_0)}{T(r_0,\theta_0)} = \left(\frac{\partial \gamma_0}{\partial r_0}\right)_{\theta_0} r_0 d\theta_0 - \left(\frac{\partial \gamma_0}{\partial \theta_0}\right)_{r_0} \frac{dr_0}{r_0}$$

Clearly $$\left(\frac{\partial \gamma_0}{\partial r_0}\right)_{\theta_0} \text{ and } \left(\frac{\partial \gamma_0}{\partial \theta_0}\right)_{r_0}$$

may not both be zero in this or any similar expression for $dT(r_0,\theta_0)/T(r_0,\theta_0)$, as that would make $T(r_0,\theta_0)$ a constant and require the differential equation to be exact prior to the application of the integrating factor.

Now $$\left(\frac{\partial \gamma_0}{\partial r_0}\right)_{\theta_0} \text{ and } \left(\frac{\partial \gamma_0}{\partial \theta_0}\right)_{r_0}$$

may be chosen independently of each other and $T(r_0,\theta_0)$ and $\gamma_0(r_0,\theta_0)$ obtained therefrom provided the expression for $dT(r_0,\theta_0)/T(r_0,\theta_0)$ and the expression $$\left(\frac{\partial \gamma_0}{\partial r_0}\right)_{\theta_0} dr_0 + \left(\frac{\partial \gamma_0}{\partial \theta_0}\right)_{r_0} d\theta_0$$

are integrable somehow. However, it is convenient to impose the conditions that these expressions are exact differentials. Such conditions are by no means restrictive as they allow all the various factors of $dr_0$ and $d\theta_0$, namely $$\left(\frac{\partial \gamma_0}{\partial r_0}\right)_{\theta_0} r_0, \left(\frac{\partial \gamma_0}{\partial \theta_0}\right)_{r_0}\frac{1}{r_0}, \left(\frac{\partial \gamma_0}{\partial r_0}\right)_{\theta_0} \text{ and } \left(\frac{\partial \gamma_0}{\partial \theta_0}\right)_{r_0},$$

to be functions of both $r_0$ and $\theta_0$ without preventing the integration of said expressions (even though the relation, if any, between $r_0$ and $\theta_0$ is as yet unknown).

The expression for $dT(r_0,\theta_0)/T(r_0,\theta_0)$ is an exact differential if:

$$\left(\frac{\partial}{\partial\theta_0}\left(-\frac{1}{r_0}\left(\frac{\partial\gamma_0}{\partial\theta_0}\right)_{r_0}\right)\right)_{r_0} = \left(\frac{\partial}{\partial r_0}\left(r_0\left(\frac{\partial\gamma_0}{\partial r_0}\right)_{\theta_0}\right)\right)_{\theta_0}$$

or $$-\frac{1}{r_0}\left(\frac{\partial}{\partial\theta_0}\left(\frac{\partial\gamma_0}{\partial\theta_0}\right)_{r_0}\right)_{r_0} = \left(\frac{\partial\gamma_0}{\partial r_0}\right)_{\theta_0} + r_0\left(\frac{\partial}{\partial r_0}\left(\frac{\partial\gamma_0}{\partial r_0}\right)_{\theta_0}\right)_{\theta_0}$$

While $$\left(\frac{\partial\gamma_0}{\partial r_0}\right)_{\theta_0} dr_0 + \left(\frac{\partial\gamma_0}{\partial\theta_0}\right)_{r_0} d\theta_0$$

is an exact differential, $d\gamma_0$, if:

$$\left(\frac{\partial}{\partial\theta_0}\left(\frac{\partial\gamma_0}{\partial r_0}\right)_{\theta_0}\right)_{r_0} = \left(\frac{\partial}{\partial r_0}\left(\frac{\partial\gamma_0}{\partial\theta_0}\right)_{r_0}\right)_{\theta_0}$$

In order to find solutions similar to those for the cartesian form of the differential equation, let:

$$\left(\frac{\partial\gamma_0}{\partial r_0}\right)_{\theta_0} = \Re\left(\sum_{j=0}^{\infty} a_j r_0^{l_j} e^{j\theta_0 i}\right) \text{ and}$$

$$\left(\frac{\partial\gamma_0}{\partial\theta_0}\right)_{r_0} = \Re\left(\sum_{j=0}^{\infty} b_j r_0^{m_j} e^{j\theta_0 i}\right)$$

where $l_j$ and $m_j$ are real constants and probably positive or negative integers, each $a_j$ and $b_j$ is a complex constant and any $a_j$ or $b_j$ may be zero. So that:

$$\left(\frac{\partial}{\partial r_0}\left(\frac{\partial\gamma_0}{\partial r_0}\right)_{\theta_0}\right)_{\theta_0} = \Re\left(\sum_{j=0}^{\infty} a_j l_j r_0^{l_j-1} e^{j\theta_0 i}\right)$$

$$\left(\frac{\partial}{\partial\theta_0}\left(\frac{\partial\gamma_0}{\partial\theta_0}\right)_{r_0}\right)_{r_0} = \Re\left(\sum_{j=0}^{\infty} -j b_j r_0^{m_j} e^{j\theta_0 i}\right)$$

$$\left(\frac{\partial}{\partial\theta_0}\left(\frac{\partial\gamma_0}{\partial r_0}\right)_{\theta_0}\right)_{r_0} = \Re\left(\sum_{j=0}^{\infty} j a_j r_0^{l_j} e^{j\theta_0 i}\right)$$

$$\left(\frac{\partial}{\partial r_0}\left(\frac{\partial\gamma_0}{\partial\theta_0}\right)_{r_0}\right)_{\theta_0} = \Re\left(\sum_{j=0}^{\infty} b_j m_j r_0^{m_j-1} e^{j\theta_0 i}\right)$$

The first condition becomes:

$$-\frac{1}{r_0}\Re\left(\sum_{j=0}^{\infty} -j b_j r_0^{m_j} e^{j\theta_0 i}\right) =$$

$$\Re\left(\sum_{j=0}^{\infty} a_j r_0^{l_j} e^{j\theta_0 i}\right) + r_0 \Re\left(\sum_{j=0}^{\infty} a_j l_j r_0^{l_j} e^{j\theta_0 i}\right)$$

$$\Re\left(\sum_{j=0}^{\infty} j b_j r_0^{m_j-1} e^{j\theta_0 i}\right) = \Re\left(\sum_{j=0}^{\infty} a_j (l_j + 1) r_0^{l_j} e^{j\theta_0 i}\right)$$

This may only ne satisfied if $m_j-1=l_j$ and $jb_j=a_j(l_j+1)=a_j m_j$. The second condition becomes:

$$\Re\left(\sum_{j=0}^{\infty} j a_j r_0^{l_j} e^{j\theta_0 i}\right) = \Re\left(\sum_{j=0}^{\infty} b_j m_j r_0^{m_j-1} e^{j\theta_0 i}\right)$$

This may only be satisfied if $l_j=m_j-1$ (as before) and $ja_j=b_j m_j$. Hence either $a_j=b_j=0$ or:

$$j = \frac{b_j m_j}{a_j} = \frac{a_j m_j}{b_j}$$

$$b_j^2 = a_j^2$$

Thus either $b_j=a_j$ and $m_j=j$ or $b_j=-a_j$ and $-m_j=j$. But as $j>0$ so $m_j=j$ if $m_j>0$ while $-m_j=j$ if $m_j<0$.

Clearly it is convenient to represent said partial derivatives by an ascending power series for which $m_j=j$ and $b_j=a_j$ for all j and adopt a measurement scale for $r_0$ for which all the power series in any solution converge. Thus:

$$\left(\frac{\partial\gamma_0}{\partial r_0}\right)_{\theta_0} = \Re\left(\sum_{j=0}^{\infty} a_j r_0^{j-1} e^{j\theta_0 i}\right) \text{ and } \left(\frac{\partial\gamma_0}{\partial\theta_0}\right)_{r_0} = \Re\left(\sum_{j=0}^{\infty} a_j r_0^{j} e^{j\theta_0 i}\right)$$

The first terms in these series are $a_0/r_0 \Re$ and $-a_0 \Re$ respectively while $a_j \Re$ and $a_j^*$ for $j>0$ appear in both said partial derivatives; so that said partial derivatives are independent of but related to each other as are their cartesian counterparts $F(x,y)$ and $G(x,y)$. It should be mentioned that each of these partial derivatives is a transformed harmonic function. It follows from said partial derivatives that:

$$d\gamma_0(r_0,\theta_0) = \Re\left(\sum_{j=0}^{\infty} a_j r_0^{j-1} e^{j\theta_0 i}\right) dr_0 + \Re\left(\sum_{j=0}^{\infty} a_j r_0^{j} e^{j\theta_0 i}\right) d\theta_0$$

$$= \left(\frac{a_0*}{r_0} + \Re\left(\sum_{j=1}^{\infty} a_j r_0^{j-1} e^{j\theta_0 i}\right)\right) dr_0 +$$

$$\left(-a_0^\Im + \Re\left(\sum_{j=1}^{\infty} a_j r_0^{j} e^{j\theta_0 i}\right)\right) d\theta_0$$

$$\gamma_0(r_0,\theta_0) = a_0* \ln r_0 - a_0^\Im \theta_0 + b_0 + \Re\left(\sum_{j=1}^{\infty} \frac{a_j}{j} r_0^{j} e^{j\theta_0 i}\right)$$

where $b_0$ is a real constant.

This specification is equally applicable to the specification of the gradient of a defining surface as may be signified by replacing $\gamma_0$ with $\gamma$, $r_0$ with $r$, $\theta_0$ with $\theta$ and $b_0$ with b.

It should be noted that $\gamma_0(r_0,\theta_0)$ is only equal to $\gamma_0(x_0, y_0)$ if $a_0$ in $\gamma_0(r_0,\theta_0)$ is zero and $a_j$ in $\gamma_0(r_0,\theta_0)$ is equal to $a_j-1$ in $\gamma_0(x_0,y_0)$ for $j>0$.

$$\frac{dT(r_0,\theta_0)}{T(r_0,\theta_0)} = r_0 \Re\left(\sum_{j=0}^{\infty} a_j r_0^{j-1} e^{j\theta_0 i}\right) d\theta_0 - \frac{1}{r_0}\Re\left(\sum_{j=0}^{\infty} a_j r_0^{j} e^{j\theta_0 i}\right) dr_0$$

$$= \Re\left(\sum_{j=0}^{\infty} a_j r_0^{j} e^{j\theta_0 i}\right) d\theta_0 - \Re\left(\sum_{j=0}^{\infty} a_j r_0^{j-1} e^{j\theta_0 i}\right) dr_0$$

$$= \left(a_0* + \Re\left(\sum_{j=1}^{\infty} a_j r_0^{j} e^{j\theta_0 i}\right)\right) d\theta_0 -$$

$$\left(-\frac{a_0^\Im}{r_0} + \Re\left(\sum_{j=1}^{\infty} a_j r_0^{j-1} e^{j\theta_0 i}\right)\right) dr_0$$

Provided a natural logarithm may be complex so that its argument may be negative:

ln $$\ln T(r_0,\theta_0) = a_0^\Re \theta_0 + a_0^\Im \ln r_0 + \ln c - \Re\left(\sum_{j=1}^{\infty} \frac{a_j}{j} r_0^{j} e^{j\theta_0 i}\right)$$

where c is a constant.

$$T(r_0, \theta_0) = cr_0^{a_0^{\Im}} e^{a_0^{\Re} \theta_0 - \Re\left(\sum_{j=1}^{\infty} \frac{a_j}{j} r_0^j e^{j\theta_0 i}\right)}$$

Moreover, the expressions for $d\gamma_0$ and $dr(r_0,\theta_0)/T(r_0,\theta_0)$ may be rewritten as:

$$d\gamma_0 - d\theta_0 = \left(\frac{\partial \gamma_0}{\partial r_0}\right)_{\theta_0} dr_0 + \left(\left(\frac{\partial \gamma_0}{\partial \theta_0}\right)_{r_0} - 1\right) d\theta_0$$

$$d(\ln T(r_0, \theta_0)) = \left(\frac{\partial \gamma_0}{\partial r_0}\right)_{\theta_0} r_0 d\theta_0 - \left(\left(\frac{\partial \gamma_0}{\partial \theta_0}\right)_{r_0} - 1\right) \frac{dr_0}{r_0} - \frac{dr_0}{r_0}$$

so that:

$$dr_0 = \frac{d\gamma_0 - d\theta_0 - \left(\left(\frac{\partial \gamma_0}{\partial \theta_0}\right)_{r_0} - 1\right) d\theta_0}{\left(\frac{\partial \gamma_0}{\partial r_0}\right)_{\theta_0}} =$$

$$\frac{\left(\frac{\partial \gamma_0}{\partial r_0}\right)_{\theta_0} r_0 d\theta_0 - d(\ln T(r_0, \theta_0)) - \frac{dr_0}{r_0}}{\frac{1}{r_0}\left(\left(\frac{\partial \gamma_0}{\partial \theta_0}\right)_{r_0} - 1\right)}$$

$$\frac{1}{r_0}\left(\left(\frac{\partial \gamma_0}{\partial \theta_0}\right)_{r_0} - 1\right)(d\gamma_0 - d\theta_0) - \frac{1}{r_0}\left(\left(\frac{\partial \gamma_0}{\partial \theta_0}\right)_{r_0} - 1\right)^2 d\theta_0 =$$

$$\left(\frac{\partial \gamma_0}{\partial r_0}\right)_{\theta_0}^2 r_0 d\theta_0 - \left(\frac{\partial \gamma_0}{\partial r_0}\right)_{\theta_0} d(\ln T(r_0, \theta_0)) - \frac{1}{r_0}\left(\frac{\partial \gamma_0}{\partial r_0}\right)_{\theta_0} dr_0$$

$$d\theta_0 = \frac{\left(\left(\frac{\partial \gamma_0}{\partial r_0}\right)_{r_0} - 1\right) d(\gamma_0 - \theta_0) + r_0 \left(\frac{\partial \gamma_0}{\partial r_0}\right)_{\theta_0} d(\ln T(r_0, \theta_0)) + \left(\frac{\partial \gamma_0}{\partial r_0}\right)_{\theta_0} dr_0}{\left(1 - \left(\frac{\partial \gamma_0}{\partial \theta_0}\right)_{r_0}\right)^2 + r_0^2 \left(\frac{\partial \gamma_0}{\partial r_0}\right)_{\theta_0}^2}$$

provided $\left(1 - \left(\frac{\partial \gamma_0}{\partial \theta_0}\right)_{r_0}\right)^2 + r_0^2 \left(\frac{\partial \gamma_0}{\partial r_0}\right)_{\theta_0}^2 \neq 0$; and:

$$d\theta_0 = \frac{d\gamma_0 - d\theta_0 - \left(\frac{\partial \gamma_0}{\partial r_0}\right)_{\theta_0} dr_0}{\left(\frac{\partial \gamma_0}{\partial \theta_0}\right)_{r_0} - 1} =$$

$$\frac{T(r_0, \theta_0)\sin(\gamma_0 - \theta_0)}{\left(1 - \left(\frac{\partial \gamma_0}{\partial \theta_0}\right)_{r_0}\right)^2 + r_0^2 \left(\frac{\partial \gamma_0}{\partial r_0}\right)_{\theta_0}^2}$$

$$r_0^2 \left(\frac{\partial \gamma_0}{\partial r_0}\right)_{\theta_0} d(\gamma_0 - \theta_0) - r_0 \left(\left(\frac{\partial \gamma_0}{\partial \theta_0}\right)_{r_0} - 1\right) d(\ln T(r_0, \theta_0)) - \left(\left(\frac{\partial \gamma_0}{\partial \theta_0}\right)_{r_0} - 1\right) dr_0$$

$$-T(r_0, \theta_0) r_0 \cos(\gamma_0 - \theta_0)$$

-continued $$\frac{\frac{1}{r_0}\left(\left(\frac{\partial \gamma_0}{\partial \theta_0}\right)_{r_0} - 1\right) dr_0 + d(\ln T(r_0, \theta_0)) + \frac{dr_0}{r_0}}{r_0 \left(\frac{\partial \gamma_0}{\partial r_0}\right)_{\theta_0}}$$

$$r_0 \left(\frac{\partial \gamma_0}{\partial r_0}\right)_{\theta_0} (d\gamma_0 - d\theta_0) -$$

$$r_0 \left(\frac{\partial \gamma_0}{\partial r_0}\right)_{\theta_0}^2 dr_0 = \frac{1}{r_0}\left(\left(\frac{\partial \gamma_0}{\partial \theta_0}\right)_{r_0} - 1\right)^2 dr_0 +$$

$$\left(\left(\frac{\partial \gamma_0}{\partial \theta_0}\right)_{r_0} - 1\right) d(\ln T(r_0, \theta_0)) + \left(\left(\frac{\partial \gamma_0}{\partial \theta_0}\right)_{r_0} - 1\right) \frac{dr_0}{r_0}$$

$$r_0^2 \left(\frac{\partial \gamma_0}{\partial r_0}\right)_{\theta_0} d(\gamma_0 - \theta_0) -$$

$$dr_0 = \frac{r_0 \left(\left(\frac{\partial \gamma_0}{\partial \theta_0}\right)_{r_0} - 1\right) d(\ln T(r_0, \theta_0)) - \left(\left(\frac{\partial \gamma_0}{\partial \theta_0}\right)_{r_0} - 1\right) dr_0}{\left(1 - \left(\frac{\partial \gamma_0}{\partial \theta_0}\right)_{r_0}\right)^2 + r_0^2 \left(\frac{\partial \gamma_0}{\partial r_0}\right)_{\theta_0}^2}$$

provided $\left(1 - \left(\frac{\partial \gamma_0}{\partial \theta_0}\right)_{r_0}\right)^2 + r_0^2 \left(\frac{\partial \gamma_0}{\partial r_0}\right)_{\theta_0}^2 \neq 0$.

So that if the differentials $dr_0$ and $d\theta_0$ are replaced by these expressions involving $d(\gamma_0-\theta_0)$, $d(\ln T(r_0,\theta_0))$ and $dr_0$ the differential equation after the application of the integrating factor becomes:

-continued
$$\frac{\left(\left(\left(\frac{\partial\gamma_0}{\partial\theta_0}\right)_{r_0}-1\right)d(\gamma_0-\theta_0)+r_0\left(\frac{\partial\gamma_0}{\partial r_0}\right)_{\theta_0}d(\ln T(r_0,\theta_0))+\left(\frac{\partial\gamma_0}{\partial r_0}\right)_{\theta_0}dr_0\right)}{\left(1-\left(\frac{\partial\gamma_0}{\partial\theta_0}\right)_{r_0}\right)^2+r_0^2\left(\times\frac{\partial\gamma_0}{\partial r_0}\right)_{\theta_0}^2}=0$$

$$T(r_0,\theta_0)\left(\left(\left(1-\left(\frac{\partial\gamma_0}{\partial\theta_0}\right)_{r_0}\right)r_0\cos(\gamma_0-\theta_0)+r_0\left(\frac{\partial\gamma_0}{\partial r_0}\right)_{\theta_0}r_0\sin(\gamma_0-\theta_0)\right)d(\gamma_0-\theta_0)+\right.$$

$$\left(\left(1-\left(\frac{\partial\gamma_0}{\partial\theta_0}\right)_{r_0}\right)r_0\sin(\gamma_0-\theta_0)-r_0\left(\frac{\partial\gamma_0}{\partial r_0}\right)_{\theta_0}r_0\cos(\gamma_0-\theta_0)\right)d(\ln T(r_0,\theta_0))+$$

$$\left.\left(\left(1-\left(\frac{\partial\gamma_0}{\partial\theta_0}\right)_{r_0}\right)\sin(\gamma_0-\theta_0)-r_0\left(\frac{\partial\gamma_0}{\partial r_0}\right)_{\theta_0}\cos(\gamma_0-\theta_0)\right)dr_0\right)$$
$$\overline{\left(1-\left(\frac{\partial\gamma_0}{\partial\theta_0}\right)_{r_0}\right)^2+r_0^2\left(\frac{\partial\gamma_0}{\partial r_0}\right)_{\theta_0}^2}=0$$

If $r_0$ $$\left(\frac{\partial\gamma_0}{\partial r_0}\right)_{\theta_0} \text{ and } \left(\frac{\partial\gamma_0}{\partial\theta_0}\right)_{r_0}$$

are both constants, and thus $a_0\Re$ and $-a_0^\ast$ respectively, the differential equation after the application of the integrating factor may be integrated by quadrature to give:

$$e^{\ln T(r_0,\theta_0)}\left(\frac{\left(1-\left(\frac{\partial\gamma_0}{\partial\theta_0}\right)_{r_0}\right)r_0\sin(\gamma_0-\theta_0)-}{r_0\left(\frac{\partial\gamma_0}{\partial r_0}\right)_{\theta_0}r_0\cos(\gamma_0-\theta_0)}\right)=k_0 \text{ or}$$
$$\overline{\left(1-\left(\frac{\partial\gamma_0}{\partial\theta_0}\right)_{r_0}\right)^2+r_0^2\left(\frac{\partial\gamma_0}{\partial r_0}\right)_{\theta_0}^2}$$

$$e^{\ln T(r_0,\theta_0)}\left(\frac{1+a_0^3}{(1+a_0^\ast)^2(a_0^\Re)^2}r_0\sin(\gamma_0-\theta_0)-\frac{a_0^\Re}{(1+a_0^\ast)^2+(a_0^\Re)^2}r_0\cos(\gamma_0-\theta_0)\right)=k_0$$

where $k_0$ is a constant and $$\gamma_0(r_0,\theta_0)=a_0\Re\ln r_0 - a_0^\ast\theta_0+b_0$$

and $$T(r_0,\theta_0)=cr_0^{a_0^\ast}e^{a_0\Re\theta_0}$$

Any function for $$\left(\frac{\partial\gamma_0}{\partial\theta_0}\right)_{r_0}$$

may be represented by different values of $$\left(\frac{\partial\gamma_0}{\partial\theta_0}\right)_{r_0}$$

at different points on the defined mirror. In which case $$\left(\frac{\partial\gamma_0}{\partial\theta_0}\right)_{r_0}$$

is "locally" constant but "globally" variable. Similarly for $$\left(\frac{\partial\gamma_0}{\partial r_0}\right)_{\theta_0}.$$

The constant factor in an integrating factor may have any value (other than zero). If c is chosen to be $(1+a_0^\ast)^2+(a_0\Re)^2$ where $a_0^\ast \neq -1$ if $a_0\Re=0$ then said solution may be written:

$$e^{a_0^\Re\theta_0}((1+a_0^3)\sin(\gamma_0-\theta_0)-a_0^\Re\cos(\gamma_0-\theta_0))r_0^{1+a_0^3}=k_0$$

or $$r_0=(k_0^{-1}e^{\alpha_0^\Re\theta_0}((1+\alpha_0^3)\sin(\gamma_0-\theta_0)-\alpha_0^\Re\cos(\gamma_0-\theta_0)))^{\frac{-1}{1+\alpha_0^3}}$$

provided $k_0 \neq 0$

This solution has the form $r_0=r_0(\theta_0,\gamma_0)$ while $\gamma_0=a_0\Re\ln r_0-a_0^\ast\theta_0+b_0$ has the form $\gamma_0=\gamma_0(r_0,\theta_0)$; so that this solution can be put in the form $r_0=r_0(\theta_0,\gamma_0(r_0,\theta_0))$. But the expressions for $r_0$ and $\gamma_0$ are not sufficiently simple for this solution to be put in the form $r_0=r_0(\theta_0)$. Both $r_0$ and $\theta_0$ are functions of $\theta_1,\theta_2,2\gamma_1-\beta_1,2\gamma_2-\beta_2,r_1,r_2$.

However, if $\gamma_0$ is defined only in terms of a constant value for $$\left(\frac{\partial\gamma_0}{\partial\theta_0}\right)_{r_0}\left(\text{so that }\left(\frac{\partial\gamma_0}{\partial r_0}\right)_{\theta_0}\text{ and }\alpha_0^\Re\text{ are zero}\right)$$

then $\gamma_0=-a_0^\ast\theta_0+b_0$, where $b_0$ is a constant. And:

$$r_0=(k_0^{-1}(1+\alpha_0^3)\sin(b_0-(1+\alpha_0^3)\theta_0))^{\frac{-1}{1+\alpha_0^3}}$$

This solution has the form $r_0=r_0(\theta_0)$ while $\gamma_0=-a_0^\ast\theta_0+b_0$ has the form $\gamma_0=\gamma_0(\theta_0)$. Both $r_0$ and $\theta_0$ are functions of $\theta_1,\theta_2,2\gamma_1-\beta_1,2\gamma_2-\beta_2,r_1,r_2$. If $a_0^\ast=-3, b_0=\pm\pi/2$ and $k_0$ is respectively negative or positive then this solution is the lemniscate $r_0^2 = \mp 2k_0^{-1} \cos 2\theta_0$.

If $$\left(\frac{\partial \gamma_0}{\partial \theta_0}\right)_{r_0} = 0$$

so that $a_0^* = 0$ then this solution becomes $$\sin(b_0 - \theta_0) = \frac{k_0}{r_0}.$$

Equally, provided $k_0 \neq 0$ said solution may be rewritten as:

$$r_0 = (k_0^{-1} e^{\alpha_0^* \theta_0} ((1 + \alpha_0^{\Re}) r_0 \sin(\gamma_0 - \theta_0) - \alpha_0^* r_0 \cos(\gamma_0 - \theta_0)))^{\frac{-1}{\alpha_0^{\Re}}}$$

This solution has the more complicated form $r_0 = r_0(r_0, \theta_0, \gamma_0)$ but both $r_0 \sin(\gamma_0 - \theta_0)$ and $r_0 \cos(\gamma_0 - \theta_0)$ are relatively simple functions of $\theta_1, \theta_2, 2\gamma_1 - \beta_1, 2\gamma_2 - \beta_2, r_1, r_2$ and $\gamma_0$.

If $$\left(\frac{\partial \gamma_0}{\partial r_0}\right)_{\theta_0}$$

and thus $a_0 \Re$ are zero then $\gamma_0 = -a_0^* \theta_0 + b_0$ and this solution becomes the further solution:

$$r_0 = (k_0^{-1}(1 + \alpha_0^{\Re}) r_0 \sin(\gamma_0 - \theta_0))^{\frac{-1}{\alpha_0^{\Re}}}$$

$$= \left(-k_0^{-1}(1 + \alpha_0^{\Re}) \frac{r_2 \sin(\theta_2 - 2\gamma_2 + \beta_2)\sin(2\gamma_1 - \beta_1 - \gamma_0) - r_1 \sin(\theta_1 - 2\gamma_1 + \beta_1)\sin(2\gamma_2 - \beta_2 - \gamma_0)}{\sin(2\gamma_1 - \beta_1 - 2\gamma_2 + \beta_2)}\right)^{\frac{-1}{\alpha_0^{\Re}}}$$

If $a_0 \Re$ is equal to zero and $a_0^* = -1$ thus disallowing both the substitution for $dr_0$ and $d\theta_0$ and also the previous choice of value for c then $\gamma_0 = \theta_0 + b_0$, where $b_0$ is a constant, and $T(r_0, \theta_0) = c/r_0$, where c is a constant. And the differential equation becomes after the application of the integrating factor:

$$cr_0^{-1} \sin b_0 dr_0 - cr_0^0 \cos b_0 d\theta_0 = 0$$

$$\frac{dr_0}{r_0} - \cot b_0 d\theta_0 = 0$$

(which is clearly an exact differential as it is the sum of two exact differentials)

ln $r_0 = \theta_0 \cot_0 + nl\ k_0$ where $k_0$ is a positive constant $r_0 = k_0 e^{\theta_0 \cot b_0}$ This is the equiangular spiral with constant angle $b_0$ measured from $r_0$ as its initial line. It includes the circle whose centre is at the origin for which $b_0 = \pm \frac{\pi}{2}$, and tends towards the line through the origin as $b_0 \to \frac{0}{\pi}$.

Now $\left(\frac{\partial}{\partial \theta_0}\left(-\frac{1}{r_0}(-T(r_0, \theta_0) r_0 \cos(\gamma_0 - \theta_0))\right)\right)_{r_0}$ $$= \left(\frac{\partial(T(r_0, \theta_0) \cos(\gamma_0 - \theta_0))}{\partial \theta_0}\right)_{r_0}$$

$$= \left(\frac{\partial T(r_0, \theta_0)}{\partial \theta_0}\right)_{r_0} \cos(\gamma_0 - \theta_0) -$$

-continued $$T(r_0, \theta_0) \sin(\gamma_0 - \theta_0) \left(\left(\frac{\partial \gamma_0}{\partial \theta_0}\right)_{r_0} - 1\right)$$

$$= T(r_0, \theta_0)\left(\frac{\partial \gamma_0}{\partial r_0}\right)_{\theta_0} r_0 \cos(\gamma_0 - \theta_0) -$$

$$T(r_0, \theta_0)\sin(\gamma_0 - \theta_0)\left(\frac{\partial \gamma_0}{\partial \theta_0}\right)_{r_0} + T(r_0, \theta_0)\sin(\gamma_0 - \theta_0)$$

$$= T(r_0, \theta_0)\sin(\gamma_0 - \theta_0) + r_0 \left(\frac{\partial T(r_0, \theta_0)}{\partial r_0}\right)_{\theta_0} \sin(\gamma_0 - \theta_0) +$$

$$r_0 T(r_0, \theta_0)\cos(\gamma_0 - \theta_0) \left(\frac{\partial \gamma_0}{\partial r_0}\right)_{\theta_0}$$

$$= \left(\frac{\partial(r_0(T(r_0, \theta_0)\sin(\gamma_0 - \theta_0)))}{\partial r_0}\right)_{\theta_0}$$

while the condition for an exact differential for the differential equation is:

$$\left(\frac{\partial(T(r_0, \theta_0)\sin(\gamma_0 - \theta_0))}{\partial \theta_0}\right)_{r_0} = \left(\frac{\partial(-T(r_0, \theta_0) r_0 \cos(\gamma_0 - \theta_0))}{\partial r_0}\right)_{\theta_0}$$

Thus $T(r_0, \theta_0) \sin(\gamma_0 - \theta_0)$ and $-T(r_0, \theta_0) \cos(\gamma_0 - \theta_0)$ satisfy identical conditions to those for $$\left(\frac{\partial \gamma_0}{\partial r_0}\right)_{\theta_0} \text{ and } \left(\frac{\partial \gamma_0}{\partial \theta_0}\right)_{r_0}$$

and may be represented by:

$$T(r_0, \theta_0)\sin(\gamma_0 - \theta_0) = \Re\Im\left(\sum_{j=0}^{\infty} c_j r_0^{j-1} e^{j\theta_0 i}\right) \text{ and }$$

$$-T(r_0, \theta_0) r_0 \cos(\gamma_0 - \theta_0) = \Re\Im\left(\sum_{j=0}^{\infty} c_j r_0^j e^{j\theta_0 i} i\right)$$

where each $c_j$ is complex and any $c_j$ may be zero. And:

$$\tan(\gamma_0 - \theta_0) = \frac{\Re\left(\sum_{j=0}^{\infty} c_j r_0^j e^{j\theta_0 i}\right)}{\Re\left(\sum_{j=0}^{\infty} c_j r_0^j e^{j\theta_0 i} i\right)}$$

This specification of $\gamma_0$ is consistent with and thus merely additional to the above specification of $$\left(\frac{\partial \gamma_0}{\partial r_0}\right)_{\theta_0} \text{ and } \left(\frac{\partial \gamma_0}{\partial \theta_0}\right)_{r_0}.$$

It is equally applicable to the specification of the gradient of a defining surface as may be signified by replacing $\gamma_0$ with $\gamma$, $r_0$ with r and $\theta_0$ with $\theta$.

Hence the differential equation may be written:

$$\Re\left(\sum_{j=0}^{\infty} c_j r_0^{j-1} e^{j\theta_0 i}\right) dr_0 + \Re\left(\sum_{j=0}^{\infty} c_j r_0^j e^{j\theta_0 i} i\right) d\theta_0 = 0$$

$$\left(\frac{c_0^*}{r_0} + \Re\left(\sum_{j=1}^{\infty} c_j r_0^{j-1} e^{j\theta_0 i}\right)\right) dr_0 +$$

$$\left( -c_0^3 + \Re\left( \sum_{j=1}^{\infty} c_j r_0^j e^{j\theta_0 i} \right) \right) d\theta_0 = 0$$

Hence 
$$c_0 * \ln r_0 - c_0^3 \theta_0 + \Re\left( \sum_{j=1}^{\infty} \frac{c_j}{j} r_0^j e^{j\theta_0 i} \right) = k_o$$

where $k_o$ is a constant.

A convenient general form may also be found as follows using the expressions for $d\gamma_0(r_0,\theta_0)$ and $d(\ln T(r_0,\theta_0))$:

$$d\left( e^{\ln T(r_0,\theta_0)} \left( \left( 1 - \Re\left( \sum_{j=0}^{\infty} c_j r_0^j e^{j\theta_0 i} \right) \right) r_0 \sin(\gamma_0 - \theta_0) - \right.\right.$$
$$\left.\left. \Re\left( \sum_{j=0}^{\infty} c_j r_0^{j-1} e^{j\theta_0 i} \right) r_0^2 \cos(\gamma_0 - \theta_0) \right) \right) =$$

$$d\left( e^{\ln T(r_0,\theta_0)} \left( \left( r_0 - \Re\left( \sum_{j=0}^{\infty} c_j r_0^{j+1} e^{j\theta_0 i} \right) \right) \sin(\gamma_0 - \theta_0) - \right.\right.$$
$$\left.\left. \Re\left( \sum_{j=0}^{\infty} c_j r_0^{j+1} e^{j\theta_0 i} \right) \cos(\gamma_0 - \theta_0) \right) \right) =$$

$$e^{\ln T(r_0,\theta_0)} \left( \left( \left( r_0 - \Re\left( \sum_{j=0}^{\infty} c_j r_0^{j+1} e^{j\theta_0 i} \right) \right) \cos(\gamma_0 - \theta_0) + \right.\right.$$
$$\left. \Re\left( \sum_{j=0}^{\infty} c_j r_0^{j+1} e^{j\theta_0 i} \right) \sin(\gamma_0 - \theta_0) \right)$$

$$\left( \Re\left( \sum_{k=0}^{\infty} a_k r_0^{k-1} e^{k\theta_0 i} \right) dr_0 + \left( \Re\left( \sum_{k=0}^{\infty} a_k r_0^k e^{k\theta_0 i} \right) - 1 \right) d\theta_0 \right) +$$

$$\left( \left( r_0 - \Re\left( \sum_{j=0}^{\infty} c_j r_0^{j+1} e^{j\theta_0 i} \right) \right) \sin(\gamma_0 - \theta_0) - \right.$$
$$\left. \Re\left( \sum_{j=0}^{\infty} c_j r_0^{j+1} e^{j\theta_0 i} \right) \cos(\gamma_0 - \theta_0) \right)$$

$$\left( r_0 \Re\left( \sum_{k=0}^{\infty} a_k r_0^{k-1} e^{k\theta_0 i} \right) d\theta_0 - \frac{1}{r_0} \Re\left( \sum_{k=0}^{\infty} a_k r_0^k e^{k\theta_0 i} \right) dr_0 \right) +$$

$$\left( \left( 1 - \Re\left( \sum_{j=0}^{\infty} (j+1) c_j r_0^j e^{j\theta_0 i} \right) \right) dr_0 - \Re\left( \sum_{j=0}^{\infty} j c_j r_0^{j+1} e^{j\theta_0 i} \right) d\theta_0 \right) \sin(\gamma_0 - \theta_0) +$$

$$\left( - \Re\left( \sum_{j=0}^{\infty} (j+1) c_j r_0^j e^{j\theta_0 i} \right) dr_0 + \Re\left( \sum_{j=0}^{\infty} j c_j r_0^{j+1} e^{j\theta_0 i} \right) d\theta_0 \right) \cos(\gamma_0 - \theta_0) ) =$$

$$e^{\ln T(r_0,\theta_0)} \left( \left( \left( \Re\left( \sum_{j=0}^{\infty} c_j r_0^{j+1} e^{j\theta_0 i} \right) \Re\left( \sum_{k=0}^{\infty} a_k r_0^{k-1} e^{k\theta_0 i} \right) - \right.\right.\right.$$
$$\left. \left( r_0 - \Re\left( \sum_{j=0}^{\infty} c_j r_0^{j+1} e^{j\theta_0 i} \right) \right) \frac{1}{r_0} \Re\left( \sum_{k=0}^{\infty} a_k r_0^k e^{k\theta_0 i} \right) + \right.$$
$$\left. 1 - \Re\left( \sum_{j=0}^{\infty} (j+1) c_j r_0^j e^{j\theta_0 i} \right) \right) \sin(\gamma_0 - \theta_0) +$$

$$\left( \left( r_0 - \Re\left( \sum_{j=0}^{\infty} c_j r_0^{j+1} e^{j\theta_0 i} \right) \right) \Re\left( \sum_{k=0}^{\infty} a_k r_0^{k-1} e^{k\theta_0 i} \right) + \right.$$
$$\Re\left( \sum_{j=0}^{\infty} c_j r_0^{j+1} e^{j\theta_0 i} \right) \frac{1}{r_0} \Re\left( \sum_{k=0}^{\infty} a_k r_0^k e^{k\theta_0 i} \right) -$$
$$\left. \Re\left( \sum_{j=0}^{\infty} (j+1) c_j r_0^j e^{j\theta_0 i} \right) \right) \cos(\gamma_0 - \theta_0) \right) dr_0 +$$

$$\left( \left( \Re\left( \sum_{j=0}^{\infty} c_j r_0 e^{j\theta_0 i} \right) \right) \left( \Re\left( \sum_{k=0}^{\infty} a_k r_0^k e^{k\theta_0 i} \right) - 1 \right) + \right.$$
$$\left( r_0 - \Re\left( \sum_{j=0}^{\infty} c_j r_0^{j+1} e^{j\theta_0 i} \right) \right) \Re\left( \sum_{k=0}^{\infty} a_k r_0^{k-1} e^{k\theta_0 i} \right) -$$
$$\left. \Re\left( \sum_{j=0}^{\infty} j c_j r_0^j e^{j\theta_0 i} \right) \right) r_0 \sin(\gamma_0 - \theta_0) +$$

-continued
$$\left(\left(1 - \Re\left(\sum_{j=0}^{\infty} c_j r_0^j e^{j\theta_0 i}\right)\right)\left(\Re\left(\sum_{k=0}^{\infty} a_k r_0^k e^{k\theta_0 i}\right) - 1\right) - $$

$$\Re\left(\sum_{j=0}^{\infty} c_j r_0^{j+1} e^{j\theta_0 i}\right) \Re\left(\sum_{k=0}^{\infty} a_k r_0^{k-1} e^{k\theta_0 i}\right) + $$

$$\Re\left(\sum_{j=0}^{\infty} j c_j r_0^j e^{j\theta_0 i}\right)\right) r_0 \cos(\gamma_0 - \theta_0)\right) d\theta_0\right)$$

Equating the factor of $T(r_0,\theta_0) \sin(\gamma_0-\theta_0)dr_0$, and that of $-T(r_0,\theta_0)r_0 \cos(\gamma_0,\theta_0)d\theta_0$, in this differential to that in the differential equation after the application of the integrating factor both give:

$$\Re\left(\sum_{j=0}^{\infty} c_j r_0^j e^{j\theta_0 i}\right) \Re\left(\sum_{k=0}^{\infty} a_k r_0^k e^{k\theta_0 i}\right) + \Re\left(\sum_{j=0}^{\infty} c_j r_0^j e^{j\theta_0 i}\right) \Re\left(\sum_{k=0}^{\infty} a_k r_0^k e^{k\theta_0 i}\right) + $$

$$1 - \Re\left(\sum_{j=0}^{\infty} (j+1)c_j r_0^j e^{j\theta_0 i}\right) - \Re\left(\sum_{k=0}^{\infty} a_k r_0^k e^{k\theta_0 i}\right) = 1$$

$$\Re\left(\left(\sum_{j=0}^{\infty} c_j r_0^j e^{j\theta_0 i}\right)\left(\sum_{k=0}^{\infty} a_k r_0^k e^{k\theta_0 i}\right) i\right) - \Re\left(\sum_{j=0}^{\infty} (a_j i + (j+1)c_j) r_0^j e^{j\theta_0 i}\right) = 0$$

$$\Re\left(\left(\sum_{j=0}^{\infty} r_0^j e^{j\theta_0 i} \sum_{k=0}^{j} c_{j-k} a_k\right) i\right) - \Re\left(\sum_{j=0}^{\infty} (a_j i + (j+1)c_j) r_0^j e^{j\theta_0 i}\right) = 0$$

Equating the complex coefficients of $r_0^j e^{j\theta_0 i}$ gives:

$$\sum_{k=0}^{j} c_{j-k} a_k i = a_j i + (j+1)c_j$$

Equating the factor of $T)r_0,\theta_0) \cos(\gamma_0-\theta_0)dr_0$, and that of $T(r_0,\theta_0)r_0 \sin(\gamma_0-\theta_0)d\theta_0$, in this differential to zero both give:

$$\Re\left(\sum_{j=0}^{\infty} c_j r_0^j e^{j\theta_0 i}\right) \Re\left(\sum_{k=0}^{\infty} a_k r_0^k e^{k\theta_0 i}\right) - \Re\left(\sum_{j=0}^{\infty} c_j r_0^j e^{j\theta_0 i}\right) \Re\left(\sum_{k=0}^{\infty} a_k r_0^k e^{k\theta_0 i}\right) - $$

$$\Re\left(\sum_{j=0}^{\infty} (j+1)c_j r_0^j e^{j\theta_0 i}\right) + \Re\left(\sum_{k=0}^{\infty} a_k r_0^k e^{k\theta_0 i}\right) = 0$$

$$-\Re\left(\left(\sum_{j=0}^{\infty} c_j r_0^j e^{j\theta_0 i}\right)\left(\sum_{k=0}^{\infty} a_k r_0^k e^{k\theta_0 i}\right)\right) + \Re\left(\sum_{j=0}^{\infty} (a_j - (j+1)c_j i) r_0^j e^{j\theta_0 i}\right) = 0$$

$$-\Re\left(\sum_{j=0}^{\infty} r_0^j e^{j\theta_0 i} \sum_{k=0}^{j} c_{j-k} a_k\right) + \Re\left(\sum_{j=0}^{\infty} (a_j - (j+1)c_j i) r_0^j e^{j\theta_0 i}\right) = 0$$

Equating the complex coefficients of $r_0^j e^{j\theta_0 i}$ gives:

$$\sum_{k=0}^{j} c_{j-k} a_k = a_j - (j+1)c_j i$$

or $$\sum_{k=0}^{j} c_{j-k} a_k i = a_j i + (j+1)c_j \text{ as before.}$$

For each value of j this condition introduces the following two new equations with two new unknowns $c_j \Re$ and $c_j^{\Im}$:

$$c_j a_0 i - (j+1)c_j = a_j i - \sum_{k=1}^{j} c_{j-k} a_k i$$

$$(c_j^{\Re} + ic_j^{\Im})(a_0^{\Re} + ia_0^{\Im})i - (j+1)c_j = a_j i - \sum_{k=1}^{j} c_{j-k} a_k i$$

-continued $$(c_j^{\Re} a_0^{\Re} - c_j^{\Im} a_0^{\Im} + i(c_j^{\Im} a_0^{\Re} + c_j^{\Re} a_0^{\Im}))i - $$

$$(j+1)(c_j^{\Re} + ic_j^{\Im}) = a_j i - \sum_{k=1}^{j} c_{j-k} a_k i$$

$$-c_j^{\Im} a_0^{\Re} - c_j^{\Re} a_0^{\Im} - (j+1)c_j^{\Re} = \Re\left(a_j i - \sum_{k=1}^{j} c_{j-k} a_k i\right)$$

$$c_j^{\Re} a_0^{\Re} - c_j^{\Im} a_0^{\Im} - (j+1)c_j^{\Im} = \Im\left(a_j i - \sum_{k=1}^{j} c_{j-k} a_k i\right)$$

$$-(a_0^{\Im} + j + 1)c_j^{\Re} - a_0^{\Re} c_j^{\Im} = \Re\left(a_j i - \sum_{k=1}^{j} c_{j-k} a_k i\right)$$

$$a_0 * c_j * - (a_0^{\Re} + j + 1)c_j^{\Im} = \Im\left(a_j i - \sum_{k=1}^{j} c_{j-k} a_k i\right)$$

These two new equations are soluble unless:

$$(a_0 \Re + j + 1)^2 = -(a_0 \Re)^2$$

which clearly cannot be the case as $a_0* + j + 1$ and $a_0 \Re$ are both real.

Hence the solution may be put in a convenient general form:

$$e^{lnT(r_0,\theta_0)}\left(\left(1 - \Re\left(\sum_{j=0}^{\infty} c_j r_0^j e^{j\theta_0 i}\right)\right) r_0 \sin(\gamma_0 - \theta_0)\right.$$

$$\left. - \Re\left(\sum_{j=0}^{\infty} c_j r_0^{j-1} e^{j\theta_0 i} i\right) r_0^2 \cos(\gamma_0 - \theta_0)\right) = k_0$$

where $k_0$ is a constant and $\sum_{k=0}^{j} c_{j-k} a_k i = a_j i + (j+1)c_j$.

For $j = 0$:-

$$-(1 + a_0^{\Re})c_0^{\Re} \quad - a_0^{\Re} c_0^{\Im} \quad = -a_0^{\Re}$$

$$a_0^{\Re} c_0^{\Re} \quad - (1 + a_0^{\Re})c_0^{\Im} = -a_0^{\Im}$$

$$c_0^{\Im} = \frac{a_0^{\Im} - (1 + a_0^{\Re})c_0^*}{a_0*} = \frac{a_0* c_0* - a_0*}{1 + a_0^{\Re}}$$

$$a_0^{\Im}(1 + a_0^{\Re}) - (1 + a_0^{\Re})^2 c_0^* \quad - (a_0^*)^2 c_0^{\Re} \quad = -(a_0^{\Re})^2$$

$$c_0* = \frac{a_0^{\Im}(1 + a_0^{\Re}) + (a_0*)^2}{(1 + a_0^{\Re})^2 + (a_0*)^2} = 1 - \frac{1 + a_0^{\Re}}{(1 + a_0^{\Re})^2 + (a_0*)^2}$$

$$c_0* = \frac{a_0^{\Im} - a_0* c_0^{\Im}}{1 + a_0^{\Re}} = \frac{(1 + a_0^{\Re})c_0^{\Im} + a_0*}{a_0*}$$

$$a_0^{\Re} a_0^{\Im} \quad -(a_0^*)^2 c_0^{\Im} \quad = (1 + a_0^{\Re})^2 c_0^{\Im} + a_0^{\Re} \quad + a_0^{\Re} a_0^{\Im}$$

$$c_0^{\Im} = \frac{-a_0*}{(1 + a_0^{\Re})^2 + (a_0*)^2}$$

If $a_j = 0$ for $j > 0$ then for $j > 0$:-

$$\sum_{k=0}^{j} c_{j-k} a_k i = c_j a_0 i = (j+1) c_j$$

which is satisfied by $c_j = 0$ for $j > 0$. In which case the solution becomes:

$$e^{lnT(r_0,\theta_0)}\left(\left(1 - 1 + \frac{1 + a_0^{\Re}}{(1 + a_0^{\Re})^2 + (a_0*)^2}\right) r_0 \sin(\gamma_0 - \theta_0) + \right.$$

$$\left. \frac{1}{r_0} \frac{-a_0*}{(1 + a_0^{\Re})^2 + (a_0*)^2} r_0^2 \cos(\gamma_0 - \theta_0)\right) = k_0$$

$$e^{lnT(r_0,\theta_0)}\left(\frac{1 + a_0^{\Re}}{(1 + a_0^{\Re})^2 + (a_0*)^2} r_0 \sin(\gamma_0 - \theta_0) - \right.$$

$$\left. \frac{a_0*}{(1 + a_0^{\Re})^2 + (a_0*)^2} r_0 \cos(\gamma_0 - \theta_0)\right) = k_0$$

so that the convenient general form is consistent with the solution when $r_0$ $$\left(\frac{\partial \gamma_0}{\partial \theta_0}\right)_{r_0}$$

are both constants.

Finally it should be mentioned that any of the solutions for the polar form may be put into cartesian form, and any of the solutions for the cartesian form may be put into polar form. However, as the range of possible specifications for $\gamma(r_0,\theta_0)$ is wider than that for $\gamma_0(x_0,y_0)$, the polar form is somewhat more general.

If $r_0 = r_0(r_0,\theta_0)$ then it is necessary to evaluate said function numerically for various values of $r_0$ in order to find that value of $r_0$ which corresponds to a given value of $\theta_0$. Hence solutions in polar form of the differential equation have to be evaluated numerically by iterating $r_0$ or $\theta_0$ as appropriate unless they are in one of the explicit forms $r_0 = r_0(\theta_0)$ or $\theta_0 = \theta_0(r_0)$; or can be put in one of those explicit forms. The form $r_0 = r_0(\theta_0,\gamma_0)$ where $\gamma_0 = \gamma_0(\theta_0)$ can always be put in the form $r_0 = r_0(\theta_0,\gamma_0(\theta_0))$ which is also the form $r_0 = r_0(\theta_0)$. Even the form $r_0 = r_0(\theta_0,\gamma_0(r_0,\theta_0))$ which results from $r_0 = r_0(\theta_0,\gamma_0)$ where $\gamma_0 = \gamma_0(r_0,\theta_0)$ might be rearranged to give $r_0 = r_0(\theta_0)$.

Now, both $r_0$ and $\theta_0$ are known in terms of $\theta_1, \theta_2, 2\gamma_1 - \beta_1, 2\gamma_2 - \beta_2, r_1, r_2$ as is $\gamma_0(r_0,\theta_0)$. Provided the, or the first, defining mirror is not a point and its equation has an explicit form, those of $\theta_1, 2\gamma_1 - \beta_1, r_1$ which are variables may in general be specified in terms of one of their number, typically $\theta_1$. Provided the, or the second, defining mirror is not a point and its equation has an explicit form, those of $\theta_2, 2\gamma_2 - \beta_2, r_2$ which are variables may in general be specified in terms of one of their number, typically $\theta_2$. In which case, all of $r_0, \theta_0$ and $\gamma_0(r_0,\theta_0)$ will be known in terms of two specifying variables, such as $\theta_1, \theta_2$, from relations such as $r_0 = r_0(\theta_1,\theta_2)$ and $\theta_0 = \theta_0(\theta_1,\theta_2)$.

The values of two such specifying variables at a point $r_0, \theta_0$ can only be found directly from $r_0 = r_0(\theta_1,\theta_2)$ and $\theta_0 = \theta_0(\theta_1,\theta_2)$ iterating the values of both specifying variables. However, if expressions for $r_0, \theta_0, \gamma_0(r_0,\theta_0)$ in terms of two such specifying variables are substituted in the equation of the defined surface, even if it is in a most general implicit form such as $r_0 = r_0(r_0,\theta_0,\gamma_0)$, then they produce that equation relating the first specifying variable to the second specifying variable which results from the choice of the starting position of the defined surface and thus the constant of integration together with the choice of the specification for the gradient, $\gamma_0$, of the defined surface. Similarly if the defined surface consists of seperately specified portions.

It may, in principle, be possible to put this equation in the form of one specifying variable being a function of the other: such as $\theta_1 = \theta_1(\theta_2)$. In which case the value of $\theta_1$ may be found from the value of $\theta_2$. However, it is somewhat more likely to be possible to put this equation in the form of a combination of the two specifying variables, such as $$\frac{\theta_2 + \theta_1}{2},$$

being a function of some different combination of the two specifying variables, such as $$\frac{\theta_2 + \theta_1}{2}.$$

In which case the value of one combination may be found from the value of the other combination. Otherwise this equation must be evaluated numerically by iterating the value of one of the specifying variables; or, if necessary, both of them.

Alternatively, $\gamma_0$ may be specified in terms of variables other than $x_0,y_0$ or $r_0,\theta_0$ such as $\theta_1,\theta_2$ and the corresponding member of the family of differential equations for $\theta_1,\theta_2$ solved in terms of such other variables.

6.21.7 Derivation of the integrating factor after a change of variables

The remaining methods for the solution of a family of differential equations are appropriate only to a defined surface, as opposed to the, or one of the, defining surfaces; and to those embodiments in which the defining surface(s) are reflective.

We have, as before, the family of differential equations $\sin\gamma_0 dx_0 - \cos\gamma_0 dy_0 = 0$ and wish to transform $dx_0$ and $dy_0$ into differentials of two new independent variables $X_1,X_2$ to obtain a new family of differential equations for $X_1,X_2$ in the hope of discovering that when $\gamma_0$ is specified in terms of $X_1,X_2$ those variables are connected by some implicit relation $u(X_1,X_2)=k_0$ which comprises the solution of one member of the family of differential equations for $X_1,X_2$.

If $x_0,y_0$ can both be expressed as functions of the independent variables $X_1,X_2$ then:

$$dx_0 = \sum_{i=1}^{2} \left(\frac{\partial x_0}{\partial X_i}\right)_{X_{i'\neq i}} dX_i \text{ and } dy_0 = \sum_{i=1}^{2} \left(\frac{\partial y_0}{\partial X_i}\right)_{X_{i'\neq i}} dX_i$$

where i' has the same range of values as i, and the subscript $X_{i'}$ specifies all the variables $X_1,X_2$; so that the subscripts $X_{i'\neq i}$ above specify that all of the variables $X_1,X_2$ except $X_i$ are held constant.

Now $x_0$ and $y_0$ are functions of the ordered set or list of variables $\{Y_1,\ldots,Y_6\} \leftrightharpoons \{\theta_1,\theta_2,2\gamma_1-\beta_1,2\gamma_2-\beta_2,r_1,r_2\}$ or some similar choice of variables in an ordered one-to-one correspondence. Whatever the variable $X_i$ is chosen to be, it must be a function of at least one of $Y_1,\ldots,Y_6$. So that each by may be regarded as a function of $X_1,X_2$. Thus:

$$\left(\frac{\partial x_0}{\partial X_i}\right)_{X_{i'\neq i}} = \sum_{j=1}^{6} \left(\frac{\partial x_0}{\partial Y_j}\right)_{Y_{j'\neq j}} \left(\frac{\partial Y_j}{\partial X_i}\right)_{X_{i'\neq i}}$$

and $$\left(\frac{\partial y_0}{\partial X_i}\right)_{X_{i'\neq i}} = \sum_{j=1}^{6} \left(\frac{\partial y_0}{\partial Y_j}\right)_{Y_{j'\neq j}} \left(\frac{\partial Y_j}{\partial X_i}\right)_{X_{i'\neq i}}$$

for $i = 1, 2$ where j' has the same range of values as j, and the subscript $Y_{j'}$ specifies all the variables $Y_1,\ldots,Y_6$; so that the subscript $Y_{j'\neq j}$ above specifies that all the variables $Y_1,\ldots,Y_6$ except $Y_j$ are held constant, as would the subscript $Y_{j'}\neq Y_j$.

A defining mirror-ray combination refers to a single defining ray and that portion of the or its respective defining mirror which reflects it, so that its description is confined to the $Y_j$ for either all the odd or all the even values of j. As it is possible that the $$\left(\frac{\partial Y_j}{\partial X_i}\right)_{X_{i'\neq i}} = 0$$

for all the odd values of j, or alternatively for all the even values of j, each variable $X_i$ may be related either to one defining mirror-ray combination only or to both defining mirror-ray combinations. For the sake of simplicity, the description hereinafter is couched in terms only of the case where there are first and second defining mirrors.

Now $\beta_1$ may always be a constant, but not all of $r_1,\theta_1,\gamma_1$ may be constant as may be seen from the following considerations which are similar to those for the defined surface.

If $r_1$ is zero then the first defining mirror is a point at the origin and $\theta_1$ and its gradient, $\gamma_1$, are undefined. If $r_1$ and $\theta_1$ are constant then the first defining mirror is a point and its gradient, $\gamma_1$, is undefined. But both of these cases are irrelevant to the relationship under examination.

If $r_1$ is a constant but $\theta_1$ is not then the first defining mirror is a circle whose centre is at the origin and $\gamma_1 = \theta_1 \pm \pi/2$.

If $\theta_1$ is constant but $r_1$ is not then the first defining mirror is a straight line through the origin and $\gamma_1=\theta_1$ so that $\gamma_1$ is also a constant.

If $\gamma_1$ is a constant then the first defining mirror is a straight line. But if said straight line does not go through the origin then neither $r_1$ nor $\theta_1$ may be constant.

If the relation between $r_1$ and $\theta_1$ is known from the specification of the first defining mirror then that mirror's gradient, $\gamma_1$, may be derived from that relationship. If $\gamma_1$ is included in the specification of the first defining mirror then $r_1,\theta_1,\gamma_1$ are dependent. And if $\beta_1$ is not a constant it must be specified in terms of one or more of $r_1,\theta_1,\gamma_1$.

In summary, not all the $Y_j$ for odd values of j can be constants. And said odd numbered variables are each either the sole odd numbered variable, a function of one or more of the other odd numbered variables, or a constant.

Similarly for the even numbered variables $\beta_2$ and $r_2,\theta_2,\gamma_2$. It should be noted, however, that the first defining mirror and the odd numbered variables are not dependent on the second defining mirror and the even numbered variables (except in a relation derived for a defined mirror).

Clearly no variable $X_i$ can be defined as a constant. It follows from the above that two $X_i$ defined only in terms of one or more of the variable $Y_j$ for odd values of j must be dependent on each other irrespective of the nature of their seperate definitions. And that two $X_i$ defined only in terms of one or more of the variable $Y_j$ for even values of j must be dependent on each other irrespective of the nature of their seperate definitions. Thus it is not possible for two $X_i$ each to relate only to the same defining mirror and be independent as required.

If $Y_j$ is a constant then $$\left(\frac{\partial x_0}{\partial Y_j}\right)_{Y_{j'\neq j}} \text{ and } \left(\frac{\partial y_0}{\partial Y_j}\right)_{Y_{j'\neq j}}$$

cannot exist but $$\left(\frac{\partial Y_j}{\partial X_i}\right)_{X_{i'\neq i}}$$

is identically equal to zero so that references to a constant $Y_j$ are merely eliminated from the above expressions.

The family of differential equations for $X_1,X_2$ can be expressed as:

$$\sin\gamma_0 \sum_{i=1}^{2} \left(\frac{\partial x_0}{\partial X_i}\right)_{X_{i'\neq i}} dX_i - \cos\gamma_0 \sum_{i=1}^{2} \left(\frac{\partial y_0}{\partial X_i}\right)_{X_{i'\neq i}} dX_i = 0$$

$$\sum_{i=1}^{2} \left(\sin\gamma_0 \left(\frac{\partial x_0}{\partial X_i}\right)_{X_{i'\neq i}} - \cos\gamma_0 \left(\frac{\partial y_0}{\partial X_i}\right)_{X_{i'\neq i}}\right) dX_i = 0$$

Since $\gamma_0$ can be regarded as a function of $X_1,X_2$ because of this family of differential equations there is no need for the integrating factor to include $\gamma_0$ explicitly. Applying the integrating factor $T(X_1,X_2)$ gives:

$$\sum_{i=1}^{2} T(X_1,X_2)\left(\sin\gamma_0\left(\frac{\partial x_0}{\partial X_i}\right)_{X_{i'\neq i}} - \cos\gamma_0\left(\frac{\partial y_0}{\partial X_i}\right)_{X_{i'\neq i}}\right)dX_i = 0$$

Provided neither of the factors of $dX_1$ nor of $dX_2$ is zero, the condition for an exact differential is:

$$\left(\frac{\partial T(X_1,X_2)}{\partial X_2}\right)_{X_1}\left(\sin\gamma_0\left(\frac{\partial x_0}{\partial X_1}\right)_{X_2} - \cos\gamma_0\left(\frac{\partial y_0}{\partial X_1}\right)_{X_2}\right) +$$

$$T(X_1,X_2)\left(\cos\gamma_0\left(\frac{\partial\gamma_0}{\partial X_2}\right)_{X_1}\left(\frac{\partial x_0}{\partial X_1}\right)_{X_2} + \right.$$

$$\sin\gamma_0\left(\frac{\partial}{\partial X_2}\left(\frac{\partial x_0}{\partial X_1}\right)_{X_2}\right)_{X_1} + \sin\gamma_0\left(\frac{\partial\gamma_0}{\partial X_2}\right)_{X_1}\left(\frac{\partial y_0}{\partial X_1}\right)_{X_2} -$$

$$\left.\cos\gamma_0\left(\frac{\partial}{\partial X_2}\left(\frac{\partial y_0}{\partial X_1}\right)_{X_2}\right)_{X_1}\right) =$$

$$\left(\frac{\partial T(X_1,X_2)}{\partial X_1}\right)_{X_2}\left(\sin\gamma_0\left(\frac{\partial x_0}{\partial X_2}\right)_{X_1} - \cos\gamma_0\left(\frac{\partial y_0}{\partial X_2}\right)_{X_1}\right) +$$

$$T(X_1,X_2)\left(\cos\gamma_0\left(\frac{\partial\gamma_0}{\partial X_1}\right)_{X_2}\left(\frac{\partial x_0}{\partial X_2}\right)_{X_1} + \right.$$

$$\sin\gamma_0\left(\frac{\partial}{\partial X_1}\left(\frac{\partial x_0}{\partial X_2}\right)_{X_1}\right)_{X_2} +$$

$$\left.\sin\gamma_0\left(\frac{\partial\gamma_0}{\partial X_1}\right)_{X_2}\left(\frac{\partial y_0}{\partial X_2}\right)_{X_1} - \cos\gamma_0\left(\frac{\partial}{\partial X_1}\left(\frac{\partial y_0}{\partial X_2}\right)_{X_1}\right)_{X_2}\right) =$$

If $x_0$ and $y_0$ are each continuous with respect to the pair of variables $X_1$ and $X_2$ then:

$$\left(\frac{\partial}{\partial X_1}\left(\frac{\partial x_0}{\partial X_2}\right)_{X_1}\right)_{X_2} = \left(\frac{\partial}{\partial X_2}\left(\frac{\partial x_0}{\partial X_1}\right)_{X_2}\right)_{X_1} \text{ and}$$

$$\left(\frac{\partial}{\partial X_1}\left(\frac{\partial y_0}{\partial X_2}\right)_{X_1}\right)_{X_2} = \left(\frac{\partial}{\partial X_2}\left(\frac{\partial y_0}{\partial X_1}\right)_{X_2}\right)_{X_1}$$

so that said second derivatives may be eliminated from the above expression. In addition $$\sin\gamma_0\left(\frac{\partial x_0}{\partial X_2}\right)_{X_1} - \cos\gamma_0\left(\frac{\partial y_0}{\partial X_2}\right)_{X_1} = -\left(\sin\gamma_0\left(\frac{\partial x_0}{\partial X_1}\right)_{X_2} - \cos\gamma_0\left(\frac{\partial y_0}{\partial X_1}\right)_{X_2}\right)\frac{dX_1}{dX_2} \text{ by}$$

virtue of the differential equation; so that:

$$\frac{dT(X_1,X_2)}{T(X_1,X_2)} = -$$

$$\frac{\cos\gamma_0\left(\frac{\partial x_0}{\partial X_2}\right)_{X_1} + \sin\gamma_0\left(\frac{\partial y_0}{\partial X_2}\right)_{X_1}}{\sin\gamma_0\left(\frac{\partial x_0}{\partial X_2}\right)_{X_1} - \cos\gamma_0\left(\frac{\partial y_0}{\partial X_2}\right)_{X_1}}\left(\frac{\partial\gamma_0}{\partial X_1}\right)_{X_2}dX_1 -$$

$$\frac{\cos\gamma_0\left(\frac{\partial x_0}{\partial X_1}\right)_{X_2} + \sin\gamma_0\left(\frac{\partial y_0}{\partial X_1}\right)_{X_2}}{\sin\gamma_0\left(\frac{\partial x_0}{\partial X_1}\right)_{X_2} - \cos\gamma_0\left(\frac{\partial y_0}{\partial X_1}\right)_{X_2}}\left(\frac{\partial\gamma_0}{\partial X_2}\right)_{X_1}dX_2$$

It has already been shown that the partial derivatives of the cartesian coordinates $x_0$ and $y_0$ can be expressed in terms of the respective partial derivatives of the path lengths and further polar coordinates $p_1$ and $p_2$ and that these results may be summarised using the modulus 2 notation as:

$$\left(\frac{\partial x_0}{\partial Y_j}\right)_{Y_{j'\neq j}} = -\cos(2\gamma_{1+|j|_2} - \beta_{1+|j|_2})\left(\frac{\partial p_{1+|j|_2}}{\partial Y_j}\right)_{Y_{j'\neq j}}$$

and $$\left(\frac{\partial y_0}{\partial Y_j}\right)_{Y_{j'\neq j}} = -\sin(2\gamma_{1+|j|_2} - \beta_{1+|j|_2})\left(\frac{\partial p_{1+|j|_2}}{\partial Y_j}\right)_{Y_{j'\neq j}}$$

for all the $Y_j$ remaining variable.

Now $\left(\frac{\partial x_0}{\partial X_i}\right)_{X_{i'\neq i}} = \sum_{j=1}^{6}\left(\frac{\partial x_0}{\partial Y_j}\right)_{Y_{j'\neq j}}\left(\frac{\partial Y_j}{\partial X_i}\right)_{X_{i'\neq i}} =$ $$\sum_{j \text{ odd}}\left(\frac{\partial x_0}{\partial Y_j}\right)_{Y_{j'\neq j}}\left(\frac{\partial Y_j}{\partial X_i}\right)_{X_{i'\neq i}} +$$

$$\sum_{j \text{ even}}\left(\frac{\partial x_0}{\partial Y_j}\right)_{Y_{j'\neq j}}\left(\frac{\partial Y_j}{\partial X_i}\right)_{X_{i'\neq i}} =$$

$$-\cos(2\gamma_2 - \beta_2)\sum_{j \text{ odd}}\left(\frac{\partial p_2}{\partial Y_j}\right)_{Y_{j'\neq j}}\left(\frac{\partial Y_j}{\partial X_i}\right)_{X_{i'\neq i}} -$$

$$\cos(2\gamma_1 - \beta_1)\sum_{j \text{ even}}\left(\frac{\partial p_1}{\partial Y_j}\right)_{Y_{j'\neq j}}\left(\frac{\partial Y_j}{\partial X_i}\right)_{X_{i'\neq i}}$$

Similarly for the partial derivatives of $y_0$ but with sines instead of cosines. If $X_i$ relates to the first defining mirror only then all the $$\left(\frac{\partial Y_j}{\partial X_i}\right)_{X_{i'\neq i}}$$

for the even values of j are identically equal to zero; so that:

$$\left(\frac{\partial x_0}{\partial X_i}\right)_{X_{i'\neq i}} = -\cos(2\gamma_2 - \beta_2)\sum_{j \text{ odd}}\left(\frac{\partial p_2}{\partial Y_j}\right)_{Y_{j'\neq j}}\left(\frac{\partial Y_j}{\partial X_i}\right)_{X_{i'\neq i}}$$

But since $p_2$ is also a function of the ordered set or list of variables $\{Y_1,\ldots,Y_6\} \leftrightarrows \{\theta_1,\theta_2,2\gamma_1-\beta_2,r_1,r_2\}$ in an ordered one-to-one correspondence:

$$\left(\frac{\partial p_2}{\partial X_i}\right)_{X_{i'\neq i}} = \sum_{j=1}^{6}\left(\frac{\partial p_2}{\partial Y_j}\right)_{Y_{j'\neq j}}\left(\frac{\partial Y_j}{\partial X_i}\right)_{X_{i'\neq i}} =$$

$$\sum_{j \text{ odd}}\left(\frac{\partial p_2}{\partial Y_j}\right)_{Y_{j'\neq j}}\left(\frac{\partial Y_j}{\partial X_i}\right)_{X_{i'\neq i}}$$

such a case. Hence we may write:

$$\left(\frac{\partial x_0}{\partial X_i}\right)_{X_{i'\neq i}} = -\cos(2\gamma_2 - \beta_2)\left(\frac{\partial p_2}{\partial X_i}\right)_{X_{i'\neq i}}$$

Similarly with a sine instead of a cosine for the partial derivative of $y_0$; and with $p_1$ and the cosine and sine of $2\gamma_1-\beta_1$ if $X_i$ relates to the second defining mirror only.

If a $Y_j$ is constant then $$\left(\frac{\partial Y_j}{\partial X_i}\right)_{X_{i'\neq i}} \equiv 0$$

for that j and all i. If $X_i$ is one of the $Y_j$ (so that $X_i$ relates to the $1+|j+1|_2$th defining mirror only) then $$\left(\frac{\partial Y_j}{\partial X_i}\right)_{X_{i'\neq i}} \equiv 1$$

for that i,j. If $X_{i'\neq i}$ is one of the $Y_j$ (so that $X_{i'\neq i}$ relates to the $1+|j+1|_2$th defining mirror only while $X_i$ relates either to the $1+|j|_2$th defining mirror only or to both defining mirrors onlyoor to both defining mirrors) then $$\left(\frac{\partial Y_j}{\partial X_i}\right)_{X_{i'\neq i}} \equiv 0$$

for that i',j.

6.21.7.1 $X_1$ relates to the first defining mirror while $X_2$ relates to the second If $X_1$ relates to the first defining mirror only while $X_2$ relates to the second defining mirror only then:

$$\left(\frac{\partial x_0}{\partial X_1}\right)_{X_2} = -\cos(2\gamma_2 - \beta_2)\left(\frac{\partial p_2}{\partial X_1}\right)_{X_2}$$

$$\left(\frac{\partial y_0}{\partial X_1}\right)_{X_2} = -\sin(2\gamma_2 - \beta_2)\left(\frac{\partial p_2}{\partial X_1}\right)_{X_2}$$

$$\left(\frac{\partial x_0}{\partial X_2}\right)_{X_1} = -\cos(2\gamma_1 - \beta_1)\left(\frac{\partial p_1}{\partial X_2}\right)_{X_1}$$

$$\left(\frac{\partial y_0}{\partial X_2}\right)_{X_1} = -\sin(2\gamma_1 - \beta_1)\left(\frac{\partial p_1}{\partial X_2}\right)_{X_1}$$

and the expression for the integrating factor becomes:

$$\frac{dT(X_1,X_2)}{T(X_1,X_2)} = \frac{(-\cos\gamma_0\cos(2\gamma_1-\beta_1)-\sin\gamma_0\sin(2\gamma_1-\beta_1))\left(\frac{\partial p_1}{\partial X_2}\right)_{X_1}}{(-\sin\gamma_0\cos(2\gamma_1-\beta_1)+\cos\gamma_0\sin(2\gamma_1-\beta_1))\left(\frac{\partial p_1}{\partial X_2}\right)_{X_1}}\left(\frac{\partial \gamma_0}{\partial X_1}\right)_{X_2}dX_1 -$$

$$\frac{(-\cos\gamma_0\cos(2\gamma_2-\beta_2)-\sin\gamma_0\sin(2\gamma_2-\beta_2))\left(\frac{\partial p_2}{\partial X_1}\right)_{X_2}}{(-\sin\gamma_0\cos(2\gamma_2-\beta_2)+\cos\gamma_0\sin(2\gamma_2-\beta_2))\left(\frac{\partial p_2}{\partial X_1}\right)_{X_2}}\left(\frac{\partial \gamma_0}{\partial X_2}\right)_{X_1}dX_2$$

Hence:

$$\frac{dT(X_1,X_2)}{T(X_1,X_2)} = \frac{\cos(2\gamma_1-\beta_1-\gamma_0)}{\sin(2\gamma_1-\beta_1-\gamma_0)}\left(\frac{\partial \gamma_0}{\partial X_1}\right)_{X_2}dX_1 + \frac{\cos(2\gamma_2-\beta_2-\gamma_0)}{\sin(2\gamma_2-\beta_2-\gamma_0)}\left(\frac{\partial \gamma_0}{\partial X_2}\right)_{X_1}dX_2$$

Clearly $$\left(\frac{\partial \gamma_0}{\partial X_1}\right)_{X_2} \text{ and } \left(\frac{\partial \gamma_0}{\partial X_2}\right)_{X_1}$$

may not both be zero in the expression for $dT(X_1,X_2)/T(X_1,X_2)$ as that would make $T(X_1,X_2)$ a constant and require the differential equation to be exact prior to the application of the integrating factor.

Now $$\left(\frac{\partial \gamma_0}{\partial X_1}\right)_{X_2} \text{ and } \left(\frac{\partial \gamma_0}{\partial X_2}\right)_{X_1}$$

may be chosen independently of each other and not only $T(X_1,X_2)$ but also $\gamma_0(X_1,X_2)$ obtained therefrom provided the expression for $dT(X_1,X_2)/T(X_1,X_2)$ and the expression $$\left(\frac{\partial \gamma_0}{\partial X_1}\right)_{X_2}dX_1 + \left(\frac{\partial \gamma_0}{\partial X_2}\right)_{X_1}dX_2$$

are integrable somehow. However, it is again convenient and not restrictive to impose the conditions that these expressions are exact differentials.

The condition that the expression for $dT(X_1,X_2)/T(X_1,X_2)$ is an exact differential is:

$$\left(\frac{\partial}{\partial X_2}\left(\frac{\cos(2\gamma_1-\beta_1-\gamma_0)}{\sin(2\gamma_1-\beta_1-\gamma_0)}\left(\frac{\partial \gamma_0}{\partial X_1}\right)_{X_2}\right)\right)_{X_1} =$$

$$\left(\frac{\partial}{\partial X_1}\left(\frac{\cos(2\gamma_2-\beta_2-\gamma_0)}{\sin(2\gamma_2-\beta_2-\gamma_0)}\left(\frac{\partial \gamma_0}{\partial X_2}\right)_{X_1}\right)\right)_{X_2} -$$

$$\csc^2(2\gamma_1-\beta_1-\gamma_0)\left(\left(\frac{\partial(2\gamma_1-\beta_1)}{\partial X_2}\right)_{X_1} - \right.$$

$$\left(\frac{\partial \gamma_0}{\partial X_2}\right)_{X_1}\left(\frac{\partial \gamma_0}{\partial X_1}\right)_{X_2} +$$

$$\cot(2\gamma_1-\beta_1-\gamma_0)\left(\frac{\partial}{\partial X_2}\left(\frac{\partial \gamma_0}{\partial X_1}\right)_{X_2}\right)_{X_1} =$$

$$-\csc^2(2\gamma_2-\beta_2-\gamma_0)\left(\left(\frac{\partial(2\gamma_2-\beta_2)}{\partial X_1}\right)_{X_2} - \right.$$

$$\left(\frac{\partial \gamma_0}{\partial X_1}\right)_{X_2}\left(\frac{\partial \gamma_0}{\partial X_2}\right)_{X_1} +$$

-continued $$\cot(2\gamma_2-\beta_2-\gamma_0)\left(\frac{\partial}{\partial X_1}\left(\frac{\partial \gamma_0}{\partial X_2}\right)_{X_1}\right)_{X_2}$$

Now $$\left(\frac{\partial(2\gamma_1 - \beta_1)}{\partial X_2}\right)_{X_1} = 0 \text{ as } 2\gamma_1 - \beta_1$$

relates to the first defining mirror only while $X_2$ relates to the second defining mirror only.

Equally $$\left(\frac{\partial(2\gamma_2 - \beta_2)}{\partial X_1}\right)_{X_2} = 0 \text{ as } 2\gamma_2 - \beta_2$$

relates to the second defining mirror only while $X_1$ relates to the first defining mirror only.

Moreover $$\left(\frac{\partial}{\partial X_2}\left(\frac{\partial \gamma_0}{\partial X_1}\right)_{X_2}\right)_{X_1} = \left(\frac{\partial}{\partial X_1}\left(\frac{\partial \gamma_0}{\partial X_2}\right)_{X_1}\right)_{X_2}$$

as the expression $$\left(\frac{\partial \gamma_0}{\partial X_1}\right)_{X_2} dX_1 + \left(\frac{\partial \gamma_0}{\partial X_2}\right)_{X_1} dX_2$$

is an exact differential, $d\gamma_0$; so that this condition can be written:

$$(\sin^2(2\gamma_2 - \beta_2 - \gamma_0) - \sin^2(2\gamma_1 - \beta_1 - \gamma_0))\left(\frac{\partial \gamma_0}{\partial X_1}\right)_{X_2}\left(\frac{\partial \gamma_0}{\partial X_2}\right)_{X_1} +$$

$$(\sin^2(2\gamma_2 - \beta_2 - \gamma_0)\sin(2\gamma_1 - \beta_1 - \gamma_0)\cos(2\gamma_1 - \beta_1 - \gamma_0) -$$

$$\sin^2(2\gamma_1 - \beta_1 - \gamma_0)\sin(2\gamma_2 - \beta_2 - \gamma_0)\cos(2\gamma_2 - \beta_2 -$$

$$\gamma_0))\left(\frac{\partial}{\partial X_1}\left(\frac{\partial \gamma_0}{\partial X_2}\right)_{X_1}\right)_{X_2} = 0$$

$$(\sin(2\gamma_2 - \beta_2 - \gamma_0) - \sin(2\gamma_1 - \beta_1 - \gamma_0))(\sin(2\gamma_2 - \beta_2 - \gamma_0) +$$

$$\sin(2\gamma_1 - \beta_1 - \gamma_0))\left(\frac{\partial \gamma_0}{\partial X_1}\right)_{X_2}\left(\frac{\partial \gamma_0}{\partial X_2}\right)_{X_1} +$$

$$\sin(2\gamma_1 - \beta_1 - \gamma_0)\sin(2\gamma_2 - \beta_2 - \gamma_0)\sin(2\gamma_2 - \beta_2 - 2\gamma_1 +$$

$$\beta_1)\left(\frac{\partial}{\partial X_1}\left(\frac{\partial \gamma_0}{\partial X_2}\right)_{X_1}\right)_{X_2} = 0$$

$$2\cos\frac{1}{2}(2\gamma_2 - \beta_2 + 2\gamma_1 - \beta_1 - 2\gamma_0)\sin\frac{1}{2}(2\gamma_2 - \beta_2 - 2\gamma_1 +$$

$$\beta_1)2\sin\frac{1}{2}(2\gamma_2 - \beta_2 + 2\gamma_1 - \beta_1 - 2\gamma_0)\cos\frac{1}{2}(2\gamma_2 - \beta_2 - 2\gamma_1 +$$

$$\beta_1)\left(\frac{\partial \gamma_0}{\partial X_1}\right)_{X_2}\left(\frac{\partial \gamma_0}{\partial X_2}\right)_{X_1} +$$

$$\sin(2\gamma_1 - \beta_1 - \gamma_0)\sin(2\gamma_2 - \beta_2 - \gamma_0)\sin(2\gamma_2 - \beta_2 - 2\gamma_1 +$$

$$\beta_1)\left(\frac{\partial}{\partial X_1}\left(\frac{\partial \gamma_0}{\partial X_2}\right)_{X_1}\right)_{X_2} = 0$$

$$\sin(2\gamma_2 - \beta_2 + 2\gamma_1 - \beta_1 - 2\gamma_0)\sin(2\gamma_2 - \beta_2 - 2\gamma_1 +$$

$$\beta_1)\left(\frac{\partial \gamma_0}{\partial X_1}\right)_{X_2}\left(\frac{\partial \gamma_0}{\partial X_2}\right)_{X_1} +$$

$$\sin(2\gamma_1 - \beta_1 - \gamma_0)\sin(2\gamma_2 - \beta_2 - \gamma_0)\sin(2\gamma_2 - \beta_2 - 2\gamma_1 +$$

$$\beta_1)\left(\frac{\partial}{\partial X_1}\left(\frac{\partial \gamma_0}{\partial X_2}\right)_{X_1}\right)_{X_2} = 0$$

As $\sin(2\gamma_2 - \beta_2 - \gamma_1 + \beta_1) = 0$ implies that the two defining rays of a pair coincide and is thus not relevant to the relationship under examination, $\sin(2\gamma_2 - \beta_2 - 2\gamma_1 + \beta_1)$ may be eliminated to leave:

$$\left(\frac{\partial}{\partial X_1}\left(\frac{\partial \gamma_0}{\partial X_2}\right)_{X_1}\right)_{X_2} =$$

$$-\frac{\sin(2\gamma_2 - \beta_2 + 2\gamma_1 - \beta_1 - 2\gamma_0)}{\sin(2\gamma_1 - \beta_1 - \gamma_0)\sin(2\gamma_2 - \beta_2 - \gamma_0)}\left(\frac{\partial \gamma_0}{\partial X_1}\right)_{X_2}\left(\frac{\partial \gamma_0}{\partial X_2}\right)_{X_1}$$

If $$\gamma_0 = \gamma_0(X_1) \text{ then } \left(\frac{\partial \gamma_0}{\partial X_2}\right)_{X_1} = 0 \text{ so that } \left(\frac{\partial}{\partial X_1}\left(\frac{\partial \gamma_0}{\partial X_2}\right)_{X_1}\right)_{X_2} = 0$$

and said condition is satisfied. Similarly if $\gamma_0 = \gamma_0(X_2)$.

If $$\gamma_0 = \gamma_0(X_1) \text{ then } \left(\frac{\partial \gamma_0}{\partial X_1}\right)_{X_2} dX_1 = d\gamma_0.$$

Since the odd numbered variables, $Y_{2j-1} \Leftrightarrow \{\theta_1, 2\beta_1, r_1\}$ in an ordered one-to-one correspondence where $j=1,2,3$, are each either the sole odd numbered variable, a function of one or more of the other odd numbered variables, or a constant; and $X_1$ relates to the first defining mirror only; $2\gamma_1 - \beta_1$ must either be a function of $X_1$ and thus of $\gamma_0$, or a constant. If $2\gamma_1 - \beta_1$ is $\gamma_0 + n\pi$ then the expression for $dT(X_1, X_2)/T(X_1, X_2)$ is infinite. Otherwise it may be integrated by quadrature if $2\gamma_1 - \beta_1$ is a constant or a function of $\gamma_0$ which allows quadrature integration.

Similarly if $\gamma_0 = \gamma_0(X_2)$ for $2\gamma_2 - \beta_2$.

If $$\gamma_0 = \gamma_0(X_1, X_2) \text{ but } \left(\frac{\partial \gamma_0}{\partial X_1}\right)_{X_2}$$

but is a non-zero constant or a function only of $X_1$ while $$\left(\frac{\partial \gamma_0}{\partial X_2}\right)_{X_1}$$

is a non-zero constant or a function only of $X_2$ then:

$$\left(\frac{\partial}{\partial X_2}\left(\frac{\partial \gamma_0}{\partial X_1}\right)_{X_2}\right)_{X_1} = \left(\frac{\partial}{\partial X_1}\left(\frac{\partial \gamma_0}{\partial X_2}\right)_{X_1}\right)_{X_2} = 0$$

and said condition becomes:

$$\sin(2\gamma_2 - \beta_2 + 2\gamma_1 - \beta_1 - 2\gamma_0)\left(\frac{\partial \gamma_0}{\partial X_1}\right)_{X_2}\left(\frac{\partial \gamma_0}{\partial X_2}\right)_{X_1} = 0$$

As neither of $$\left(\frac{\partial \gamma_0}{\partial X_1}\right)_{X_2} \text{ nor } \left(\frac{\partial \gamma_0}{\partial X_2}\right)_{X_1}$$

are zero:

$$\sin(2\gamma_2 - \beta_2 + 2\gamma_1 - \beta_1 - 2\gamma_0) = 0$$

$$2\gamma_2 - \beta_2 + 2\gamma_1 - \beta_1 - 2\gamma_0 = n\pi$$

$$\gamma_0 = \frac{2\gamma_2 - \beta_2 + 2\gamma_1 - \beta_1 - n\pi}{2}$$

as shown in FIG. 96 for n=−1.

If $\gamma_0(X_1, X_2)$ is specified in terms of an analytic function of the two variables $X_1, X_2$ as:

$$\gamma_0 = \sum_{j=0}^{\infty} \sum_{k=0}^{\infty} a_{jk} X_1^j X_2^k$$

then:-

$$\left(\frac{\partial \gamma_0}{\partial X_1}\right)_{X_2} = \sum_{j=0}^{\infty} \sum_{k=0}^{\infty} j a_{jk} X_1^{j-1} X_2^k$$

$$\left(\frac{\partial}{\partial X_2}\left(\frac{\partial \gamma_0}{\partial X_1}\right)_{X_2}\right)_{X_1} = \sum_{j=0}^{\infty} \sum_{k=0}^{\infty} jk a_{jk} X_1^{j-1} X_2^{k-1}$$

$$\left(\frac{\partial \gamma_0}{\partial X_2}\right)_{X_1} = \sum_{j=0}^{\infty} \sum_{k=0}^{\infty} k a_{jk} X_1^j X_2^{k-1}$$

$$\left(\frac{\partial}{\partial X_1}\left(\frac{\partial \gamma_0}{\partial X_2}\right)_{X_1}\right)_{X_2} = \sum_{j=0}^{\infty} \sum_{k=0}^{\infty} jk a_{jk} X_1^{j-1} X_2^{k-1}$$

so that said second derivatives arc equal and said condition becomes:

$$\sin(2\gamma_2 - \beta_2 + 2\gamma_1 - \beta_1 - 2\gamma_0)\left(\sum_{j=0}^{\infty}\sum_{k=0}^{\infty} j a_{jk} X_1^{j-1} X_2^k\right)\left(\sum_{l=0}^{\infty}\sum_{m=0}^{\infty} m a_{lm} X_1^l X_2^{m-1}\right) +$$

$$\sin(2\gamma_1 - \beta_1 - \gamma_0)\sin(2\gamma_2 - \beta_2 - \gamma_0)\sum_{j=0}^{\infty}\sum_{k=0}^{\infty} jk a_{jk} X_1^{j-1} X_2^{k-1} = 0$$

$$\sin(2\gamma_2 - \beta_2 + 2\gamma_1 - \beta_1 - 2\gamma_0)\sum_{j=0}^{\infty}\sum_{k=0}^{\infty}\sum_{l=0}^{\infty}\sum_{m=0}^{\infty} jm a_{jk} X_1^{j-1} X_2^{k-1} a_{lm} X_1^l X_2^m +$$

$$\sin(2\gamma_1 - \beta_1 - \gamma_0)\sin(2\gamma_2 - \beta_2 - \gamma_0)\sum_{j=0}^{\infty}\sum_{k=0}^{\infty} jk a_{jk} X_1^{j-1} X_2^{k-1} = 0$$

Equally if said partial derivatives of $\gamma_0$ are specified as above.

6.21.7.2 $X_1$ and $X_2$ each relate to both defining mirrors.

If both $X_1$ and $X_2$ each relate to both defining mirrors then:

$$\left(\frac{\partial x_0}{\partial X_1}\right)_{X_2} = \sum_{\substack{j \\ \text{odd}}} \left(\frac{\partial x_0}{\partial Y_j}\right)_{Y_{j \neq j}} \left(\frac{\partial Y_j}{\partial X_1}\right)_{X_2}$$

$$+ \sum_{\substack{j \\ \text{even}}} \left(\frac{\partial x_0}{\partial Y_j}\right)_{Y_{j \neq j}} \left(\frac{\partial Y_j}{\partial X_1}\right)_{X_2}$$

$$= -\cos(2\gamma_2 - \beta_2) \sum_{\substack{j \\ \text{odd}}} \left(\frac{\partial p_2}{\partial Y_j}\right)_{Y_{j \neq j}} \left(\frac{\partial Y_j}{\partial X_1}\right)_{X_2}$$

$$-\cos(2\gamma_1 - \beta_1) \sum_{\substack{j \\ \text{even}}} \left(\frac{\partial p_1}{\partial Y_j}\right)_{Y_{j \neq j}} \left(\frac{\partial Y_j}{\partial X_1}\right)_{X_2}$$

$$\left(\frac{\partial y_0}{\partial X_1}\right)_{X_2} = \sum_{\substack{j \\ \text{odd}}} \left(\frac{\partial y_0}{\partial Y_j}\right)_{Y_{j \neq j}} \left(\frac{\partial Y_j}{\partial X_1}\right)_{X_2}$$

$$+ \sum_{\substack{j \\ \text{even}}} \left(\frac{\partial y_0}{\partial Y_j}\right)_{Y_{j \neq j}} \left(\frac{\partial Y_j}{\partial X_1}\right)_{X_2}$$

$$= -\sin(2\gamma_2 - \beta_2) \sum_{\substack{j \\ \text{odd}}} \left(\frac{\partial p_2}{\partial Y_j}\right)_{Y_{j \neq j}} \left(\frac{\partial Y_j}{\partial X_1}\right)_{X_2}$$

$$-\sin(2\gamma_1 - \beta_1) \sum_{\substack{j \\ \text{even}}} \left(\frac{\partial p_1}{\partial Y_j}\right)_{Y_{j \neq j}} \left(\frac{\partial Y_j}{\partial X_1}\right)_{X_2}$$

$$\left(\frac{\partial x_0}{\partial X_2}\right)_{X_1} = \sum_{\substack{j \\ \text{odd}}} \left(\frac{\partial x_0}{\partial Y_j}\right)_{Y_{j \neq j}} \left(\frac{\partial Y_j}{\partial X_2}\right)_{X_1}$$

$$+ \sum_{\substack{j \\ \text{even}}} \left(\frac{\partial x_0}{\partial Y_j}\right)_{Y_{j \neq j}} \left(\frac{\partial Y_j}{\partial X_2}\right)_{X_1}$$

$$= -\cos(2\gamma_2 - \beta_2) \sum_{\substack{j \\ \text{odd}}} \left(\frac{\partial p_2}{\partial Y_j}\right)_{Y_{j \neq j}} \left(\frac{\partial Y_j}{\partial X_2}\right)_{X_1}$$

$$-\cos(2\gamma_1 - \beta_1) \sum_{\substack{j \\ \text{even}}} \left(\frac{\partial p_1}{\partial Y_j}\right)_{Y_{j \neq j}} \left(\frac{\partial Y_j}{\partial X_2}\right)_{X_1}$$

$$\left(\frac{\partial y_0}{\partial X_2}\right)_{X_1} = \sum_{\substack{j \\ \text{odd}}} \left(\frac{\partial y_0}{\partial Y_j}\right)_{Y_{j \neq j}} \left(\frac{\partial Y_j}{\partial X_2}\right)_{X_1}$$

$$+ \sum_{\substack{j \\ \text{even}}} \left(\frac{\partial y_0}{\partial Y_j}\right)_{Y_{j \neq j}} \left(\frac{\partial Y_j}{\partial X_2}\right)_{X_1}$$

$$= -\sin(2\gamma_2 - \beta_2) \sum_{\substack{j \\ \text{odd}}} \left(\frac{\partial p_2}{\partial Y_j}\right)_{Y_{j \neq j}} \left(\frac{\partial Y_j}{\partial X_2}\right)_{X_1}$$

$$-\sin(2\gamma_1 - \beta_1) \sum_{\substack{j \\ \text{even}}} \left(\frac{\partial p_1}{\partial Y_j}\right)_{Y_{j \neq j}} \left(\frac{\partial Y_j}{\partial X_2}\right)_{X_1}$$

and the expression for the integrating factor becomes:

$$\frac{dT(X_1,X_2)}{T(X_1,X_2)} = \frac{\left(\begin{array}{c}\cos(2\gamma_2-\beta_2-\gamma_0)\sum\limits_{\substack{j\\\text{odd}}}\left(\frac{\partial p_2}{\partial Y_j}\right)_{Y_{j\neq j}}\left(\frac{\partial Y_j}{\partial X_1}\right)_{X_2}+\\\cos(2\gamma_1-\beta_1-\gamma_0)\sum\limits_{\substack{j\\\text{even}}}\left(\frac{\partial p_1}{\partial Y_j}\right)_{Y_{j\neq j}}\left(\frac{\partial Y_j}{\partial X_1}\right)_{X_2}\end{array}\right)}{\left(\begin{array}{c}\sin(2\gamma_2-\beta_2-\gamma_0)\sum\limits_{\substack{j\\\text{odd}}}\left(\frac{\partial p_2}{\partial Y_j}\right)_{Y_{j\neq j}}\left(\frac{\partial Y_j}{\partial X_1}\right)_{X_2}+\\\sin(2\gamma_1-\beta_1-\gamma_0)\sum\limits_{\substack{j\\\text{even}}}\left(\frac{\partial p_1}{\partial Y_j}\right)_{Y_{j\neq j}}\left(\frac{\partial Y_j}{\partial X_1}\right)_{X_2}\end{array}\right)}\left(\frac{\partial\gamma_0}{\partial X_2}\right)_{X_1}dX_2+$$

$$\frac{\left(\begin{array}{c}\cos(2\gamma_2-\beta_2-\gamma_0)\sum\limits_{\substack{j\\\text{odd}}}\left(\frac{\partial p_2}{\partial Y_j}\right)_{Y_{j\neq j}}\left(\frac{\partial Y_j}{\partial X_2}\right)_{X_1}+\\\cos(2\gamma_1-\beta_1-\gamma_0)\sum\limits_{\substack{j\\\text{even}}}\left(\frac{\partial p_1}{\partial Y_j}\right)_{Y_{j\neq j}}\left(\frac{\partial Y_j}{\partial X_2}\right)_{X_1}\end{array}\right)}{\left(\begin{array}{c}\sin(2\gamma_2-\beta_2-\gamma_0)\sum\limits_{\substack{j\\\text{odd}}}\left(\frac{\partial p_2}{\partial Y_j}\right)_{Y_{j\neq j}}\left(\frac{\partial Y_j}{\partial X_2}\right)_{X_1}+\\\sin(2\gamma_1-\beta_1-\gamma_0)\sum\limits_{\substack{j\\\text{even}}}\left(\frac{\partial p_1}{\partial Y_j}\right)_{Y_{j\neq j}}\left(\frac{\partial Y_j}{\partial X_2}\right)_{X_1}\end{array}\right)}\left(\frac{\partial\gamma_0}{\partial X_1}\right)_{X_2}dX_1$$

while the family of differential equations becomes:

$$\sum_{i=1}^{2}\left(\sin(2\gamma_2-\beta_2-\gamma_0)\sum\limits_{\substack{j\\\text{odd}}}\left(\frac{\partial p_2}{\partial Y_j}\right)_{Y_{j\neq j}}\left(\frac{\partial Y_j}{\partial X_i}\right)_{X_{i'\neq i}}+\sin(2\gamma_1-\beta_1-\gamma_0)\sum\limits_{\substack{j\\\text{even}}}\left(\frac{\partial p_1}{\partial Y_j}\right)_{Y_{j\neq j}}\left(\frac{\partial Y_j}{\partial X_i}\right)_{X_{i'\neq i}}\right)dX_i=0$$

so that:-

-continued $$\frac{dT(X_1,X_2)}{T(X_1,X_2)} = \frac{\left(\left(\cos(2\gamma_2-\beta_2-\gamma_0)\sum_{j\,\text{odd}}\left(\frac{\partial p_2}{\partial Y_j}\right)_{Y_{j\neq j}}\left(\frac{\partial Y_j}{\partial X_1}\right)_{X_2}+\cos(2\gamma_1-\beta_1-\gamma_0)\sum_{j\,\text{even}}\left(\frac{\partial p_1}{\partial Y_j}\right)_{Y_{j\neq j}}\left(\frac{\partial Y_j}{\partial X_1}\right)_{X_2}\right)\left(\frac{\partial\gamma_0}{\partial X_2}\right)_{X_1}-\left(\cos(2\gamma_2-\beta_2-\gamma_0)\sum_{j\,\text{odd}}\left(\frac{\partial p_2}{\partial Y_j}\right)_{Y_{j\neq j}}\left(\frac{\partial Y_j}{\partial X_2}\right)_{X_1}+\cos(2\gamma_1-\beta_1-\gamma_0)\sum_{j\,\text{even}}\left(\frac{\partial p_1}{\partial Y_j}\right)_{Y_{j\neq j}}\left(\frac{\partial Y_j}{\partial X_2}\right)_{X_1}\right)\left(\frac{\partial\gamma_0}{\partial X_1}\right)_{X_2}\right)}{\left(\sin(2\gamma_2-\beta_2-\gamma_0)\sum_{j\,\text{odd}}\left(\frac{\partial p_2}{\partial Y_j}\right)_{Y_{j\neq j}}\left(\frac{\partial Y_j}{\partial X_1}\right)_{X_2}+\sin(2\gamma_1-\beta_1-\gamma_0)\sum_{j\,\text{even}}\left(\frac{\partial p_1}{\partial Y_j}\right)_{Y_{j\neq j}}\left(\frac{\partial Y_j}{\partial X_1}\right)_{X_2}\right)}\,dX_2$$

$$=\frac{\left(\left(\cos(2\gamma_2-\beta_2-\gamma_0)\sum_{j\,\text{odd}}\left(\frac{\partial p_2}{\partial Y_j}\right)_{Y_{j\neq j}}\left(\frac{\partial Y_j}{\partial X_2}\right)_{X_1}+\cos(2\gamma_1-\beta_1-\gamma_0)\sum_{j\,\text{even}}\left(\frac{\partial p_1}{\partial Y_j}\right)_{Y_{j\neq j}}\left(\frac{\partial Y_j}{\partial X_2}\right)_{X_1}\right)\left(\frac{\partial\gamma_0}{\partial X_1}\right)_{X_2}-\left(\cos(2\gamma_2-\beta_2-\gamma_0)\sum_{j\,\text{odd}}\left(\frac{\partial p_2}{\partial Y_j}\right)_{Y_{j\neq j}}\left(\frac{\partial Y_j}{\partial X_1}\right)_{X_2}+\cos(2\gamma_1-\beta_1-\gamma_0)\sum_{j\,\text{even}}\left(\frac{\partial p_1}{\partial Y_j}\right)_{Y_{j\neq j}}\left(\frac{\partial Y_j}{\partial X_1}\right)_{X_2}\right)\left(\frac{\partial\gamma_0}{\partial X_2}\right)_{X_1}\right)}{\left(\sin(2\gamma_2-\beta_2-\gamma_0)\sum_{j\,\text{odd}}\left(\frac{\partial p_2}{\partial Y_j}\right)_{Y_{j\neq j}}\left(\frac{\partial Y_j}{\partial X_2}\right)_{X_1}+\sin(2\gamma_1-\beta_1-\gamma_0)\sum_{j\,\text{even}}\left(\frac{\partial p_1}{\partial Y_j}\right)_{Y_{j\neq j}}\left(\frac{\partial Y_j}{\partial X_2}\right)_{X_1}\right)}\,dX_1$$

by the respective elimination of $dX_1$ and $dX_2$ together with their denominators using the differential equation as before.

As $X_1$ may have any definition provided it relates to both defining mirrors, as may $X_2$, it suffices for $\gamma_0$ to be specified in terms of only one of said variables. Indeed $X_1, X_2$ are interchangeable, since each of them is related to both defining mirrors, so that it is only necessary to consider one of the two possible definitions.

If $$\gamma_0 = \gamma_0(X_2) \text{ then } \left(\frac{\partial\gamma_0}{\partial X_1}\right)_{X_2} = 0$$

and the above expressions reduce to:

$$\frac{dT(X_1, X_2)}{T(X_1, X_2)} = \frac{\left(\cos(2\gamma_2 - \beta_2 - \gamma_0)\sum_{\substack{j\\ \text{odd}}}\left(\frac{\partial p_2}{\partial Y_j}\right)_{Y_{j\neq j}}\left(\frac{\partial Y_j}{\partial X_1}\right)_{X_2} + \cos(2\gamma_1 - \beta_1 - \gamma_0)\sum_{\substack{j\\ \text{even}}}\left(\frac{\partial p_1}{\partial Y_j}\right)_{Y_{j\neq j}}\left(\frac{\partial Y_j}{\partial X_1}\right)_{X_2}\right)}{\left(\sin(2\gamma_2 - \beta_2 - \gamma_0)\sum_{\substack{j\\ \text{odd}}}\left(\frac{\partial p_2}{\partial Y_j}\right)_{Y_{j\neq j}}\left(\frac{\partial Y_j}{\partial X_1}\right)_{X_2} + \sin(2\gamma_1 - \beta_1 - \gamma_0)\sum_{\substack{j\\ \text{even}}}\left(\frac{\partial p_1}{\partial Y_j}\right)_{Y_{j\neq j}}\left(\frac{\partial Y_j}{\partial X_1}\right)_{X_2}\right)}\left(\frac{\partial \gamma_0}{\partial X_2}\right)_{X_1} dX_2$$

$$= \frac{\left(\cos(2\gamma_2 - \beta_2 - \gamma_0)\sum_{\substack{j\\ \text{odd}}}\left(\frac{\partial p_2}{\partial Y_j}\right)_{Y_{j\neq j}}\left(\frac{\partial Y_j}{\partial X_1}\right)_{X_2} + \cos(2\gamma_1 - \beta_1 - \gamma_0)\sum_{\substack{j\\ \text{even}}}\left(\frac{\partial p_1}{\partial Y_j}\right)_{Y_{j\neq j}}\left(\frac{\partial Y_j}{\partial X_1}\right)_{X_2}\right)}{\left(\sin(2\gamma_2 - \beta_2 - \gamma_0)\sum_{\substack{j\\ \text{odd}}}\left(\frac{\partial p_2}{\partial Y_j}\right)_{Y_{j\neq j}}\left(\frac{\partial Y_j}{\partial X_2}\right)_{X_1} + \sin(2\gamma_1 - \beta_1 - \gamma_0)\sum_{\substack{j\\ \text{even}}}\left(\frac{\partial p_1}{\partial Y_j}\right)_{Y_{j\neq j}}\left(\frac{\partial Y_j}{\partial X_2}\right)_{X_1}\right)}\left(\frac{\partial \gamma_0}{\partial X_2}\right)_{X_1} dX_1$$

For the first alternative to be integrated by quadrature on its own, it is necessary to eliminate $X_1$ from it, as expressions involving the independent variables $X_1$ and $dX_2$ cannot be integrated by quadrature. Such an elimination can, however, only be made when the value of $X_1$ is restricted to the solutions of certain equations.

For the second alternative to be integrated by quadrature on its own, it is necessary to eliminate $X_2$ and $\gamma_0(X_2)$ from it, as expressions involving the independent variables $X_2$ and $dX_1$ cannot be integrated by quadrature. It should be noted that $$\left(\frac{\partial \gamma_0}{\partial X_2}\right)_{X_1}$$

may be a function of $X_2$.

An example of such an elimination for one specification of $\gamma_0 = \gamma_0(X_2)$ and the subsequent integration to obtain the corresponding integrating factor together with the consequent solution of the corresponding member of the family of differential equations will now be given.

6.21.7.2.1 Expression involving $dX_1$

The fundamental choice is that of $\gamma_0$, which, if not a constant, must be specified in terms of one or more other variable(s). As $\gamma_0$ is to be specified as a function of $X_2$ here and both $\gamma_0$ and $X_2$ have to be eliminated, the choice of $X_2$ must be considered before the choice of $X_1$.

However, the choice of $X_2$ is considered before the choice of $\gamma_0$ because each choice of $X_2$ gives rise to more than one choice of $\gamma_0$. Moreover, it happens that even the most generalised choice of $X_2$ immediately suggests a related choice for $X_1$.

$X_2$ relates to both defining mirrors. Since the odd numbered variables $Y_{2j-1}$ where $j=1,2,3$ are each either the sole odd numbered variable, functions of one or more of the other odd numbered variables, or constants; and the even numbered variables $Y_{2k}$ where $k=1,2,3$ are each either the sole even numbered variable, functions of one or more of the other even numbered variables, or constants; it is sufficient to define $X_2$ in terms of a function of an odd numbered variable and a function of its corresponding even numbered variable:

$$X_2 = F(Y_{2j}) + G(Y_{2j-1})$$

There is no obvious restriction on the choice of $X_1$ other than that $X_1$ also relates to both defining mirrors. It may therefore be defined as:

$$X_1 = F(Y_{2j}) - G(Y_{2j-1})$$

which has the advantage that:

$$F(Y_{2j}) = \frac{X_2 + X_1}{2}$$

and $$G(Y_{2j-1}) = \frac{X_2 - X_1}{2}$$

The radius of a single axially symmetric defining mirror comprising a portion of a hemisphere whose centre lies at the pole is specified by $r_1 = c$ where $c$ is a positive constant, as the radius in a system of polar co-ordinates is always positive by convention; and $r_2 = c$. The pole, which is also the origin O, must, of course, lie on the axis of symmetry for such a defining mirror.

The radius co-ordinate of a single axially symmetric defining mirror may be specified by $$r_1 = c\sin^{\frac{1}{a-1}}((a-1)\theta_1 + b)$$

where a=−a* and $$c = (k_0^{-1}(1+a^3))^{\frac{-1}{1+a^3}}$$

which may be negative as well as positive but not zero. Also $$r_2 = c\sin^{\frac{1}{a-1}}((a-1)\theta_2 + b).$$

In both these cases $\gamma_1 = a\theta_1 + b$ and $\gamma_2 = a\theta_2 + b$.
If, in addition, $X_1 = a\theta_2 - a\theta_1$ and $X_2 = a\theta_2 + a\theta_1$ then:

$$a\theta_1 = \frac{1}{2}(X_2 - X_1) \quad a\theta_2 = \frac{1}{2}(X_2 + X_1)$$

$$\left(\frac{\partial \theta_1}{\partial X_1}\right)_{X_2} = -\frac{1}{2a} \quad \left(\frac{\partial \theta_2}{\partial X_1}\right)_{X_2} = \frac{1}{2a}$$

$$\left(\frac{\partial \theta_1}{\partial X_2}\right)_{X_1} = \frac{1}{2a} \quad \left(\frac{\partial \theta_2}{\partial X_2}\right)_{X_1} = \frac{1}{2a}$$

$$2\gamma_1 - \beta_1 = 2a\theta_1 + 2b - \beta_1 = X_2 - X_1 + 2b - \beta_1$$

$$2\gamma_2 - \beta_2 = 2a\theta_2 + 2b - \beta_2 = X_2 + X_1 + 2b - \beta_2$$

$$\theta_1 - 2\gamma_1 + \beta_1 = \frac{1}{2a}(X_2 - X_1) - X_2 + X_1 - 2b + \beta_1$$

$$= \left(\frac{1}{2a} - 1\right)X_2 - \left(\frac{1}{2a} - 1\right)X_1 - 2b + \beta_1$$

$$\theta_2 - 2\gamma_2 + \beta_2 = \frac{1}{2a}(X_2 + X_1) - X_2 - X_1 - 2b + \beta_2$$

$$= \left(\frac{1}{2a} - 1\right)X_2 + \left(\frac{1}{2a} - 1\right)X_1 - 2b + \beta_2$$

$$\theta_1 - 2\gamma_2 + \beta_2 = \frac{1}{2a}(X_2 - X_1) - X_2 + X_1 - 2b + \beta_2$$

$$= \left(\frac{1}{2a} - 1\right)X_2 - \left(\frac{1}{2a} + 1\right)X_1 - 2b + \beta_2$$

$$\theta_2 - 2\gamma_1 + \beta_1 = \frac{1}{2a}(X_2 + X_1) - X_2 + X_1 - 2b + \beta_1$$

$$= \left(\frac{1}{2a} - 1\right)X_2 + \left(\frac{1}{2a} + 1\right)X_1 - 2b + \beta_1$$

In many practical applications the output angles of the defining rays, $\beta_1$ and $\beta_2$, are constant or vary only slowly with $\theta_1$ and $\theta_2$ respectively. Thus if the specification for the defined surface is split up into several parts, $\beta_1$ and $\beta_2$ may each be regarded as particular constants throughout each individual part.

If both $\beta_1$ and $\beta_2$ are "locally" constant then the following partial derivatives are independent of $X_1$ and $X_2$:

$$\left(\frac{\partial(2\gamma_1 - \beta_1)}{\partial X_1}\right)_{X_2} = -1 \quad \left(\frac{\partial(2\gamma_2 - \beta_2)}{\partial X_1}\right)_{X_2} = 1$$

$$\left(\frac{\partial(2\gamma_1 - \beta_1)}{\partial X_2}\right)_{X_1} = 1 \quad \left(\frac{\partial(2\gamma_2 - \beta_2)}{\partial X_2}\right)_{X_1} = 1$$

Clearly an alternative definition of $X_1$ and $X_2$ in terms of $2\gamma_1 - \beta_1$ and $2\gamma_2 - \beta_2$ to be $X_1 = 2\gamma_2 - \beta_2 - 2\gamma_1 + \beta_1$ and $X_2 = 2\gamma_2 - \beta_2 + 2\gamma_1 - \beta_1$ gives a very similar result.

6.21.7.2.1.1 The circle whose centre lies at the origin

If there is a single axially symmetric defining mirror comprising a portion of a hemisphere whose centre lies at the pole O then a=1. Moreover, as $\theta_1$ and $\theta_2$ must either be both greater than or both less than $\pi/2$ for such a mirror, $b = -\pi/2$ for acute angles of $\gamma_1$ and $\gamma_2$ and obtuse angles of $\theta_1$ and $\theta_2$ while $b = \pi/2$ for obtuse angles of $\gamma_1$ and $\gamma_2$ and acute angles of $\theta_1$ and $\theta_2$. Furthermore $r_2 = r_1$, a constant; so that:

$$\left(\frac{\partial r_1}{\partial X_1}\right)_{X_2} = \left(\frac{\partial r_2}{\partial X_1}\right)_{X_2} = 0 \quad \left(\frac{\partial r_1}{\partial X_2}\right)_{X_1} = \left(\frac{\partial r_2}{\partial X_2}\right)_{X_1} = 0$$

An example for $b = -\pi/2$ shown on FIG. 97.

6.21.7.2.1.1.1 Numerator of the expressions involving one differential

The numerator common to both the expressions involving one differential is:

$$\cos(2\gamma_2 - \beta_2 - \gamma_0)\sum_{\substack{j \\ \text{odd}}}\left(\frac{\partial p_2}{\partial Y_j}\right)_{Y_{j\neq j}}\left(\frac{\partial Y_j}{\partial X_1}\right)_{X_2} + \cos(2\gamma_1 - \beta_1 - \gamma_0)\sum_{\substack{j \\ \text{even}}}\left(\frac{\partial p_1}{\partial Y_j}\right)_{Y_{j\neq j}}\left(\frac{\partial Y_j}{\partial X_1}\right)_{X_2} =$$

$$\frac{1}{\sin^2(2\gamma_1 - \beta_1 - 2\gamma_2 + \beta_2)}\left(\sin(2\gamma_1 - \beta_1 - 2\gamma_2 + \beta_2)\left(\cos(2\gamma_2 - \beta_2 - \gamma_0)\cos(\theta_1 - 2\gamma_1 + \beta_1)r_1\left(\frac{\partial \theta_1}{\partial X_1}\right)_{X_2} - \right.\right.$$

$$\cos(2\gamma_1 - \beta_1 - \gamma_0)\cos(\theta_2 - 2\gamma_2 + \beta_2)r_2\left(\frac{\partial \theta_1}{\partial X_1}\right)_{X_2}\right) + \cos(2\gamma_2 - \beta_2 - \gamma_0)(r_2\sin(\theta_2 - 2\gamma_2 + \beta_2) - r_1\sin(\theta_1 - 2\gamma + \beta_2))\left(\frac{\partial(2\gamma_1 - \beta_1)}{\partial X_1}\right)_{X_2} -$$

$$\cos(2\gamma_1 - \beta_1 - \gamma_0)(r_2\sin(\theta_2 - 2\gamma_1 + \beta_1) - r_1\sin(\theta_1 - 2\gamma_1 + \beta_1))\left(\frac{\partial(2\gamma_2 - \beta_2)}{\partial X_1}\right)_{X_2}\right) =$$

-continued $$\frac{r_1}{\sin^2(-2X_1 - \beta_1 + \beta_2)} \left( \sin(-2X_1 - \beta_1 + \beta_2) \left( \cos(X_2 + X_1 + 2b - \beta_2 - \gamma_0)\cos\left( -\frac{1}{2}X_2 + \frac{1}{2}X_1 - 2b + \beta_1 \right)\left( -\frac{1}{2} \right) - \right. \right.$$

$$\cos(X_2 - X_1 + 2b - \beta_1 - \gamma_0)\cos\left( -\frac{1}{2}X_2 - \frac{1}{2}X_1 - 2b + \beta_2 \right)\frac{1}{2} \right) + \cos(X_2 + X_1 + 2b - \beta_2 - \gamma_0) \left( \sin\left( -\frac{1}{2}X_2 - \frac{1}{2}X_1 - 2b + \beta_2 \right) - \right.$$

$$\sin\left( -\frac{1}{2}X_2 - \frac{3}{2}X_1 - 2b + \beta_2 \right) \right) (-1) - \cos(X_2 - X_1 + 2b - \beta_1 - \gamma_0) \left( \sin\left( -\frac{1}{2}X_2 + \frac{3}{2}X_1 - 2b + \beta_1 \right) - \right.$$

$$\sin\left( -\frac{1}{2}X_2 + \frac{1}{2}X_1 - 2b + \beta_1 \right) \right) \right) = \frac{r_1}{2\sin^2(2X_1 + \beta_1 - \beta_2)} \left( \frac{1}{2} \sin(2X_1 + \beta_1 - \beta_2) \left( \cos\left( \frac{1}{2}X_2 + \frac{3}{2}X_1 + \beta_1 - \beta_2 - \gamma_0 \right) + \right. \right.$$

$$\cos\left( \frac{3}{2}X_2 + \frac{1}{2}X_1 + 4b - \beta_1 - \beta_2 - \gamma_0 \right) + \cos\left( \frac{1}{2}X_2 - \frac{3}{2}X_1 - \beta_1 + \beta_2 - \gamma_0 \right) + \cos\left( \frac{3}{2}X_2 - \frac{1}{2}X_1 + 4b - \beta_1 - \beta_2 - \gamma_0 \right) \right) -$$

$$\sin\left( \frac{1}{2}X_2 + \frac{1}{2}X_1 - \gamma_0 \right) + \sin\left( \frac{3}{2}X_2 + \frac{3}{2}X_1 + 4b - 2\beta_2 - \gamma_0 \right) + \sin\left( \frac{1}{2}X_2 - \frac{1}{2}X_1 - \gamma_0 \right) - \sin\left( \frac{3}{2}X_2 - \frac{5}{2}X_1 + 4b - 2\beta_2 - \gamma_0 \right) -$$

$$\sin\left( \frac{1}{2}X_2 + \frac{1}{2}X_1 - \gamma_0 \right) + \sin\left( \frac{3}{2}X_2 - \frac{5}{2}X_1 + 4b - 2\beta_1 - \gamma_0 \right) + \sin\left( \frac{1}{2}X_2 - \frac{1}{2}X_1 - \gamma_0 \right) - \sin\left( \frac{3}{2}X_2 - \frac{3}{2}X_1 + 4b - 2\beta_1 - \gamma_0 \right) \right) =$$

$$\frac{r_1}{2\sin^2(2X_1 + \beta_1 - \beta_2)} \left( \frac{1}{2} \sin(2X_1 + \beta_1 - \beta_2) \left( \cos\left( \frac{1}{2}X_2 - \gamma_0 \right)\cos\left( \frac{3}{2}X_1 + \beta_1 - \beta_2 \right) + \right. \right.$$

$$\cos\left( \frac{3}{2}X_2 + 4b - \beta_1 - \beta_2 - \gamma_0 \right)\cos\frac{1}{2}X_1 \right) - 2\cos\left( \frac{1}{2}X_2 - \gamma_0 \right)\sin\frac{1}{2}X_1 + \cos\left( \frac{3}{2}X_2 + 4b - \beta_1 - \beta_2 - \gamma_0 \right)\sin\left( \frac{3}{2}X_1 + \beta_1 - \beta_2 \right) -$$

$$\cos\left( \frac{3}{2}X_2 + 4b - \beta_1 - \beta_2 - \gamma_0 \right)\sin\left( \frac{5}{2}X_1 + \beta_1 - \beta_2 \right) \right) = \frac{r_1}{\sin^2(2X_1 + \beta_1 - \beta_2)} \left( \frac{1}{2} \sin(2X_1 + \beta_1 - \beta_2) \left( \cos\left( \frac{1}{2}X_2 - \right. \right. \right.$$

$$\gamma_0 \right)\cos\left( \frac{3}{2}X_1 + \beta_1 - \beta_2 \right) + \cos\left( \frac{3}{2}X_2 + 4b - \beta_1 - \beta_2 - \gamma_0 \right)\cos\frac{1}{2}X_1 \right) - 2\cos\left( \frac{1}{2}X_2 - \gamma_0 \right)\sin\frac{1}{2}X_1 -$$

$$\cos\left( \frac{3}{2}X_2 + 4b - \beta_1 - \beta_2 - \gamma_0 \right)2\cos(2X_1 + \beta_1 - \beta_2)\sin\frac{1}{2}X_1 \right) = \frac{r_1}{2\sin^2(2X_1 + \beta_1 - \beta_2)} \left( \cos\left( \frac{3}{2}X_2 + 4b - \beta_1 - \beta_2 - \gamma_0 \right)\sin(2X_1 + \right.$$

$$\beta_1 - \beta_2)\cos\frac{1}{2}X_1 - 4\cos(2X_1 + \beta_1 - \beta_2)\sin\frac{1}{2}X_1 \right) + \cos\left( \frac{1}{2}X_2 - \gamma_0 \right) \left( \sin(2X_1 + \beta_1 - \beta_2)\cos\left( \frac{3}{2}X_1 + \beta_1 - \beta_2 \right) - 4\sin\frac{1}{2}X_1 \right) \right)$$

35

6.21.7.2.1.1.2 Denominator of the expression involving $dX_1$

The denominator of the expression involving $dX_1$ and also the factor of $dX_2$ in the differential equation is:

$$\sin(2\gamma_2 - \beta_2 - \gamma_0) \sum_{\substack{j \\ \text{odd}}} \left( \frac{\partial p_2}{\partial Y_j} \right)_{Y_{j \neq j}} \left( \frac{\partial Y_j}{\partial X_2} \right)_{X_1} + \sin(2\gamma_1 - \beta_1 - \gamma_0) \sum_{\substack{j \\ \text{even}}} \left( \frac{\partial p_1}{\partial Y_j} \right)_{Y_{j \neq j}} \left( \frac{\partial Y_j}{\partial X_2} \right)_{X_1} =$$

$$\frac{1}{\sin^2(2\gamma_1 - \beta_1 - 2\gamma_2 + \beta_2)} \left( \sin(2\gamma_1 - \beta_1 - 2\gamma_2 + \beta_2) \left( \sin(2\gamma_2 - \beta_2 - \gamma_0)\cos(\theta_1 - 2\gamma_1 + \beta_1)r_1 \left( \frac{\partial \theta_1}{\partial X_2} \right)_{X_1} - \right. \right.$$

$$\sin(2\gamma_1 - \beta_1 - \gamma_0)\cos(\theta_2 - 2\gamma_2 + \beta_2)r_2 \left( \frac{\partial \theta_2}{\partial X_2} \right)_{X_1} \right) + \sin(2\gamma_2 - \beta_2 - \gamma_0)(r_2\sin(\theta_2 - 2\gamma_2 + \beta_2) - r_1\sin(\theta_1 - 2\gamma_2 + \beta_2)) \left( \frac{\partial (2\gamma_1 - \beta_1)}{\partial X_2} \right)_{X_1} -$$

$$\sin(2\gamma_1 - \beta_1 - \gamma_0)(r_2\sin(\theta_2 - 2\gamma_1 + \beta_1) - r_1\sin(\theta_1 - 2\gamma_1 + \beta_1)) \left( \frac{\partial (2\gamma_2 - \beta_2)}{\partial X_2} \right)_{X_1} \right) =$$

$$\frac{r_1}{\sin^2(-2X_1 - \beta_1 + \beta_2)} \left( \sin(-2X_1 - \beta_1 + \beta_2) \left( \sin(X_2 + X_1 + 2b - \beta_2 - \gamma_0)\cos\left( -\frac{1}{2}X_2 + \frac{1}{2}X_1 - 2b + \beta_1 \right)\frac{1}{2} - \right. \right.$$

$$\sin(X_2 - X_1 + 2b - \beta_1 - \gamma_0)\cos\left( -\frac{1}{2}X_2 - \frac{1}{2}X_1 - 2b + \beta_2 \right)\frac{1}{2} \right) + \sin(X_2 + X_1 + 2b - \beta_2 - \gamma_0) \left( \sin\left( -\frac{1}{2}X_2 - \frac{1}{2}X_1 - 2b + \beta_2 \right) - \right.$$

$$\sin\left( -\frac{1}{2}X_2 - \frac{3}{2}X_1 - 2b + \beta_2 \right) \right) - \sin(X_2 - X_1 - 2b - \beta_1 - \gamma_0)\sin\left( -\frac{1}{2}X_2 + \frac{3}{2}X_1 - 2b + \beta_1 \right) -$$

$$\sin\left( -\frac{1}{2}X_2 + \frac{1}{2}X_1 - 2b + \beta_1 \right) \right) \right) = \frac{r_1}{2\sin^2(2X_1 + \beta_1 - \beta_2)} \left( -\frac{1}{2} \sin(2X_1 + \beta_1 - \beta_2) \left( \sin\left( \frac{1}{2}X_2 + \frac{3}{2}X_1 + \beta_1 - \beta_2 - \gamma_0 \right) + \right. \right.$$

$$\sin\left( \frac{3}{2}X_2 + \frac{1}{2}X_1 + 4b - \beta_1 - \beta_2 - \gamma_0 \right) - \sin\left( \frac{1}{2}X_2 - \frac{3}{2}X_1 - \beta_1 + \beta_2 - \gamma_0 \right) - \sin\left( \frac{3}{2}X_2 - \frac{1}{2}X_1 + 4b - \beta_1 - \beta_2 - \gamma_0 \right) \right) +$$

$$\cos\left( \frac{3}{2}X_2 + \frac{3}{2}X_1 + 4b - 2\beta_2 - \gamma_0 \right) - \cos\left( \frac{1}{2}X_2 + \frac{1}{2}X_1 - \gamma_0 \right) - \cos\left( \frac{3}{2}X_2 - \frac{5}{2}X_1 + 4b - 2\beta_2 - \gamma_0 \right) + \cos\left( \frac{1}{2}X_2 - \frac{1}{2}X_1 - \gamma_0 \right) -$$

-continued $$\cos\left(\frac{3}{2}X_2 - \frac{5}{2}X_1 + 4b - 2\beta_1 - \gamma_0\right) + \cos\left(\frac{1}{2}X_2 - \frac{1}{2}X_1 - \gamma_0\right) + \cos\left(\frac{3}{2}X_2 - \frac{3}{2}X_1 + 4b - 2\beta_1 - \gamma_0\right) - \cos\left(\frac{1}{2}X_2 - \frac{1}{2}X_1 - \gamma_0\right)\right) =$$

$$\frac{r_1}{2\sin^2(2X_1 + \beta_1 - \beta_2)} \left(-\frac{1}{2}\sin(2X_1 + \beta_1 - \beta_2)\left(\cos\left(\frac{1}{2}X_2 - \gamma_0\right)\sin\left(\frac{3}{2}X_1 + \beta_1 - \beta_2\right) + \right.\right.$$

$$\cos\left(\frac{3}{2}X_2 + 4b - \beta_1 - \beta_2 - \gamma_0\right)\sin\frac{1}{2}X_1\right) + \cos\left(\frac{3}{2}X_2 + 4b - \beta_1 - \beta_2 - \gamma_0\right)\cos\left(\frac{3}{2}X_1 + \beta_1 - \beta_2\right) -$$

$$\cos\left(\frac{3}{2}X_2 + 4b - \beta_1 - \beta_2 - \gamma_0\right)\cos\left(\frac{5}{2}X_1 + \beta_1 - \beta_1\right)\right) = \frac{r_1}{2\sin^2(2X_1 + \beta_1 - \beta_2)} \left(-\frac{1}{2}\sin(2X_1 + \beta_1 - \beta_2)\left(\cos\left(\frac{1}{2}X_2 - \right.\right.\right.$$

$$\gamma_0)\sin\left(\frac{3}{2}X_1 + \beta_1 - \beta_2\right) + \cos\left(\frac{3}{2}X_2 + 4b - \beta_1 - \beta_2 - \gamma_0\right)\sin\frac{1}{2}X_1\right) + \cos\left(\frac{3}{2}X_2 + 4b - \beta_1 - \beta_2 - \gamma_0\right)2\sin(2X_1 +$$

$$\beta_1 - \beta_2)\sin\frac{1}{2}X_1\right) = \frac{r_1}{2\sin^2(2X_1 + \beta_1 - \beta_2)} \left(3\cos\left(\frac{3}{2}X_2 + 4b - \beta_1 - \beta_2 - \gamma_0\right)\sin\frac{1}{2}X_1 - \cos\left(\frac{1}{2}X_2 - \gamma_0\right)\sin\left(\frac{3}{2}X_1 + \beta_1 - \beta_2\right)\right)$$

6.21.7.2.1.1.3 Integrating factor for the circle centred at the origin

If $\cos(\frac{1}{2}X_2 - \gamma_0) = 0$ so that $\cos(\frac{3}{2}X_2 + 4b - \beta_1 - \beta_2 - \gamma_0)$ may be removed from the expression for the integrating factor then $$\frac{1}{2}X_2 - \gamma_0 = \pm \frac{1}{2}\pi, \gamma_0 = \frac{1}{2}X_2 \mp \frac{1}{2}\pi, \left(\frac{\partial\gamma_0}{\partial X_2}\right)_{X_1} = \frac{1}{2}$$

and $dT(X_1,X_2))/T(X_1,X_2)$ is:

$$-\frac{\sin(2X_1 + \beta_1 - \beta_2)\cos\frac{1}{2}X_1 - 4\cos(2X_1 + \beta_1 - \beta_2)\sin\frac{1}{2}X_1}{3\sin(2X_1 + \beta_1 - \beta_2)\sin\frac{1}{2}X_1} \quad \frac{1}{2}dX_1 = \frac{1}{3}\frac{2\cos(2X_1 + \beta_1 - \beta_2)\,dX_1}{\sin(2X_1 + \beta_1 - \beta_2)} - \frac{1}{3}\frac{\frac{1}{2}\cos\frac{1}{2}X_1 dX_1}{\sin\frac{1}{2}X_1}$$

Thus provided a natural logarithm may be complex so that its argument may be negative:

$\ln T(X_1,X_2) = \frac{1}{3}\ln\sin(2X_1 + \beta_1 - \beta_2) - \frac{1}{3}\ln\sin\frac{1}{2}X_1 + \ln c$ where $c$ is a constant; or:

$T(X_1,X_2) = c \sin^{1/3}(2X_1 + \beta_1 - \beta_2) \sin^{-1/3}\frac{1}{2}X_1$ 6.21.7.2.1.1.4 Factor of $dX_1$ in the differential equation The factor of $dX_1$ in the differential equation and also the denominator of the expression involving $dX_2$ is:

$$\sin(2\gamma_2 - \beta_2 - \gamma_0)\sum_{\substack{j\\odd}}\left(\frac{\partial p_2}{\partial Y_j}\right)_{Y_{j\ne j}}\left(\frac{\partial Y_j}{\partial X_1}\right)_{X_2} + \sin(2\gamma_1 - \beta_1 - \gamma_0)\sum_{\substack{j\\even}}\left(\frac{\partial p_1}{\partial Y_j}\right)_{Y_{j\ne j}}\left(\frac{\partial Y_j}{\partial X_1}\right)_{X_2} =$$

$$\frac{1}{\sin^2(2\gamma_1 - \beta_1 - 2\gamma_2 + \beta_2)}\left(\sin(2\gamma_1 - \beta_1 - 2\gamma_2 + \beta_2)\left(\sin(2\gamma_2 - \beta_2 - \gamma_0)\cos(\theta_1 - 2\gamma_1 + \beta_1)r_1\left(\frac{\partial\theta_1}{\partial X_1}\right)_{X_2} - \right.\right.$$

$$\sin(2\gamma_1 - \beta_1 - \gamma_0)\cos(\theta_2 - 2\gamma_2 + \beta_2)r_2\left(\frac{\partial\theta_2}{\partial X_1}\right)_{X_2}\right) + \sin(2\gamma_2 - \beta_2 - \gamma_0)(r_2\sin(\theta_2 - 2\gamma_2 + \beta_2) - r_1\sin(\theta_1 - 2\gamma_2 + \beta_2))\left(\frac{\partial(2\gamma_1 - \beta_1)}{\partial X_1}\right)_{X_2} -$$

$$\sin(2\gamma_1 - \beta_1 - \gamma_0)(r_2\sin(\theta_2 - 2\gamma_1 + \beta_1) - r_1\sin(\theta_1 - 2\gamma_1 + \beta_1))\left(\frac{\partial(2\gamma_2 - \beta_2)}{\partial X_1}\right)_{X_2} =$$

$$\frac{r_1}{\sin^2(-2X_1 - \beta_1 + \beta_2)}\left(\sin(-2X_1 - \beta_1 + \beta_2)\left(\sin(X_2 + X_1 + 2b - \beta_2 - \gamma_0)\cos\left(-\frac{1}{2}X_2 + \frac{1}{2}X_1 - 2b + \beta_1\right)\left(-\frac{1}{2}\right) - \right.\right.$$

$$\sin(X_2 - X_1 + 2b - \beta_1 - \gamma_0)\cos\left(-\frac{1}{2}X_2 - \frac{1}{2}X_1 - 2b + \beta_2\right)\frac{1}{2}\right) + \sin(X_2 + X_1 + 2b - \beta_2 - \gamma_0)\left(\sin\left(-\frac{1}{2}X_2 - \frac{1}{2}X_1 - 2b + \beta_2\right) - \right.$$

$$\sin\left(-\frac{1}{2}X_2 - \frac{3}{2}X_1 - 2b + \beta_2\right)\right)(-1) - \sin(X_2 - X_1 + 2b - \beta_1 - \gamma_0)\left(\sin\left(-\frac{1}{2}X_2 + \frac{3}{2}X_1 - 2b + \beta_1\right) - \right.$$

$$\sin\left(-\frac{1}{2}X_2 + \frac{1}{2}X_1 - 2b + \beta_1\right)\right)\right) = \frac{r_1}{2\sin^2(2X_1 + \beta_1 - \beta_2)}\left(\frac{1}{2}\sin(2X_1 + \beta_1 - \beta_2)\left(\sin\left(\frac{1}{2}X_2 + \frac{3}{2}X_1 + \beta_1 - \beta_2 - \gamma_0\right) + \right.\right.$$

$$\sin\left(\frac{3}{2}X_2 + \frac{1}{2}X_1 + 4b - \beta_1 - \beta_2 - \gamma_0\right) + \sin\left(\frac{1}{2}X_2 - \frac{3}{2}X_1 - \beta_1 + \beta_2 - \gamma_0\right) + \sin\left(\frac{3}{2}X_2 - \frac{1}{2}X_1 + 4b - \beta_1 - \beta_2 - \gamma_0\right)\right) -$$

$$\cos\left(\frac{3}{2}X_2 + \frac{3}{2}X_1 + 4b - 2\beta_2 - \gamma_0\right) + \cos\left(\frac{1}{2}X_2 + \frac{1}{2}X_1 - \gamma_0\right) + \cos\left(\frac{3}{2}X_2 + \frac{5}{2}X_1 + 4b - 2\beta_2 - \gamma_0\right) - \cos\left(\frac{1}{2}X_2 - \frac{1}{2}X_1 - \gamma_0\right) -$$

-continued $$\cos\left(\frac{3}{2}X_2 - \frac{5}{2}X_1 + 4b - 2\beta_1 - \gamma_0\right) + \cos\left(\frac{1}{2}X_2 + \frac{1}{2}X_1 - \gamma_0\right) + \cos\left(\frac{3}{2}X_2 + \frac{3}{2}X_1 + 4b - 2\beta_1 - \gamma_0\right) - \cos\left(\frac{1}{2}X_2 + \frac{1}{2}X_1 - \gamma_0\right) =$$

$$\frac{r_1}{\sin^2(2X_1 + \beta_1 - \beta_2)}\left(\frac{1}{2}\sin(2X_1 + \beta_1 - \beta_2)\left(\sin\left(\frac{1}{2}X_2 - \gamma_0\right)\cos\left(\frac{3}{2}X_1 + \beta_1 - \beta_2\right) + \sin\left(\frac{3}{2}X_2 + 4b - \beta_1 - \beta_2 - \gamma_0\right)\cos\frac{1}{2}X_1\right) - $$

$$2\sin\left(\frac{1}{2}X_1 - \gamma_0\right)\sin\frac{1}{2}X_1 + \sin\left(\frac{3}{2}X_2 + 4b - \beta_1 - \beta_2 - \gamma_0\right)\sin\left(\frac{3}{2}X_1 + \beta_1 - \beta_2\right) - \sin\left(\frac{3}{2}X_2 + 4b - \beta_1 - \beta_2 - \gamma_0\right)$$

$$\beta_2 - \gamma_0)\sin\left(\frac{5}{2}X_1 + \beta_1 - \beta_2\right)\right) = \frac{r_1}{\sin^2(2X_1 + \beta_1 - \beta_2)}\left(\frac{1}{2}\sin(2X_1 + \beta_1 - \beta_2)\left(\sin\left(\frac{1}{2}X_2 - \gamma_0\right)\cos\left(\frac{3}{2}X_1 + \beta_1 - \beta_2\right) + \right.\right.$$

$$\sin\left(\frac{3}{2}X_2 + 4b - \beta_1 - \beta_2 - \gamma_0\right)\cos\frac{1}{2}X_1\right) - 2\sin\left(\frac{1}{2}X_2 - \gamma_0\right)\sin\frac{1}{2}X_1 - \sin\left(\frac{3}{2}X_2 + 4b - \beta_1 - \beta_2 - \gamma_0\right)2\cos(2X_1 + \beta_1 - $$

$$\beta_2)\sin\frac{1}{2}X_1\right) = \frac{r_1}{2\sin^2(2X_1 + \beta_1 - \beta_2)}\left(\sin\left(\frac{3}{2}X_2 + 4b - \beta_1 - \beta_2 - \gamma_0\right)\left(\sin(2X_1 + \beta_1 - \beta_2)\cos\frac{1}{2}X_1 - 4\cos(2X_1 + \beta_1 - \beta_2)\sin\frac{1}{2}X_1\right) + \right.$$

$$\sin\left(\frac{1}{2}X_2 - \gamma_0\right)\left(\sin(2X_1 + \beta_1 - \beta_2)\cos\left(\frac{3}{2}X_1 + \beta_1 - \beta_2\right) - 4\sin\frac{1}{2}X_1\right)\right)$$

20

6.21.7.2.1.1.5 Solution of the member of the family of differential equations

When $\gamma_0 = \frac{1}{2}X_2 - \frac{1}{2}\pi$ as shown in FIG. 98 then $\sin(\frac{1}{2}X_2 - \gamma_0) = 1$ while $\sin(\frac{3}{2}X_2 + 4b - \beta_1 - \beta_2 - \gamma_0) = \cos(X_2 + 4b - \beta_1 - \beta_2)$ and $\cos(\frac{1}{2}X_2 - \gamma_0) = 0$ while $\cos(\frac{3}{2}X_2 + 4b - \beta_1 - \beta_2 - \gamma_0) = -\sin(X_2 + 4b - \beta_1 - \beta_2)$ so that the differential equation becomes:

$$c\sin^{-\frac{1}{3}}(2X_1 + \beta_1 - \beta_2)\sin^{-\frac{1}{3}}\frac{1}{2}X_1\frac{r_1}{2\sin^2(2X_1 + \beta_1 - \beta_2)}\left(\sin(2X_1 + \beta_1 - \beta_2)\cos\left(\frac{3}{2}X_1 + \beta_1 - \beta_2\right) - 4\sin\frac{1}{2}X_1 + \right.$$

$$\cos(X_2 + 4b - \beta_1 - \beta_2)\left(\sin(2X_1 + \beta_1 - \beta_2)\cos\frac{1}{2}X_1 - 4\cos(2X_1 + \beta_1 - \beta_2)\sin\frac{1}{2}X_1\right)\right)dX_1 +$$

$$c\sin^{-\frac{1}{3}}(2X_1 + \beta_1 - \beta_2)\sin^{-\frac{1}{3}}\frac{1}{2}X_1\frac{r_1}{2\sin(2X_1 + \beta_1 - \beta_2)}\left(-3\sin(X_2 + 4b - \beta_1 - \beta_2)\sin\frac{1}{2}X_1\right)dX_2 = 0$$

$$\frac{1}{2}cr_1\sin^{-\frac{5}{3}}(2X_1 + \beta_1 - \beta_2)\sin^{-\frac{1}{3}}\frac{1}{2}X_1\left(\sin(2X_1 + \beta_1 - \beta_2)\cos(2X_1 + \beta_1 - \beta_2)\cos\frac{1}{2}X_1 + \right.$$

$$\sin^2(2X_1 + \beta_1 - \beta_2)\sin\frac{1}{2}X_1 - 4\sin\frac{1}{2}X_1\right)dX_1 +$$

$$cr_1\sin^{\frac{1}{3}}(2X_1 + \beta_1 - \beta_2)\sin^{-\frac{1}{3}}\frac{1}{2}X_1\cos(X_2 + 4b - \beta_1 - \beta_2)\frac{\frac{1}{2}\sin(2X_1 + \beta_1 - \beta_2)\cos\frac{1}{2}X_1 - 2\cos(2X_1 + \beta_1 - \beta_2)\sin\frac{1}{2}X_1}{\sin^2(2X_1 + \beta_1 - \beta_2)}dX_1 +$$

$$\frac{3}{2}cr_1\left(\frac{\sin\frac{1}{2}X_1}{\sin(2X_1 + \beta_1 - \beta_2)}\right)^{\frac{2}{3}}d(\cos(X_2 + 4b - \beta_1 - \beta_2)) = 0$$

$$\frac{1}{2}cr_1\sin^{-\frac{5}{3}}(2X_1 + \beta_1 - \beta_2)\sin^{-\frac{1}{3}}\frac{1}{2}X_1\left(\sin(2X_1 + \beta_1 - \beta_2)\cos(2X_1 + \beta_1 - \beta_2)\cos\frac{1}{2}X_1 + 4\sin^2(2X_1 + \beta_1 - \beta_2)\sin\frac{1}{2}X_1 - 4\sin\frac{1}{2}X_1 - \right.$$

$$6\sin^2(2X_1 + \beta_1 - \beta_2)\sin\frac{1}{2}X_1 + 3\sin^2(2X_1 + \beta_1 - \beta_2)\sin\frac{1}{2}X_1\right)dX_1 +$$

$$cr_1\left(\frac{\sin\frac{1}{2}X_1}{\sin(2X_1 + \beta_1 - \beta_2)}\right)^{-\frac{1}{3}}d\left(\frac{\sin\frac{1}{2}X_1}{\sin(2X_1 + \beta_1 - \beta_2)}\right)\cos(X_2 + 4b - \beta_1 - \beta_2) +$$

$$\frac{3}{2}cr_1\left(\frac{\sin\frac{1}{2}X_1}{\sin(2X_1 + \beta_1 - \beta_2)}\right)^{\frac{2}{3}}d(\cos(X_2 + 4b - \beta_1 - \beta_2)) = 0$$

$$\frac{3}{2}cr_1\left(\frac{2}{6}\sin^{-\frac{2}{3}}(2X_1 + \beta_1 - \beta_2)\sin^{-\frac{1}{3}}\frac{1}{2}X_1\cos(2X_1 + \beta_1 - \beta_2)\cos\frac{1}{2}X_1 - \right.$$

$$\frac{4}{3}\sin^{-\frac{5}{3}}(2X_1 + \beta_1 - \beta_2)\sin^{\frac{2}{3}}\frac{1}{2}X_1(1 - \sin^2(2X_1 + \beta_1 - \beta_2)) - 2\sin^{-\frac{1}{3}}(2X_1 + \beta_1 - \beta_2)\sin^{\frac{2}{3}}\frac{1}{2}X_1\right)dX_1 +$$

-continued $$\frac{3}{2} cr_1 \sin^{\frac{1}{3}}(2X_1+\beta_1-\beta_2)\sin^{\frac{2}{3}}\frac{1}{2}X_1 dX_1 + \frac{3}{2} cr_1 d\left(\left(\frac{\sin\frac{1}{2}X_1}{\sin(2X_1+\beta_1-\beta_2)}\right)^{\frac{2}{3}}\cos(X_2+4b-\beta_1-\beta_2)\right) = 0$$

$$\frac{3}{2} cr_1 d\left(\sin^{-\frac{2}{3}}(2X_1+\beta_1-\beta_2)\sin^{\frac{2}{3}}\frac{1}{2}X_1\cos(2X_1+\beta_1-\beta_2)\right) + \frac{3}{2} cr_1 \sin^{\frac{1}{3}}(2X_1+\beta_1-\beta_2)\sin^{\frac{2}{3}}\frac{1}{2}X_1 dX_1 +$$

$$\frac{3}{2} cr_1 d\left(\sin^{-\frac{2}{3}}(2X_1+\beta_1-\beta_2)\sin^{\frac{2}{3}}\frac{1}{2}X_1\cos(X_2+4b-\beta_1-\beta_2)\right) = 0$$

from which the constant factor $\frac{3}{2}cr_1$ may be eliminated.

Now $\sin^{\frac{1}{3}}(2X_1+\beta_1-\beta_2)\sin^{\frac{2}{3}}\frac{1}{2}X_1 dX_1 =$ $(\sin 2X_1\cos(\beta_1-\beta_2)+\cos 2X_1\sin(\beta_1-\beta_2))^{\frac{1}{3}}\sin^{\frac{2}{3}}\frac{1}{2}X_1 dX_1 =$ $\sin^{\frac{1}{3}}2X_1\sin^{\frac{2}{3}}\frac{1}{2}X_1\cos^{\frac{1}{3}}(\beta_1-\beta_2)(1+\cot 2X_1\tan(\beta_1-$ $\beta_2))^{\frac{1}{3}}dX_1 = \sin^{\frac{1}{3}}2X_1\sin^{\frac{2}{3}}\frac{1}{2}X_1\cos^{\frac{1}{3}}(\beta_1-$ $\beta_2)\sum_{n=0}^{\infty}\binom{\frac{1}{3}}{n}\cot^n 2X_1\tan^n(\beta_1-\beta_2)dX_1$ (which is convergent when $-1 \leq \cot 2X_1 \tan(\beta_1-\beta_2) \leq 1$) and in which $\sin^{1/3}2X_1\sin^{2/3}\frac{1}{2}X_1 dX_1$ may be reduced to:

$$\left(\frac{4\sin\frac{1}{2}X_1\cos\frac{1}{2}X_1\left(2\cos^2\frac{1}{2}X_1-1\right)}{\sin\frac{1}{2}X_1}\right)^{\frac{1}{3}}\sin\frac{1}{2}X_1 dX_1 =$$

$$-2^{\frac{2}{3}}\left(2\cos^3\frac{1}{2}X_1-\cos\frac{1}{2}X_1\right)^{\frac{1}{3}}2d\left(\cos\frac{1}{2}X_1\right) =$$

$$2^{\frac{2}{3}}\left(\frac{1}{\cos^2\frac{1}{2}X_1}-2\right)^{\frac{1}{3}}2\cos\frac{1}{2}X_1 d\left(\cos\frac{1}{2}X_1\right)$$

which enables a differential to be formed for that atomic factor which has a fractional power.

Putting $\omega = \left(\frac{1}{\cos^2\frac{1}{2}X_1}-2\right)^{\frac{1}{3}}$ makes $\omega^3 = \frac{1}{\cos^2\frac{1}{2}X_1}-2$, $\omega^3+2 = \frac{1}{\cos^2\frac{1}{2}X_1}$, and $\cos^2\frac{1}{2}X_1 = \frac{1}{\omega^3+2}$ so that:

$$d\left(\cos^2\frac{1}{2}X_1\right) = 2\cos\frac{1}{2}X_1 d\left(\cos\frac{1}{2}X_1\right) = -\frac{3\omega^2 d\omega}{(\omega^3+2)^2}$$

$\cos X_1 = 2\cos^2\frac{1}{2}X_1 - 1 = \frac{2}{\omega^3+2}-1 = \frac{2-\omega^3-2}{\omega^3+2} = -\frac{\omega^3}{\omega^3+2}$ $\sin^2\frac{1}{2}X_1 = 1-\cos^2\frac{1}{2}X_1 = 1-\frac{1}{\omega^3+2} = \frac{\omega^3+2-1}{\omega^3+2} = \frac{\omega^3+1}{\omega^3+2}$ $\sin^2 2X_1 = 4\sin^2\frac{1}{2}X_1\cos^2\frac{1}{2}X_1 = 4\frac{\omega^3+1}{\omega^3+2}\cdot\frac{1}{\omega^3+2} = 4\frac{\omega^3+1}{(\omega^3+2)^2}$ $\sin^2 2X_1 = 4\sin^2 X_1\cos^2 X_1 = 16\frac{(\omega^3+1)\omega^6}{(\omega^3+2)^4}$ $\cos 2X_1 = 2\cos^2 X_1 - 1 = \frac{2\omega^6}{(\omega^3+2)^2}-1 = \frac{2\omega^6-(\omega^3+2)^2}{(\omega^3+2)^2}$ Now it is only really desirable that $\beta_1 \neq \beta_2$ for the final stage in a series of stages; and $\theta_2 \approx \theta_1$ for such a final stage. Moreover $X_1 = a\theta_2 - a\theta_1$ where $\theta_1, \theta_2$ are usually chosen so that $\theta_2 > \theta_1$. Thus $X_1$ is small and positive. Hence the most useful range for $X_1$ is $0 \leq X_1 \leq \frac{1}{2}\pi$. So that $0 \leq \frac{1}{2}X_1 \leq \frac{1}{4}\pi$, $1 \geq \cos\frac{1}{2}X_1 \geq 1/\sqrt{2}$, $-1 \leq \omega \leq 0$, and $\omega^3+1 \geq 0$. Equally, $0 \leq 2X_1 \leq \pi$ so that $0 \leq \sin 2X_1 \leq 1$. As $(\omega^3+2)^2 > 0$ in any event, it is necessary to take the negative value of the square root of $\omega^3+1$ when $0 \leq X_1 \leq \frac{1}{2}\pi$. In which case:

$$\sin 2X_1 = \frac{-(\omega^3+1)^{\frac{1}{2}}4\omega^3}{(\omega^3+2)^2}$$

$$\cot 2X_1 = \frac{2\omega^6-(\omega^3+2)^2}{-(\omega^3+1)^{\frac{1}{2}}4\omega^3}$$

and $\sin^{\frac{1}{3}}(2X_1+\beta_1-\beta_2)\sin^{\frac{2}{3}}\frac{1}{2}X_1 dX_1 = -2^{\frac{2}{3}}\frac{3\omega^3 d\omega}{(\omega^3+2)^2}\cos^{\frac{1}{3}}(\beta_1-\beta_2)\sum_{n=0}^{\infty}\binom{\frac{1}{3}}{n}\left(\frac{2\omega^6-(\omega^3+2)^2}{-(\omega^3+1)^{\frac{1}{2}}4\omega^3}\right)^n\tan^n(\beta_1-\beta_2)$ which may be integrated in principle.

When $\beta_1 \approx \beta_2$ then $\tan(\beta_1-\beta_2) \approx 0$ and only the first term in the above series, namely $$\begin{pmatrix} \frac{1}{3} \\ 0 \end{pmatrix}$$

which equals one, is significant. Now:

$$-2^{\frac{2}{3}} \frac{3\omega^3 d\omega}{(\omega^3+2)^2}$$

$$= 2^{\frac{2}{3}} \frac{(\omega^3+2) - \omega(3\omega^2) - (\omega^3+2)}{(\omega^3+2)^2} d\omega$$

$$= 2^{\frac{2}{3}} \frac{d}{d\omega}\left(\frac{\omega}{\omega^3+2}\right) - 2^{\frac{2}{3}} \frac{d\omega}{\omega^3+2}$$

$$= 2^{\frac{2}{3}} \frac{d}{d\omega}\left(\frac{\omega}{\omega^3+2}\right) - 2^{\frac{2}{3}} \frac{\frac{1}{3 \cdot 2^{\frac{2}{3}}}\left(\omega^2 - 2^{\frac{1}{3}}\omega + 2^{\frac{2}{3}}\right) + \left(-\frac{1}{3 \cdot 2^{\frac{2}{3}}}\omega + \frac{2^{\frac{2}{3}}}{3}\right)\left(\omega + 2^{\frac{1}{3}}\right)}{\omega^3+2} d\omega$$

$$= 2^{\frac{2}{3}} \frac{d}{d\omega}\left(\frac{\omega}{\omega^3+2}\right) - \frac{1}{3} \frac{d\omega}{\omega + 2^{\frac{1}{3}}} + \frac{1}{3} \frac{\omega - 2 \cdot 2^{\frac{1}{3}}}{\omega^2 - 2^{\frac{1}{3}}\omega + 2^{\frac{2}{3}}} d\omega$$

$$= 2^{\frac{2}{3}} \frac{d}{d\omega}\left(\frac{\omega}{\omega^3+2}\right) - \frac{1}{3} \frac{d\left(\omega + 2^{\frac{1}{3}}\right)}{\omega + 2^{\frac{1}{3}}} + \frac{1}{6} \frac{2\omega - 2^{\frac{1}{3}}}{\omega^2 - 2^{\frac{1}{3}}\omega + 2^{\frac{2}{3}}} d\omega - \frac{1}{2} \frac{2^{\frac{1}{3}} d\omega}{\omega^2 - 2^{\frac{1}{3}}\omega + 2^{\frac{2}{3}}}$$

$$= 2^{\frac{2}{3}} \frac{d}{d\omega}\left(\frac{\omega}{\omega^3+2}\right) - \frac{1}{3} \frac{d\left(\omega + 2^{\frac{1}{3}}\right)}{\omega + 2^{\frac{1}{3}}} + \frac{1}{6} \frac{d\left(\omega^2 - 2^{\frac{1}{3}}\omega + 2^{\frac{2}{3}}\right)}{\omega^2 - 2^{\frac{1}{3}}\omega + 2^{\frac{2}{3}}} - \frac{1}{2^{\frac{2}{3}}} \frac{d\omega}{\left(\omega - \frac{1}{2^{\frac{2}{3}}}\right)^2 + \frac{3}{2^{\frac{4}{3}}}}$$

Thus $-2^{\frac{2}{3}} \int \frac{3\omega^3 d\omega}{(\omega^3+2)^2}$ $$= 2^{\frac{2}{3}} \frac{\omega}{\omega^3+2} - \frac{1}{3} \ln\left|\omega + 2^{\frac{1}{3}}\right| + \frac{1}{6} \ln\left|\omega^2 - 2^{\frac{1}{3}}\omega + 2^{\frac{2}{3}}\right| - \frac{2^{\frac{2}{3}}}{2^{\frac{2}{3}}\sqrt{3}} \arctan \frac{\omega - \frac{1}{2^{\frac{2}{3}}}}{\frac{\sqrt{3}}{2^{\frac{2}{3}}}}$$

$$= 2^{\frac{2}{3}} \frac{\omega}{\omega^3+2} + \frac{1}{6} \ln \frac{\left|\omega^2 - 2^{\frac{1}{3}}\omega + 2^{\frac{2}{3}}\right|}{\left|\omega + 2^{\frac{1}{3}}\right|^2} - \frac{1}{\sqrt{3}} \arctan \frac{2^{\frac{2}{3}}\omega - 1}{\sqrt{3}}$$

As $|a||b|=|ab|$ and $1/|a|=|1/a|$ since all absolute values are positive, this may be written:

$$2^{\frac{2}{3}} \frac{\omega}{\omega^3+2} + \frac{1}{6} \ln\left|\frac{\omega^2 - 2^{\frac{1}{3}}\omega + 2^{\frac{2}{3}}}{\left(\omega + 2^{\frac{1}{3}}\right)^2}\right| - \frac{1}{\sqrt{3}} \arctan \frac{2^{\frac{2}{3}}\omega - 1}{\sqrt{3}}$$

$$= 2^{\frac{2}{3}} \frac{\omega}{\omega^3+2} + \frac{1}{6} \ln\left|\frac{\left(\omega^2 - 2^{\frac{1}{3}}\omega + 2^{\frac{2}{3}}\right)\left(\omega + 2^{\frac{1}{3}}\right)}{\left(\omega + 2^{\frac{1}{3}}\right)^3}\right| - \frac{1}{\sqrt{3}} \arctan \frac{2^{\frac{2}{3}}\omega - 1}{\sqrt{3}}$$

-continued $$= 2^{\frac{2}{3}} \frac{\omega}{\omega^3 + 2} + \frac{1}{6} \ln \frac{|\omega^3 + 2|}{\left|\omega + 2^{\frac{1}{3}}\right|^3} - \frac{1}{\sqrt{3}} \arctan \frac{2^{\frac{2}{3}} \omega - 1}{\sqrt{3}}$$

$$= 2^{\frac{2}{3}} \frac{\omega}{\omega^3 + 2} - \frac{1}{6} \ln \left|\cos^2 \frac{1}{2} X_1\right| - \frac{1}{2} \ln \left|\omega + 2^{\frac{1}{3}}\right| - \frac{1}{\sqrt{3}} \arctan \frac{2^{\frac{2}{3}} \omega - 1}{\sqrt{3}}$$

Hence for $\gamma_0 = \frac{1}{2}X_2 - \frac{1}{2}\pi$ and $0 \leq X_1 \leq \frac{1}{2}\pi$ the solution may be written:

$$\sin^{-\frac{2}{3}}(2X_1 + \beta_1 - \beta_2) \sin^{\frac{2}{3}} \frac{1}{2} X_1(\cos(X_2 + 4b - \beta_1 - \beta_2) + \cos(2X_1 + \beta_1 - \beta_2)) + \cos^{-\frac{1}{3}}(\beta_1 - \beta_2) \left(2^{\frac{2}{3}} \frac{\omega}{\omega^2 + 2} - \right.$$

$$\left. \frac{1}{3} \ln \left|\cos \frac{1}{2} X_1\right| - \frac{1}{2} \ln \left|\omega + 2^{\frac{1}{3}}\right| - \frac{1}{\sqrt{3}} \arctan \frac{2^{\frac{2}{3}} \omega - 1}{\sqrt{3}} - 2^{\frac{2}{3}} \int \frac{3\omega^3 d\omega}{(\omega^3 + 2)^2} \sum_{n=1}^{\infty} \binom{\frac{1}{3}}{n} \left(\frac{2\omega^6 - (\omega^3 + 2)^2}{-(\omega^3 + 1)^{\frac{1}{2}} 4\omega^3}\right)^n \tan^n(\beta_1 - \beta_2)\right) = k_0$$

where $\omega = \left(\frac{1}{\cos^2 \frac{1}{2} X_1} - 2\right)^{-\frac{1}{3}}$ and $k_0$ is a constant.

6.21.7.2.1.2 The circle through the origin and similar curves
When $$r_1 = c \sin^{\frac{1}{a-1}}((a-1)\theta_1 + b) \text{ and}$$

$$r_2 = c \sin^{\frac{1}{a-1}}((a-1)\theta_2 + b) \text{ where } \frac{1}{a-1}$$

is a positive integer it is helpful to derive formulae incorporating integer powers of trigonometric functions in order to facilitate the seperation of the variables.

A positive or negative sine or a positive or negative cosine may always be expressed as a positive sine without altering the sign of its argument using $-\sin A = \sin(A+\pi)$, $\cos A = \sin(A+\pi/2)$ or $-\cos A = \sin(A-\pi/2)$ as appropriate. So that it is not necessary to derive formulae with negative sines or positive or negative cosines as well as formulae with positive sines. Moreover, each formula may be expressed in terms of a summation of positive sines.

If m is any positive integer and $$\binom{m}{n}$$

represents the binomial coefficient for the nth term of a binomial expansion of the mth power then for $m \geq 2$:

$$\sin A \sum_{n=0}^{m-1} \frac{1}{2^{m-1}} \binom{m-1}{n} \sin\left(\frac{\pi}{2} - (m-1-2n)\left(A - \frac{\pi}{2}\right)\right)$$

$$= \sum_{n=0}^{m-1} \frac{1}{2^m} \binom{m-1}{n} \left(\cos\left(\frac{\pi}{2} - A - (m-1-2n)\left(A - \frac{\pi}{2}\right)\right) - \cos\left(\frac{\pi}{2} + A - (m-1-2n)\left(A - \frac{\pi}{2}\right)\right)\right)$$

$$= \sum_{n=0}^{m-1} \frac{1}{2^m} \binom{m-1}{n} \left(\sin\left(\frac{\pi}{2} - (m-2n)\left(A - \frac{\pi}{2}\right)\right) + \right.$$

-continued $$\left. \sin\left(\frac{\pi}{2} - (m - 2(n+1))\left(A - \frac{\pi}{2}\right)\right)\right)$$

$$= \frac{1}{2^m} \left(\binom{m-1}{0} \sin\left(\frac{\pi}{2} - (m-0)\left(A - \frac{\pi}{2}\right)\right) + \right.$$

$$\sum_{n=1}^{m-1} \left(\binom{m-1}{n} + \binom{m-1}{n-1}\right) \sin\left(\frac{\pi}{2} - (m-2n)\left(A - \frac{\pi}{2}\right)\right) +$$

$$\left. \binom{m-1}{m-1} \sin\left(\frac{\pi}{2} - (m - 2(m-1+1))\left(A - \frac{\pi}{2}\right)\right)\right)$$

As $\binom{m-1}{0} = 1 = \binom{m}{0}, \binom{m}{n} = \binom{m-1}{n} + \binom{m-1}{n-1}$ and $$\binom{m-1}{m-1} = 1 = \binom{m}{m}$$

this may be written:

$$\sum_{n=0}^{m} \frac{1}{2^m} \binom{m}{n} \sin\left(\frac{\pi}{2} - (m-2n)\left(A - \frac{\pi}{2}\right)\right)$$

This summation is the same as the summation which was multiplied by sin A except that m has replaced m−1.

When m=1 this summation equals sin A. And when $m \geq 2$ the summation for m−1 multiplied by sin A is the summation for m. Hence by induction this summation, for any value of m which is a positive integer, equals $\sin^m A$.

When m=0 this summation equals $$\binom{0}{0}.$$

As $\sin^0 A = 1$ so $$\binom{0}{0}$$

may be taken to be unity so that this summation also equals $\sin^m A$ for a zero value of m.

Moreover $\sin^m A \sin C$ $$= \sum_{n=0}^{m} \frac{1}{2^m} \binom{m}{n} \sin\left(\frac{\pi}{2} - (m-2n)\left(A - \frac{\pi}{2}\right)\right) \sin C =$$

$$\sum_{n=0}^{m} \frac{1}{2^{m+1}} \binom{m}{n} \left(\cos\left(\frac{\pi}{2} - C - (m-2n)\left(A - \frac{\pi}{2}\right)\right) - \right.$$

$$\left. \cos\left(\frac{\pi}{2} + C - (m-2n)\left(A - \frac{\pi}{2}\right)\right)\right) =$$

$$\sum_{n=0}^{m} \frac{1}{2^{m+1}} \binom{m}{n} \left(\sin\left(C + (m-2n)\left(A - \frac{\pi}{2}\right)\right) + \sin\left(C - (m-2n)\left(A - \frac{\pi}{2}\right)\right)\right)$$

As $+(m - 2(m-n)) = m - 2m + 2n = -(m-2n)$ and $\binom{m}{n} = \binom{m}{m-n}$ this summation comprises two identical sets of terms and may be written: -

$$\sum_{n=0}^{m} \frac{1}{2^m} \binom{m}{n} \sin\left(C - (m-2n)\left(A - \frac{\pi}{2}\right)\right)$$

Hence $\sin^m A \sin C + \sin^m B \sin D =$ $$\sum_{n=0}^{m} \frac{1}{2^m} \binom{m}{n} \left(\sin\left(C - (m-2n)\left(A - \frac{\pi}{2}\right)\right) + \sin\left(D - (m-2n)\left(B - \frac{\pi}{2}\right)\right)\right) =$$

$$\sum_{n=0}^{m} \frac{1}{2^{m-1}} \binom{m}{n} \left(\sin\left(\frac{C+D}{2} - (m-2n)\left(\frac{A+B}{2} - \frac{\pi}{2}\right)\right)\right.$$

$$\left. \cos\left(\frac{C-D}{2} + (m-2n)\frac{B-A}{2}\right)\right)$$

In addition, the following expression may be simplified:

$\sin (2\gamma_1 - \beta_1 - 2\gamma_2 +$ $$\beta_2)\left(\left(\frac{\partial p_2}{\partial \theta_1}\right)_{Y_j \ne \theta_1}\left(\frac{\partial \theta_1}{\partial X_1}\right)_{X_2} + \left(\frac{\partial p_2}{\partial r_1}\right)_{Y_j \ne r_1}\left(\frac{\partial r_1}{\partial X_1}\right)_{X_2}\right) =$$

$$r_1\cos(\theta_1 - 2\gamma_1 + \beta_1)\left(\frac{\partial \theta_1}{\partial X_1}\right)_{X_2} + \sin(\theta_1 - 2\gamma_1 + \beta_1)\left(\frac{\partial r_1}{\partial X_1}\right)_{X_2} =$$

$$(c\sin^{\frac{1}{a-1}}((a-1)\theta_1 + b)\cos((1-2a)\theta_1 - 2b + \beta_1) +$$

$$c\sin^{\frac{1}{a-1}-1}((a-1)\theta_1 + b)\cos((a-1)\theta_1 + b)\sin((1 -$$

$$2a)\theta_1 - 2b + \beta_1))\left(\frac{\partial \theta_1}{\partial X_1}\right)_{X_2} = c\sin(-a\theta_1 - b +$$

$$\beta_1)\sin^{\frac{1}{a-1}-1}((a-1)\theta_1 + b)\left(\frac{\partial \theta_1}{\partial X_1}\right)_{X_2}$$

since $r_1 = r_1(\theta_1)$. (In fact, this relationship holds for any value of a except a=1.)

Similarly for the expression:

$$\sin(2\gamma_1 - \beta_1 - 2\gamma_2 + \beta_2)\left(\left(\frac{\partial p_1}{\partial \theta_2}\right)_{Y_j \ne \theta_2}\left(\frac{\partial \theta_2}{\partial X_1}\right)_{X_2} + \left(\frac{\partial p_1}{\partial r_2}\right)_{Y_j \ne r_2}\left(\frac{\partial r_2}{\partial X_1}\right)_{X_2}\right)$$

and for both these expressions when $X_1$ and $X_2$ are interchanged.

6.21.7.2.1.2.1 Numerator of the expressions involving one differential

The numerator common to both the expressions involving one differential is:

$$\cos(2\gamma_2 - \beta_2 - \gamma_0) \sum_{\substack{j \\ \text{odd}}} \left(\frac{\partial p_2}{\partial Y_j}\right)_{Y_{j \ne j}} \left(\frac{\partial Y_j}{\partial X_1}\right)_{X_2} +$$

$$\cos(2\gamma_1 - \beta_1 - \gamma_0) \sum_{\substack{j \\ \text{even}}} \left(\frac{\partial p_1}{\partial Y_j}\right)_{Y_{j \ne j}} \left(\frac{\partial Y_j}{\partial X_1}\right)_{X_2} +$$

$$\frac{1}{\sin^2(2\gamma_1 - \beta_1 - 2\gamma_2 + \beta_2)} (\sin(2\gamma_1 - \beta_1 - 2\gamma_2 + \beta_2))$$

$$\left(\cos(2\gamma_2 - \beta_2 - \gamma_0)c\sin(-a\theta_1 - b + \beta_1)\sin^{\frac{1}{a-1}-1}((a-1)\theta_1 + b)\left(\frac{\theta_1}{\partial X_1}\right)_{X_2} - \right.$$

$$\cos(2\gamma_1 - \beta_1 - \gamma_1)c\sin(-a\theta_2 - b + \beta_1)\sin^{\frac{1}{a-1}-1}((a-1)\theta_2 + b)\left(\frac{\partial \theta_2}{\partial X_1}\right)_{X_2}\right)$$

$$- \cos(2\gamma_2 - \beta_2 - \gamma_0)$$

$$\left(r_1\sin(\theta_1 - 2\gamma_2 + \beta_2) - r_2\sin(\theta_2 - 2\gamma_2 + \beta_2))\left(\frac{\partial(2\gamma_1 - \beta_1)}{\partial X_1}\right)_{X_2} + \right.$$

$$\cos(2\gamma_1 - \beta_1 - \gamma_0)(r_1\sin(\theta_1 - 2\gamma_1 + \beta_1) - r_2\sin(\theta_2 - 2\gamma_1 + \beta_1))\left(\frac{\partial(2\gamma_2 - \beta_2)}{\partial X_1}\right)_{X_2}\right)$$

-continued $$= \frac{c}{\sin^2(-2X_1 - \beta_1 + \beta_2)} (-\sin(-2X_1 - \beta_1 + \beta_2))$$

$$\left( \begin{array}{c} \cos(X_2 + X_1 + 2b - \beta_2 - \gamma_0) \\ \sin\left(-\frac{1}{2}X_2 + \frac{1}{2}X_1 - b + \beta_1\right) \sin^{\frac{1}{a-1} - 1}\left(\frac{a-1}{2a}(X_2 - X_1) + b\right)\frac{1}{2a} + \\ \cos(X_2 - X_1 + 2b - \beta_1 - \gamma_0) \\ \sin\left(-\frac{1}{2}X_2 - \frac{1}{2}X_1 - b + \beta_2\right) \sin^{\frac{1}{a-1} - 1}\left(\frac{a-1}{2a}(X_2 + X_1) + b\right)\frac{1}{2a} + \\ \sin^{\frac{1}{a-1}}\left(\frac{a-1}{2a}(X_2 - X_1) + b\right) \\ \left(\cos(X_2 - X_1 + 2b - \beta_2 - \gamma_0)\sin\left(\left(\frac{1}{2a} - 1\right)X_2 - \left(\frac{1}{2a} - 1\right)X_1 - 2b + \beta_1\right) - \right. \\ \left. \cos(X_2 + X_1 + 2b - \beta_2 - \gamma_0)\sin\left(\left(\frac{1}{2a} - 1\right)X_2 - \left(\frac{1}{2a} + 1\right)X_1 - 2b + \beta_2\right)(-1)\right) + \\ \sin^{\frac{1}{a-1}}\left(\frac{a-1}{2a}(X_2 + X_1) + b\right) \\ \left(-\cos(X_2 - X_1 + 2b - \beta_1 - \gamma_0)\sin\left(\left(\frac{1}{2a} - 1\right)X_2 + \left(\frac{1}{2a} + 1\right)X_1 - 2b + \beta_1\right) + \right. \\ \left. \cos(X_2 + X_1 + 2b - \beta_1 - \gamma_0)\sin\left(\left(\frac{1}{2a} - 1\right)X_2 + \left(\frac{1}{2a} - 1\right)X_1 - 2b + \beta_2\right)(-1)\right) \end{array} \right)$$

$$= \frac{c}{2\sin^2(2X_1 + \beta_1 - \beta_2)}\left(\frac{1}{2a}\sin(2X_1 + \beta_1 - \beta_2)\right.$$

$$\left(\sin^{\frac{1}{a-1} - 1}\left(\frac{a-1}{2a}(X_2 - X_1) + b\right)\right)$$

$$\left(\sin\left(\frac{1}{2}X_2 + \frac{3}{2}X_1 + b + \beta_1 - \beta_2 - \gamma_0\right) - \sin\left(\frac{3}{2}X_2 + \frac{1}{2}X_1 + 3b - \beta_1 - \beta_2 - \gamma_0\right)\right) +$$

$$\sin^{\frac{1}{a-1} - 1}\left(\frac{a-1}{2a}(X_2 + X_1) + b\right)$$

$$\left(\sin\left(\frac{1}{2}X_2 + \frac{3}{2}X_1 + b - \beta_1 + \beta_2 - \gamma_0\right) - \sin\left(\frac{3}{2}X_2 - \frac{1}{2}X_1 + 3b - \beta_1 - \beta_2 - \gamma_0\right)\right) +$$

$$\sin^{\frac{1}{a-1}}\left(\frac{a-1}{2a}(X_2 - X_1) + b\right)$$

$$\left(\sin\left(\frac{1}{2a}X_2 - \frac{1}{2a}X_1 - \gamma_0\right) - \sin\left(\left(\frac{4a-1}{2a}\right)X_2 - \left(\frac{4a-1}{2a}\right)X_1 + 4b - 2\beta_1 - \gamma_0\right) + \right.$$

$$\left. \sin\left(\frac{1}{2a}X_2 - \frac{1}{2a}X_1 - \gamma_0\right) - \sin\left(\left(\frac{4a-1}{2a}\right)X_2 + \left(\frac{4a+1}{2a}\right)X_1 + 4b - 2\beta_2 - \gamma_0\right)\right)$$

$$+ \sin^{\frac{1}{a-1}}\left(\frac{a-1}{2a}(X_2 + X_1) + b\right)$$

$$\left(-\sin\left(\frac{1}{2a}X_2 + \frac{1}{2a}X_1 - \gamma_0\right) + \sin\left(\left(\frac{4a-1}{2a}\right)X_2 - \left(\frac{4a+1}{2a}\right)X_1 + 4b - 2\beta_1 - \gamma_0\right)\right.$$

$$\left. -\sin\left(\frac{1}{2a}X_2 + \frac{1}{2a}X_1 - \gamma_0\right) + \sin\left(\left(\frac{4a-1}{2a}\right)X_2 + \left(\frac{4a-1}{2a}\right)X_1 + 4b - 2\beta_2 - \gamma_0\right)\right)\right)$$

$$= \frac{c}{4\sin^2(2X_1 + \beta_1 - \beta_2)}\left(\frac{1}{a}\sin(2X_1 + \beta_1 - \beta_2)\right.$$

$$\left(\sin^{\frac{1}{a-1} - 1}\left(\frac{a-1}{2a}(X_2 - X_1) + b\right)\right)$$

-continued $$\left(\sin\left(\frac{1}{2}X_2+\frac{3}{2}X_1+b+\beta_1-\beta_2-\gamma_0\right)-\sin\left(\frac{3}{2}X_2+\frac{1}{2}X_1+3b-\beta_1-\beta_2-\gamma_0\right)\right)+$$

$$\sin^{\frac{1}{a-1}}{}^{-1}\left(\frac{a-1}{2a}(X_2+X_1)+b\right)$$

$$\left(\sin\left(\frac{1}{2}X_2-\frac{3}{2}X_1+b-\beta_1+\beta_2-\gamma_0\right)-\sin\left(\frac{3}{2}X_2-\frac{1}{2}X_1+3b-\beta_1-\beta_2-\gamma_0\right)\right)+$$

$$\sin^{\frac{1}{a-1}}{}^{-1}\left(\frac{a-1}{2a}(X_2-X_1)+b\right)$$

$$\left(2\cos\left(\frac{2-a}{2a}X_2-\frac{2-a}{2a}X_1-b-\gamma_0\right)-2\cos\left(\frac{1}{2}X_2-\frac{1}{2}X_1+b-\gamma_0\right)-\right.$$

$$\cos\left(\frac{3}{2}X_2+\frac{5}{2}X_1+3b-2\beta_2-\gamma_0\right)+\cos\left(\frac{5a-2}{2a}X_2+\frac{3a+2}{2a}X_1+5b-2\beta_2-\gamma_0\right)-$$

$$\cos\left(\frac{3}{2}X_2-\frac{3}{2}X_1+3b-2\beta_1-\gamma_0\right)+\cos\left(\frac{5a-2}{2a}X_2-\frac{5a-2}{2a}X_1+5b-2\beta_1-\gamma_0\right)\right)+$$

$$\sin^{\frac{1}{a-1}}{}^{-1}\left(\frac{a-1}{2a}(X_2+X_1)+b\right)$$

$$\left(-2\cos\left(\frac{2-a}{2a}X_2+\frac{2-a}{2a}X_1-b-\gamma_0\right)+2\cos\left(\frac{1}{2}X_2-\frac{1}{2}X_1+b-\gamma_0\right)-\right.$$

$$\cos\left(\frac{3}{2}X_2-\frac{5}{2}X_1+3b-2\beta_2-\gamma_0\right)-\cos\left(\frac{5a-2}{2a}X_2-\frac{3a+2}{2a}X_1+5b-2\beta_2-\gamma_0\right)+$$

$$\left.\cos\left(\frac{3}{2}X_2-\frac{3}{2}X_1+3b-2\beta_1-\gamma_0\right)-\cos\left(\frac{5a-2}{2a}X_2-\frac{5a-2}{2a}X_1+5b-2\beta_1-\gamma_0\right)\right)\right)$$

$$=\frac{c}{4\sin^2(2X_1+\beta_1-\beta_2)}\left(\frac{1}{a}\sin(2X_1+\beta_1-\beta_2)\right.$$

$$\left(\sin^{\frac{1}{a-1}}{}^{-1}\left(\frac{a-1}{2a}(X_2-X_1)+b\right)\right.$$

$$\left(\sin\left(\frac{1}{2}X_2+\frac{3}{2}X_1+b+\beta_1-\beta_2-\gamma_0\right)-\sin\left(\frac{3}{2}X_2+\frac{1}{2}X_1+3b-\beta_1-\beta_2-\gamma_0\right)\right)+$$

$$\sin^{\frac{1}{a-1}}{}^{-1}\left(\frac{a-1}{2a}(X_2+X_1)+b\right)$$

$$\left(\sin\left(\frac{1}{2}X_2-\frac{3}{2}X_1+b-\beta_1+\beta_2-\gamma_0\right)-\sin\left(\frac{3}{2}X_2-\frac{1}{2}X_1+3b-\beta_1-\beta_2-\gamma_0\right)\right)+$$

$$\sin^{\frac{1}{a-1}}{}^{-1}\left(\frac{a-1}{2a}(X_2-X_1)+b\right)$$

$$\left(2\sin\left(\frac{\pi}{2}+\frac{2-a}{2a}X_2-\frac{2-a}{2a}X_1-b-\gamma_0\right)+2\sin\left(\frac{3}{2}\pi+\frac{1}{2}X_2-\frac{1}{2}X_1+b-\gamma_0\right)+\right.$$

$$\sin\left(\frac{3}{2}\pi+\frac{3}{2}X_2+\frac{5}{2}X_1+3b-2\beta_2-\gamma_0\right)+$$

$$\sin\left(\frac{\pi}{2}+\frac{5a-2}{2a}X_2+\frac{3a+2}{2a}X_1+5b-2\beta_2-\gamma_0\right)+$$

$$\sin\left(\frac{3}{2}\pi+\frac{3}{2}X_2-\frac{3}{2}X_1+3b-2\beta_1-\gamma_0\right)+$$

$$\left.\sin\left(\frac{\pi}{2}+\frac{5a-2}{2a}X_2-\frac{5a-2}{2a}X_1+5b-2\beta_1-\gamma_0\right)\right)+$$

$$\sin^{\frac{1}{a-1}}{}^{-1}\left(\frac{a-1}{2a}(X_2+X_1)+b\right)$$

$$\left(2\sin\left(\frac{3\pi}{2}+\frac{2-a}{2a}X_2+\frac{2-a}{2a}X_1-b-\gamma_0\right)+2\sin\left(\frac{1}{2}\pi+\frac{1}{2}X_2-\frac{1}{2}X_1+b-\gamma_0\right)+\right.$$

$$\sin\left(\frac{1}{2}\pi+\frac{3}{2}X_2-\frac{5}{2}X_1+3b-2\beta_2-\gamma_0\right)+$$

-continued
$$\sin\left(\frac{3\pi}{2} + \frac{5a-2}{2a} X_2 - \frac{3a+2}{2a} X_1 + 5b - 2\beta_2 - \gamma_0\right) +$$

$$\sin\left(\frac{1}{2}\pi + \frac{3}{2} X_2 - \frac{3}{2} X_1 + 3b - 2\beta_1 - \gamma_0\right) -$$

$$\sin\left(\frac{3\pi}{2} + \frac{5a-2}{2a} X_2 - \frac{5a-2}{2a} X_1 + 5b - 2\beta_1 - \gamma_0\right)\Big)\Big)$$

$$= \frac{c}{4\sin^2(2X_1 + \beta_1 - \beta_2)} \sum_{n=0}^{\frac{1}{a-1}-1} \frac{1}{2^{\frac{1}{a-1}-2}} \binom{\frac{1}{a-1}-1}{n} \left(\frac{1}{a}\sin(2X_1 + \beta_1 - \beta_2)\right.$$

$$\left(\sin\left(\frac{1}{2} X_2 + b - \gamma_0 - \left(\frac{1}{a-1} - 1 - 2n\right)\left(\frac{a-1}{2a} X_2 + b - \frac{\pi}{2}\right)\right)\right.$$

$$\cos\left(\frac{3}{2} X_1 + \beta_1 - \beta_2 + \left(\frac{1}{a-1} - 1 - 2n\right)\left(\frac{a-1}{2a} X_1\right)\right)$$

$$-\sin\left(\frac{3}{2} X_2 + 3b - \beta_1 - \beta_2 - \gamma_0 - \left(\frac{1}{a-1} - 1 - 2n\right)\left(\frac{a-1}{2a} X_2 + b - \frac{\pi}{2}\right)\right)$$

$$\cos\left(\frac{1}{2} X_1 + \left(\frac{1}{a-1} - 1 - 2n\right)\frac{a-1}{2a} X_1\right)$$

$$2\sin\left(\pi + \frac{2-a}{2a} X_2 - b - \gamma_0 - \left(\frac{1}{a-1} - 1 - 2n\right)\left(\frac{a-1}{2a} X_2 + b - \frac{\pi}{2}\right)\right)$$

$$\cos\left(-\frac{\pi}{2} - \frac{2-a}{2a} X_1 + \left(\frac{1}{a-1} - 1 - 2n\right)\left(\frac{a-1}{2a} X_1\right)\right)$$

$$+ 2\sin\left(\pi + \frac{1}{2} X_2 + 3b - \gamma_0 - \left(\frac{1}{a-1} - 1 - 2n\right)\left(\frac{a-1}{2a} X_2 + b - \frac{\pi}{2}\right)\right)$$

$$\cos\left(\frac{1}{2}\pi - \frac{1}{2} X_1 + \left(\frac{1}{a-1} - 1 - 2n\right)\frac{a-1}{2a} X_1\right)$$

$$+ \sin\left(\pi + \frac{3}{2} X_2 + 3b - \beta_1 - \beta_2 - \gamma_0 - \left(\frac{1}{a-1} - 1 - 2n\right)\left(\frac{a-1}{2a} X_2 + b - \frac{\pi}{2}\right)\right)$$

$$\cos\left(\frac{1}{2}\pi - \frac{5}{2} X_1 - \beta_1 - \beta_2 - \gamma_0 - \left(\frac{1}{a-1} - 1 - 2n\right)\frac{a-1}{2a} X_1\right)$$

$$+ \sin\left(\pi + \frac{5a-2}{2a} X_2 + 5b - \beta_1 - \beta_2 - \gamma_0 - \left(\frac{1}{a-1} - 1 - 2n\right)\left(\frac{a-1}{2a} X_2 + b - \frac{\pi}{2}\right)\right)$$

$$\cos\left(-\frac{\pi}{2} + \frac{3a+2}{2a} X_1 + \beta_1 - \beta_2 + \left(\frac{1}{a-1} - 1 - 2n\right)\frac{a-1}{2a} X_1\right)$$

$$+ \sin\left(\pi + \frac{3}{2} X_2 + 3b - \beta_1 - \beta_2 - \gamma_0 - \left(\frac{1}{a-1} - 1 - 2n\right)\left(\frac{a-1}{2a} X_2 + b - \frac{\pi}{2}\right)\right)$$

$$\cos\left(\frac{1}{2}\pi - \frac{3}{2} X_1 - \beta_1 + \beta_2 + \left(\frac{1}{a-1} - 1 - 2n\right)\frac{a-1}{2a} X_1\right)$$

$$+ \sin\left(\pi + \frac{5a-2}{2a} X_2 + 5b - \beta_1 - \beta_2 - \gamma_0 - \left(\frac{1}{a-1} - 1 - 2n\right)\frac{(a-1)}{2a} X_2 + b - \frac{\pi}{2}\right)$$

$$\cos\left(-\frac{\pi}{2} - \frac{5a-2}{2a} X_1 - \beta_1 + \beta_2 + \left(\frac{1}{a-1} - 1 - 2a\right)\frac{a-1}{2a} X_1\right)\Big)$$

$$= \frac{c}{\sin^2(2X_1 + \beta_1 - \beta_2)} \sum_{n=0}^{\frac{1}{a-1}-1} 2^{-\frac{1}{a-1}} \binom{\frac{1}{a-1}-1}{n} \left(\frac{1}{a}\sin(2X_1 + \beta_1 - \beta_2)\right.$$

$$\left(\sin\left(\frac{1}{2} X_2 + b - \gamma_0 - \left(\frac{1}{a-1} - 1 - 2n\right)\left(\frac{a-1}{2a} X_2 + b - \frac{\pi}{2}\right)\right)\right.$$

$$\cos\left(\frac{3}{2} X_1 + \beta_1 - \beta_2 + \left(\frac{1}{a-1} - 1 - 2n\right)\frac{a-1}{2a} X_1\right)$$

$$-\sin\left(\frac{3}{2} X_2 + 3b - \beta_1 - \beta_2 - \gamma_0 - \left(\frac{1}{a-1} - 1 - 2n\right)\left(\frac{a-1}{2a} X_2 + b - \frac{\pi}{2}\right)\right)$$

-continued $$\cos\left(\frac{1}{2}X_1 + \left(\frac{1}{a-1} - 1 - 2n\right)\frac{a-1}{2a}X_1\right)$$

$$-2\sin\left(\frac{2-a}{2a}X_2 - b - \gamma_0 - \left(\frac{1}{a-1} - 1 - 2n\right)\right.$$

$$\left.\left(\frac{a-1}{2a}X_2 + b - \frac{\pi}{2}\right)\right)$$

$$\sin\left(-\frac{2-a}{2a}X_1 + \left(\frac{1}{a-1} - 1 - 2n\right)\frac{a-1}{2a}X_1\right)$$

$$+2\sin\left(\frac{1}{2}X_2 + b - \gamma_0 - \left(\frac{1}{a-1} - 1 - 2n\right)\left(\frac{a-1}{2a}X_2 + b - \frac{\pi}{2}\right)\right)$$

$$\sin\left(-\frac{1}{2}X_1 + \left(\frac{1}{a-1} - 1 - 2n\right)\frac{a-1}{2a}X_1\right)$$

$$-\sin\left(\frac{3}{2}X_2 + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$2\cos\left(\frac{1}{2}\pi + \frac{1}{2}X_1 + \left(\frac{1}{a-1} - 1 - 2n\right)\frac{a-1}{2a}X_1\right)\cos(2X_1 + \beta_1 - \beta_2)$$

$$-\sin\left(\frac{5a-2}{2a}X_2 + 5b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$2\cos\left(-\frac{\pi}{2} + \frac{2-a}{2a}X_1 + \left(\frac{1}{a-1} - 1 - 2n\right)\frac{a-1}{2a}X_1\right)\cos(2X_1 + \beta_1 + \beta_2)$$

$$= \frac{c}{\sin^2(X_1 + \beta_1 - \beta_2)} \sum_{n=0}^{\frac{1}{a-1}-1} 2^{-\frac{1}{a-1}} \binom{\frac{1}{a-1}-1}{n}$$

$$\left(\sin\left(\frac{1}{2}X_2 + b - \gamma_0 - \left(\frac{1}{a-1} - 1 - 2n\right)\left(\frac{a-1}{2a}X_2 + b - \frac{\pi}{2}\right)\right)\right)$$

$$\left(2\sin\left(-\frac{1}{2}X_1 + \left(\frac{1}{a-1} - 1 - 2n\right)\frac{a-1}{2a}X_1\right)\right)$$

$$+\frac{1}{2}\sin(2X_1 + \beta_1 - \beta_2)\cos\left(\frac{3}{2}X_1 + \beta_1 - \beta_2 + \left(\frac{1}{a-1} - 1 - 2n\right)\left(\frac{a-1}{2a}X_1\right)\right)$$

$$+\sin\left(\frac{3}{2}X_2 + 3b - \beta_2 - \beta_2 - \gamma_0 - \left(\frac{1}{a-1} - 1 - 2n\right)\left(\frac{a-1}{2a}X_2 + b - \frac{\pi}{2}\right)\right)$$

$$\left(2\sin\left(\frac{1}{2}X_1 + \left(\frac{1}{a-1} - 1 - 2n\right)\frac{a-1}{2a}X_1\right)\cos(2X_1 + \beta_1 - \beta_2)\right)$$

$$-\frac{1}{a}\sin(2X_1 + \beta_1 - \beta_2)\cos\left(\frac{1}{2}X_1 + \left(\frac{1}{a-1} - 1 - 2n\right)\frac{a-1}{2a}X_1\right)$$

$$-2\sin\left(\frac{2-a}{2a}X_2 - b - \gamma_0 - \left(\frac{1}{a-1} - 1 - 2n\right)\frac{a-1}{2a}X_2 + b - \frac{\pi}{2}\right)$$

$$\sin\left(-\frac{2-a}{2a}X_1 + \left(\frac{1}{a-1} - 1 - 2n\right)\frac{a-1}{2a}X_1\right)$$

$$-2\sin\left(\frac{5a-2}{2a}X_2 + 5b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$\sin\left(\frac{2-a}{2a}X_1 + \left(\frac{1}{a-1} - 1 - 2n\right)\frac{a-1}{2a}X_1\right)\cos(2X_1 + \beta_1 - \beta_2)$$

6.21.7.2.1.2.2 Denominator of the expression involving $dX_1$

The denominator of the expression involving $dX_1$ and also the factor of $dX_2$ in the differential equation is:

$$\sin(2\alpha_2 - \beta_2 - \gamma_0) \sum_{\substack{j \\ \text{odd}}} \left(\frac{\partial p_2}{\partial Y_j}\right)_{Y_{j\neq j}} \left(\frac{\partial Y_j}{\partial X_2}\right)_{X_1} + \sin(2\gamma_1 - \beta_1 - \gamma_0) \sum_{\substack{j \\ \text{even}}} \left(\frac{\partial p_1}{\partial Y_j}\right)_{Y_{j\neq j}} \left(\frac{\partial Y_j}{\partial X_2}\right)_{X_1}$$

$$= \frac{1}{\sin^2(2\gamma_1 - \beta_1 - 2\gamma_2 + \beta_2)} (\sin(2\gamma_1 - \beta_1 - 2\gamma_2 - \beta_2)$$

$$\left(\sin(2\gamma_2 - \beta_2 - \gamma_0) c \sin(-a\theta_1 - b + \beta_1) \sin^{\frac{1}{a-1} - 1}((a-1)\theta_1 + b) \left(\frac{\partial \theta_1}{\partial X_2}\right)_{X_1}\right.$$

$$- \sin(2\gamma_1 - \beta_1 - \gamma_0) c \sin(-a\theta_2 - b + \beta_2) \sin^{\frac{1}{a-1} - 1}((a-1)\theta_2 + b) \left(\frac{\partial \theta_2}{\partial X_2}\right)_{X_1}$$

$$- \sin(2\gamma_1 - \beta_2 - \gamma_0)$$

$$(r_1\sin(\theta_1 - 2\gamma_2 + \beta_2) - r_2\sin(\theta_2 - 2\gamma_2 + \beta_2)) \left(\frac{\partial(2\gamma_1 - \beta_1)}{\partial x_2}\right)_{X_1}$$

$$+ \sin(2\gamma_1 - \beta_1 - \gamma_0)$$

$$\left.(r_1\sin(\theta_1 - 2\gamma_1 + \beta_1) - r_1\sin(\theta_2 - 2\gamma_1 + \beta_1)) \left(\frac{\partial(2\gamma_2 - \beta_2)}{\partial X_2}\right)_{X_1}\right)$$

$$= \frac{c}{\sin^2(-2X_1 - \beta_1 + \beta_2)} (\sin(2X_1 + \beta_1 - \beta_2)$$

$$\left(\sin(X_2 + X_1 + 2b - \beta_2 - \gamma_0)\right.$$

$$\sin\left(-\frac{1}{2} X_2 - \frac{1}{2} X_1 - b + \beta_1\right) \sin^{\frac{1}{a-1} - 1}\left(\frac{a-1}{2a}(X_2 - X_1) + b\right) \frac{1}{2a}$$

$$- \sin(X_2 - X_1 + 2b - \beta_1 - \gamma_0)$$

$$\sin\left(-\frac{1}{2} X_2 + \frac{1}{2} X_1 - b + \beta_2\right) \sin^{\frac{1}{a-1} - 1}\left(\frac{a-1}{2a}(X_2 + X_1) + b\right) \frac{1}{2a}$$

$$+ \sin^{\frac{1}{a-1}}\left(\frac{a-1}{2a}(X_2 - X_1) + b\right)$$

$$\left(\sin(X_2 - X_1 + 2b - \beta_1 - \gamma_0)\sin\left(\left(\frac{1}{2a} - 1\right)X_2 - \left(\frac{1}{2a} - 1\right)X_1 - b + \beta_1\right) - \right.$$

$$\sin(X_2 + X_1 + 2b - \beta_2 - \gamma_0)\sin\left(\left(\frac{1}{2a} - 1\right)X_2 - \left(\frac{1}{2a} + 1\right)X_1 - 2b + \beta_2\right)\right)$$

$$+ \sin^{\frac{1}{a-1}}\left(\frac{a-1}{2a}(X_2 + X_1) + b\right)$$

$$\left(\sin(X_2 + X_1 + 2b - \beta_2 - \gamma_0)\sin\left(\left(\frac{1}{2a} - 1\right)X_2 + \left(\frac{1}{2a} - 1\right)X_1 - b + \beta_2\right) - \right.$$

$$\left.\sin(X_2 - X_1 + 2b - \beta_1 - \gamma_0)\sin\left(\left(\frac{1}{2a} - 1\right)X_2 - \left(\frac{1}{2a} + 1\right)X_1 - 2b + \beta_1\right)\right)$$

$$= \frac{c}{2\sin^2(2X_1 + \beta_1 + \beta_2)} \left(\frac{1}{2a} \sin(2X_1 + \beta_1 - \beta_2)\right.$$

$$\left(\sin^{\frac{1}{a-1} - 1}\left(\frac{a-1}{2a}(X_2 - X_1) + b\right)\right)$$

$$\left(-\cos\left(\frac{3}{2} X_2 + \frac{1}{2} X_1 + 3b - \beta_1 - \beta_2 - \gamma_0\right) + \cos\left(\frac{1}{2} X_2 + \frac{3}{2} X_1 + b + \beta_1 - \beta_2 - \gamma_0\right)\right)$$

$$+ \sin^{\frac{1}{a-1} - 1}\left(\frac{a-1}{2a}(X_2 + X_1) + b\right)$$

$$\left.\left(\cos\left(\frac{3}{2} X_2 - \frac{1}{2} X_1 + 3b - \beta_1 - \beta_2 - \gamma_0\right) - \cos\left(\frac{1}{2} X_2 - \frac{3}{2} X_1 + b - \beta_1 + \beta_2 - \gamma_0\right)\right)\right)$$

-continued $$+ \sin^{\frac{1}{a-1}}\left(\frac{a-1}{2a}(X_2 - X_1) + b\right)$$

$$\left(\cos\left(\left(\frac{4a-1}{2a}\right)X_2 - \left(\frac{4a-1}{2a}\right)X_1 + 4b - 2\beta_1 - \gamma_0\right) - \cos\left(\frac{1}{2a}X_2 - \frac{1}{2a}X_1 - \gamma_0\right)\right.$$

$$\left. - \cos\left(\left(\frac{4a-1}{2a}\right)X_2 + \left(\frac{4a-1}{2a}\right)X_1 + 4b - 2\beta_2 - \gamma_0\right) + \cos\left(\frac{1}{2a}X_2 - \frac{1}{2a}X_1 - \gamma_0\right)\right)$$

$$+ \sin^{\frac{1}{a-1}}\left(\frac{a-1}{2a}(X_2 + X_1) + b\right)$$

$$\left(\cos\left(\left(\frac{4a-1}{2a}\right)X_2 + \left(\frac{4a-1}{2a}\right)X_1 + 4b - 2\beta_2 - \gamma_0\right) - \cos\left(\frac{1}{2a}X_2 + \frac{1}{2a}X_1 - \gamma_0\right)\right.$$

$$\left. - \cos\left(\left(\frac{4a-1}{2a}\right)X_2 - \left(\frac{4a-1}{2a}\right)X_1 + 4b - 2\beta_1 - \gamma_0\right) + \cos\left(\frac{1}{2a}X_2 + \frac{1}{2a}X_1 - \gamma_0\right)\right)\right)$$

$$= \frac{c}{4\sin^2(2X_1 + \beta_1 - \beta_2)}\left(\frac{1}{a}\sin(2X_1 + \beta_1 - \beta_2)\right.$$

$$\left(\sin^{\frac{1}{a-1} - 1}\left(\frac{a-1}{2a}(X_2 - X_1) + b\right)\right)\left(\sin\left(\frac{3}{2}\pi + \frac{3}{2}X_2 + \frac{1}{2}X_1 + 3b - \beta_1 - \beta_2 - \gamma_0\right)\right.$$

$$\left. + \sin\left(\frac{1}{2}\pi + \frac{1}{2}X_2 + \frac{3}{2}X_1 + b + \beta_1 - \beta_2 - \gamma_0\right)\right)$$

$$+ \sin^{\frac{1}{a-1} - 1}\left(\frac{a-1}{2a}(X_2 + X_1) + b\right)\left(\sin\left(\frac{1}{2}\pi + \frac{3}{2}X_2 - \frac{1}{2}X_1 + 3b - \beta_1 - \beta_2 - \gamma_0\right)\right.$$

$$\left. + \sin\left(\frac{3}{2}\pi + \frac{1}{2}X_2 - \frac{3}{2}X_1 + b - \beta_1 + \beta_2 - \gamma_0\right)\right)\right)$$

$$+ \sin^{\frac{1}{a-1} - 1}\left(\frac{a-1}{2a}(X_2 - X_1) + b\right)$$

$$\left(\sin\frac{(5a-2)}{2a}X_2 - \frac{5a-2}{2a}X_1 + 5b - 2\beta_1 - \gamma_0\right) - \sin\left(\frac{3}{2}X_2 - \frac{3}{2}X_1 + 3b - 2\beta_1 - \gamma_0\right)$$

$$- \sin\left(\frac{5a-2}{2a}X_2 + \frac{3a+2}{2a}X_1 + 5b - 2\beta_2 - \gamma_0\right) + \sin\left(\frac{3}{2}X_2 + \frac{5}{3}X_1 + 3b - 2\beta_2 - \gamma_0\right)\right)$$

$$+ \sin^{\frac{1}{a-1} - 1}\left(\frac{a-1}{2a}(X_2 + X_1) + b\right)$$

$$\sin\left(\frac{5a-2}{2a}X_2 + \frac{5a-2}{2a}X_1 + 5b - 2\beta_2 - \gamma_0\right) - \sin\left(\frac{3}{2}X_2 + \frac{3}{2}X_1 + 3b - 2\beta_2 - \gamma_0\right)$$

$$- \sin\left(\frac{5a-2}{2a}X_2 - \frac{3a-2}{2a}X_1 + 5b - 2\beta_1 - \gamma_0\right) + \sin\left(\frac{3}{2}X_2 - \frac{5}{2}X_1 + 3b - 2\beta_1 - \gamma_0\right)\right)\right)$$

$$= \frac{c}{4\sin^2(2X_1 + \beta_1 - \beta_2)} \sum_{n=0}^{\frac{1}{a-1} - 1} \frac{1}{2^{\frac{1}{a-1} - 2}} \left(\frac{\frac{1}{a-1} - 1}{n}\right)\left(\frac{1}{a}\sin(2X_1 + \beta_1 - \beta_2)\right)$$

$$\left(\sin\left(\pi + \frac{3}{2}X_2 + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)\right)$$

$$\cos\left(\frac{1}{2}\pi + \frac{1}{2}X_1 + \left(\frac{1}{a-1} - 1 - 2n\right)\frac{a-1}{2a}X_1\right)$$

$$+ \sin\left(\pi + \frac{1}{2}X_2 + b - \gamma_0 - \left(\frac{1}{a-1} - 1 - 2n\right)\left(\frac{a0-1}{2a}X_2 + b - \frac{\pi}{2}\right)\right)$$

$$\cos\left(-\frac{1}{2}\pi + \frac{3}{2}X_1 + \beta_1 - \beta_2 + \left(\frac{1}{a-1} - 1 - 2n\right)\frac{a-1}{2a}X_1\right)\right)$$

$$- \sin\left(\frac{3}{2}X_2 + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)\right)$$

-continued $$\cos\left(-\frac{3}{2}X_1 - \beta_1 + \beta_2 + \left(\frac{1}{a-1} - 1 - 2n\right)\frac{a-1}{2a}X_1\right)$$

$$+ \sin\left(\frac{3}{2}X_2 + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$\cos\left(\frac{5}{2}X_1 + \beta_1 - \beta_2 + \left(\frac{1}{a-1} - 1 - 2n\right)\frac{a-1}{2a}X_1\right)$$

$$+ \sin\left(\frac{5a-2}{2a}X_2 + 5b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$\cos\left(-\frac{5a-2}{2a}X_1 - \beta_1 + \beta_2 - \gamma_0 - \left(\frac{1}{a-1} - 1 - 2n\right)\frac{a-1}{2a}X_1\right)$$

$$+ \sin\left(\frac{5a-2}{2a}X_2 + 5b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$\cos\left(\frac{3a+2}{2a}X_1 + \beta_1 - \beta_2 + \left(\frac{1}{a-1} - 1 - 2n\right)\frac{a-1}{2a}X_1\right)$$

$$= \frac{c}{\sin^2(2X_1 + \beta_1 - \beta_2)} \sum_{n=0}^{\frac{1}{a-1}-1} 2^{-\frac{1}{a-1}} \left(\frac{\frac{1}{a-1}-1}{n}\right)\left(\frac{1}{a}\sin(2x_1 + \beta_1 - \beta_2)\right)$$

$$\left(\sin\left(\frac{3}{2} + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)\right)$$

$$\sin\left(\frac{1}{2}X_1 + \left(\frac{1}{a-1} - 1 - 2n\right)\frac{a-1}{2a}X_1\right)$$

$$- \sin\left(\frac{1}{2}X_2 + b - \gamma_0 - \left(\frac{1}{a-1} - 1 - 2n\right)\left(\frac{a-1}{2a}X_2 + b - \frac{\pi}{2}\right)\right)$$

$$\sin\left(\frac{3}{2}X_1 + \beta_1 - \beta_2 + \left(\frac{1}{a-1} - 1 - 2n\right)\frac{a-1}{2a}X_1\right)$$

$$+ \sin\left(\frac{3}{2}X_2 + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$2\sin\left(\frac{1}{2}X_1 + \left(\frac{1}{a-1} - 1 - 2n\right)\frac{a-1}{2a}X_1\right)\sin(-2X_1 - \beta_1 + \beta_2)$$

$$- \sin\left(\frac{5a-2}{2a}X_2 + 5b - \beta_1 - \beta_2 - \gamma_0 - \left(\frac{1}{a-1} - 1 - 2n\right)\left(\frac{a-1}{2a}X_2 + b - \frac{\pi}{1}\right)\right)$$

$$2\sin\left(\frac{2-a}{2a}X_2 + \left(\frac{1}{a-1} - 1 - 2n\right)\frac{a-1}{2a}X_1\right)\sin(-2X_1 - \beta_1 + \beta_2)$$

$$= \frac{c}{\sin(2X_1 + \beta_1 - \beta_2)} \sum_{n=0}^{\frac{1}{a-1}-1} 2^{-\frac{1}{a-1}} \left(\frac{\frac{1}{a-1}-1}{n}\right)$$

$$\left(\left(\frac{1}{a} - 2\right)\sin\left(\frac{3}{2}X_2 + 3b - \beta_1 - \beta_2 - \gamma_0 - \left(\frac{1}{a-1} - 1 - 2n\right)\left(\frac{a-1}{2a}X_2 + b - \frac{\pi}{2}\right)\right)\right)$$

$$\sin\left(\frac{1}{2}X_1 + \left(\frac{1}{a-1} - 1 - 2n\right)\frac{a-1}{2a}X_1\right)$$

$$- \frac{1}{a}\sin\left(\frac{1}{2}X_2 + b - \gamma_0 - \left(\frac{1}{a-1} - 1 - 2n\right)\left(\frac{a-1}{2a}X_2 + b - \frac{\pi}{2}\right)\right)$$

$$\sin\left(\frac{3}{2}X_1 + \beta_1 - \beta_2 + \left(\frac{1}{a-1} - 1 - 2n\right)\frac{a-1}{2a}X_1\right)$$

$$+ 2\sin\left(\frac{5a-2}{2a}X_2 + 5b - \beta_1 - \beta_2 - \gamma_0 - \left(\frac{1}{a-1} - 1 - 2n\right)\left(\frac{a-1}{2a}X_2 + b - \frac{\pi}{2}\right)\right)$$

$$\sin\left(\frac{2-a}{2a} X_1 + \left(\frac{1}{a-1} - 1 - 2n\right) \frac{a-1}{2a} X_1\right)\right)$$

6.21.7.2.1.2.3 Integrating factor for the circle through the origin

If $a = 2$ then $$r_1 = c\sin^{\frac{1}{a-1}}((a-1)\theta_1 + b) = c\sin(\theta_1 + b) = c\cos\left(\frac{\pi}{2} - (\theta_1 + b)\right).$$

This is the equation of a circle through the origin where b is that one of the angles between the tangent at the origin O and the initial line 20 which does not overlap with $\theta_1$ and $|c|$ is the diameter of the circle as shown in FIG. 99. Since $r_1$ is always positive by convention $0 \leq |\theta_1 + b|_0^{2\pi} \leq \pi$ if c is positive and $\pi < |\theta_1 + b|_0^{2\pi} < 2\pi$ if c is negative. Similarly for $$r_2 = c\sin^{\frac{1}{a-1}}((a-1)\theta_2 + b).$$

As $$\frac{1}{a-1} - 1 = 0 \text{ and } \binom{0}{0} = 1$$

the numerator common to both the expressions for the integrating factor involving one differential becomes:

$$\frac{c}{2\sin^2(2X_1 + \beta_1 - \beta_2)} \left(\sin\left(\frac{1}{2} X_2 + b - \gamma_0\right)\right.$$

$$\left(2\sin\left(-\frac{1}{2} X_1\right) + \frac{1}{2} \sin(2X_1 + \beta_1 - \beta_2)\cos\left(\frac{3}{2} X_1 + \beta_1 - \beta_2\right)\right) + \sin\left(\frac{3}{2} X_2 + 3b - \beta_1 - \beta_2 - \gamma_0\right)$$

$$\left(2\sin\frac{1}{2} X_1 \cos(2X_1 + \beta_1 - \beta_2) - \frac{1}{2} \sin(2X_1 + \beta_1 - \beta_2)\cos\frac{1}{2} X_1\right)\right) =$$

$$\frac{c}{4\sin^2(2X_1 + \beta_1 - \beta_2)} \left(\cos\left(\frac{3}{2} X_2 + 3b + \frac{1}{2} \pi - \beta_1 - \beta_2 - \gamma_0\right)\right.$$

$$\left(\sin(2X_1 + \beta_1 - \beta_2)\cos\frac{1}{2} X_1 - 4\cos(2X_1 + \beta_1 - \beta_2)\sin\frac{1}{2} X_1\right) +$$

$$\cos\left(\frac{1}{2} X_2 + b - \frac{1}{2} \pi - \gamma_0\right)\left(\sin(2X_1 + \beta_1 - \beta_2)\cos\left(\frac{3}{2} X_1 + \beta_1 - \beta_2\right) - 4\sin\frac{1}{2} X_1\right)\right)$$

while the denominator of the expression for the integrating factor involving $dX_1$ becomes:

$$\frac{c}{2\sin(2X_1 + \beta_1 - \beta_2)} \left(\left(\frac{1}{2} - 2\right)\sin\left(\frac{3}{2} X_2 + \right.\right.$$

$$\left.3b - \beta_1 - \beta_2 - \gamma_0\right)\sin\frac{1}{2} X_1 -$$

$$\frac{1}{2} \sin\left(\frac{1}{2} X_2 + b - \gamma_0\right)\sin\left(\frac{3}{2} X_1 + \beta_1 - \beta_2\right)\right) =$$

$$\frac{c}{4\sin(2X_1 + \beta_1 - \beta_2)} \left(3\cos\left(\frac{3}{2} X_2 + \right.\right.$$

$$\left.3b + \frac{1}{2} \pi - \beta_1 - \beta_2 - \gamma_0\right)\sin\frac{1}{2} X_1 -$$

$$\cos\left(\frac{1}{2} X_2 + b - \frac{1}{2} \pi - \gamma_0\right)\sin\left(\frac{3}{2} X_1 + \beta_1 - \beta_2\right)\right)$$

It will be observed that both these expressions are very similar to their corresponding expressions for a portion of a hemisphere (whose centre lies at the origin ) and differ only in that the $X_2, \gamma_0$ terms have constants $3b + \frac{1}{2}\pi$ instead of $4b$ and $b - \frac{1}{2}\pi$ instead of zero, while $c/2$ replaces $r_1$. So that the same integrating factor is obtained for the circle through the origin as for the portion of a hemisphere; and the solution for the portion of the hemisphere may be utilised, if the appropriate constants are substituted, for the circle through the origin.

7.0 Summary

It should be understood that the various embodiments of the electromagnetic energy directing method and apparatus hereinbefore described are given by way of example only, and are not meant to limit the scope of the invention.

As can be seen from the foregoing description a large number of embodiments of the present invention can be envisaged, and it should therefore be understood that not all of these provide all of the advantages listed in Section 3.0.

I claim:

1. An apparatus for directing electromagnetic energy comprising a source with an extent selected from the group consisting of an area and a volume from which electromagnetic energy of at least one wavelength is emitted first towards a defined surface and thence to a defining surface, the nature of each surface being selected from the group consisting of everywhere reflective and everywhere refractive, wherein each point on the defined surface lies at a point of intersection of a pair of defining rays radiating from different points within said extent, each defining ray being of a defining wavelength and being propagated by the defined surface, said propagation being selected from the group consisting of reflection and refraction according to the nature of said defined surface, and then being incident to the same side of the defining surface at a respective further point and there being propagated through a respective predetermined directed angle, said propagation being selected from the group consisting of reflection and refraction according to the nature of said defining surface, so that the defined surface is optically nearer to the source than the defining surface along both defining rays, and further the directed angle of a half-tangent to the defining surface which is co-planar with the two defining rays and lies at any intermediate point on the defining surface between the two respective further points is intermediate between the directed angles of two similarly orientated half-tangents which are co-planar with the two defining rays and lie at the respective further points, and a further ray from said source and of said defining wavelength passing through said point of intersection and also any one of such intermediate points is propagated by the defining surface through a directed angle selected from the group consisting of a directed angle intermediate between the two respective predetermined directed angles and a directed angle approximately equal to one of them, said propagation being selected from the group consisting of reflection and refraction according to the nature of said defining surface.

2. An apparatus as claimed in claim 1 which has an axis of symmetry, the defining and defined surfaces being formed by rotation about said axis of symmetry.

3. An apparatus as claimed in claim 1 which has an axis of symmetry, the defining and defined surfaces being formed by rotation about said axis of symmetry, such that if a line parallel to or coincident with said axis of symmetry is chosen as the initial line in a system of two dimensional polar co-ordinates in a plane through said axis of symmetry and as the positive half of the x-axis in a system of two dimensional cartesian co-ordinates in said plane then a point on said defining surface has polar co-ordinates $r,\theta$, gradient $\gamma$ and cartesian co-ordinates $x,y$ while a point on said defined surface has polar co-ordinates $r_0,\theta_0$, gradient $\gamma_0$ and cartesian co-ordinates $x_0,y_0$.

4. An apparatus as claimed in claim 3 in which each pair of defining rays whose intersection specifies a point on the defined surface lie entirely in a respective plane through the axis of symmetry such that if a further line parallel to said axis of symmetry through the point of intersection of a pair of defining rays in a plane through said axis of symmetry is chosen as an initial line in a further system of two dimensional polar co-ordinates in said plane then a point on the defining surface has further polar co-ordinates $p,\delta$ and the polar co-ordinates of the respective further point for the first defining ray are $r_1,\theta_1$, the further polar coordinates of said respective further point for said first defining ray are $p_1,\gamma_1$, the gradient of said defining surface at said respective further point for said first defining ray is $\gamma_1$, the polar co-ordinates of the respective further point for the second defining ray are $r_2,\theta_2$, the further polar co-ordinates of said respective further point for said second defining ray are $p_2,\delta_2$, the gradient of said defining surface at said respective further point for said second defining ray is $\gamma_2$, said first defining ray is reflected or refracted from said defining surface at an output angle of $\beta_1$ to the x-axis and said second defining ray is reflected or refracted from said defining surface at an output angle of $\beta_2$ to the x-axis.

5. An apparatus as claimed in claim 4 wherein the defining surface is in the form of first and second defining surfaces of the same type as the surface reformed and a respective one of the defining rays is incident on each of said defining surfaces to a similarly orientated side to that on which the other defining ray is incident to the other defining surface and the intermediate point lies on either of said defining surfaces in the plane of and between the pair of defining rays so that the respective further point for said first defining ray lies on said first defining surface and the gradient of said first defining surface at said respective further point for said first defining ray is $\gamma_1$ and said first defining ray is reflected or refracted from said first defining surface at an output angle of $\beta_1$ to the x-axis and the respective further point for said second defining ray lies on said second defining surface and the gradient of said second defining surface at said respective further point for said second defining ray is $\gamma_2$ and said second defining ray is reflected or refracted from said second defining surface at an output angle of $\beta_2$ to the x-axis.

6. An apparatus as claimed in claim 5 wherein an edge of said first defining surface is everywhere contiguous with an edge of said second defining surface.

7. An apparatus as claimed in claim 4 in which the defining surface is continuous.

8. An apparatus as claimed in claim 4 in which the defined surface is continuous.

9. An apparatus as claimed in claim 7 in which the gradient of a portion of said surface is specified by $\gamma=b$ where b is a constant so that the differential equation for said surface is an exact differential over said region.

10. An apparatus as claimed in claim 8 in which the gradient of at least a portion of said surface is specified by $\gamma_0=b_0$ where $b_0$ is a constant so that the differential equation for said surface is an exact differential over said region.

11. An apparatus as claimed in claim 8 in which the co-ordinates used in the differential equation for said surface are the polar co-ordinates $r_0,\theta_0$ and the gradient $\gamma_0$ of at least a portion of said surface is specified by $\gamma_0(r_0,\theta_0)=\theta_0+2n\pi\pm\pi/2$ so that said differential equation is an exact differential over said region.

12. An apparatus as claimed in claim 8 in which the gradient of at least a portion of said surface is continuous and is specified by its partial derivative with respect to one of the co-ordinates used in the differential equation for said surface together with a constant of integration, its partial derivative with respect to the other co-ordinate used in said differential equation being determined from the condition that said differential equation is an exact differential; so that said condition is automatically satisfied and said differential equation is an exact differential over said region.

13. An apparatus as claimed in claim 12 in which the co-ordinates used in said differential equation are the Cartesian co-ordinates $x_0,y_0$ and the partial derivatives of said gradient $\gamma_0$ are:

$$\left(\frac{\partial\gamma_0}{\partial x_0}\right)_{y_0}=\frac{\cos\gamma_0}{x_0\sin\gamma_0-y_0\cos\gamma_0}$$

and $$\left(\frac{\partial\gamma_0}{\partial y_0}\right)_{x_0}=\frac{\sin\gamma_0}{x_0\sin\gamma_0-y_0\cos\gamma_0}$$

so that said gradient is given by:

$x_0\cos\gamma_0+y_0\sin\gamma_0=a_0$ where $a_0$ is a constant.

14. An apparatus as claimed in claim 12 in which the co-ordinates used in said differential equation are the polar co-ordinates $r_0,\theta_0$ and the partial derivatives of said gradient $\gamma_0$ are:

$$\left(\frac{\partial \gamma_0}{\partial r_0}\right)_{\theta_0} = \frac{1}{r_0} \cot(\gamma_0 - \theta_0)$$

and $$\left(\frac{\partial \gamma_0}{\partial \theta_0}\right)_{r_0} = 1$$

so that said gradient is given by:

$$\gamma_0(r_0, \theta_0) = \arccos \frac{a_0}{r_0} + \theta_0$$

where $a_0$ is a constant.

15. An apparatus as claimed in claim 8 in which the gradient of at least a portion of said defined surface is specified by its partial derivatives with respect to the co-ordinates used in the differential equation for said defined surface together with a constant of integration in such a manner that said differential equation after the application of an integrating factor is an exact differential over said region and both the expression for the differential of the natural logarithm of said integrating factor given by the condition that said differential equation after the application of said integrating factor is an exact differential arid the sum over both the co-ordinates used in said differential equation of the product of the partial derivative of said gradient with respect to one of said co-ordinates and the differential of that co-ordinate, namely $$\sum_{i=1}^{2} \left(\frac{\partial \gamma_0}{\partial X_i}\right)_{X_j} dX_i$$

where $j \neq i, \gamma_0$ is said gradient and $X_1, X_2$ are said co-ordinates used in the differential equation, are exact differentials over said region.

16. An apparatus as claimed in claim 15 in which the co-ordinates used in said differential equation are the cartesian co-ordinates $x_0, y_0$ and the partial derivatives of said gradient are:

$$\left(\frac{\partial \gamma_0}{\partial x_0}\right)_{y_0} = \Re \left(\sum_{j=0}^{\infty} a_j (x_0 + iy_0)^j\right)$$

and $$\left(\frac{\partial \gamma_0}{\partial y_0}\right)_{x_0} = \Re \left(\sum_{j=0}^{\infty} a_j (x_0 + iy_0)^j i\right)$$

where each $a_j$ is a complex constant, any $a_j$ may be zero, and, if the series have an infinite number of terms, they are each convergent; so that said gradient is given by:

$$\gamma_0(x_0, y_0) = \Re \left(\sum_{j=0}^{\infty} \frac{a_j}{j+1} (x_0 + iy_0)^{j+1}\right) + b_0$$

where $b_0$ is a real constant.

17. An apparatus as claimed in claim 15 in which the co-ordinates used in said differential equation are the polar co-ordinates $r_0, \theta_0$ and the partial derivatives of said gradient are:

$$\left(\frac{\partial \gamma_0}{\partial r_0}\right)_{\theta_0} = \Re \left(\sum_{j=0}^{\infty} a_j r_0^{j-1} e^{j\theta_0 i}\right)$$

and $$\left(\frac{\partial \gamma_0}{\partial \theta_0}\right)_{r_0} = \Re \left(\sum_{j=0}^{\infty} a_j r_0^j e^{j\theta_0 i}\right)$$

where each $a_j$ is a complex constant, any $a_j$ may be zero, and, if the series have an infinite number of terms, they are each convergent; so that said gradient is given by:

$$\gamma_0(r_0, \theta_0) = a_0 \Re \ln r_0 - a_0 \ast \theta_0 + b_0 + \Re \left(\sum_{j=1}^{\infty} \frac{a_j}{j} r_0^j e^{j\theta_0 i}\right)$$

where $b_0$ is a real constant.

18. An apparatus as claimed in claim 16 in which said gradient of at least a portion of said surface is additionally specified by:

$$\tan \gamma_0 = \frac{\Re \left(\sum_{j=0}^{\infty} c_j (x_0 + iy_0)^j i\right)}{\Re \left(\sum_{j=0}^{\infty} c_j (x_0 + iy_0)^j\right)}$$

where each $c_j$ is a complex constant and any $c_j$ may be zero.

19. An apparatus as claimed in claim 17 in which said gradient of at least a portion of said surface is additionally specified by:

$$\tan(\gamma_0 - \theta_0) = - \frac{\Re \left(\sum_{j=0}^{\infty} c_j r_0^j e^{j\theta_0 i}\right)}{\Re \left(\sum_{j=0}^{\infty} c_j r_0^j e^{j\theta_0 i} i\right)}$$

where each $c_j$ is a complex constant arid any $c_j$ may be zero.

20. An apparatus as claimed in claim 8 in which the defining surface is reflective and the gradient of at least a portion of said defined surface is specified by its partial derivatives with respect to the co-ordinates used in the differential equation for said defined surface together with a constant of integration in such a manner that said differential equation after the application of an integrating factor is an exact differential over said region and both the expression for the differential of the natural logarithm of said integrating factor given by the condition that said differential equation after the application of said integrating factor is an exact differential and the sum over both the co-ordinates used in said differential equation of the product of the partial derivative of said gradient with respect to one of said co-ordinates and the differential of that co-ordinate, namely $$\sum_{i=1}^{2} \left(\frac{\partial \gamma_0}{\partial X_i}\right)_{X_j} dX_i$$

where $j \neq i$, $\gamma_0$ is said gradient and $X_1, X_2$ are said co-ordinates used in the differential equation, are exact differentials over said region.

21. An apparatus as claimed in claim 20 in which the co-ordinates used in said differential equation are $X_1, X_2$ where $X_1$ relates to the first defining mirror-ray combination only while $X_2$ relates to the second defining mirror-ray combination only and $$\left(\frac{\partial \gamma_0}{\partial X_2}\right)_{X_1} = 0$$

but $\gamma_0 \neq 2\gamma_1 - \beta_1 - n\pi$.

22. An apparatus as claimed in claim 20 in which the co-ordinates used in said differential equation are $X_1, X_2$ where $X_1$ relates to the first defining mirror-ray combination only while $X_2$ relates to the second defining mirror-ray combination only and $$\left(\frac{\partial \gamma_0}{\partial X_1}\right)_{X_2} = 0$$

but $\gamma_0 \neq 2\gamma_2 - \beta_2 - n\pi$.

23. An apparatus as claimed in claim 20 in which the co-ordinates used in said differential equation are $X_1, X_2$ where $X_1$ relates to the first defining mirror-ray combination only while $X_2$ relates to the second defining mirror-ray combination only and $$\left(\frac{\partial \gamma_0}{\partial X_1}\right)_{X_2}$$

is a non-zero constant or a function only of $X_1$ while $$\left(\frac{\partial \gamma_0}{\partial X_2}\right)_{X_1}$$

is a non-zero constant or a function only of $X_2$ so that:

$$\gamma_0 = \frac{2\gamma_2 - \beta_2 + 2\gamma_1 - \beta_1 - n\pi}{2}.$$

24. An apparatus as claimed in claim 20 in which the co-ordinates used in said differential equation are $X_1, X_2$ where $X_1$ relates to the first defining mirror-ray combination only while $X_2$ relates to the second defining mirror-ray combination only and $\left(\frac{\partial \gamma_0}{\partial X_1}\right)_{X_2} = \sum_{j=0}^{\infty} \sum_{k=0}^{\infty} j a_{jk} X_1^{j-1} X_2^k$ while $\left(\frac{\partial \gamma_0}{\partial X_2}\right)_{X_1} = \sum_{j=0}^{\infty} \sum_{k=0}^{\infty} k a_{jk} X_1^j X_2^{k-1}$ so that $\gamma_0 = \sum_{j=0}^{\infty} \sum_{k=0}^{\infty} a_{jk} X_1^j X_2^k.$ 25. An apparatus as claimed in claim 8 in which the defining surface is reflective and the co-ordinates used in the differential equation for said defined surface are $X_1, X_2$ where both $X_1$ and $X_2$ each relate to both defining mirror-ray combinations and the partial derivative of the gradient of at least a portion of said defined surface with respect to one of said co-ordinates is zero so that said gradient is specified only in terms of the other of said variables, for instance as $\gamma_0 = \gamma_0(X_2)$ when $$\left(\frac{\partial \gamma_0}{\partial X_1}\right)_{X_2} = 0,$$

and said differential equation after the application of an integrating factor is an exact differential over said region.

26. An apparatus as claimed in claim 25 in which when the variables $\theta_1, \theta_2, 2\gamma_1 - \beta_1, 2\gamma_2 - \beta_2, r_1, r_2$ are numbered such that the ordered set or list of variables $\{Y_1, \ldots, Y_6\} \leftrightarrow \{\theta_1, \theta_2, 2\gamma_1 - \beta_1, 2\gamma_2 - \beta_2, r_1, r_2\}$ in an ordered one-to-one correspondence, each of the variables $X_1, X_2$ is defined in terms of a function of an odd numbered variable, $G(Y_{2j-1})$ where $j=1,2,3$, and a function of its corresponding even numbered variable, $F(Y_{2j})$.

27. An apparatus as claimed in claim 26 in which said variables are defined as:

$$X_2 = F(Y_{2j}) + G(Y_{2j-1})$$

and $$X_1 = F(Y_{2j}) - G(Y_{2j-1}).$$

28. An apparatus as claimed in claim 27 in which the radius co-ordinate of the axially symmetric defining mirror is specified by $$r_1 = c \sin^{\frac{1}{a-1}}((a-1)\theta_1 + b)$$

where $a,b,c$ are real constants and said variables are defined as:

$$X_2 = a\theta_2 + a\theta_1$$

and $$X_1 = a\theta_2 - a\theta_1.$$

29. An apparatus as claimed in claim 28 in which the output angles of the defining rays, $\beta_1$ and $\beta_2$, are constant, or vary so slowly with $\theta_1$ and $\theta_2$ respectively that they may be regarded as locally constant.

30. An apparatus as claimed in claim 29 in which said axially symmetric defining mirror comprises a portion of a hemisphere whose centre lies at the pole, so that $a=1$ and $b=-\pi/2$ for acute angles of $\gamma_1$ and $\gamma_2$ and obtuse angles of $\theta_1$ and $\theta_2$, while $b=\pi/2$ for obtuse angles of $\gamma_1$ and $\gamma_2$ and acute angles of $\theta_1$ and $\theta_2$, and $r_2 = r_1$, a constant.

31. An apparatus as claimed in claim 30 in which the gradient of at least a portion of said defined surface is specified by $\gamma_0 = \frac{1}{2} X_2 \mp \frac{1}{2} \pi$.

32. An apparatus as claimed in claim 30 in which the gradient of at least a portion of said defined surface is specified by $\gamma_0 = \frac{1}{2} X_2 - \frac{1}{2} \pi$ and the range for $X_1$ is $0 \leq X_1 \leq \frac{1}{2} \pi$.

33. An apparatus as claimed in claim 29 in which said axially symmetric defining mirror has a section in a plane through said axis of symmetry which is a circle through the origin, so that $a=2$.

34. An apparatus as claimed in claim 4 in which the defining surface is reflective and all the defining rays are incident to the same side of the defining mirror as any perpendicular from the axis of symmetry; and for each point of intersection of a pair of defining rays $\gamma'_1$ is the gradient of said defining mirror at a point whose further polar co-ordinates are $p'_1, \delta'_1$ and $p'_1$ has at most a single value for any value of $\delta'_1, \gamma'_2$ is the gradient of said defining mirror at a point whose further polar co-ordinates are $p'_2, \delta'_2$ and $p'_2$ has at most a single value for any value of $\delta'_2$, and $\gamma'_2 > \gamma'_1$ for all $\delta'_2 > \delta'_1$ and for all $\delta'_1$ where for the purpose of said comparison $\gamma'_1, \gamma'_2$ are directed angles; so that said defining mirror is concave with respect to all the points of intersection of each pair of the defining rays.

35. An apparatus as claimed in claim 34 in which the output angles of one of said pairs of defining rays are the same or approximately the same so that, for those in-plane rays comprising said pair of defining rays and the further rays for their point of intersection, the angular output aperture of said in-plane rays, when defined as the maximum of the angles between any two of the output rays corresponding to said in-plane rays if said output angles have a range greater than or equal to $-\pi$ but less than $\pi$, is less than the angular input aperture for said point, when defined as the angle between said pair of defining rays on incidence to the defined surface.

36. An apparatus as claimed in claim 34 in which a further ray from the point of intersection of one of said pairs of defining rays is co-planar with said two defining rays and intersects said defining mirror at an intermediate point with further polar co-ordinates $p_3, \frac{1}{2}(\delta_2+\delta_1)$ and the gradient $\gamma_3$ of said defining mirror at said intermediate point is approximately equal to $\frac{1}{2}(\gamma_2+\gamma_1)$ so that the angle $\omega_1$ between the output direction of said further ray and the output direction of the first defining ray is given by the approximation $$\cos\omega_1 \approx \cos\frac{\beta_1-\beta_2}{2}.$$

37. An apparatus as claimed in claim 36 in which $\beta_1=\beta_2$.
38. An apparatus as claimed in claim 36 in which $\beta_1\approx\beta_2$.
39. An apparatus as claimed in claim 36 in which said defining mirror is such that $\frac{1}{2}(\delta_2-\delta_1)$ is very nearly equal to $\gamma_2-\gamma_1$ so that $$|\omega_1| \ll \frac{\delta_2-\delta_1}{2}.$$

40. An apparatus as claimed in claim 35 further comprising a plurality of stages wherein the first stage includes said defining surface together with said defined surface and each additional stage includes a defining surface together with a defined surface respectively having the characteristics of said defining surface and said defined surface.

41. An apparatus as claimed in claim 40 wherein the rays output from a stage form the input to a further stage which will be referred to as the next successive stage in series to said stage and which has smaller choices for the angular input aperture at the various points on its defined surface than said stage in order to improve the accuracy with which those rays are directed.

42. An apparatus as claimed in claim 40 wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

43. An apparatus as claimed in claim 41 wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

44. An apparatus as claimed in claim 42 wherein the defined surface of a parallel stage is a mirror which incorporates a mirror on its reverse side which mirror forms the defining mirror of the next parallel stage inwards.

45. An apparatus as claimed in claim 43 wherein the defined surface of a parallel stage is a mirror which incorporates a mirror on its reverse side which mirror forms the defining mirror of the next parallel stage inwards.

46. An apparatus as claimed in any of claims 41 to 45 in which there is a plurality of first stages, each including a defining and a defined mirror, which first stages will be referred to as being in parallel to one another, so that the input aperture of each such parallel first stage is but a fraction of that of an input aperture formed by an edge of the outermost defining mirror and an edge of the innermost defined mirror of said parallel first stages, and the gradient in a plane through the axis of symmetry of each of the defined mirrors of said parallel first stages is such that the angles of incidence of the rays of electromagnetic energy on said defined mirrors are high and such that said defined mirrors are long and thus have a high surface area, whereby said high angles of incidence, said high surface area of the defined mirror of and said relatively small input aperture for each such parallel first stage enable the source to have a very high intensity over a large waveband.

47. An apparatus as claimed in any of claims 41 to 45 wherein there is a predetermined direction for a stage which is the last in a series of stages and every defining ray for said stage is reflected through a respective predetermined directed angle so as to be parallel to said predetermined direction and the defining surface for said stage is such that the further rays for said stage are reflected to be approximately parallel to said predetermined direction.

48. An apparatus as claimed in any of claims 41 to 45 wherein there is a predetermined focus for a stage which is the last in a series of stages and every defining ray for said stage is reflected through a respective predetermined directed angle so as to come to said predetermined focus and the defining surface for said stage is such that the further rays for said stage are reflected to come approximately to said predetermined focus.

49. An apparatus as claimed in any of claims 41 to 45 wherein there is a predetermined output angle to the x-axis for a stage which is the last in a series of stages and every defining ray for said stage is reflected from the defining mirror for said stage at an output angle to the x-axis equal to said predetermined output angle and said defining mirror is such that the further rays for said stage are reflected from said defining mirror at output angles to the x-axis approximately equal to said predetermined output angle.

50. An apparatus as claimed in claim 39 further comprising a plurality of stages wherein the first stage includes said defining surface together with said defined surface and each additional stage includes a defining surface together with a defined surface respectively having the characteristics of said defining surface and said defined surface.

51. An apparatus as claimed in claim 50 wherein the rays output from a stage form the input to a further stage which will be referred to as the next successive stage in series to said stage and which has smaller choices for the angular input aperture at the various points on its defined surface than said stage in order to improve the accuracy with which those rays are directed.

52. An apparatus as claimed in claim 50 wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

53. An apparatus as claimed in claim 51 wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

54. An apparatus as claimed in claim 52 wherein the defined surface of a parallel stage is a mirror which incorporates a mirror on its reverse side which mirror forms the defining mirror of the next parallel stage inwards.

55. An apparatus as claimed in claim 53 wherein the defined surface of a parallel stage is a mirror which incorporates a mirror on its reverse side which mirror forms the defining mirror of the next parallel stage inwards.

56. An apparatus as claimed in any of claims 51 to 55 in which there is a plurality of first stages, each including a defining and a defined mirror, which first stages will be referred to as being in parallel to one another, so that the input aperture of each such parallel first stage is but a fraction of that of an input aperture formed by an edge of the outermost defining mirror and an edge of the innermost defined mirror of said parallel first stages, and the gradient in a plane through the axis of symmetry of each of the defined mirrors of said parallel first stages is such that the angles of incidence of the rays of electromagnetic energy on said defined mirrors are high and such that said defined mirrors are long and thus have a high surface area, whereby said high angles of incidence, said high surface area of the defined mirror of and said relatively small input aperture for each such parallel first stage enable the source to have a very high intensity over a large waveband.

57. An apparatus as claimed in any of claims 51 to 55 wherein there is a predetermined direction for a stage which is the last in a series of stages and every defining ray for said stage is reflected through a respective predetermined directed angle so as to be parallel to said predetermined direction and the defining surface for said stage is such that the further rays for said stage are reflected to be approximately parallel to said predetermined direction.

58. An apparatus as claimed in any of claims 51 to 55 wherein there is a predetermined focus for a stage which is the last in a series of stages and every defining ray for said stage is reflected through a respective predetermined directed angle so as to come to said predetermined focus and the defining surface for said stage is such that the further rays for said stage are reflected to come approximately to said predetermined focus.

59. An apparatus as claimed in any of claims 51 to 55 wherein there is a predetermined output angle to the x-axis for a stage which is the last in a series of stages and every defining ray for said stage is reflected from the defining mirror for said stage at an output angle to the x-axis equal to said predetermined output angle and said defining mirror is such that the further rays for said stage are reflected from said defining mirror at output angles to the x-axis approximately equal to said predetermined output angle.

60. An apparatus as claimed in any of claims 41 to 43 or 51 to 53 in which the defining mirrors of at least two successive stages in a series form a continuous reflective surface.

61. An apparatus as claimed in claim 60 in which the defining mirror of each of said successive stages has a regular envelope to the lines extending those portions of the defining rays for that stage before their reflection by said defining mirror.

62. An apparatus as claimed in claim 60 in which there is a single regular envelope to the lines extending those portions of the defining rays for all of said successive stages before their reflection by said defining mirrors.

63. An apparatus as claimed in claim 61 in which at least two defined mirrors of successive stages in a series are similarly orientated and the specification of the gradient in a plane through the axis of symmetry for, and the position of, each of said defined mirrors is such that said defined mirrors form one continuous reflective surface.

64. An apparatus as claimed in claim 62 in which at least two defined mirrors of successive stages in a series are similarly orientated and the specification of the gradient in a plane through the axis of symmetry for, and the position of, each of said defined mirrors is such that said defined mirrors form one continuous reflective surface.

65. An apparatus as claimed in any of claims 41 to 43 or 51 to 53 in which at least two defined mirrors of successive stages in a series are similarly orientated and the specification of the gradient in a plane through the axis of symmetry for, and the position of, each of said defined mirrors is such that said defined mirrors form one continuous reflective surface.

66. An apparatus as claimed in claim 63 in which that point of the defined mirror of the lowest numbered stage of said successive stages which is nearest the source has the largest value of the gradient in a plane through the axis of symmetry, and of the angular input aperture, the defined mirrors of each successive stage are further from said source and from said axis of symmetry, and the value of said gradient, and of said angular input aperture, progressively reduce as the point of intersection of the defining rays moves along said continuous surface away from said source through said successive stages.

67. An apparatus as claimed in claim 64 in which that point of the defined mirror of the lowest numbered stage of said successive stages which is nearest the source has the largest value of the gradient in a plane through the axis of symmetry, and of the angular input aperture, the defined mirrors of each successive stage are further from said source and from said axis of symmetry, and the value of said gradient, and of said angular input aperture, progressively reduce as the point of intersection of the defining rays moves along said continuous surface away from said source through said successive stages.

68. An apparatus as claimed in claim 65 in which that point of the defined mirror of the lowest numbered stage of said successive stages which is nearest the source has the largest value of the gradient in a plane through the axis of symmetry, and of the angular input aperture, the defined mirrors of each successive stage are further from said source and from said axis of symmetry, and the value of said gradient, and of said angular input aperture, progressively reduce as the point of intersection of the defining rays moves along said continuous surface away from said source through said successive stages.

69. An apparatus as claimed in any of claims 41 to 43 or 51 to 53 in which a further mirror is provided to reflect rays from the source to a point on a defined mirror from which they will be reflected within the cone enclosing the well directed in and out-of-plane rays for said point.

70. An apparatus as claimed in any of claims 41 to 43 or 51 to 53 in which the annular thickness of the output beam from each final stage is small in relation to the spread of the output beam on a target due to other effects.

71. An apparatus as claimed in any of claims 41 to 43 or 51 to 53 in which the defining mirrors in a series of stages are contiguous and form a single defining unit with a continuous reflective surface and all their corresponding defined surfaces in said series of stages except the last are also contiguous and reflective and form a single defined unit with a continuous reflective surface and said defining and defined units are attached by a fixed tripod having three legs which are equidistant from the axis of symmetry and equally spaced around it.

72. An apparatus as claimed in claim 71 in which each leg of said fixed tripod is reflective and symmetric about a respective half-plane through the axis of symmetry and has a section in a respective further plane at right angles to said respective half-plane through the axis of symmetry and to its length which is an isosceles triangle whose unequal angle lies nearer to the source than its equal angles and is small compared with the largest grazing angle for any ray amongst the rays of electromagnetic energy incident upon said leg.

73. An apparatus as claimed in claim 71 in which a defined mirror for the last in said series of stages is attached to said defining unit by a moving tripod having three legs which are provided with mountings on the defining unit equidistant from the axis of symmetry and equally spaced around it, each leg being moved axially by a respective axial drive unit which includes a respective screw shaft and in a respective plane through the axis of said respective screw shaft by a respective transverse drive unit, but being free to rotate in a helix around its respective screw shaft together with its respective transverse drive unit.

74. An apparatus as claimed in claim 72 in which a defined mirror for the last in said series of stages is attached to said defining unit by a moving tripod having three legs which are provided with mountings on the defining unit equidistant from the axis of symmetry and equally spaced around it, each leg being moved axially by a respective axial drive unit which includes a respective screw shaft and in a respective plane through the axis of said respective screw shaft by a respective transverse drive unit, but being free to rotate in a helix around its respective screw shaft together with its respective transverse drive unit.

75. An apparatus as claimed in claim 73 in which one end of a leg of the moving tripod is attached to its respective axial drive unit by a pair of taper roller bearings which are preloaded against each other and the other end is attached to said defined mirror by a spherical bearing, and the movement of said leg in the respective plane through the axis of its respective screw shaft comprises a rotation about said pair of taper roller bearings.

76. An apparatus as claimed in claim 74 in which one end of a leg of the moving tripod is attached to its respective axial drive unit by a pair of taper roller bearings which are preloaded against each other and the other end is attached to said defined mirror by a spherical bearing, and the movement of said leg in the respective plane through the axis of its respective screw shaft comprises a rotation about said pair of taper roller bearings.

77. An apparatus as claimed in claim 73 in which each leg of the moving tripod is reflective and symmetric about said respective plane through the axis of its respective screw shaft and its section in a respective second further plane at right angles to said respective plane and to its length is a rectangle.

78. An apparatus as claimed in claim 75 in which each leg of the moving tripod is reflective and symmetric about said respective plane through the axis of its respective screw shaft and its section in a respective second further plane at right angles to said respective plane and to its length is a rectangle.

79. An apparatus as claimed in claim 74 in which each leg of the moving tripod is reflective and symmetric about said respective plane through the axis of its respective screw shaft and its section in a respective second further plane at right angles to said respective plane and to its length is a rectangle whose smaller sides are equal in length to and may be lined up with an unequal side of an isosceles triangle which forms the smallest side of a leg of said fixed tripod.

80. An apparatus as claimed in claim 76 in which each leg of the moving tripod is reflective and symmetric about said respective plane through the axis of its respective screw shaft and its section in a respective second further plane at right angles to said respective plane and to its length is a rectangle whose smaller sides are equal in length to and may be lined up with an unequal side of an isosceles triangle which forms the smallest side of a leg of said fixed tripod.

81. An apparatus as claimed in claim 75 in which said spherical bearing is recessed inside said defined mirror so that it will not be heated by or impede the electromagnetic energy.

82. An apparatus as claimed in claim 76 in which said spherical bearing is recessed inside said defined mirror so that it will not be heated by or impede the electromagnetic energy.

83. An apparatus as claimed in claim 77 in which said spherical bearing is recessed inside said defined mirror so that it will not be heated by or impede the electromagnetic energy.

84. An apparatus as claimed in claim 78 in which said spherical bearing is recessed inside said defined mirror so that it will not be heated by or impede the electromagnetic energy.

85. An apparatus as claimed in claim 79 in which said spherical bearing is recessed inside said defined mirror so that it will not be heated by or impede the electromagnetic energy.

86. An apparatus as claimed in claim 80 in which said spherical bearing is recessed inside said defined mirror so that it will not be heated by or impede the electromagnetic energy.

87. An apparatus as claimed in claim 75 in which three mountings for the spheres of said spherical bearing and of two further spherical bearings for the other two legs of the moving tripod respectively are connected by an equilateral triangular structure which serves both to stiffen said defined mirror and allows the three transverse drive units for said moving tripod to tension said moving tripod in order to eliminate any play due to said spherical bearings.

88. An apparatus as claimed in claim 76 in which three mountings for the spheres of said spherical bearing and of two further spherical bearings for the other two legs of the moving tripod respectively are connected by an equilateral triangular structure which serves both to stiffen said defined mirror and allows the three transverse drive units for said moving tripod to tension said moving tripod in order to eliminate any play due to said spherical bearings.

89. An apparatus as claimed in claim 87 in which actuators selected from the group consisting of electromagnetic and electromechanical actuators are mounted on the equilateral triangular structure one to a side in multiples of three with their moving parts connected to said defined mirror by lugs so as to be able to produce small distortions of said defined mirror.

90. An apparatus as claimed in claim 88 in which actuators selected from the group consisting of electromagnetic and electromechanical actuators are mounted on the equilateral triangular structure one to a side in multiples of three with their moving parts connected to said defined mirror by lugs so as to be able to produce small distortions of said defined mirror.

91. An apparatus as claimed in claim 73 in which each leg of the moving tripod is arranged to be moved axially in the same direction parallel to the axis of symmetry at the same time so that said defined mirror is also moved in said direction.

92. An apparatus as claimed in claim 74 in which each leg of the moving tripod is arranged to be moved axially in the same direction parallel to the axis of symmetry at the same time so that said defined mirror is also moved in said direction.

93. An apparatus as claimed in claim 75 in which said leg of the moving tripod is arranged to be rotated in the plane containing its screw shaft and to be moved axially at the same time so that said defined mirror is rotated about an axis through the two centres of the spheres of two further spherical bearings for the other two legs of said moving tripod.

94. An apparatus as claimed in claim 76 in which said leg of the moving tripod is arranged to be rotated in the plane containing its screw shaft and to be moved axially at the same time so that said defined mirror is rotated about an axis through the two centres of the spheres of two further spherical bearings for the other two legs of said moving tripod.

95. An apparatus as claimed in claim 75 in which each leg of the moving tripod is arranged to be rotated in the plane containing its screw shaft and to be moved axially all at the same time in such a manner that said defined mirror is rotated about an axis other than its own axis of symmetry.

96. An apparatus as claimed in claim 76 in which each leg of the moving tripod is arranged to be rotated in the plane containing its screw shaft and to be moved axially all at the same time in such a manner that said defined mirror is rotated about an axis other than its own axis of symmetry.

97. An apparatus as claimed in claim 75 in which each leg of the moving tripod is arranged to be rotated in the plane containing its screw shaft and to be moved axially all at the same time in such a manner that said defined mirror is moved in a plane at right angles to the axis of symmetry.

98. An apparatus as claimed in claim 76 in which each leg of the moving tripod is arranged to be rotated in the plane containing its screw shaft and to be moved axially all at the same time in such a manner that said defined mirror is moved in a plane at right angles to the axis of symmetry.

99. An apparatus as claimed in claim 91 in which the gradients of said defining and defined mirrors for said last in said series of stages are such that the output angles of those rays from said final stage lying in any plane through the axis of symmetry either reduce, so that said rays converge towards the axis of symmetry, or increase, so that said rays diverge away from the axis of symmetry, according to the direction of said movement along the axis of symmetry.

100. An apparatus as claimed in claim 92 in which the gradients of said defining and defined mirrors for said last in said series of stages are such that the output angles of those rays from said final stage lying in any plane through the axis of symmetry either reduce, so that said rays converge towards the axis of symmetry, or increase, so that said rays diverge away from the axis of symmetry, according to the direction of said movement along the axis of symmetry.

101. An apparatus as claimed in claim 95 in which said defining mirror for said last in said series of stages extends over a portion of a sphere whose centre lies on the axis of symmetry and said defined mirror of said final stage is symmetric about its own axis of symmetry and said defined mirror is arranged to be rotated about any such axis of rotation through said centre away from a position in which its own axis of symmetry is aligned with the axis of symmetry so that rays output from said final stage are directed with respect to the rotated axis of symmetry of said defined mirror.

102. An apparatus as claimed in claim 96 in which said defining mirror for said last in said series of stages extends over a portion of a sphere whose centre lies on the axis of symmetry and said defined mirror of said final stage is symmetric about its own axis of symmetry and said defined mirror is arranged to be rotated about any such axis of rotation through said centre away from a position in which its own axis of symmetry is aligned with the axis of symmetry so that rays output from said final stage are directed with respect to the rotated axis of symmetry of said defined mirror.

103. An apparatus as claimed in claim 97 in which the direction of movement of that portion of said defined mirror for said last in said series of stages which lies in a particular plane through the axis of symmetry is at right angles to said axis of symmetry and the gradients of said defining and defined mirrors for said final stage are such that the output angle of a ray from said final stage lying in said particular plane either reduces, so that said ray converges towards said axis of symmetry, or increases, so that said ray diverges away from said axis of symmetry, according to the direction of said movement at right angles to said axis of symmetry, the relationship between the effect and the sense of said movement depending on the gradients of said defining and defined mirrors.

104. An apparatus as claimed in claim 98 in which the direction of movement of that portion of said defined mirror for said last in said series of stages which lies in a particular plane through the axis of symmetry is at right angles to said axis of symmetry and the gradients of said defining and defined mirrors for said final stage are such that the output angle of a ray from said final stage lying in said particular plane either reduces, so that said ray converges towards said axis of symmetry, or increases, so that said ray diverges away from said axis of symmetry, according to the direction of said movement at right angles to said axis of symmetry, the relationship between the effect and the sense of said movement depending on the gradients of said defining and defined mirrors.

105. An apparatus as claimed in claim 2 in which each pair of defining rays whose intersection specifies a point on the defined surface lie entirely in a respective plane through the axis of symmetry.

106. An apparatus as claimed in claim 105 wherein the defining surface is in the form of first and second reflective defining surfaces on each of which a respective one of the defining rays is incident to a similarly orientated side to that on which the other defining ray is incident to the other defining surface and the intermediate point lies on either of said defining surfaces in the plane of and between the pair of defining rays.

107. An apparatus as claimed in claim 106 wherein an edge of said first defining surface is everywhere contiguous with an edge of said second defining surface.

108. An apparatus as claimed in claim 105 wherein the defining surface is in the form of first and second refractive defining surfaces on each of which a respective one of the defining rays is incident to a similarly orientated side to that on which the other defining ray is incident to the other defining surface and the intermediate point lies on either of said defining surfaces in the plane of and between the pair of defining rays.

109. An apparatus as claimed in claim 108 wherein an edge of said first defining surface is everywhere contiguous with an edge of said second defining surface.

110. An apparatus as claimed in claim 2 wherein the defining surface is in the form of first and second reflective defining surfaces on each of which a respective one of the defining rays is incident to a similarly orientated side to that on which the other defining ray is incident to the other defining surface and the intermediate point lies on either of said defining surfaces in the plane of and between the pair of defining rays.

111. An apparatus as claimed in claim 110 wherein an edge of said first defining surface is everywhere contiguous with an edge of said second defining surface.

112. An apparatus as claimed in claim 2 wherein the defining surface is in the form of first and second refractive defining surfaces on each of which a respective one of the defining rays is incident to a similarly orientated side to that on which the other defining ray is incident to the other defining surface and the intermediate point lies on either of said defining surfaces in the plane of and between the pair of defining rays.

113. An apparatus as claimed in claim 112 wherein an edge of said first defining surface is everywhere contiguous with an edge of said second defining surface.

114. An apparatus as claimed in claim 1 wherein the defining surface is in the form of first and second reflective defining surfaces on each of which a respective one of the defining rays is incident to a similarly orientated side to that on which the other defining ray is incident to the other defining surface and the intermediate point lies on either of said defining surfaces in the plane of and between the pair of defining rays.

115. An apparatus as claimed in claim 114 wherein an edge of said first defining surface is everywhere contiguous with an edge of said second defining surface.

116. An apparatus as claimed in claim 1 wherein the defining surface is in the form of first and second refractive defining surfaces on each of which a respective one of the defining rays is incident to a similarly orientated side to that on which the other defining ray is incident to the other defining surface and the intermediate point lies on either of said defining surfaces in the plane of and between the pair of defining rays.

117. An apparatus as claimed in claim 116 wherein an edge of said first defining surface is everywhere contiguous with an edge of said second defining surface.

118. An apparatus as claimed in any of claims 1 to 6 or 105 to 117 in which a point on the defined surface lies at a point of intersection of a defining ray and a respective line, said line having the path which a defining ray would have taken if it existed.

119. An apparatus as claimed in any of claims 1 to 6 or 105 to 117 in which a point on the defined surface lies at a point of intersection of a pair of lines, each such line having the path which a defining ray would have taken if it existed.

120. An apparatus as claimed in any of claims 105, 106 or 107 in which the defining surface is reflective and all the defining rays are incident to the same side of the defining mirror as any perpendicular from the axis of symmetry, and for each point of intersection of a pair of defining rays said defining mirror is concave with respect to said point of intersection and the output directions of said pair of defining rays are the same or approximately the same so that, for those in-plane rays comprising said pair of defining rays and the further rays for their point of intersection, the angular output aperture of said in-plane rays, when defined as the maximum of the angles between any two of the output rays corresponding to said in-plane rays, is less than the angular input aperture for said point, when defined as the angle between said pair of defining rays on incidence to the defined surface.

121. An apparatus as claimed in any of claims 105, 108 or 109 in which, for those in-plane rays comprising a pair of defining rays and the further rays for their point of intersection, the angular output aperture of said in-plane rays, when defined as the maximum of the angles between any two of the output rays corresponding to said in-plane rays, is less than the angular input aperture for said point, when defined as the angle between the pair of defining rays for said point on incidence to the defined surface.

122. An apparatus as claimed in any of claims 2, 110 or 111 in which the defining surface is reflective and all the rays incident to the defining mirror are incident to the same side of said defining mirror and the defining mirror is concave with respect to all the points of intersection of each pair of the defining rays which are incident upon it and the output directions of in and out-of-plane rays reflected from a particular region of the defining mirror approximate to the output directions of the defining rays reflected from that particular region.

123. An apparatus as claimed in any of claims 2, 112 or 113 in which the angular output aperture for one of said points of intersection, when defined as the maximum of the angles between any two of the output rays for said point of intersection, is less than the angular input aperture for said point, when defined as the angle between the pair of defining rays for said point on incidence to the defined surface.

124. An apparatus as claimed in any of claims 1, 114 or 115 in which the defining surface is reflective and all the rays incident to the defining mirror are incident to the same side of said defining mirror and the defining mirror is concave with respect to all the points of intersection of each pair of the defining rays which are incident upon it and the output directions of in and out-of-plane rays reflected from a particular region of the defining mirror approximate to the output directions of the defining rays reflected from that particular region.

125. An apparatus as claimed in any of claims 1, 116 or 117 in which the angular output aperture for one of said points of intersection, when defined as the maximum of the angles between any two of the output rays for said point of intersection, is less than the angular input aperture for said point, when defined as the angle between the pair of defining rays for said point on incidence to the defined surface.

126. An apparatus as claimed in claim 105 in which the defining surface is reflective and all the defining rays are incident to the same side of the defining mirror as any perpendicular from the axis of symmetry, and for each point of intersection of a pair of defining rays said defining mirror is concave with respect to said point of intersection and the output directions of said pair of defining rays are the same or approximately the same so that, for those in-plane rays comprising said pair of defining rays and the further rays for their point of intersection, the angular output aperture of said in-plane rays, when defined as the maximum of the angles between any two of the output rays corresponding to said in-plane rays, is less than the angular input aperture for said point, when defined as the angle between said pair of defining rays on incidence to the defined surface.

127. An apparatus as claimed in claim 105 in which, for those in-plane rays comprising a pair of defining rays and the further rays for their point of intersection, the angular output aperture of said in-plane rays, when defined as the maximum of the angles between any two of the output rays corresponding to said in-plane rays, is less than the angular input aperture for said point, when defined as the angle between the pair of defining rays for said point on incidence to the defined surface.

128. An apparatus as claimed in claim 2 in which the defining surface is reflective and all the rays incident to the defining mirror are incident to the same side of said defining mirror and the defining mirror is concave with respect to all the points of intersection of each pair of the defining rays which are incident upon it and the output directions of in and out-of-plane rays reflected from a particular region of the defining mirror approximate to the output directions of the defining rays reflected from that particular region.

129. An apparatus as claimed in claim 2 in which the angular output aperture for one of said points of intersection, when defined as the maximum of the angles between any two of the output rays for said point of intersection, is less than the angular input aperture for said point, when defined as the angle between the pair of defining rays for said point on incidence to the defined surface.

130. An apparatus as claimed in claim 1 in which the defining surface is reflective and all the rays incident to the defining mirror are incident to the same side of said defining mirror and the defining mirror is concave with respect to all the points of intersection of each pair of the defining rays which are incident upon it and the output directions of in and out-of-plane rays reflected from a particular region of the defining mirror approximate to the output directions of the defining rays reflected from that particular region.

131. An apparatus as claimed in claim 1 in which the angular output aperture for one of said points of intersection, when defined as the maximum of the angles between any two of the output rays for said point of intersection, is less than the angular input aperture for said point, when defined as the angle between the pair of defining rays for said point on incidence to the defined surface.

132. An apparatus as claimed in any of claims 126 to 131 further comprising a plurality of stages wherein the first stage includes said defining surface together with said defined surface and each additional stage includes a defining surface together with a defined surface respectively having the characteristics of said defining surface and said defined surface.

133. An apparatus as claimed in claim 132 wherein the rays output from a stage form the input to a further stage which will be referred to as the next successive stage in series to said stage and which has smaller choices for the angular input aperture at the various points on its defined surface than said stage in order to improve the accuracy with which those rays are directed.

134. An apparatus as claimed in claim 132 wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

135. An apparatus as claimed in claim 133 wherein the rays output from a stage form the input to more than one further stage which further stages will be referred to as being in parallel to one another but in series to said stage and which each have smaller choices for the angular input aperture at the various points on their defined surface than said stage in order to improve the accuracy with which those rays are directed.

136. An apparatus as claimed in claim 1 in which the source includes at least two sources all of which are of the same type.

137. An apparatus as claimed in claim 1 in which the source includes at least two sources at least two of which are of a different type to each other.

138. An apparatus as claimed in either of claims 136 or 137 in which at least two of the sources share an input aperture.

139. An apparatus as claimed in claim 1 in which the source produces electromagnetic energy continuously.

140. An apparatus as claimed in any of claims 41 to 43 or 51 to 53 in which at least a portion of the electromagnetic energy is not only of a high wavelength but is also incident to the defining mirror of a final stage in a series of stages at a low grazing angle such that the ratio of its E-polarization diffraction field to its H-polarization diffraction field is dependent on said low grazing angle.

141. An apparatus as claimed in any of claims 41 to 43 or 51 to 53 in which at least a portion of the electromagnetic energy is not only of high wavelengths but is also incident to the defining mirror of a final stage in a series of stages at a low grazing angle such that the ratio of its E-polarization diffraction field to its H-polarization diffraction field is dependent on said low grazing angle.

142. An apparatus as claimed in claim 1 in which the source is a plasma arc produced by an electric current.

143. An apparatus as claimed in claim 142 in which the plasma arc produces electromagnetic energy continuously.

144. An apparatus as claimed in claim 142 in which the plasma arc is powered by an electrical generator and the apparatus is mounted in an aircraft and the electrical generator is driven by the aircraft's engine.

145. An apparatus as claimed in claim 1 in which the source is a plasma produced in a shock tube.

146. An apparatus as claimed in claim 145 in which the shock tube comprises a round of chemical ammunition and the heat capacity of a mirror in the apparatus is arranged to be sufficient to contain the electromagnetic energy it adsorbs from the operation of a single round of said chemical ammunition.

147. An apparatus as claimed in claim 145 in which the shock tube comprises a round of chemical ammunition and the heat capacity of a lens in the apparatus is arranged to be sufficient to contain the electromagnetic energy it adsorbs from the operation of a single round of said chemical ammunition.

148. An apparatus as claimed in claim 1 in which the source is a plasma produced by at least one nuclear reaction.

149. An apparatus as claimed in claim 148 in which the plasma produces electromagnetic energy continuously.

150. An apparatus as claimed in any of claims 41 to 43 or 51 to 53 further comprising at least one additional source.

151. An apparatus as claimed in claim 150 in which one of the sources is a laser.

152. An apparatus as claimed in claim 151 in which the defining and defined surfaces of the innermost final stage are reflective and two alternate defining rays from the laser intersect at an alternate point on an alternate defined mirror for said innermost final stage and are then reflected to pass through a gap in the defined mirror of said innermost final stage to intersect and be reflected by the defining mirror of said innermost final stage, said alternate defined mirror being defined by said point and similar points.

153. An apparatus as claimed in claim 152 in which the alternate defined mirror is attached to the remainder of the apparatus by and movable by a further moving tripod.

154. An apparatus as claimed in claim 152 in which the optical cavity of the laser is symmetric about an axis of symmetry and comprises an unstable resonator with an annular output aperture and the angular input aperture at the alternate point, when defined as the angle between the pair of alternate defining rays on incidence to the alternate defined mirror at said alternate point, is approximately equal to twice the maximum angular error in the collimation of that electromagnetic energy output from said optical cavity which is incident at said alternate point.

155. An apparatus as claimed in claim 152 in which the laser is in the form of a circular array of lasers, each of whose phases is arranged to be controlled, the angular input aperture at an alternate point for any one of those lasers, when defined as the angle between the pair of alternate defining rays on incidence to the alternate defined mirror at said alternate point, is approximately equal to twice the maximum angular error in the collimation of that electromagnetic energy output from said laser which is incident at said alternate point, and said gap is replaced by holes in the defined mirror of said innermost final stage each of which is of sufficient size and suitably placed for the beam of a single laser to pass through.

156. An apparatus as claimed in claim 152 in which the defining rays for each final stage and the alternate defining rays for said innermost final stage are all chosen to give respective distributions of electromagnetic energy on a target comprising fusion reactants and said target is imploded first by electromagnetic energy from a source other than the laser and then also by at least one pulse of electromagnetic energy from said laser in order to achieve an increasing, or ramped, power level sufficient to compress said target and heat at least a part of the fusion reactants to a temperature at which they will undergo thermonuclear fusion.

157. An apparatus as claimed in claim 154 in which the defining rays for each final stage and the alternate defining rays for said innermost final stage are all chosen to give respective distributions of electromagnetic energy on a target comprising fusion reactants and said target is imploded first by electromagnetic energy from a source other than the laser and then also by at least one pulse of electromagnetic energy from said laser in order to achieve an increasing, or ramped, power level sufficient to compress said target and heat at least a part of the fusion reactants to a temperature at which they will undergo thermonuclear fusion.

158. An apparatus as claimed in claim 155 in which the defining rays for each final stage and the alternate defining rays for said innermost final stage are all chosen to give respective distributions of electromagnetic energy on a target comprising fusion reactants and at least a portion of said target is imploded first by electromagnetic energy from a source other than the laser and then also by at least one pulse of electromagnetic energy from said laser in order to achieve an increasing, or ramped, power level sufficient to compress at least a portion of said target and heat at least a part of the fusion reactants to a temperature at which they will undergo thermonuclear fusion.

159. An apparatus as claimed in claim 158 in which a further alternate defined mirror recirculates electromagnetic energy from the fusion reaction into a stage of the apparatus from where it is directed by virtue of said choice of defining rays for each final stage for the containment of the target.

160. An apparatus as claimed in claim 158 in which a further alternate defined mirror recirculates electromagnetic energy from the fusion reaction into a stage of the apparatus from where it is directed by virtue of said choice of defining rays for each final stage for the implosion of a further part of the target.

161. An apparatus as claimed in claim 158 in which a further alternate defined mirror recirculates electromagnetic energy from the fusion reaction into a stage of the apparatus from where it is directed by virtue of said choice of defining rays for each final stage for the implosion of the next target.

162. An apparatus as claimed in claim 159 in which a source other than the circular array of lasers comprises a circular array of shock tubes, electromagnetic energy from which is incident to the first stage defined mirror, and an accelerator propels a series of equally spaced targets, each comprising fusion reactants, along a line through each point at which an implosion will take place at a very high speed which is chosen in relation to said spacing to synchronise the arrival of a portion of each pulse of recirculated electromagnetic energy and each target at said point of implosion.

163. An apparatus as claimed in claim 160 in which a source other than the circular array of lasers comprises a circular array of shock tubes, electromagnetic energy from which is incident to the first stage defined mirror, and an accelerator propels a series of equally spaced targets, each comprising fusion reactants, along a line through each point at which an implosion will take place at a very high speed which is chosen in relation to said spacing to synchronise the arrival of each pulse of recirculated electromagnetic energy and each portion of each target at said point of implosion.

164. An apparatus as claimed in claim 161 in which a source other than the circular array of lasers comprises a circular array of shock tubes, electromagnetic energy from which is incident to the first stage defined mirror, and an accelerator propels a series of equally spaced targets, each comprising fusion reactants, along a line through each point at which an implosion will take place at a very high speed which is chosen in relation to said spacing to synchronise the arrival of each pulse of recirculated electromagnetic energy and each target at said point of implosion.

165. An apparatus as claimed in claim 156 in which the target is a cylindrical shell enclosing fusion reactants and the implosion is towards the axis of the cylindrical shell.

166. An apparatus as claimed in claim 157 in which the target is a cylindrical shell enclosing fusion reactants and the implosion is towards the axis of the cylindrical shell.

167. An apparatus as claimed in claim 159 in which the target is a cylindrical shell enclosing fusion reactants and the implosion is towards the axis of the cylindrical shell.

168. An apparatus as claimed in claim 160 in which the target is a cylindrical shell enclosing fusion reactants and the implosion is towards the axis of the cylindrical shell.

169. An apparatus as claimed in claim 161 in which the target is a cylindrical shell enclosing fusion reactants and the implosion is towards the axis of the cylindrical shell.

170. An apparatus as claimed in claim 162 in which the target is a cylindrical shell enclosing fusion reactants and the implosion is towards the axis of the cylindrical shell.

171. An apparatus as claimed in claim 163 in which the target is a cylindrical shell enclosing fusion reactants and the implosion is towards the axis of the cylindrical shell.

172. An apparatus as claimed in claim 164 in which the target is a cylindrical shell enclosing fusion reactants and the implosion is towards the axis of the cylindrical shell.

173. An apparatus as claimed in claim 151 in which a laser produces electromagnetic energy continuously.

174. An apparatus as claimed in claim 1 in which the source is a laser.

175. An apparatus as claimed in claim 174 in which the laser produces electromagnetic energy continuously.

176. An apparatus as claimed in claim 1 in which the source lies between the defining and defined surfaces.

177. An apparatus as claimed in claim 176 in which the source produces electromagnetic energy continuously.

178. An apparatus as claimed in claim 176 in which is at least one of said defining and defined surfaces forms at least a part of the boundary enclosing a cavity in which the stimulated emission of radiation takes place.

179. An apparatus as claimed in claim 178 in which the cavity comprises a resonator.

180. An apparatus as claimed in claim 1 in which the reflecting surface of a mirror comprises a liquid metal.

181. An apparatus as claimed in claim 180 in which said mirror is perforated by holes through which the liquid metal is made to pass by the action of a spring on a plunger to form said reflecting surface.

182. An apparatus as claimed in claim 1 in which a mirror is made to move by the rotation of a screw in order to replace a reflecting surface which is being evaporated away.

183. An apparatus as claimed in claim 182 in which the reflecting surface of a mirror comprises a liquid metal.

184. An apparatus as claimed in claim 1 in which the reflecting surface of a mirror is metallic.

185. An apparatus as claimed in any of claims 41 to 43 or 51 to 53 in which the reflecting surface of a mirror of the final stage in a series of stages is metallic.

186. An apparatus as claimed in claim 185 in which the electromagnetic energy is incident to said mirror of the final stage in a series of stages at low grazing angles.

187. An apparatus as claimed in claim 1 in which a mirror consists of a metal coated with a single layer of dielectric which is hard, transparent to all the wavelengths to be utilised by the apparatus, and does not adsorb water, in order to protect said mirror, and the thickness of said layer is the same throughout the extent of that layer.

188. An apparatus as claimed in claim 1 in which a mirror consists of a substrate coated with at least two layers of different dielectrics, each of which dielectrics is transparent to all the wavelengths to be utilised by the apparatus, said layers having alternately lower and higher refractive indices than the layer of dielectric (if any) on top of them, wherein the thickness of each layer is the same throughout the extent of that layer.

189. An apparatus as claimed in claim 188 in which said substrate is a metal.

190. An apparatus as claimed in either of claims 188 or 189 in which the outer layer of dielectric is of a type of dielectric which is hard, transparent to all the wavelengths to be utilised by the apparatus and does not adsorb water so that it may protect the layers of dielectrics below it, and the thickness of said layer is the same throughout the extent of that layer.

191. An apparatus as claimed in either of claims 188 or 189 in which the outermost layer of dielectric has a higher refractive index than the layer of dielectric below it and is of twice the quarter wave thickness for an angle of incidence above the Brewster angle for its outermost boundary but below any angle of incidence corresponding to the Brewster angle at its innermost boundary for a predetermined wavelength.

192. An apparatus as claimed in either of claims 188 or 189 in which the outermost layer of dielectric has a higher refractive index than the layer of dielectric below it and is of less than the quarter wave thickness for an angle of incidence above the Brewster angle for its outermost boundary but below any angle of incidence corresponding to the Brewster angle at its innermost boundary for a predetermined wavelength.

193. An apparatus as claimed in either of claims 188 or 189 in which the outermost layer of dielectric has a lower refractive index than the layer of dielectric below it and is of the quarter wave thickness for an angle of incidence above the Brewster angle for its outermost boundary but below any angle of incidence corresponding to the Brewster angle at its innermost boundary for a predetermined wavelength.

194. An apparatus as claimed in either of claims 188 or 189 in which the number of layers of dielectrics comprising the coating on a mirror is varied along an axis of symmetry of said mirror.

195. An apparatus as claimed in claim 1 in which the electromagnetic energy emitted by the source is of at least two wavelengths.

196. An apparatus as claimed in any of claims 41 to 43 or 51 to 53 in which the electromagnetic energy emitted by the source is of at least two wavelengths.

197. An apparatus as claimed in claim 187 in which the electromagnetic energy emitted by the source is of at least two wavelengths.

198. An apparatus as claimed in claim 188 in which the electromagnetic energy emitted by the source is of at least two wavelengths.

199. An apparatus as claimed in claim 189 in which the electromagnetic energy emitted by the source is of at least two wavelengths.

200. An apparatus as claimed in any of claims 197 to 199 in which the reflectivity of a mirror is chosen to be high for those wavelengths for which the rays of electromagnetic energy incident to it have the greatest energy at the expense of certain wavelengths for which said rays have a lower energy so as to avoid damaging said mirror by heating it excessively and to maximise the energy in the output beam and, in addition, to provide the output beam with a signature for detection by a sensor system.

201. An apparatus as claimed in any of claims 197 to 199 in which the output beam is to be used within the atmosphere and the reflectivity of a mirror is chosen to be low for those wavelengths which are so much scattered or adsorbed by the atmosphere as not to be useful in favour of higher reflectivity at other wavelengths and, in addition, to provide the output beam with a signature for detection by a sensor system.

202. An apparatus as claimed in any of claims 195 or 197 to 199 in which the source is such that the energy distribution over the wavelengths of the electromagnetic energy emitted by said source is sufficiently weighted in favour of low wavelengths as to avoid the initiation of plasma shielding at the target.

203. An apparatus as claimed in any of claims 195 or 197 to 199 in which the source is such that the electromagnetic energy emitted by said source is distributed over a number of component wavelengths which cannot interact coherently and the energy of each such component does not exceed the threshold at which Stimulated Raman Scattering begins.

204. An apparatus as claimed in claim 196 in which a mirror consists of a metal coated with a single layer of dielectric which is hard, transparent to all the wavelengths to be utilised by the apparatus, and does not adsorb water, in order to protect said mirror, and the thickness of said layer is the same throughout the extent of that layer.

205. An apparatus as claimed in claim 204 in which the thickness of the coating of dielectric is chosen to give the mirror low reflectivity at one predetermined value of the angle of incidence for one predetermined wavelength of the electromagnetic energy incident upon it, said mirror being the defining mirror of a final stage in a series of stages and said predetermined angle of incidence respectively being one of the narrow range of angles of incidence to said defining mirror, in order to provide the output beam with a signature for detection by a sensor system.

206. An apparatus as claimed in either of claims 198 or 199 in which there are at least two layers of at least one of the types of dielectric and the thicknesses of said layers are chosen according to a predetermined relation, consisting of an arithmetic progression, so as to obtain adequate reflectivity over the range of wavelengths of electromagnetic energy incident on said mirror for the range of angles of incidence to said mirror and/or to provide the output beam with a signature for detection by a sensor system.

207. An apparatus as claimed in either of claims 198 or 199 in which there are at least two layers of at least one of the types of dielectric and the thicknesses of said layers are chosen according to a predetermined relation, consisting of a geometric progression, so as to obtain adequate reflectivity over the range of wavelengths of electromagnetic energy incident on said mirror for the range of angles of incidence to said mirror and/or to provide the output beam with a signature for detection by a sensor system.

208. An apparatus as claimed in either of claims 198 or 199 in which there are at least two layers of at least one of the types of dielectric and the thicknesses of said layers are chosen according to a predetermined relation, consisting of an harmonic progression, so as to obtain adequate reflectivity over the range of wavelengths of electromagnetic energy incident on said mirror for the range of angles of incidence to said mirror and/or to provide the output beam with a signature for detection by a sensor system.

209. An apparatus as claimed in either of claims 188 or 189 in which the source is a laser.

210. An apparatus as claimed in claim 209 in which said source of electromagnetic energy is monochromatic, and the wavelength in a vacuum of the electromagnetic energy it emits is $\lambda$ and the thickness of the ith layer of dielectric is $\lambda/4(n_i^2 - n_0^2 \sin^2 \phi_0)^{1/2}$ where $\phi_0$ is the angle of incidence at the outermost boundary of the outermost layer, $n_0$ is the (real) refractive index of the incident medium and $n_i$ is the (real) refractive index of the ith layer so that said thickness is the quarter wave thickness for said angle of incidence $\phi_0$ and said wavelength $\lambda$.

211. An apparatus comprising a defined surface as defined by a source with an extent selected from the group consisting of an area and a volume from which electromagnetic energy of at least one wavelength is emitted first towards a defined surface and thence to a defining surface, the nature of each surface being selected from the group consisting of everywhere reflective and everywhere refractive, wherein each point on the defined surface lies at a point of intersection of a pair of defining rays radiating from different points within said extent, each defining ray being of a defining wavelength and being propagated by the defined surface, said propagation being selected from the group consisting of reflection and refraction according to the nature of said defined surface, and then being incident to the same side of the defining surface at a respective further point and there being propagated through a respective predetermined directed angle, said propagation being selected from the group consisting of reflection and refraction according to the nature of said defining surface, so that the defined surface is optically nearer to the source than the defining surface along both defining rays, and further the directed angle of a half-tangent to the defining surface which is co-planar with the two defining rays and lies at any intermediate point on the defining surface between the two respective further points is intermediate between the directed angles of two similarly orientated half-tangents which are co-planar with the two defining rays and lie at the respective further points, and a further ray from said source and of said defining wavelength passing through said point of intersection and also any one of such intermediate points is propagated by the defining surface through a directed angle selected from the group consisting of a directed angle intermediate between the two respective predetermined directed angles and a directed angle approximately equal to one of them, said propagation being selected from the group consisting of reflection and refraction according to the nature of said defining surface.

212. A method for directing electromagnetic energy comprising providing a source with an extent selected from the group consisting of an area and a volume from which electromagnetic energy of at least one wavelength is emitted first towards a defined surface and thence to a defining surface, the nature of each surface being selected from the group consisting of everywhere reflective and everywhere refractive, wherein each point on the defined surface lies at a point of intersection of a pair of defining rays radiating from different points within said extent, each defining ray being of a defining wavelength and being propagated by the defined surface, said propagation being selected from the group consisting of reflection and refraction according to the nature of said defined surface, and then being incident to the same side of the defining surface at a respective further point and there being propagated through a respective predetermined directed angle, said propagation being selected from the group consisting of reflection and refraction according to the nature of said defining surface, so that the defined surface is optically nearer to the source than the defining surface along both defining rays, and further the directed angle of a half-tangent to the defining surface which is co-planar with the two defining rays and lies at any intermediate point on the defining surface between the two respective further points is intermediate between the directed angles of two similarly orientated half-tangents which are co-planar with the two defining rays and lie at the respective further points, and a further ray from said source and of said defining wavelength passing through said point of intersection and also any one of such intermediate points is propagated by the defining surface through a directed angle selected from the group consisting of a directed angle intermediate between the two respective predetermined directed angles and a directed angle approximately equal to one of them, said propagation being selected from the group consisting of reflection and refraction according to the nature of said defining surface; and providing said defining and defined surfaces.

213. A method as claimed in claim 212 in which a point on the defined surface lies at a point of intersection of a defining ray and a respective line, said line having the path which a defining ray would have taken if it existed.

214. A method as claimed in claim 212 in which a point on the defined surface lies at a point of intersection of a pair of lines, each such line having the path which a defining ray would have taken if it existed.

* * * * *